(12) United States Patent
Venkatarayalu et al.

(10) Patent No.: US 12,553,885 B2
(45) Date of Patent: Feb. 17, 2026

(54) APPARATUSES, SYSTEMS, AND METHODS FOR SAMPLE TESTING

(71) Applicant: Hand Held Products, Inc., Charlotte, NC (US)

(72) Inventors: Suresh Venkatarayalu, Waxhaw, NC (US); Chen Feng, Mount Laurel, NC (US)

(73) Assignee: Hand Held Products, Inc., Charlotte, NC (US)

( * ) Notice: Subject to any disclaimer, the term of this patent is extended or adjusted under 35 U.S.C. 154(b) by 215 days.

(21) Appl. No.: 18/156,221

(22) Filed: Jan. 18, 2023

(65) Prior Publication Data

US 2023/0152305 A1    May 18, 2023

Related U.S. Application Data

(63) Continuation-in-part of application No. 17/936,764, filed on Sep. 29, 2022, and a continuation-in-part of
(Continued)

(51) Int. Cl.
*G01N 33/531*    (2006.01)
*G01N 21/17*    (2006.01)
(Continued)

(52) U.S. Cl.
CPC .......... *G01N 33/531* (2013.01); *G01N 21/17* (2013.01); *G01N 2021/1765* (2013.01);
(Continued)

(58) Field of Classification Search
CPC ..... G01N 2021/458; G01N 2021/7779; G01N 21/45; G01N 21/7703; G01N 1/4077; G01N 15/0612; G01N 2001/4088; G01N 2015/019; G01N 33/54386; G01N 2021/1765; G01N 2021/416; G01N 2021/432; G01N 21/17; G01N 21/77; G01N 2333/165; G01N 33/531; B01L 2300/0654; B01L 2300/0877; B01L 2300/18; B01L 2400/0481; B01L 3/5025; B01L 3/502715; B01L 3/50273; B01L 7/52; B01L 2200/0652; B01L 2200/16;
(Continued)

(56) References Cited

U.S. PATENT DOCUMENTS

| 4,564,021 A | 1/1986 | Siegmann et al. |
| 5,787,885 A | 8/1998 | Lemelson |

(Continued)

FOREIGN PATENT DOCUMENTS

| AU | 2013204332 B2 | 7/2015 |
| CN | 102288293 A | 12/2011 |

(Continued)

OTHER PUBLICATIONS

European search report Mailed on Oct. 23, 2023 for EP Application No. 23152603, 11 page(s).
(Continued)

*Primary Examiner* — Jennifer Wecker
(74) *Attorney, Agent, or Firm* — Alston & Bird LLP

(57) ABSTRACT

Methods, apparatuses, and systems associated with a sample testing device are provided.

4 Claims, 192 Drawing Sheets

Related U.S. Application Data application No. 17/302,536, filed on May 5, 2021, now Pat. No. 12,196,672, said application No. 17/936,764 is a continuation-in-part of application No. 17/302,536, filed on May 5, 2021, now Pat. No. 12,196,672.

(60) Provisional application No. 63/316,257, filed on Mar. 3, 2022, provisional application No. 63/263,481, filed on Nov. 3, 2021, provisional application No. 63/262,076, filed on Oct. 4, 2021, provisional application No. 63/154,476, filed on Feb. 26, 2021, provisional application No. 63/198,609, filed on Oct. 29, 2020, provisional application No. 63/021,416, filed on May 7, 2020.

(51) Int. Cl.
*G01N 21/45* (2006.01)
*G01N 21/41* (2006.01)
*G01N 21/43* (2006.01)

(52) U.S. Cl.
CPC . *G01N 2021/416* (2013.01); *G01N 2021/432* (2013.01); *G01N 2021/458* (2013.01)

(58) Field of Classification Search
CPC ..... B01L 2300/0681; B01L 2300/0816; B01L 2300/168; B01L 2300/1816; B01L 3/502761

See application file for complete search history.

(56) References Cited

U.S. PATENT DOCUMENTS

| | | |
|---|---|---|
| 5,961,924 A | 10/1999 | Reichert et al. |
| 6,033,368 A | 3/2000 | Gaston et al. |
| 6,078,705 A | 6/2000 | Neuschafer et al. |
| 6,192,168 B1 | 2/2001 | Feldstein et al. |
| 6,618,536 B1 | 9/2003 | Heideman et al. |
| 6,624,894 B2 | 9/2003 | Olszak et al. |
| 6,846,638 B2 | 1/2005 | Shipwash |
| 6,903,820 B2 | 6/2005 | Wang |
| 6,955,650 B2 | 10/2005 | Mault et al. |
| 7,024,066 B1 | 4/2006 | Malendevich et al. |
| 7,048,776 B2 | 5/2006 | Moore et al. |
| 7,052,854 B2 | 5/2006 | Melker et al. |
| 7,313,280 B2 | 12/2007 | Murai et al. |
| 7,347,825 B2 | 3/2008 | Vaughan et al. |
| 8,279,445 B2 | 10/2012 | Dominguez Horna et al. |
| 8,279,448 B2 | 10/2012 | Kim et al. |
| 8,323,586 B2 | 12/2012 | Zhou et al. |
| 8,361,392 B2 | 1/2013 | Lee et al. |
| 8,403,178 B2 | 3/2013 | May et al. |
| 8,654,344 B2 | 2/2014 | Borot et al. |
| 8,928,875 B2 | 1/2015 | Braeckmans et al. |
| 9,004,736 B1 | 4/2015 | Srinivas et al. |
| 9,157,804 B2 | 10/2015 | Messerschmidt |
| 9,169,521 B1 | 10/2015 | Rajagopal et al. |
| 9,202,833 B2 | 12/2015 | Mackey |
| 9,257,814 B1 | 2/2016 | Djordjevic et al. |
| 9,273,949 B2 | 3/2016 | Bornhop et al. |
| 9,310,185 B2 | 4/2016 | Lloret Soler et al. |
| 9,322,767 B2 | 4/2016 | Ehrenkranz |
| 9,450,381 B1 | 9/2016 | Cai et al. |
| 9,638,858 B2 | 5/2017 | Luo et al. |
| 9,690,093 B2 | 6/2017 | Margallo Balbés et al. |
| 9,739,594 B2 | 8/2017 | Koerner et al. |
| 9,804,510 B2 | 10/2017 | Hamaya et al. |
| 9,964,703 B2 | 5/2018 | Parker et al. |
| 9,976,844 B2 | 5/2018 | Lloret Soler et al. |
| 9,988,691 B2 | 6/2018 | Sislian et al. |
| 10,042,131 B1 | 8/2018 | Lesea |
| 10,261,013 B2 | 4/2019 | Bornhop et al. |
| 10,359,417 B2 | 7/2019 | Hammarlund et al. |
| 10,473,665 B2 | 11/2019 | Trowell et al. |
| 10,527,784 B1 | 1/2020 | Koste et al. |
| 10,591,284 B2 | 3/2020 | Deck et al. |
| 10,591,460 B1 | 3/2020 | Ahmad et al. |
| 10,627,210 B2 | 4/2020 | Habrich |
| 10,670,939 B2 | 6/2020 | Liu et al. |
| 2002/0034457 A1 | 3/2002 | Reichert et al. |
| 2002/0057884 A1 | 5/2002 | Hirose et al. |
| 2002/0196450 A1 | 12/2002 | Olszak et al. |
| 2003/0152304 A1 | 8/2003 | Gonthier et al. |
| 2004/0061864 A1 | 4/2004 | Snyder et al. |
| 2004/0081384 A1 | 4/2004 | Datesman et al. |
| 2004/0127808 A1 | 7/2004 | Vaughan et al. |
| 2004/0149777 A1 | 8/2004 | Santagiuliana |
| 2004/0161804 A1 | 8/2004 | McCash et al. |
| 2004/0239944 A1 | 12/2004 | Shirai et al. |
| 2004/0247199 A1 | 12/2004 | Murai et al. |
| 2004/0257579 A1 | 12/2004 | Shirai et al. |
| 2005/0048599 A1 | 3/2005 | Goldberg et al. |
| 2005/0137491 A1 | 6/2005 | Paz et al. |
| 2005/0140860 A1 | 6/2005 | Olczak |
| 2006/0051010 A1 | 3/2006 | Chu et al. |
| 2007/0062255 A1 | 3/2007 | Talton |
| 2007/0102362 A1 | 5/2007 | Iida et al. |
| 2007/0211254 A1 | 9/2007 | Matsushita et al. |
| 2007/0223002 A1 | 9/2007 | Masri et al. |
| 2008/0186504 A1 | 8/2008 | Kiesel et al. |
| 2008/0204747 A1 | 8/2008 | Emmerson et al. |
| 2009/0040524 A1 | 2/2009 | Joung |
| 2009/0140048 A1 | 6/2009 | Yu et al. |
| 2009/0152267 A1 | 6/2009 | May et al. |
| 2009/0255953 A1 | 10/2009 | May et al. |
| 2009/0314763 A1 | 12/2009 | Chu et al. |
| 2010/0009456 A1 | 1/2010 | Prins et al. |
| 2010/0188665 A1 | 7/2010 | Dotson et al. |
| 2010/0271634 A1 | 10/2010 | Dominguez Horna et al. |
| 2011/0109897 A1 | 5/2011 | Bataillou et al. |
| 2011/0172129 A1 | 7/2011 | Lee et al. |
| 2011/0236273 A1 | 9/2011 | Claussen et al. |
| 2011/0310378 A1 | 12/2011 | Froggatt et al. |
| 2012/0085761 A1 | 4/2012 | Gonzalez |
| 2012/0147228 A1 | 6/2012 | Duparré et al. |
| 2012/0174650 A1 | 7/2012 | Ariessohn et al. |
| 2012/0214707 A1 | 8/2012 | Ymeti et al. |
| 2012/0231548 A1 | 9/2012 | Akers, Jr. |
| 2013/0142477 A1 | 6/2013 | Diemeer |
| 2013/0217029 A1 | 8/2013 | Sislian et al. |
| 2013/0231548 A1 | 9/2013 | Brown et al. |
| 2013/0321677 A1 | 12/2013 | Cote et al. |
| 2014/0080729 A1 | 3/2014 | Grego et al. |
| 2014/0198307 A1 | 7/2014 | Hamaya et al. |
| 2014/0220606 A1* | 8/2014 | Puntambekar ..... G01N 33/6869 436/501 |
| 2014/0311350 A1 | 10/2014 | Campbell et al. |
| 2015/0033824 A1 | 2/2015 | Hammarlund et al. |
| 2015/0129768 A1 | 5/2015 | Koizumi et al. |
| 2015/0226609 A1 | 8/2015 | Cho |
| 2015/0268161 A1 | 9/2015 | Song et al. |
| 2015/0276588 A1 | 10/2015 | Marshall et al. |
| 2015/0338202 A1 | 11/2015 | Xiang et al. |
| 2016/0022946 A1 | 1/2016 | Sislian et al. |
| 2016/0041138 A1 | 2/2016 | Pycke et al. |
| 2016/0187333 A1 | 6/2016 | Moll et al. |
| 2016/0282207 A1 | 9/2016 | Rablau |
| 2016/0327743 A1 | 11/2016 | Kippenberg et al. |
| 2016/0349454 A1 | 12/2016 | Zhang et al. |
| 2017/0016638 A1 | 1/2017 | Yun |
| 2017/0028403 A1 | 2/2017 | Krause |
| 2017/0067882 A1 | 3/2017 | Bornhop et al. |
| 2017/0097287 A1 | 4/2017 | Clavaguera et al. |
| 2017/0303822 A1 | 10/2017 | Allsworth et al. |
| 2017/0303823 A1 | 10/2017 | Allsworth et al. |
| 2017/0324482 A1 | 11/2017 | Kato et al. |
| 2017/0370703 A1 | 12/2017 | Wang et al. |
| 2018/0003706 A1 | 1/2018 | Mavinkurve et al. |
| 2018/0128600 A1 | 5/2018 | 'T Hooft |
| 2018/0128680 A1 | 5/2018 | Kim |
| 2018/0147573 A1* | 5/2018 | Hiddessen ............ B01F 33/813 |
| 2018/0155782 A1 | 6/2018 | Zhong |

(56) References Cited

U.S. PATENT DOCUMENTS

| | | | |
|---|---|---|---|
| 2018/0250671 A1* | 9/2018 | De Lange | B01L 3/5027 |
| 2018/0306775 A1 | 10/2018 | Beck et al. | |
| 2019/0167152 A1 | 6/2019 | Weda et al. | |
| 2019/0255474 A1 | 8/2019 | Ryan et al. | |
| 2019/0265157 A1 | 8/2019 | Challener | |
| 2019/0274588 A1 | 9/2019 | Cardin | |
| 2019/0275357 A1 | 9/2019 | Palmer, Jr. et al. | |
| 2019/0339466 A1 | 11/2019 | Heck et al. | |
| 2020/0006088 A1 | 1/2020 | Yu et al. | |
| 2020/0025611 A1 | 1/2020 | Mai et al. | |
| 2020/0025631 A1 | 1/2020 | Howells et al. | |
| 2020/0096450 A1 | 3/2020 | Zhong et al. | |
| 2020/0132605 A1 | 4/2020 | Fung et al. | |
| 2020/0156076 A1 | 5/2020 | Crescenzi et al. | |
| 2020/0220329 A1 | 7/2020 | Siriani et al. | |
| 2021/0016276 A1 | 1/2021 | Chiu et al. | |
| 2021/0076979 A1 | 3/2021 | O'Brien et al. | |
| 2021/0302650 A1 | 9/2021 | Song et al. | |
| 2021/0349018 A1 | 11/2021 | Venkatarayalu et al. | |
| 2021/0370289 A1* | 12/2021 | Klein | G01N 33/54326 |
| 2022/0003670 A1 | 1/2022 | McBrady et al. | |
| 2022/0003673 A1 | 1/2022 | Denomme et al. | |

FOREIGN PATENT DOCUMENTS

| | | |
|---|---|---|
| CN | 102322876 A | 1/2012 |
| CN | 103003685 A | 3/2013 |
| CN | 105121998 A | 12/2015 |
| CN | 103884683 B | 4/2016 |
| CN | 106482834 A | 3/2017 |
| CN | 106908405 A | 6/2017 |
| CN | 107101575 A | 8/2017 |
| CN | 207570561 U | 7/2018 |
| CN | 108592964 A | 9/2018 |
| CN | 208311016 U | 1/2019 |
| CN | 109844496 A | 6/2019 |
| CN | 109946463 A | 6/2019 |
| CN | 110077703 A | 8/2019 |
| CN | 110081817 A | 8/2019 |
| CN | 110112649 A | 8/2019 |
| CN | 209215662 U | 8/2019 |
| CN | 110401101 A | 11/2019 |
| CN | 209878413 U | 12/2019 |
| CN | 110672556 A | 1/2020 |
| CN | 110703385 A | 1/2020 |
| CN | 110873693 A | 3/2020 |
| CN | 210149831 U | 3/2020 |
| CN | 210405999 U | 4/2020 |
| CN | 210427333 U | 4/2020 |
| EP | 2017602 A1 | 1/2009 |
| EP | 3907494 A1 | 11/2021 |
| EP | 4239318 A2 | 9/2023 |
| GB | 2437543 A | 4/2006 |
| JP | 07-084135 A | 3/1995 |
| JP | 11-500826 A | 1/1999 |
| JP | 2000-230890 A | 8/2000 |
| JP | 2002-507287 A | 3/2002 |
| JP | 2002-098844 A | 4/2002 |
| JP | 2002-541492 A | 12/2002 |
| JP | 2003-004752 A | 1/2003 |
| JP | 2004-117582 A | 4/2004 |
| JP | 2004-125624 A | 4/2004 |
| JP | 2004-145246 A | 5/2004 |
| JP | 2004-537038 A | 12/2004 |
| JP | 2005-234538 A | 9/2005 |
| JP | 2007-531863 A | 11/2007 |
| JP | 2008-506940 A | 3/2008 |
| JP | 2011-509225 A | 3/2011 |
| JP | 2013-509581 A | 3/2013 |
| JP | 2013-238401 A | 11/2013 |
| JP | 2014-509732 A | 4/2014 |
| JP | 2015-052751 A | 3/2015 |
| JP | 2016-512431 A | 4/2016 |
| JP | 2016-166917 A | 9/2016 |
| JP | 2017-503162 A | 1/2017 |
| JP | 2017-161355 A | 9/2017 |
| JP | 2020-020990 | 2/2020 |
| JP | 2020-523551 A | 8/2020 |
| JP | 2020-153862 A | 9/2020 |
| KR | 10-0839268 B1 | 6/2008 |
| KR | 10-2015-0059436 A | 6/2015 |
| RU | 2690319 C1 | 5/2019 |
| WO | 1998/044970 A1 | 10/1998 |
| WO | 2004/020987 A1 | 3/2004 |
| WO | 2005/054826 A1 | 6/2005 |
| WO | 2009/010624 A1 | 1/2009 |
| WO | 2009/022028 A1 | 2/2009 |
| WO | 2010/090599 A1 | 8/2010 |
| WO | 2017/153378 A1 | 9/2017 |
| WO | 2018/143474 A1 | 8/2018 |
| WO | 2018/185489 A1 | 10/2018 |
| WO | 2020/005431 A1 | 1/2020 |
| WO | 2020/031751 A1 | 2/2020 |
| WO | 2020/037307 A1 | 2/2020 |
| WO | 2020/071273 A1 | 4/2020 |
| WO | 2020/141463 A2 | 7/2020 |
| WO | 2021/202929 A1 | 10/2021 |

OTHER PUBLICATIONS

Notice of Allowance and Fees Due (PTOL-85) Mailed on Sep. 20, 2024 for U.S. Appl. No. 17/302,536, 2 page(s).

Trafton, et al. "Covid-19 diagnostic based on MIT technology might be tested on patient samples soon," MIT News on Campus and Around the World, Massachusetts Institute of Technology, Mar. 12, 2020, https://news.mit.edu/2020/covid-19-diagnostic-test-prevention-0312.

Usachev, et al. "Multiplexed Surface Plasmon Resonance based real time viral aerosol detection," Journal of Aerosol Science, 90 (2015): 136-143. https://doi.org/10.1016/j.jaerosci.2015.08.009.

Wallace, J. "New saliva test to instantly detect coronavirus via interferometric laser technology," Laser Focus World, Apr. 7, 2020 (7 pages). https://www.laserfocusworld.com/test-measurement/article/14173589/new-saliva-test-to-instantly-detect-coronavirus-via-interferometric-laser-technology.

Waltz, E. "Can Sensors that Detect Coronavirus in the Air Help Economies Reopen Safely?" IEEE Spectrum, Jun. 18, 2020, https://spectrum.ieee.org/devices-monitor-coronavirus-in-the-air.

Wragg, et al. "An automated online instrument to quantify aerosol-bound reactive oxygen species (ROS) for ambient measurement and health-relevant aerosol studies," in Atmos. Meas. Tech., 9, 4891-4900, 2016. doi:10.5194/amt-9-4891-2016.

Ymeti, A. Development of a multichannel integrated young interferometer immunosensor. 2004. PhD Thesis. University of Twente.

Zinoviev, et al. "Integrated Bimodal Waveguide Interferometric Biosensor for Label-Free Analysis," in Journal of Lightwave Technology, 2011, vol. 29, No. 13, pp. 1926-1930, doi: 10.1109/JLT.2011.2150734.

Communication about intention to grant a European patent Mailed on Sep. 18, 2024 for EP Application No. 21172819, 6 page(s).

Examiner Interview Summary Record (PTOL-413) Mailed on Mar. 6, 2025 for U.S. Appl. No. 18/503,902, 1 page(s).

Notice of Allowance and Fees Due (PTOL-85) Mailed on Mar. 6, 2025 for U.S. Appl. No. 18/503,902, 10 page(s).

English translation of JP Decision to Grant dated Feb. 2, 2024 for JP Application No. 2022152938, 2 page(s).

JP Decision to Grant Mailed on Feb. 2, 2024 for JP Application No. 2022152938, 3 page(s).

Notice of Allowance and Fees Due (PTOL-85) Mailed on Nov. 17, 2023 for U.S. Appl. No. 17/302,535, 3 page(s).

Notice of Allowance and Fees Due (PTOL-85) Mailed on Nov. 17, 2023 for U.S. Appl. No. 17/446,686, 3 page(s).

Notice of Allowanec and Fees Due (PTOL-85) Mailed on Nov. 24, 2023 for U.S. Appl. No. 17/446,688, 3 page(s).

Requirement for Restriction/Election Mailed on Jan. 11, 2024 for U.S. Appl. No. 17/933,678, 8 page(s).

Non-Final Rejection Mailed on Jun. 14, 2024 for U.S. Appl. No. 18/503,902, 16 page(s).

(56) References Cited

OTHER PUBLICATIONS

Notice of Allowance and Fees Due (PTOL-85) Mailed on Jul. 26, 2023 for U.S. Appl. No. 17/446,684, 3 page(s).
Notice of Allowance and Fees Due (PTOL-85) Mailed on Jul. 27, 2023 for U.S. Appl. No. 17/446,686, 9 page(s).
European search report Mailed on Sep. 3, 2024 for EP Application No. 23213622, 13 page(s).
English Translation of JP Office Action dated Feb. 9, 2024 for JP Application No. 2021079086, 5 page(s).
EP Office Action Mailed on Mar. 13, 2024 for EP Application No. 21172749, 7 page(s).
JP Office Action Mailed on Feb. 9, 2024 for JP Application No. 2021079086, 6 page(s).
Decision to grant a European patent Mailed on Jan. 23, 2025 for EP Application No. 21172819, 3 page(s).
Advisory Action (PTOL-303) Mailed on Feb. 19, 2025 for U.S. Appl. No. 17/933,678, 2 page(s).
Final Rejection Mailed on Feb. 7, 2025 for U.S. Appl. No. 17/447,998, 10 page(s).
Final Rejection Mailed on Feb. 20, 2025 for U.S. Appl. No. 17/447,996, 13 page(s).
Non-Final Rejection Mailed on Feb. 13, 2025 for U.S. Appl. No. 17/936,764, 10 page(s).
EP Office Action Mailed on May 28, 2024 for EP Application No. 22197548, 9 page(s).
European search report Mailed on Apr. 4, 2024 for EP Application No. 22199404, 12 page(s).
English Translation of JP Office Action dated Feb. 4, 2025 for JP Application No. 2021079150, 4 page(s).
JP Office Action Mailed on Feb. 4, 2025 for JP Application No. 2021079150, 5 page(s).
European search report Mailed on Jul. 29, 2024 for EP Application No. 22199404, 14 page(s).
Karsunke et al., "Development of a multichannel flow-through chemiluminescence microarray chip for parallel calibration and detection of pathogenic bacteria," Anal Bioannal Chem, 395:1623-1630, (2009).
Advisory Action (PTOL-303) Mailed on Jan. 13, 2025 for U.S. Appl. No. 18/503,902, 3 page(s).
Final Rejection Mailed on Sep. 23, 2024 for U.S. Appl. No. 18/503,902, 16 page(s).
Requirement for Restriction/Election Mailed on Dec. 5, 2024 for U.S. Appl. No. 17/936,764, 7 page(s).
English Translation of JP Notice of Allowance, including Search Report dated Oct. 11, 2024 for JP Application No. 2021079086, 2 page(s).
JP Notice of Allowance, including Search Report Mailed on Oct. 11, 2024 for JP Application No. 2021079086, 4 page(s).
Non-Final Rejection Mailed on Apr. 11, 2024 for U.S. Appl. No. 17/933,678, 20 page(s).
Notice of Allowance and Fees Due (PTOL-85) Mailed on Aug. 10, 2023 for U.S. Appl. No. 17/302,535, 8 page(s).
Notice of Allowance and Fees Due (PTOL-85) Mailed on Aug. 10, 2023 for U.S. Appl. No. 17/446,686, 3 page(s).
Notice of Allowance and Fees Due (PTOL-85) Mailed on Aug. 17, 2023 for U.S. Appl. No. 17/446,688, 3 page(s).
Final Rejection Mailed on Sep. 6, 2024 for U.S. Appl. No. 17/933,678, 22 page(s).
Non-Final Rejection Mailed on Sep. 11, 2024 for U.S. Appl. No. 17/447,994, 12 page(s).
Non-Final Rejection Mailed on Sep. 11, 2024 for U.S. Appl. No. 17/447,996, 15 page(s).
Non-Final Rejection Mailed on Sep. 11, 2024 for U.S. Appl. No. 17/447,998, 8 page(s).
Notice of Allowance and Fees Due (PTOL-85) Mailed on Sep. 5, 2024 for U.S. Appl. No. 17/302,536, 10 page (s).
Stamm, Ch., and W. Lukosz. "Integrated Optical Difference Interferometer as immunosensor." Sensors and Actuators B: Chemical, vol. 31, No. 3, Mar. 1996, pp. 203-207, https://doi.org/10.1016/0925-4005(96)80067-0 (Year: 1996).
Notice of Allowance and Fees Due (PTOL-85) Mailed on Aug. 7, 2023 for U.S. Appl. No. 17/446,684, 3 page(s).
Notice of Allowance and Fees Due (PTOL-85) Mailed on Aug. 7, 2023 for U.S. Appl. No. 17/446,688, 8 page(s).
Requirement for Restriction/Election Mailed on Oct. 4, 2024 for U.S. Appl. No. 17/447,995, 7 page(s).
Final Rejection Mailed on Feb. 3, 2025 for U.S. Appl. No. 17/447,994, 12 page(s).
English Translation of JP Notice of Allowance, including Search Report dated Oct. 1, 2024 for JP Application No. 2022160389, 2 page(s).
JP Notice of Allowance, including Search Report Mailed on Oct. 1, 2024 for JP Application No. 2022160389, 3 page(s).
Non-Final Rejection Mailed on Dec. 23, 2024 for U.S. Appl. No. 17/447,995, 21 page(s).
English Translation of JP Office Action dated Oct. 10, 2023 for JP Application No. 2022160389, 2 page(s).
English Translation of JP Office Action dated Sep. 29, 2023 for JP Application No. 2022152938, 1 page(s).
JP Office Action Mailed on Oct. 10, 2023 for JP Application No. 2022160389, 3 page(s).
JP Office Action Mailed on Sep. 29, 2023 for JP Application No. 2022152938, 2 page(s).
Notice of Allowance and Fees Due (PTOL-85) Mailed on Mar. 25, 2025 for U.S. Appl. No. 18/503,902, 7 page(s).
Notice of Allowance and Fees Due (PTOL-85) Mailed on Mar. 28, 2025 for U.S. Appl. No. 18/503,902, 7 page(s).
European partial search report Mailed on May 3, 2024 for EP Application No. 23213622, 11 page(s).
Non-Final Rejection Mailed on Mar. 29, 2024 for U.S. Appl. No. 17/302,536, 16 page(s).
EP Office Action Mailed on Sep. 27, 2023 for EP Application No. 21172819, 5 page(s).
European search report Mailed on Oct. 2, 2023 for EP Application No. 23177883, 7 page(s).
Advisory Action (PTOL-303) Mailed on Jul. 10, 2023 for U.S. Appl. No. 17/302,535, 3 page(s).
European search report Mailed on Jul. 17, 2023 for EP Application No. 23152603, 14 page(s).
European search report Mailed on Nov. 9, 2021 for EP Application No. 21172819, 8 page(s).
European search report Mailed on Sep. 24, 2021 for EP Application No. 21172749, 12 page(s).
Examiner Interview Summary Record (PTOL-413) Mailed on Jul. 10, 2023 for U.S. Appl. No. 17/302,535, 1 page(s).
Non-Final Rejection Mailed on Nov. 18, 2022 for U.S. Appl. No. 17/302,535, 16 page(s).
Notice of Allowance and Fees Due (PTOL-85) Mailed on Jul. 12, 2023 for U.S. Appl. No. 17/446,684, 8 page(s).
Sevin-Landais et al., "Functional immobilisation of the nicotinic acetylcholine receptor in tethered lipid membranes," Biophysical Chemistry, 85:141-152, (2000).
EP Office Action Mailed on Jun. 12, 2025 for EP Application No. 23152603, 6 page(s).
Notice of Allowance and Fees Due (PTOL-85) Mailed on Jul. 22, 2025 for U.S. Appl. No. 17/447,994, 6 page(s).
Notice of Allowance and Fees Due (PTOL-85) Mailed on Jul. 24, 2025 for U.S. Appl. No. 17/447,996, 8 page(s).
Advisory Action (PTOL-303) Mailed on May 5, 2025 for U.S. Appl. No. 17/447,996, 3 page(s).
Non-Final Rejection Mailed on May 13, 2025 for U.S. Appl. No. 17/933,678, 17 page(s).
Notice of Allowance and Fees Due (PTOL-85) Mailed on May 8, 2025 for U.S. Appl. No. 18/503,902, 7 page(s).
Examiner Interview Summary Record (PTOL-413) Mailed on Jun. 24, 2025 for U.S. Appl. No. 17/447,996, 1 page(s).
Notice of Allowance and Fees Due (PTOL-85) Mailed on Jul. 1, 2025 for U.S. Appl. No. 17/447,995, 10 page(s).
Notice of Allowance and Fees Due (PTOL-85) Mailed on Jul. 1, 2025 for U.S. Appl. No. 17/447,996, 8 page(s).
Notice of Allowance and Fees Due (PTOL-85) Mailed on Jul. 15, 2025 for U.S. Appl. No. 17/447,995, 10 page(s).

(56) References Cited

OTHER PUBLICATIONS

Notice of Allowance and Fees Due (PTOL-85) Mailed on Jul. 15, 2025 for U.S. Appl. No. 17/447,998, 6 page(s).
Notice of Allowance and Fees Due (PTOL-85) Mailed on Jun. 23, 2025 for U.S. Appl. No. 17/447,994, 6 page(s).
Notice of Allowance and Fees Due (PTOL-85) Mailed on Jun. 24, 2025 for U.S. Appl. No. 17/447,996, 11 page(s).
Notice of Allowance and Fees Due (PTOL-85) Mailed on Jun. 24, 2025 for U.S. Appl. No. 17/447,998, 6 page(s).
Examiner Interview Summary Record (PTOL-413) Mailed on May 21, 2025 for U.S. Appl. No. 17/447,994, 1 page(s).
Notice of Allowance and Fees Due (PTOL-85) Mailed on Jun. 10, 2025 for U.S. Appl. No. 17/447,995, 10 page(s).
Notice of Allowance and Fees Due (PTOL-85) Mailed on Jun. 10, 2025 for U.S. Appl. No. 17/447,998, 6 page(s).
Notice of Allowance and Fees Due (PTOL-85) Mailed on Jun. 11, 2025 for U.S. Appl. No. 18/503,902, 7 page(s).
Notice of Allowance and Fees Due (PTOL-85) Mailed on May 21, 2025 for U.S. Appl. No. 17/447,994, 10 page(s).
Notice of Allowance and Fees Due (PTOL-85) Mailed on May 27, 2025 for U.S. Appl. No. 18/503,902, 7 page(s).
Notice of Allowance and Fees Due (PTOL-85) Mailed on May 28, 2025 for U.S. Appl. No. 17/447,998, 9 page(s).
Notice of Allowance and Fees Due (PTOL-85) Mailed on Jul. 25, 2025 for U.S. Appl. No. 17/447,995, 10 page(s).
Notice of Allowance and Fees Due (PTOL-85) Mailed on Jul. 25, 2025 for U.S. Appl. No. 17/447,998, 6 page(s).
Agranovski, et al. "Comparative Study of the Performance of Nine Filters Utilized in Filtration of Aerosols by Bubbling," Aerosol Science and Technology, 2001, 35:4, 852-859, DOI: 10.1080/027868201753227415.
Agranovski, et al. "New personal sampler for viable airborne viruses: feasibility study," Journal of Aerosol Science, vol. 36, Issues 5-6, 2005, pp. 609-617. https://doi.org/10.1016/j.jaerosci.2004.11.014.
Azevedo, M. "E25Bio Raises $2M From Khosla Ventures To Create Rapid COVID-19 Diagnostic Test," Crunchbase News, Mar. 18, 2020. https://news.crunchbase.com/news/e25bio-raises-2m-from-khosla-ventures-to-create-rapid-covid-19-diagnostic-test/.
Bellamy III, W. "Halo Sensor Advances IoT Concept of Wireless Cabin Air Quality Monitoring," Aviation Today, Jun. 12, 2020 (7 pages). https://www.aviationtoday.com/2020/06/12/halo-sensor-advances-iot-concept-wireless-cabin-air-quality-monitoring/.
BioOptics World Editors. "Optical method could cut Coronavirus diagnosis time to 15 minutes," Laser Focus World, Mar. 10, 2020 (5 pages). https://www.laserfocusworld.com/biooptics/biomedicine/article/14195374/optical-method-could-cut-coronavirus-diagnosis-time-to-15-minutes.
BioPhotonics, "Plasmonic Biosensor Uses Thermal and Optical Methods to Detect Coronavirus," Photonics Media, Jul./Aug. 2020, https://www.photonics.com/Articles/Plasmonic_Biosensor_Uses_Thermal_and_Optical/a65734.
Campbell D.P. (2008) Interferometric Biosensors. In: Zourob M., Elwary S., Turner A. (eds) Principles of Bacterial Detection: Biosensors, Recognition Receptors and Microsystems. Springer, New York, NY. https://doi.org/10.1007/978-0-387-75113-9_9.
Chaghajerdi, A. "Sensing and Control in Optical Drives: How to Read Data from a Clear Disc," in IEEE Control Systems Magazine, vol. 28, No. 3, pp. 23-29, Jun. 2008, doi: 10.1109/MCS.2008.920486.
Collimation of Astigmatic Diode Laser Beam by Objective Lens, LightTrans International GmbH. Retrieved from https://www.lighttrans.com/fileadmin/shared/UseCases/Application_UC_Collimation%20of%20Astigmatic%20Diode%20Laser.pdf, Year: 2020.
Communication from Photonics 21. "Photonics21 to develop saliva test to detect Covid-19 with lasers," Science Business, Apr. 7, 2020 (6 pages). https://sciencebusiness.net/network-updates/photonics21-develop-saliva-test-detect-covid-19-lasers.
Covid-19 diagnose, faster and cheaper, nanbiosis (2 pages). https://www.nanbiosis.es/covid-19-diagnose-faster-and-cheaper/ Dec. 21, 2021.
Deck, L. "High-performance multi-channel fiber-based absolute distance measuring interferometer system," Proceedings vol. 7405, Instrumentation, Metrology, and Standards for Nanomanufacturing III; 74050E (2009), 9 pages. https://doi.org/10.1117/12.826253.
Duval, et al. "Nanophotonic lab-on-a-chip platforms including novel bimodal interferometers, microfluidics and grating couplers," Lab on a chip, 2012, 12(11): 1987-1994. 10.1039/c2lc40054e.
European search report Mailed on May 8, 2023 for EP Application No. 22197548, 13 page(s).
European Search Report Mailed on Nov 9, 2021for EP Application No. 21172819.1, 9 page(s).
European search report Mailed on Sep. 24, 2021 for EP Application No. 21172749.
Final Rejection Mailed on Apr. 11, 2023 for U.S. Appl. No. 17/302,535, 12 page(s).
Final Rejection Mailed on Apr. 11, 2023 for U.S. Appl. No. 17/446,684, 17 page(s).
Gao, et al. "Airborne Wireless Sensor Networks for Airplane Monitoring System," Hindawi Wireless Communications and Mobile Computing, vol. 2018, Article ID 6025825, 18 pages. DOI: https://doi.org/10.1155/2018/6025825.
Garcia, D. Lab-on-A-Chip Integration of the Bimodal Waveguide Nanointerferometric Biosensor. 2018. Autonomous University of Barcelona. PhD Dissertation.
González, Ana Belen. A Bimodal Waveguide Interferometer Device Based on Silicon Photonics Technology for Label-free and High Sensitive Biosensing. 2012. The Autonomous University of Barcelona. PhD Thesis.
González-Guerrero, et al. "Advanced photonic biosensors for point-of-care diagnostics," Procedia Engineering, vol. 25, 2011, pp. 71-75, ISSN 1877-7058. DOI:https://doi.org/10.1016/j.proeng.2011.12.018.
HALO IOT Smart Sensor [retrieved on Dec. 15, 2021] retrieved on the internet from <URL:https://ipvideocorp.com/halo/> (15 pages).
HALO IOT Smart Sensor Mechanical Specifications. IPVideoCorp. https://ipvideocorp.com/halo-tech-specs/ Year 2020.
HALO Smart Sensor. IP Video Corp. https://ipvideocorp.com/wp-content/uploads/2020/02/HALO_General_2.10.20.pdf, Year 2021.
Hamed, A. "Image Processing of Corona Virus Using Interferometry," Optics and Photonics Journal, 2016, 6, 75-86.
Hong, et al. "Gentle Sampling of Submicrometer Airborne Virus Particles using a Personal Electrostatic Particle Concentrator" Environ. Sci. Technol. 2016, 50, 22, 12365-12372.
Igor L Kratskin, XiaosongYu, Richard L Doty, An Easily Constructed Pipette for Pressure Microinjections Into the Brain, Brain Research Bulletin, vol. 44, Issue 2, 1997, pp. 199-203, ISSN 0361-9230,https://doi.org/10.1016/S0361-9230(97)00092-0 (Year: 1997).
Industry News: New 'saliva test' to instantly detect coronavirus with lasers, Select Science Apr. 7, 2020, (5 pages), https://www.selectscience.net/industry-news/new-saliva-test-to-instantly-detect-coronavirus-with-lasers/?artID=51173.
Integrate Breath Biopsy. Owlstone Medical, https://www.owlstonemedical.com/breath-biopsy-covid-19-research/, Dec. 16, 2021.
Interferometry explained, Renishaw, https://www.renishaw.com/en/interferometry-explained--7854, Dec. 16, 2021.
Kratskin, Igor et al., "An Easily Constructed Pipette for Pressure Microinjections Into the Brain," Brain Research Bulletin, 44(2):199-203, (1997).
Liang, et al. "Bimodal Waveguide Interferometer RI Sensor Fabricated on Low-Cost Polymer Platform," IEEE Photonics Journal, vol. 11, No. 2, pp. 1-8, Apr. 2019, Art No. 6801108, doi: 10.1109/JPHOT.2019.2900741.
List of references cited by examiner Mailed on Apr. 3, 2023 for U.S. Appl. No. 17/446,686, 1 page(s).
List of references cited by examiner Mailed on Apr. 11, 2023 for U.S. Appl. No. 17/302,535, 1 page(s).
List of references cited by examiner Mailed on Nov. 25, 2022 for U.S. Appl. No. 17/446,684.

(56) References Cited

OTHER PUBLICATIONS

Martino, et al. "Reference interferometer using a semiconductor laser/LED reference source in a cryogenic Fourier-transform spectrometer," Proceedings, Cryogenic Optical Systems and Instruments VIII, 1998, vol. 3435, 1998 (11 pages), https://doi.org/10.1117/12.323746.
McDevitt, et al. "Development and Performance Evaluation of an Exhaled-Breath Bioaerosol Collector," Aerosol Sci Technology, 2013, 47(4):444-451. doi: 10.1080/02786826.2012.762973, Year: 2013.
Miller, et al. "A Handheld Electrostatic Precipitator for Sampling Airborne Particles and Nanoparticles," Aerosol Science and Technology, 2010, 44:6, 417-427, DOI: 10.1080/02786821003692063.
National Research Council. 2002. The Airliner Cabin Environment and the Health of Passengers and Crew. Washington, DC: The National Academies Press.https://doi.org/10.17226/10238.
New research projects on Coronavirus, Oct. 22, 2020, European Commission (4 pages). https://ec.europa.eu/info/sites/default/files/research_and_innovation/research_by_area/documents/ec_rtd_cv-projects.pdf.
Non-Final Rejection Mailed on Apr. 3, 2023 for U.S. Appl. No. 17/446,686, 17 page(s).
Non-Final Rejection Mailed on Apr. 5, 2023 for U.S. Appl. No. 17/446,688, 19 page(s).
Non-Final Rejection Mailed on Nov. 18, 2022 for U.S. Appl. No. 17/302,535.
Non-Final Rejection Mailed on Nov. 25, 2022 for U.S. Appl. No. 17/446,684.
Partial European Search Report for EP No. 22197548.5 received Feb. 16, 2023.
Patil, Satyashodhan. "Technical Considerations for Designing Syringes and Other Drug-Delivery Devices." Mddionline.com, Jul. 23, 2019, https://www.mddionline.com/design-engineering/designing-drug-delivery-device-read-first (Year: 2019).
Ruiz-Vega, et al. "Nanophotonic biosensors for point-of-care COVID-19 diagnostics and coronavirus surveillance," J. Phys. Photonics 3 (2021) 011002, pp. 1-8.
SARS-COV-2 Airborne Detection. Smiths Detection. https://www.smithsdetection.com/, Year: 2021.
Schmit, Joanna. An Introduction to non-contact surface metrology. 2007, https://cupdf.com/document/an-introduction-to-non-contact-surface-metrology-dr-an-introduction-to-non-contact.html.
Advisory Action (PTOL-303) Mailed on Apr. 15, 2025 for U.S. Appl. No. 17/447,994, 3 page(s).
Advisory Action (PTOL-303) Mailed on Apr. 17, 2025 for U.S. Appl. No. 17/447,998, 3 page(s).
Notice of Allowance and Fees Due (PTOL-85) Mailed on Apr. 21, 2025 for U.S. Appl. No. 17/447,995, 12 page(s).
Notice of Allowance and Fees Due (PTOL-85) Mailed on Aug. 1, 2025 for U.S. Appl. No. 17/936,764, 11 page(s).
Notice of Allowance and Fees Due (PTOL-85) Mailed on Aug. 6, 2025 for U.S. Appl. No. 17/447,996, 9 page(s).
Notice of Allowance and Fees Due (PTOL-85) Mailed on Aug. 6, 2025 for U.S. Appl. No. 17/447,998, 7 page(s).
Notice of Allowance and Fees Due (PTOL-85) Mailed on Aug. 11, 2025 for U.S. Appl. No. 17/936,764, 8 page(s).
Notice of Allowance and Fees Due (PTOL-85) Mailed on Aug. 15, 2025 for U.S. Appl. No. 17/447,994, 7 page(s).
Notice of Allowance and Fees Due (PTOL-85) Mailed on Aug. 15, 2025 for U.S. Appl. No. 17/447,996, 9 page(s).
Notice of Allowance and Fees Due (PTOL-85) Mailed on Aug. 26, 2025 for U.S. Appl. No. 17/447,998, 7 page(s).
Notice of Allowance and Fees Due (PTOL-85) Mailed on Aug. 28, 2025 for U.S. Appl. No. 17/447,995, 10 page(s).
Notice of Allowance and Fees Due (PTOL-85) Mailed on Aug. 29, 2025 for U.S. Appl. No. 17/447,994, 7 page(s).
Notice of Allowance and Fees Due (PTOL-85) Mailed on Oct. 2, 2025 for U.S. Appl. No. 17/936,764, 8 page(s).
Notice of Allowance and Fees Due (PTOL-85) Mailed on Sep. 2, 2025 for U.S. Appl. No. 17/447,996, 9 page(s).
Notice of Allowance and Fees Due (PTOL-85) Mailed on Sep. 3, 2025 for U.S. Appl. No. 17/447,998, 7 page(s).
Notice of Allowance and Fees Due (PTOL-85) Mailed on Sep. 3, 2025 for U.S. Appl. No. 17/936,764, 8 page(s).
Notice of Allowance and Fees Due (PTOL-85) Mailed on Sep. 23, 2025 for U.S. Appl. No. 17/447,996, 9 page(s).
Notice of Allowance and Fees Due (PTOL-85) Mailed on Sep. 23, 2025 for U.S. Appl. No. 17/936,764, 8 page(s).
English Translation of JP Notice of Allowance, including Search Report dated Aug. 25, 2025 for JP Application No. 2021079150, 2 page(s).
Extended European Search Report Mailed on Oct. 13, 2025 for EP Application No. 25164714, 13 page(s).
JP Notice of Allowance, including Search Report Mailed on Aug. 25, 2025 for JP Application No. 2021079150, 3 page(s).
Notification of Oral Proceeding Mailed on Aug. 28, 2025 for EP Application No. 21172749, 10 page(s).
Suruk et al., "Novel Rapid Protein Coating Technique for Silicon Photonic Biosensor to Improve Surface Morphology and Increase Bioreceptor Density", Coatngs, vol. 11, No. 5, May 18, 2021, pp. 595.
Notice of Allowance and Fees Due (PTOL-85) Mailed on Nov. 7, 2025 for U.S. Appl. No. 17/936,764, 8 page (s).
Requirement for Restriction/Election Mailed on Nov. 17, 2025 for U.S. Appl. No. 18/326,778, 6 page(s).
CN Office Action mailed on Nov. 19, 2025 for CN Application No. 202110495601, 10 page(s).
English Translation of CN Office Action dated Nov. 19, 2025 for CN Application No. 202110495601, 7 page(s).

* cited by examiner

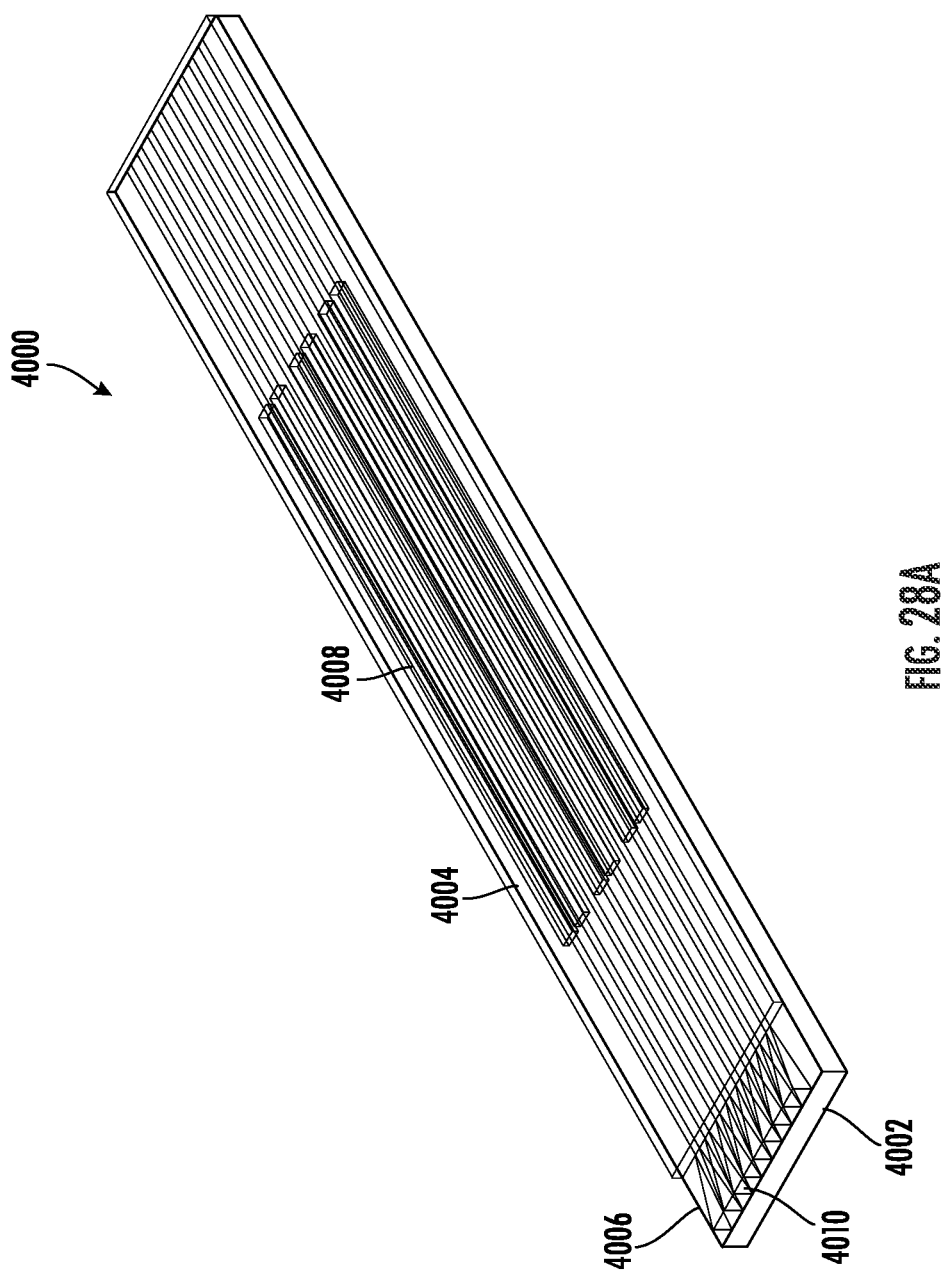

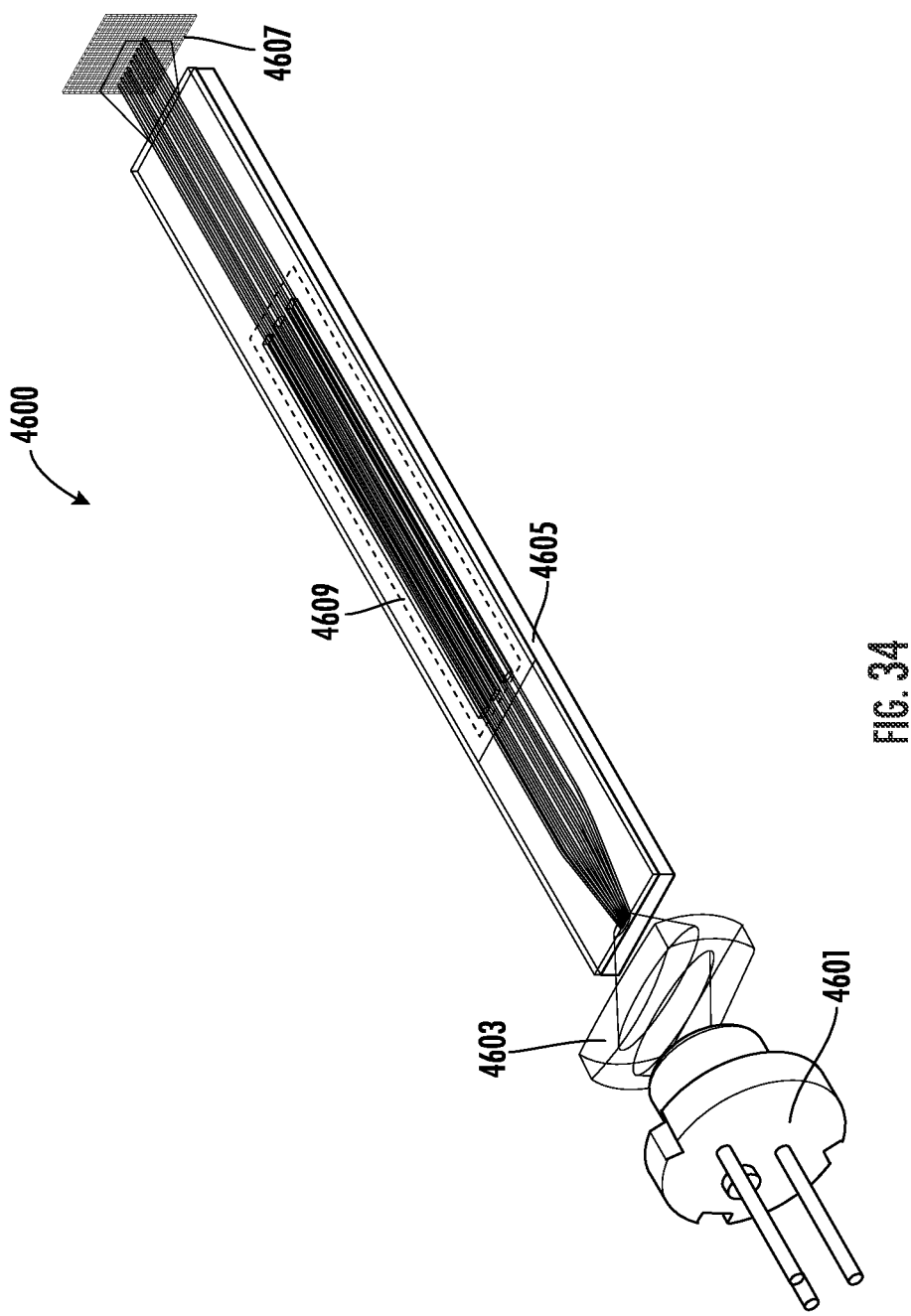

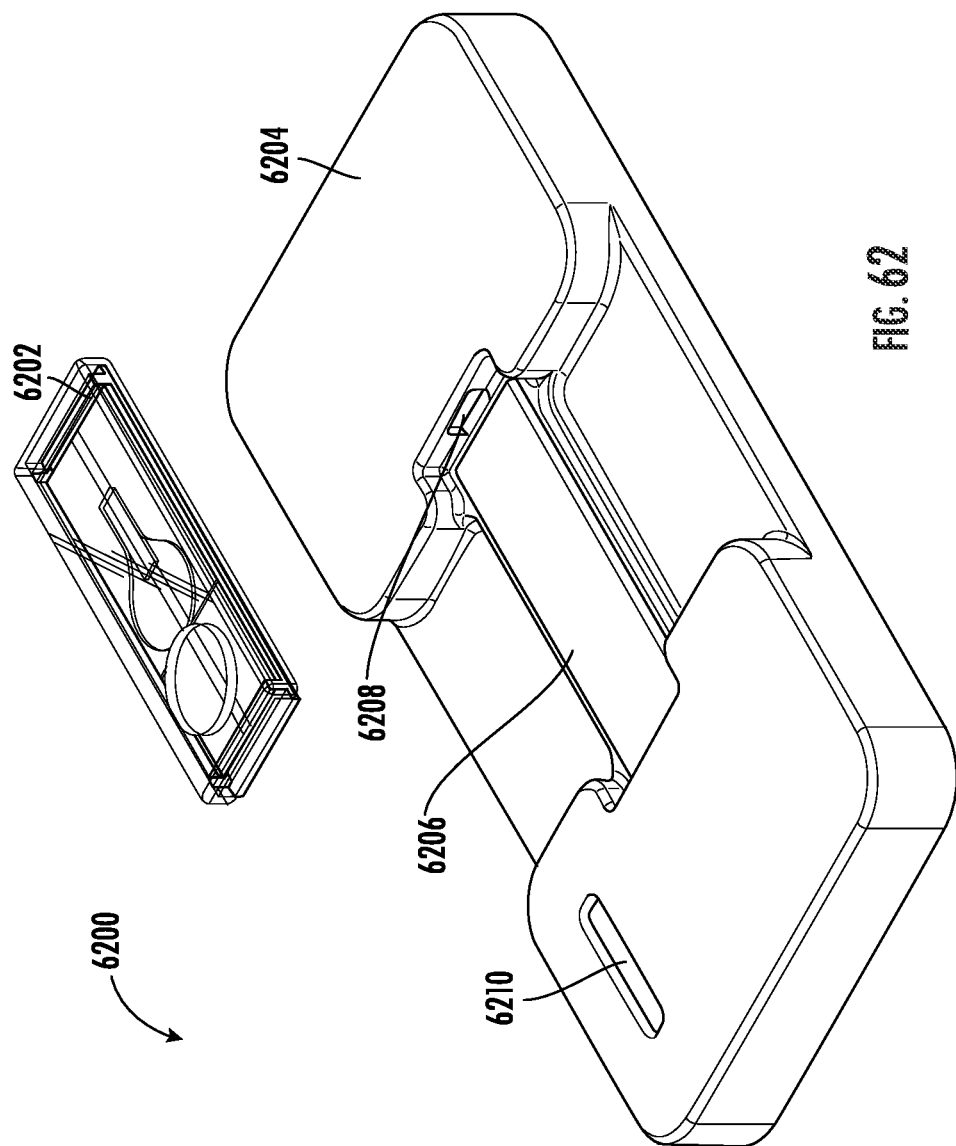

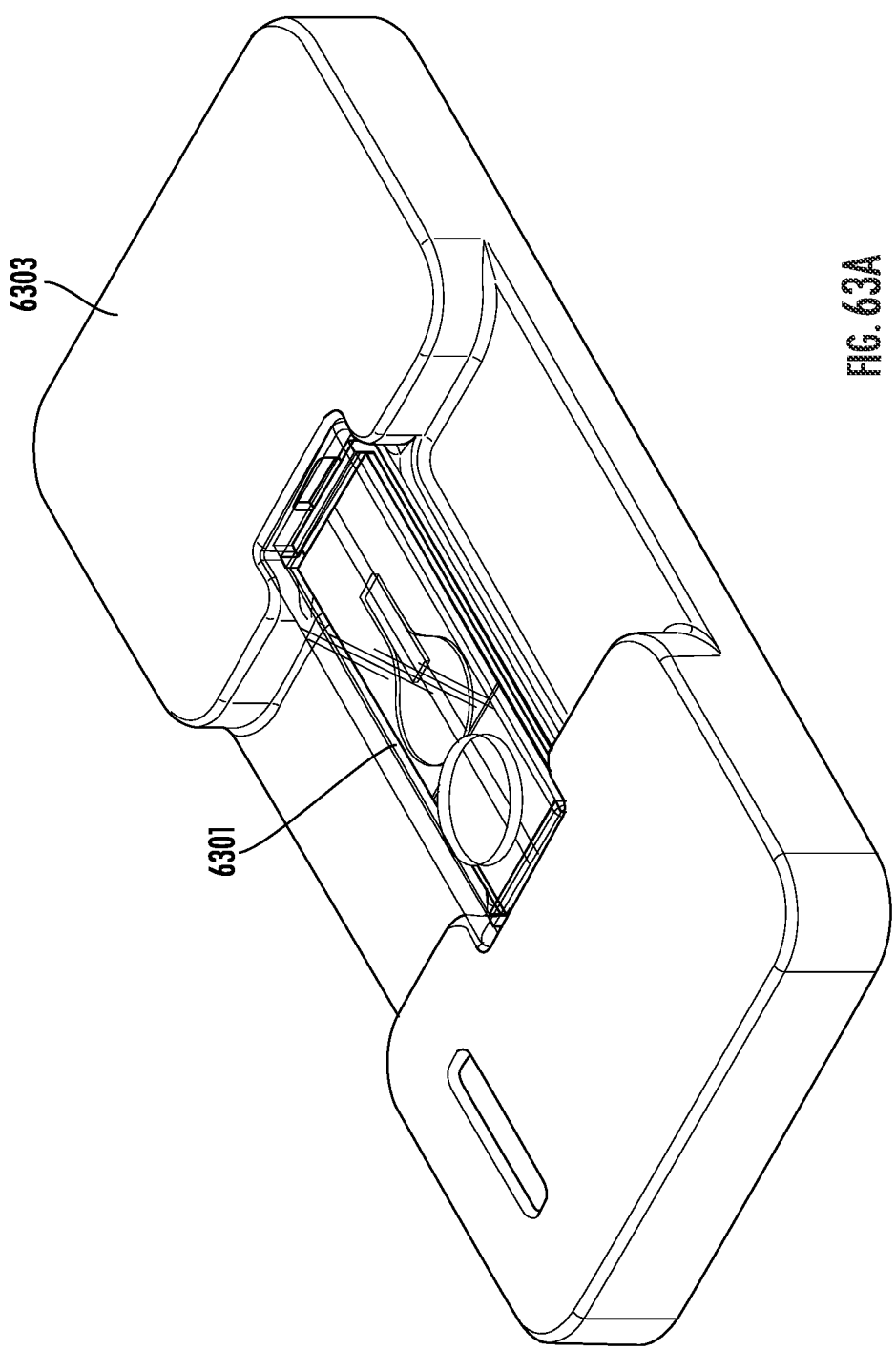

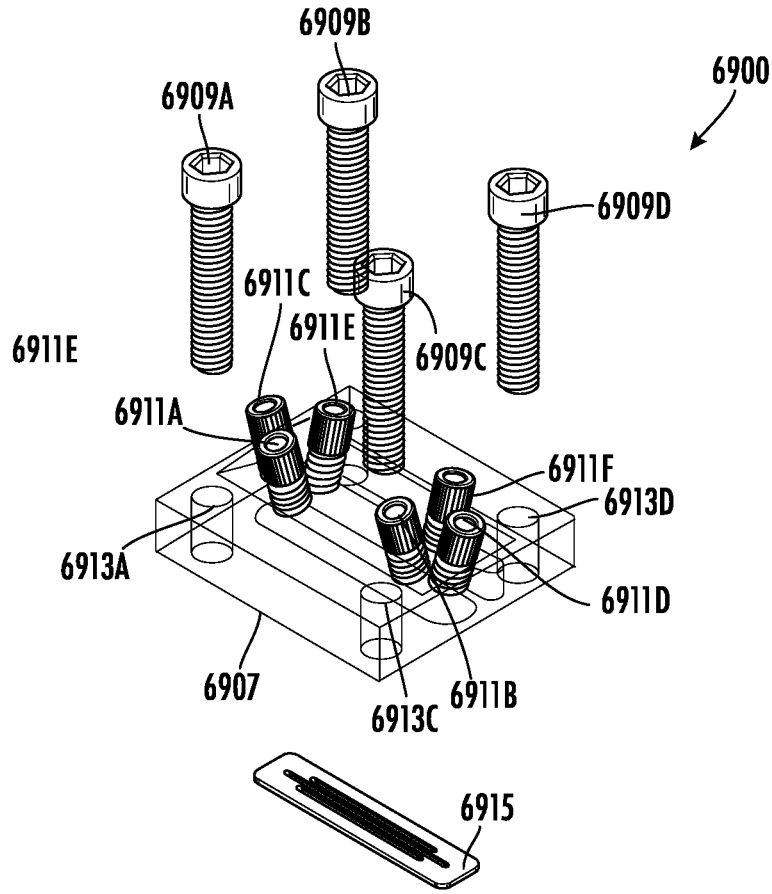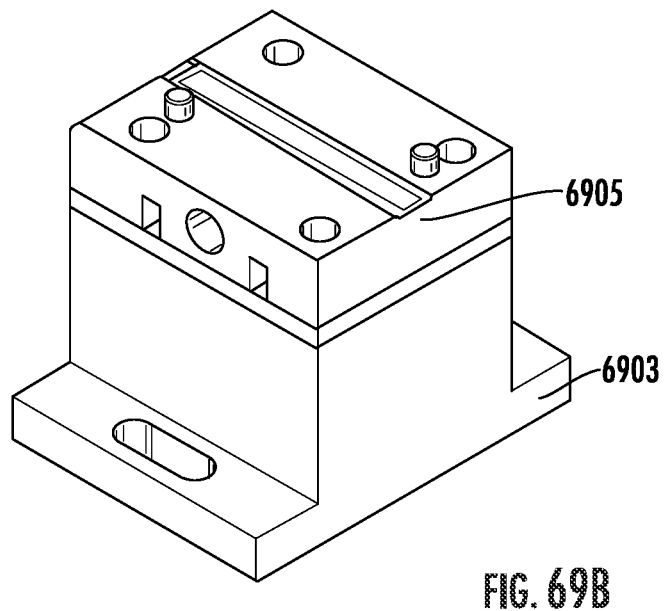
FIG. 69B

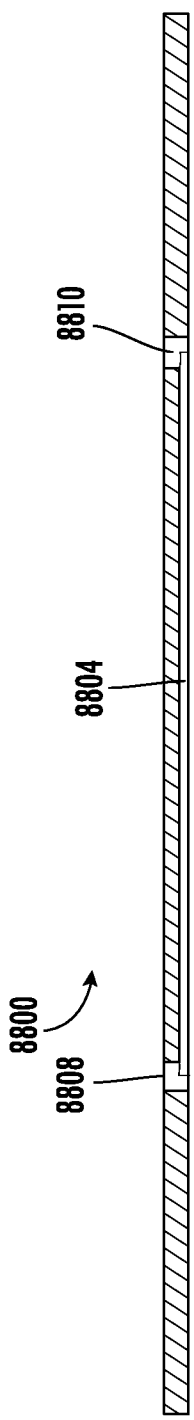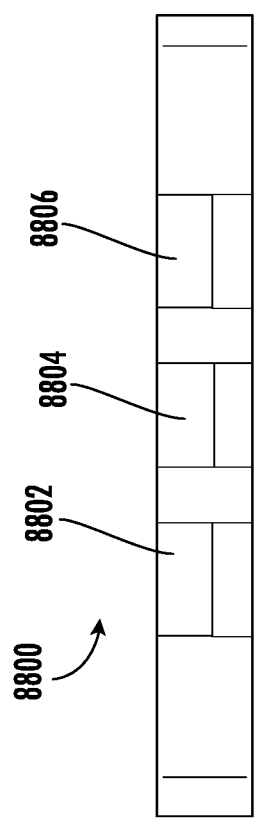

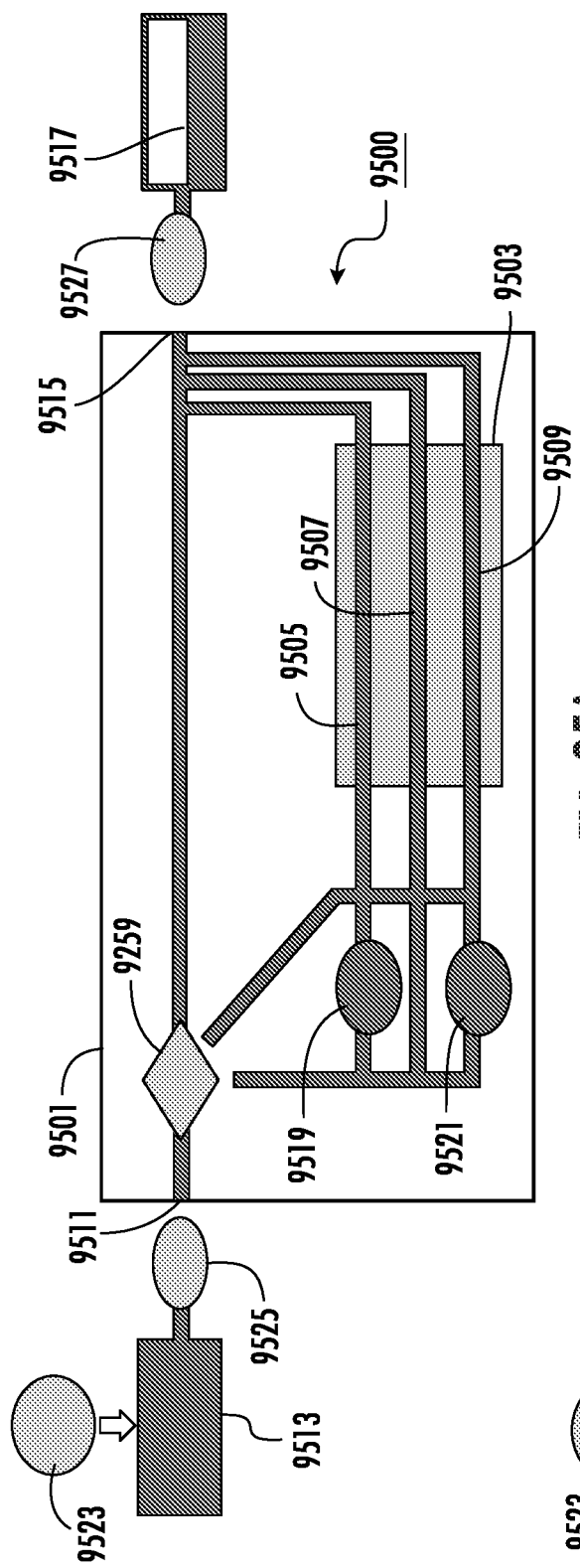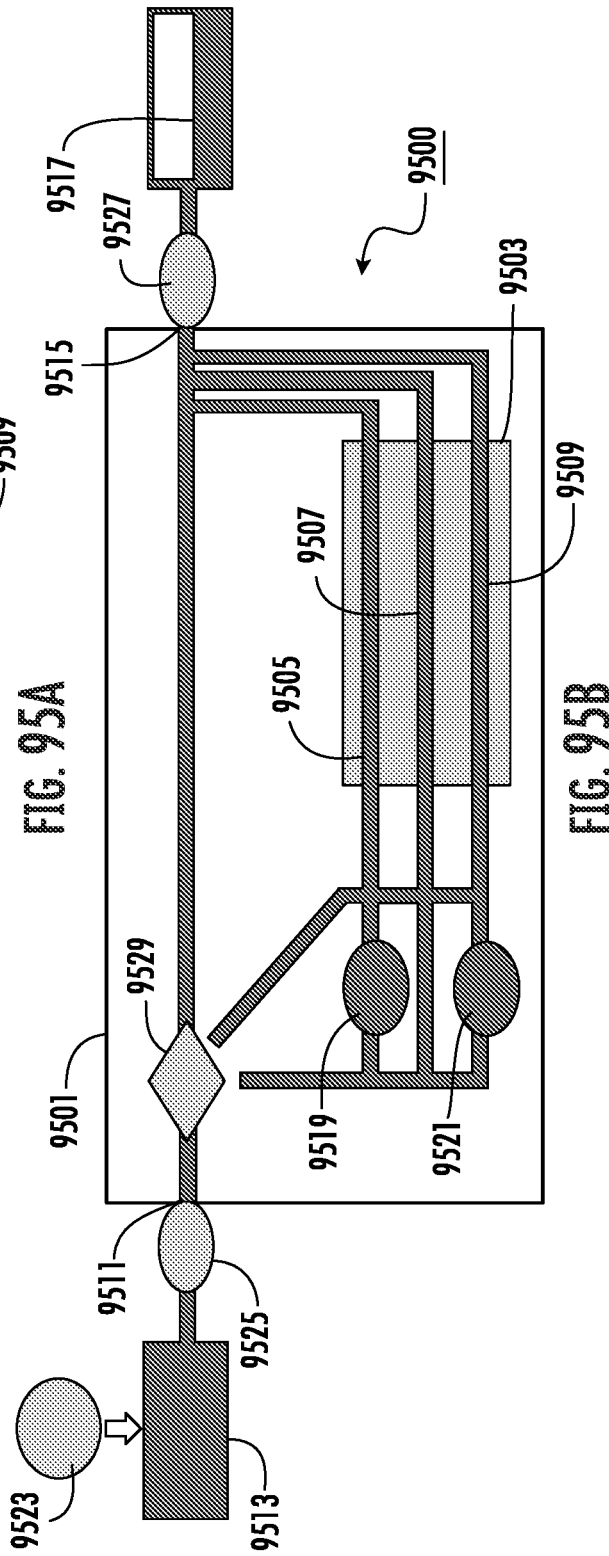

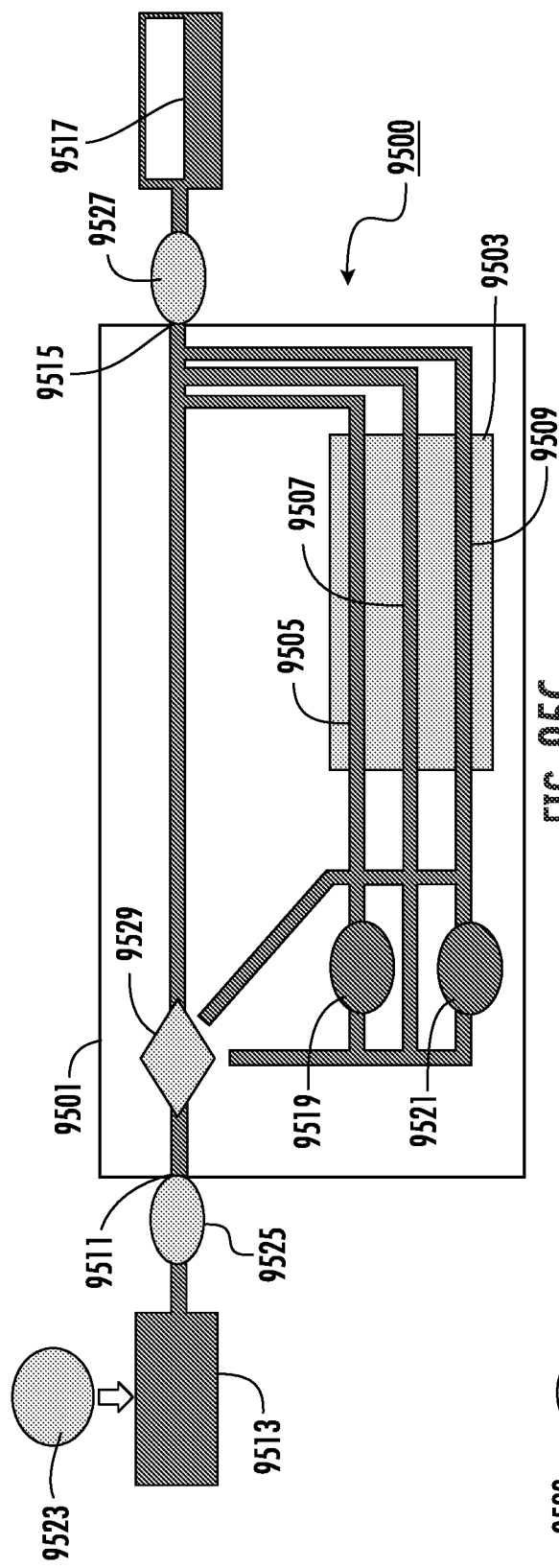
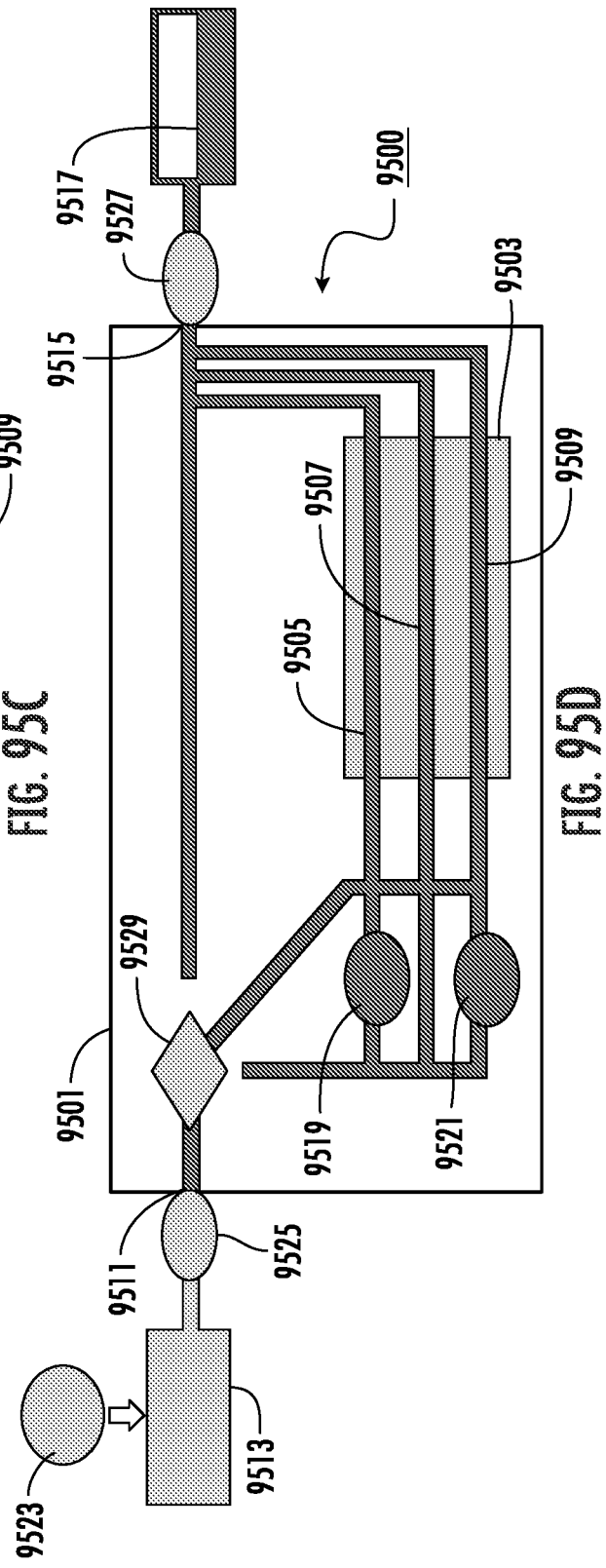
FIG. 95C
FIG. 95D

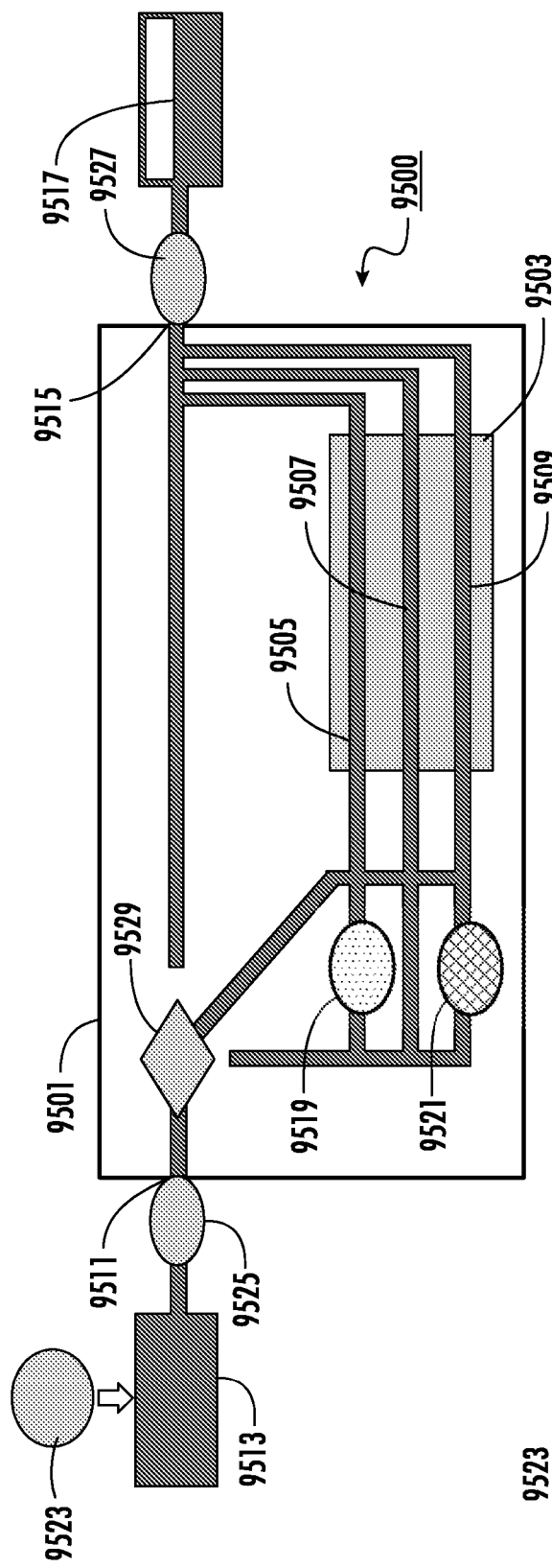
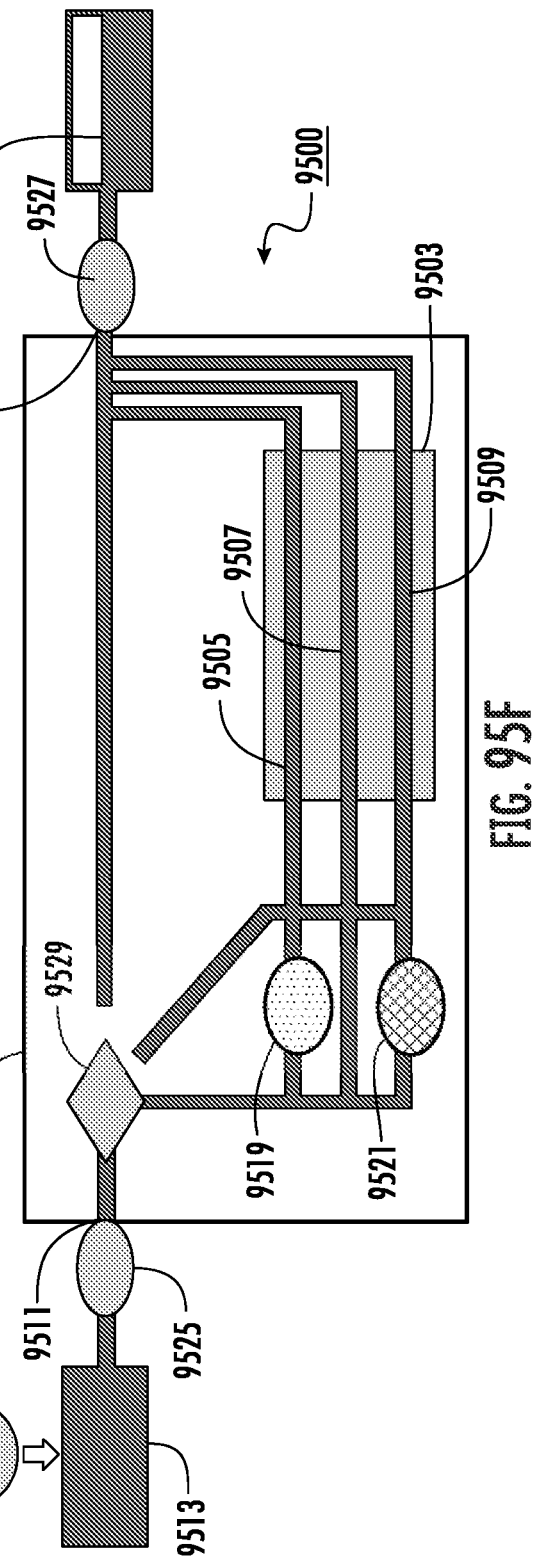
FIG. 95E
FIG. 95F

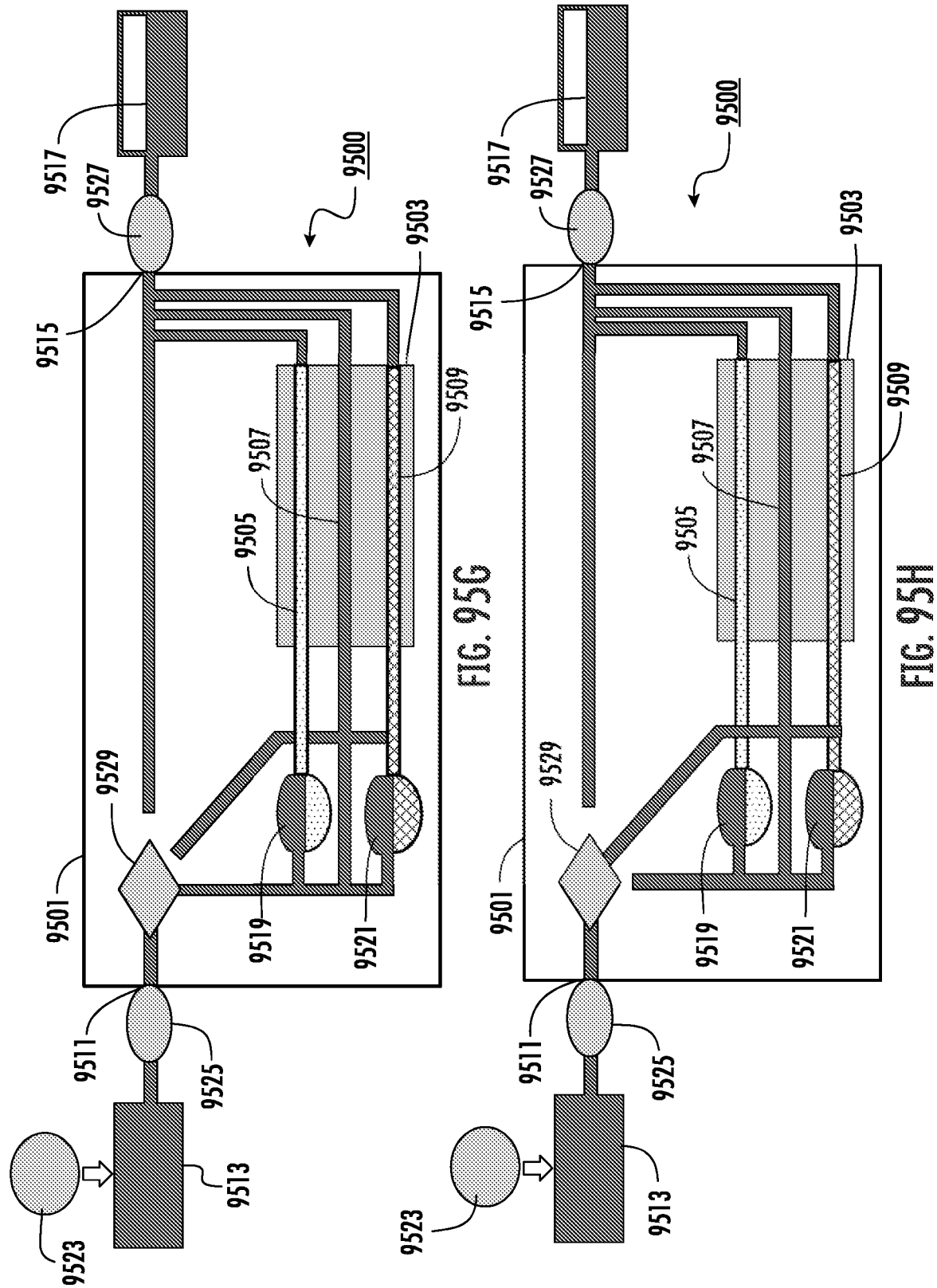

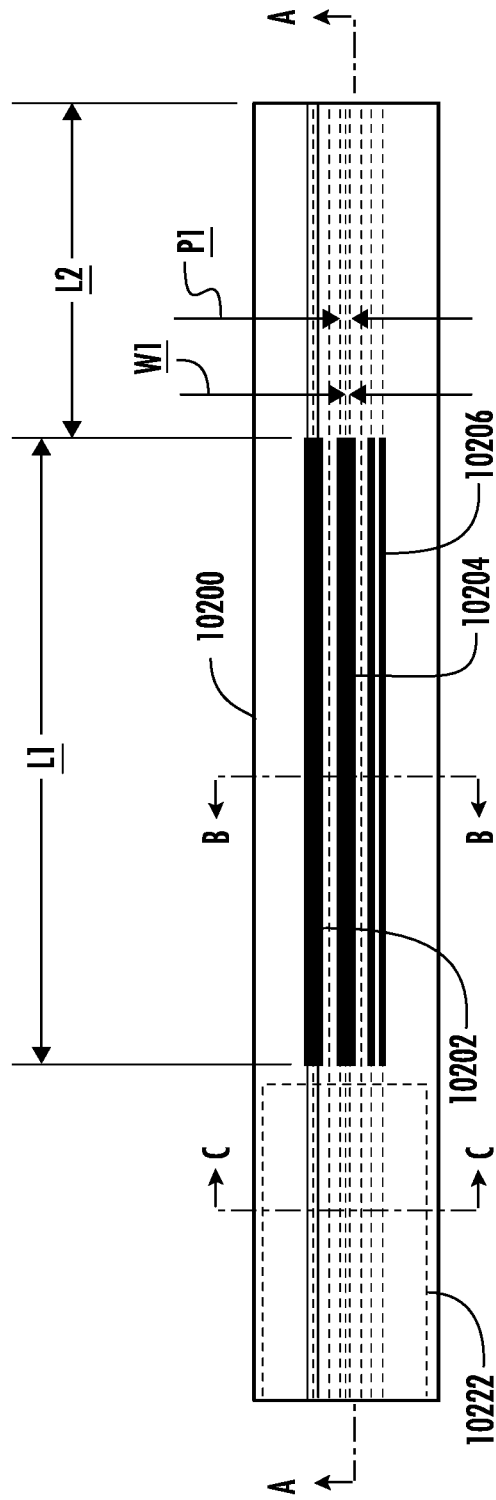

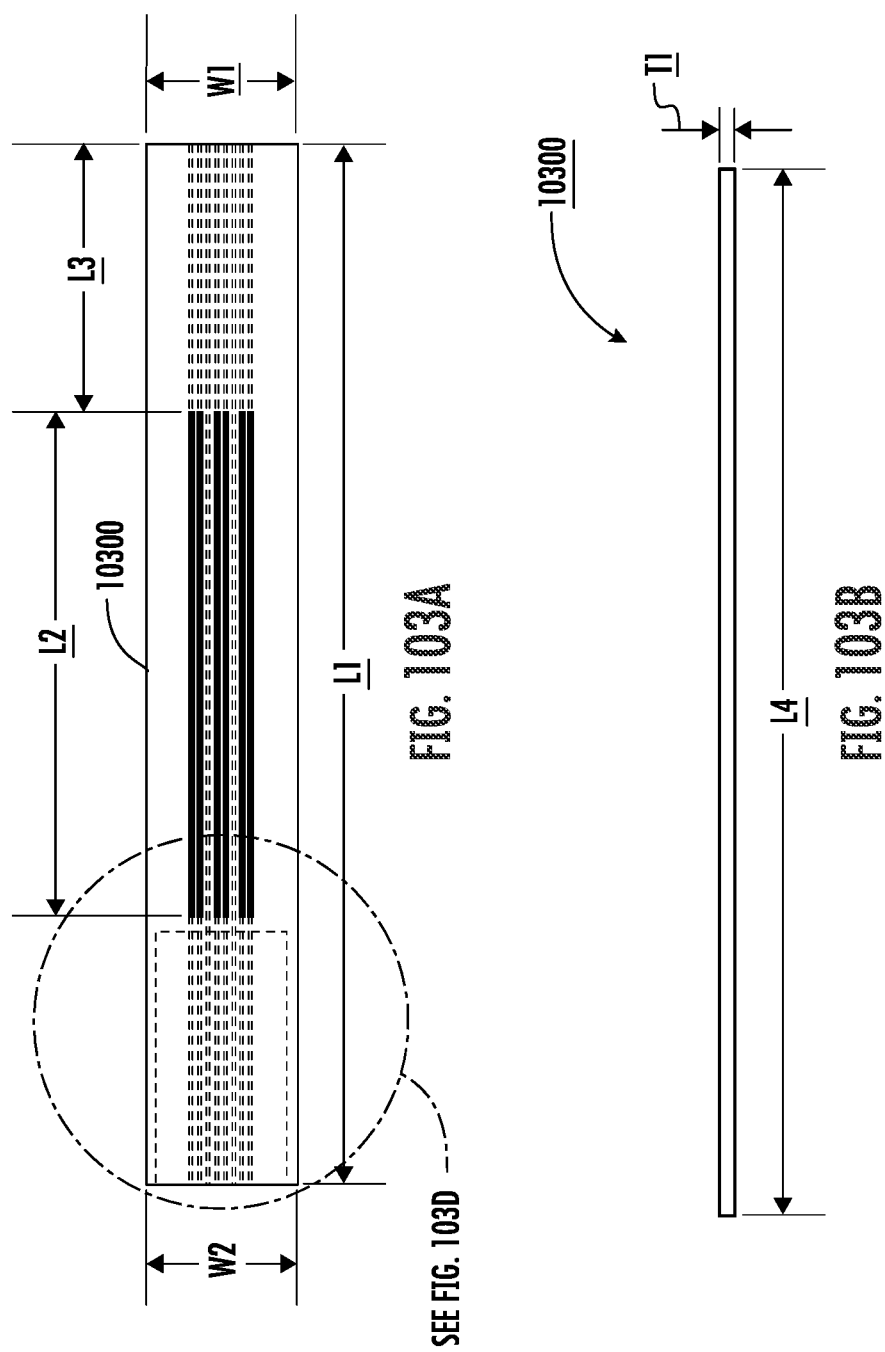

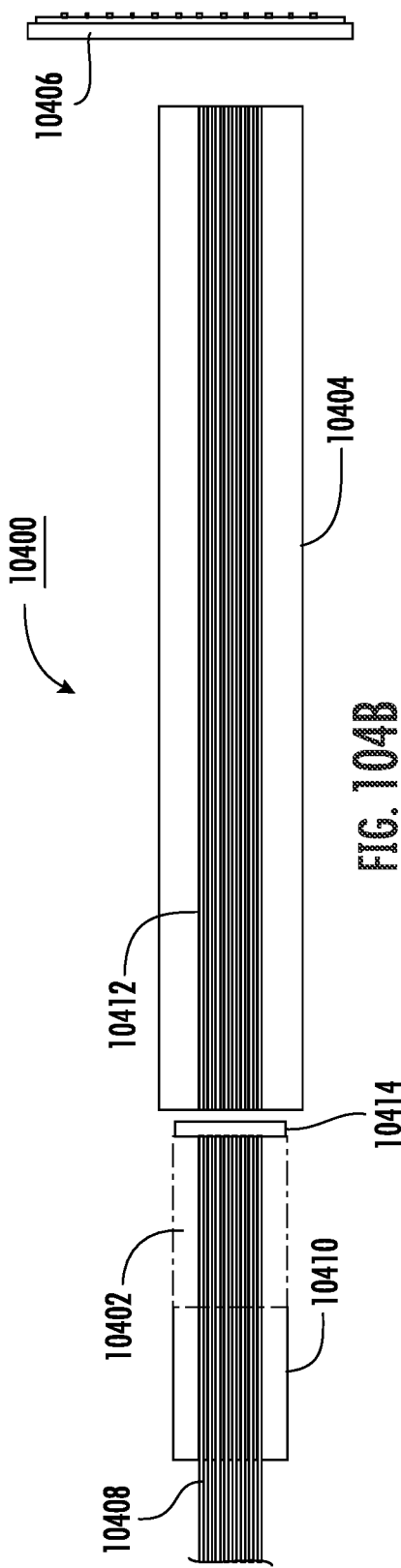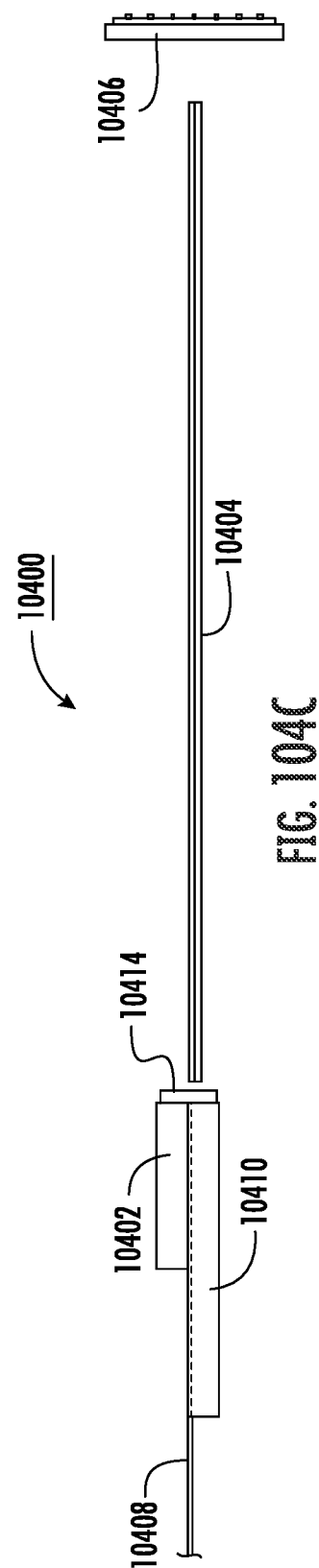

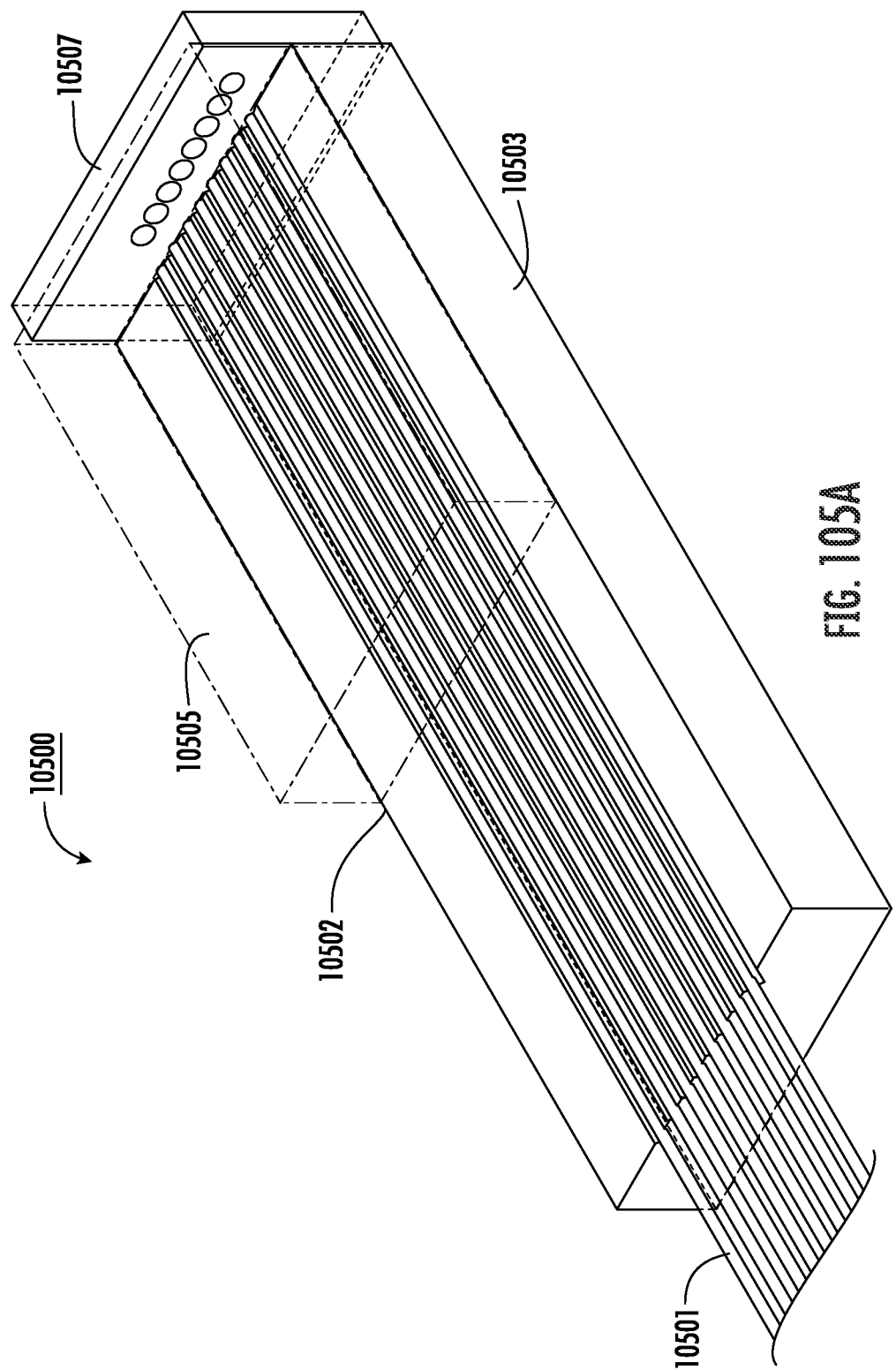

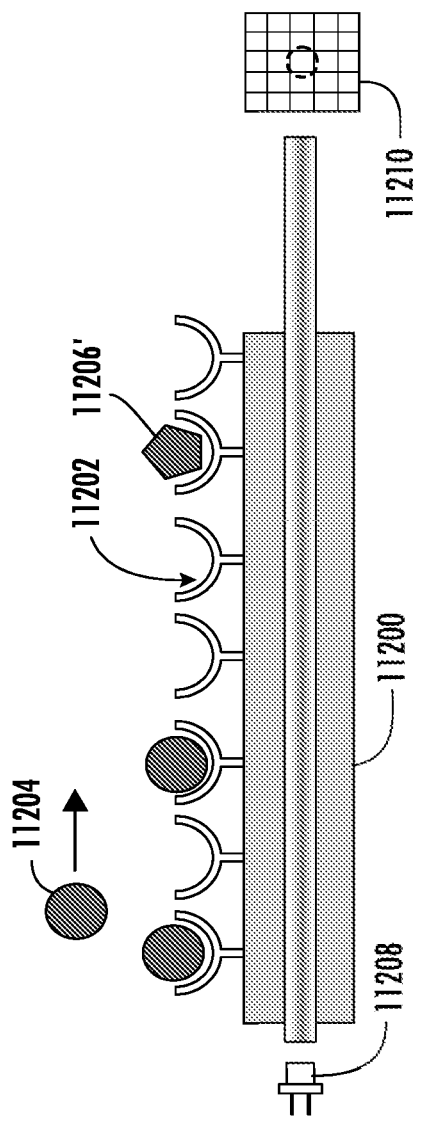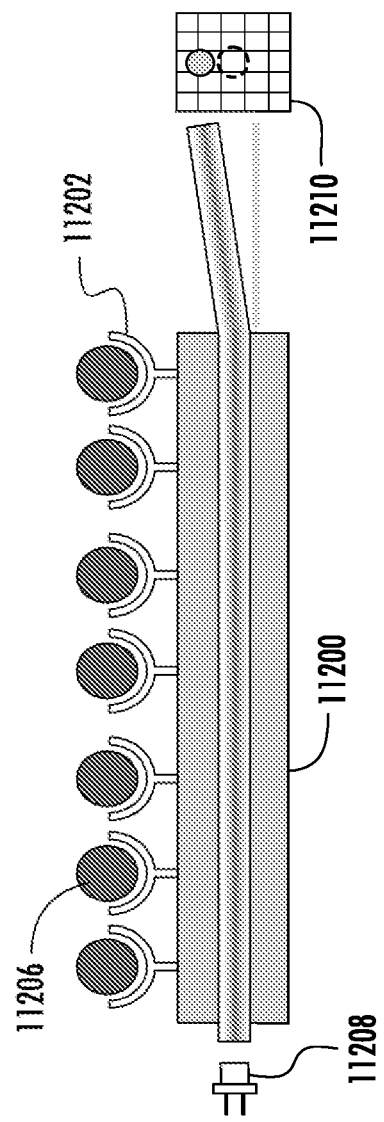

APPARATUSES, SYSTEMS, AND METHODS FOR SAMPLE TESTING

CROSS-REFERENCE TO RELATED APPLICATIONS

The present application claims priority to and benefit of U.S. Provisional Patent Application No. 63/316,257, filed Mar. 3, 2022, the content of which is incorporated by reference in its entirety.

The present application is also a continuation-in-part application of U.S. patent application Ser. No. 17/936,764, filed Sep. 29, 2022, the content of which is incorporated by reference in its entirety. U.S. patent application Ser. No. 17/936,764 claims priority to and benefit of U.S. Provisional Patent Application No. 63/262,076, filed Oct. 4, 2021, the content of which is incorporated by reference in its entirety. U.S. patent application Ser. No. 17/936,764 also claims priority to and benefit of U.S. Provisional Patent Application No. 63/263,481, filed Nov. 3, 2021, the content of which is incorporated by reference in its entirety. U.S. patent application Ser. No. 17/936,764 is further a continuation-in-part application of U.S. patent application Ser. No. 17/302,536, filed May 5, 2021, the content of which is incorporated by reference in its entirety. U.S. patent application Ser. No. 17/302,536 claims priority to and benefit of U.S. Patent Application No. 63/021,416 (filed on May 7, 2020), U.S. Patent Application No. 63/198,609 (filed Oct. 29, 2020), and U.S. Patent Application No. 63/154,476 (filed on Feb. 26, 2021), the entire contents of which are incorporated by reference into the present application.

The present application is further a continuation-in-part application of U.S. patent application Ser. No. 17/302,536, filed May 5, 2021, the content of which is incorporated by reference in its entirety. U.S. patent application Ser. No. 17/302,536 claims priority to and benefit of U.S. Patent Application No. 63/021,416 (filed on May 7, 2020), U.S. Patent Application No. 63/198,609 (filed Oct. 29, 2020), and U.S. Patent Application No. 63/154,476 (filed on Feb. 26, 2021), the entire contents of which are incorporated by reference into the present application.

BACKGROUND

Existing methods, apparatus, and systems are plagued by challenges and limitations. For example, efficiency and/or accuracy of many devices may be affected due to various factors such as structural limitations, environmental temperature, contamination, and/or the like.

BRIEF SUMMARY

In accordance with various examples of the present disclosure, various example methods, apparatuses, and systems for sample testing are provided. In some embodiments, example methods, apparatuses, and systems may utilize interferometry to detect the presence of virus and/or other viral indicator of protein content in a collected sample.

In some examples, a sample testing device may comprise a waveguide and an integrated optical component. In some examples, the integrated optical component may be coupled to the waveguide. In some examples, the integrated optical component may comprise a collimator and a beam splitter.

In some examples, the beam splitter may comprise a first prism and a second prism. In some examples, the second prism may be attached to a first oblique surface of the first prism. In some examples, the first prism and the second prism form a cube shape.

In some examples, the beam splitter may comprise a polarization beam splitter.

In some examples, the collimator may be attached to a second oblique surface of the first prism.

In some examples, the sample testing device may comprise a light source coupled to the integrated optical component. In some examples, the light source may be configured to emit a laser light beam.

In some examples, the waveguide may comprise a waveguide layer and an interface layer having a sample opening. In some examples, the interface layer may be disposed on a top surface of the waveguide layer.

In some examples, the integrated optical component may be disposed on a top surface of the waveguide layer.

In some examples, the sample testing device may comprise a lens component positioned above the interface layer. In some examples, the lens component may at least partially overlap with an output opening of the interface layer in the output light direction.

In some examples, the sample testing device may comprise an imaging component disposed on a top surface of the lens component.

In some examples, the imaging component may be configured to detect an interference fringe pattern.

In some examples, a sample testing device may comprise a waveguide having a first surface and a lens array disposed on the first surface. In some examples, the lens array comprises at least one optical lens.

In some examples, the lens array may comprise at least one micro lens array. In some examples, a first shape of a first optical lens of the micro lens array may be different from a second shape of a second optical lens of the micro lens array. In some examples, the at least one optical lens may comprise at least one prism lens.

In some examples, a first surface curvature of the first optical lens may be different from a second surface curvature of the second optical lens in a waveguide light transfer direction.

In some examples, the sample testing device may comprise an integrated optical component couple to the waveguide through the lens array.

In some examples, the sample testing device may comprise an imaging component coupled to the waveguide through the lens array.

In some examples, a sample testing device may comprise a waveguide having a sample opening on a first surface and an opening layer disposed on the first surface. In some examples, the opening layer may comprise a first opening at least partially overlapping with the sample opening.

In some examples, the sample testing device may further comprise a cover layer coupled to the waveguide via at least one sliding mechanism. In some examples, the cover layer may comprise a second opening.

In some examples, the cover layer may be positioned on top of the opening layer and moveable between a first position and a second position.

In some examples, when the cover layer may be at the first position, the second opening overlaps with the first opening.

In some examples, when the cover layer is at the second position, the second opening does not overlap with the first opening.

In some examples, a sample testing device may comprise a waveguide having a top surface and a bottom surface, and a light source configured to couple light into the sample testing device via the bottom surface of the waveguide.

In some examples, the light source may be configured to emit a light beam through the top surface of the waveguide.

In some examples, a sample testing device may comprise a waveguide having a top surface and a bottom surface. In some examples, the top surface of the waveguide may be configured to be integrated with a user computing device.

In some examples, a thickness of the waveguide may be within a range of 5 millimeters to 7 millimeters.

In some examples, a user computing device component may be configured to be commonly used by the sample testing device.

In some examples, a sample testing device may comprise a waveguide, and an insulating layer disposed on at least one surface of the waveguide.

In some examples, the sample testing device may further comprise at least one sensor configured to control a temperature of the insulating layer.

In some examples, a sample testing device may comprise a waveguide and a thermally controlled waveguide housing encasing the waveguide.

In some examples, a sample testing device may comprise a waveguide comprising at least: a substrate layer defining a bottom surface of the sample testing device; a waveguide layer deposited thereon configured to couple light laterally from an input side of the waveguide to an output side of the waveguide; and an interface layer defining a top surface of the sample testing device.

In some examples, the substrate layer may comprise an integrated circuit.

In some examples, the waveguide layer may further comprise at least one reference channel and at least one sample channel.

In some examples, the at least one reference channel may be associated with a reference window in the interface layer, and the at least one sample channel is associated with at least one sample window in the interface layer.

In some examples, a computer-implemented method is provided. The computer-implemented method may comprise receiving first interference fringe data for an unidentified sample medium, the first interference fringe data associated with a first wavelength; receiving second interference fringe data for the unidentified sample medium, the second interference fringe data associated with a second wavelength; deriving refractive index curve data based on the first interference fringe data associated with the first wavelength and the second interference fringe data associated with the second wavelength; and determining sample identity data based on the refractive index curve data.

In some examples, the computer-implemented method further comprises triggering a light source to generate (i) first projected light of the first wavelength, wherein the first projected light represents a first interference fringe pattern and (ii) second projected light of the second wavelength, wherein the second projected light represents a second interference fringe pattern, wherein receiving the first interference fringe data comprises capturing, using an imaging component, the first interference fringe data representing the first interference fringe pattern associated with the first wavelength, and wherein receiving the second interference fringe data comprises capturing, using the imaging component the second interference fringe data representing the second interference fringe pattern associated with the second wavelength.

In some examples, the computer-implemented method further comprises triggering a first light source to generate first projected light of the first wavelength, wherein the first projected light represents a first interference fringe pattern; and triggering a second light source to generate second projected light of the first wavelength, wherein the second projected light represents a second interference fringe pattern, wherein receiving the first interference fringe data comprises capturing, using an imaging component, the first interference fringe data representing the first interference fringe pattern associated with the first wavelength, and wherein receiving the second interference fringe data comprises capturing, using the imaging component the second interference fringe data representing the second interference fringe pattern associated with the second wavelength.

In some examples, determining the sample identity data based on the refractive index curve data comprises querying a refractive index database for the sample identity data based on the refractive index curve data, wherein the sample identity data corresponds to a stored refractive index curve in the refractive index database that best matches the refractive index curve data.

In some examples, the computer-implemented method further comprises determining an operating temperature associated with the unidentified sample medium, wherein the refractive index database is queried based on at least the refractive index curve data and the operating temperature to determine the sample identity data.

In some examples, wherein the refractive index database may be configured to store a plurality of known refractive index curve data associated with a plurality of identified samples, the plurality of identified samples associated with a plurality of known sample identity data.

In some examples, the refractive index database is further configured to store the plurality of known refractive index curve data associated with a plurality of temperature data.

In some examples, a computer-implemented method is provided. The computer-implemented method may comprise triggering a light source calibration event associated with a light source; capturing reference interference fringe data representing a reference interference fringe pattern in a sample environment, the reference interference fringe pattern projected via a reference channel of a waveguide; comparing the reference interference fringe data with stored calibration interferometer data to determine a refractive index offset between the reference interference fringe data and the stored calibration interference data; and tuning the light source based on the refractive index offset.

In some examples, tuning the light source based on the refractive index offset comprises adjusting a voltage level applied to the light source to adjust a light wavelength associated with the light source.

In some examples, tuning the light source based on the refractive index offset comprises adjusting a current level applied to the light source to adjust a light wavelength associated with the light source.

In some examples, the computer-implemented method further comprises adjusting a temperature control, wherein adjusting the temperature control sets the sample environment to a tuned operating temperature, and wherein the tuned operating temperature is within a threshold range from a desired operating temperature.

In some examples, the computer-implemented method further comprises: initiating a calibration setup event associated with the light source; capturing calibrated reference interference fringe data representing a calibrated interference fringe pattern in a calibrated environment, the calibrated interference fringe pattern projected via the reference channel of the waveguide; and storing, in a local memory, the calibrated reference interference fringe data as the stored calibration interference fringe data.

In some examples, the calibrated environment comprises an environment having a known operating temperature.

In some examples, a computer-implemented method is provided. The computer-implemented method comprises receiving sample interference fringe data for an unidentified sample medium, the sample interference fringe data associated with a determinable wavelength; providing the sample interference fringe data to a trained sample identification model; and receiving, from the trained sample identification model, sample identity data associated with the sample identity data associated with the sample interference fringe data.

In some examples, receiving the sample interference fringe data for the unidentified sample medium comprises triggering a light source to generate a projected light of the determinable wavelength, wherein the projected light is associated with a sample interference fringe pattern; capturing, using an imaging component, the sample interference fringe data representing the sample interference fringe pattern.

In some examples, the sample identity data comprises a sample identity label.

In some examples, the sample identity data comprises a plurality of confidence scores associated with a plurality of sample identity labels.

In some examples, the trained sample identification model comprises a trained deep learning model or a trained statistical model.

In some examples, the computer-implemented method further comprises determining an operational temperature associated with a sample environment; and providing the operational temperature and the sample interference fringe data to the trained sample identification model, wherein the sample identity data is received in response to the operational temperature and the sample interference fringe data. In some examples, the computer-implemented method further comprises: collecting a plurality of interference fringe data, the plurality of interference fringe data associated with a plurality of known sample identity labels; storing, in a training database, each of the plurality of interference fringe data with the plurality of known sample identity labels; and training the trained sample identification model from the training database.

In some examples, a sample testing device may comprise a substrate; a waveguide disposed on the substrate; and a lens array disposed on the substrate. In some embodiments, the lens array may be configured to direct light to an input edge of the waveguide.

In some embodiments, the lens array may comprise a compound parabolic concentrator (CPC) lens array.

In some embodiments, the lens array may comprise a micro CPC lens array.

In some embodiments, the lens array may comprise an asymmetric CPC lens array.

In some embodiments, the lens array may comprise an asymmetric micro CPC lens array.

In some embodiments, the waveguide may comprise at least one reference channel and at least one sample channel.

In some embodiments, the lens array may be configured to direct light to a first input edge of the at least one reference channel and to a second input edge of the at least one sample channel.

In some embodiments, the sample testing device may comprise: an integrated optical component coupled to the lens array, wherein the integrated optical component may comprise a collimator and a beam splitter.

In some embodiments, a waveguide may comprise: a plurality of optical channels within the waveguide, wherein each of the plurality of optical channels defines an optical path; and an input edge comprising a plurality of input openings, wherein each of the plurality of input openings corresponds to one of the plurality of optical channels.

In some embodiments, the input edge may be configured to receive light.

In some embodiments, each of the plurality of input openings may be configured to receive light.

In some embodiments, each of the plurality of optical channels may be configured to guide the light from a corresponding input opening through a corresponding optical channel.

In some embodiments, each of the plurality of optical channels may comprise a curved portion and a straight portion.

In some embodiments, a method for manufacturing a waveguide is provided. The method may comprise: attaching an intermediate layer on a substrate layer; attaching a waveguide layer on the intermediate layer; and etching a first edge of the intermediate layer, a first edge of the waveguide layer, a second edge of the intermediate layer, and a second edge of the waveguide layer.

In some embodiments, the first edge of the waveguide layer may comprise an input opening, wherein the second edge of the waveguide layer may comprise an output opening.

In some embodiments, the first edge of the waveguide layer may comprise a recessed optical edge.

In some embodiments, the second edge of the waveguide layer may comprise a recessed optical edge.

In some embodiments, the method may comprise coupling a light source to the first edge of the waveguide layer.

In some embodiments, a method for manufacturing may comprise producing a waveguide with on-chip fluidics; and attaching a cover glass component to the waveguide with on-chip fluidics.

In some embodiments, producing the waveguide with on-chip fluidics may comprise: producing a waveguide layer; producing an on-chip fluidics layer; and attaching the on-chip fluidics layer to a top surface of the waveguide layer.

In some embodiments, attaching the cover glass component may comprise: producing an adhesive layer; attaching the adhesive layer on a top surface of the waveguide with on-chip fluidics; and attaching a cover glass layer on a top surface of the adhesive layer.

In some embodiments, a sample testing device may comprise a waveguide holder component, wherein a first surface of the waveguide holder component comprises at least one alignment feature; and a waveguide comprising at least one etched edge, wherein the at least one etched edge is in contact with the at least one alignment feature of the waveguide holder component in an alignment arrangement.

In some embodiments, the at least one alignment feature may comprise at least one protrusion on the first surface of the waveguide holder component, wherein, when in the alignment arrangement, the at least one etched edge is in contact with the at least one protrusion.

In some embodiments, the waveguide holder component may comprise: a holder cover element; and a fluid gasket element secured to the holder cover element, wherein the fluid gasket element is positioned between the holder cover element and the waveguide.

In some embodiments, the holder cover element may comprise a plurality of input openings on a top surface of the holder cover element, wherein the fluid gasket element may comprise a plurality of inlets protruding from a top surface of the fluid gasket element.

In some embodiments, the sample testing device further comprises: a thermal pad component disposed on a bottom surface of the waveguide.

In some embodiments, a method is provided. The method may comprise applying an antibody solution through a sample channel of a sample testing device; and injecting sample medium through the sample channel.

In some embodiments, prior to injecting the sample medium, the method may comprise: applying a buffer solution through the sample channel after an incubation time period subsequent to applying the antibody solution.

In some embodiments, subsequent to injecting the sample medium, the method may comprise: applying a cleaning solution through the sample channel.

In some embodiments, a computer-implemented method is provided. The method may comprise receiving first interference fringe data for an unidentified sample medium; calculating at least one statistical metric based on the first interference fringe data; comparing the at least one statistical metric with one or more statistical metrics associated with one or more identified media; and determining sample identity data based on the at least one statistical metric and the one or more statistical metrics.

In some embodiments, the at least one statistical metric may comprise one or more of: a sum associated with the first interference fringe data, a mean associated with the first interference fringe data, a standard deviation associated with the first interference fringe data, a skewness associated with the first interference fringe data, or a Kurtosis value associated with the first interference fringe data.

In some embodiments, the computer-implemented method may comprise: receiving second interference fringe data for an identified reference medium; and calculating a plurality of statistical metrics based on the second interference fringe data; and storing the plurality of statistical metrics in a database.

In some embodiments, comparing the at least one statistical metric with the one or more statistical metrics may comprise: determining whether a difference between the at least one statistical metric and the one or more statistical metrics satisfies a threshold.

In some embodiments, the computer-implemented method may comprise: in response to determining that the difference between the at least one statistical metric and the one or more statistical metrics satisfies the threshold, determining the sample identity data based on identify data of an identified reference medium associated with the one or more statistical metrics.

In some embodiments, a sample testing device may comprise: an analyzer apparatus comprising a slot base and at least one optical window; and a sensor cartridge fastened to the slot base, wherein the at least one optical window is aligned with one of an input window of the sensor cartridge or an output window of the sensor cartridge. In some embodiments, the sensor cartridge comprises a substrate layer and a waveguide described herein.

In some embodiments, the sensor cartridge may comprise: a substrate layer; a waveguide disposed on a top surface of the substrate layer; and a cover layer disposed on a top surface of the waveguide.

In some embodiments, the waveguide may comprise at least one opening on the top surface of the waveguide.

In some embodiments, the cover layer may comprise at least one opening.

In some embodiments, the cover layer may be slidably attached to the waveguide.

In some embodiments, a sample testing device may comprise: a waveguide; and a sampler component disposed on a top surface of the waveguide, wherein the sampler component may comprise an anode element.

In some embodiments, the top surface of the waveguide may comprise a ground grid layer.

In some embodiments, the ground grid layer may comprise metal material.

In some embodiments, the ground grid layer may be connected to a ground.

In some embodiments, the waveguide may comprise a cladding window layer that is disposed under the ground grid layer.

In some embodiments, the waveguide may comprise a light shield layer disposed under the cladding window layer.

In some embodiments, the waveguide may comprise a planer layer disposed under the light shield layer.

In some embodiments, the waveguide may comprise a waveguide core layer disposed under the planer layer.

In some embodiments, the waveguide may comprise a cladding layer disposed under the waveguide core layer.

In some embodiments, the waveguide may comprise a substrate layer disposed under the cladding layer.

In some embodiments, a sample testing device may comprise a shell component comprising at least one airflow opening element; and a base component comprising an air blower element corresponding to the at least one airflow opening element, wherein the air blower element is configured to direct air to a waveguide.

In some embodiments, the waveguide may be disposed on an inner surface of the base component.

In some embodiments, the sample testing device may comprise: an aerosol sampler component disposed on an inner surface of the base component and connecting the air blower element with the waveguide.

In some embodiments, the base component may comprise a power plug element.

In some embodiments, a sample testing device comprises a pump; a first valve connected to the pump and to a first flow channel; and a buffer loop connected to the first valve and a second valve.

In some embodiments, the first valve and the second valve are 2-configuration 6-port valves. In some embodiments, the pump is connected to a fifth port of the first valve. In some embodiments, the first flow channel is connected to a sixth port of the first valve.

In some embodiments, when the first valve is in the first configuration, the fifth port of the first valve is connected to the sixth port of the first valve. In some embodiments, when the first valve is in the first configuration, the pump is configured to provide buffer solution to the first flow channel through the first valve.

In some embodiments, when the first valve is in the second configuration, the fifth port of the first valve is connected to the fourth port of the first valve. In some embodiments, the fourth port of the first valve is connected to the first port of the first valve through a first sample loop.

In some embodiments, the first sample loop comprises first fluid. In some embodiments, when the first valve is in the second configuration, the pump is configured to inject the first fluid to the first flow channel.

In some embodiments, the second valve is connected to a second flow channel. In some embodiments, the second valve comprises a second sample loop. In some embodiments, the second sample loop comprises second fluid. In some embodiments, the pump is configured to inject the first test liquid to the first flow channel and inject the second test liquid to the second flow channel at the same time.

In some embodiments, a sample testing device further comprises a processor configured to align a laser source to the waveguide by causing the laser source or an optical element from which it is refracted or reflected to move in a vertical dimension until detecting a change in the back-reflected power from the surface, with the characteristic reflectivity of the dielectric in which the waveguide is embedded being used as a signal to indicate when the laser is incident on that film; and cause the laser source or an optical element from which it is refracted or reflected to move in a horizontal dimension in a direction indicated by the pattern of light diffracted from gratings formed in waveguides to either side of the target area for coupling into the main functional waveguide, the position or spatial frequency of the gratings being different on one side of the target than the other. In some embodiments, a method for aligning a laser source to a waveguide comprises aiming a laser beam emitted by the laser source at a waveguide mount; and causing the laser source to move upwards in a vertical dimension until detecting, via an imaging component, at least one grating coupler spot formed by the laser beam reflected from a grating coupler in the waveguide.

In some embodiments, the waveguide is disposed on a top surface of the waveguide mount. In some embodiments, a fluid cover is disposed on a top surface of the waveguide.

In some embodiments, a reflectivity rate of the waveguide mount is higher than a reflectivity rate of the waveguide.

In some embodiments, the waveguide comprises an optical channel and a plurality of alignment channels. In some embodiments, each of the plurality of alignment channels comprises at least one grating coupler.

In some embodiments, the method for aligning the laser source to the waveguide further comprises causing the laser source to move in a horizontal dimension based at least in part on a spatial frequency associated with the at least one grating coupler spot.

In some embodiments, a method for aligning a laser source to a waveguide comprises aiming a laser beam emitted by the laser source at a waveguide mount; and causing the laser source to move upwards in a vertical dimension until a back-reflected signal power from the laser beam detected by a photodiode satisfies a threshold.

In some embodiments, the waveguide is configured to receive sample medium comprising non-viral indicator of the biological content and viral indicator of the biological content. In some embodiments, the sample testing device further comprises a processor configured to determine whether a concentration level of the non-viral indicator of biological content satisfies a threshold. In some embodiments, a method comprises detecting a concentration level of non-viral indicator of biological content; and determining whether the concentration level of the non-viral indicator of biological content satisfies a threshold.

In some embodiments, in response to determining that the concentration level of the non-viral indicator of biological content satisfies the threshold, the method further comprises detecting a concentration level of viral indicator of biological content.

In some embodiments, in response to determining that the concentration level of the non-viral indicator of biological content does not satisfy the threshold, the method further comprises transmitting a warning signal.

In some embodiments, a method comprises detecting concentration level of non-viral indicators of biological content, detecting concentration levels of viral indicators of biological content, and calculating comparative concentration levels of viral indicators of biological content.

In some embodiments, a sample testing device comprises a waveguide platform; an aiming control base disposed on a top surface of the waveguide platform; and a waveguide base disposed on the top surface of the waveguide platform.

In some embodiments, the waveguide base comprises a waveguide. In some embodiments, the aiming control base comprises a laser source. In some embodiments, the aiming control base is configured to align the laser source to an input end of the waveguide.

In some embodiments, the aiming control base comprises at least one electro-magnetic actuator configured to control at least one of a pitch or a roll of the aiming control base.

In some embodiments, the aiming control base comprises a scan element.

In some embodiments, a waveguide cartridge comprises a waveguide, a flow channel plate disposed on a top surface of the waveguide, a cartridge body disposed on a top surface of the flow channel plate, a fluid cover disposed on a top surface of the cartridge body, and a cartridge cover disposed on a top surface of the fluid cover.

In some embodiments, the cartridge body comprises a plurality of ports disposed on a bottom surface of the cartridge body, wherein each of the plurality of ports is connected to at least one flow channel defined by the flow channel plate.

In some embodiments, the cartridge body comprises a buffer reservoir, a reference port, a sample port, and an exhauster chamber.

In some embodiments, a system comprises an evaporator unit and a condenser unit. In some embodiments, the evaporator unit comprises an evaporator coil connected to a compressor and a condenser coil of the condenser unit. In some embodiments, the evaporator unit comprises a condensate tray positioned under the evaporator coil and configured to receive condensed liquid. In some embodiments, the condenser unit comprises a sample collection device connected to the condensate tray.

In some embodiments, the evaporator coil comprises one or more hydrophobic layers.

In some embodiments, the sample collection device stores buffer solution.

In accordance with various embodiments of the present disclosure, a sample testing device is provided. In some embodiments, the sample testing device comprises a waveguide cartridge comprising a waveguide, wherein the waveguide comprises at least one reference channel and at least one sample channel; and a multiport valve connected to an inlet of the waveguide cartridge and configured to provide a plurality of configurations comprising: a first configuration connecting the inlet of the waveguide cartridge to an outlet of the waveguide cartridge; and a second configuration connecting the inlet of the waveguide cartridge to the at least one reference channel and the at least one sample channel.

In some embodiments, the sample testing device further comprises a reservoir removably connected to the inlet of the waveguide cartridge.

In some embodiments, the reservoir stores a buffer solution. In some embodiments, the sample testing device further comprises: a pump connected to the reservoir and configured to inject the buffer solution through the inlet of the waveguide cartridge.

In some embodiments, the sample testing device further comprises a waste collector removably connected to the outlet of the waveguide cartridge.

In some embodiments, the waveguide cartridge further comprises a reference reservoir connected to the at least one reference channel and a sample reservoir connected to the at least one sample channel.

In some embodiments, the reference reservoir is configured to receive a reference solution. In some embodiments, the sample reservoir is configured to receive a sample solution.

In some embodiments, the multiport valve is configured to provide a third configuration connecting the inlet of the waveguide cartridge to the reference reservoir and the sample reservoir.

In accordance with various embodiments of the present disclosure, a method for operating a sample testing device is provided. In some embodiments, the method comprises connecting a reservoir to an inlet of a waveguide cartridge of the sample testing device, wherein the sample testing device comprises a multiport valve, wherein the reservoir stores a buffer solution and is connected to a pump; switching the multiport valve to a first configuration to connect the inlet of the waveguide cartridge to an outlet of the waveguide cartridge, wherein the outlet is connected to a waste collector; causing the pump to inject the buffer solution to the inlet of the waveguide cartridge; switching the multiport valve to a second configuration to connect the inlet of the waveguide cartridge to at least one reference channel and at least one sample channel of a waveguide of the waveguide cartridge; and switching the multiport valve to a third configuration to connect the inlet of the waveguide cartridge to a reference reservoir and a sample reservoir of the waveguide cartridge, wherein the reference reservoir is connected to the at least one reference channel, wherein the sample reservoir is connected to the at least one sample channel.

In accordance with various embodiments of the present disclosure, a sample testing device is provided. In some embodiments, the sample testing device comprises a waveguide comprising at least one reference channel and at least one sample channel; and a multiport valve comprises at least one buffer solution port, a reference solution port, and a sample solution port. In some embodiments, the multiport valve is configured to provide a plurality of configurations comprising: a first configuration connecting the at least one buffer solution port to the at least one reference channel and the at least one sample channel; and a second configuration connecting the reference solution port to the at least one reference channel and the sample solution port to the at least one sample channel.

In accordance with various embodiments of the present disclosure, a method for manufacturing a sample testing device is provided. In some embodiments, the method comprises: coating antibody on a surface of a waveguide layer of the sample testing device, wherein the surface of the waveguide layer comprises a sampling area and a non-sampling area; covering the sampling area of the waveguide layer with an ultraviolet (UV) shielding mask; projecting UV light onto the surface of the waveguide layer; and subsequent to projecting the UV light onto the surface of the waveguide layer, removing the UV shielding mask from the waveguide layer.

In some embodiments, a size of the UV shielding mask is the same as a size of the sampling area.

In some embodiments, the UV light deactivates antibody on the surface of the waveguide layer that is not covered by the UV shielding mask.

In some embodiments, the UV light does not deactivate antibodies on the surface of the waveguide layer that is covered by the UV shielding mask.

In some embodiments, the method further comprises subsequent to removing the UV shielding mask from the waveguide layer, attaching a flow channel plate onto the surface of the waveguide layer.

In some embodiments, the flow channel plate defines a plurality of flow channels. In some embodiments, the method further comprises: aligning the plurality of flow channels of the flow channel plate with the sampling area on the surface of the waveguide layer.

In accordance with various embodiments of the present disclosure, a sample testing device is provided. In some embodiments, the sample testing device comprises a light source coupler comprising an optical fiber array and an optical fiber holder, wherein the optical fiber array is secured within the optical fiber holder; and a waveguide comprising at least one optical channel, wherein the at least one optical channel is aligned with the light source coupler.

In some embodiments, the light source coupler comprises a micro lens array disposed on a first edge surface of the optical fiber holder.

In some embodiments, a micro lens of the micro lens array is aligned to the at least one optical channel of the waveguide.

In some embodiments, the optical fiber holder comprises a top holder component and a bottom holder component. In some embodiments, the optical fiber array is secured between the top holder component and the bottom holder component.

In some embodiments, the bottom holder component comprises a v-groove array. In some embodiments, the optical fiber array is fastened to the v-groove array.

In some embodiments, the top holder component and the bottom holder component form the first edge surface of the optical fiber holder.

In some embodiments, the optical fiber array is configured to redirect light into the at least one optical channel of the waveguide through the micro lens array.

In some embodiments, the optical fiber array comprises eight optical fibers.

In accordance with various embodiments of the present disclosure, a computer-implemented method for calibrating a sample testing device comprising a plurality of sample channels is provided. In some embodiments, the computer-implemented method comprises: causing a known sample associated with a sample type to be provided to the plurality of sample channels and at least one control substance to be provided to at least one control channel, wherein the plurality of sample channels is coated with a plurality of antibodies for detecting a plurality of sample types; recording a plurality of calibration signals received from the plurality of sample channels and at least one control signal received from the at least one control channel detected by an imaging component; and in response to determining that the at least one control signal is within a control signal range, generating a dataset indicating data connections between the sample type and the plurality of calibration signals.

In some embodiments, each of the plurality of sample channels is coated with a different antibody than that of another of the plurality of sample channels.

In some embodiments, only one of the plurality of sample channels is coated with an antibody for detecting the sample type associated with the known sample.

In accordance with some embodiments of the present disclosure, a computer-implemented method for operating a sample testing device comprising a plurality of sample channels is provided. In some embodiments, the computer-implemented method comprises: causing an unknown sample to be provided to the plurality of sample channels and at least one control substance to be provided to at least one control channel, wherein the plurality of sample channels is coated with a plurality of antibodies for detecting a plurality of sample types; recording a plurality of sample signals received from the plurality of sample channels and at least one control signal received from the at least one control channel detected by an imaging component; in response to determining that the at least one control signal is within a control signal range, retrieving a plurality of datasets indicating a plurality of data connections between the plurality of sample types and a plurality of calibration signals; and determining, based at least in part on the plurality of datasets and the plurality of sample signals, a sample type of the unknown sample.

In some embodiments, each of the plurality of sample types is associated with a set of calibration signals from the plurality of calibration signals. In some embodiments, when determining the sample type corresponding to the unknown sample, the method further comprises: determining whether the plurality of sample signals matches the set of calibration signals associated with a first sample type.

In some embodiments, the computer-implemented method further comprises: in response to determining that the plurality of sample signals matches the set of calibration signals associated with the first sample type, determining that the sample type corresponding to the unknown sample is the first sample type.

In some embodiments, the computer-implemented method further comprises: in response to determining that the plurality of sample signals does not match any set of calibration signals, determining that the sample type corresponding to the unknown sample is not any of the plurality of sample types.

In accordance with some embodiments of the present disclosure, a method for sample testing is provided. In some embodiments, the method uses a waveguide comprising a plurality of sample channels and a plurality of antibody collections for detecting a plurality of sample types. In some embodiments, the method comprises: producing a plurality of antibody mixtures using the plurality of antibody collections, wherein each of the plurality of antibody mixtures comprises at least two different antibodies from the plurality of antibody collections; coating the plurality of sample channels with the plurality of antibody mixtures, wherein each of the plurality of sample channels is coated with a different antibody mixture; providing a sample to the plurality of sample channels to cause the plurality of sample channels to generate a plurality of test signals; and determining, based at least in part on the plurality of test signals, a sample type from the plurality of sample types that corresponds to the sample.

In some embodiments, when producing the plurality of antibody mixtures, the method further comprises: determine a total number of the plurality of sample channels; and selecting a total number of antibody collections from the plurality of antibody collections based at least in part on the total number of the plurality of sample channels.

In some embodiments, a total number of the plurality of antibody mixtures is the same as the total number of the plurality of sample channels.

In some embodiments, a total number of the plurality of sample channels is n. In some embodiments, a total number of antibody collections from the plurality of antibody collections is selected based on 2n−1.

In some embodiments, when producing the plurality of antibody mixtures, the method further comprises: adding an antibody from an antibody collection to only one of the plurality of antibody mixtures.

In some embodiments, when producing the plurality of antibody mixtures, the method further comprises: adding an antibody from an antibody collection to all of the plurality of antibody mixtures.

In some embodiments, when producing the plurality of antibody mixtures, the method further comprises: adding an antibody from an antibody collection to all except one of the plurality of antibody mixtures.

In accordance with some embodiments of the present disclosure, a computer-implemented method for determining a sample type associated with a sample is provided. In some embodiments, the computer-implemented method comprises: receiving a plurality of test signals from a plurality of sample channels associated with the sample, wherein each of the plurality of sample channels is coated with an antibody mixture for detecting a plurality of sample types; and determining, for a sample channel of the plurality of sample channels, whether a test signal of the plurality of test signals from the sample channel indicates the sample is associated with at least one of the plurality of sample types associated with the antibody mixture coated on the sample channel.

In some embodiments, the computer-implemented method further comprises: in response to determining that the test signal indicates the sample is associated with at least one of the plurality of sample types, adding the plurality of sample types as sample type/variant candidates for the sample type associated with the sample.

In some embodiments, the computer-implemented method further comprises: in response to determining that the test signal does not indicate the sample is associated with at least one of the plurality of sample types, eliminating the plurality of sample types as sample type/variant candidates for the sample type associated with the sample.

In accordance with some embodiments of the present disclosure, a sample testing device is provided. In some embodiments, the sample testing device comprises: a waveguide comprising a plurality of optical channels; and an imager baffle component disposed on an imaging component, wherein the imager baffle component comprises a plurality of optical slots, wherein each of the plurality of optical slots is aligned with one of the plurality of optical channels.

In some embodiments, the imager baffle component comprises a glass substrate having a first surface and a second surface opposite to the first surface.

In some embodiments, the imager baffle component further comprises: a first optical coating disposed on the first surface of the glass substrate, and a second optical coating disposed on the second surface of the glass substrate.

In some embodiments, at least one of the first optical coating and the second optical coating comprises a neutral density filter.

In some embodiments, at least one of the first optical coating and the second optical coating comprises a narrow bandpass filter.

In some embodiments, the imager baffle component further comprises: a first mask pattern disposed on the first optical coating; and a second mask pattern disposed on the second optical coating.

In some embodiments, the first mask pattern is printed on the first optical coating.

In some embodiments, the second mask pattern is printed on the second optical coating.

In some embodiments, the first mask pattern is etched on the first optical coating.

In some embodiments, the second mask pattern is etched on the second optical coating.

In some embodiments, the first mask pattern and the second mask pattern form the plurality of optical slots of the imager baffle component.

In accordance with some embodiments of the present disclosure, a method for determining a fault condition with respect to at least one fluid channel of a sample testing device is provided. In some embodiments, the method comprises: monitoring, a current measurement signal of a sample testing device pump or actuator that is operatively coupled to the at least one fluid channel; and responsive to detecting an above-threshold current value or a current measurement signal that is above or below a target current range, providing an indication of the fault condition.

In some embodiments, the above-threshold current value is 120 mA.

In some embodiments, a nominal current measurement signal is between 60-80 mA.

In some embodiments, the sample testing device pump or actuator comprises a motion controller and a voice coil actuator.

In some embodiments, monitoring the current output comprises obtaining current measurements from within the motion controller of the sample testing device via an ammeter.

In some embodiments, the target current range is determined based at least in part on a machine learning technique.

In some embodiments, the machine learning technique is utilized to identify temporary increases in force or pressure from true obstructions based at least in part on time-weighted analysis.

In some embodiments, providing the indication of the fault condition comprises generating an alert for presentation via a user interface of a user computing entity that is in electronic communication with the sample testing device.

In accordance with some embodiments of the present disclosure, a method for monitoring fluid transition is provided. In some embodiments, the method comprising: causing a laser source to emit a laser beam through a sample channel of a waveguide; causing a first injection of a buffer solution to the sample channel of the waveguide; calculating a refractive index change value associated with the sample channel; and determining whether the refractive index change value corresponds to a predetermined refractive index change value.

In some embodiments, prior to causing the first injection of the buffer solution, the method further comprises: receiving first imaging data from an imaging sensor. In some embodiments, subsequent to causing the first injection of the buffer solution, the method further comprises: receiving second imaging data from the imaging sensor.

In some embodiments, the laser source is positioned adjacent to an input end of the sample channel. In some embodiments, the imaging sensor is positioned adjacent to an output end of the sample channel.

In some embodiments, the method further comprises calculating the refractive index change value based on the first imaging data and the second imaging data.

In some embodiments, the method further comprises in response to determining that the refractive index change value corresponds to the predetermined refractive index change value, causing a second injection of a sample solution to the sample channel of the waveguide.

In some embodiments, the method further comprises: in response to determining that the refractive index change value does not correspond to the predetermined refractive index change value, causing a continuing injection of the buffer solution to the sample channel of the waveguide.

In accordance with some embodiments of the present disclosure, a wavelength adjustment device is provided. In some embodiments, the wavelength adjustment device comprises: a housing, an optical fiber support base secured within the housing, and a compressor positioned within the housing and above the optical fiber support base. In some embodiments, the compressor comprises piezoelectric material.

In some embodiments, the wavelength adjustment device further comprises: a variable power supply comprising a first electrode and a second electrode. In some embodiments, the first electrode is connected to a first side of the piezoelectric material. In some embodiments, the second electrode is connected to a second side of the piezoelectric material. In some embodiments, the variable power supply applies a voltage between the first electrode and the second electrode.

In some embodiments, the wavelength adjustment device further comprises: an optical fiber positioned between the optical fiber support base and the compressor. In some embodiments, the compressor exerts a pressure on the optical fiber in response to the applied voltage.

In accordance with some embodiments of the present disclosure, a method for operating a wavelength adjustment device that is in electronic communication with an imaging component is provided. In some embodiments, the method comprises receiving a user input triggering a continuous wavelength sweeping mode of the wavelength adjustment device; causing an increase of a voltage applied to a compressor of the wavelength adjustment device; extracting an interference fringe pattern from a test signal from the imaging component; and updating a voltage correlation data object to indicate a data correlation between the voltage and the interference fringe pattern.

In accordance with some embodiments of the present disclosure, a method for operating a wavelength adjustment device to set wavelengths of laser beams entering sample channels of a waveguide is provided. In some embodiments, the method comprises: receiving user input triggering a direct wavelength setting mode of the wavelength adjustment device; retrieving voltage correlation data objects associated with the sample channels of the waveguide; determining overlapping interference fringe pattern data among the voltage correlation data objects; determining voltages corresponding to the overlapping interference fringe pattern data; and causing the voltages applied to compressors of the wavelength adjustment device.

In accordance with some embodiments of the present disclosure, a method for sample testing is provided. In some embodiments, the method comprises: producing a plurality of antibody mixtures using a plurality of sample antibody collections; coating a plurality of sample channels with the plurality of antibody mixtures; coating at least one positive reference channel with at least one reference binding substance; producing a sample mixture using a reference substance and a sample substance; and injecting the sample mixture to the plurality of sample channels and the at least one positive reference channel.

In some embodiments, the method further comprises receiving a plurality of test signals from the plurality of sample channels and at least one reference signal from the at least one positive reference channel; and determining a sample type from a plurality of sample types that is associated with the sample substance.

In accordance with some embodiments of the present disclosure, a method for sample testing is provided. In some embodiments, the method comprises injecting a sample mixture comprising a reference substance and a sample substance to a plurality of sample channels and at least one positive reference channel; receiving a plurality of test signals associated with the plurality of sample channels and at least one reference signal from the at least one positive reference channel; recording the at least one reference signal as at least one positive indication benchmark; and determining whether each test signal provides a positive indication according to the at least one positive indication benchmark.

In some embodiments, the method further comprises: in response to determining that a test signal from a sample channel provides the positive indication, generating a candidate data set comprising sample types associated with antibody mixture coated on the sample channel.

In some embodiments, the method further comprises: in response to determining that a test signal from a sample channel does not provide the positive indication, generating an elimination data set comprising sample types associated with antibody mixture coated on the sample channel.

In some embodiments, the method further comprises: determining that the sample substance is associated with a sample type that is in each candidate data set and not in any elimination data set.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative examples may be read in conjunction with the accompanying figures. It will be appreciated that, for simplicity and clarity of illustration, components and elements illustrated in the figures have not necessarily been drawn to scale, unless described otherwise. For example, the dimensions of some of the components or elements may be exaggerated relative to other elements, unless described otherwise. Examples incorporating teachings of the present disclosure are shown and described with respect to the figures presented herein, in which:

FIG. 28A illustrates an example view of an example sample testing device in accordance with various examples of the present disclosure;

FIG. 34 illustrates an example sample testing device in accordance with various examples of the present disclosure;

FIG. 42C illustrates an example waveguide in accordance with various examples of the present disclosure;

FIG. 62 illustrates an example sample testing device in accordance with various examples of the present disclosure;

FIG. 63A illustrates an example sample testing device in accordance with various examples of the present disclosure;

FIG. 69B illustrates an example exploded view associated with an example sample testing device in accordance with various examples of the present disclosure;

FIG. 83C illustrates an example side view of a sample testing device in accordance with various examples of the present disclosure;

FIG. 83D illustrates an example top view of a sample testing device in accordance with various examples of the present disclosure;

FIG. 83E illustrates an example cross sectional view of the sample testing device in accordance with various examples of the present disclosure;

FIG. 84A illustrates an example perspective view of an aiming control base in accordance with various examples of the present disclosure;

FIG. 84B illustrates another example perspective view of the aiming control base in accordance with various examples of the present disclosure;

FIG. 84C illustrates an example side view of the aiming control base in accordance with various examples of the present disclosure;

FIG. 84D illustrates an example top view of the aiming control base in accordance with various examples of the present disclosure;

FIG. 85A illustrates an example perspective view of a scan element in accordance with various examples of the present disclosure;

FIG. 85B illustrates another example exploded view of the scan element in accordance with various examples of the present disclosure;

FIG. 85C illustrates another example exploded view of the scan element in accordance with various examples of the present disclosure;

FIG. 85D illustrates an example side view of the scan element in accordance with various examples of the present disclosure;

FIG. 85E illustrates an example perspective view of a resonant flex component in accordance with various examples of the present disclosure;

Figure 86A:
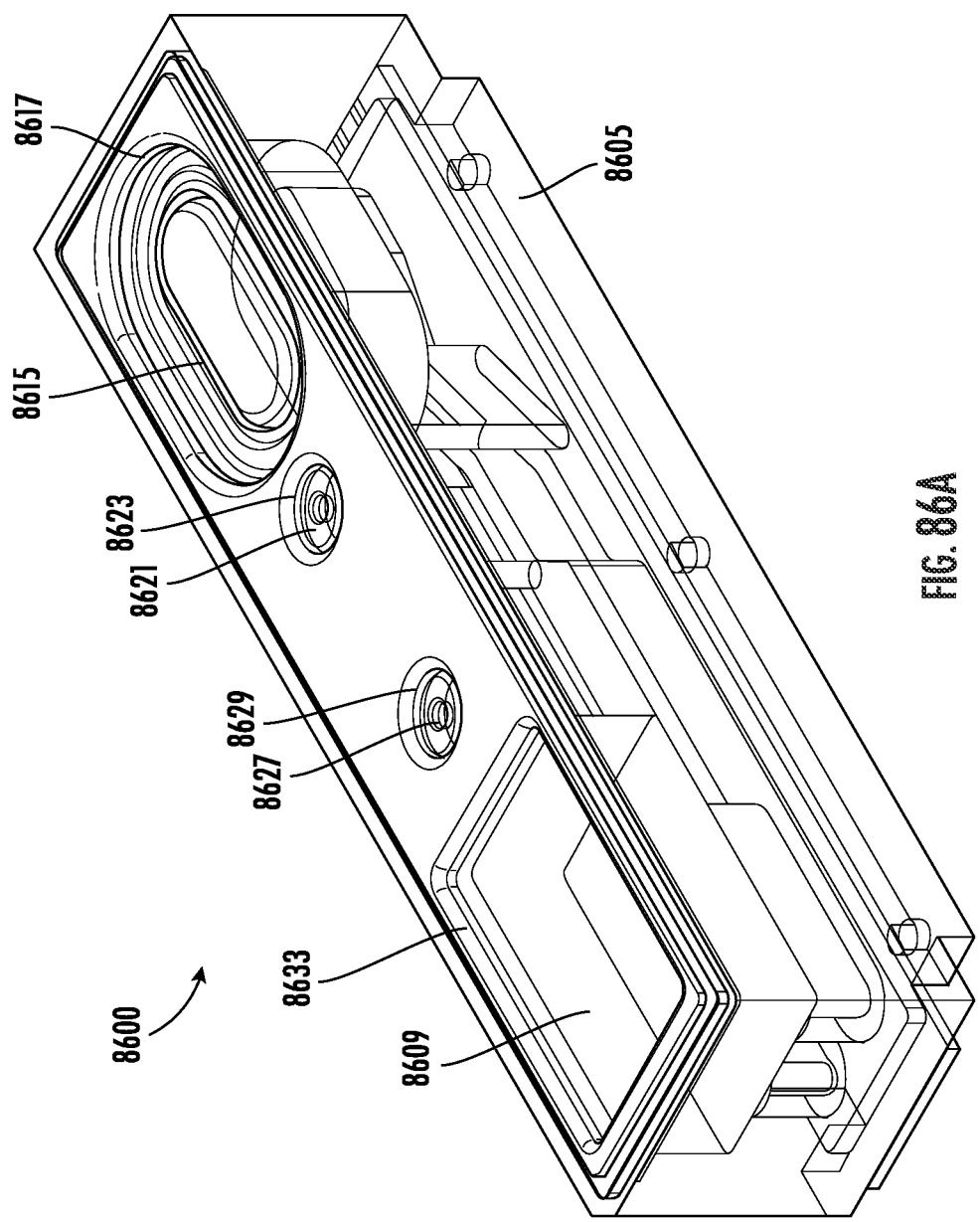
Figure 86B:
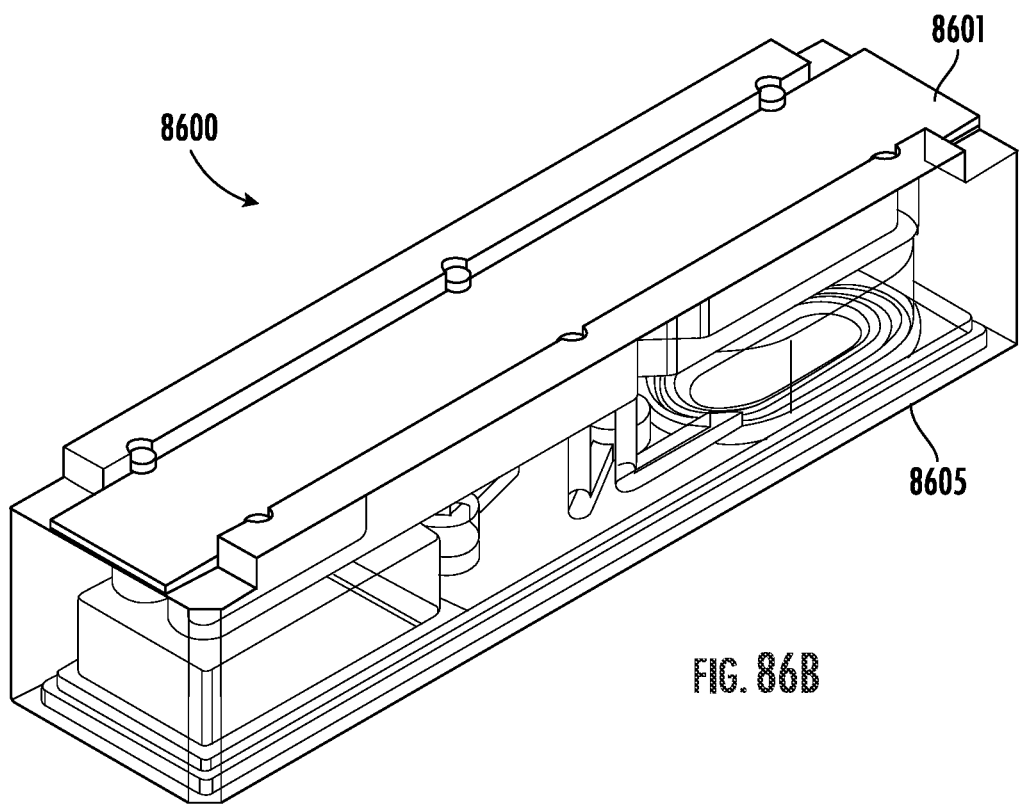
Figure 86C:
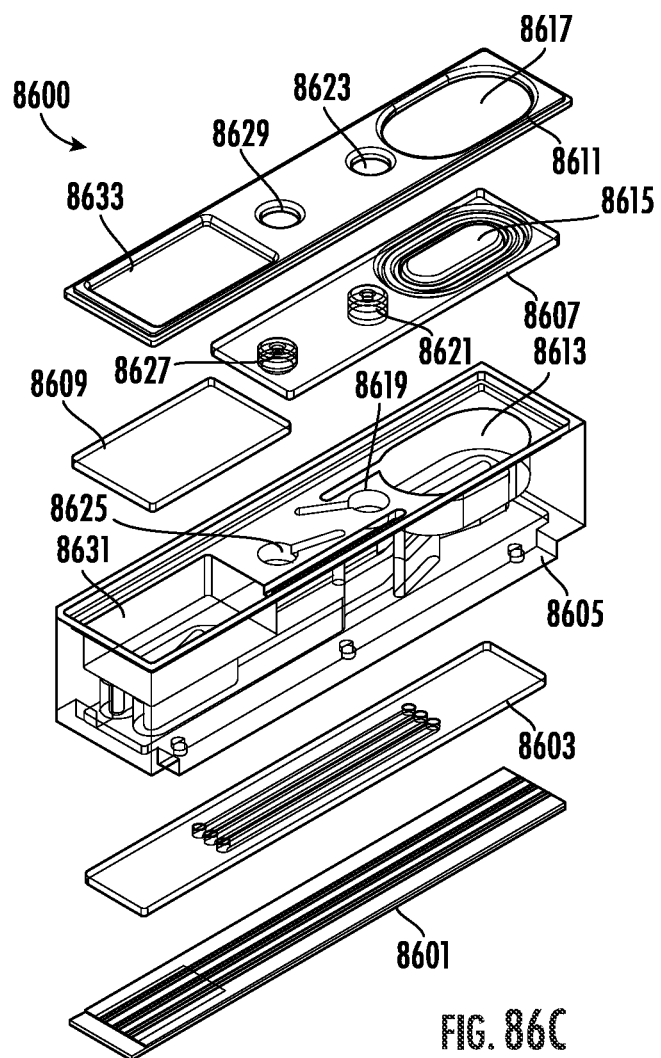
Figure 86D:
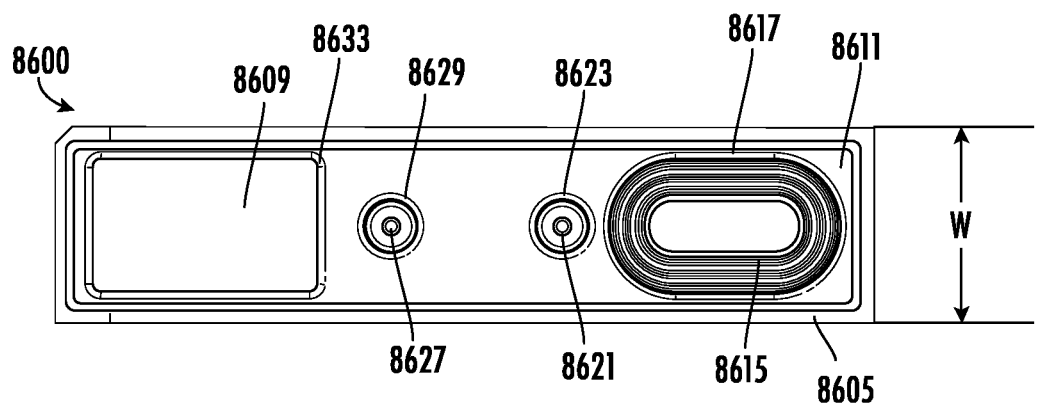
Figure 86E:
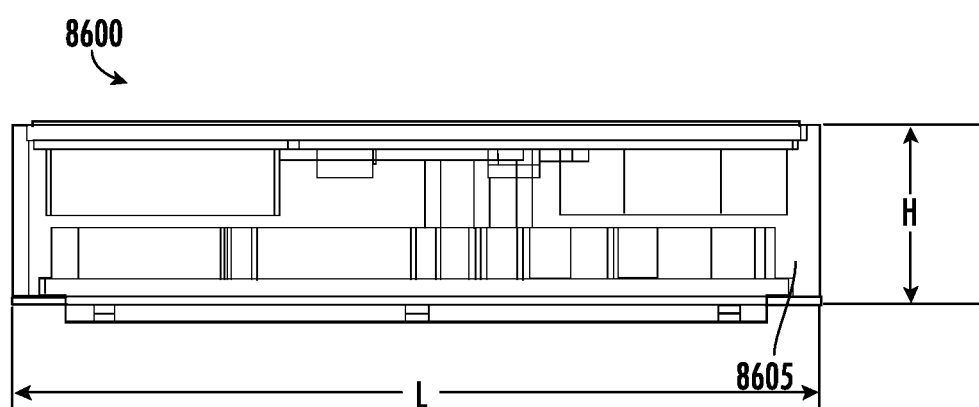
Figure 86F:
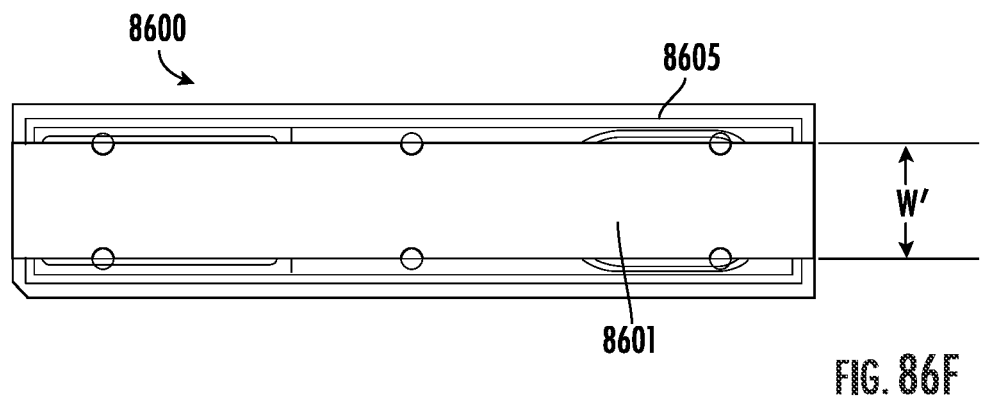
Figure 87A:
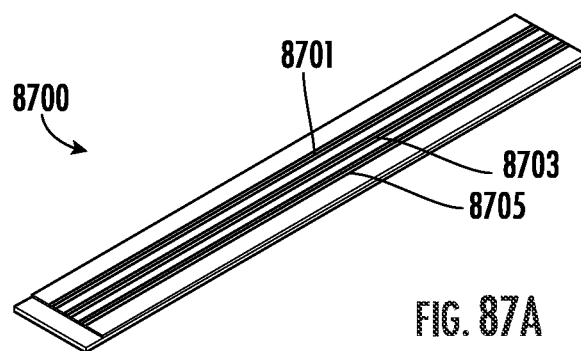
Figure 87B:
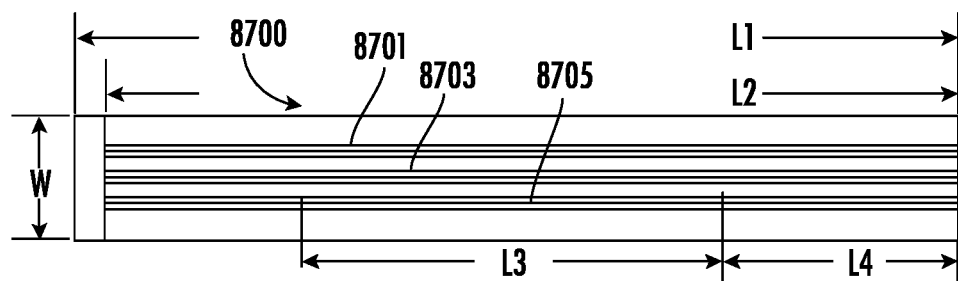
Figure 87C:
Figure 88A:
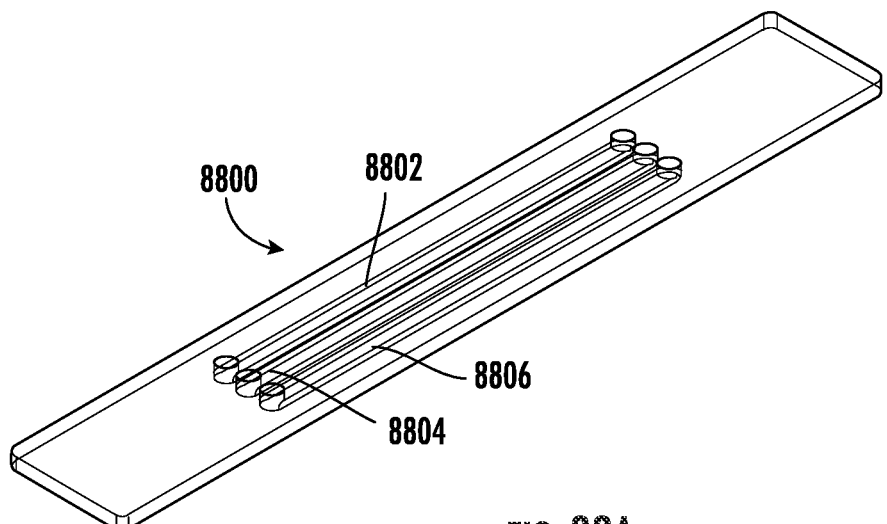
Figure 88B:
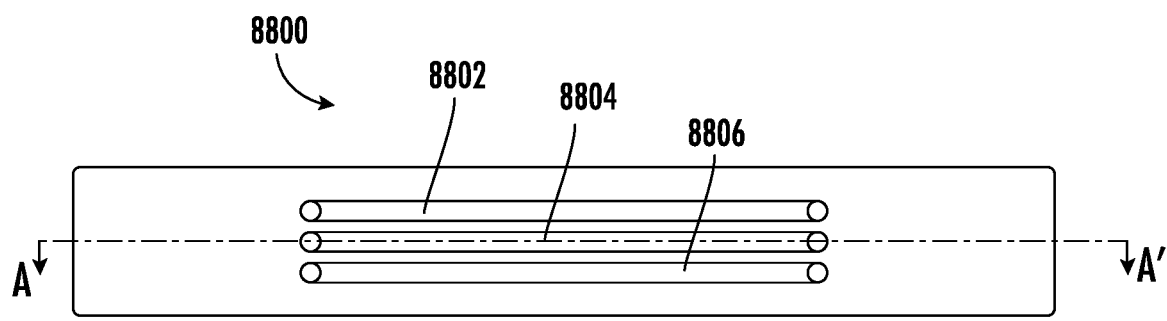
Figure 89A:
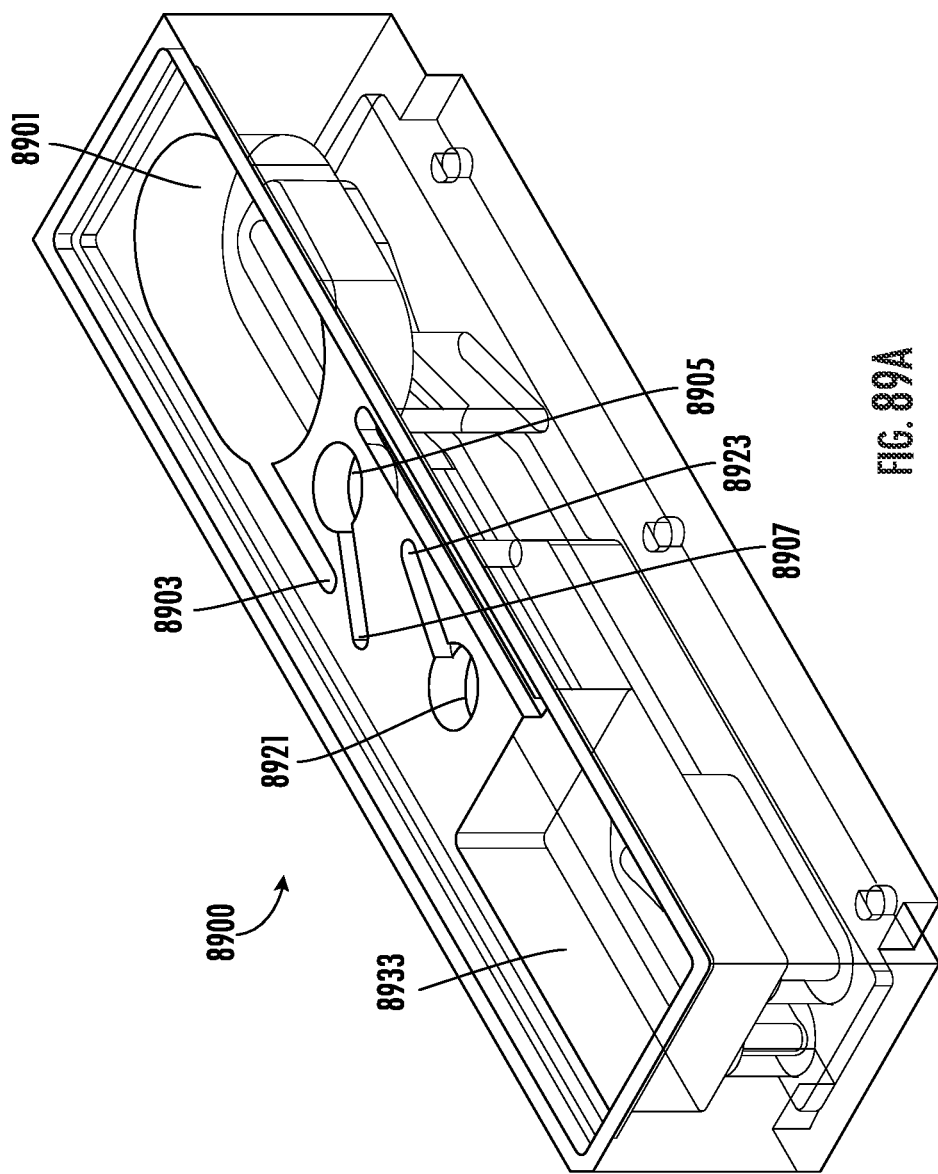
Figure 89B:
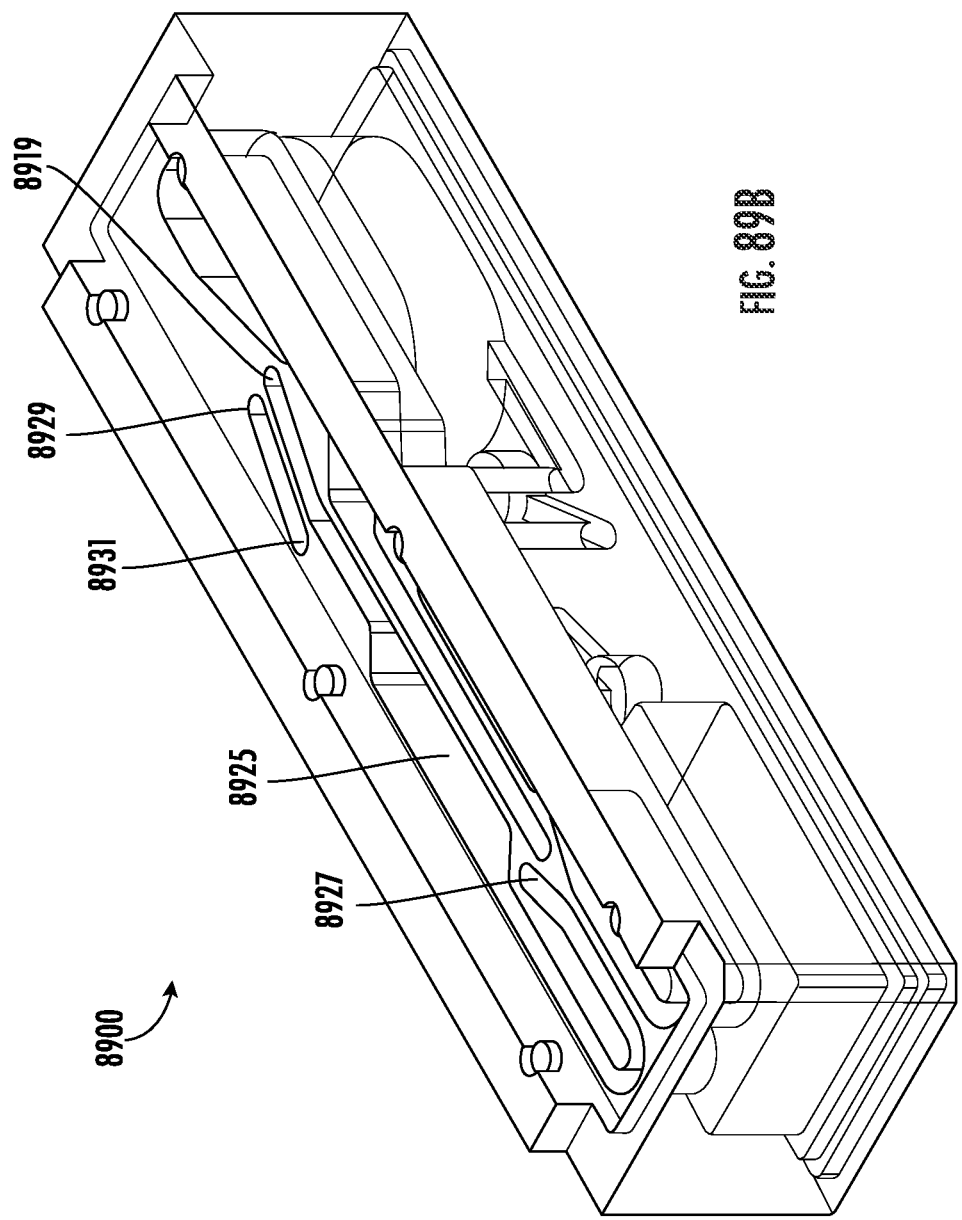
Figure 89C:
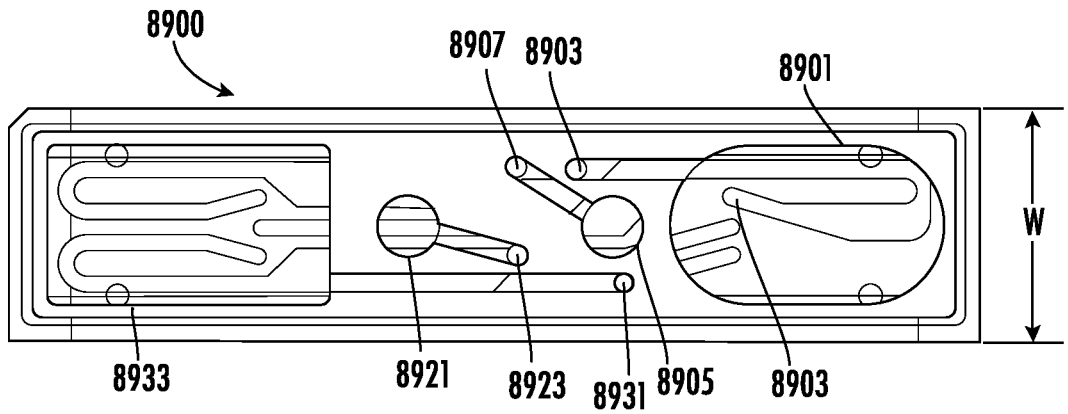
Figure 89D:
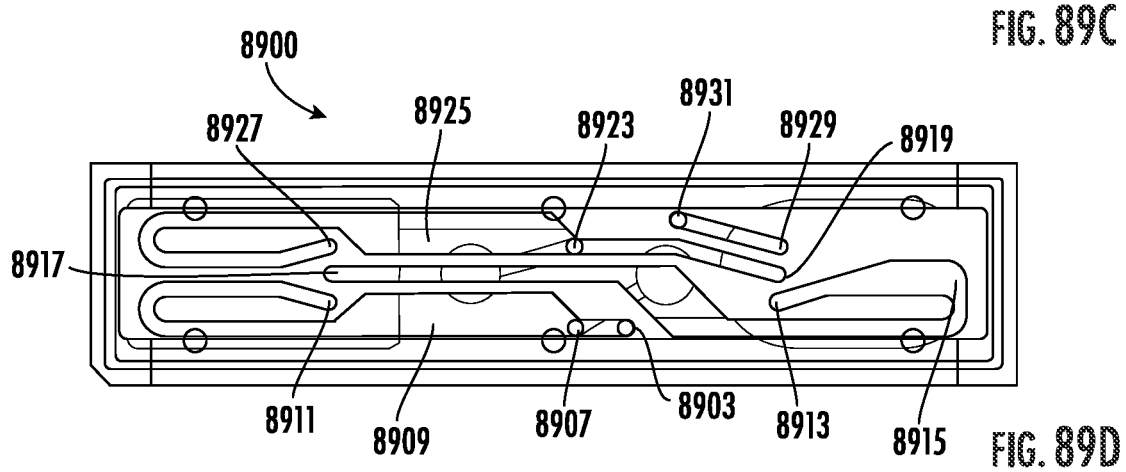
Figure 89E:
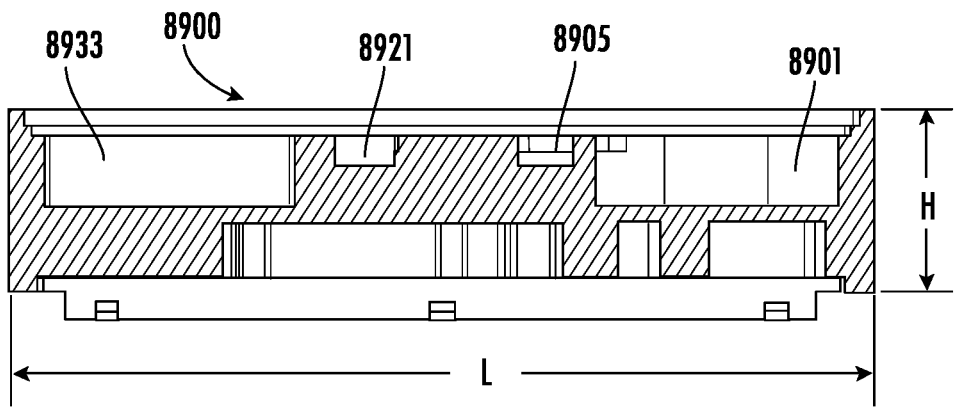
Figure 90A:
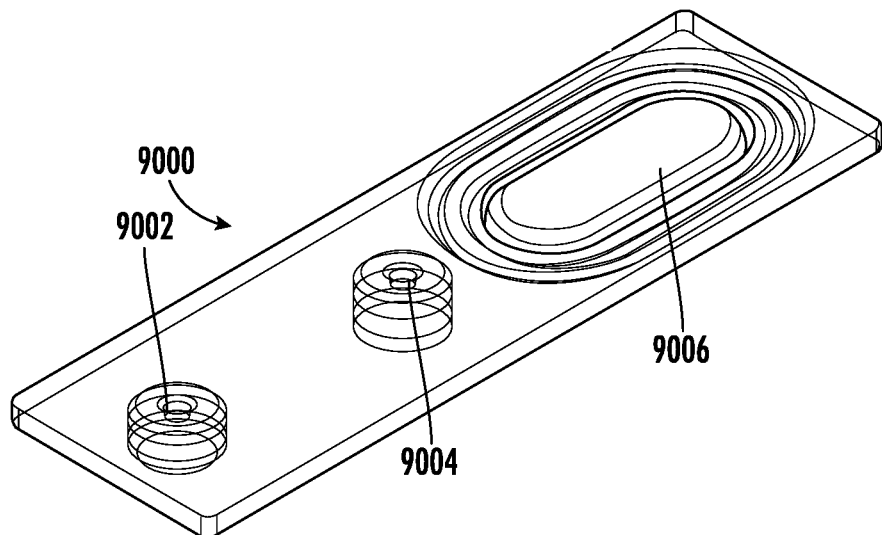
Figure 90B:
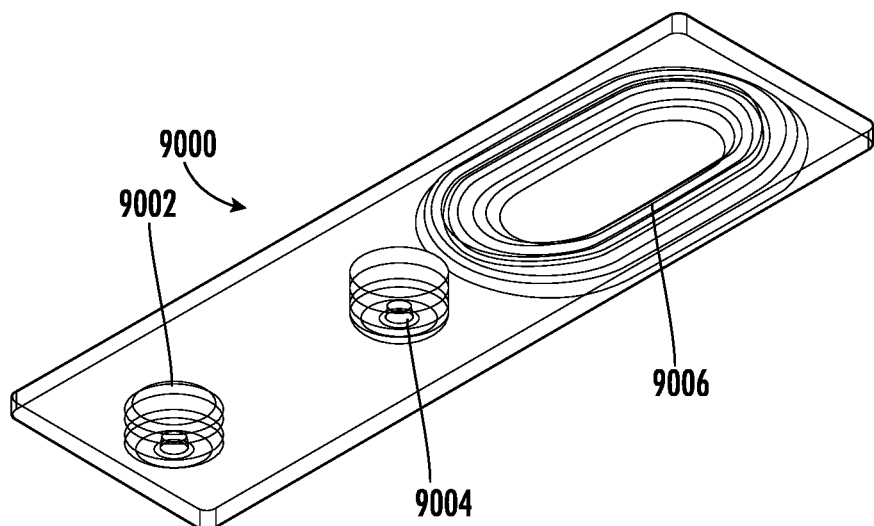
Figure 90C:
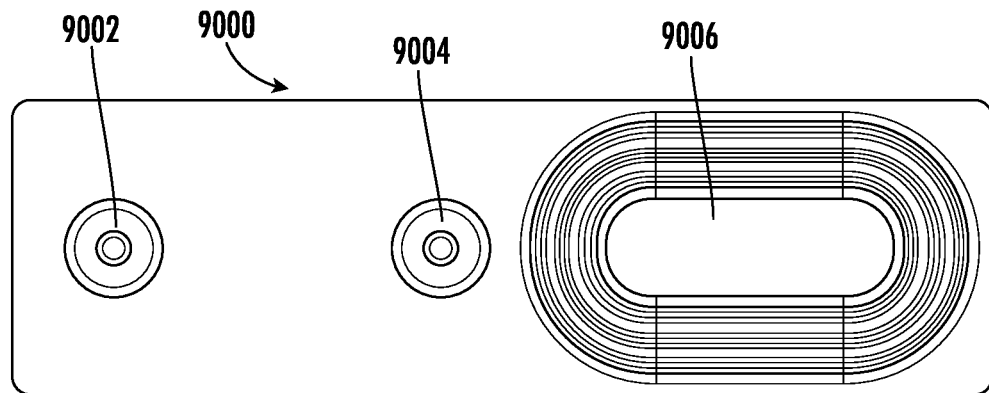
Figure 90D:
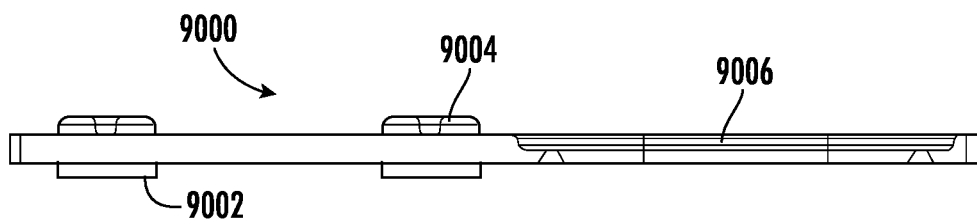
Figure 90E:
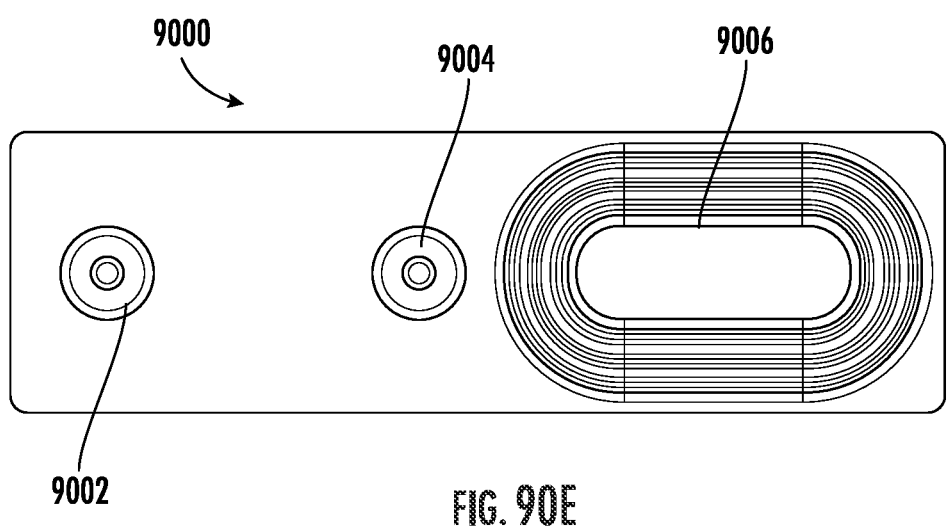
Figure 91A:
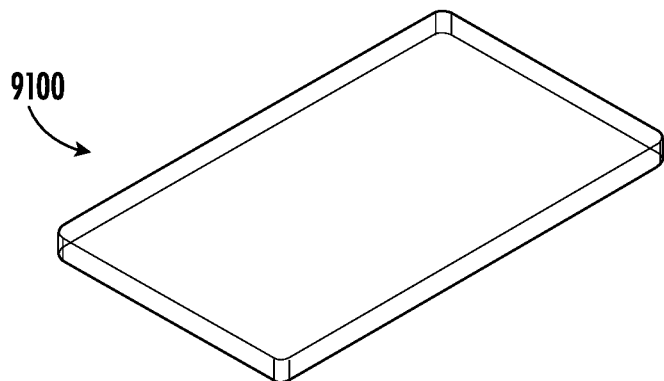
Figure 91B:
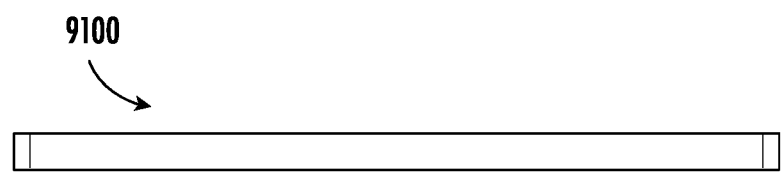
Figure 91C:
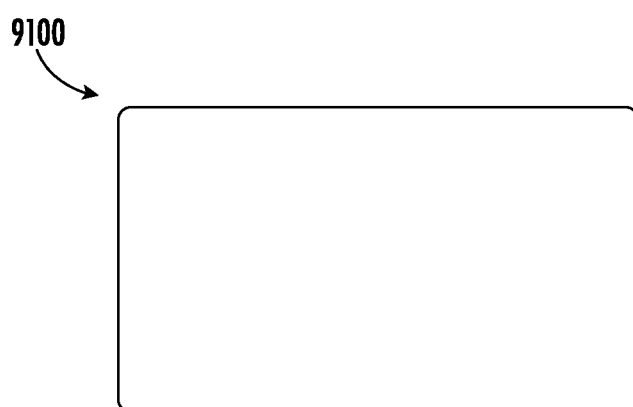
Figure 92A:
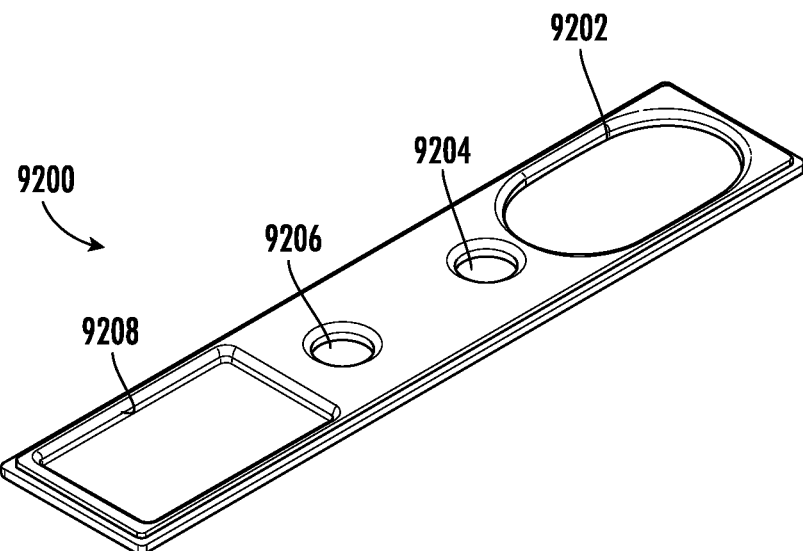
Figure 92B:
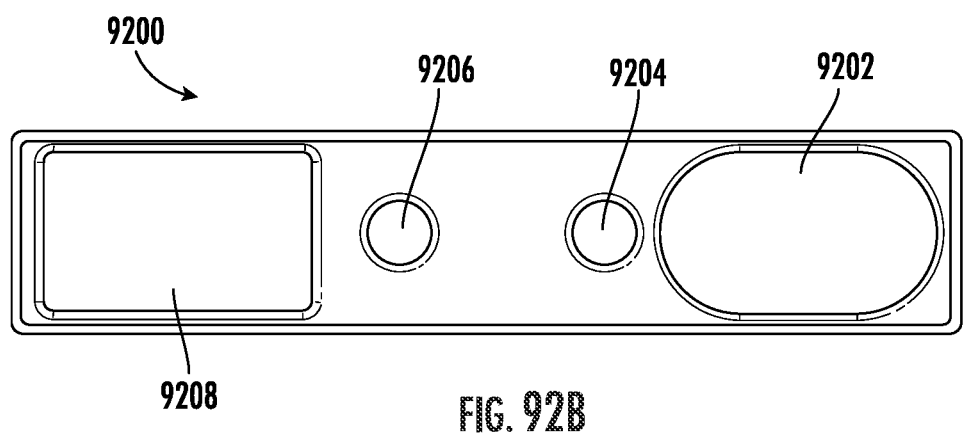
Figure 92C:
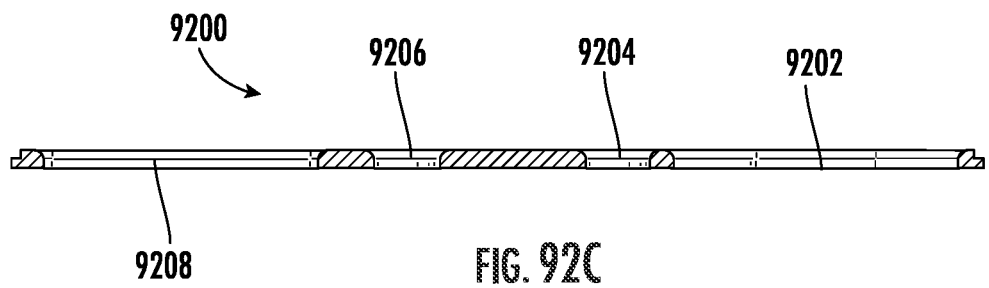
Figure 93A:
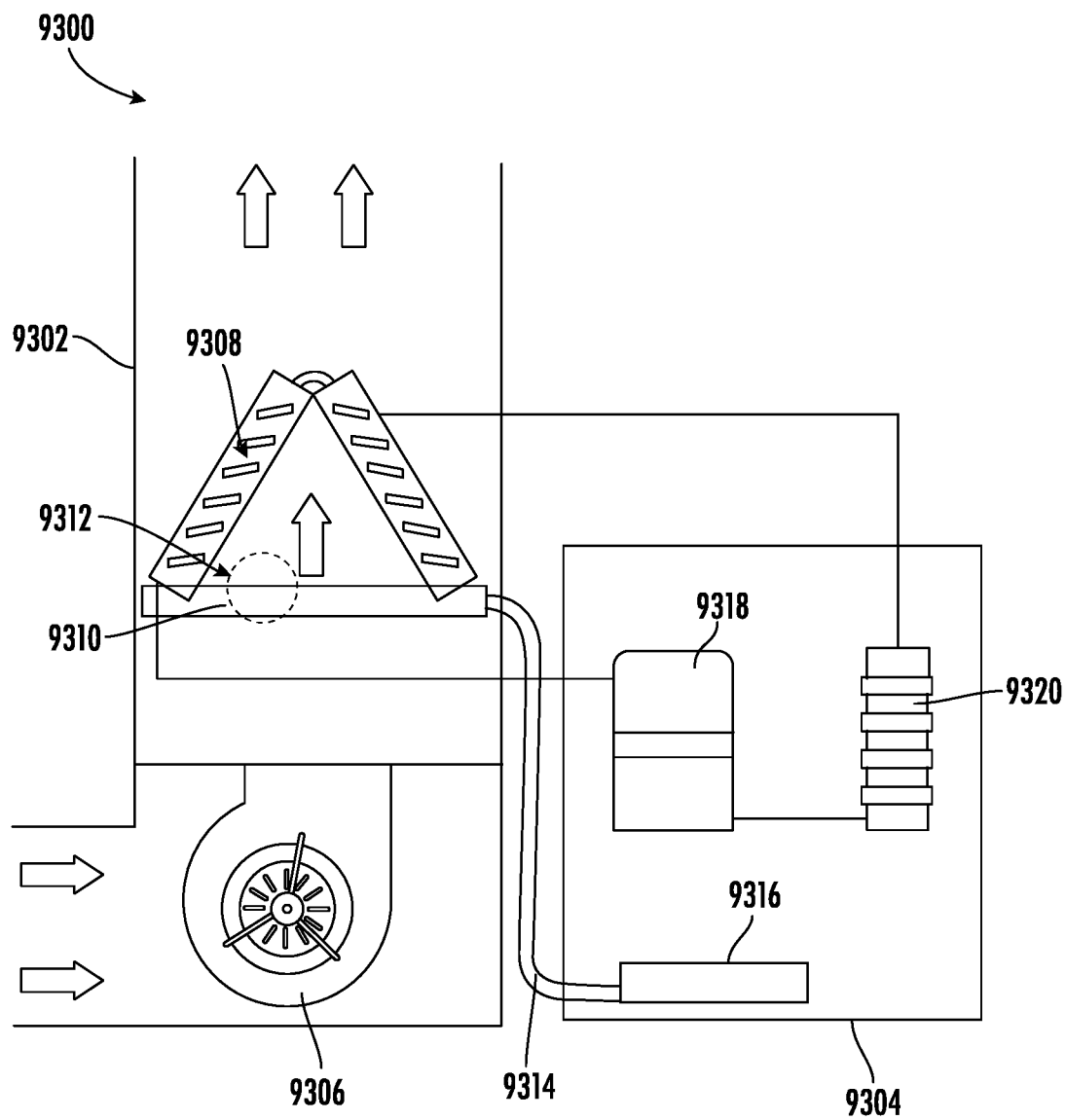
Figure 93B:
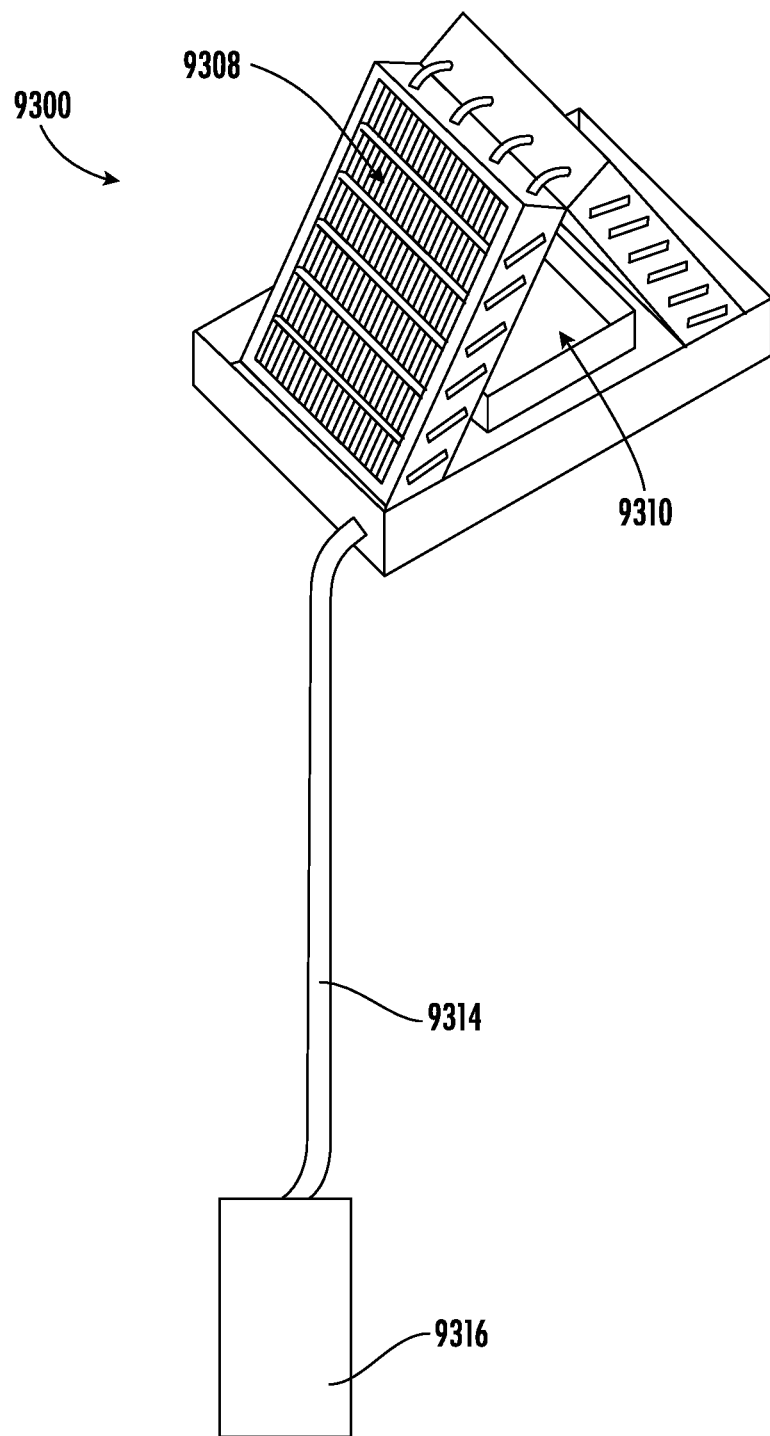
Figure 94A:
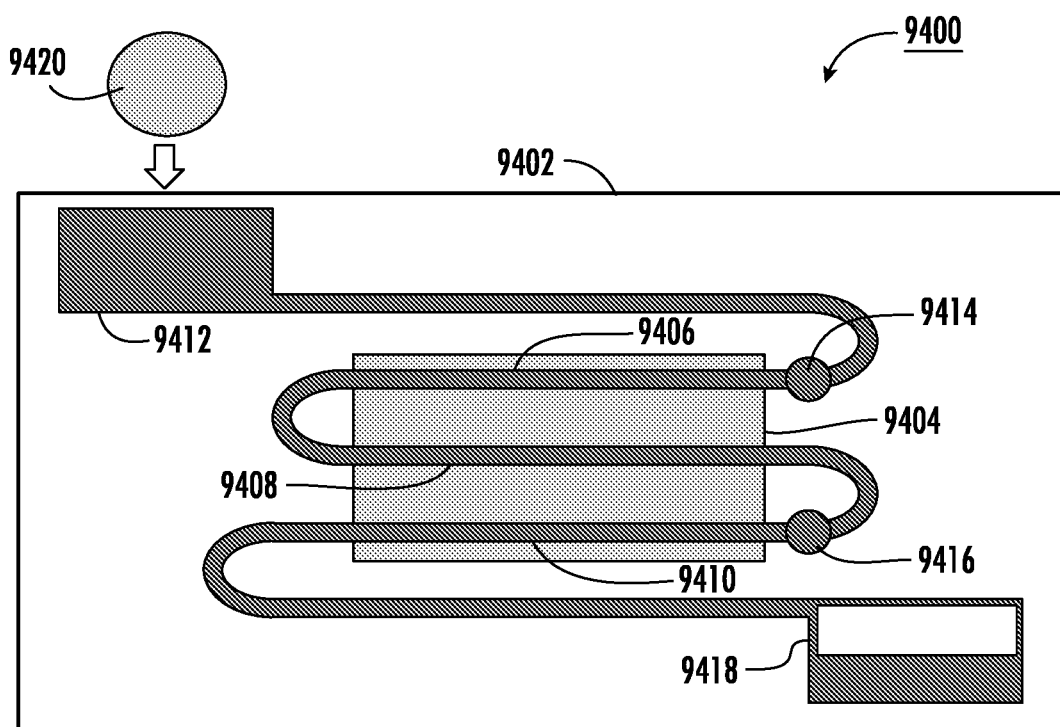
Figure 94B:
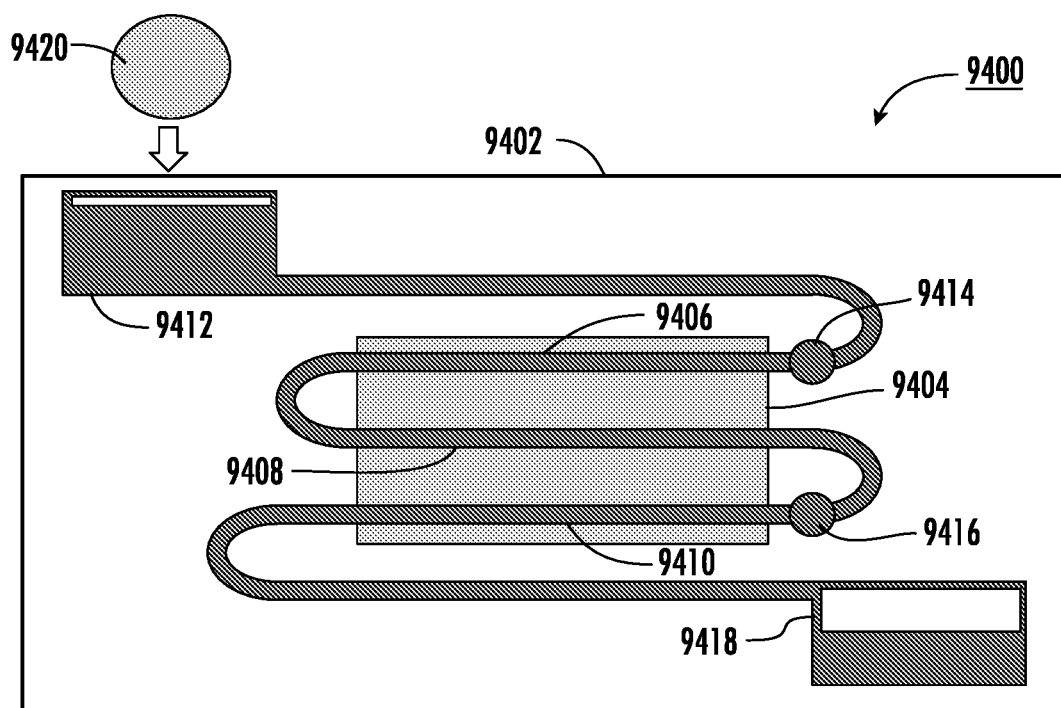
Figure 94C:
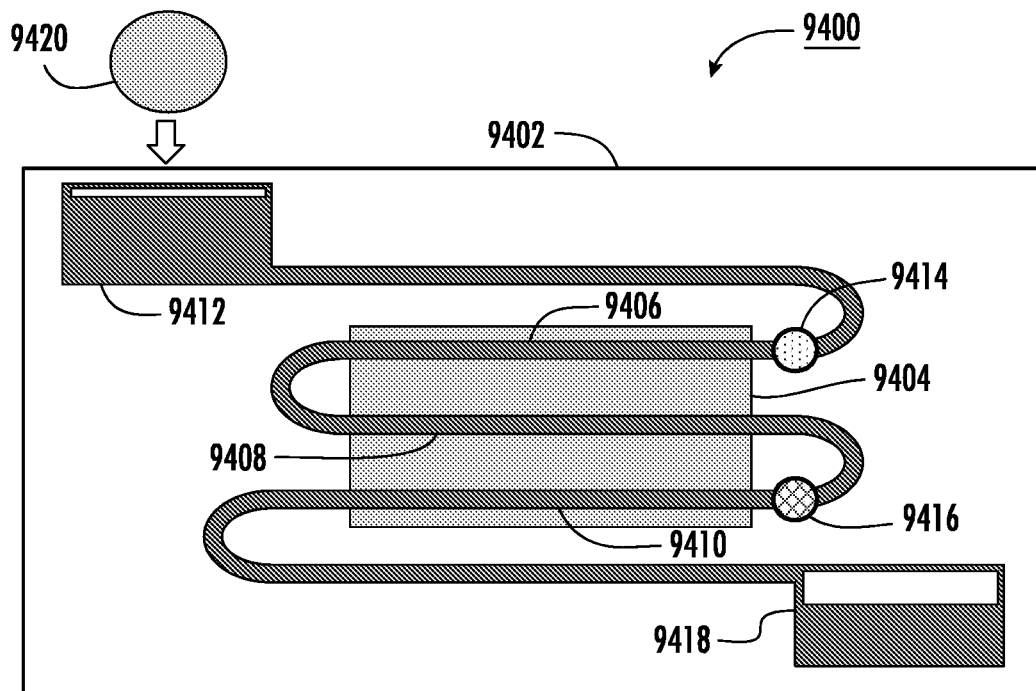
Figure 94D:
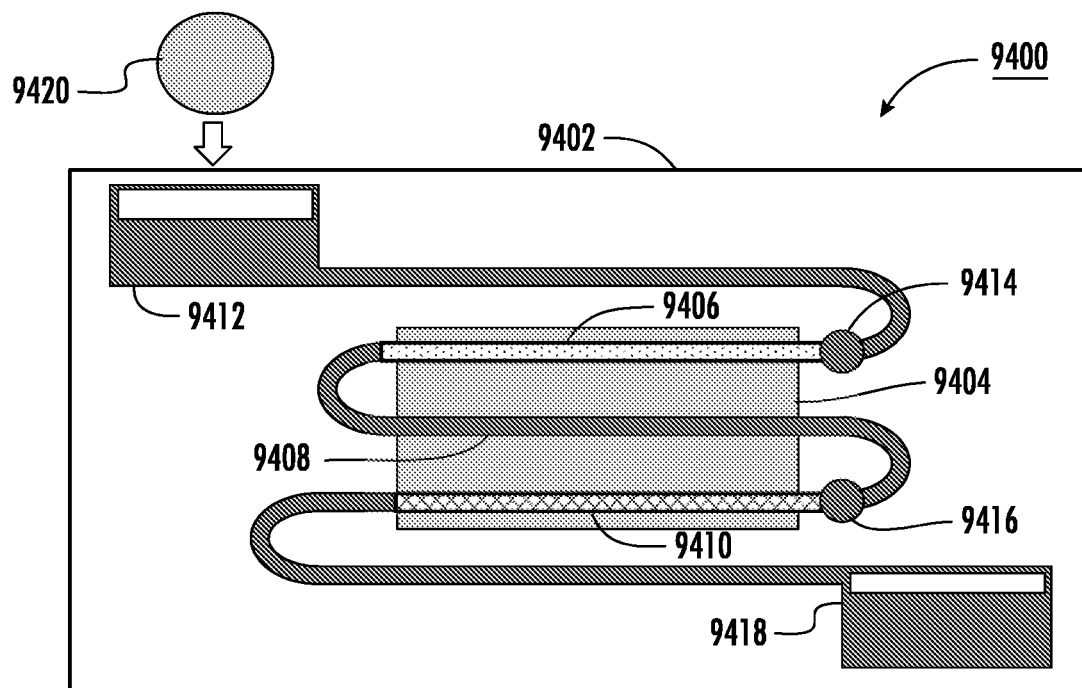
Figure 94E:
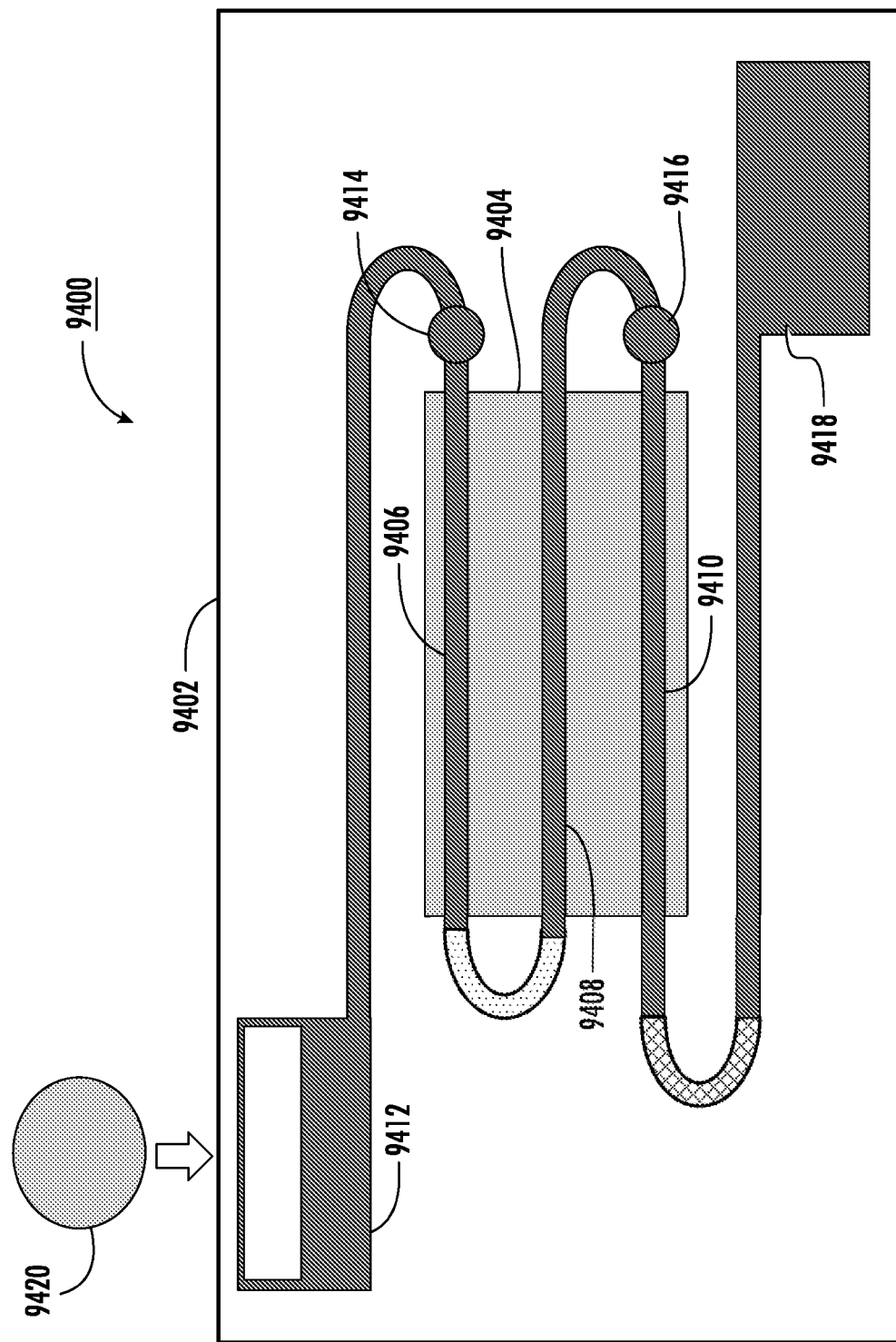
Figure 96A:
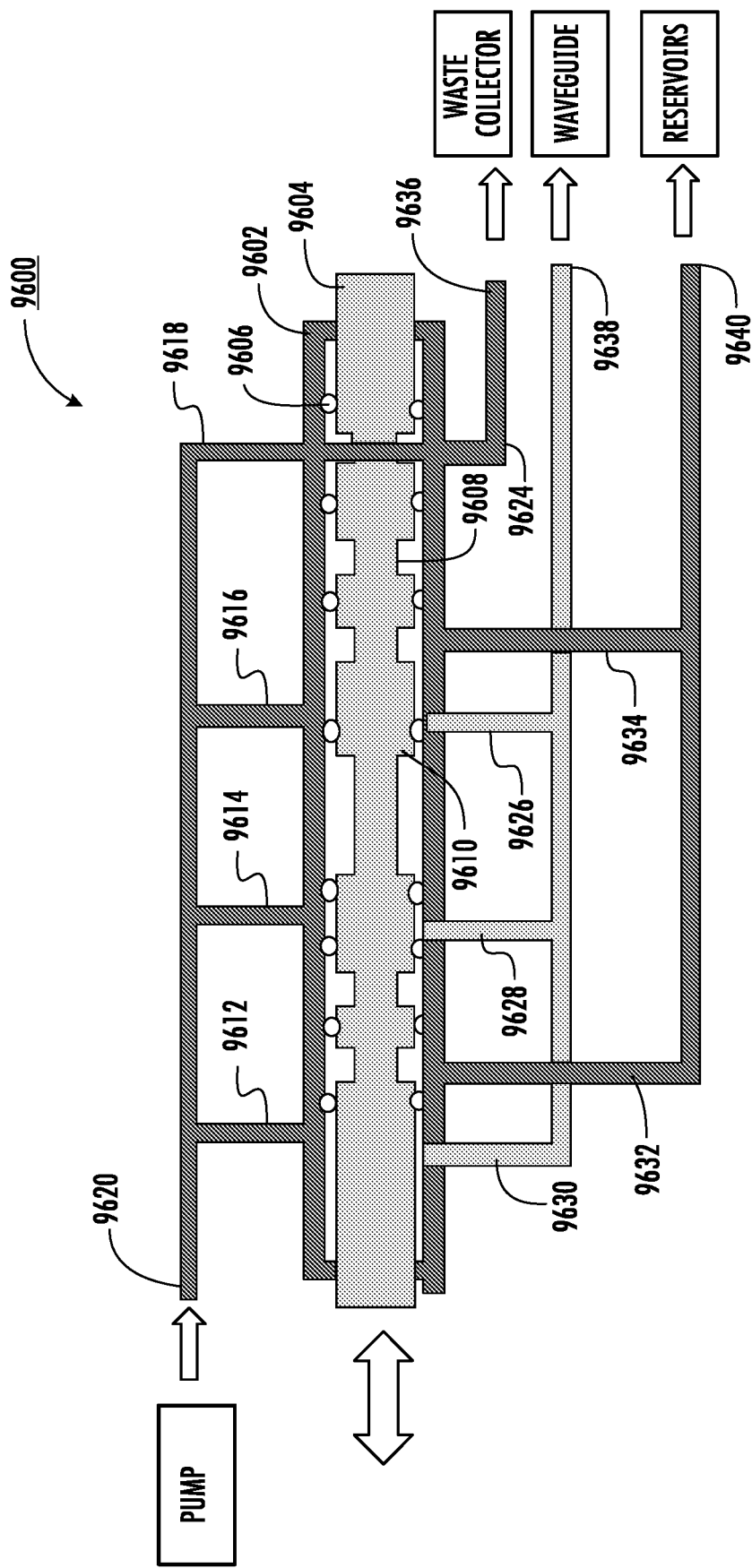
Figure 96B:
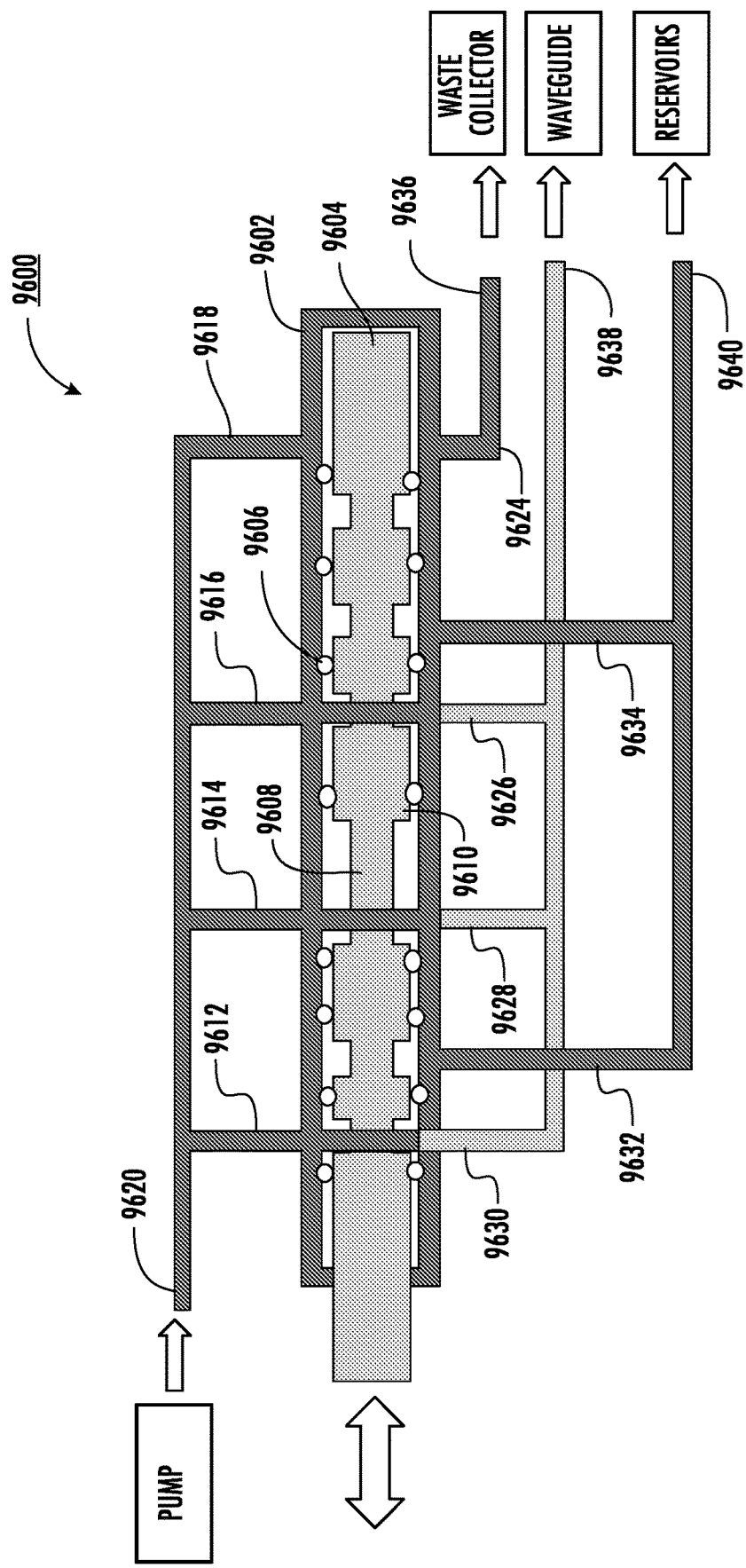
Figure 96C:
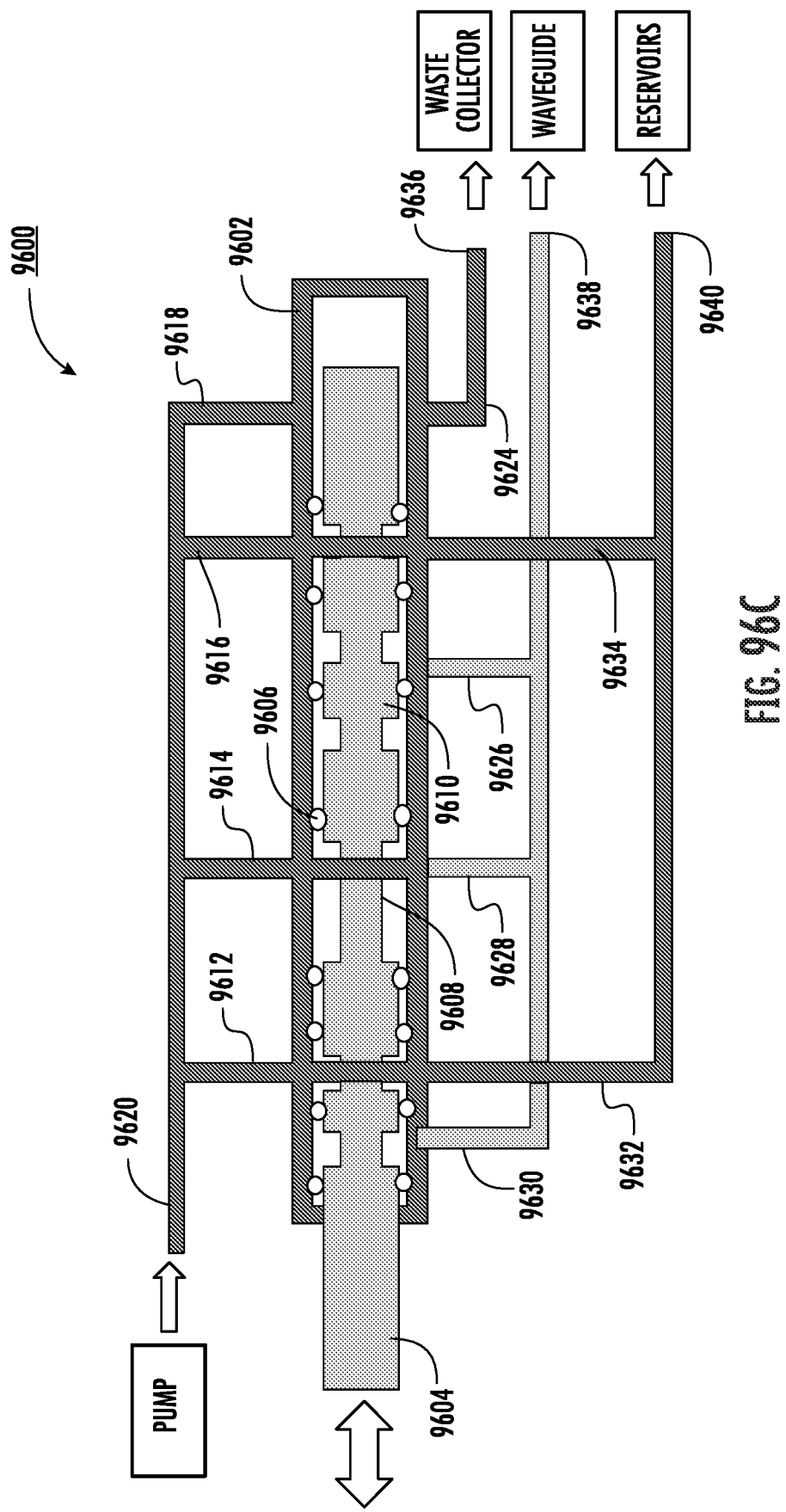
Figure 97A:
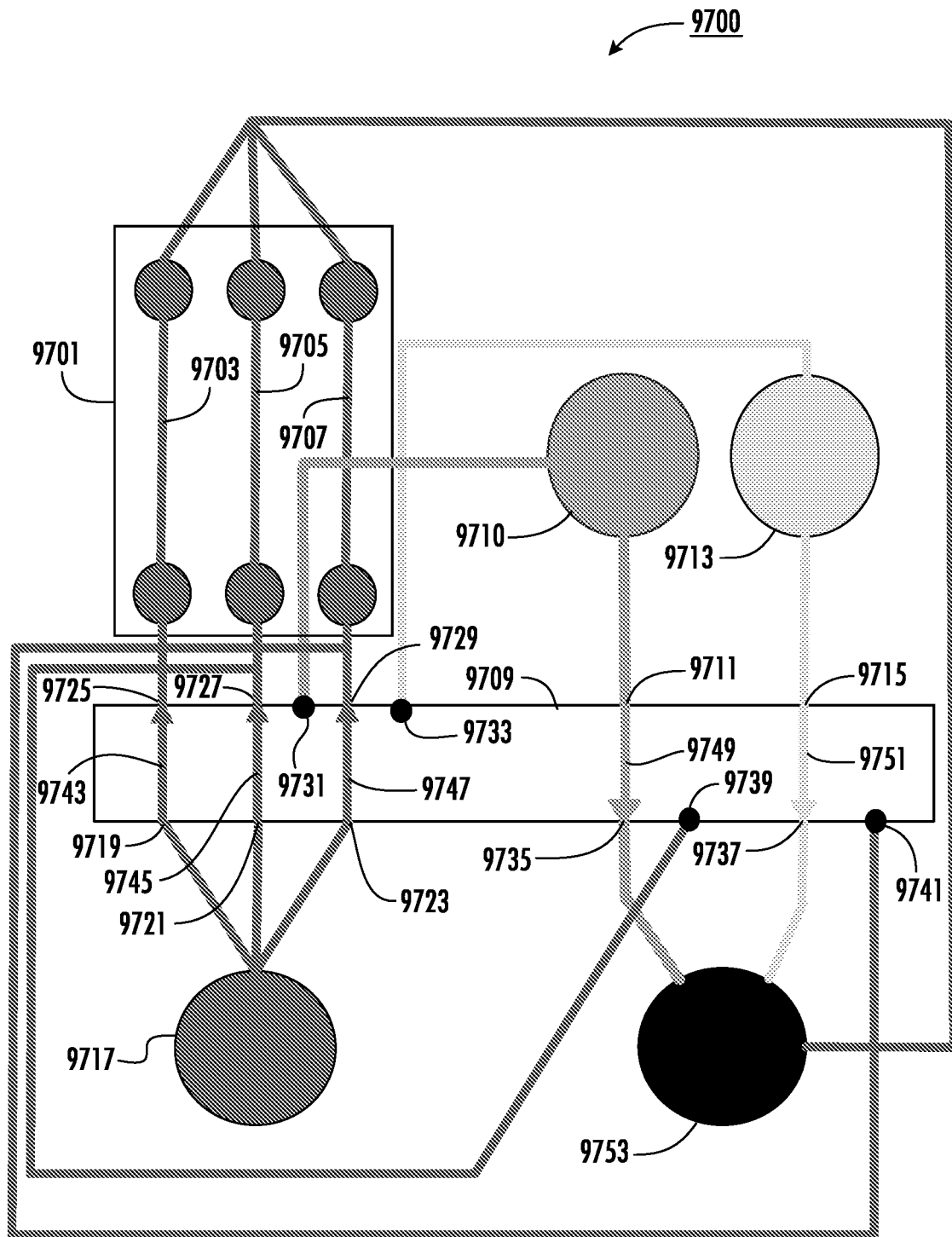
Figure 97B:
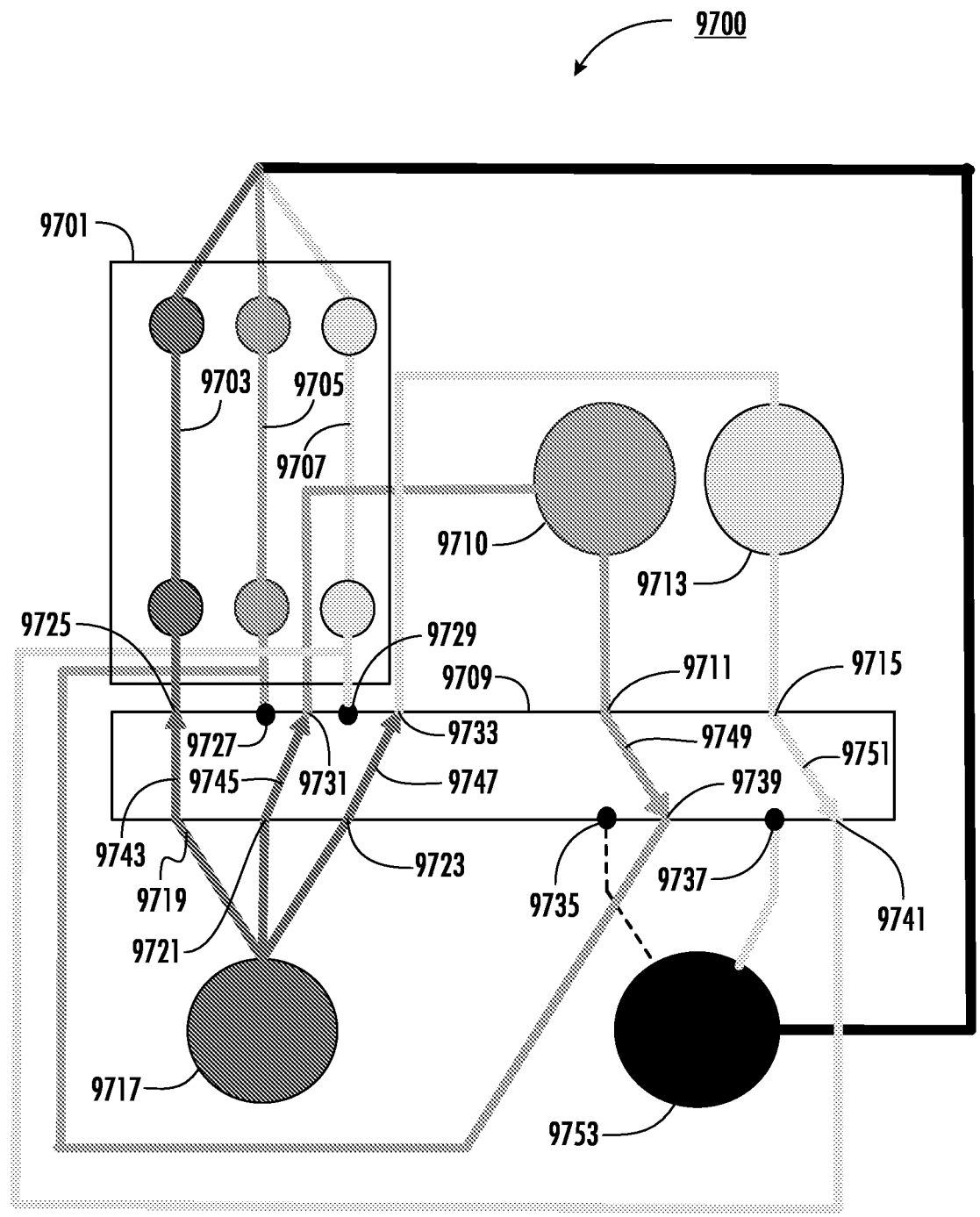
Figure 98A:
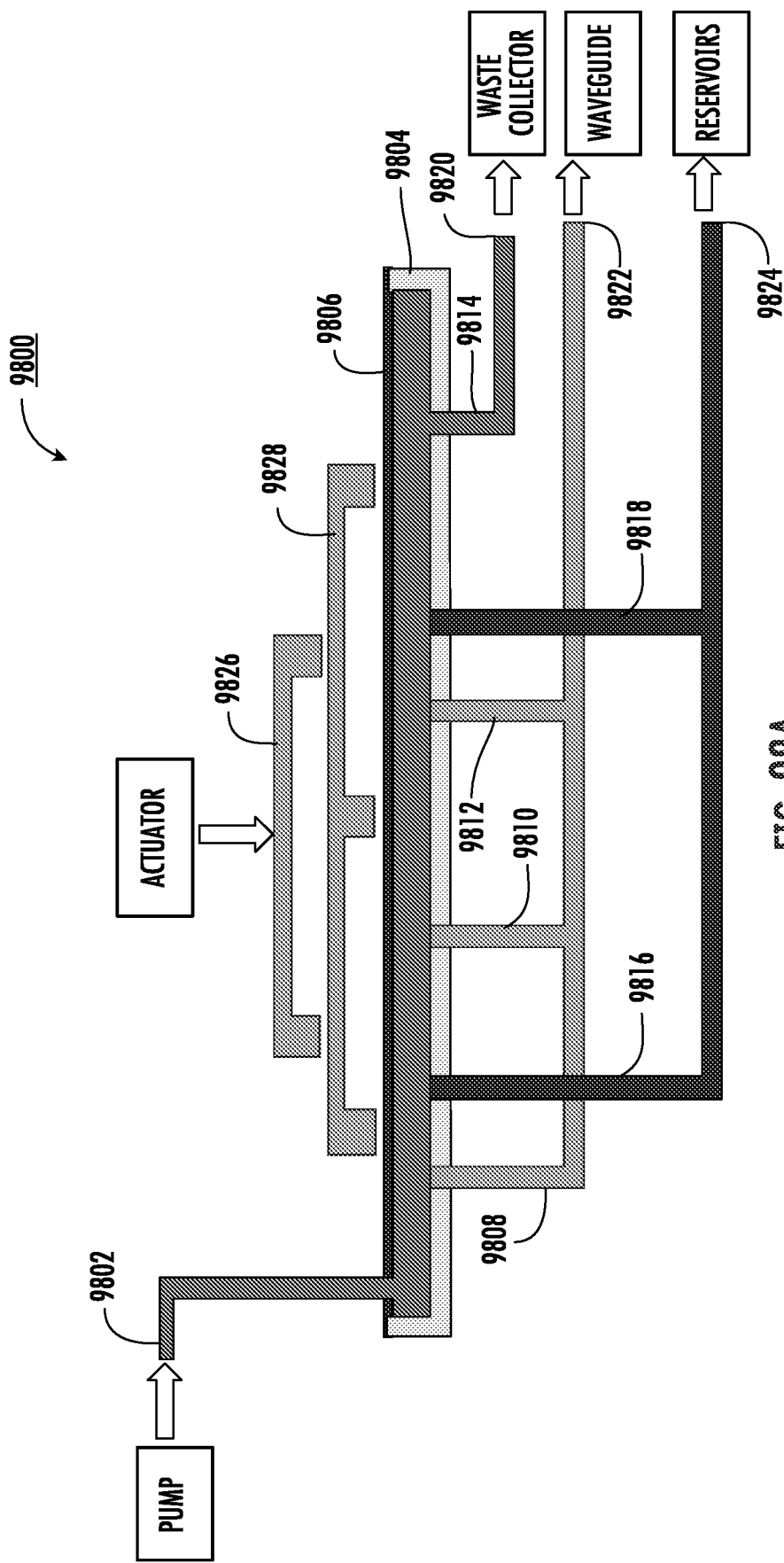
Figure 98B:
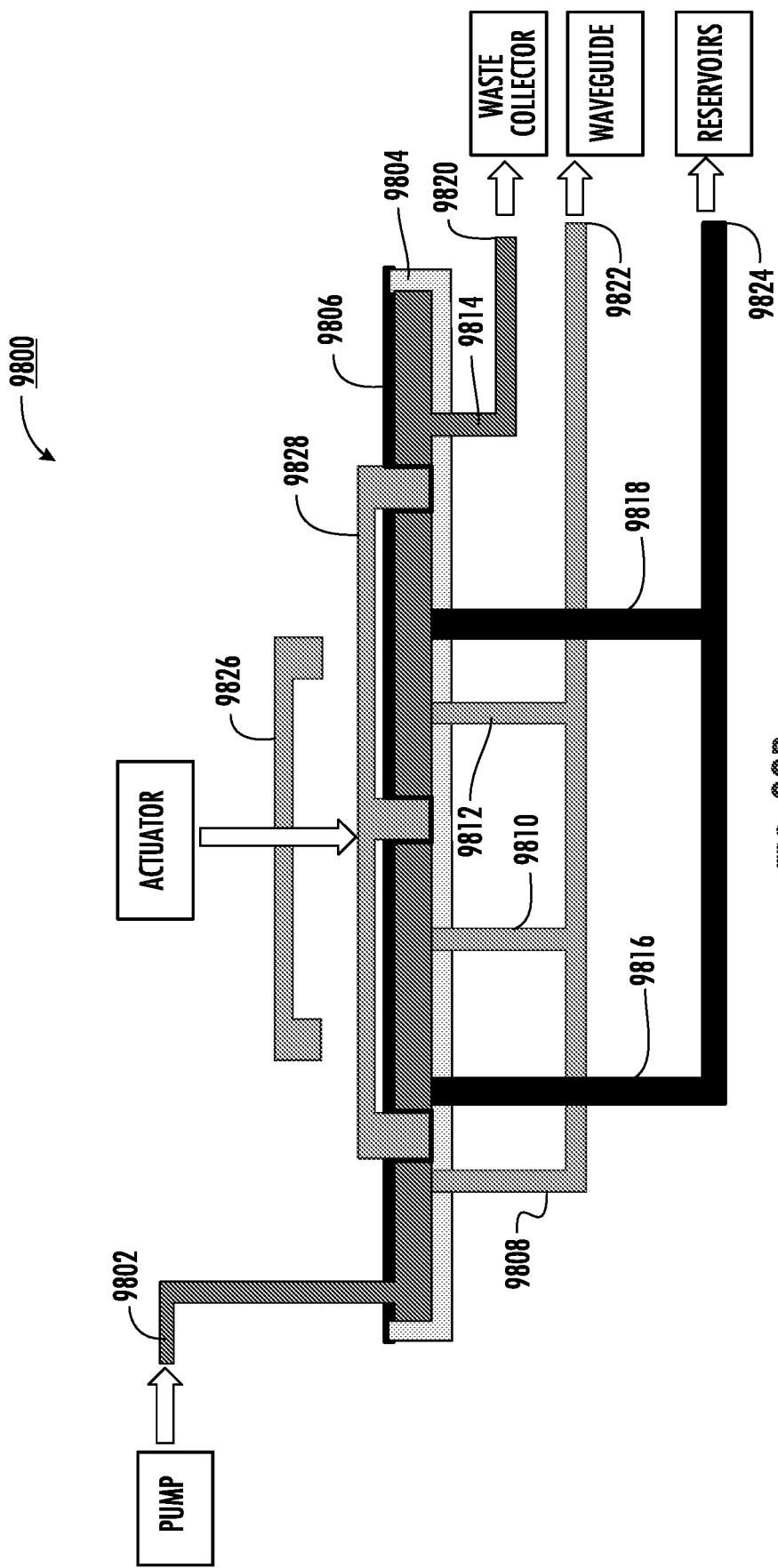
Figure 98C:
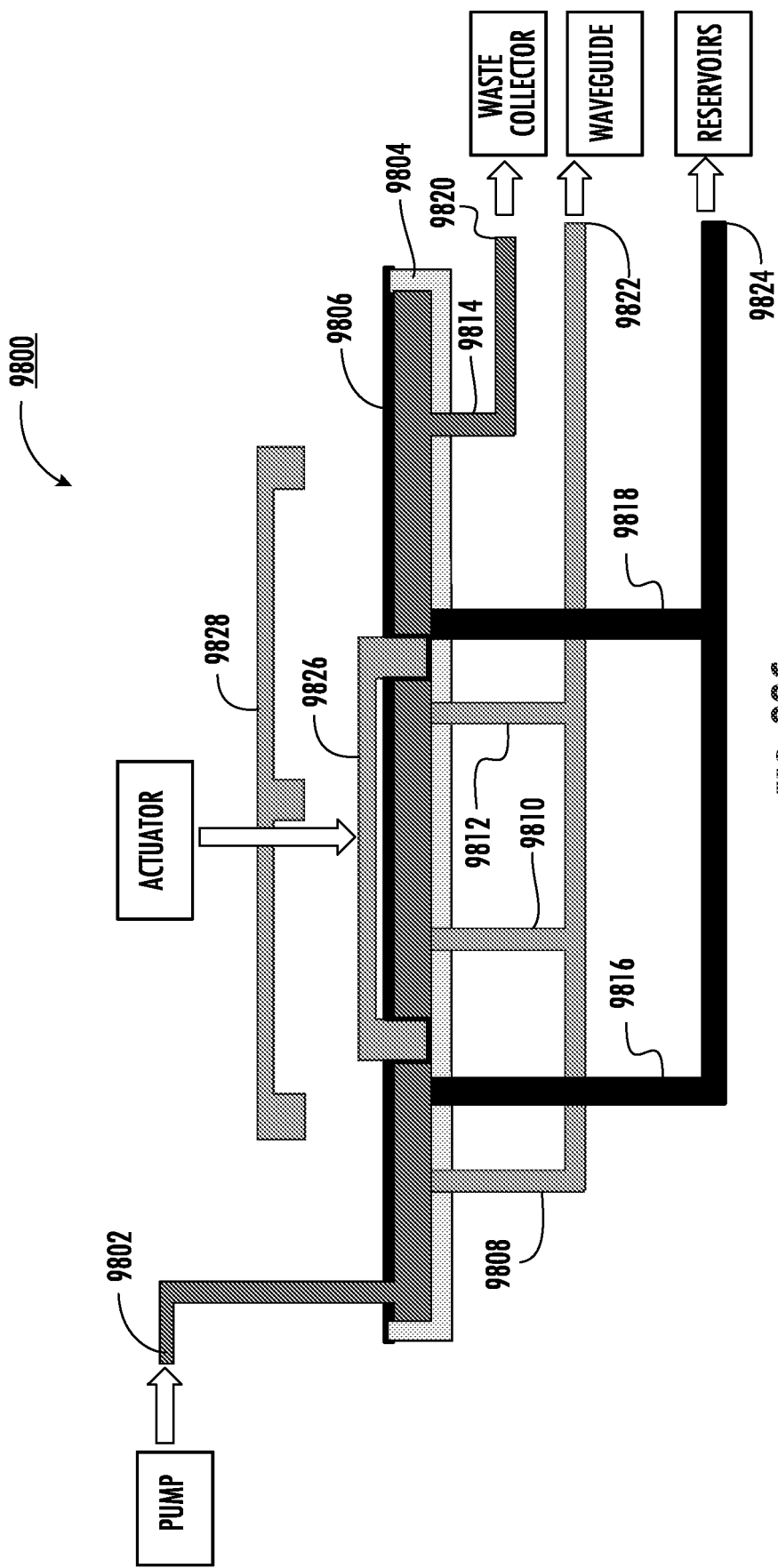
Figure 99A:
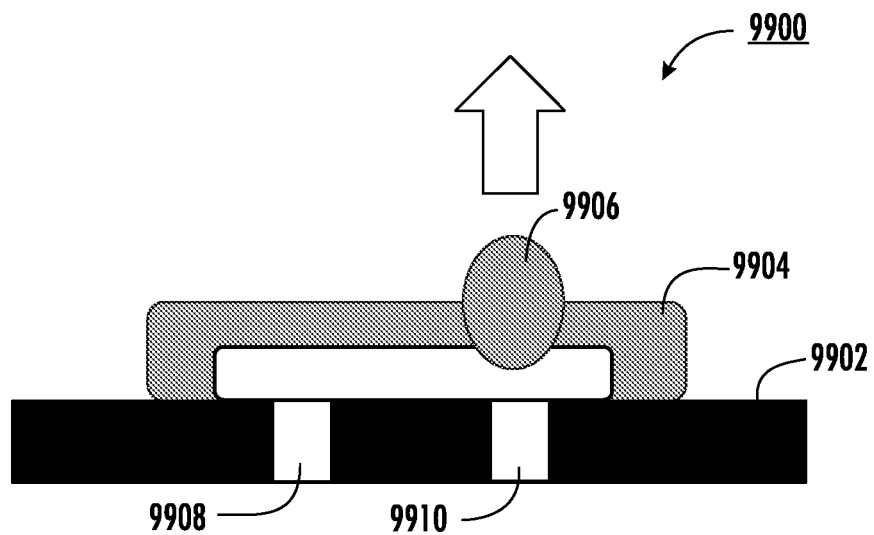
Figure 99B:
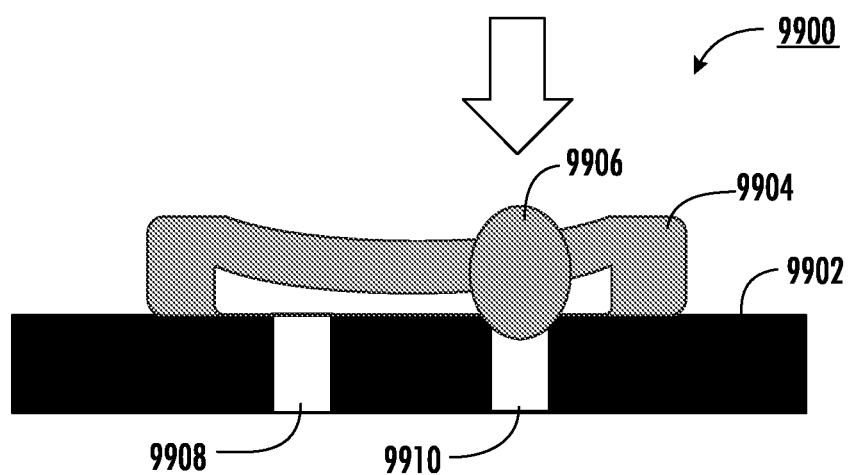
Figure 100A:
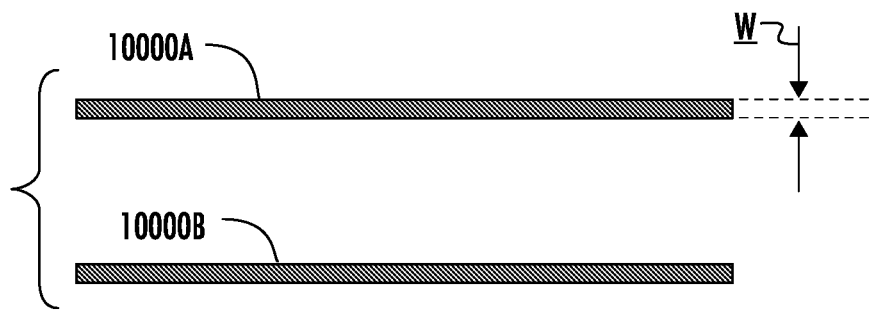
Figure 100B:
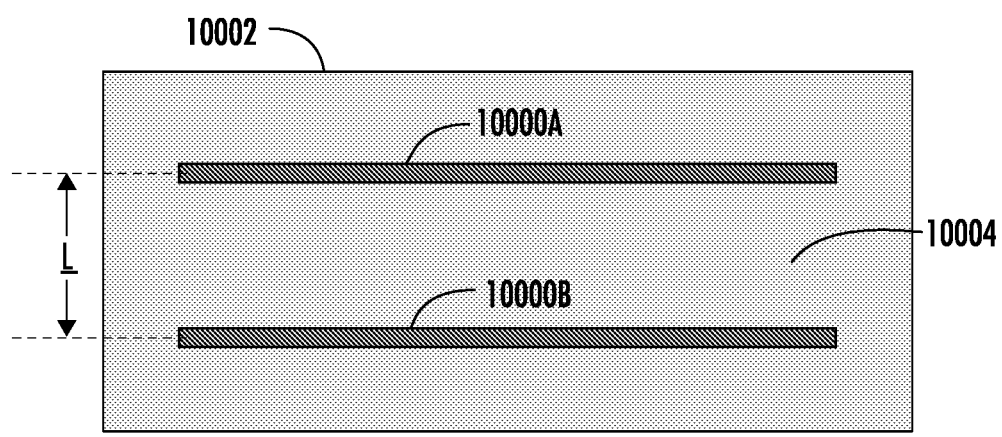
Figure 100C:
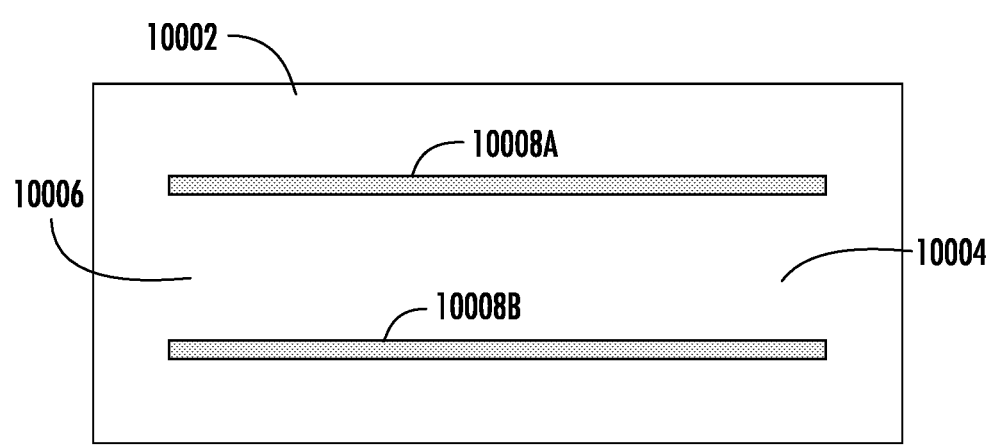
Figure 101:
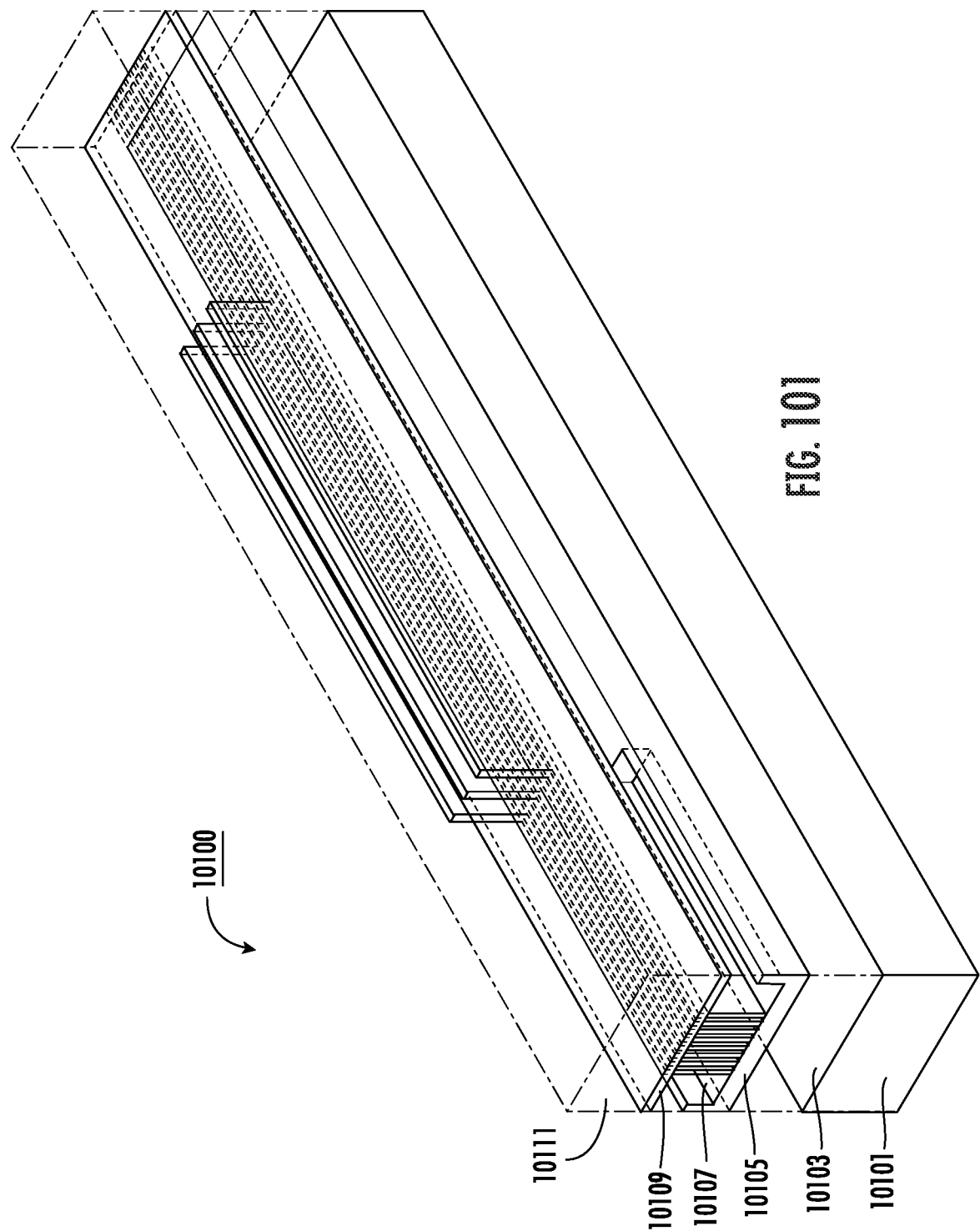
Figure 104A:
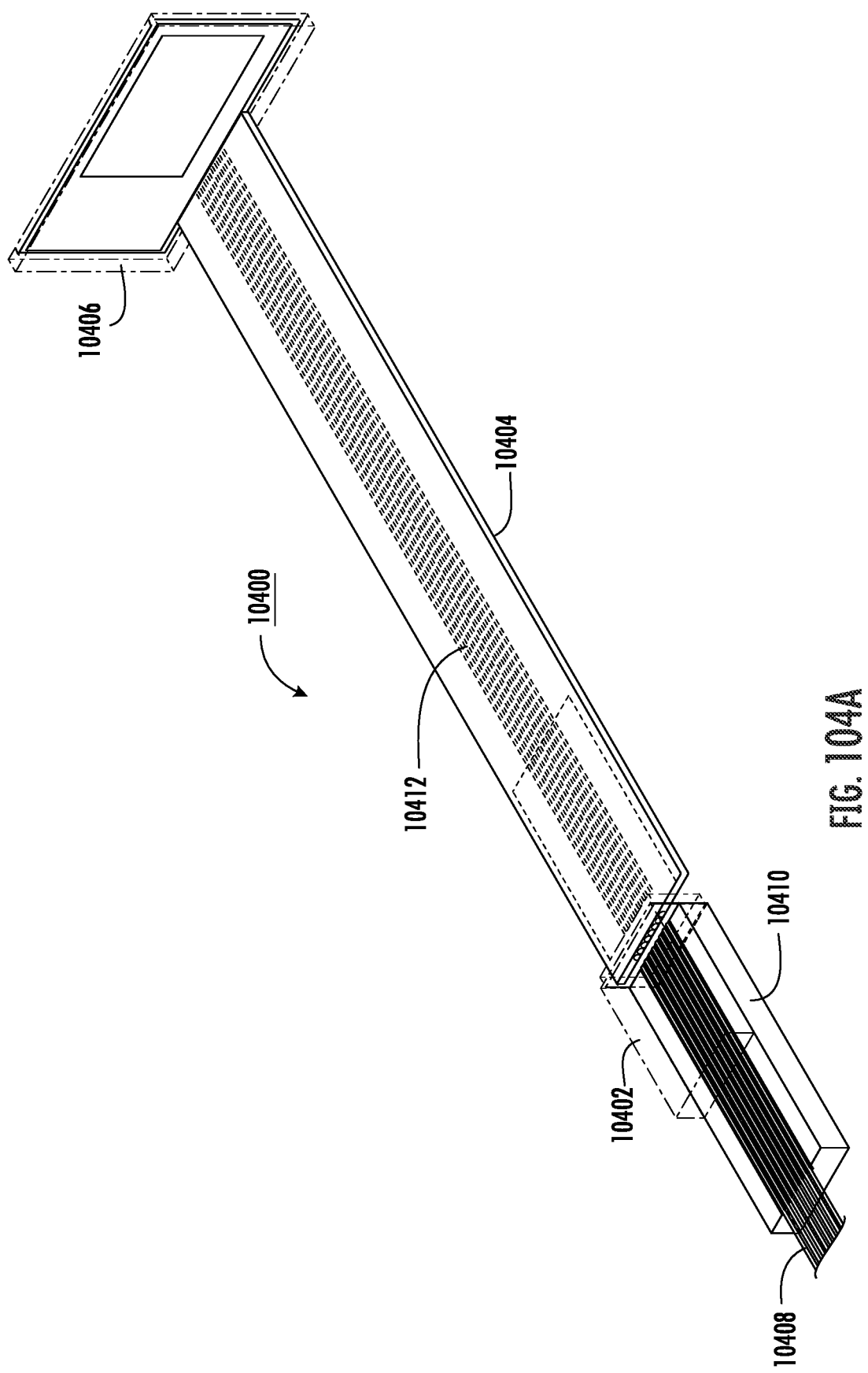
Figure 106A:
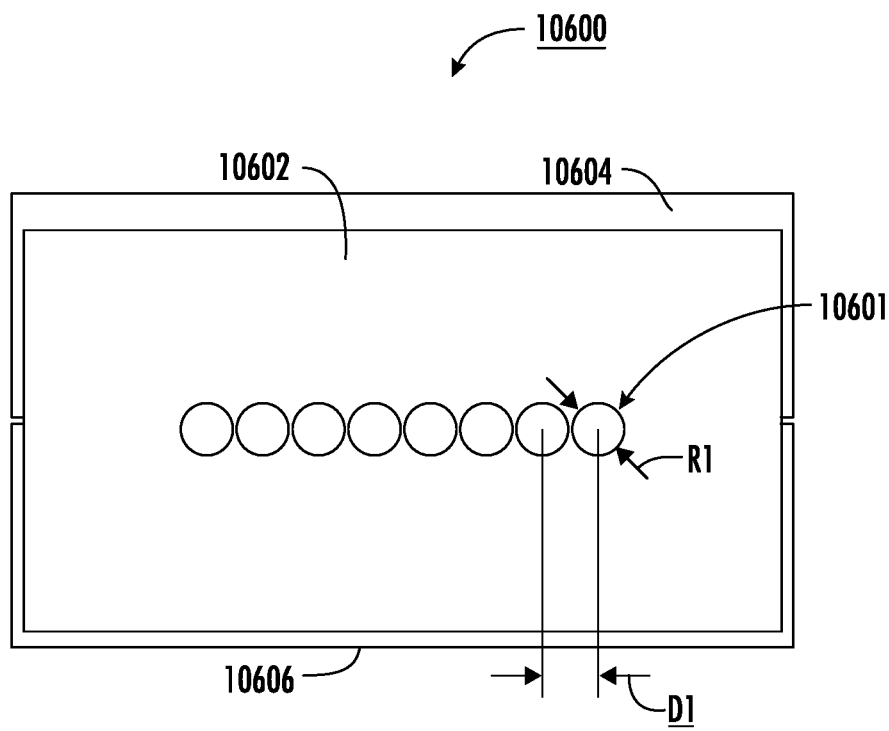
Figure 106B:
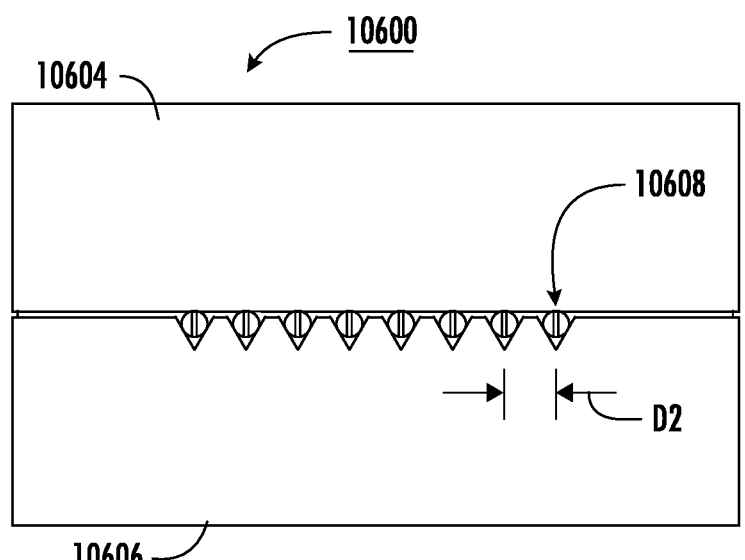
Figure 107:
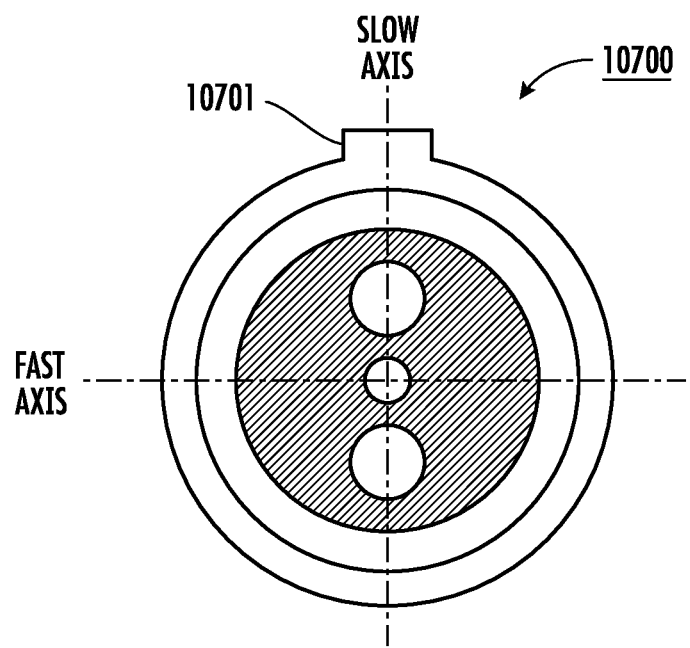
Figure 108:
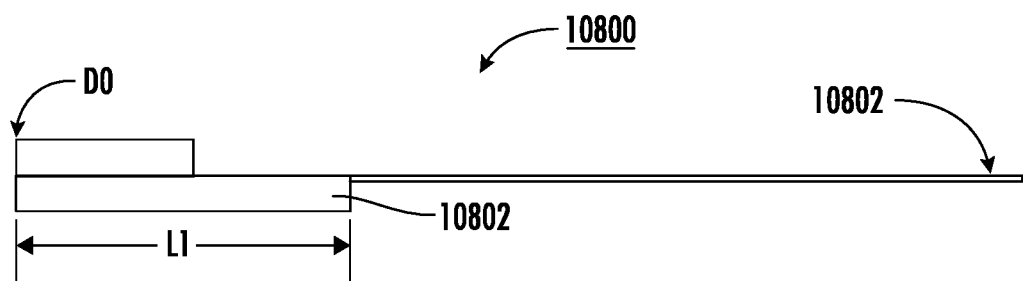
Figure 109A:
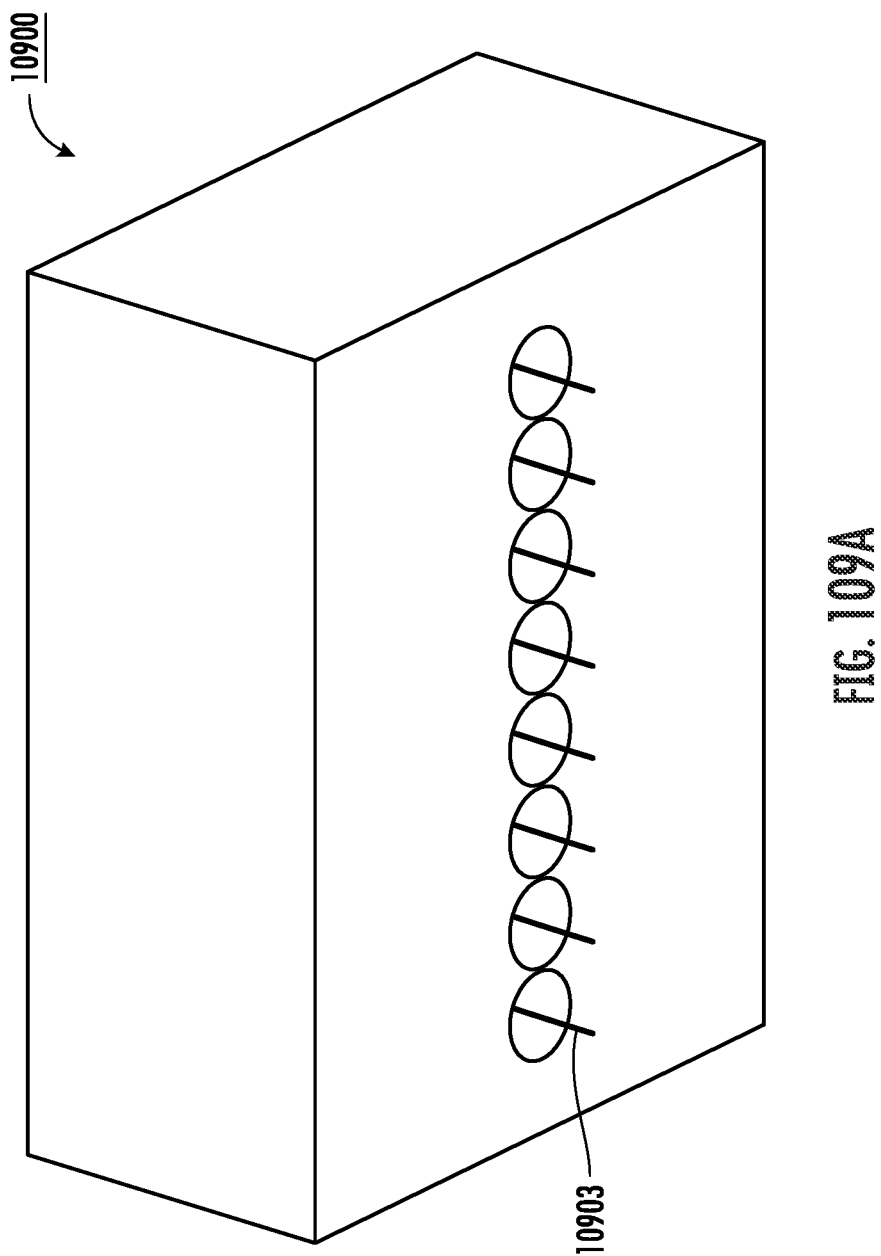
Figure 109B:
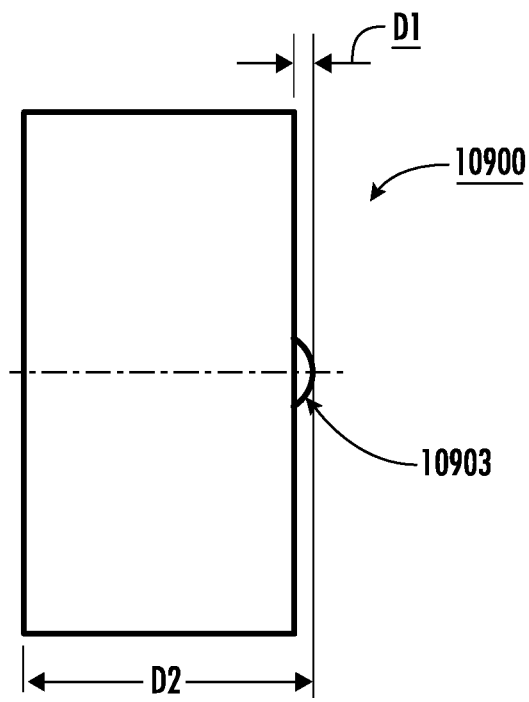
Figure 109C:
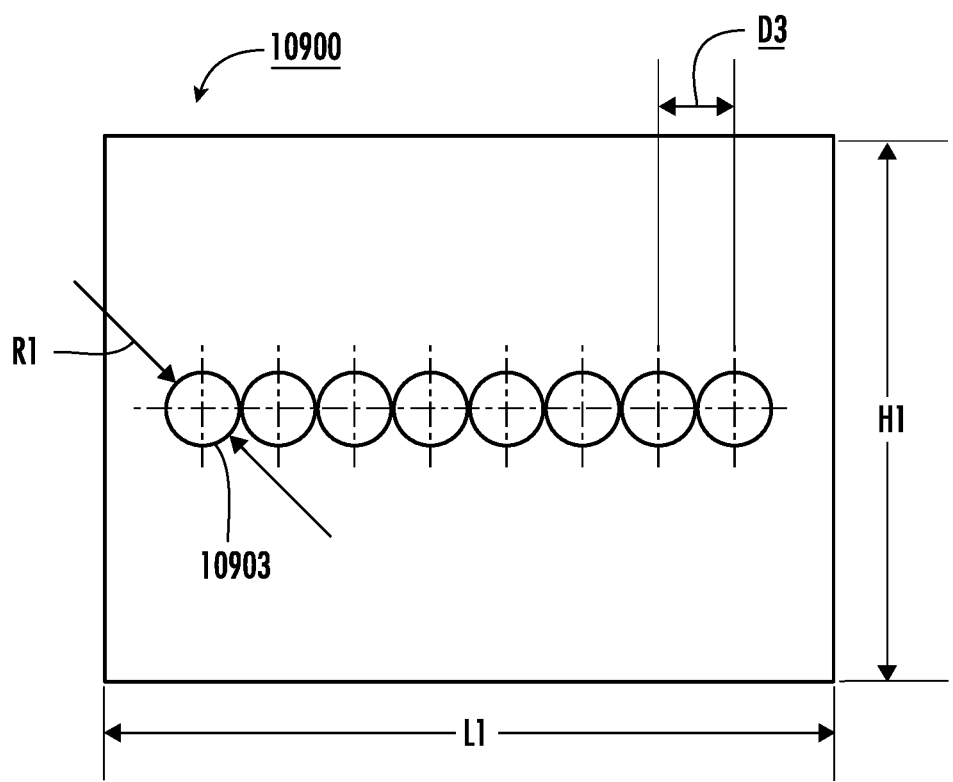
Figure 110:
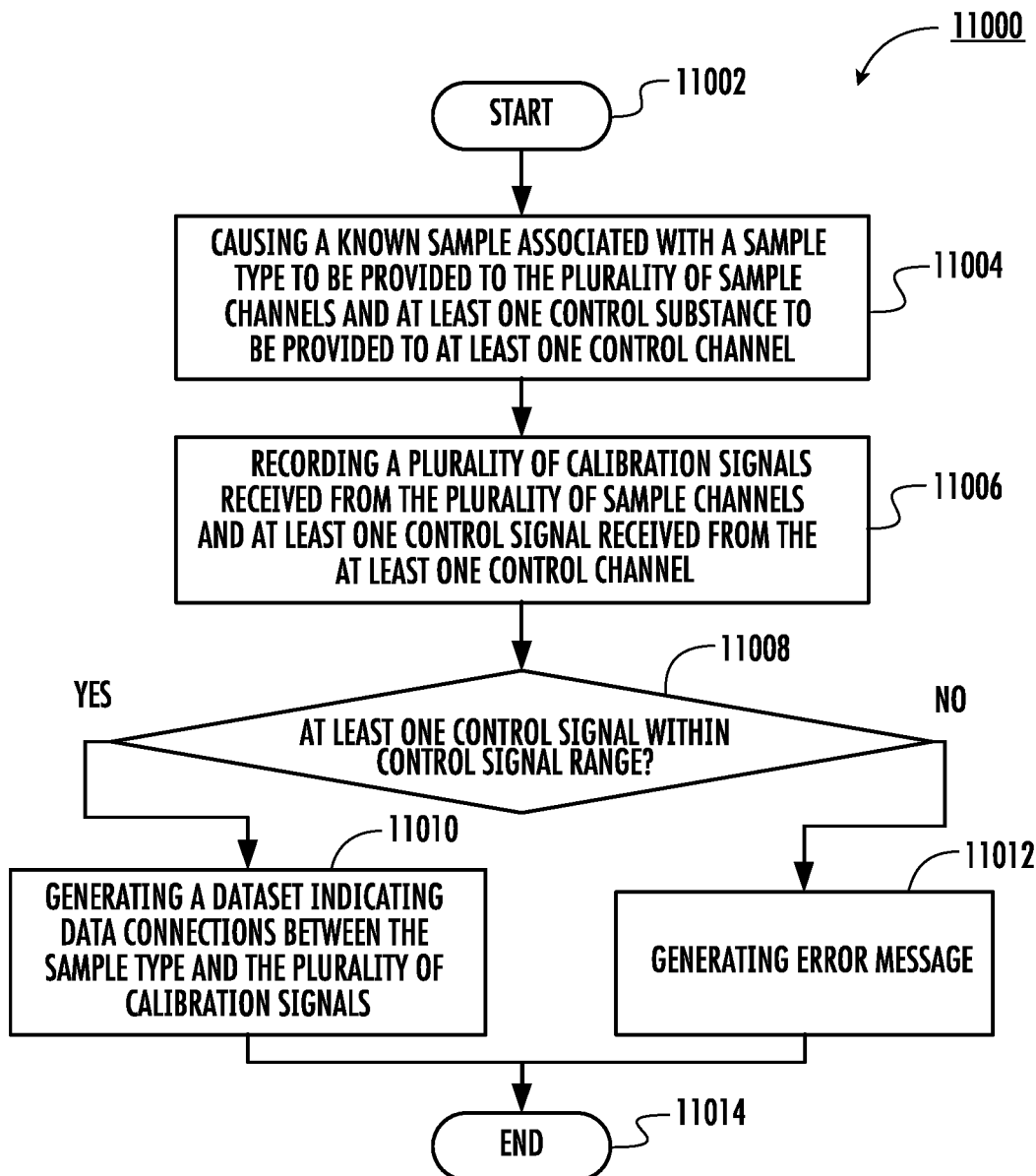
Figure 111:
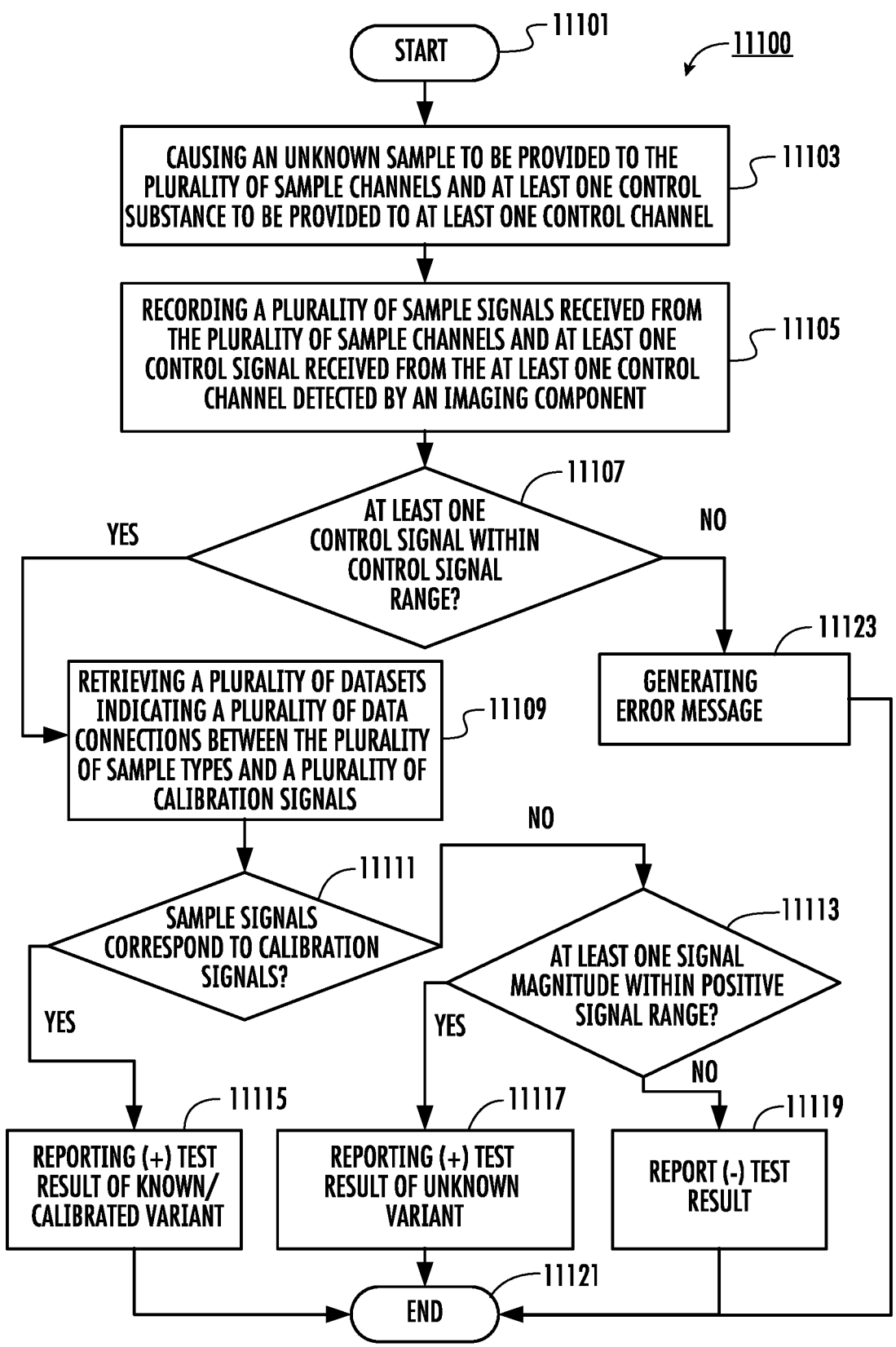
Figure 113A:
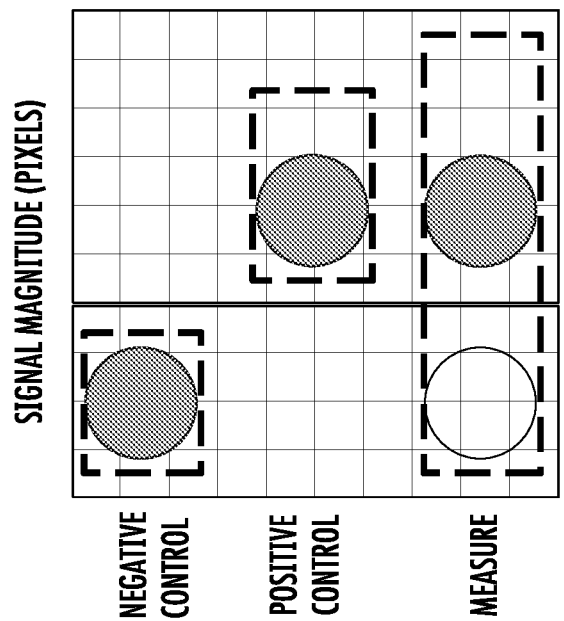
Figure 113B:
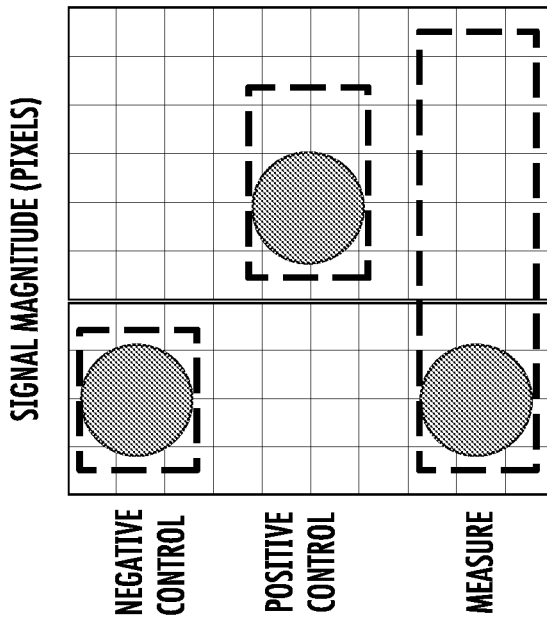
Figure 114A:
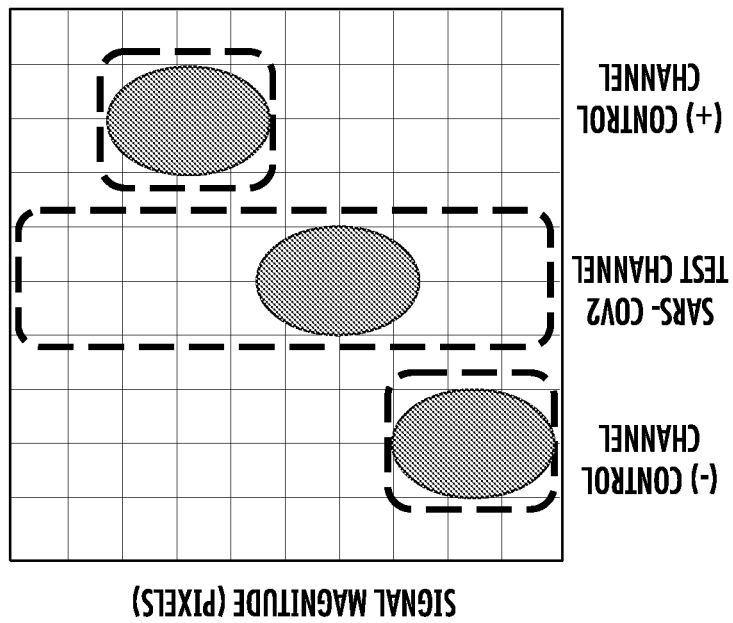
Figure 114B:
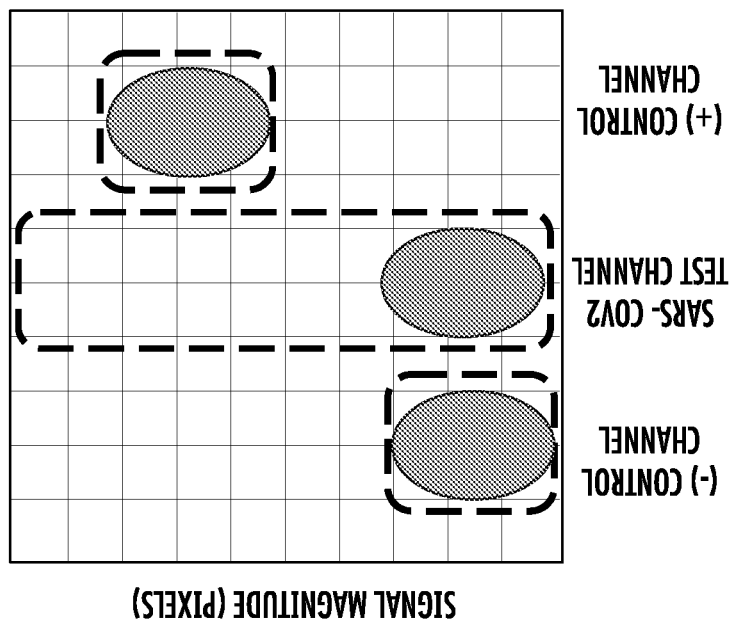
Figure 115A:
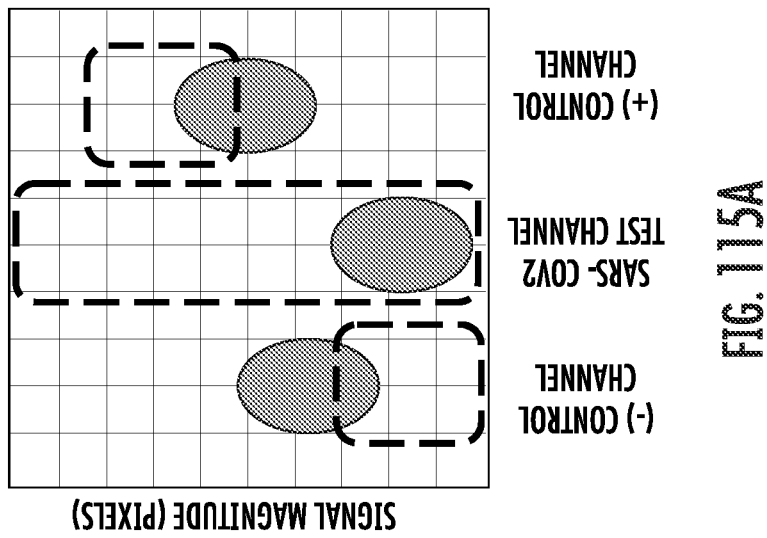
Figure 115B:
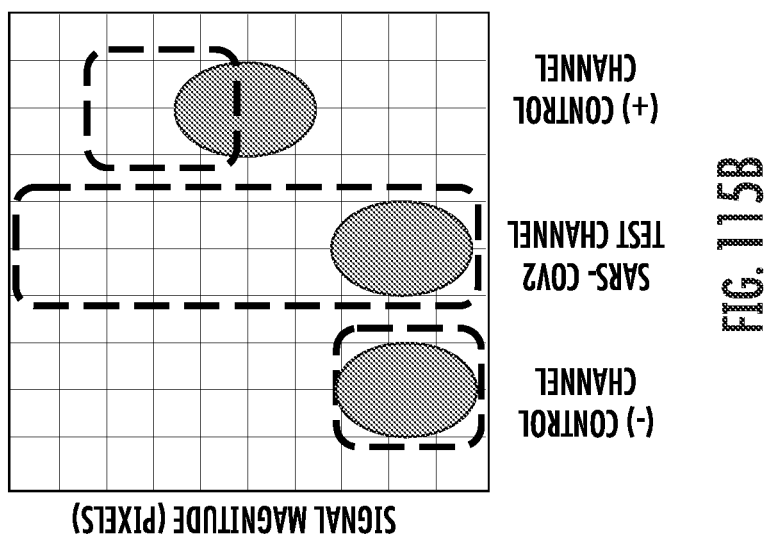
Figure 115C:
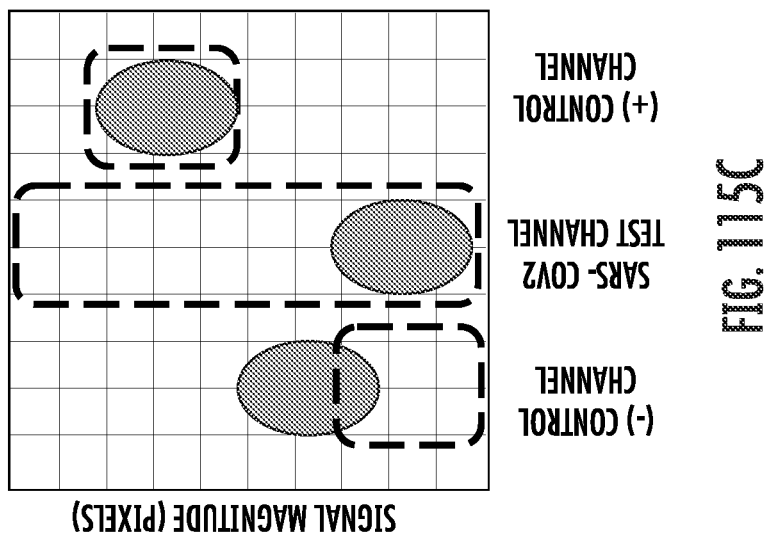
Figure 116:
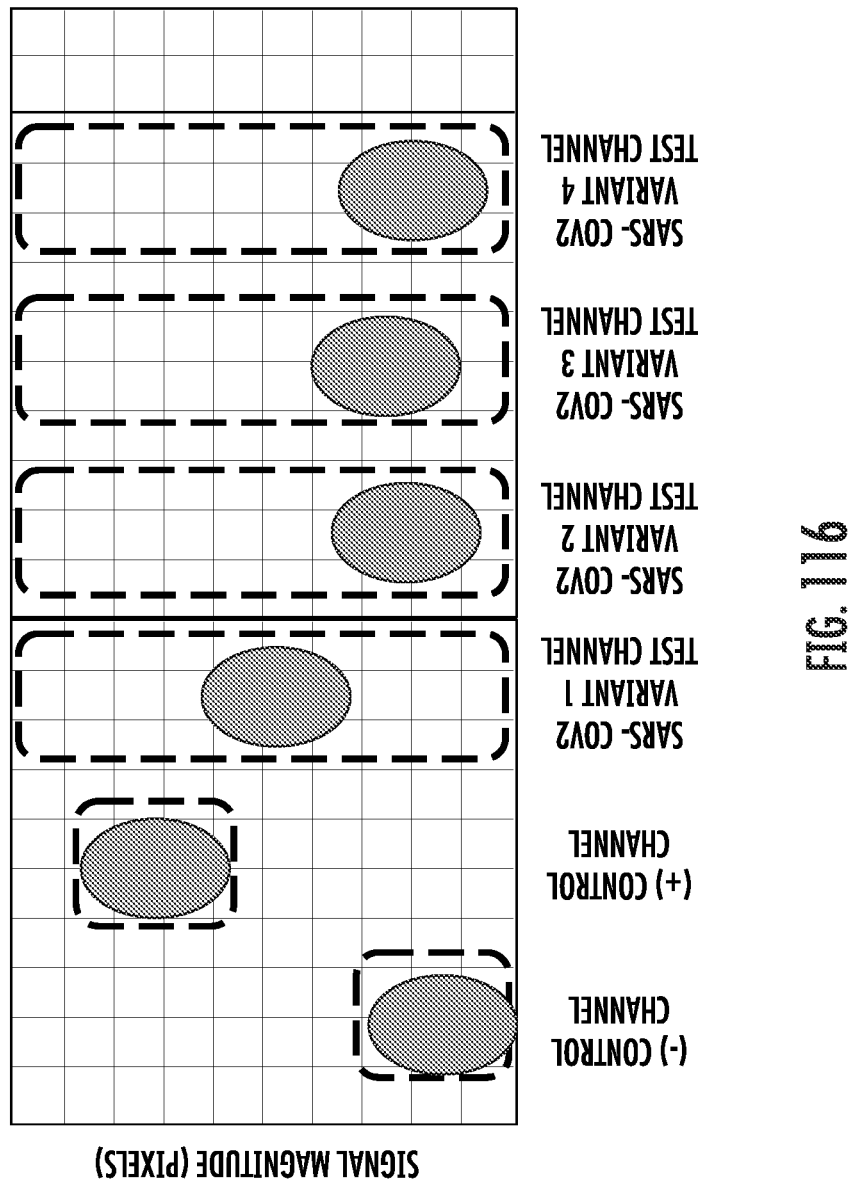
Figure 117:
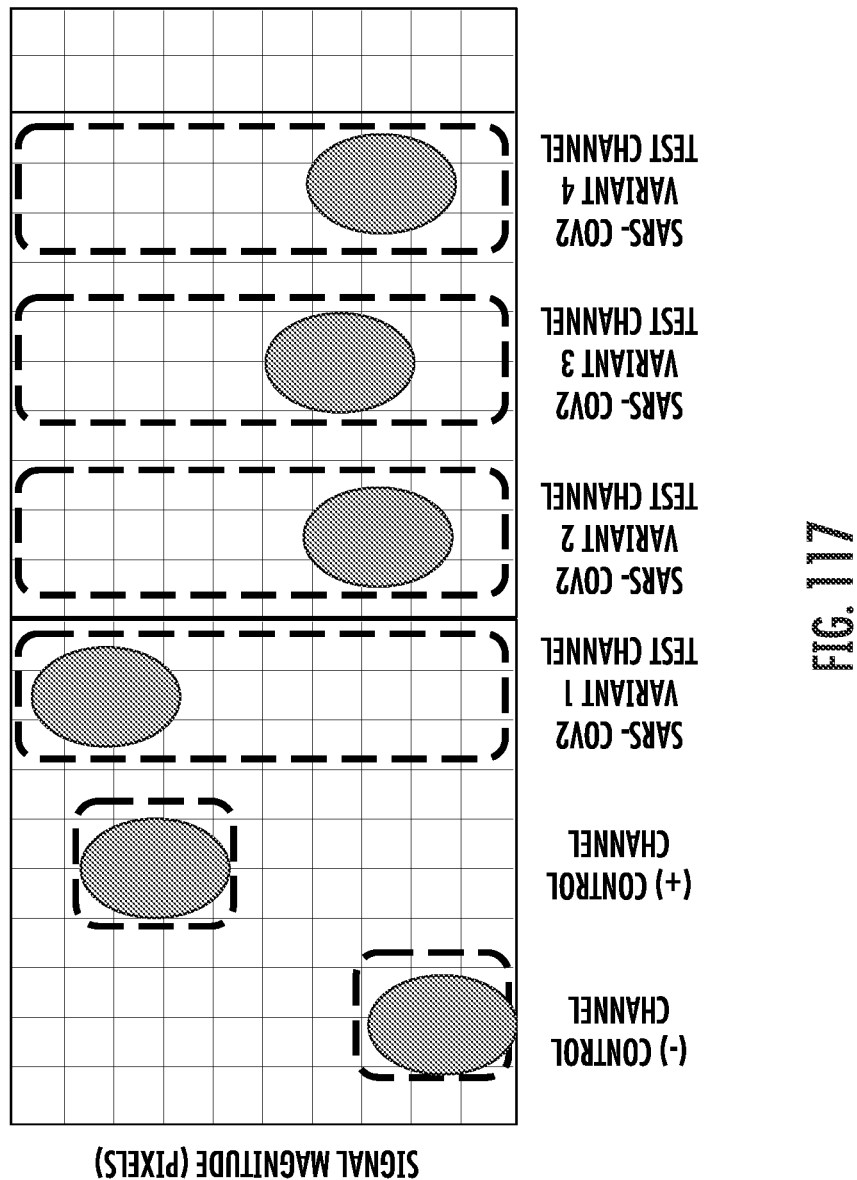
Figure 118:
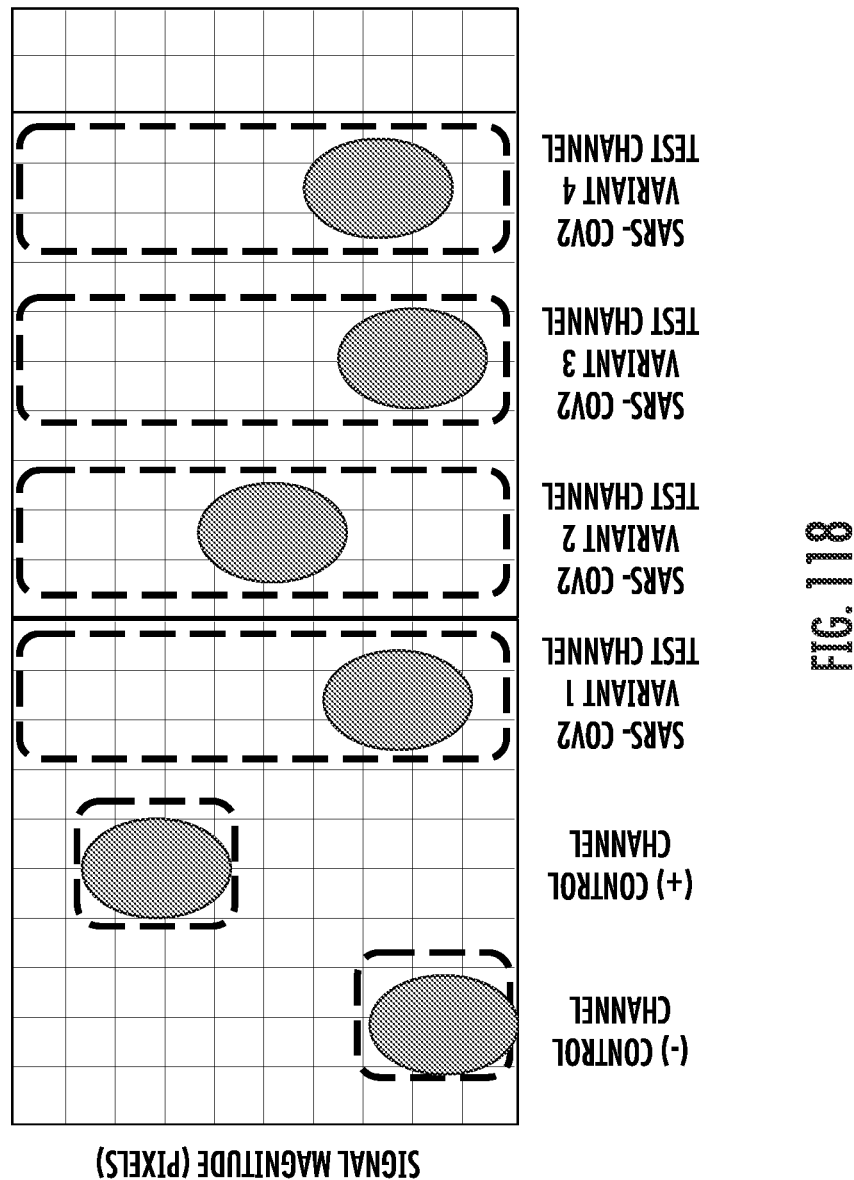
Figure 119:
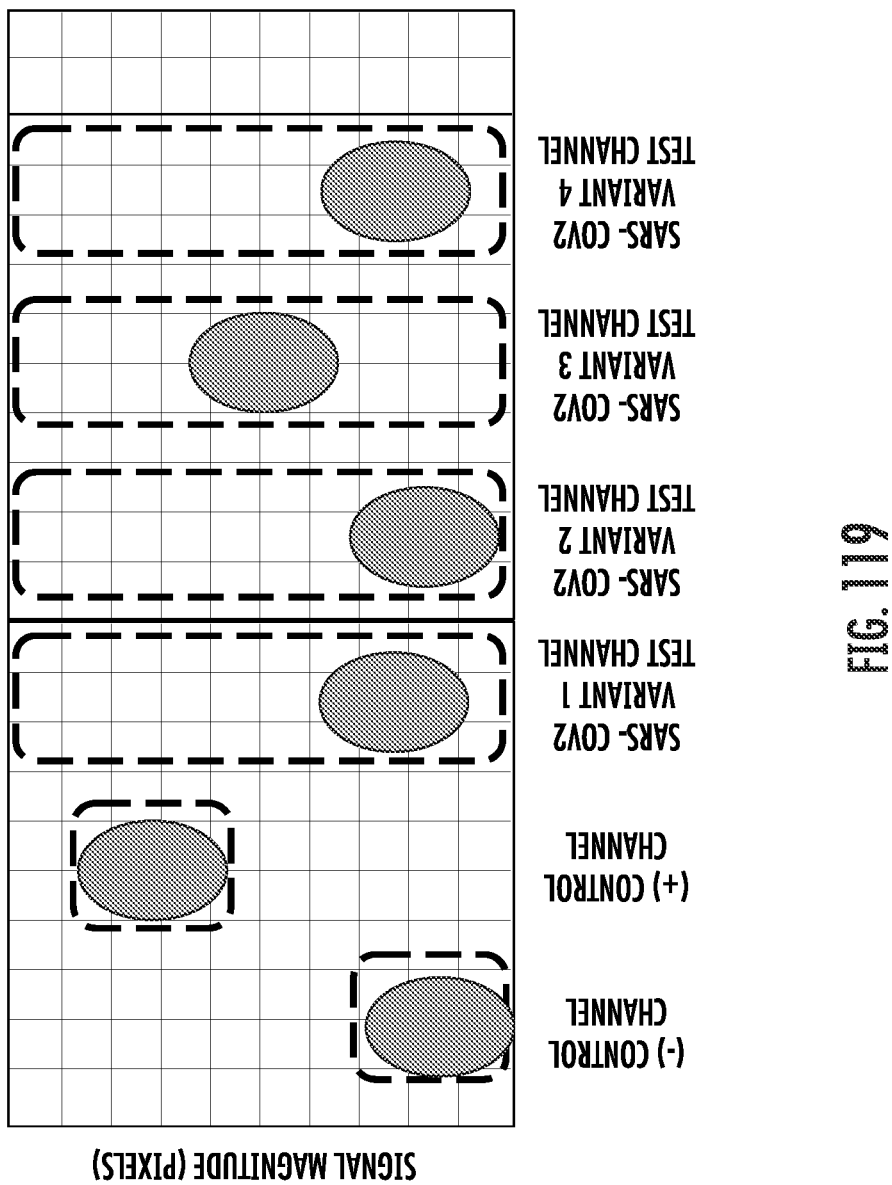
Figure 120:
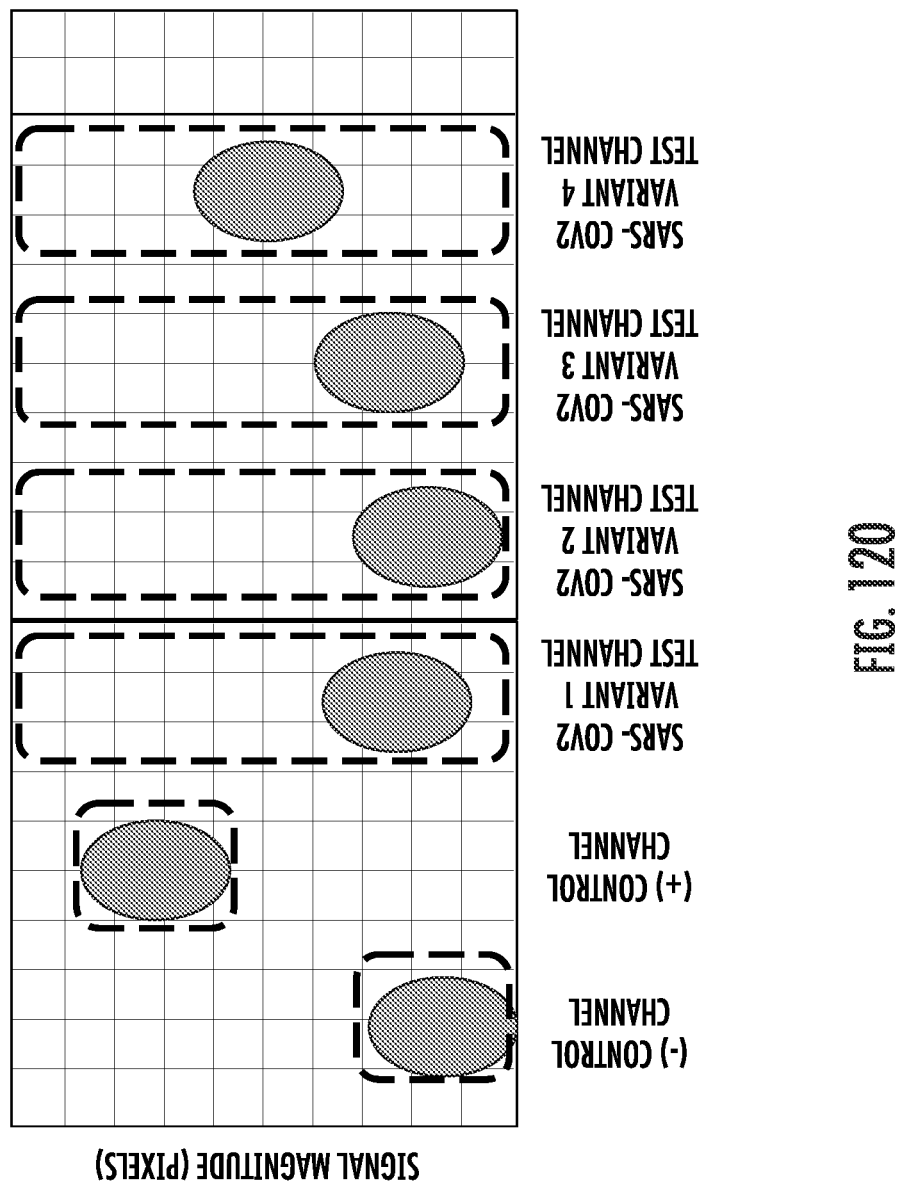
Figure 121:
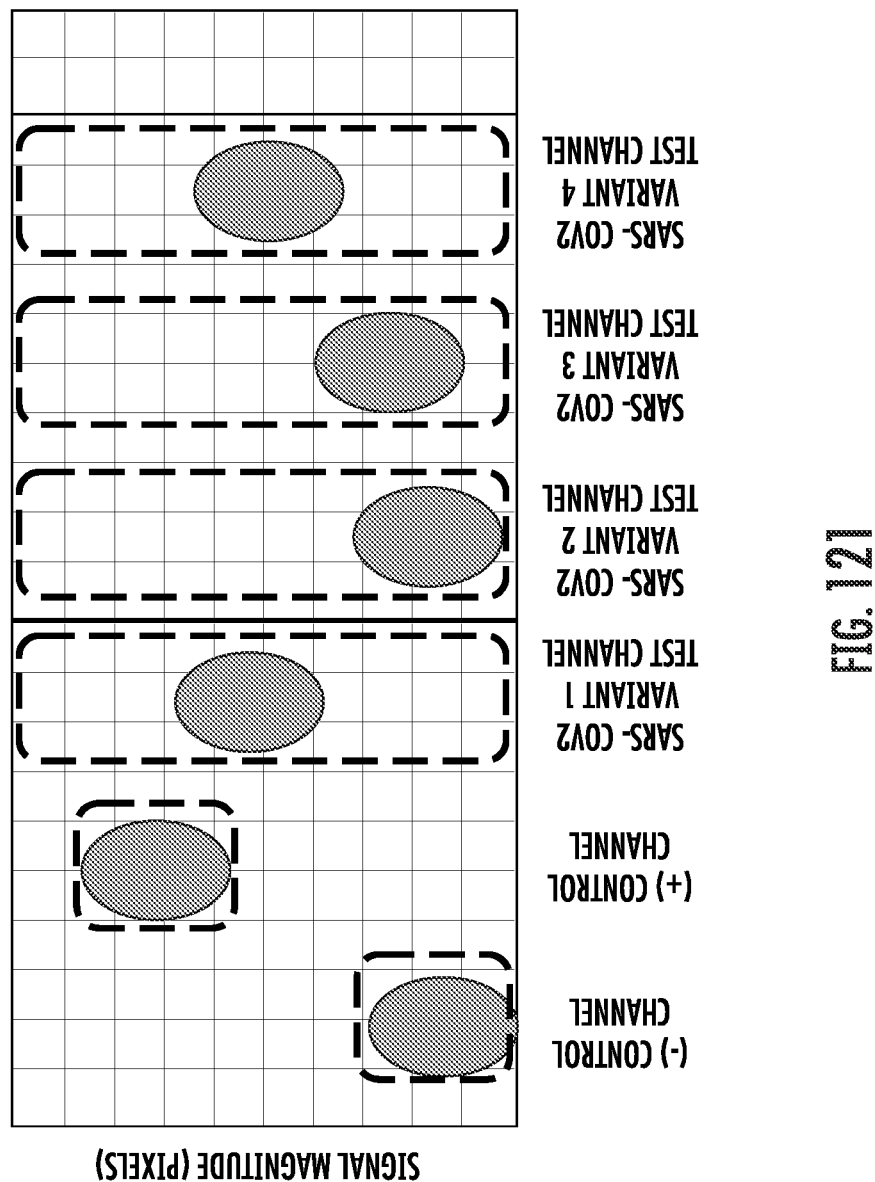
Figure 122:
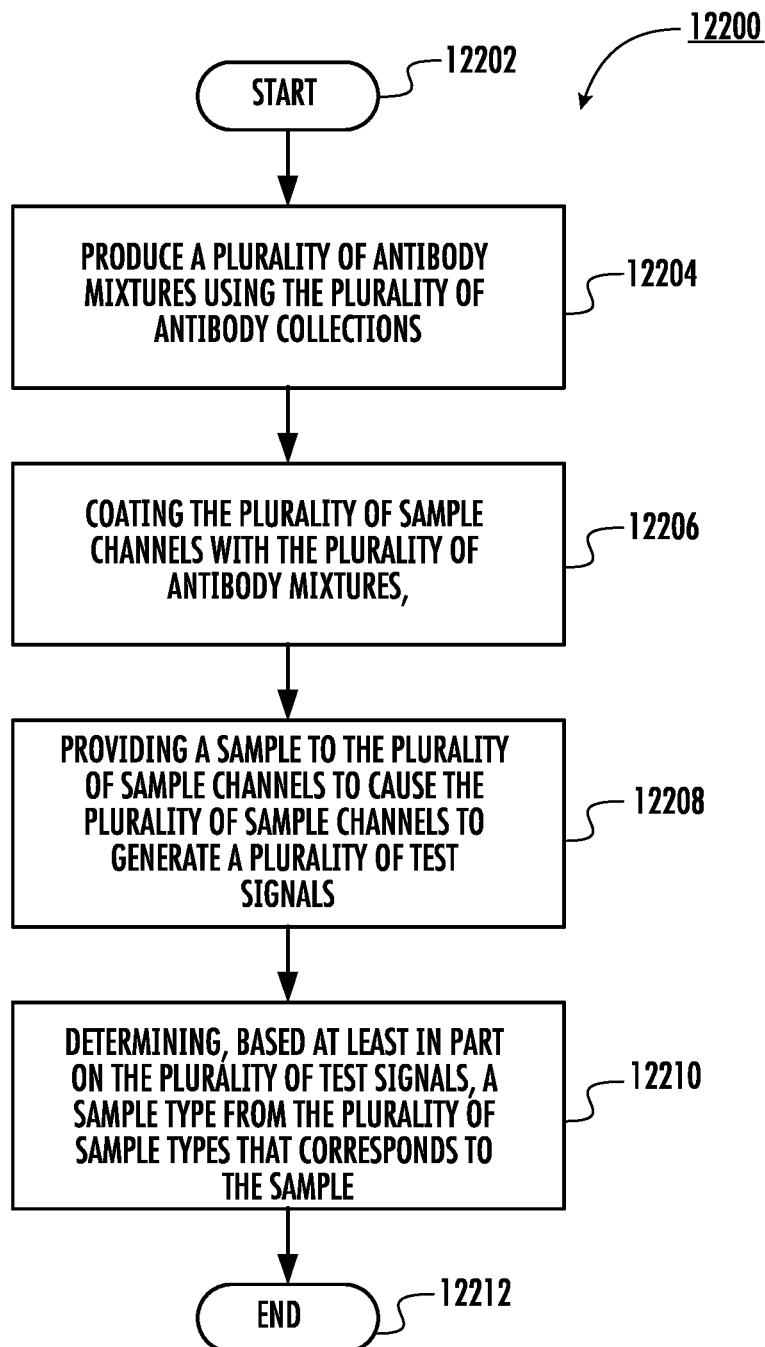
Figure 123:
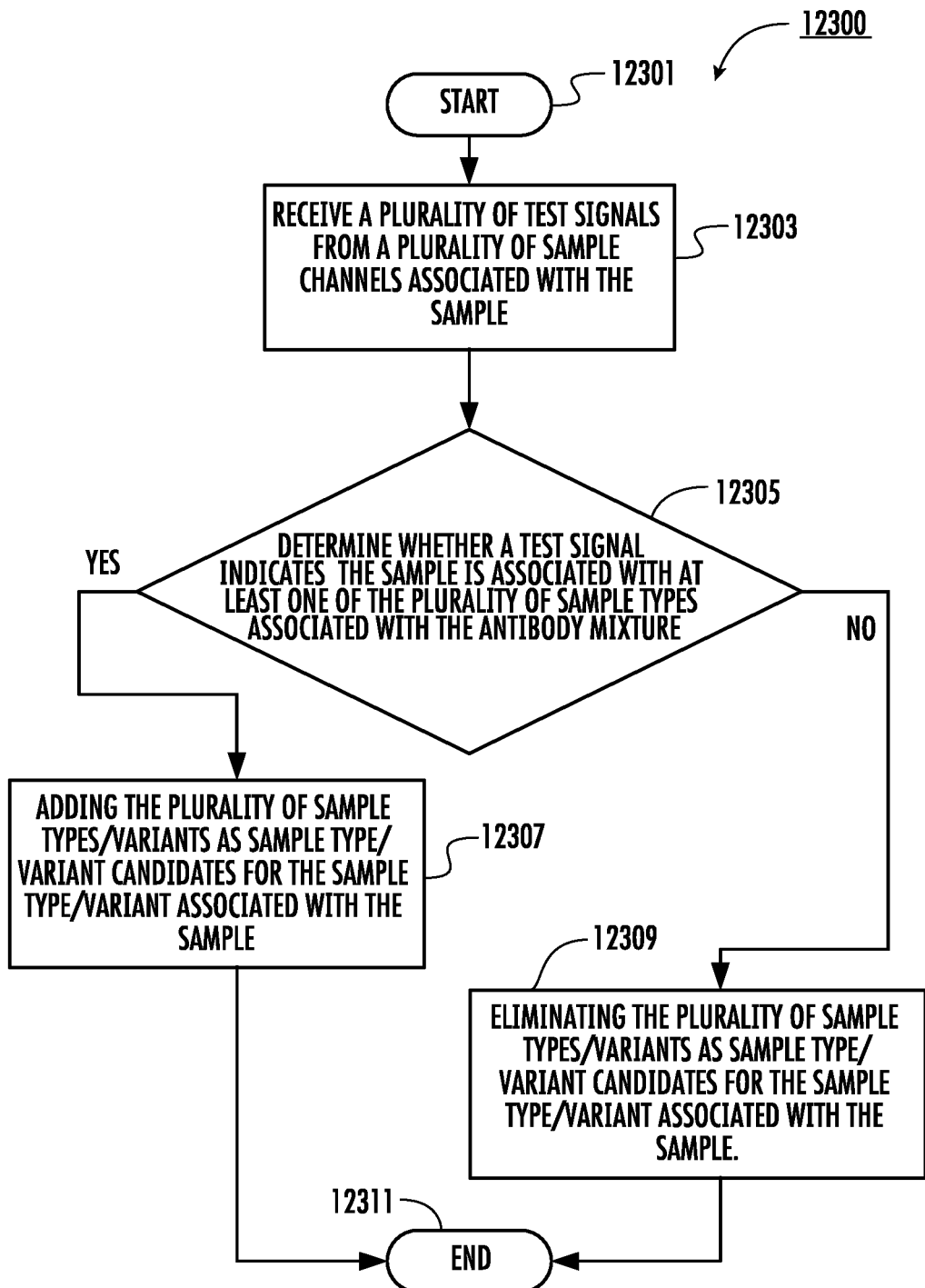
Figure 124A:
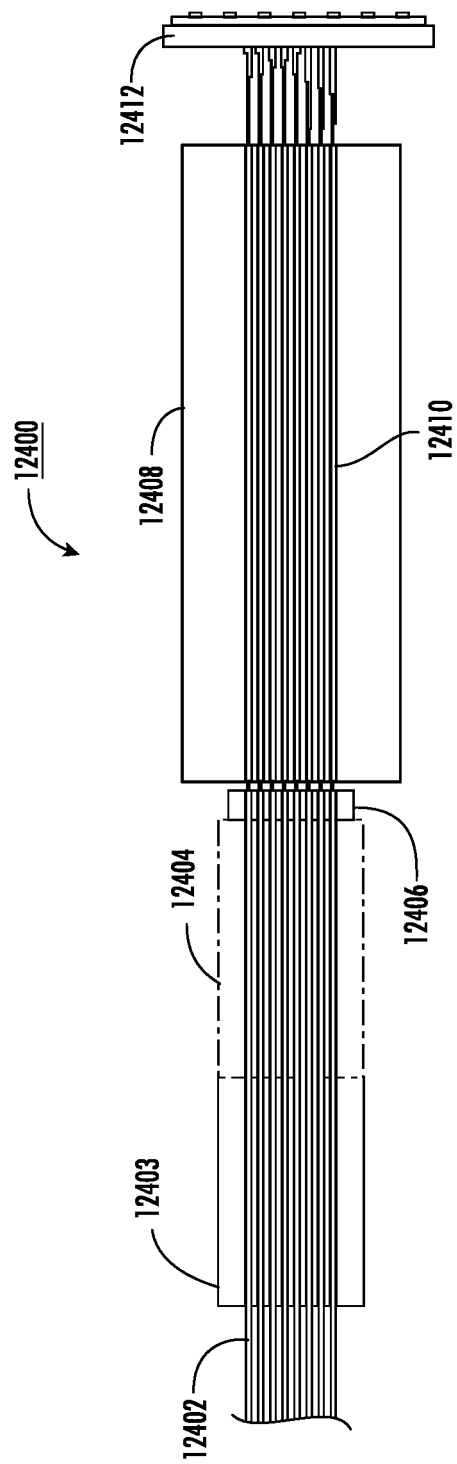
Figure 124B:
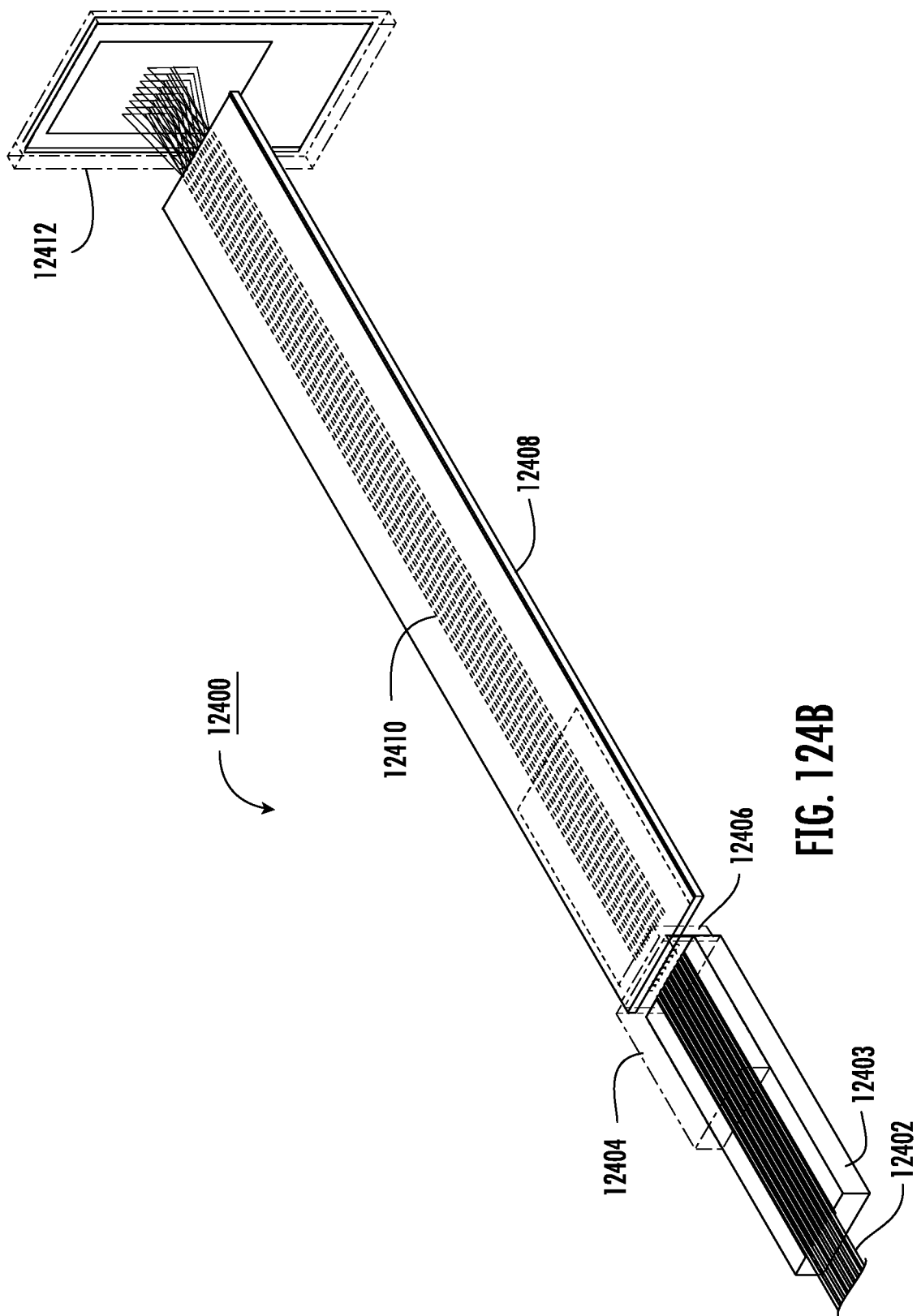
Figure 124C:
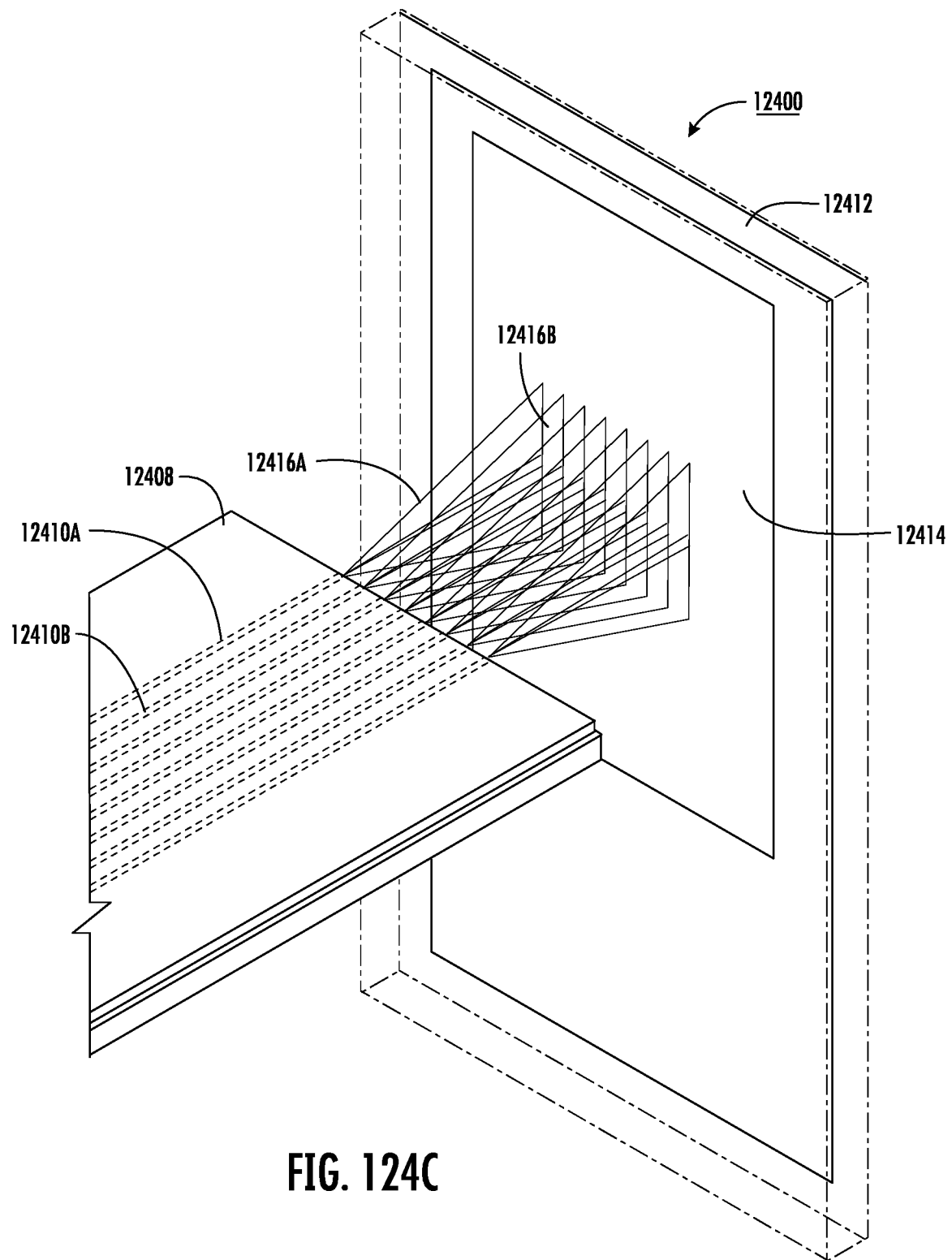
Figure 125A:
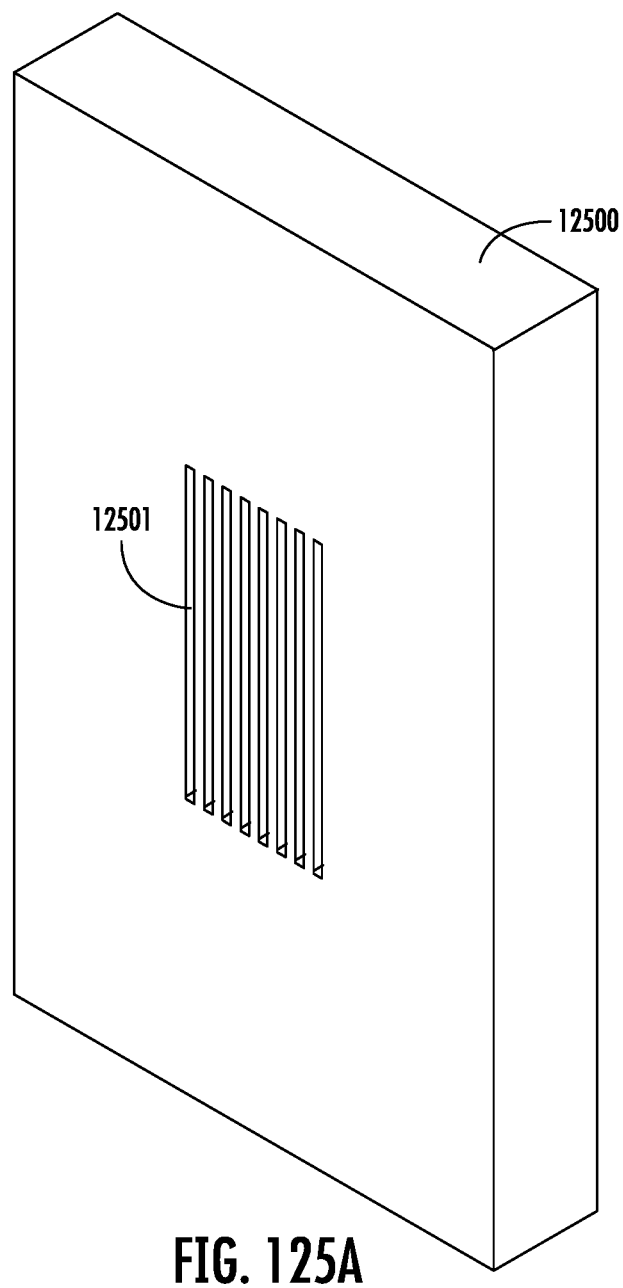
Figure 125B:
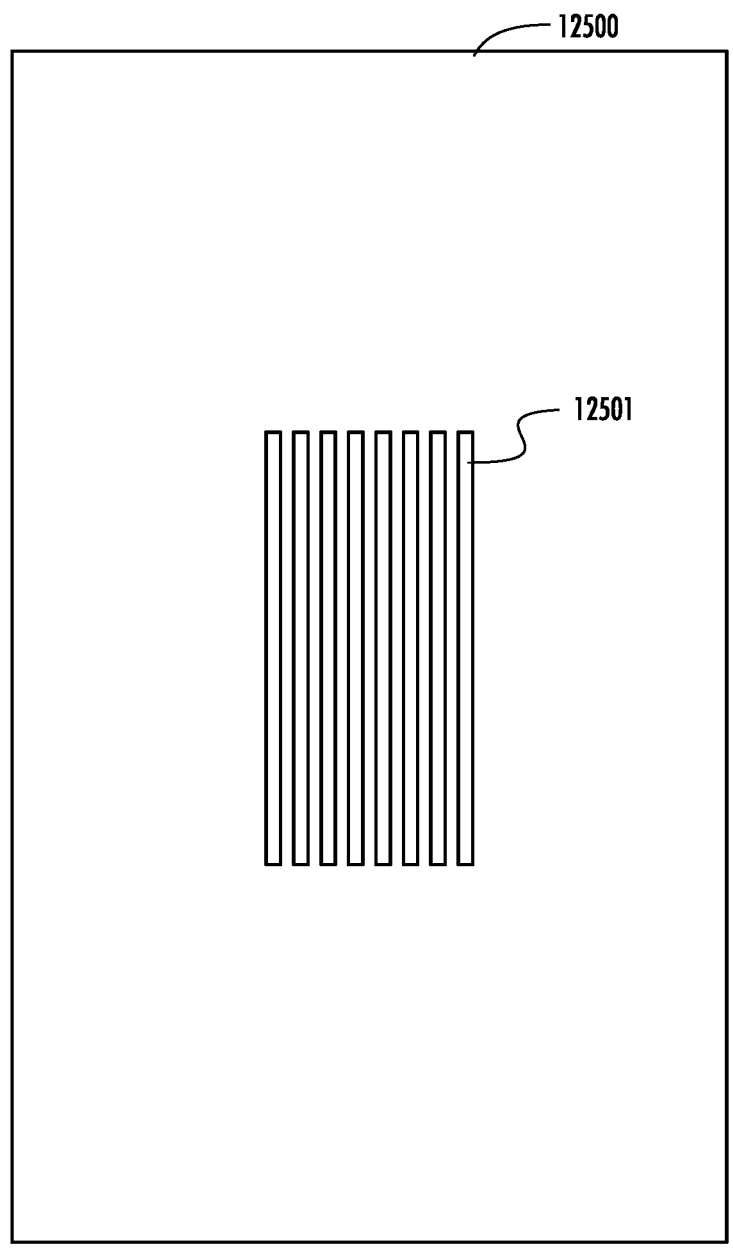
Figure 126A:
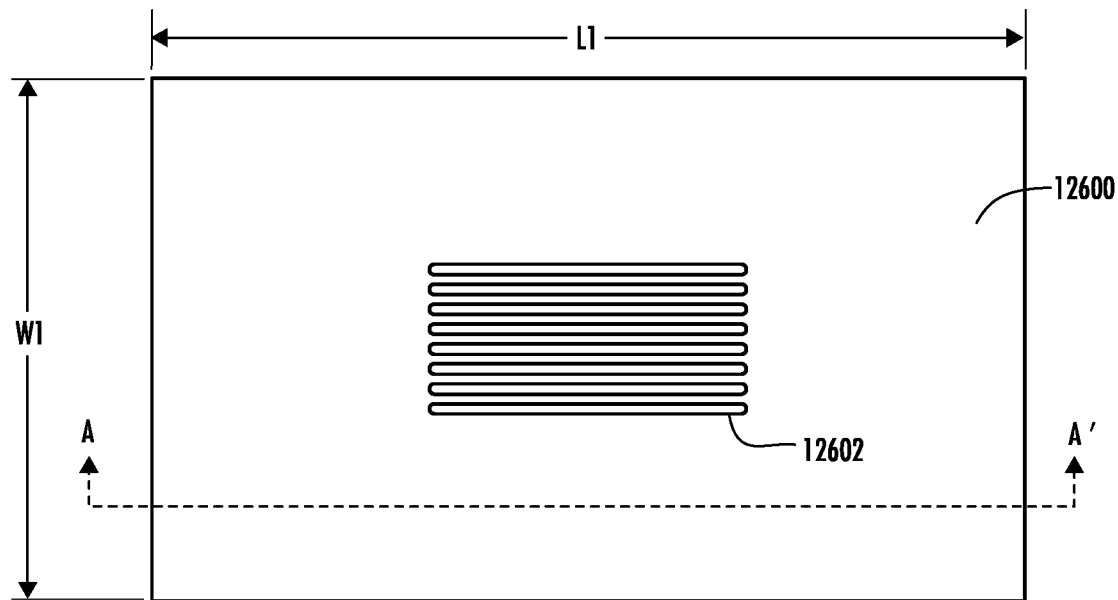
Figure 126B:
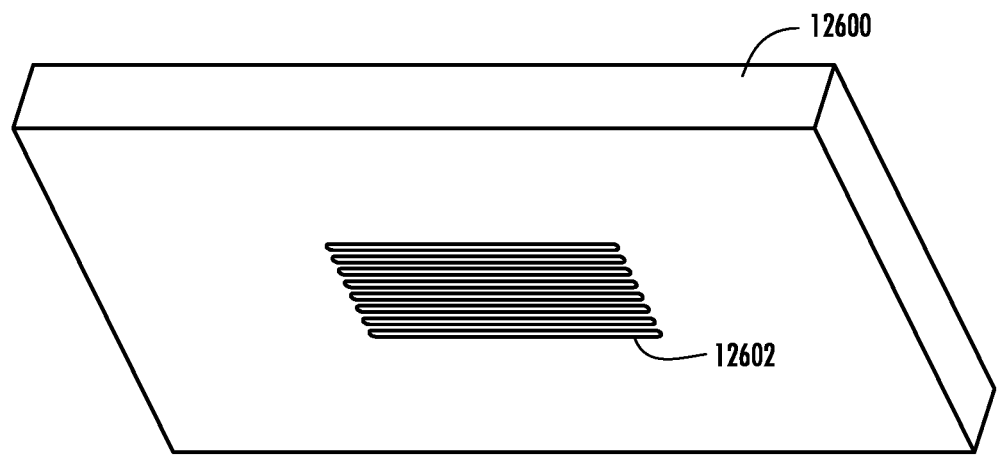
Figure 126C:
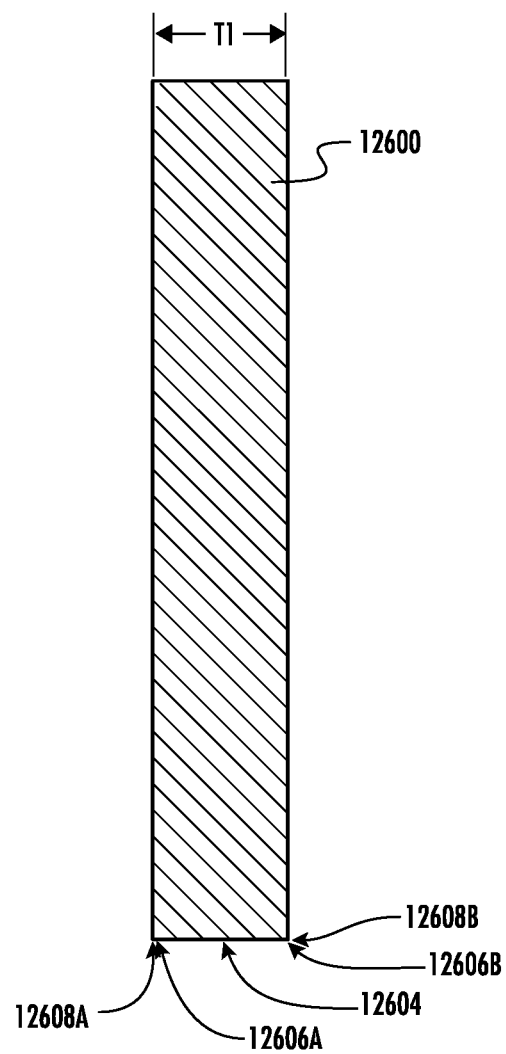
Figure 127:
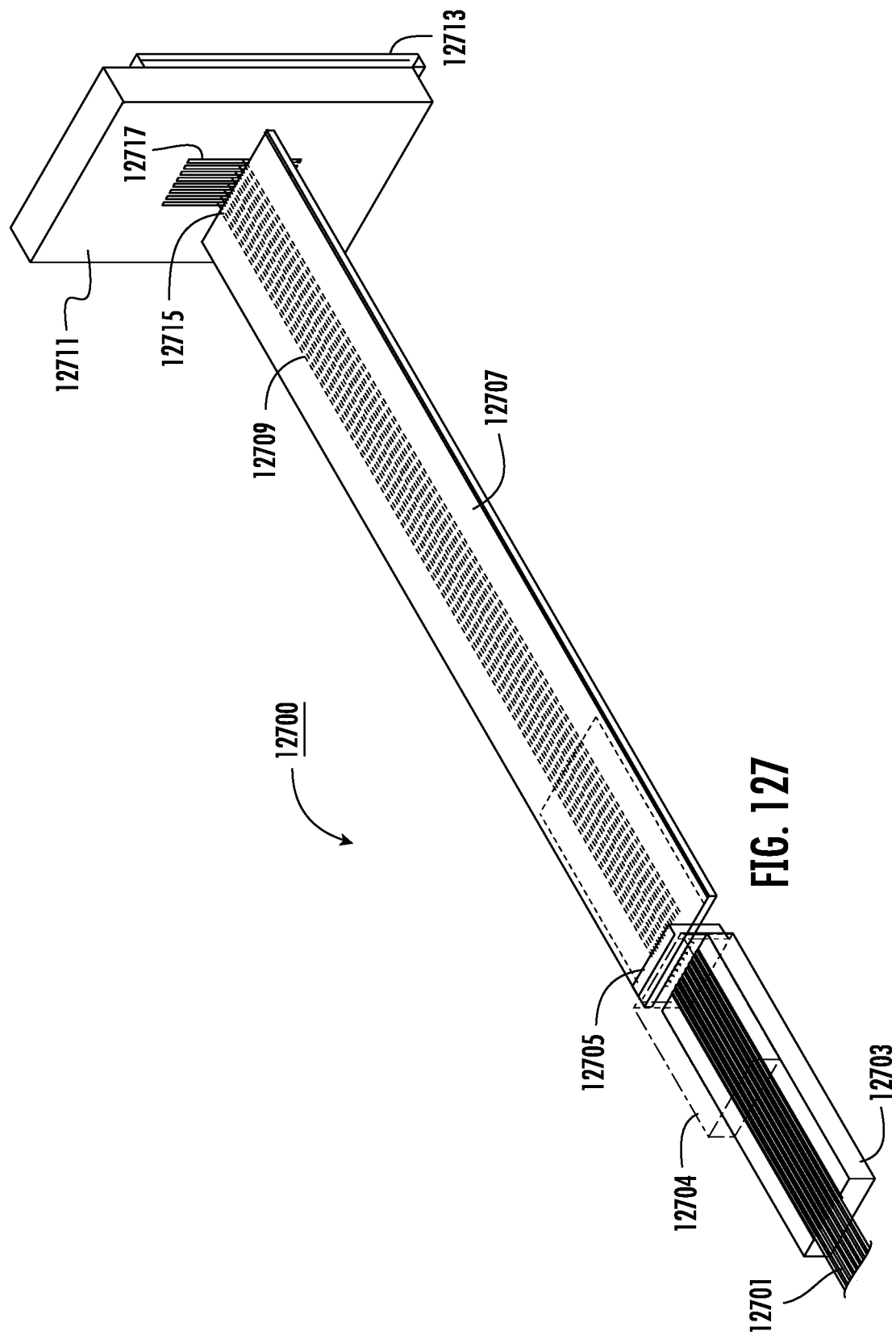
Figure 128:
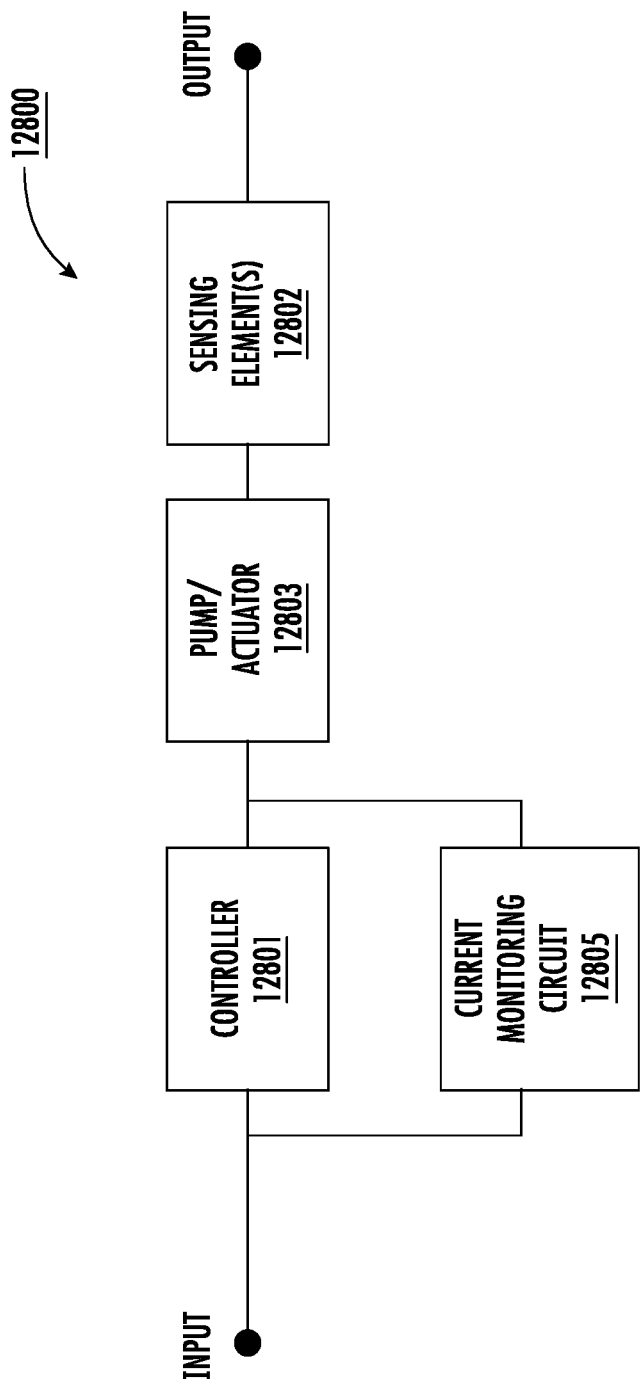
Figure 129:
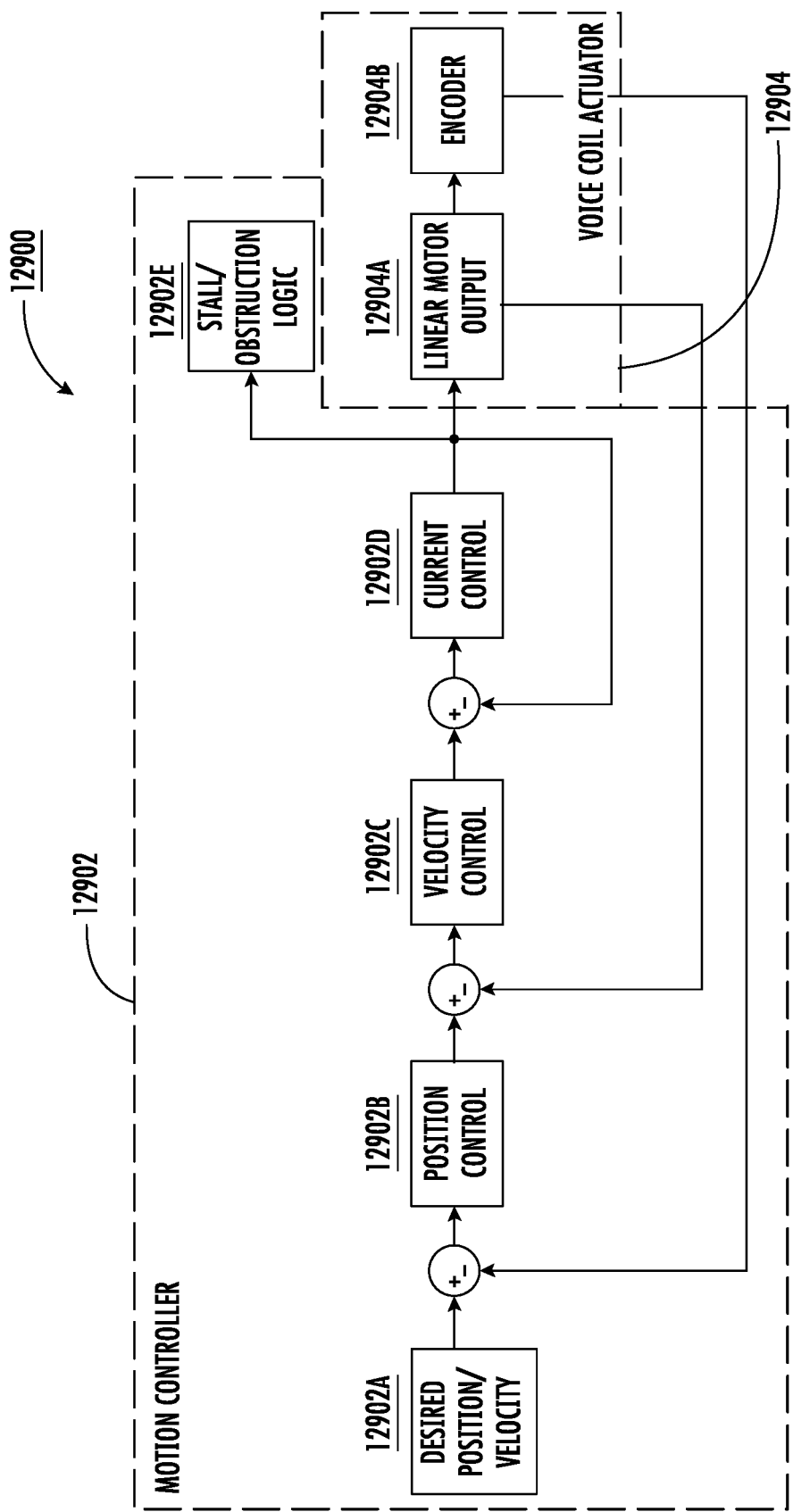
Figure 130:
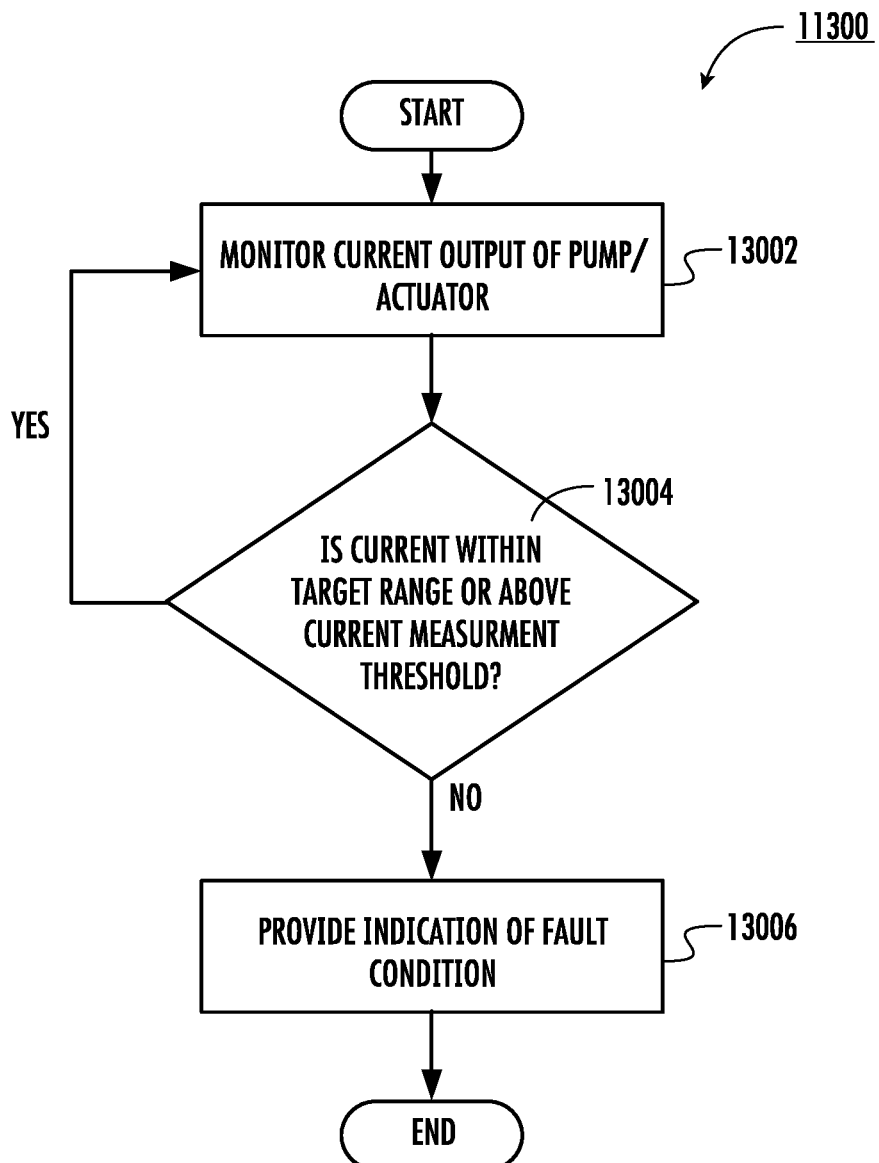
Figure 131:
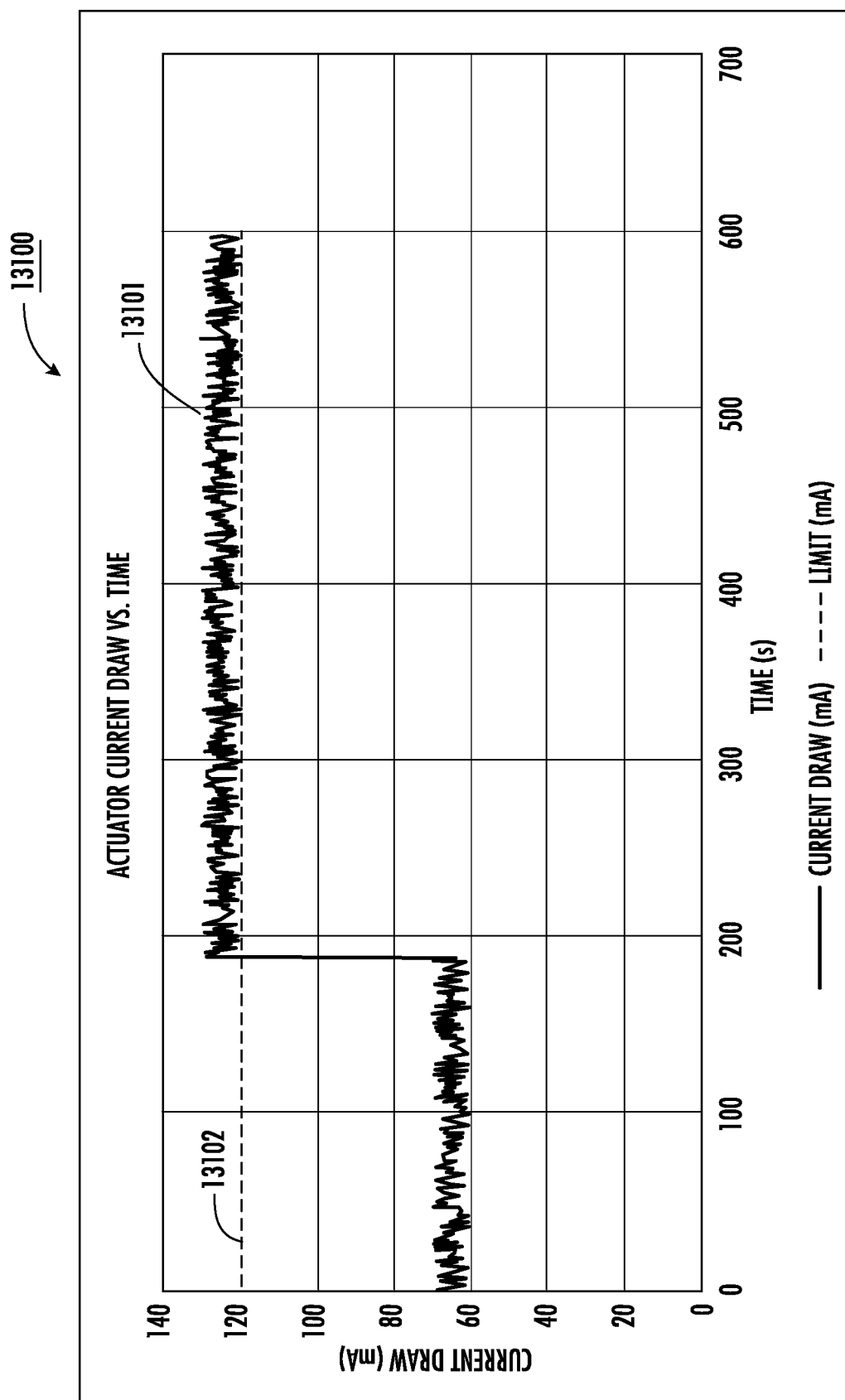
Figure 132:
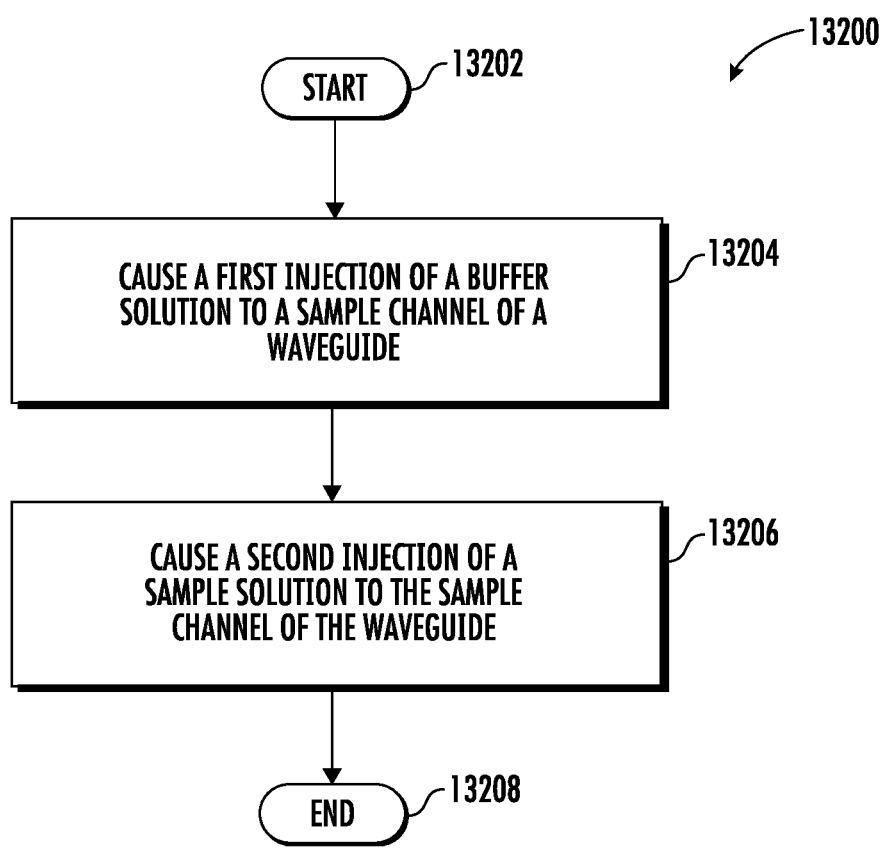
Figure 133A:
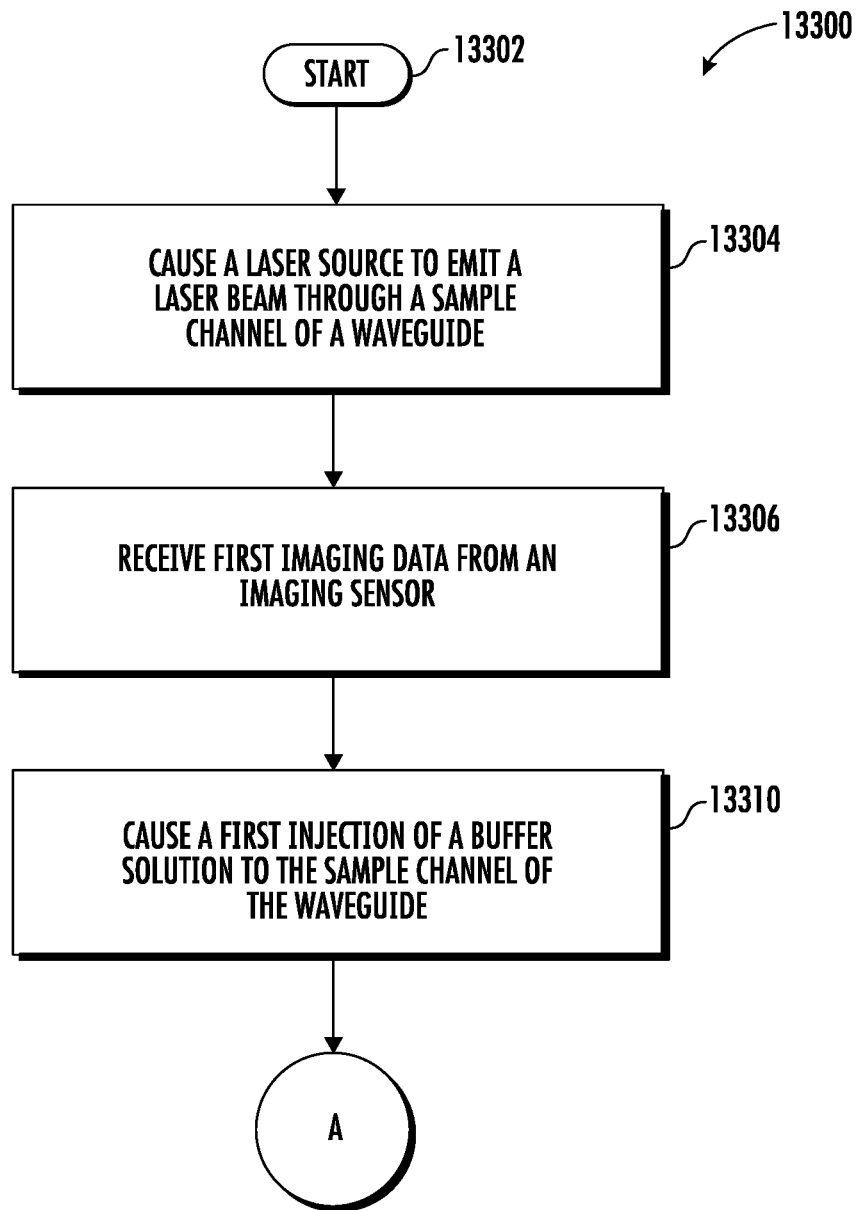
Figure 133B:
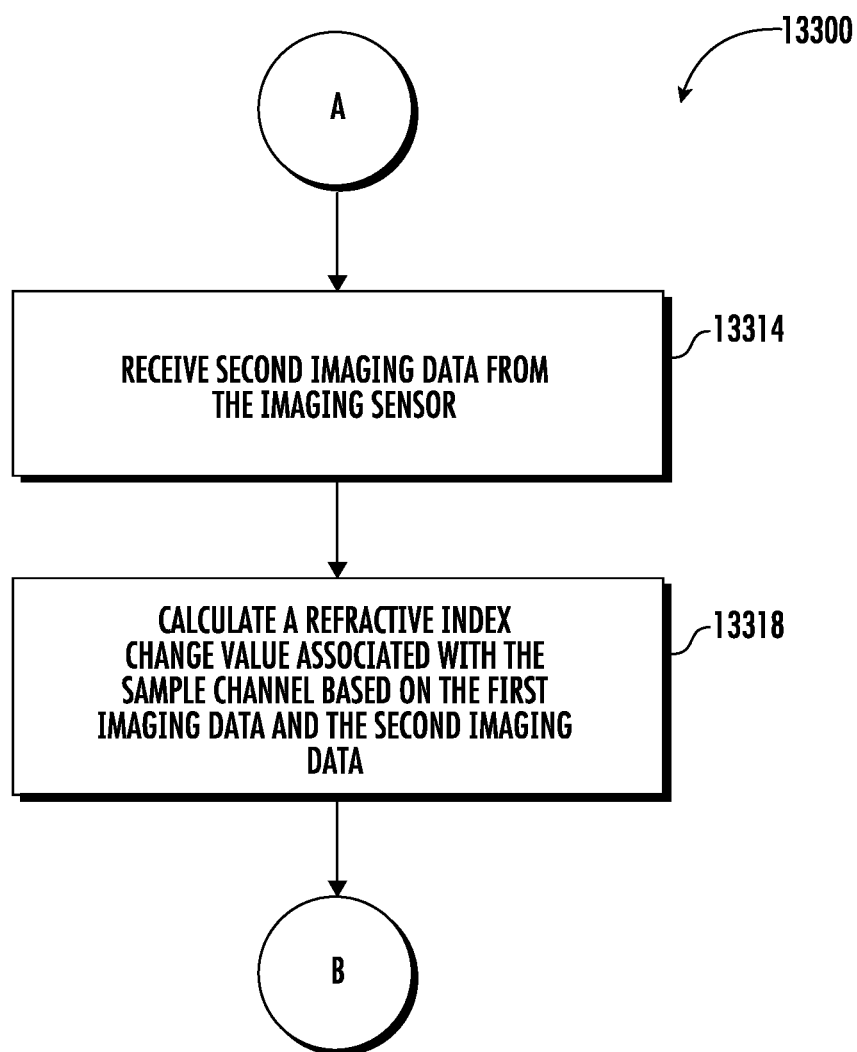
Figure 133C:
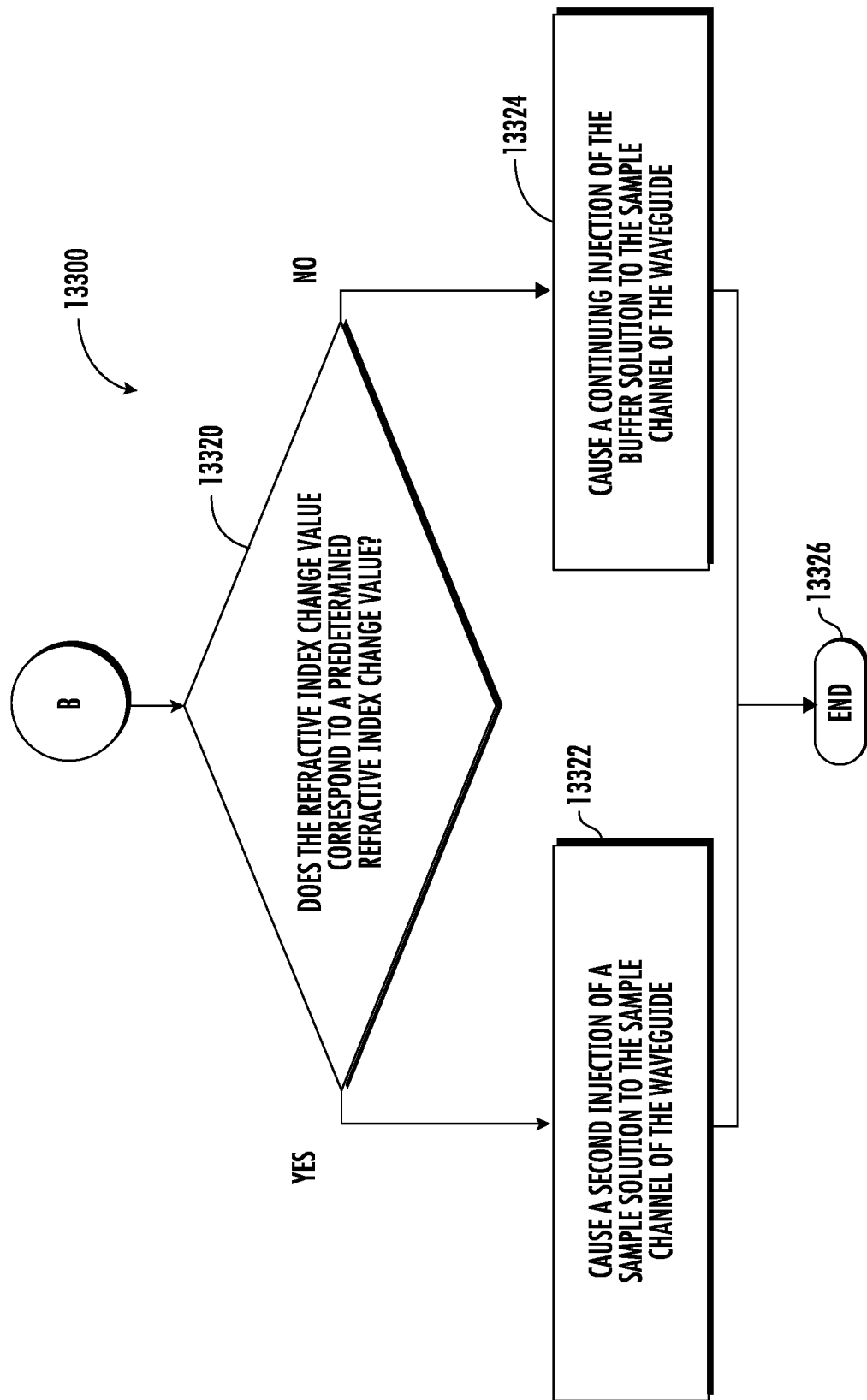
Figure 134A:
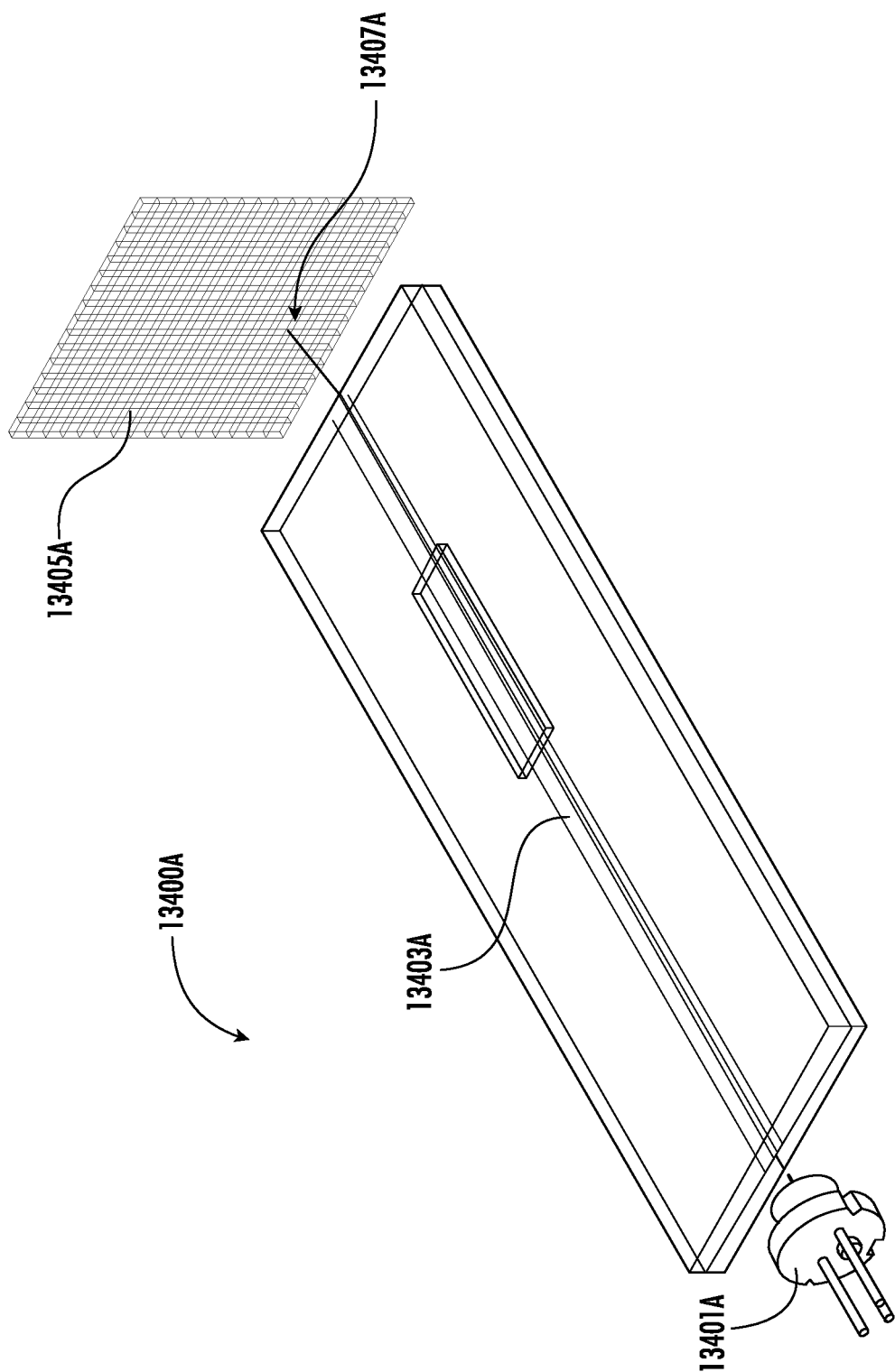
Figure 134B:
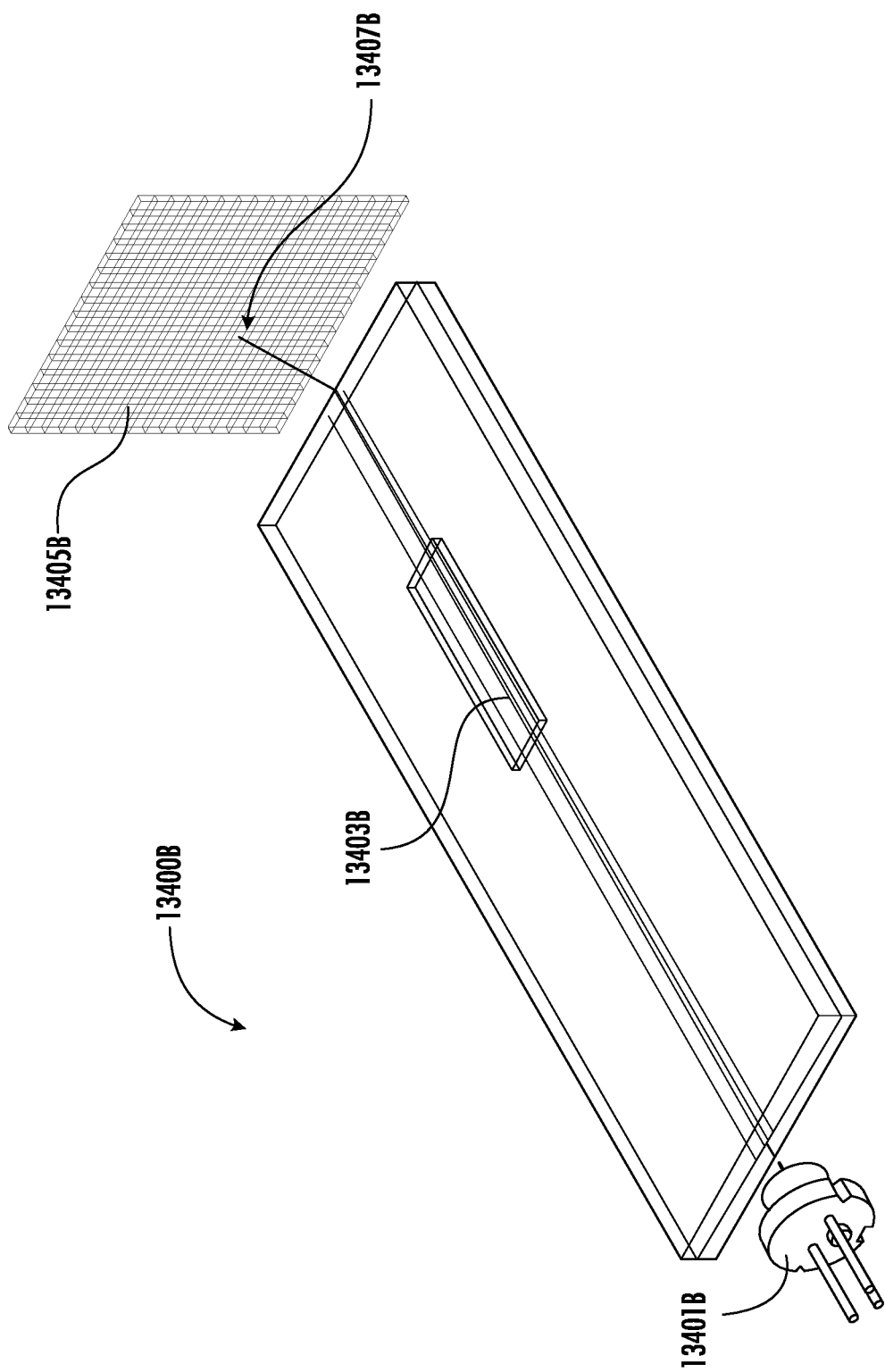
Figure 135A:
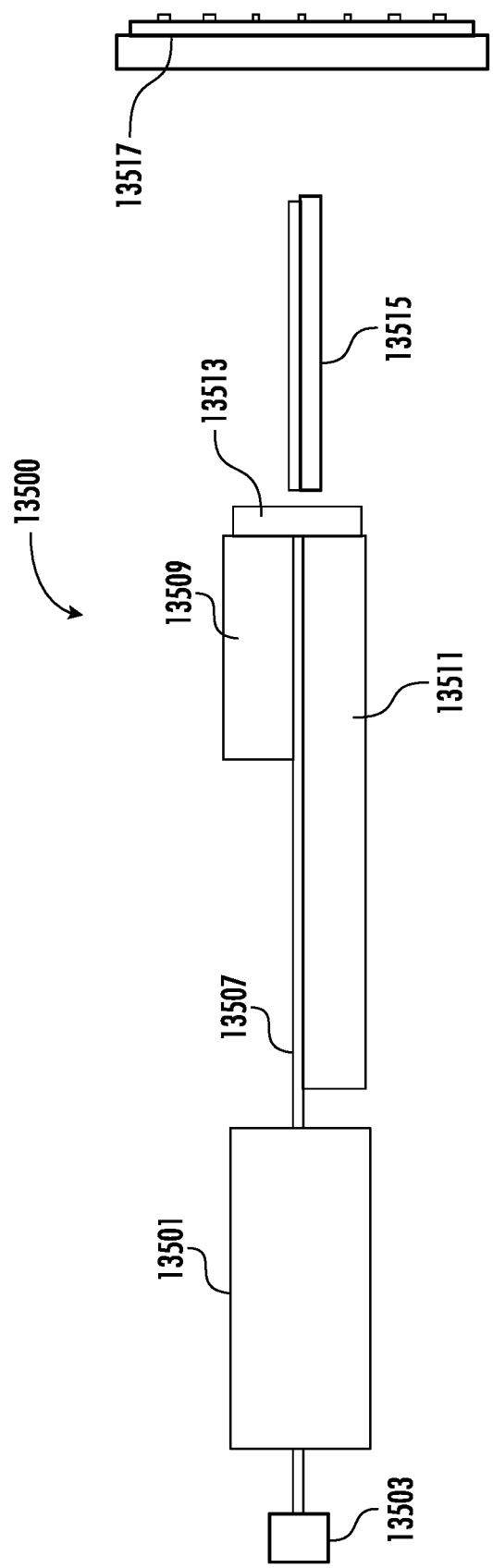
Figure 135B:
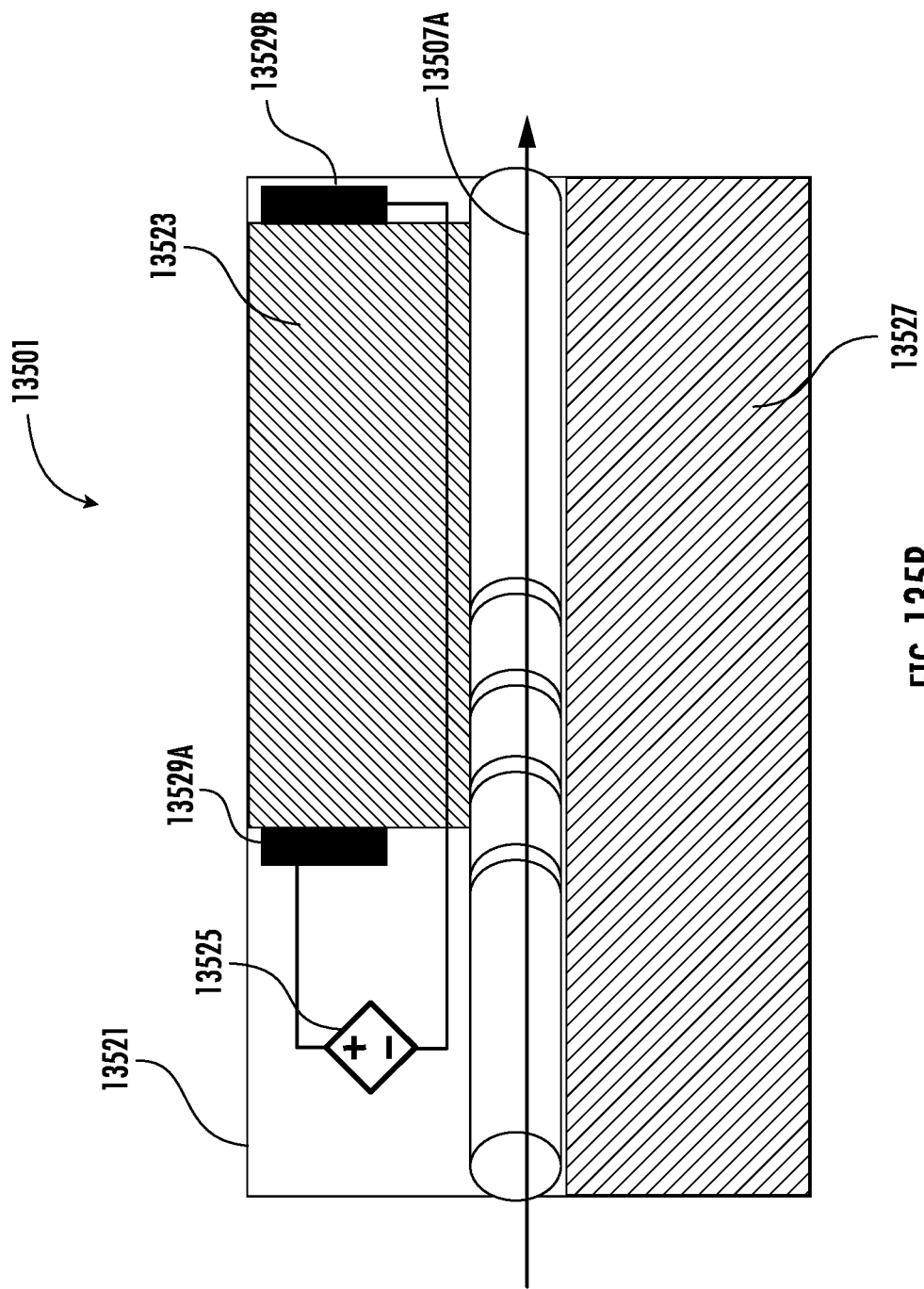
Figure 136:
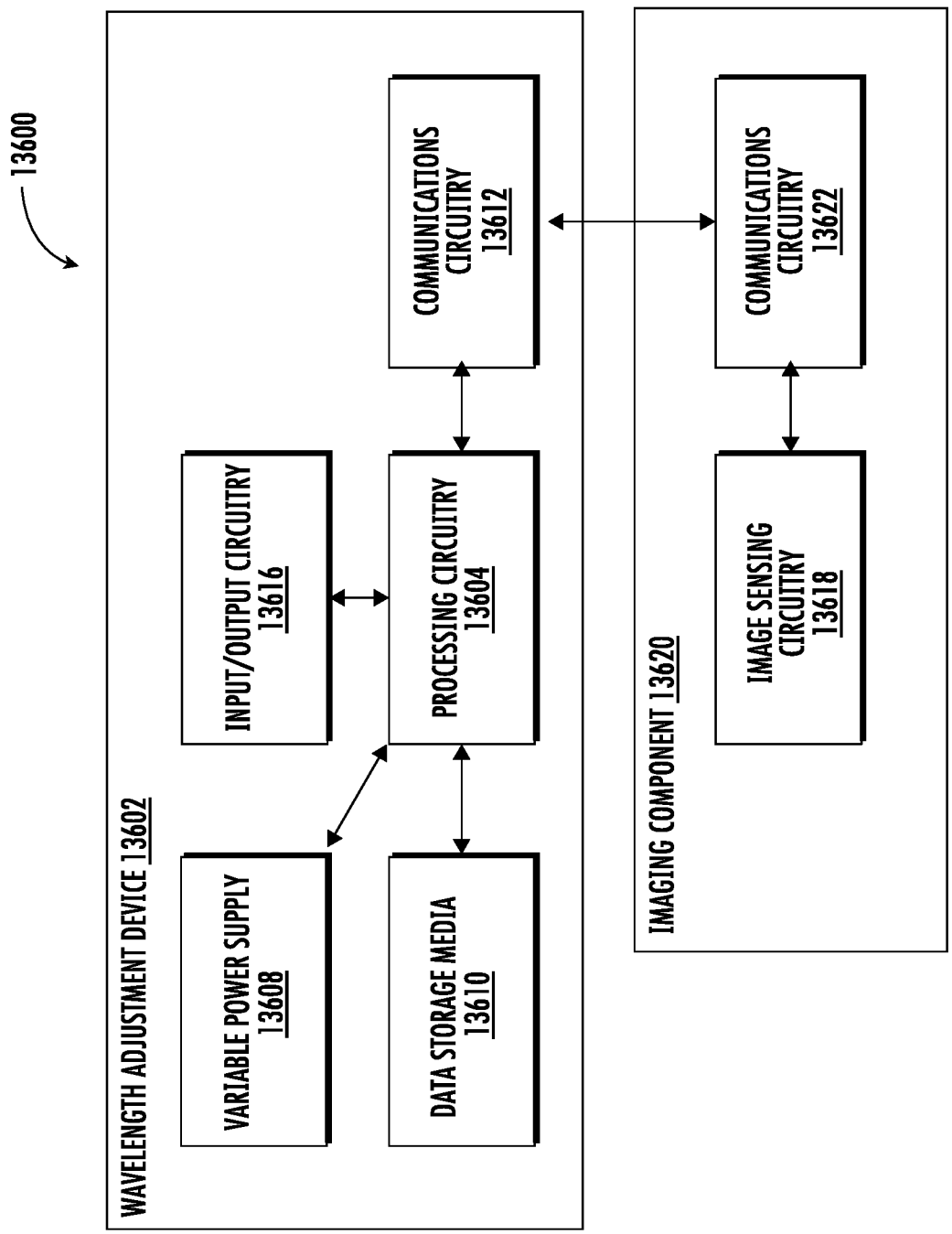
Figure 137A:
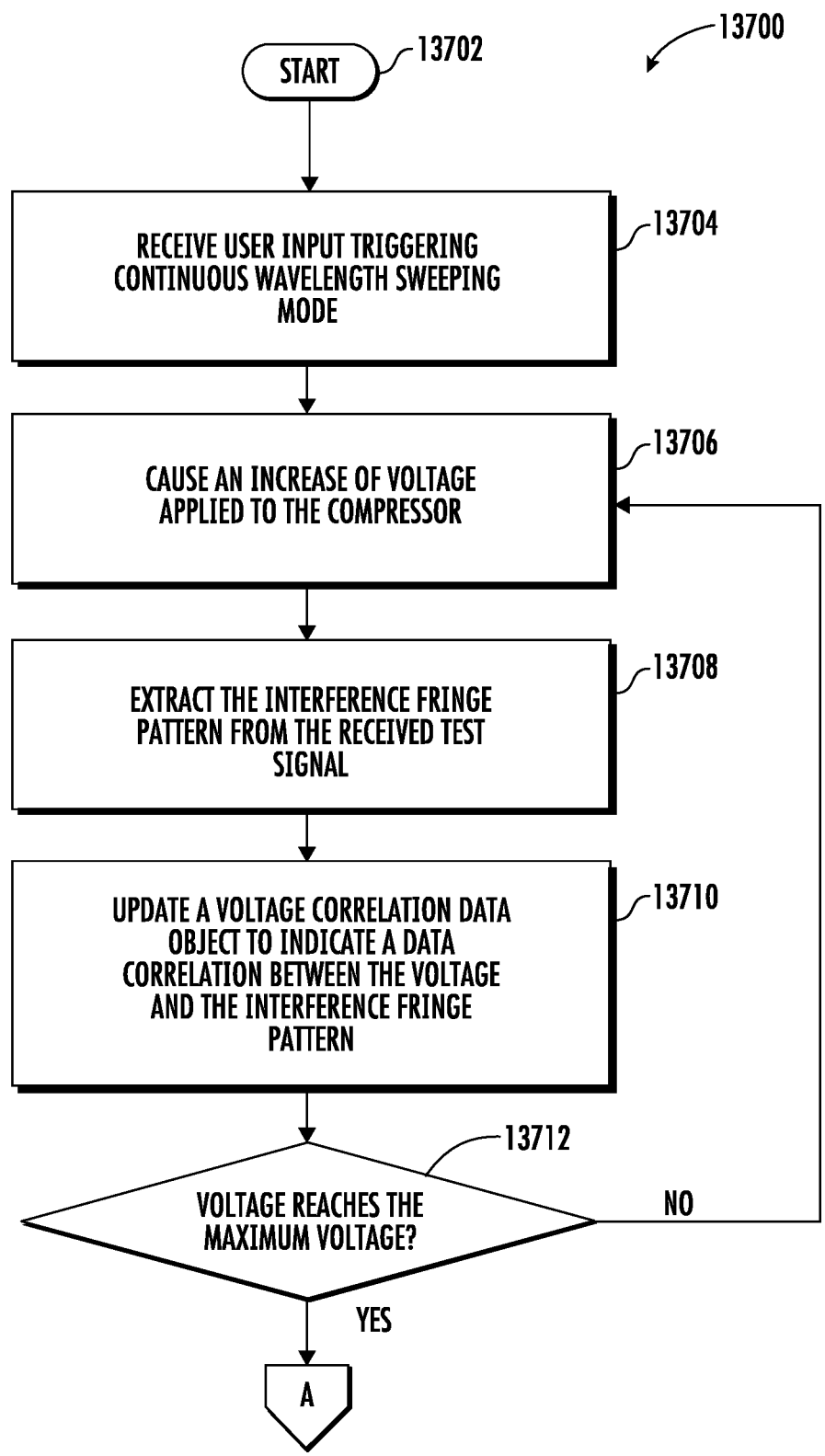
Figure 137B:
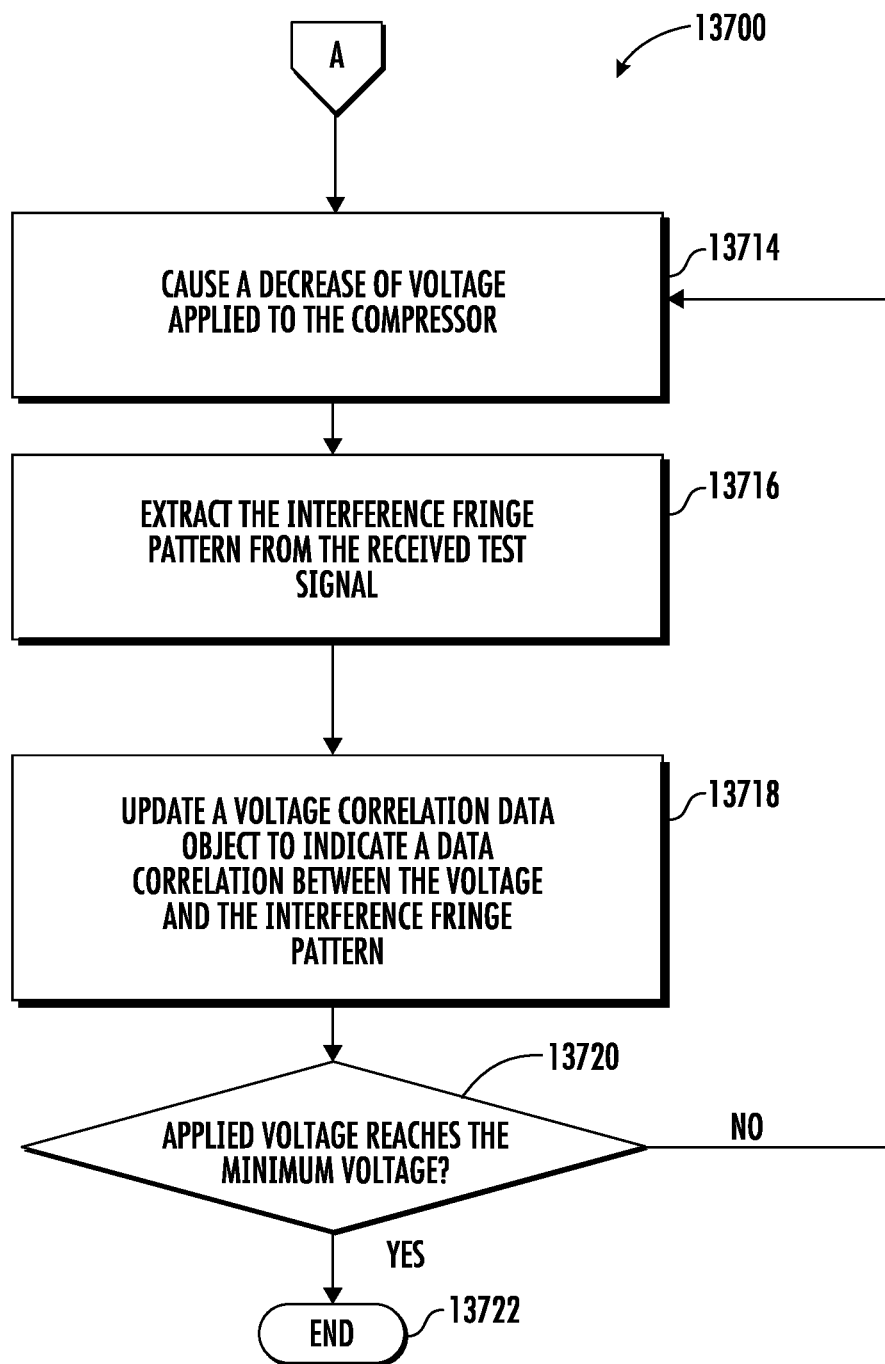
Figure 138:
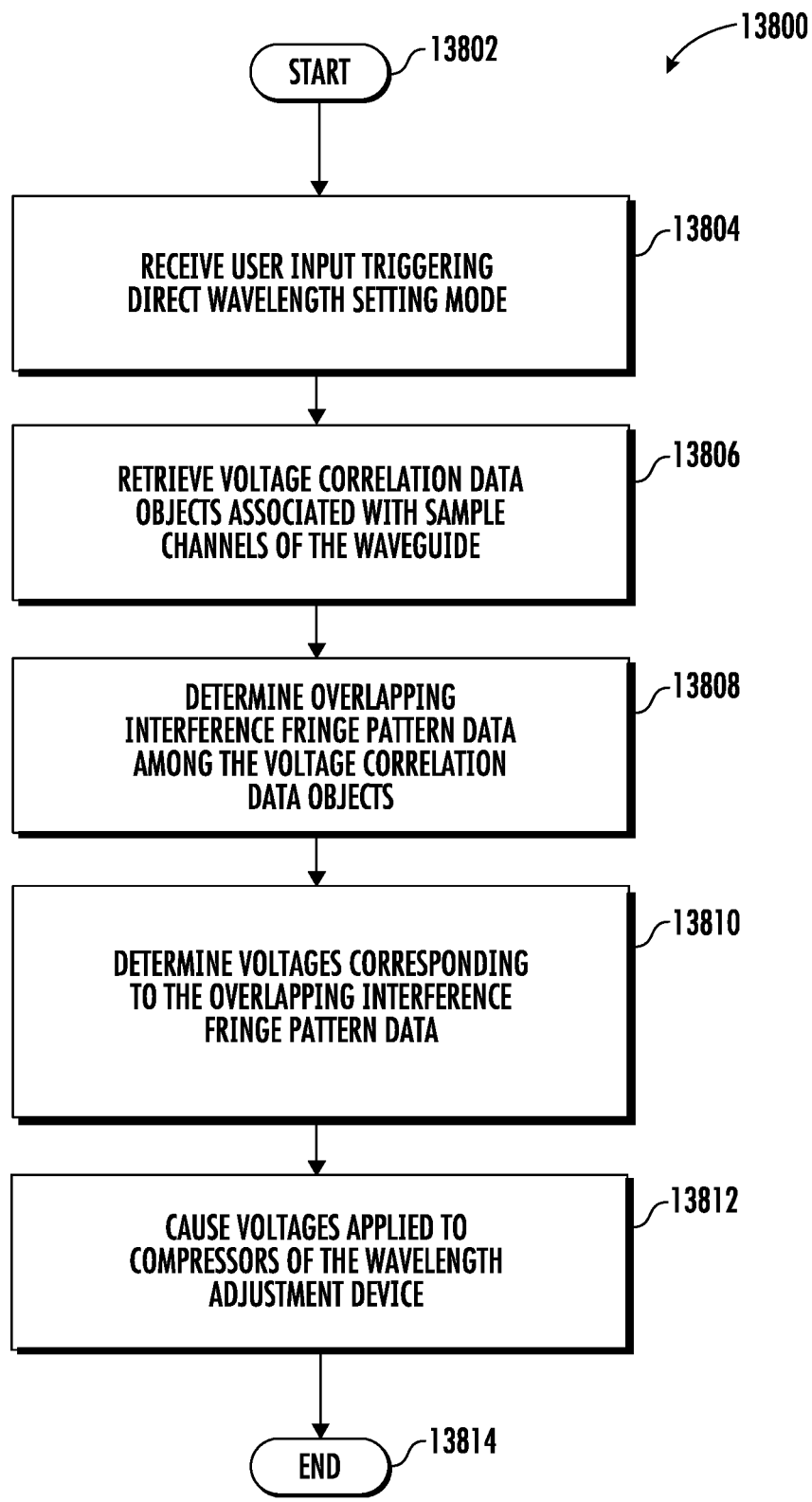
Figure 139:
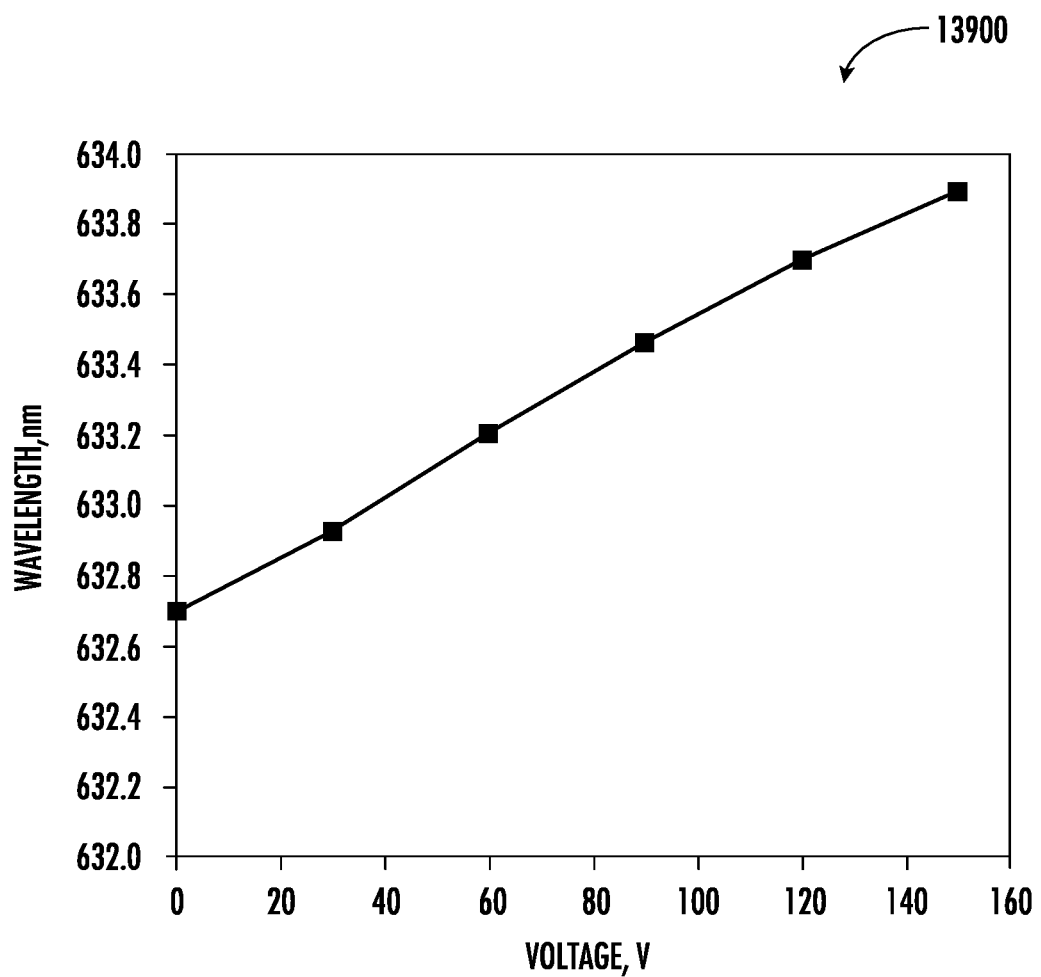
Figure 140:
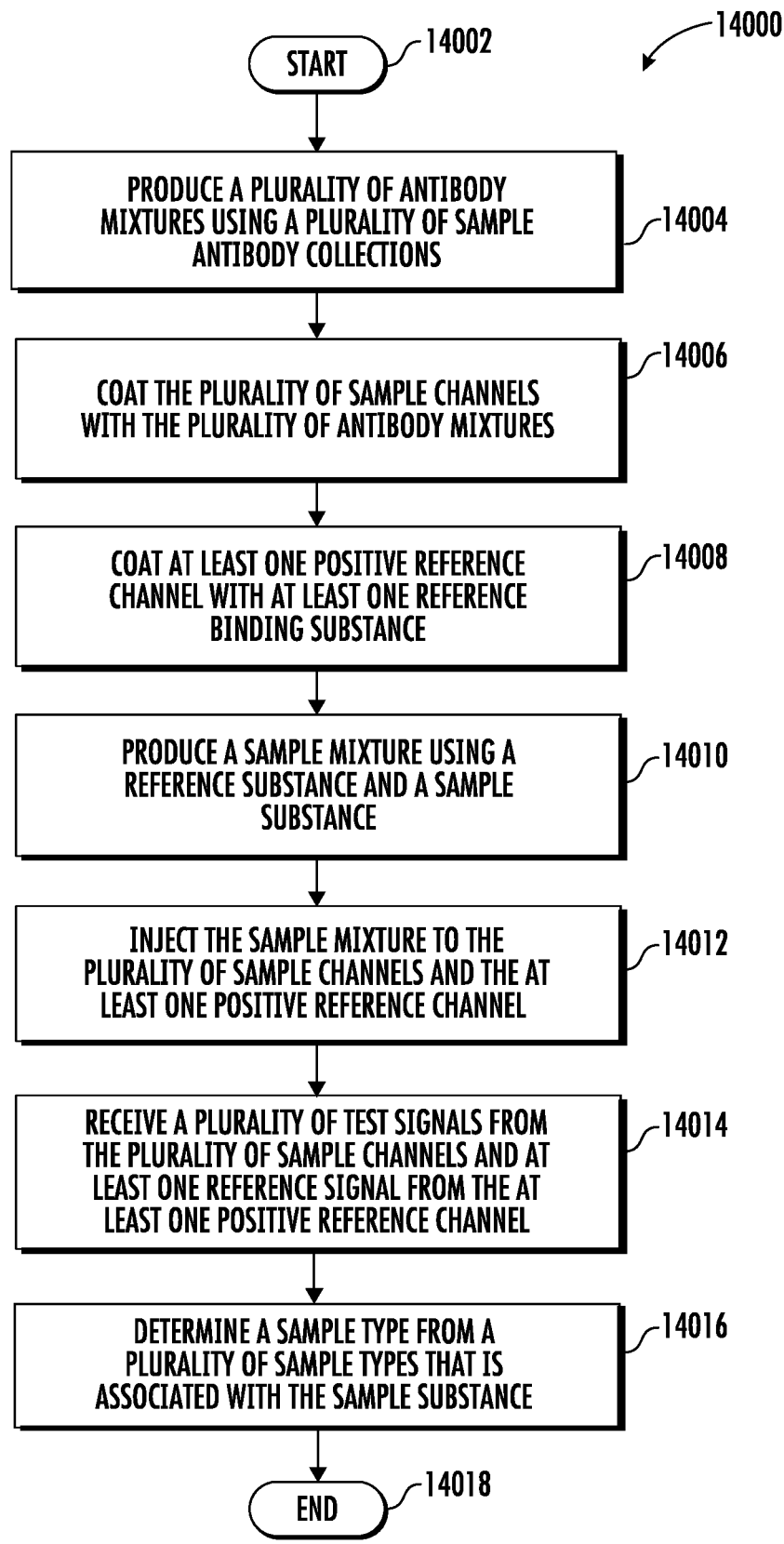
Figure 141:
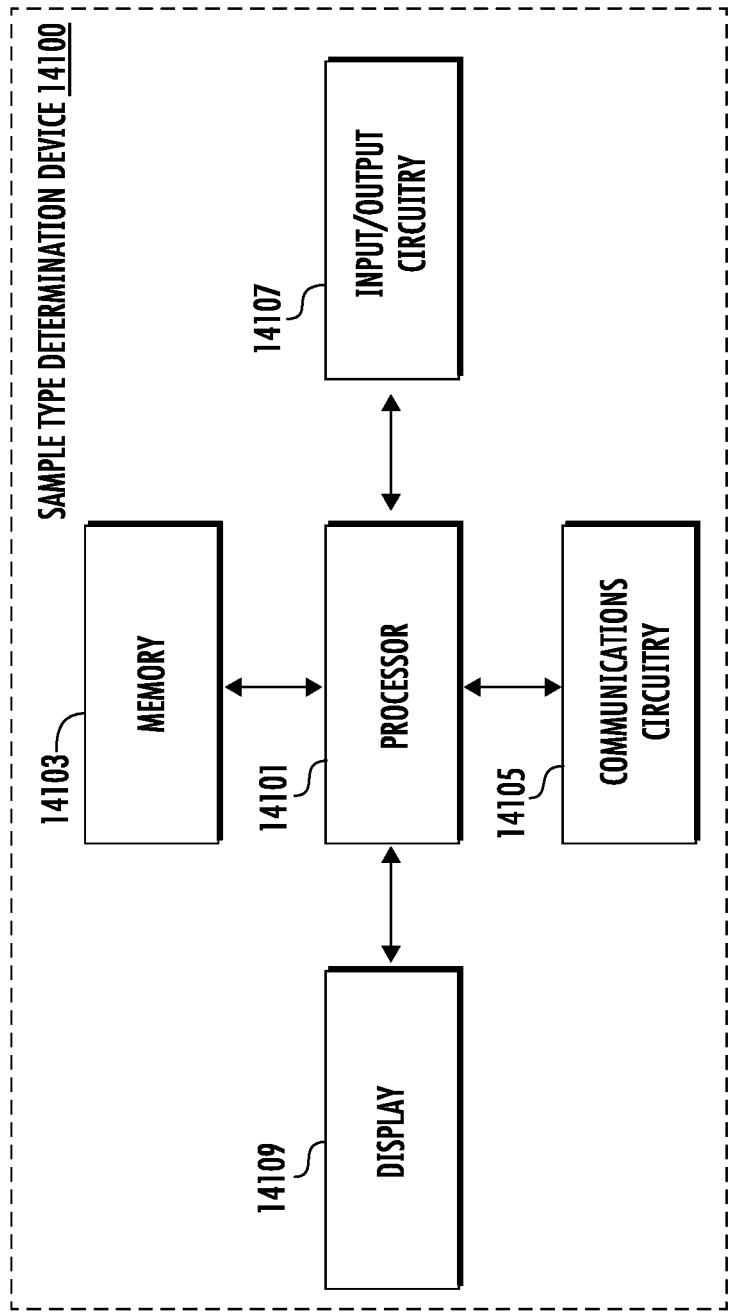
Figure 142A:
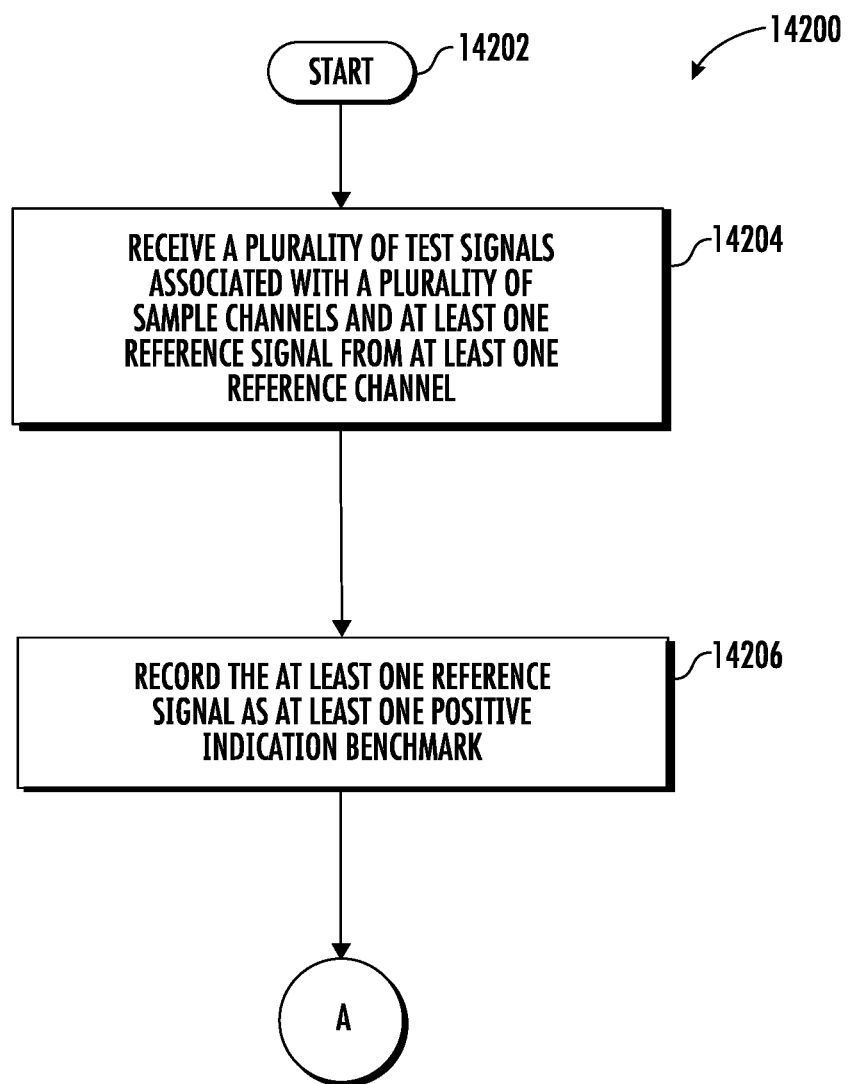
Figure 142B:
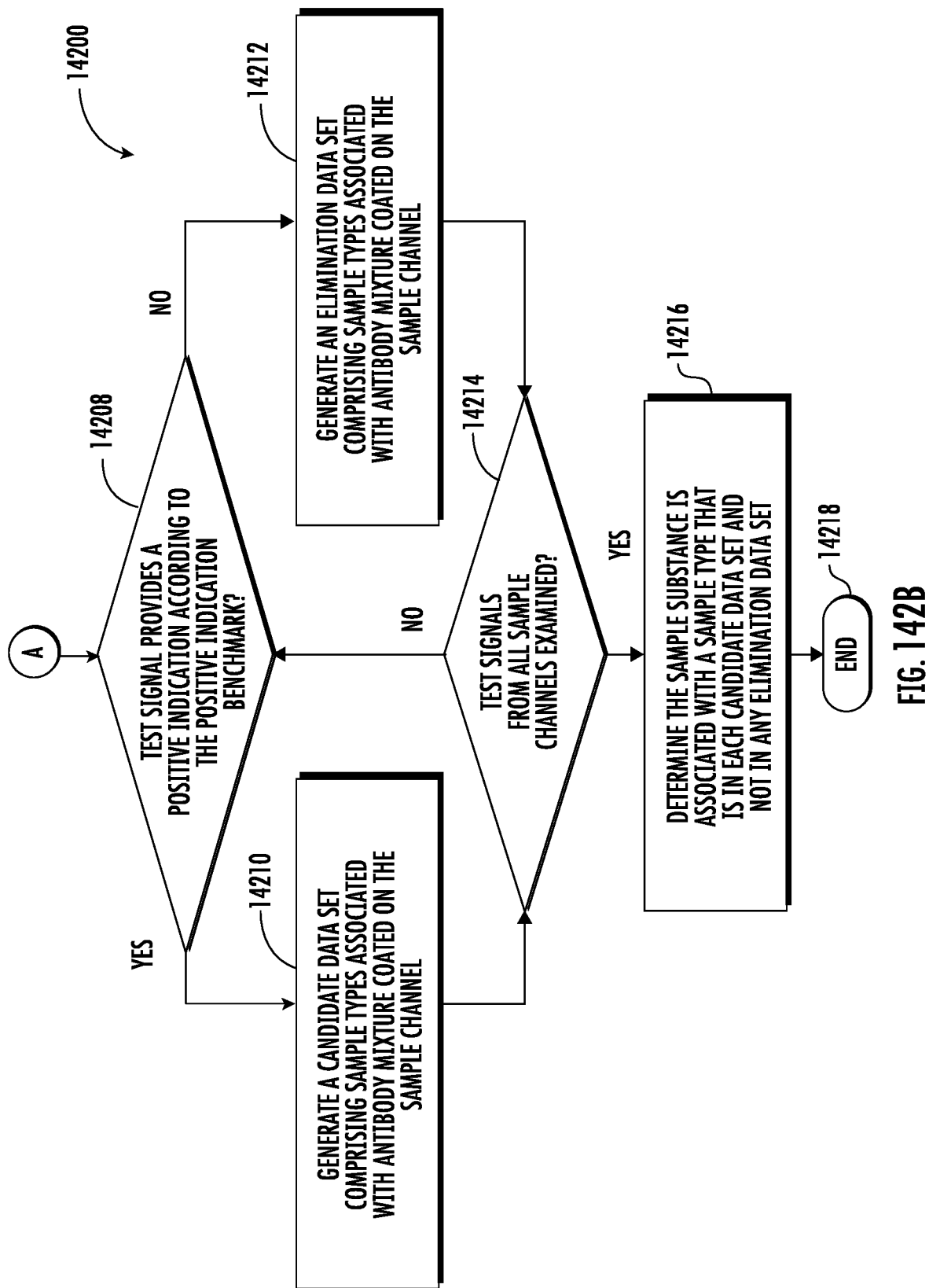
Figure 143A:
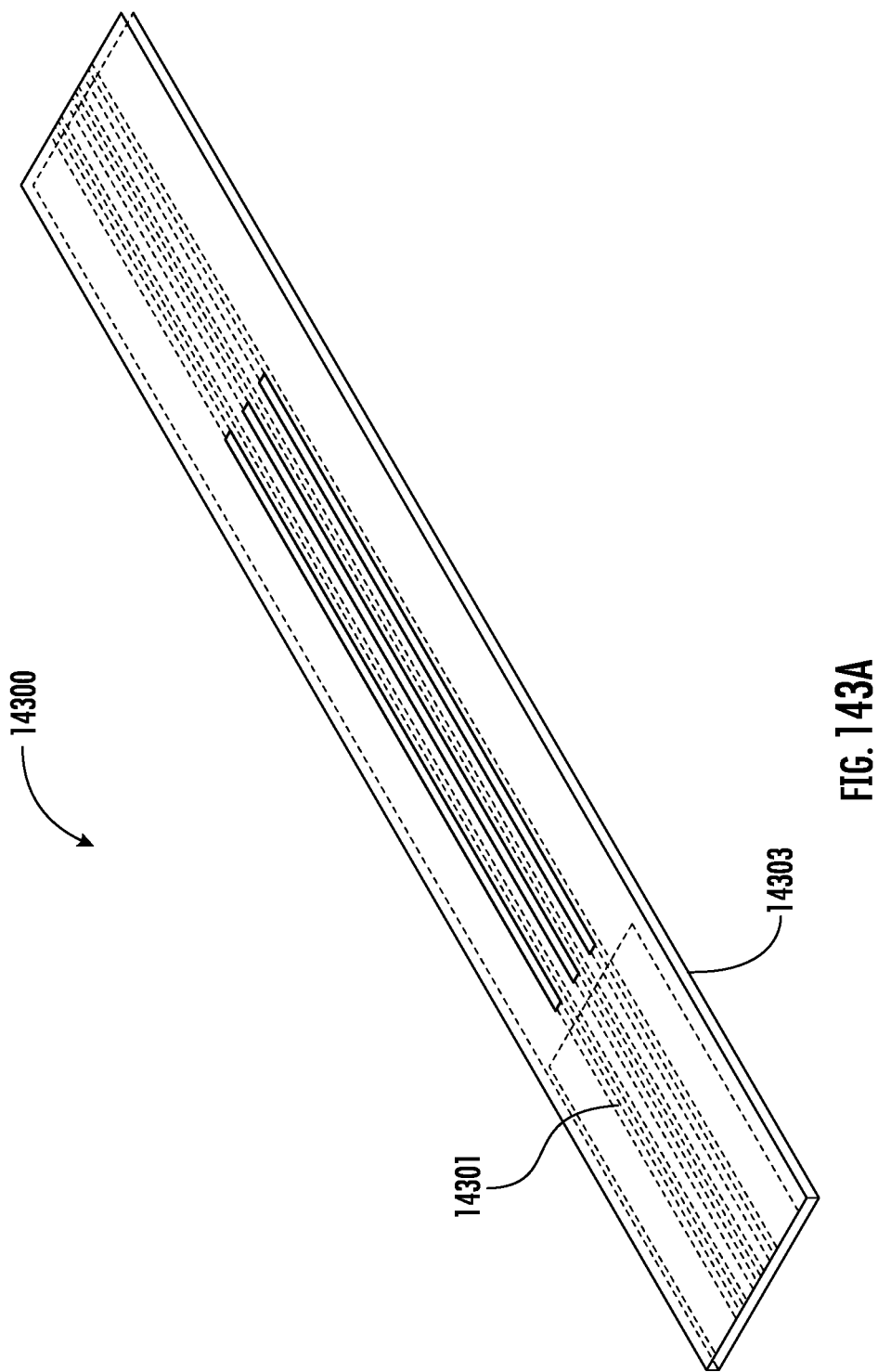
Figure 143B:
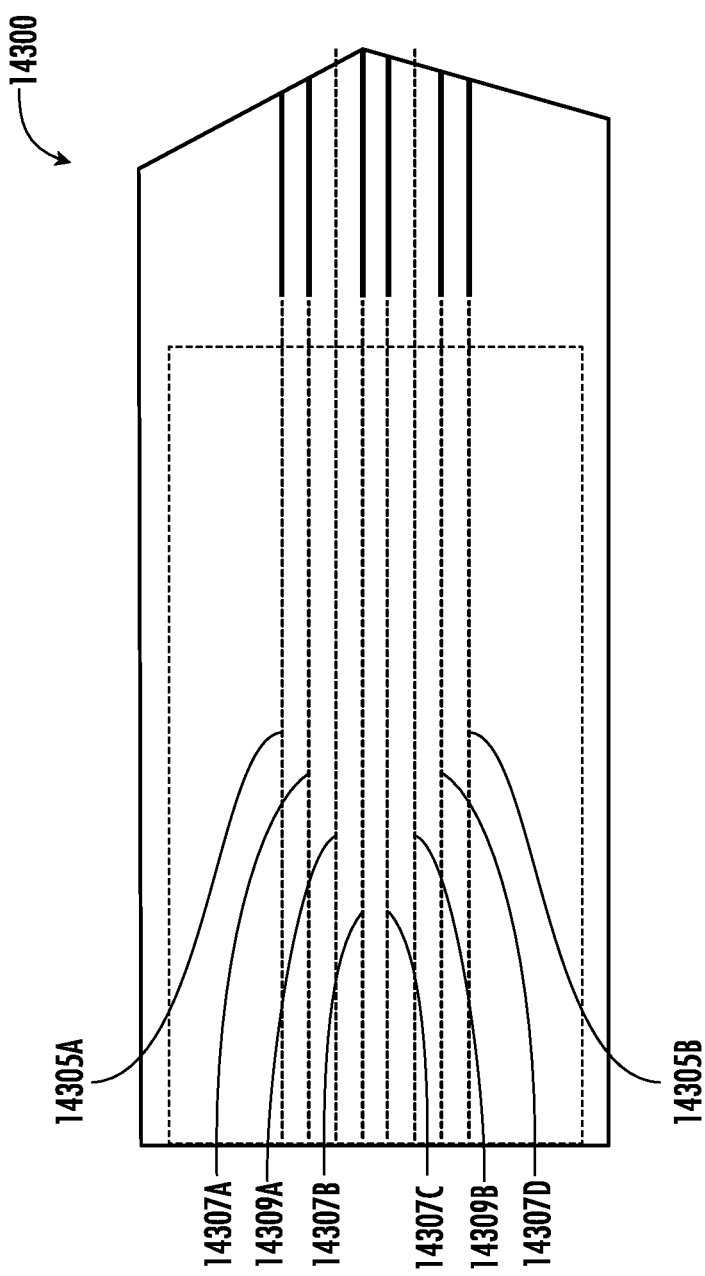
Figure 144A:
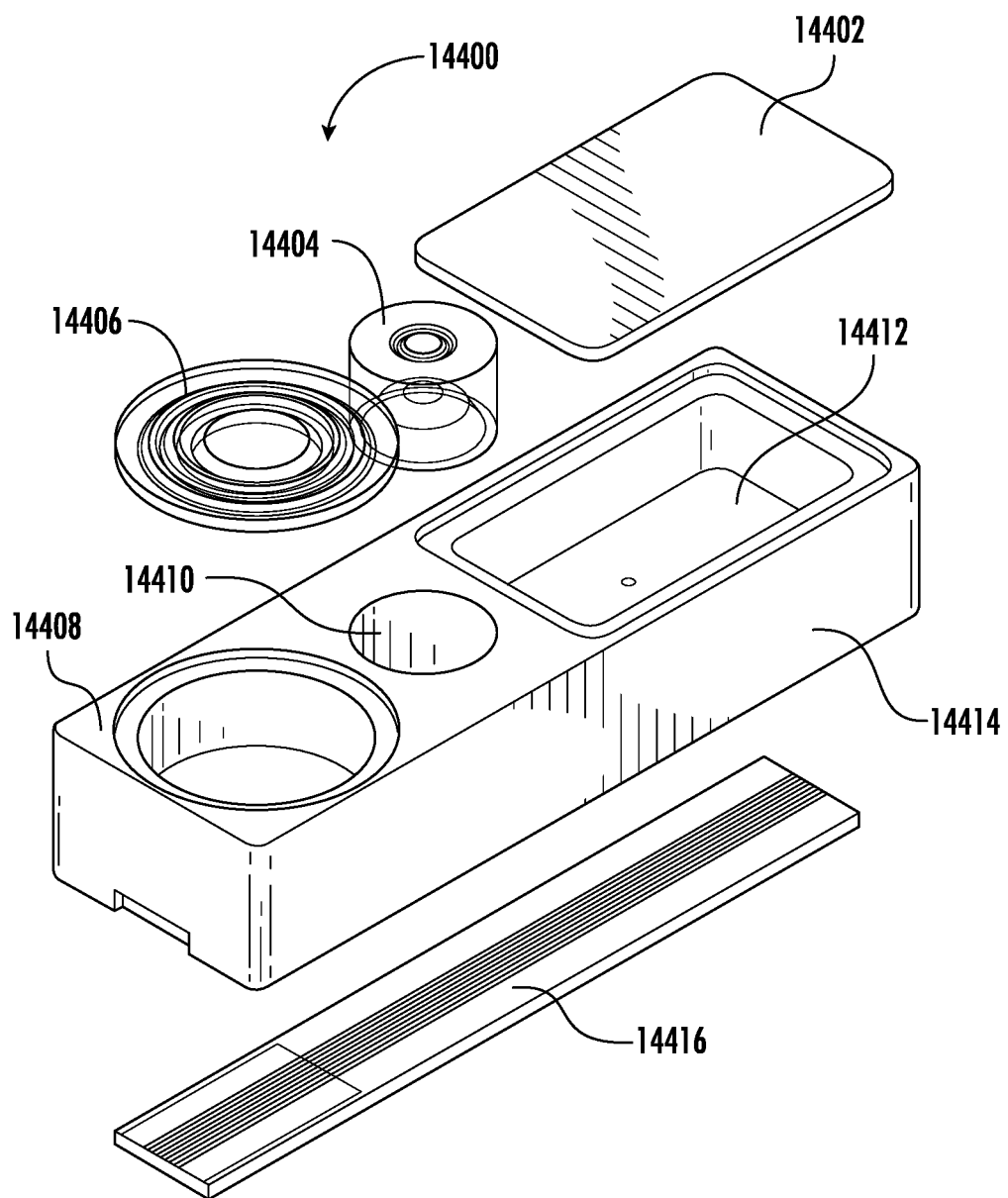
Figure 144B:
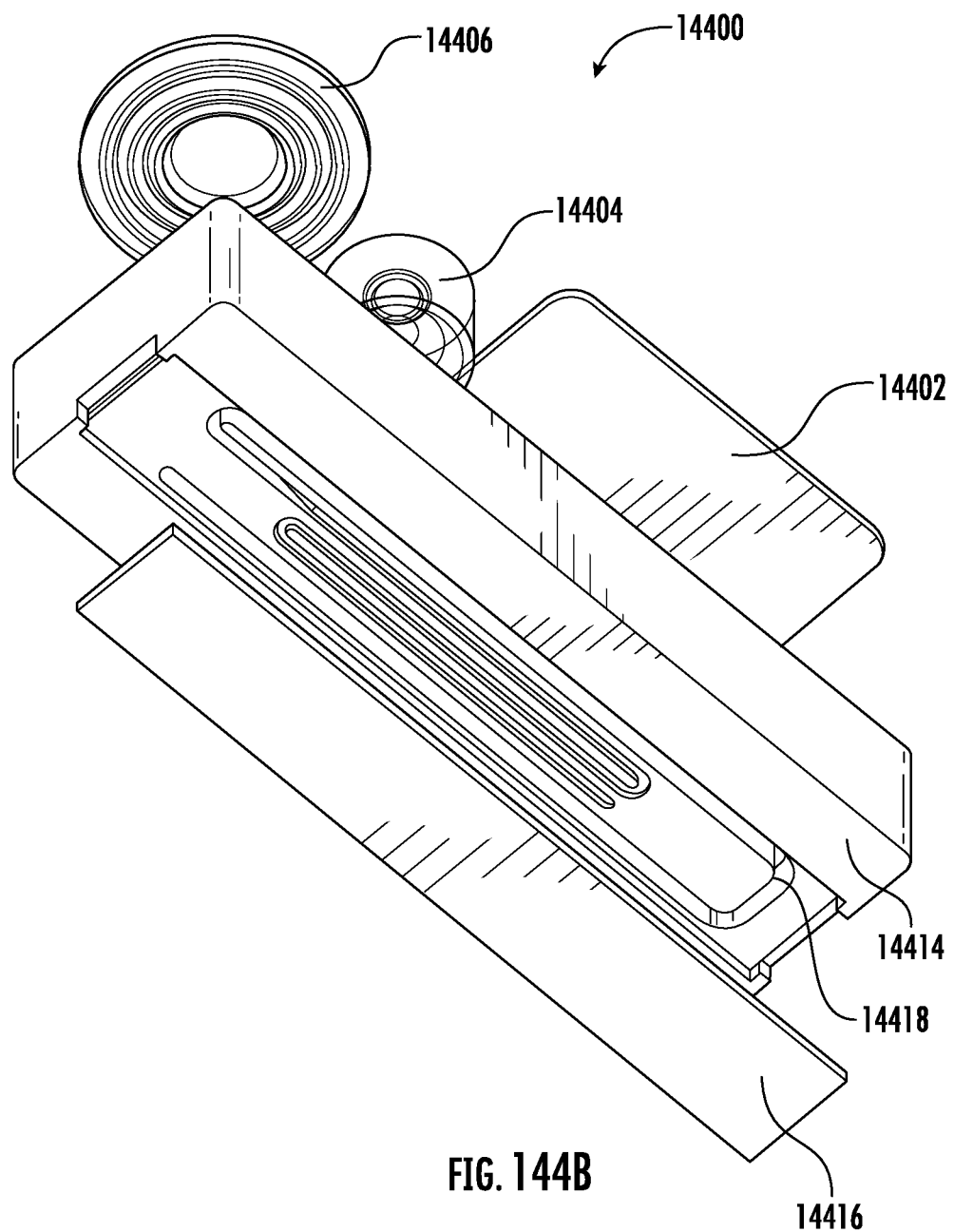
Figure 144C:
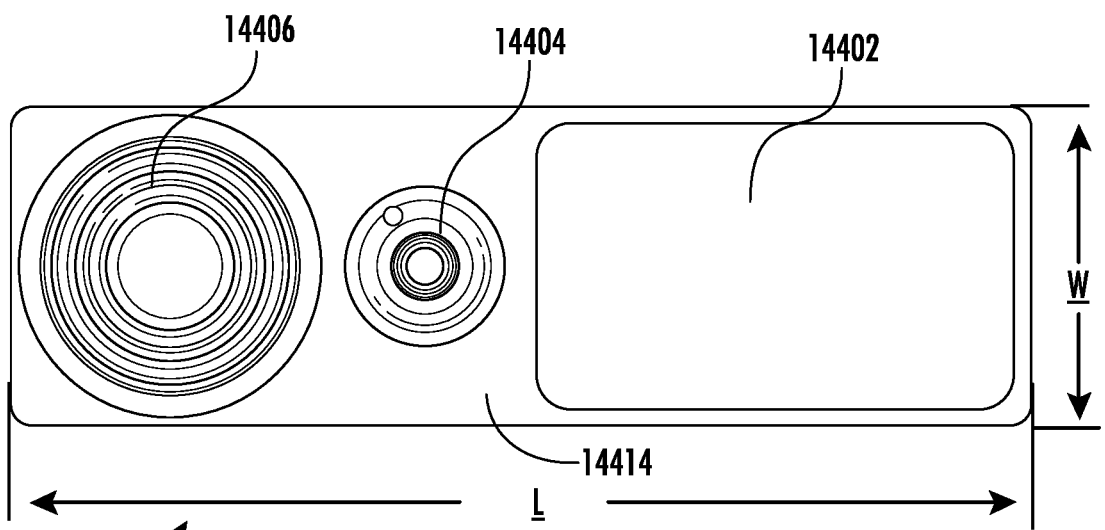
Figure 144D:
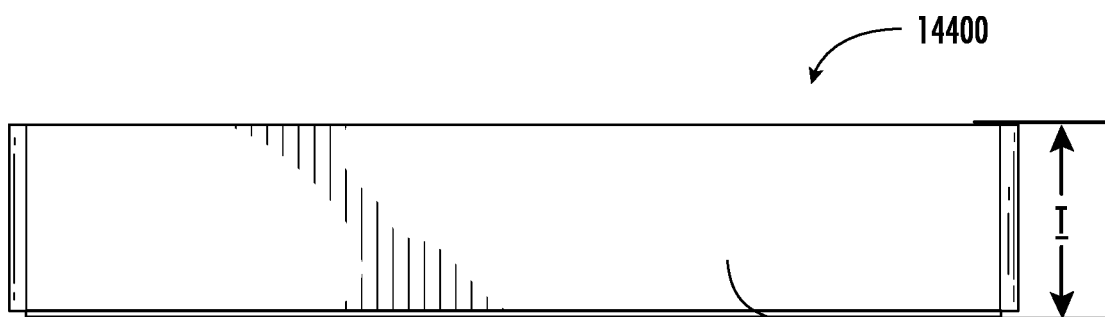
Figure 144E:
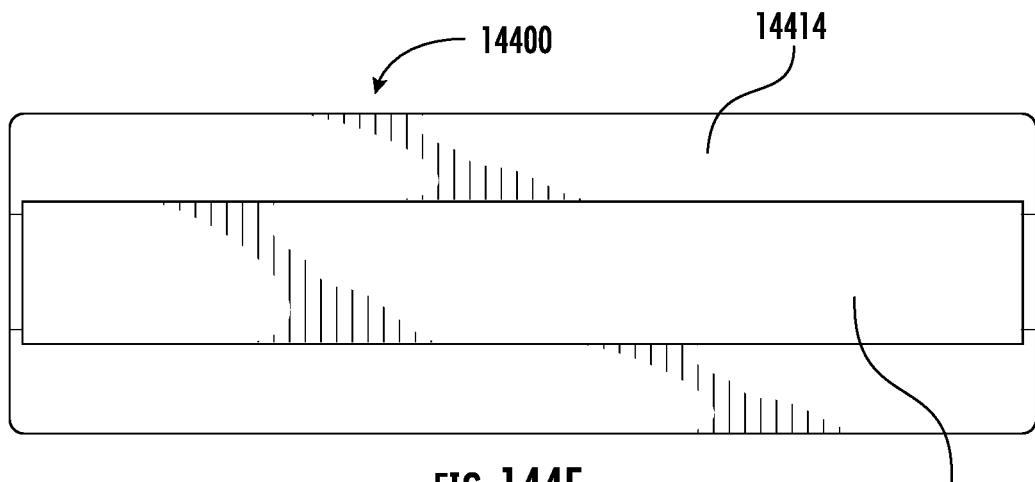
Figure 144F:
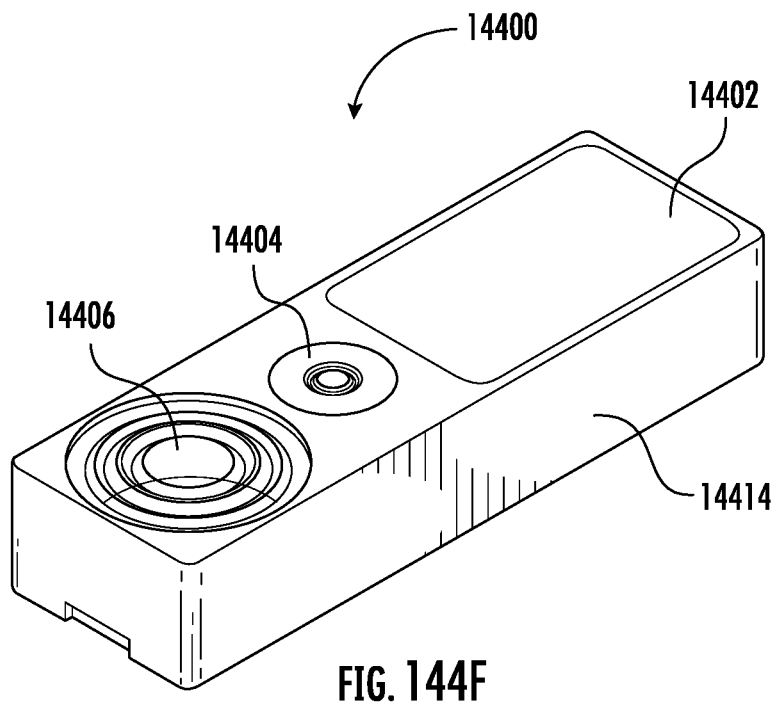
Figure 144G:
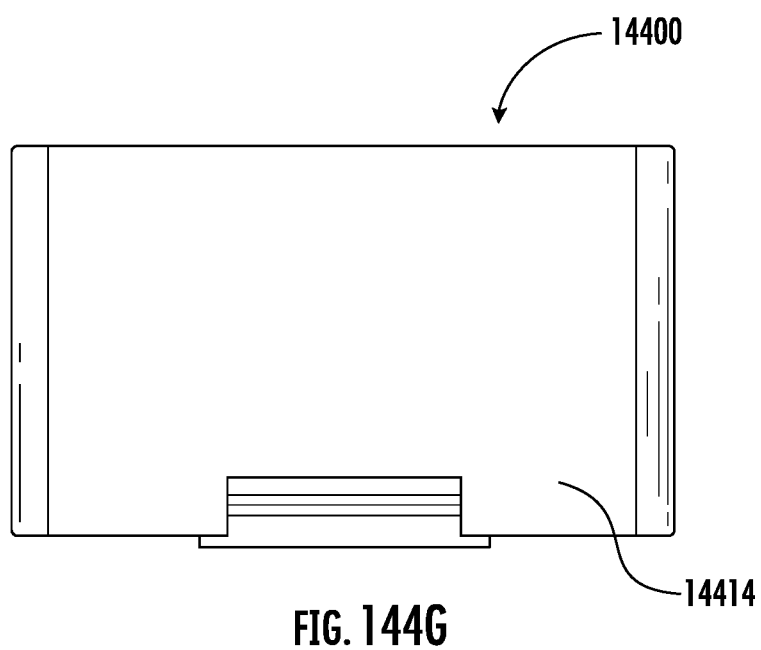
Figure 145A:
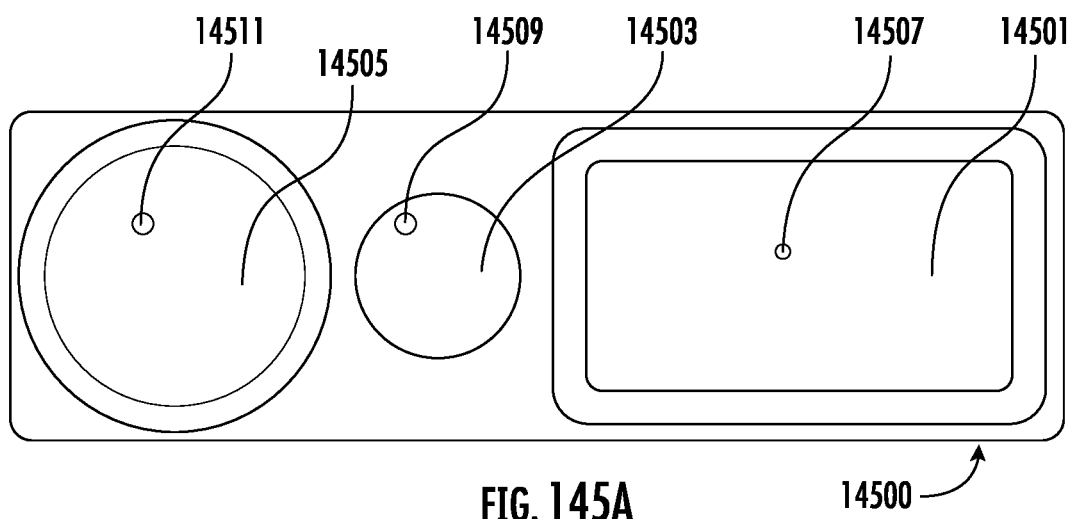
Figure 145B:
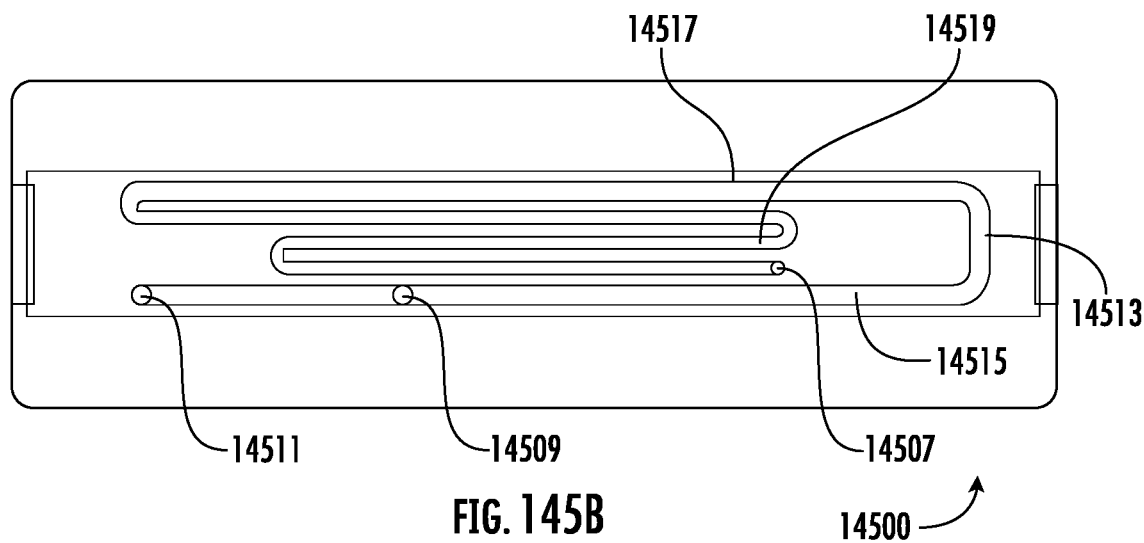
Figure 145C:
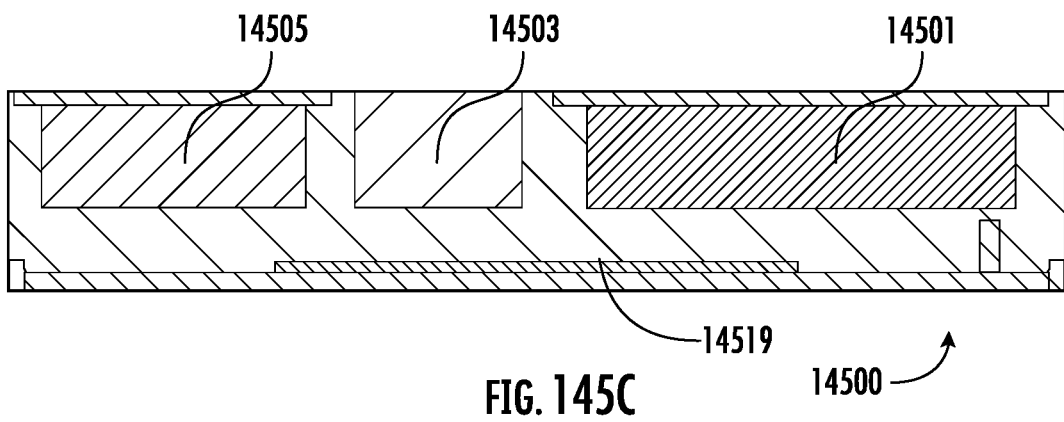
Figure 145D:
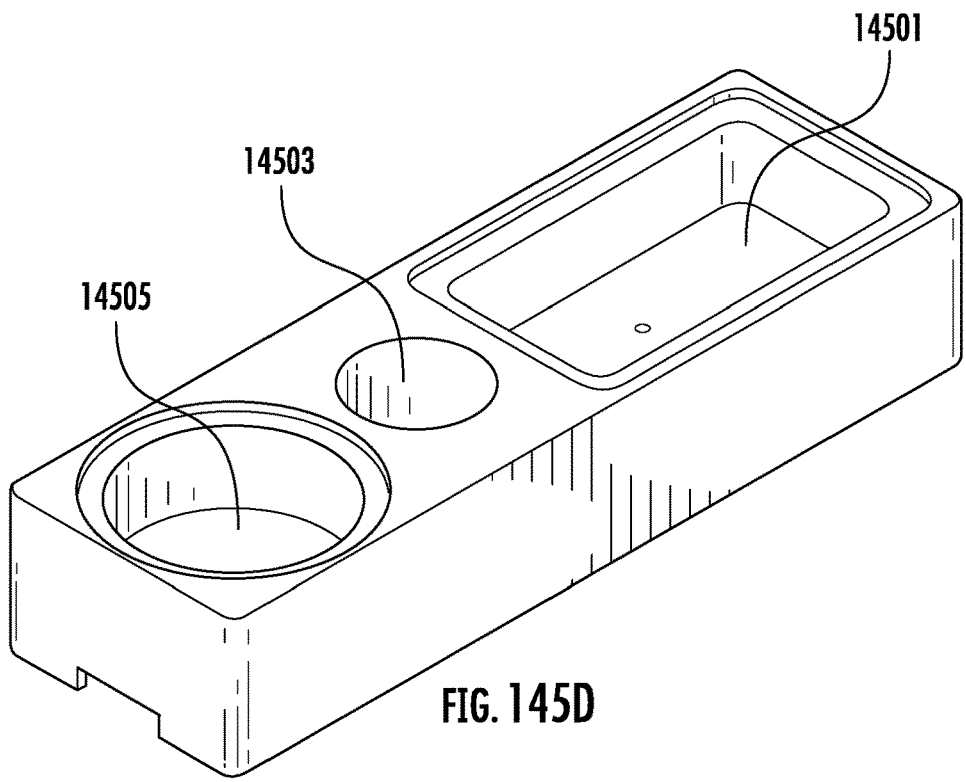
Figure 145E:
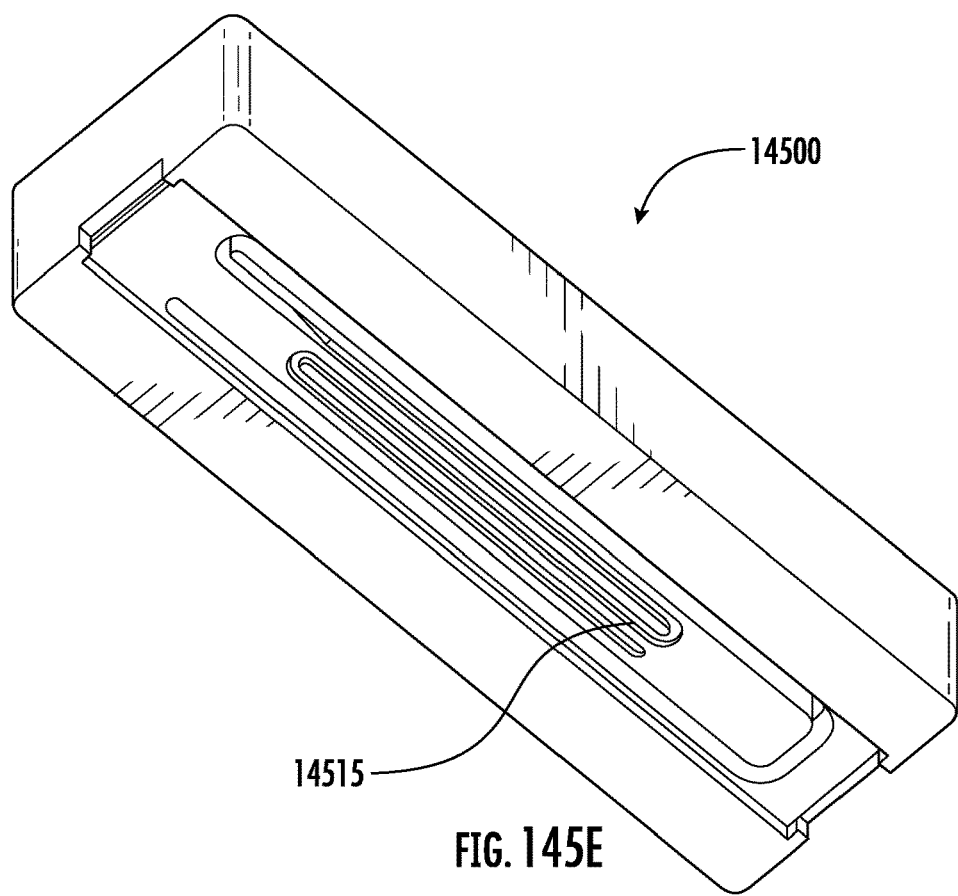
Figure 145F:
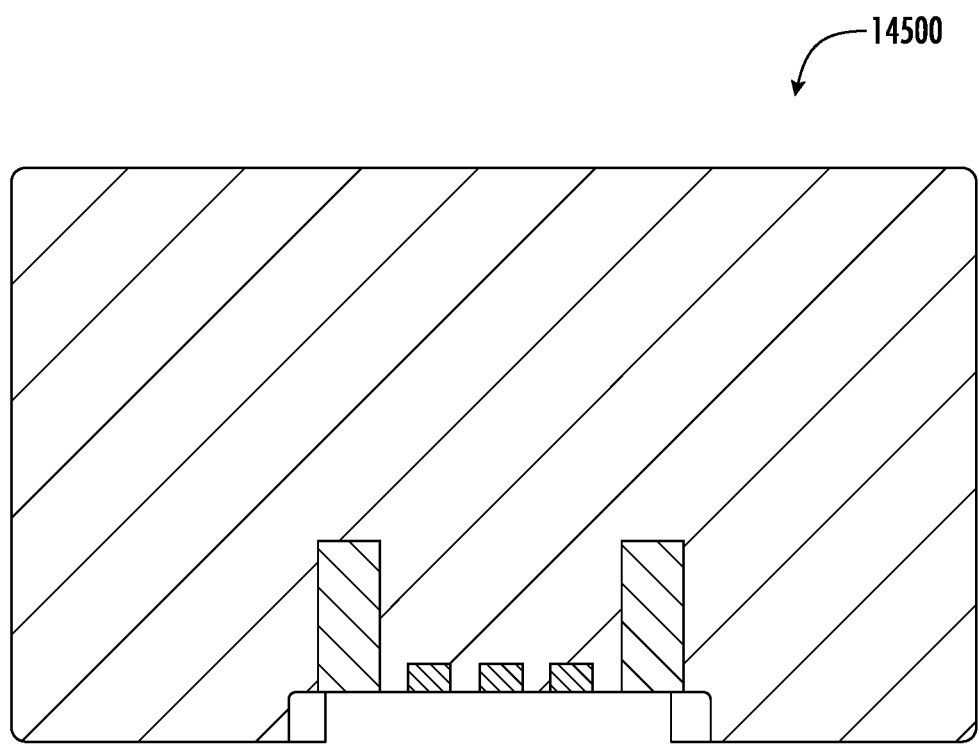
Figure 146A:
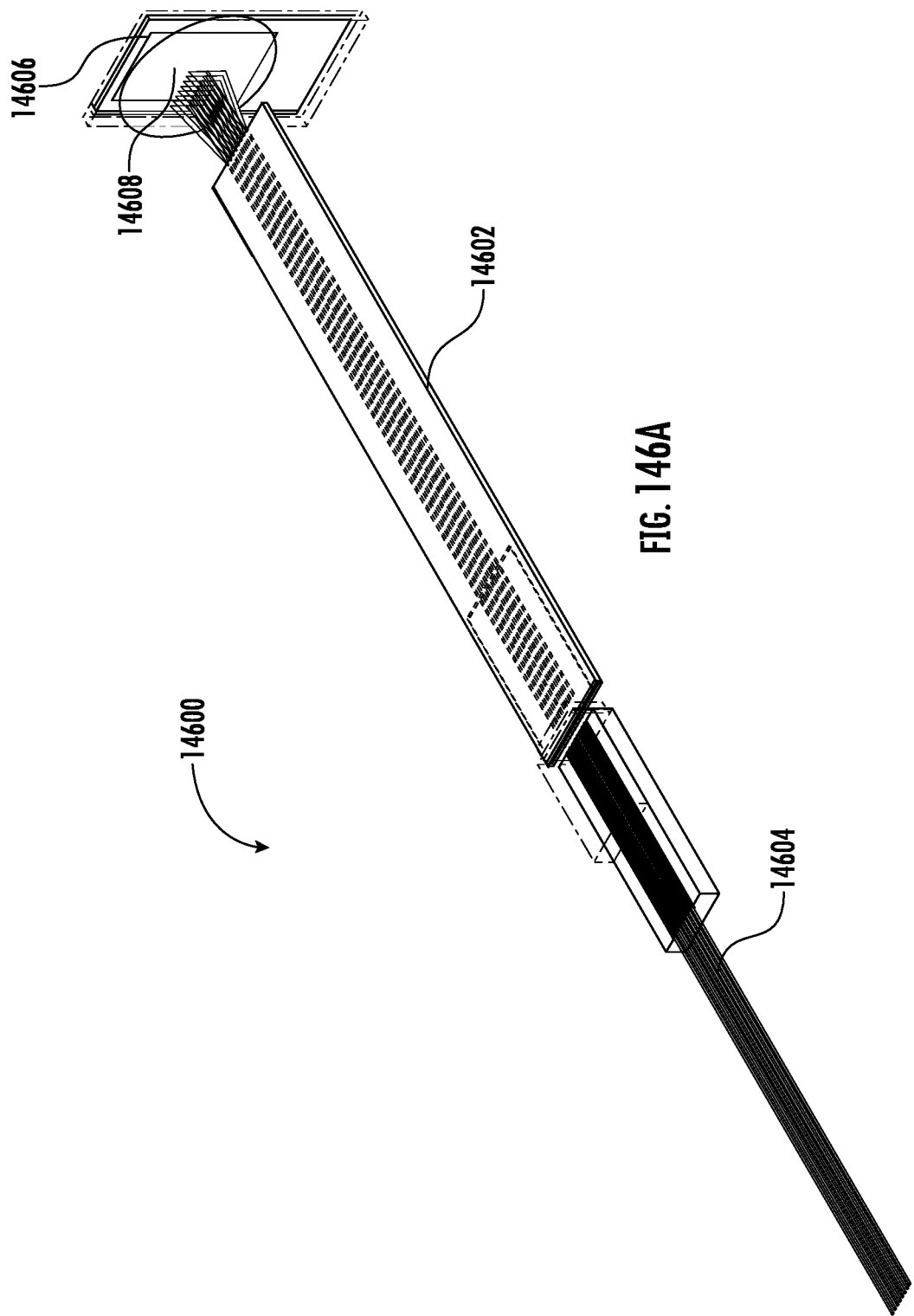
Figure 146B:
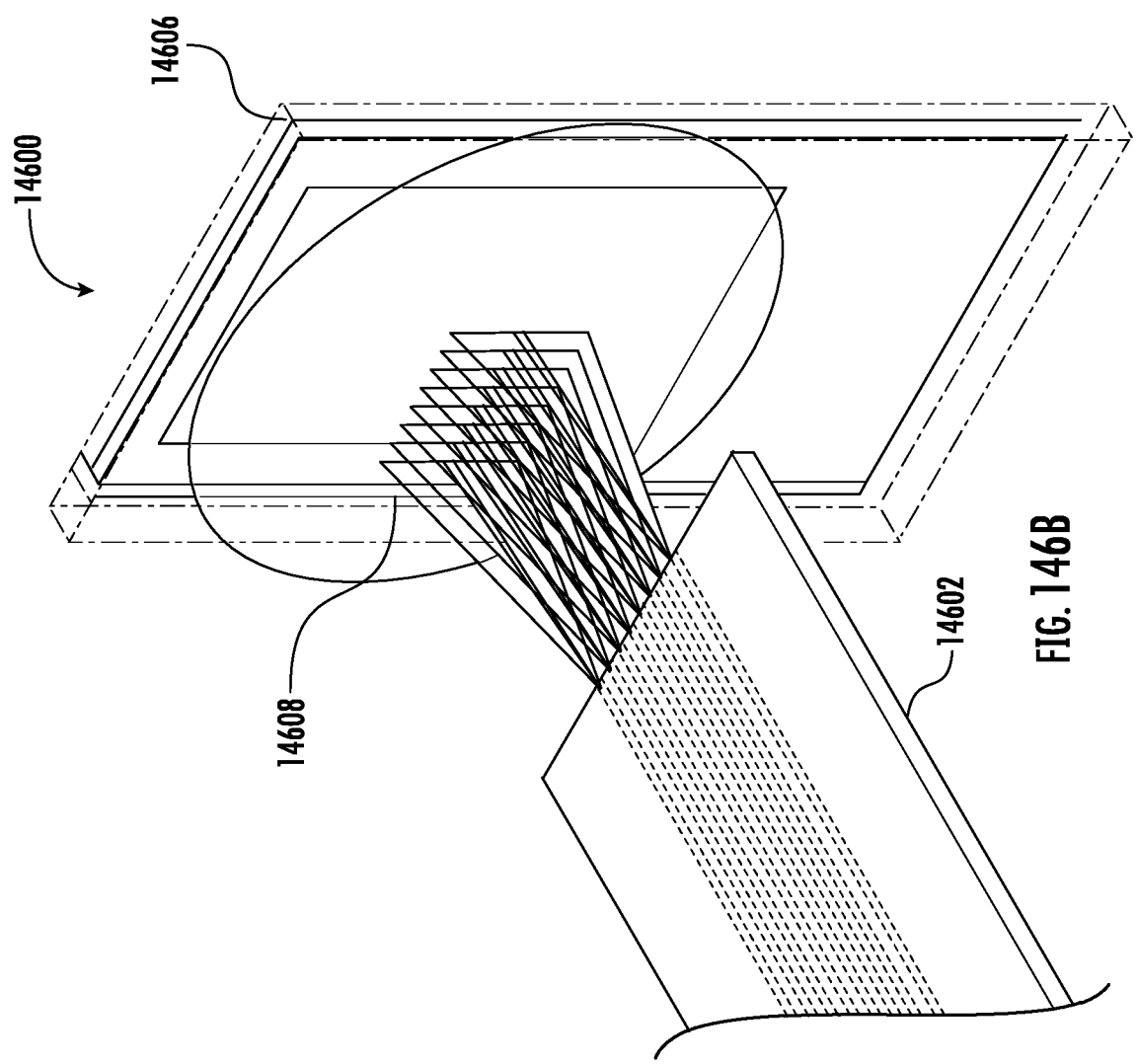
Figure 146C:
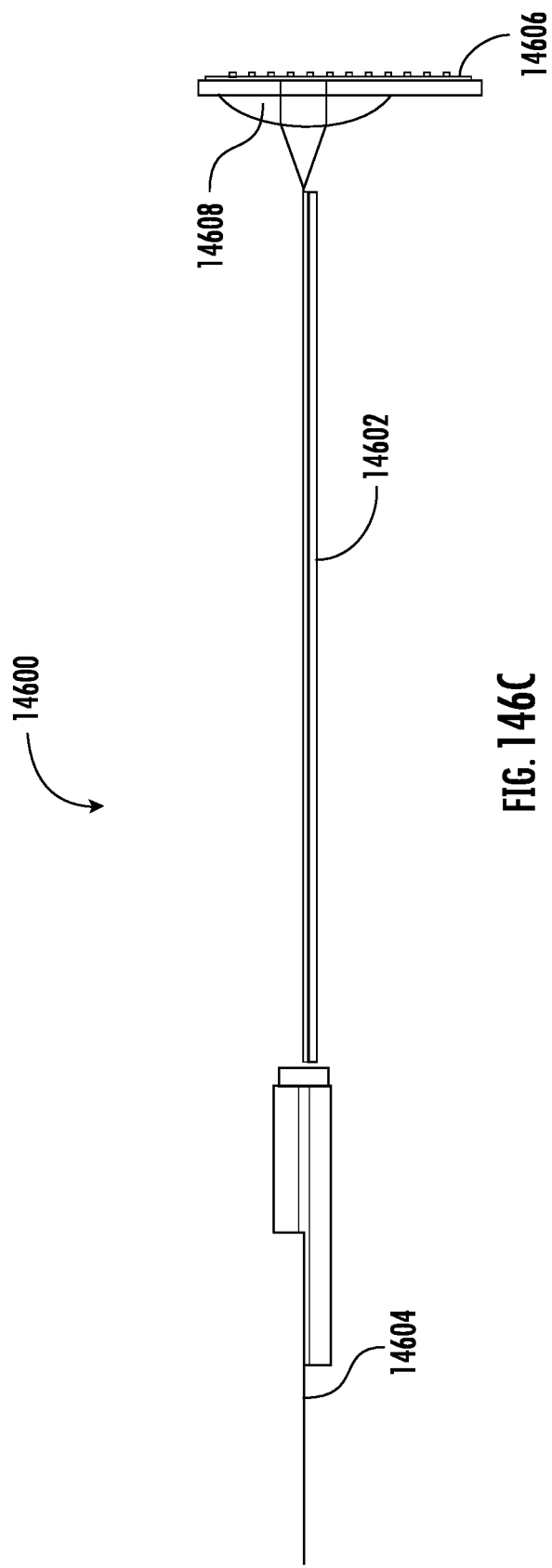
Figure 146D:
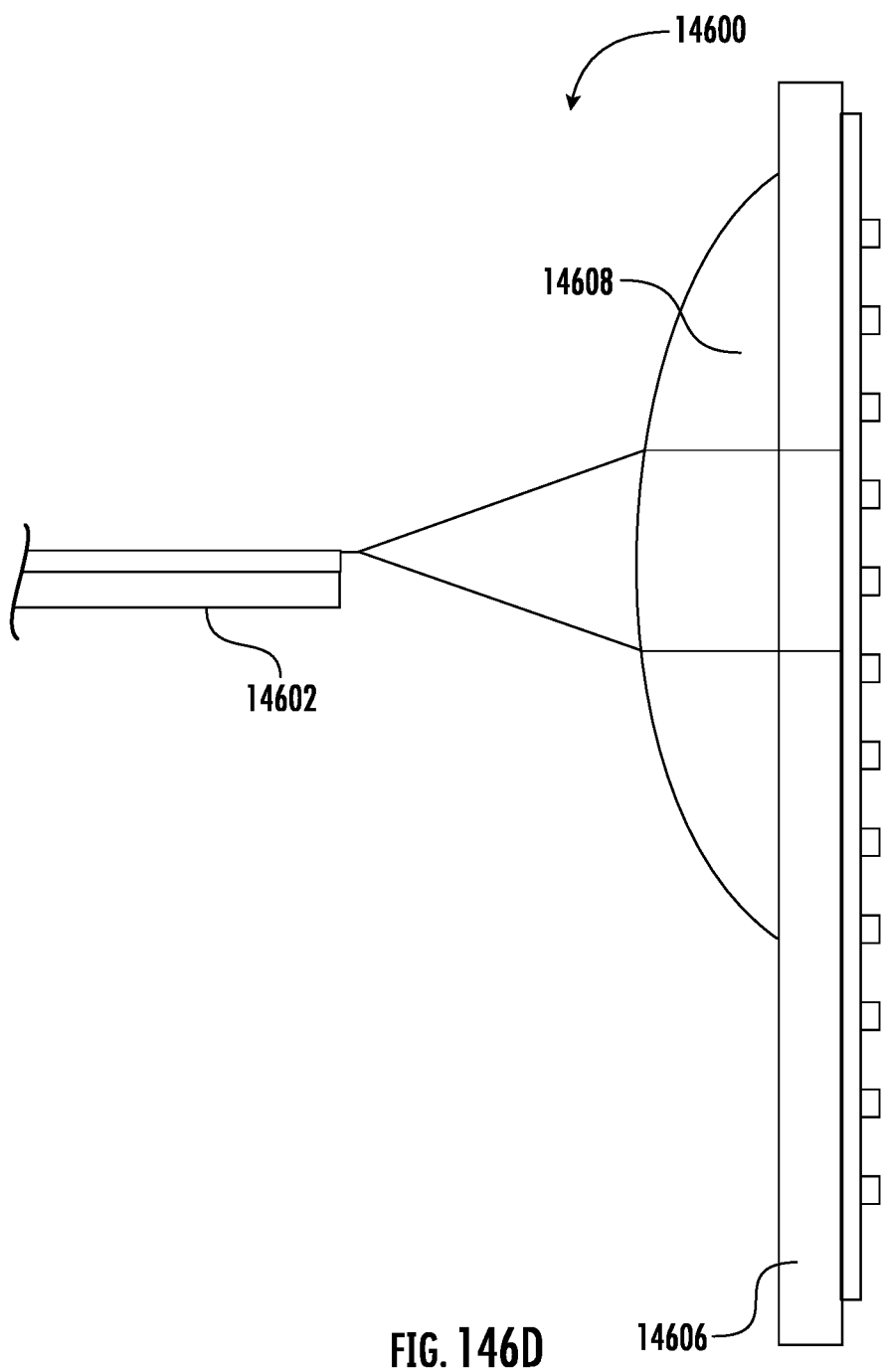
Figure 147A:
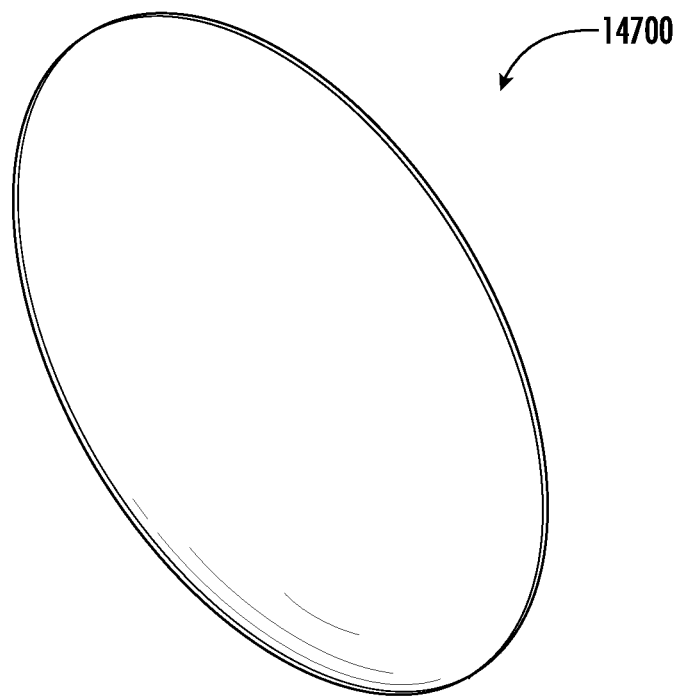
Figure 147B:
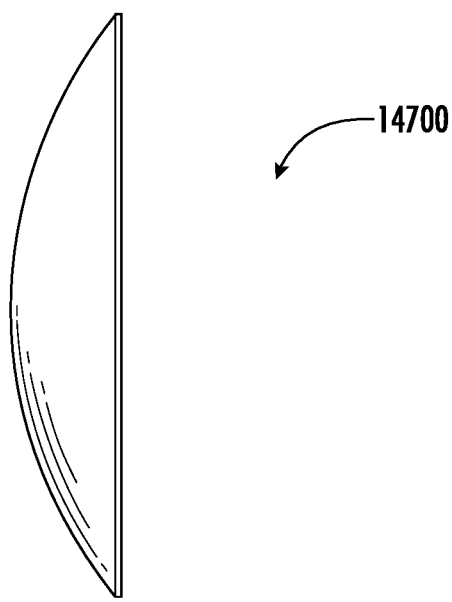

FIG. 86A illustrates an example perspective view of the waveguide cartridge in accordance with various examples of the present disclosure;

FIG. 86B illustrates an example perspective view of the waveguide cartridge in accordance with various examples of the present disclosure;

FIG. 86C illustrates an example exploded view of the waveguide cartridge in accordance with various examples of the present disclosure;

FIG. 86D illustrates an example top view of the waveguide cartridge in accordance with various examples of the present disclosure;

FIG. 86E illustrates an example side view of the waveguide cartridge in accordance with various examples of the present disclosure;

FIG. 86F illustrates an example bottom view of the waveguide cartridge in accordance with various examples of the present disclosure;

FIG. 87A illustrates an example perspective view of the waveguide in accordance with various examples of the present disclosure;

FIG. 87B illustrates an example top view of the waveguide in accordance with various examples of the present disclosure;

FIG. 87C illustrates an example side view of the waveguide in accordance with various examples of the present disclosure;

FIG. 88A illustrates an example perspective view of the flow channel plate in accordance with various examples of the present disclosure;

FIG. 88B illustrates an example top view of the flow channel plate in accordance with various examples of the present disclosure;

FIG. 88C illustrates an example cross-sectional view of the flow channel plate in accordance with various examples of the present disclosure;

FIG. 88D illustrates an example side view of the flow channel plate in accordance with various examples of the present disclosure;

FIG. 89A illustrates an example perspective view of the cartridge body in accordance with various examples of the present disclosure;

FIG. 89B illustrates an example perspective view of the cartridge body 8900 in accordance with various examples of the present disclosure;

FIG. 89C illustrates an example top view of the cartridge body in accordance with various examples of the present disclosure;

FIG. 89D illustrates an example bottom view of the cartridge body in accordance with various examples of the present disclosure;

FIG. 89E illustrates an example side view of the cartridge body in accordance with various examples of the present disclosure;

FIG. 90A illustrates an example perspective view of the fluid cover in accordance with various examples of the present disclosure;

FIG. 90B illustrates an example perspective view of the fluid cover in accordance with various examples of the present disclosure;

FIG. 90C illustrates an example top view of the fluid cover in accordance with various examples of the present disclosure;

FIG. 90D illustrates an example side view of the fluid cover in accordance with various examples of the present disclosure;

FIG. 90E illustrates an example bottom view of the fluid cover in accordance with various examples of the present disclosure;

FIG. 91A illustrates an example perspective view of the exhaust filter in accordance with various examples of the present disclosure;

FIG. 91B illustrates an example side view of the exhaust filter in accordance with various examples of the present disclosure;

FIG. 91C illustrates an example bottom view of the exhaust filter in accordance with various examples of the present disclosure;

FIG. 92A illustrates an example perspective view of the cartridge cover in accordance with various examples of the present disclosure;

FIG. 92B illustrates an example top view of the cartridge cover in accordance with various examples of the present disclosure;

FIG. 92C illustrates an example side view of the cartridge cover in accordance with various examples of the present disclosure;

FIG. 93A illustrates an example block diagram of an example system in accordance with various examples of the present disclosure;

FIG. 93B illustrates an example block diagram of an example system in accordance with various examples of the present disclosure;

FIG. 94A, FIG. 94B, FIG. 94C, FIG. 94D, and FIG. 94E illustrate an example sample testing device 9400 in accordance with various embodiments of the present disclosure;

FIG. 95A, FIG. 95B, FIG. 95C, FIG. 95D, FIG. 95E, FIG. 95F, FIG. 95G, FIG. 95H, FIG. 95I, and FIG. 95J illustrate an example sample testing device in accordance with various embodiments of the present disclosure;

FIG. 96A, FIG. 96B, and FIG. 96C illustrate an example multiport valve in accordance with various embodiments of the present disclosure;

FIG. 97A and FIG. 97B illustrate an example sample testing device in accordance with various embodiments of the present disclosure;

FIG. 98A, FIG. 98B, and FIG. 98C illustrate an example multiport valve in accordance with various embodiments of the present disclosure;

FIG. 99A and FIG. 99B illustrate example valve in accordance with various embodiments of the present disclosure;

FIG. 100A, FIG. 100B, and FIG. 100C illustrate an example method for manufacturing a sample testing device in accordance with various embodiments of the present disclosure;

FIG. 101 illustrates an example sample testing device in accordance with various embodiments of the present disclosure;

FIG. 102A, FIG. 102B, FIG. 102C, FIG. 102D, and FIG. 102E illustrate an example waveguide in accordance with various embodiments of the present disclosure;

FIG. 103A, FIG. 103B, FIG. 103C, and FIG. 103D illustrate an example waveguide;

FIG. 104A, FIG. 104B, and FIG. 104C illustrate an example sample testing device in accordance with various embodiments of the present disclosure;

FIG. 105A, FIG. 105B, FIG. 105C, FIG. 105D illustrate an example light source coupler in accordance with various embodiments of the present disclosure;

FIG. 106A and FIG. 106B illustrate an example optical fiber holder in accordance with various embodiments of the present disclosure;

FIG. 107 illustrates an example waveplate in accordance with various embodiments of the present disclosure;

FIG. 108 illustrates an example light source coupler in accordance with various embodiments of the present disclosure;

FIG. 109A, FIG. 109B, and FIG. 109C illustrate an example micro lens array in accordance with various embodiments of the present disclosure;

FIG. 110 illustrates an example method in accordance with various embodiments of the present disclosure;

FIG. 111 illustrates an example method in accordance with various embodiments of the present disclosure;

FIG. 112A and FIG. 112B provide example diagrams illustrating an example waveguide in accordance with various embodiments of the present disclosure;

FIG. 113A and FIG. 113B provide example diagrams illustrating example signal magnitudes from channels in an example waveguide in accordance with various embodiments of the present disclosure;

FIG. 114A and FIG. 114B provide example diagrams illustrating example signal magnitudes from channels in an example waveguide in accordance with various embodiments of the present disclosure;

FIG. 115A, FIG. 115B, and FIG. 115C provide example diagrams illustrating example signal magnitudes from channels in an example waveguide in accordance with various embodiments of the present disclosure;

FIG. 116 provides an example diagram illustrating example signal magnitudes from channels in an example waveguide in accordance with various embodiments of the present disclosure;

FIG. 117 provides an example diagram illustrating example signal magnitudes from channels in an example waveguide in accordance with various embodiments of the present disclosure;

FIG. 118 provides an example diagram illustrating example signal magnitudes from channels in an example waveguide in accordance with various embodiments of the present disclosure;

FIG. 119 provides an example diagram illustrating example signal magnitudes from channels in an example waveguide in accordance with various embodiments of the present disclosure;

FIG. 120 provides an example diagram illustrating example signal magnitudes from channels in an example waveguide in accordance with various embodiments of the present disclosure;

FIG. 121 provides an example diagram illustrating example signal magnitudes from channels in an example waveguide in accordance with various embodiments of the present disclosure;

FIG. 122 illustrates an example method in accordance with various embodiments of the present disclosure;

FIG. 123 illustrates an example method in accordance with various embodiments of the present disclosure;

FIG. 124A, FIG. 124B, and FIG. 124C illustrate example views of an example sample testing device in accordance with various embodiments of the present disclosure;

FIG. 125A and FIG. 125B illustrate example views of an example imager baffle component in accordance with various embodiments of the present disclosure;

FIG. 126A, FIG. 126B, and FIG. 126C illustrate example views of an example imager baffle component in accordance with various embodiments of the present disclosure;

FIG. 127 illustrates an example sample testing device in accordance with various embodiments of the present disclosure;

FIG. 128 illustrates an example system in accordance with various embodiments of the present disclosure;

FIG. 129 illustrates an example controller in accordance with various embodiments of the present disclosure;

FIG. 130 illustrates an example method in accordance with various embodiments of the present disclosure;

FIG. 131 illustrates an example graph in accordance with various embodiments of the present disclosure;

FIG. 132 illustrates an example method in accordance with various embodiments of the present disclosure;

FIG. 133A, FIG. 133B, and FIG. 133C illustrate an example method in accordance with various embodiments of the present disclosure;

FIG. 134A illustrates an example sample testing device in accordance with various embodiments of the present disclosure;

FIG. 134B illustrates an example sample testing device in accordance with various embodiments of the present disclosure;

FIG. 135A illustrates an example side view of an example sample testing device with an example wavelength adjustment device in accordance with various embodiments of the present disclosure;

FIG. 135B illustrates an example cross-section view of an example wavelength adjustment device in accordance with various embodiments of the present disclosure;

FIG. 136 illustrates an example block diagram of example components associated with a wavelength adjustment device and an imaging component in accordance with various embodiments of the present disclosure;

FIG. 137A and FIG. 137B illustrate an example method of operating a wavelength adjustment device in a continuous wavelength sweeping mode in accordance with some embodiments of the present disclosure;

FIG. 138 illustrates an example method of operating a wavelength adjustment device in a direct wavelength setting mode in accordance with various embodiments of the present disclosure;

FIG. 139 illustrates an example graph showing data correlations between voltage value data and wavelength value data of an example voltage correlation data object in accordance with various embodiments of the present disclosure;

FIG. 140 illustrates an example method of determining a sample type of a sample in the sample mixture in accordance with various embodiments of the present disclosure;

FIG. 141 illustrates an example block diagram showing example components of a sample type determination device in accordance with various embodiments of the present disclosure;

FIG. 142A and FIG. 142B illustrate an example method of determining a sample type associated with a sample in accordance with various embodiments of the present disclosure;

FIG. 143A illustrates an example perspective view of an example waveguide in accordance with various embodiments of the present disclosure;

FIG. 143B illustrates an example zoomed view of at least a portion of an example waveguide in accordance with various embodiments of the present disclosure;

FIG. 144A illustrates an example exploded view of the example waveguide cartridge in accordance with various embodiments of the present disclosure;

FIG. 144B illustrates another example exploded view of the example waveguide cartridge in accordance with various embodiments of the present disclosure;

FIG. 144C illustrates an example top view of an example waveguide cartridge in accordance with various embodiments of the present disclosure;

FIG. 144D illustrates an example side view of the example waveguide cartridge in accordance with various embodiments of the present disclosure;

FIG. 144E illustrates an example bottom view of the example waveguide cartridge in accordance with various embodiments of the present disclosure;

FIG. 144F illustrates an example perspective view of the example waveguide cartridge in accordance with various embodiments of the present disclosure;

FIG. 144G illustrates an example left view of the example waveguide cartridge in accordance with various embodiments of the present disclosure;

FIG. 145A illustrates an example top view of an example cartridge body in accordance with various embodiments of the present disclosure;

FIG. 145B illustrates an example bottom view of the example cartridge body in accordance with various embodiments of the present disclosure;

FIG. 145C illustrates an example cross section view of the example cartridge body in accordance with various embodiments of the present disclosure;

FIG. 145D illustrates an example perspective view of the example cartridge body in accordance with various embodiments of the present disclosure;

FIG. 145E illustrates an example perspective view of the example cartridge body in accordance with various embodiments of the present disclosure;

FIG. 145F illustrates an example left view of the example cartridge body in accordance with various embodiments of the present disclosure;

FIG. 146A illustrates an example perspective view of an example sample testing device in accordance with various embodiments of the present disclosure;

FIG. 146B illustrates an example zoomed view of at least a portion of the example sample testing device in accordance with various embodiments of the present disclosure;

FIG. 146C illustrates an example side view of the example sample testing device in accordance with various embodiments of the present disclosure;

FIG. 146D illustrates another example zoomed view of at least a portion of the example sample testing device in accordance with various embodiments of the present disclosure;

FIG. 147A illustrates an example perspective view of an example field lens in accordance with various embodiments of the present disclosure; and FIG. 147B illustrates an example side view of the example field lens in accordance with various embodiments of the present disclosure.

DETAILED DESCRIPTION OF THE INVENTION

Some examples of the present disclosure will now be described more fully hereinafter with reference to the accompanying drawings, in which some, but not all examples of the disclosure are shown. Indeed, these disclosures may be embodied in many different forms and should not be construed as limited to the examples set forth herein; rather, these examples are provided so that this disclosure will satisfy applicable legal requirements. Like numbers refer to like elements throughout.

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Interferometry refers to mechanisms and/or techniques that may cause one or more waves, beams, signals, and/or the like (including, but not limited to, optical light beams, electromagnetic waves, sound waves, and/or the like) to overlap, superimpose and/or interfere with one another. Interferometry may provide a basis for various methods, apparatus, and systems for sensing (including, but not limited to, detecting, measuring, and/or identifying) object(s), substance(s), organism(s), chemical and/or biological solution(s), and/or the like.

In accordance with examples of the present disclosure, various methods, apparatus, and systems for sensing (including, but not limited to, detecting, measuring, and/or identifying) object(s), substance(s), organism(s), chemical and/or biological solution(s), compounds, and/or the like may be based on interferometry. For example, an "interferometry-based sample testing device" or a "sample texting device" may be an instrument that may output one or more measurements based on inference(s), superimposition(s) and/or overlap(s) of two or more waves, beams, signals, and/or the like that may, for example, transmit energy (including, but not limited to, optical light beams, electromagnetic waves, sound waves, and/or the like).

Figure 1:
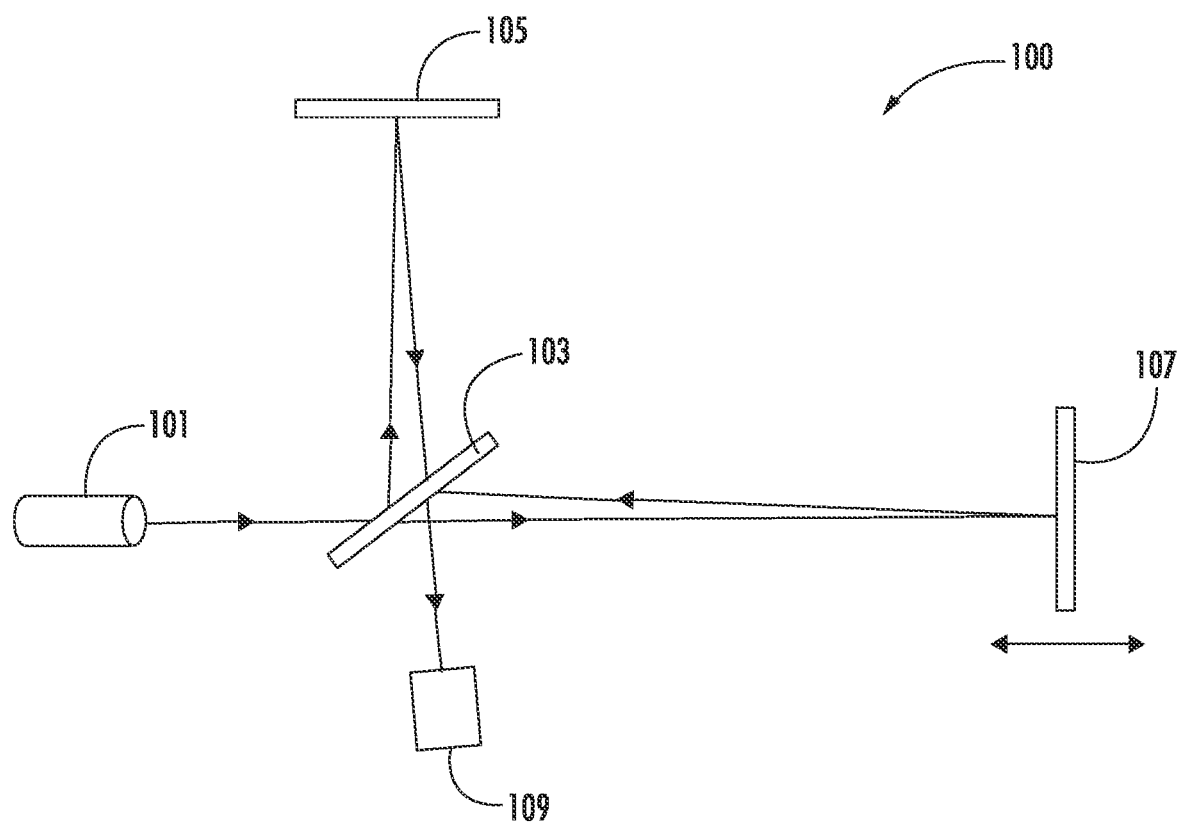
FIG. 1 illustrates an example block diagram illustrating an example sample testing device in accordance with various examples of the present disclosure.

In some examples, an interferometry-based sample testing device may compare, contrast, and/or distinguish the positions or surface structures of two or more object(s), substance(s), organism(s), chemical and/or biological solution(s), compounds, and/or the like. Referring now to FIG. 1, an example block diagram illustrating an example sample testing device 100 is shown. In some examples, the example sample testing device 100 may be an interferometry-based sample testing device, such as, but not limited to, an amplitude interferometer.

In the example shown in FIG. 1, the sample testing device 100 may comprise a light source 101, a beam splitter 103, a reference surface component 105, a sample surface component 107, and/or an imaging component 109.

In some examples, the light source 101 may be configured to produce, generate, emit, and/or trigger the production, generation, and/or emission of light. The example light source 101 may include, but is not limited to, laser diodes (for example, violet laser diodes, visible laser diodes, edge-emitting laser diodes, surface-emitting laser diodes, and/or the like. Additionally, or alternatively, the light source 101 may include, but not limited to, incandescent based light sources (such as, but not limited to, halogen lamp, nernst lamp), luminescent based light sources (such as, but not limited to, fluorescence lamps), combustion based light sources (such as, but not limited to, carbide lamps, acetylene gas lamps), electric arc based light sources (such as, but not limited to, carbon arc lamps), gas discharge based light sources (such as, but not limited to, xenon lamp, neon lamps), high-intensity discharge based light sources (HID) (such as, but not limited to, hydrargyrum quartz iodide (HQI) lamps, metal-halide lamps). Additionally, or alternatively, the light source 101 may comprise one or more light-emitting diodes (LEDs). Additionally, or alternatively, the light source 101 may comprise one or more other forms of natural and/or artificial sources of light.

In some examples, the light source 101 may be configured to generate light having a spectral purity within a predetermined threshold. For example, the light source 101 may comprise a laser diode that may generate a single-frequency laser beam. Additionally, or alternatively, the light source 101 may be configured to generate light that having variances in spectral purity. For example, the light source 101 may comprise a laser diode that may generate a wavelength-tunable laser beam. In some examples, the light source 101 may be configured to generate light having a broad optical spectrum.

In the example shown in FIG. 1, the light generated, emitted, and/or triggered by the light source 101 may travel through a light path and arrive at the beam splitter 103. In some examples, the beam splitter 103 may comprise one or more optical elements that may be configured to divide, split, and/or separate the light into two or more divisions, portions, and/or beams. For example, the beam splitter 103 may comprise a plater beam splitter. The plater beam splitter may comprise a glass plate. One or more surfaces of the flat glass plate may be coated with one or more chemical coatings. For example, the glass plate may be coated with a chemical coating such that at least a portion of the light may be reflected from the glass plate and at least another portion of the light may be transmitted through the glass plate. In some examples, the plater beam splitter may be positioned at a 45 degree angle with respect to the angle of the input light. In some examples, the plater beam splitter may be positioned at other angles.

While the description above provides example(s) of the beam splitter 103, it is noted that the scope of the present disclosure is not limited to the description above. In some examples, an example beam splitter 103 may comprise one or more additional and/or alternative elements. For example, the beam splitter 103 may comprise a cube beam splitter element. In this example, the cube beam splitter element may comprise two right angle prisms that are attached to one another. For example, one lateral or oblique surface of one right angle prism may be attached to one lateral or oblique surface of the other right angle prism. In some examples, that the two right angle prisms may form a cube shape. Additionally, or alternatively, the beam splitter 103 may comprise other elements.

While the description above provides glass as an example material for the beam splitter 103, it is noted that the scope of the present disclosure is not limited to the description above. In some examples, an example beam splitter 103 may comprise one or more additional and/or alternative materials, such as, but not limited to, clear plastic, optical fiber materials, and/or the like. Additionally, or alternatively, the beam splitter 103 may comprise other materials.

In the example shown in FIG. 1, the beam splitter 103 may split the light received from the light source 101 to at least two portions. For example, a first portion of the light may be reflected from the beam splitter 103 may arrive at the reference surface component 105. A second portion of the light may be transmitted through the beam splitter 103 and arrive at the sample surface component 107.

In the present disclosure, the term "surface component" refers to a physical structure that may be configured to allow at least a portion of the waves, beams, signals, and/or the like that it receives to pass through and/or reflect at least a portions of the waves, beams, signals, and/or the like that it receives. In some examples, an example surface component may comprise one or more optical components, including one or more reflective optical components and/or one or more transmissive optical components. For example, an example surface component may comprise mirrors, retroreflectors, and/or the like. Additionally, or alternatively, the surface component may comprise one or more lenses, filters, windows, optical flats, prisms, polarizers, beam splitters, wave plates, and/or the like.

In the example shown in FIG. 1, the example sample testing device may comprise two surface components: a reference surface component 105 and a sample surface component 107. In some examples, the reference surface component 105 and/or the sample surface component 107 may comprise one or more optical components such as, but not limited to, those described above. As will be described in detail herein, a reference medium may be in contact with at least a portion of a surface of the reference surface component 105, and/or a sample medium may be in contact with at least a portion of a surface of the sample surface component 107.

In the example shown in FIG. 1, the reference surface component 105 and the sample surface component 107 each reflect at least a beam of the light back to the beam splitter 103. For example, the reference surface component 105 may reflect at least a beam of the first portion of the light back to the beam splitter 103. The sample surface component 107 may reflect at least a beam of the second portion of the light back to the beam splitter 103.

In some examples, the beam of light reflected from the reference surface component 105 and the beam of light reflected from the sample surface component 107 may be at least partially recombined and/or rejoined at the beam splitter 103.

For example, the reference surface component 105 and the sample surface component 107 may be in a perpendicular arrangement with one another (such as the example shown in FIG. 1). In such an example, the beam of light reflected from the reference surface component 105 and the beam of light reflected from the sample surface component 107 may be recombined by the beam splitter 103 into at least one beam of light that may travel towards the imaging component 109. Additionally, or alternatively, the beam splitter 103 may reflect at least some of the beam of light from the reference surface component 105 and the beam of light from the sample surface component 107 back to the light source 101.

In some examples, the recombination of beams of lights may occur at a location different from the beam splitter 103. For example, the beam splitter 103 may comprise one or more retroreflectors. In such an example, the beam splitter 103 may recombine light from the reference surface component 105 and the sample surface component 107 into two or more beams of light.

In some examples, observed intensity of the recombined beam of light varies depending on the amplitude and phase differences between the beam of light reflected from the reference surface component 105 and the beam of light reflected from the sample surface component 107.

For example, phase difference between the beam of light reflected from the reference surface component 105 and the beam of light reflected from the sample surface component 107 may occur when the beams travel along different lengths and/or directions of optical paths, which may be due to, for example, differences in form, texture, shape, tilt, and/or refractive index between the reference surface component 105 and/or the sample surface component 107. As described further herein, the refractive index may change due to, for example, the presence of one or more object(s), substance(s), organism(s), chemical and/or biological solution(s), compounds, and/or the like on the reference surface component 105 and/or the sample surface component 107.

In some examples, if the beam of light reflected from the reference surface component 105 and the beam of light reflected from the sample surface component 107 are exactly out of phase at the point at which they are recombined, the two beams of lights may cancel each other out, and the resulting intensity may be zero. This is also referred to as "destructive interference."

In some examples, if the beam of light reflected from the reference surface component 105 and the beam of light reflected from the sample surface component 107 are equal in intensity and are exactly in phase at the point at which they are recombined, the resultant intensity may be four times that of either beam individually. This is also referred to as "constructive interference."

Additionally, or alternatively, if the beam of light reflected from the reference surface component 105 and the beam of light reflected from the sample surface component 107 are spatially extended, there may be the variations over a surface area in the relative phase of wave fronts comprising the two beams. For example, alternating regions of constructive interference and destructive interference may produce alternating bright bands and dark bands, creating an interference fringe pattern. Example details of the interference fringe pattern are described and illustrated further herein.

In the example shown in FIG. 1, the example sample testing device 100 may comprise an imaging component 109 that may be configured to detect, measure, and/or identify the interference fringe pattern. For example, the imaging component 109 may be positioned on the travel path of the recombined light beam form the beam splitter 103.

In the present disclosure, the term "imaging component" refers to a device, instrument, and/or apparatus that may be configured to detect, measure, capture, and/or identify an image and/or information associated with an image. In some examples, the imaging component may comprise one or more imagers and/or image sensors (such as an integrated 1D, 2D, or 3D image sensor). Various examples of the image sensors may include, but are not limited to, a contact image sensor (CIS), a charge-coupled device (CCD), or a complementary metal-oxide semiconductor (CMOS) sensor, a photodetector, one or more optical components (e.g., one or more lenses, filters, mirrors, beam splitters, polarizers, etc.), autofocus circuitry, motion tracking circuitry, computer vision circuitry, image processing circuitry (e.g., one or more digital signal processors configured to process images for improved image quality, decreased image size, increased image transmission bit rate, etc.), verifiers, scanners, cameras, any other suitable imaging circuitry, or any combination thereof.

In the example shown in FIG. 1, the imaging component 109 may receive the recombined light beam as the recombined light beam travels from the beam splitter 103. In some examples, the imaging component 109 may be configured to generate imaging data associated with the received light beam. In some examples, a processing component may be electronically coupled to the imaging component 109, and may be configured to analyze the imaging data to determine, for example but not limited to, the change in refractive index associated with the reference surface component 105 and/or the sample surface component 107, example details of which are described herein.

Additionally, or alternatively, based on the imaging data generated by the imaging component 109, a two-dimensional and/or a three-dimensional topographic image associated with the reference surface component 105 and/or the sample surface component 107 may be generated. For example, the imaging data may correspond to an interference fringe pattern as received by the imaging component 109, example details of which are described herein.

Additionally, or alternatively, based on the imaging data generated by the imaging component 109, the processing component may determine the difference between a first optical path length (between the sample surface component 107 and the beam splitter 103) and a second optical path length (between the reference surface component 105 and the beam splitter 103). For example, as described above, an interference fringe pattern may occur when there is at least a partial phase difference between the beam of light reflected from the reference surface component 105 and the beam of light reflected from the sample surface component 107. The phase difference may occur when the beams of light travel in different optical path lengths and/or directions, which may due in part to the differences in form, texture, shape, tilt, and/or refractive index between the reference surface component 105 and/or the sample surface component 107. As such, by analyzing the interference fringe pattern, the processing component may determine the phase difference. Based on the phase difference, the processing component may determine the path length difference between the first optical path length and the second optical path length based on, for example, the following formula:

$$\lambda = 2\pi \, Ln/\varphi$$

where φ corresponds to the phase difference, L corresponds to the path length difference, n corresponds to the refractive index, and A corresponds to the wavelength.

While the description above provides example(s) of sample testing devices based on interferometry, it is noted that the scope of the present disclosure is not limited to the description above. In some examples, an example sample testing device may comprise one or more additional and/or alternative elements, and/or these elements may be arranged and/or positioned differently than those illustrated above.

In some examples, an example sample testing device may comprise parallel surface components. For example, the reference surface component and the sample surface component may be positioned in a parallel arrangement with one another, such that light beams may bounce between the reference surface component and the sample surface component. For example, the light beam may be reflected from the reference surface component to the sample surface component, which may then in turn be reflected from the sample surface component to the reference surface component. In some examples, one or both of the sample surface component and the reference surface component may be coated with reflective coatings on one or both sides. In some examples, one or both of the reference surface component and the sample surface component may have a transmission ratio that is targeted at one or more specific optical frequencies. For example, the sample surface component may allow light within an optical frequency to pass through the sample surface component and arrive at an imaging component. Based on the interference fringe pattern associated with the light within the optical frequency, the sample testing device may detect, measure, and/or identify changes in form, texture, shape, tilt, and/or refractive index between the reference surface component and/or the sample surface component.

In some examples, an example sample testing device may utilize counterpropagating beams of light. For example, the beam of light from the light source may be split by the beam splitter into two beams of light that may travel at opposite directions following a common optical path. In some examples, one or more surface components may be positioned such that two beams of light form a closed loop. As an example, the example sample testing device may comprise three surface elements. The three surface elements and the beam splitter may each be positioned at a corner of a square shape, such that the optical path of the beams of light may form the square shape. In some examples, the sample testing device may provide different polarization states.

In some examples, additionally, or alternatively, an example sample testing device may include one or more optical fibers in the beam splitter. In some examples, an example sample testing device may comprise optical fiber in the form of fiber coupler(s). For example, the example sample testing device may comprise a fiber polarization controller to control the polarization state of the light as it travels through the fiber coupler. Additionally, or alternatively, the sample testing device may comprise optical fiber in the form of polarization-maintaining fibers.

In some examples, an example sample testing device may comprise two or more separate beam splitters. As an example, the first beam splitter may split the light beam into two or more portions, and the second beam splitter may combine two or more portions of light beams into a single light beam. In such an example, the sample testing device may produce two or more interference fringe patterns, and one of the beam splitters may direct the two or more interference fringe patterns to one or more imaging components. In some examples, the distance between the reference surface component and the beam splitter and the distance between the sample surface component and the beam splitter may be different. In some examples, the distance between the reference surface component and the beam splitter and the distance between the sample surface component and the beam splitter may be the same.

For example, the sample testing device may comprise a Mach-Zehnder interferometer. In such examples, the optical path lengths in the two arms of the Mach-Zehnder interferometer may be identical, or may be different (for example, with an extra delay line). In some examples, the distribution of optical powers at the two outputs of Mach-Zehnder interferometer may depend on the difference in optical arm lengths and on the wavelength (or optical frequency), which may be adjusted (for example, by slightly changing the position of the sample surface component and/or the reference surface component).

In some examples, the sample testing device may comprise a Fabry-Perot interferometer. In some examples, the sample testing device may comprise a Gires-Tournois interferometer. In some examples, the sample testing device may comprise a Michelson interferometer. In some examples, the sample testing device may comprise a Sagnac interferometer. Additionally, or alternatively, the sample testing device may comprise other types and/or forms of interferometers.

An example sample testing device in accordance with examples of the present disclosure may be implemented in one or more environments, uses case, applications, and/or purposes. As described above, the relationship between the phase difference (p, path length difference L, refractive index n, and the wavelength A may be summarized by the following formula:

$$n = \frac{\lambda \times \varphi}{2 \times \pi \times L}$$

In some examples, an example sample testing device in accordance with examples of the present disclosure may be implemented to measure an optical system performance, surface roughness, and/or surface contact condition change (for example, a wet surface). Additionally, or alternatively, an example sample testing device in accordance with examples of the present disclosure may be implemented to measure deviations and/or degree of flatness of an optical surface.

In some examples, an example sample testing device in accordance with examples of the present disclosure may be utilized to measure a distance, changes to a position, and/or a displacement. In some examples, an example sample testing device in accordance with examples of the present disclosure may be implemented to calculate a rotational angle.

In some examples, an example sample testing device in accordance with examples of the present disclosure may be utilized to measure the wavelength of a light source and/or the wavelength components of a light source. For example, the example sample testing device may be configured as a wave meter to measure the wavelength of a laser beam. In some examples, an example sample testing device in accordance with examples of the present disclosure may be implemented to monitor changes in an optical wavelength or frequency. Additionally, or alternatively, an example sample testing device in accordance with examples of the present disclosure may be implemented to measure a linewidth of a laser.

In some examples, an example sample testing device in accordance with examples of the present disclosure may be implemented to modulate the power or phase of a laser beam. In some examples, an example sample testing device in accordance with examples of the present disclosure may be implemented to measure the chromatic dispersion of optical components as an optical filter.

Figure 2:
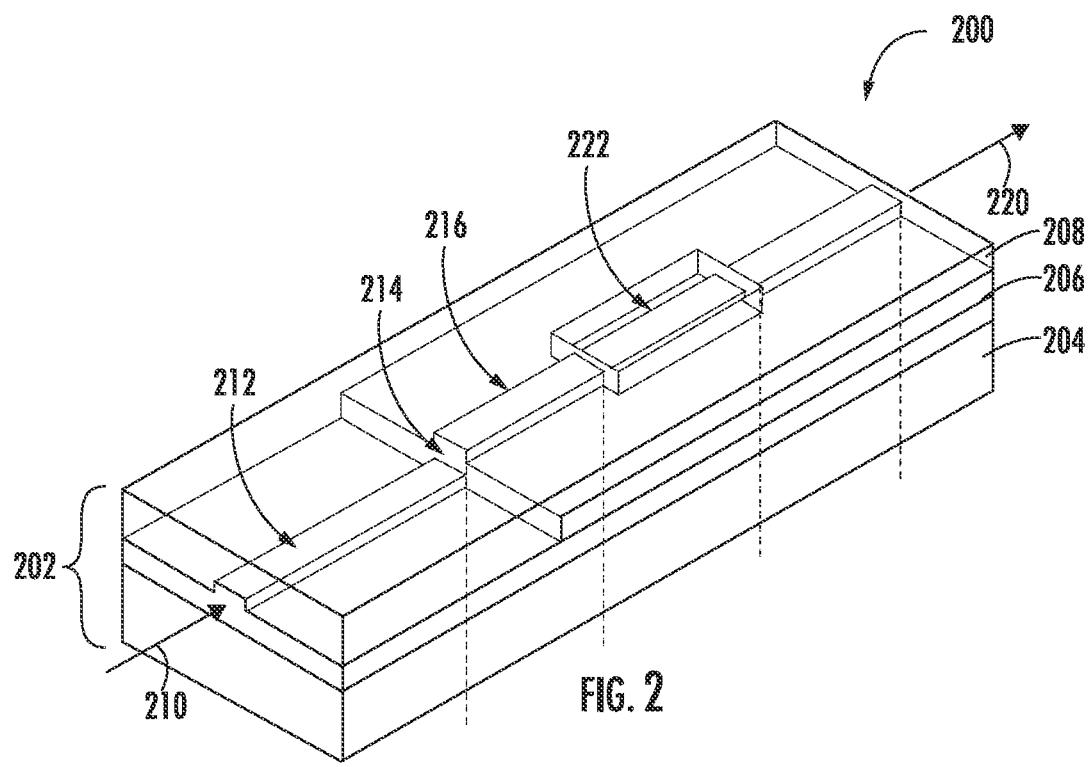
FIG. 2 illustrates an example sample testing device comprising an example waveguide in accordance with various examples of the present disclosure.

In some examples, an example sample testing device in accordance with examples of the present disclosure may be implemented to determine a change in the refractive index of a surface component. Referring now to FIG. 2, an example diagram showing an example sample testing device 200 is illustrated. In some examples, the example sample testing device 200 may be implemented to detect, measure, and/or identify refractive index variations and/or changes. In some examples, the example sample testing device 200 may be an interferometry-based sample testing device.

In the example shown in FIG. 2, the example sample testing device 200 may comprise a waveguide 202. As used herein, the terms "waveguide," "waveguide device," "waveguide component" may be used interchangeably to refer to a physical structure that may guide waves, beams, signals, and/or the like (including, but not limited to, optical light beams, electromagnetic waves, sound waves, and/or the like). Example structures of waveguide are illustrated herein.

In some examples, the waveguide 202 may comprise one or more layers. For example, the waveguide 202 may comprise an interface layer 208, a waveguide layer 206, and a substrate layer 204.

In some examples, the interface layer 208 may comprise material(s) such as, but not limited to, glass, silicon oxide, polymer, and/or the like. In some examples, In some examples, the interface layer 208 may be disposed on top of the waveguide layer 206 through various means, including but not limited to, mechanical means (for example, a binding clip) and/or chemical means (such as the use of adhesive material (e.g. glue)).

In some examples, the waveguide layer 206 may comprise material such as, but not limited to, silicon oxide, silicon nitride, polymer, glass, optic fiber, and/or the like that may guide the guide waves, beams, signals, and/or the like as they propagate through the waveguide layer 206. In some examples, the waveguide layer 206 may provide a physical constraint for the propagation such that minimal loss of energy is achieved. In some examples, the waveguide layer 206 may be disposed on top of the substrate layer 204 through various means, including but not limited to, mechanical means (for example, a binding clip) and/or chemical means (such as the use of adhesive material (e.g. glue)).

In some examples, the substrate layer 204 may provide mechanical support for the waveguide layer 206 and the interface layer 208. For example, the substrate layer 204 may comprise material such as, but not limited to, glass, silicon oxide, and polymer.

In the example shown in FIG. 2, the light (for example, from a light source such as the light source as shown above in connection with FIG. 1) may be directed to, emitted through, and/or otherwise enter the waveguide 202.

In some examples, the light may enter the waveguide 202 through a side surface of the waveguide 202. For example, as shown in FIG. 2, light may enter the waveguide 202 through a side surface at the optical direction 210, and the optical path of the light may be in a perpendicular arrangement with the side surface. In some examples, the light source may be coupled to the side surface of the waveguide 202 through one or more fastening mechanisms and/or attaching mechanisms, including not limited to, chemical means (for example, adhesive material such as glues), mechanical means (for example, one or more mechanical fasteners or methods such as soldering, snap-fit, permanent and/or non-permeant fasteners), magnetic means (for example, through the use of magnet(s)), and/or suitable means.

While the description above provides an example of the direction where the light may enter the waveguide 202, it is noted that the scope of the present disclosure is not limited to the description above. In some examples, the light may additionally, or alternatively, enter the waveguide 202 at a different surface and/or at a different direction. For example, the light may enter the waveguide 202 from a top surface of the waveguide 202. Additionally, or alternatively, the light may enter the waveguide 202 from a bottom surface of the waveguide 202. Additional details are described herein.

Referring back to FIG. 2, the waveguide 202 may comprise a first waveguide portion 212.

In some examples, the first waveguide portion 212 may be configured to provide, support, and/or cause a single transversal mode of the light as it travels through the first waveguide portion 212. As used herein, the term "transverse mode," "transversal mode," or "vertical mode" refers to a pattern of waves, beams, and/or signals that may be in a perpendicular plane or arrangement to the propagation direction of the waves, beams, and/or signals. For example, the pattern may be associated with an intensity pattern of light radiation that is measured along a line formed by a plane that is perpendicular to the propagation direction of the light, and/or a plane that is perpendicular to the first waveguide portion 212. In some examples, transverse modes may be categorized into, including but not limited to, transverse electromagnetic (TEM) modes, transverse electric (TE) modes, and transverse magnetic (TM) modes. For example, in the TEM modes, there is neither electric field nor magnetic field in the direction of light propagation. In the TE modes, there is no electric field in the direction of light propagation. In the TM modes, there is no magnetic field in the direction of light propagation.

As an example, when laser light travels through a confined channel (such as, but not limited to, the first waveguide portion 212), the laser light may form one or more modes. For example, the laser light may form a peak mode 0. In some examples, the laser light may form modes in addition to the peak mode 0. In some examples, the size and the thickness of a waveguide or waveguide portion may affect the number of modes of laser light as it propagates through the waveguide or the waveguide portion.

In some examples, the first waveguide portion 212 may have a thickness lower than the optical wavelength of the light that travels through the first waveguide portion 212. In some examples, the first waveguide portion 212 may have a thickness of a quarter of the wavelength. In some examples, the first waveguide portion 212 may have a thickness between 0.1 um and 0.2 um, which may limit the light to only one single mode. In some examples, the thickness of the first waveguide portion 212 may be of other value(s).

While the description above provides example characteristics of the first waveguide portion 212 associated with the transverse mode, it is noted that the scope of the present disclosure is not limited to the description above. In some examples, the first waveguide portion 212 may be configured to provide, support, and/or cause two or more transversal modes as the light travels through the first waveguide portion 212. Additionally, or alternatively, the first waveguide portion 212 may be configured to provide, support, and/or cause one or more longitudinal modes. As used herein, the term "longitudinal mode," or "horizontal mode" refers to a pattern of waves, beams, and/or signals that may be in a parallel plane or arrangement to the propagation direction of the waves, beams, and/or signals. For example, the pattern may be associated with an intensity pattern of light radiation that is measured along a line formed by a plane that is parallel to the propagation direction of the light, and/or a plane that is perpendicular to the first waveguide portion 212. In some examples, the longitudinal mode may be categorized into different types.

Referring back to FIG. 2, the waveguide 202 may comprise a step portion 214 and/or a second waveguide portion 216. In some examples, step portion 214 may correspond to a portion of the waveguide 202 having an increased thickness. For example, the thickness of the waveguide 202 may increase from the thickness of the first waveguide portion 212 to a thickness of the second waveguide portion 216.

In some examples, the thickness of the second waveguide portion 216 may be twice the thickness of the first waveguide portion 212. In some examples, the ratio between the thickness of the first waveguide portion 212 and the second waveguide portion 216 may be other value(s).

In the example shown in FIG. 2, the step portion 214 may comprise a vertical surface that protrudes from and disposed perpendicular to a top surface of the first waveguide portion 212. It is noted that the scope of the present disclosure is not limited to this example only. In some examples, the step portion 214 may comprise a curved surface. Additionally, or alternatively, the step portion 214 may comprise other shapes and/or in other forms.

As described above, the size and the thickness of a waveguide or waveguide portion may affect the number of modes of laser light as it propagates through the waveguide or the waveguide portion. In some examples, due to the increased thickness from the first waveguide portion 212 to the second waveguide portion 216 (e.g. a vertical asymmetry), the modes of laser light traveling from the first waveguide portion 212 to the second waveguide portion 216 may change. For example, the first waveguide portion 212 may be configured to provide, support, and/or cause a single transversal mode of the light as it travels through the first waveguide portion 212, and the second waveguide portion 216 may be configured to provide, support, and/or cause two transversal modes of the light as it travels through the second waveguide portion 216.

In some examples, the thickness of the second waveguide portion 216 may be larger than the thickness of the first waveguide portion 212. As such, the second waveguide portion 216 may allow more than one single mode as described above.

While the description above provides an example structure of a waveguide 202, it is noted that the scope of the present disclosure is not limited to the description above. For example, the waveguide layer 206 may comprise a first waveguide sub-layer and a second waveguide sub-layer. The second waveguide sub-layer may be disposed on a top surface of the first waveguide sub-layer, and the length of the second waveguide sub-layer may be shorter than the length of the first waveguide sub-layer. In such an example, the difference in lengths may increase the step portion 214, which may increase the thickness of the waveguide layer 206 from the thickness of the first waveguide sub-layer to the combined thickness of the first waveguide sub-layer and the second first waveguide sub-layer.

While the description above provides an example of changing the mode from a single transverse mode to two modes, it is noted that the scope of the present disclosure is not limited to the description above. For example, the number of mode(s) associated with the first waveguide portion 212 may be more than one, and the number of modes associated with the second waveguide portion 216 may be any value that is more than or less than the number of mode(s) associated with the first waveguide portion 212.

Continuing from the above example, two modes of light beams may propagate thought the second waveguide portion 216. For example, a first mode of light beam may have a different velocity than the second mode of light beam. In some examples, the first mode of light beam and the second mode of light beam may interfere with one another (for example, modal interference). In some examples, as the two modes of light beams exit the waveguide 202 in the optical direction 220, they may create an interference fringe pattern, similar to those described above in connection with FIG. 1.

As described in connection with FIG. 1, a change in the interference fringe pattern may be due to phase difference change in the beams of light. Continuing from the above example, a change in the interference fringe pattern of the first mode of light and the second mode of light may be due to phases difference change between the first mode of light and the second mode of light, which in turn may be due to optical path length changes between the first mode of light and the second mode of light.

In some examples, the optical path length changes may be due to a change in the physical structure(s), parameter(s) and/or characteristic(s) associated with the waveguide 202, such as, but not limited to, a change in the refractive index associated with a surface of the waveguide 202.

Figure 3:
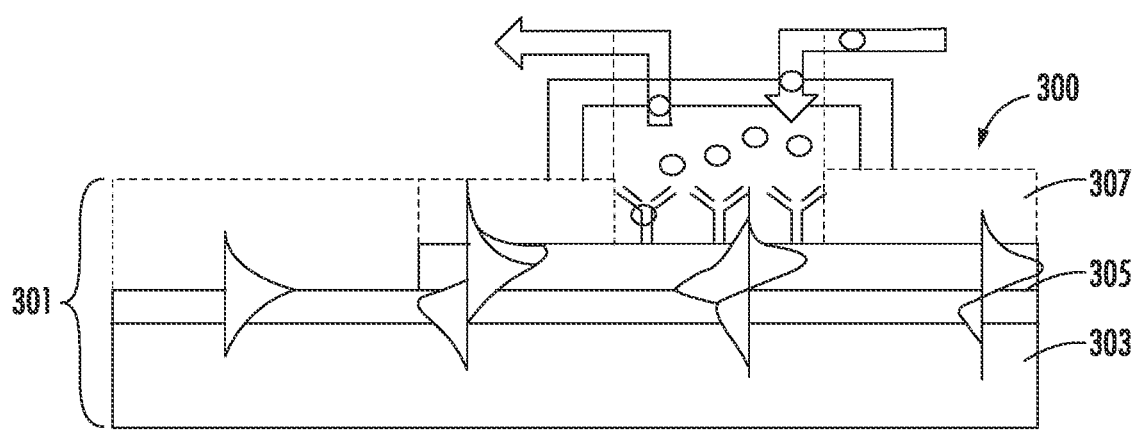
FIG. 3 illustrates an example diagram illustrating an example change in an evanescent field in accordance with various examples of the present disclosure.

For example, the refractive index associated with the surface of the waveguide layer 206 that is exposed through the sample opening 222 of the interface layer 208 may change due to, for example but not limited to, a change in the evanescent field. Referring now to FIG. 3, an example diagram illustrating such a change is shown.

In the example shown in FIG. 3, the example sample testing device 300 may comprise a waveguide 301, similar to the waveguide 202 described above in connection with FIG. 2. For example, the waveguide 202 may comprise a substrate layer 303, a waveguide layer 305, and an interface layer 307, similar to the substrate layer 204, the waveguide layer 206, and the interface layer 208 described above in connection with FIG. 2.

In some examples, a sample medium may be placed on the surface of the waveguide layer 305 that is exposed through the sample opening of the interface layer 307 and/or may be in contact with the surface of the waveguide layer 305. As used herein, the term "sample medium" refers to object(s), substance(s), organism(s), chemical and/or biological solution(s), molecule(s), and/or the like that a sample testing device in accordance with examples of the present disclosure may be configured to detect, measure, and/or identify. For example, the sample medium may comprise analyte (for example, in the form of a biochemical sample), and the sample testing device 300 may be configured to detect, measure, and/or identify whether the analyte comprises a particular substance or organism.

In some examples, the sample medium may be placed on the surface of the waveguide layer 305 via physical and/or chemical attraction, such as but not limited to, through a flow channel described herein, gravitational force, surface tension, chemical bonding, and/or the like. For example, the sample testing device 300 may be configured to detect the presence of one or more particular viruses (for example, coronavirus such as severe acute respiratory syndrome coronavirus 2 (SARS-CoV-2)) in a sample medium. In some examples, the sample testing device 300 may comprise antibodies attached to a surface of the waveguide layer 305, and the antibodies may correspond to the one or more particular viruses that the sample testing device 300 is configured to detect. A chemical or biological reaction between the antibody and the virus may cause a change in the evanescent field, which in turn may change the refractive index of the chemical in contact with surface of waveguide layer 305 (for example, but not limited to, the interface layer 307).

Continuing from the above SARS-CoV-2 example, antibody for SARS-CoV-2 (for example but not limited to SARS-CoV polyclonal antibodies) may be attached to surface of the waveguide layer 305 through physical and/or chemical attraction, such as but not limited to, gravitational force, surface tension, chemical bonding, and/or the like. When the sample medium is placed on the surface of the waveguide layer 305 through the opening of the interface layer 307, the antibody for SARS-CoV-2 may attract molecules of the SARS-CoV-2 virus, if present in the sample medium.

In circumstances where molecules of the SARS-CoV-2 virus is present in the sample medium, the antibody for SARS-CoV-2 may pull the molecules towards the surface of the waveguide layer 305. As described above, the chemical and/or biological reaction between the antibody and the virus may cause a change in the evanescent field, which may in turn change the refractive index of the chemical in contact with surface of waveguide layer 305 (for example, but not limited to, the interface layer 307).

In circumstances where molecules of the SARS-CoV-2 virus are not present in the sample medium, there may not be any chemical and/or biological reaction between the antibody and the virus, and therefore the evanescent field and the refractive index of the chemical close to the surface of the waveguide layer 305 may not change (for example, but not limited to, the interface layer 307).

As described above, a change in the refractive index of the chemical in contact with the surface of the waveguide layer 305 (for example, but not limited to, the interface layer 307) may result in a change of the optical path length of the light as the light propagates through the waveguide layer 305. Further, similar to those described above in connection with FIG. 2, the light that exits the waveguide layer 305 may comprise two (or more) modes and may create an interference fringe pattern. As such, a change in the interference fringe pattern may indicate a change in the refractive index, which in turn may indicate the presence of object(s), substance(s), organism(s), chemical and/or biological solution(s) that the sample testing device 300 is configured to detect, measure, and/or identify (for example, the SARS-CoV-2 virus).

Figure 4:
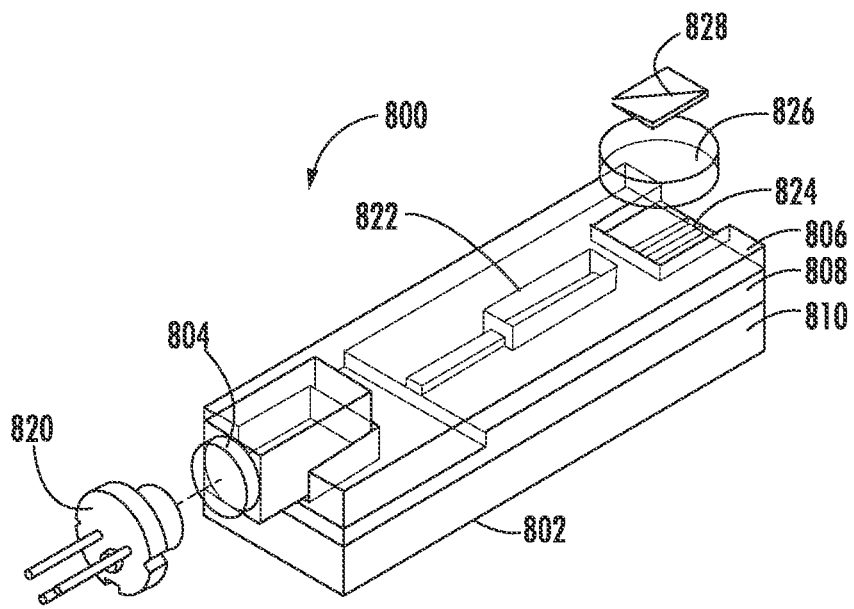
FIG. 4 illustrates an example perspective view of an example sample testing device in accordance with various examples of the present disclosure.
Figure 5:
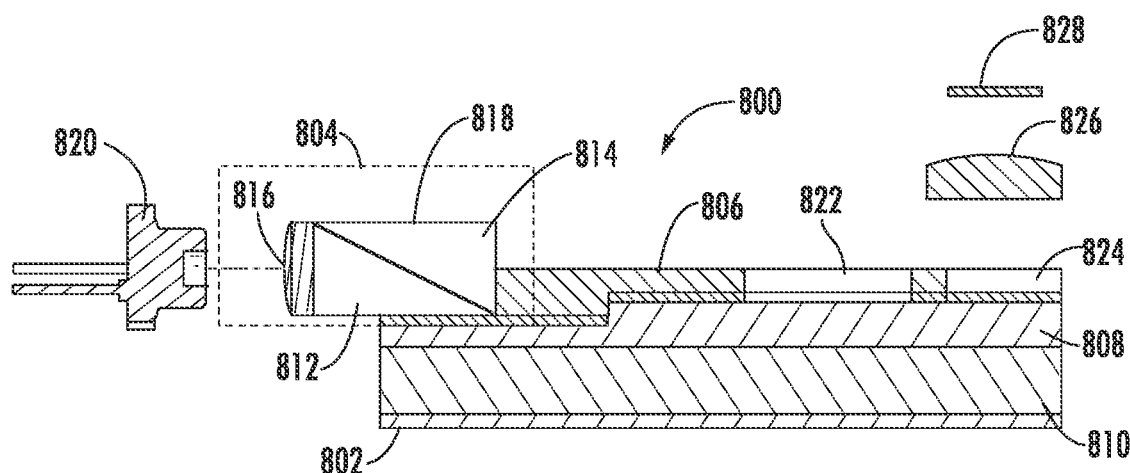
FIG. 5 illustrates an example side-section view of the example sample testing device of FIG. 4 in accordance with various examples of the present disclosure.

Some examples of the present disclosure may overcome various technical challenges. For example, an example sample testing device may comprise an integrated optical component. Referring now to FIG. 4 and FIG. 5, example views of an example sample testing device 800 in accordance with examples of the present disclosure are illustrated. In some examples, the example sample testing device 800 may be an interferometry-based sample testing device.

In the example shown in FIG. 4 and FIG. 5, the example sample testing device 800 may comprise a light source 820, a waveguide 802, and/or an integrated optical component 804.

Similar to the light source 101 described above in connection with FIG. 1, the light source 820 of the sample testing device 800 may be configured to produce, generate, emit, and/or trigger the production, generation, and/or emission of light (including but not limited to a laser light beam). The example light source 820 may include, but not limited to, laser diodes (for example, violet laser diodes, visible laser diodes, edge-emitting laser diodes, surface-emitting laser diodes, and/or the like). Additionally, or alternatively, the light source 820 may include, but is not limited to, incandescent based light sources (such as, but not limited to, halogen lamp, nernst lamp), luminescent based light sources (such as, but not limited to, fluorescence lamps), combustion based light sources (such as, but not limited to, carbide lamps, acetylene gas lamps), electric arc based light sources (such as, but not limited to, carbon arc lamps), gas discharge based light sources (such as, but not limited to, xenon lamp, neon lamps), high-intensity discharge based light sources (HID) (such as, but not limited to, hydrargyrum quartz iodide (HQI) lamps, metal-halide lamps). Additionally, or alternatively, the light source 820 may comprise one or more light-emitting diodes (LEDs). Additionally, or alternatively, the light source 820 may comprise one or more other forms of natural and/or artificial sources of light.

Referring back to FIG. 4 and FIG. 5, the light generated by the light source 820 may travel along an optical path and arrive at the integrated optical component 804. In some examples, the integrated optical component 804 may collimate, polarize, and/or couple light into the waveguide 802. For example, the integrated optical component 804 may be an integrated collimator, polarizer, and coupler.

Referring now to FIG. 5, an example structure of the integrated optical component 804 is shown. In the example shown in FIG. 5, the integrated optical component 804 may comprise at least a collimator 816 and a beam splitter 818.

In some examples, the collimator 816 may comprise one or more optical components to redirect and/or adjust the direction of the light that it receives. As an example, the optical component(s) may comprise one or more optical collimating lens and/or imaging lens, such as but not limited to one or more lens having spherical surface(s), one or more lens having parabolic surface(s) and/or the like. For example, the optical component(s) may comprise silicon meniscus lens.

For example, beams of light received by the collimator 816 may each travel along an optical direction that may not be parallel with the optical direction of another beam or light. As the beams of light travel through the collimator 816, the collimator 816 may collimate beams of light into parallel or approximately parallel beams of light. Additionally, or alternatively, the collimator 816 may narrow the light beams by either causing the direction of the light beams to become more aligned in a specification direction and/or causing the spatial cross-section of the light beams to become smaller.

Referring back to FIG. 4 and FIG. 5, the collimator 816 may be attached to an oblique surface of the beam splitter 818.

Similar to the beam splitter 103 described above in connection with FIG. 1, the beam splitter 818 of the example sample testing device 800 may comprise one or more optical elements that may be configured to divide, split, and/or separate the light into two or more divisions, portions, and/or beams.

In the examples shown in FIG. 5, the beam splitter 818 may comprise a first prism 812 and a second prism 814. In some examples, each of the first prism 812 and the second prism 814 may be a right angle prism.

In some examples, the second prism 814 may be attached to a first oblique surface of the first prism 812 through various means, including but not limited to, mechanical means and/or chemical means. For example, adhesive material (such as glue) may be applied on the first oblique surface of the first prism 812, such that the first prism 812 may be bonded with the second prism 814. Additionally, or alternatively, the second prism 814 may be cemented together with the first prism 812.

In some examples, the collimator 816 may be attached to a second oblique surface of the first prism 812 through various means, including but not limited to, mechanical means and/or chemical means. For example, adhesive material (such as glue) may be applied on the second oblique surface of the first prism 812, such that collimator 816 may be bonded with the first prism 812. Additionally, or alternatively, the collimator 816 may be cemented together with the first prism 812

As described above, the collimator 816 may collimate beams of light into parallel or approximately parallel beams of light, which may in turn be received by the beam splitter 818. In some examples, the light received by the beam splitter 818 may be split into two or more portions as it travels through the oblique surface of the first prism 812. For example, the oblique surface of the first prism 812 may reflect a portion of the light and may allow another portion of the light to pass through. In some examples, a hypotenuse surface of the first prism 812 and/or the second prism 814 may comprise a chemical coating. In some examples, the first prism 812 and the second prism 814 may together form a cube shape.

In some examples, the beam splitter 818 may be a polarization beam splitter. As used herein, the polarization beam splitter may split the light into one or more portions, and each portion may have a different polarization. In some examples, by implementing a polarization beam splitter, one (or, in some examples, two or more) beam with selected polarization may be transmitted into the waveguide 802. As such, the beam splitter 818 may server as a polarizer.

In some examples, the angle of the first prism 812 and the second prism 814 may be calculated to redirect the light into the waveguide based on the acceptance efficiency for directly light into the waveguide 802. For example, the first prism 812 and the second prism 814 may each be arranged in a 45 degrees angle with the waveguide 802, as shown in FIG. 5. Additionally, or alternatively, the angle of the first prism 812 and the second prism 814 may be arranged based on other values to improve the acceptance efficiency.

While the description above provides an example of beam splitter 818, it is noted that the scope of the present disclosure is not limited to the description above. In some examples, an example beam splitter 818 may comprise one or more additional and/or alternative elements. For example, the beam splitter 103 may comprise a plater beam splitter, similar to those described above in connection the beam splitter 103 of with FIG. 1.

In some examples, the size of the beam splitter 818 (for example, width, length, and/or height) may be 5 millimeters. In some examples, the size of the beam splitter 818 may be other value(s).

Referring back to FIG. 4 and FIG. 5, the integrated optical component 804 may be coupled to the waveguide 802. For example, a surface of the integrated optical component 804 may be attached to a surface of the waveguide 802 through various means, including but not limited to, mechanical means and/or chemical means. For example, adhesive material (such as glue) may be applied on a surface of the waveguide 802 and/or on a surface of the integrated optical component 804, such that the waveguide 802 may be bonded with the integrated optical component 804. Additionally, or alternatively, the waveguide 802 may be cemented together with the integrated optical component 804.

In some examples, the waveguide 802 may comprise one or more layers. For example, the waveguide 802 may comprise an interface layer 806, a waveguide layer 808, and a substrate layer 810, similar to the interface layer 208, the waveguide layer 206, and the substrate layer 204 described above in connection with FIG. 2. For example, the interface layer 806 may be disposed on a top surface of the waveguide layer 808.

In some examples, the interface layer 208 may comprise an opening for receiving the waveguide 802. For example, the opening of the interface layer 208 may correspond to the shape of the integrated optical component 804. In some examples, the integrated optical component 804 may be securely positioned on a top surface of the waveguide layer 808 through the opening of the interface layer 208, such that the integrated optical component 804 may be in direct contact with the waveguide layer 808. In some examples, layer(s) (for example, a coupler layer) may be implemented between the integrated optical component 804 and the waveguide layer 808.

In the example shown in FIG. 4 and FIG. 5, the interface layer 806 may comprise a sample opening 822. Similar to those described above in connection with FIG. 2, the sample opening 822 may receive a sample medium. In some examples, the integrated optical component 804 may be disposed on and/or attached to a top surface of the interface layer 806, input light may be provided to the waveguide layer 808 through the interface layer 806. In such examples, input light may be provided to a top surface of the waveguide 802 (instead of through a side surface).

In some examples, the interface layer 806 may comprise an output opening 824. In some examples, the output opening 824 may allow light to exit the waveguide 802. Similar to those described in connection with FIG. 2, the waveguide 802 may cause two modes of light to exit the waveguide 802, resulting in an interference fringe pattern.

Referring back to FIG. 4 and FIG. 5, the example sample testing device 800 may comprise a lens component 826 disposed on the top surface of the interface layer 806. For example, the lens component 826 may at least partially overlap with the output opening 824 of the interface layer 806, such that light exiting the waveguide 802 may pass through the lens component 826.

In some examples, the lens component 826 may comprise one or more optical imaging lens, such as but not limited to one or more lens having spherical surface(s), one or more lens having parabolic surface(s) and/or the like. In some examples, the lens component 826 may redirect and/or adjust the direction of the light that exits from the waveguide 802 towards an imaging component 828. In some examples, the imaging component 828 may be disposed on a top surface of the lens component 826.

In some examples, the lens component 826 may be positioned at a distance from the output opening 824. For example, the lens component 826 may be securely supported by a supporting structure (for example, a supporting layer) such that it is positioned on top of the output opening 824 and without in contact with the output opening 824. In some examples, the lens component 826 may at least partially overlap with the output opening 824 of the interface layer 806 in an output light direction, such that light output from the waveguide 802 may travel through the lens component 826.

In some examples, the imaging component 828 may be positioned at a distance from the lens component 826. For example, the imaging component 828 and/or the lens component 826 may each be securely supported by a supporting structure (for example, a supporting layer) such that the imaging component 828 is positioned on top of the lens component 826 and without in contact with the lens component 826. In some examples, the imaging component 828 may at least partially overlap with the lens component 826 in an output light direction, such that light output from the waveguide 802 may travel through the lens component 826 and arrive at the imaging component 828.

Similar to the imaging component 109 described above in connection with FIG. 1, the imaging component 828 may be configured to detect an interference fringe pattern. For example, the imaging component 109 may comprise one or more imagers and/or image sensors (such as an integrated 1D, 2D, or 3D image sensor). Various examples of the image sensors may include, but are not limited to, a contact image sensor (CIS), a charge-coupled device (CCD), or a complementary metal-oxide semiconductor (CMOS) sensor, a photodetector, one or more optical components (e.g., one or more lenses, filters, mirrors, beam splitters, polarizers, etc.), autofocus circuitry, motion tracking circuitry, computer vision circuitry, image processing circuitry (e.g., one or more digital signal processors configured to process images for improved image quality, decreased image size, increased image transmission bit rate, etc.), verifiers, scanners, cameras, any other suitable imaging circuitry, or any combination thereof.

In the example shown in FIG. 4 and FIG. 5, the integrated optical component 804 may provide input light to a top surface of the waveguide 802, and, after the light travels through the waveguide 802, it may exit from the top surface of the waveguide 802. By directing the optical path of input light to and output light from the waveguide 802 with directly coupling to the surface of the waveguide layer 808 through the openings of the interface layer 806 and/or contact with the best match coupler layer in between, light efficiency and fringe calculation accuracy may be improved, which may improve the performance of the sample testing device 800 and reduce the size of the sample testing device 800.

In some examples, interferometry-based sample testing devices may use coupler(s) or grating mechanism(s) to couple an light source and an waveguide. However, the use of coupler(s) or grating mechanism(s) may negatively affect the light efficiency of light that travels from the light source to the waveguide. Additionally, implementing coupler(s) or grating mechanism(s) to couple a light source to an waveguide may require additional manufacturing processes, increase the cost associated with manufacturing the sample testing device, and increase the size of the sample testing device.

Figure 6:
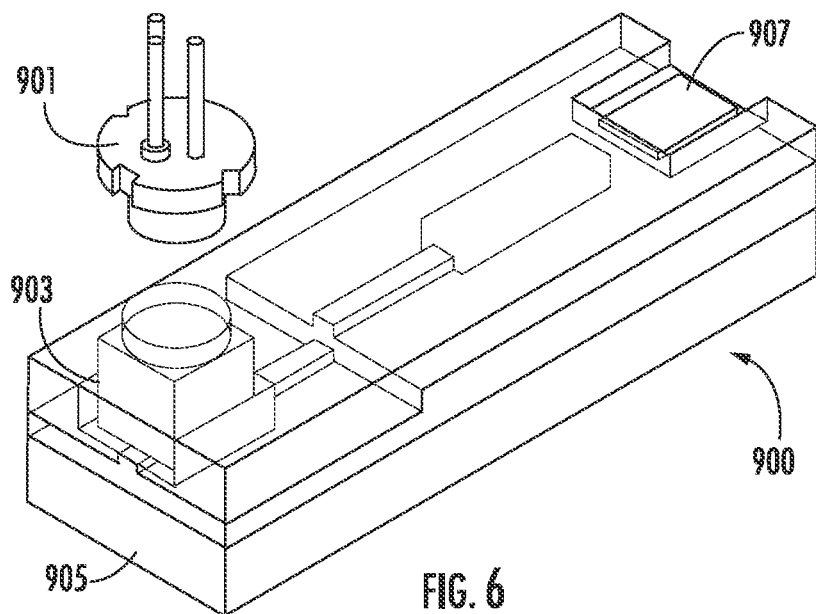
FIG. 6 illustrates an example perspective view of an example sample testing device in accordance with various examples of the present disclosure.
Figure 7:
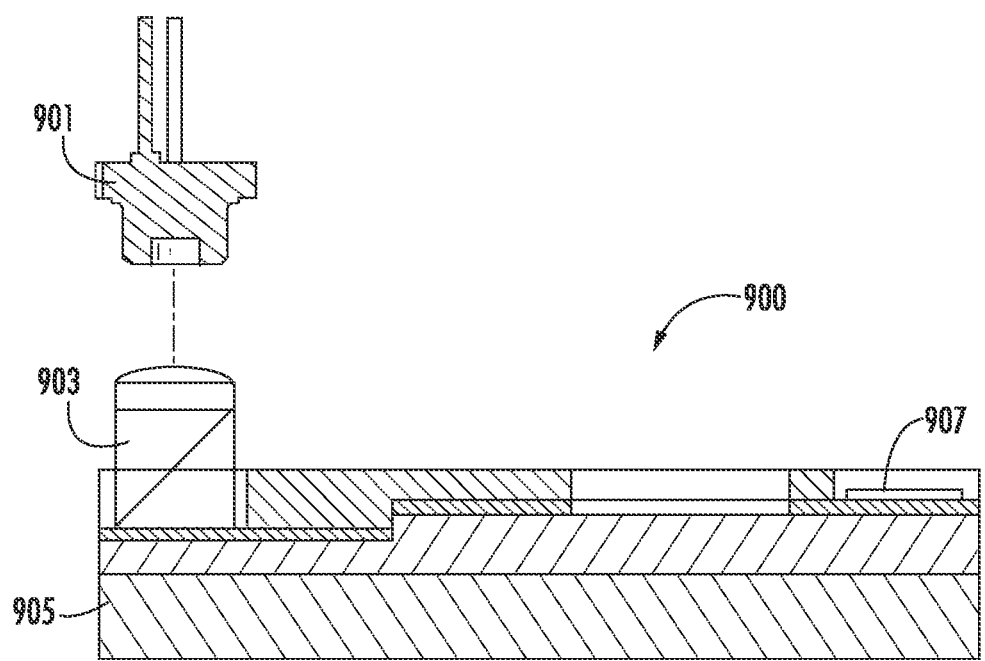
FIG. 7 illustrates an example side-section view of the example sample testing device of FIG. 6 in accordance with various examples of the present disclosure.

Some examples of the present disclosure may overcome various technical challenges. For example, an example sample testing device may comprise a lens array. Referring now to FIG. 6 and FIG. 7, an example sample testing device 900 is illustrated.

In the example shown in FIG. 6 and FIG. 7, the example sample testing device 900 may comprise a light source 901, a waveguide 905, and/or an integrated optical component 903, similar to the light source 820, the waveguide 802, and the integrated optical component 804 described above in connection with FIG. 4 and FIG. 5.

For example, the light source 901 may be configured to produce, generate, emit, and/or trigger the production, generation, and/or emission of light. The light may be received by the integrated optical component 903, which may direct the light to the waveguide 905. For example, the integrated optical component 903 may comprise at least one collimator and at least one beam splitter, similar to the integrated optical component 804 described above in connection with FIG. 4 and FIG. 5.

Referring back to FIG. 6 and FIG. 7, the waveguide 905 may cause two modes of light to exit the waveguide 905 and be received by the imaging component 907, similar to those described above in connection with FIG. 4 and FIG. 5. For example, the imaging component 907 may comprise a complementary metal-oxide semiconductor (CMOS) sensor that may detect the interference fringe pattern of light exit from the waveguide 905.

Similar to the sample testing device 800 described above in connection with FIG. 4 and FIG. 5, the sample testing device 900 illustrated in FIG. 6 and FIG. 7 may direct the optical path of input light to and output light from the waveguide 905 through a top surface of the waveguide 905. In FIG. 4 and FIG. 5, the light source 820 may emit light in an optical direction that is parallel to the top surface of the waveguide 802. In FIG. 6 and FIG. 7, the light source 901 may emit light in an optical direction that is perpendicular to the top surface of the waveguide 905. Regardless of the direction of the light emitted by the light source, the integrated optical component may direct the input light to the waveguide through a top surface of the waveguide.

Figure 8:
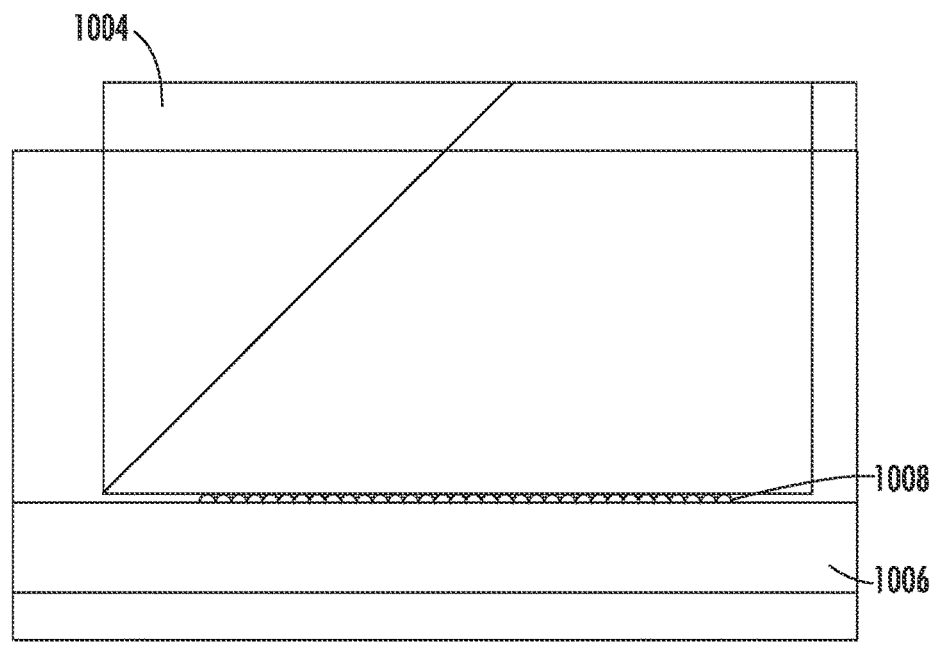
FIG. 8 illustrates an example diagram of an example lens array in accordance with various examples of the present disclosure.

In some examples, the integrated optical component 903 and/or the imaging component 907 may be coupled to the waveguide 905 through coupler(s) or grating mechanism(s). However, as described above, coupler(s) and grating mechanism(s) may require additional manufacturing processes, increase the cost associated with manufacturing the sample testing device, and increase the size of the sample testing device. In some examples, the integrated optical component 903 and/or the imaging component 907 may be coupled to the waveguide 905 through a lens array. Referring now to FIG. 8, an example diagram illustrating an example lens array is shown.

In the example shown in FIG. 8, an example sample testing device may comprise an example integrated optical component 1004 coupled to the waveguide 1006 through an example lens array 1008. In some examples, the lens array 1008 may direct light received from the integrated optical component 1004 to the waveguide 1006. In some examples, the integrated optical component 1004 may be the same or similar to the integrated optical component 804 described above in connection with FIG. 8. For example, the integrated optical component 1004 may comprise one or more collimator(s) and/or polarizer(s).

In some examples, the lens array 1008 may comprise at least one micro lens array. As used herein, the term "micro lens" or microlens" refers to a transmissive optical device (for example, an optical lens) having a diameter less than a predetermined value. For example, an example micro lens may have a diameter less than one millimeter (for example, ten micrometers). The small size of the micro lens may provide the technical benefit of improved optical quality.

As use herein, the term "micro lens array" or "microlens array" refers to an arranged set of micro lens. For example, the arranged set of micro lens may form a one-dimensional or two-dimensional array pattern. Each micro lens in the array pattern may serve to focus and concentrate the light, thereby may improve the light efficiency. Examples of the present disclosure may encompass various types of micro lens array, details of which are described herein.

In some examples, a micro lens array may redirect and/or couple the light into waveguide 905 with the best efficiency. Referring back to FIG. 8, the example lens array 1008 may comprise at least one optical lens. In some examples, each optical lens of the lens array 1008 may have a shape similar to a prism shape. For example, each optical lens of the lens array 1008 may be a right angle prism lens. In such an example, each of the optical lens may be arranged in a parallel arrangement with another optical lens without overlap or gaps.

In some examples, the lens array 1008 may comprise lens having different shapes and/or pitches in two or more directions. For example, a first shape of a first optical lens of the micro lens array may be different from a second shape of a second optical lens of the micro lens array.

As an example, along the direction of the light that transmits through the waveguide 905, lens of lens array 1008 may have a surface shape of a prism, and the pitch for each lens may be determined based on, for example, the micro lens height and prism angle. As an example, along another direction (for example, the cross direction of the light that transmits through the waveguide 905, the surface of the lens array 1008 may be curved to converge the light into the center region of the waveguide, which may improve the collection efficiency. In this example, the pitch in this direction may be determined based on the height of the micro lens and the surface curvature associated with the lens.

In some examples, the micro lens array may have different arrangements along a waveguide light transfer direction to achieve light uniformity. In some examples, a first surface curvature of the first optical lens may be different from a second surface curvature of the second optical lens in the waveguide light transfer direction. For example, the difference between the surface curvatures of lens in the micro lens array may create different lens power. In some examples, the lens power difference may in turn change the light collection efficiency. For example, with different micro lens surface curvature, the light collection efficiency may be changed. In some examples, an uniform surface curvature micro lens may create uniform light collection efficiency along, for example, the direction of light as it transmits through the waveguide. In some examples, the different micro lens power arrangements may create non-uniform light collection efficiency to compensate for the light intensity change due to, for example, the loss energy along the waveguide. In some examples, the different surface power may create different pitches with the uniform height micro lens array.

While the description above provides example shapes and pitches of a micro lens array, it is noted that the scope of the present disclosure is not limited to the description above. In some examples, an example micro lens array may comprise one or more shapes and/or pitches.

While the description above provides an example pattern of an example micro lens array, it is noted that the scope of the present disclosure is not limited to the description above. In some examples, an example micro lens array may comprise one or more additional and/or alternative elements. For example, one or more optical lens of the micro lens array may be in shape(s) other than a prism shape. Additionally, or alternatively, one or more optical lenses of the micro lens array may be placed in a hexagonal array.

In some examples, the lens array 1008 may be disposed on the first surface of the waveguide 1006 through a wafer process with direct etching or etching with post thermal forming. For example, direct etching with grey scale mask may create micro lens with any surface shape, such as spherical lens or micro prism. Additionally, or alternatively, thermal forming may form spherical surface lenses. Additionally, or alternatively, other manufacturing processes and/or techniques may be implemented for the disposed the lens array disposed on the surface of the waveguide 1006.

While the description above provides an example of coupling mechanism between the integrated optical component 1004 and the waveguide 1006, it is noted that the scope of the present disclosure is not limited to the description above. In some examples, one or more additional and/or alternative elements may be implemented to provide a coupling mechanism. For example, a single micro lens may be implemented to couple the integrated optical component 1004 with the waveguide 1006.

Figure 9:
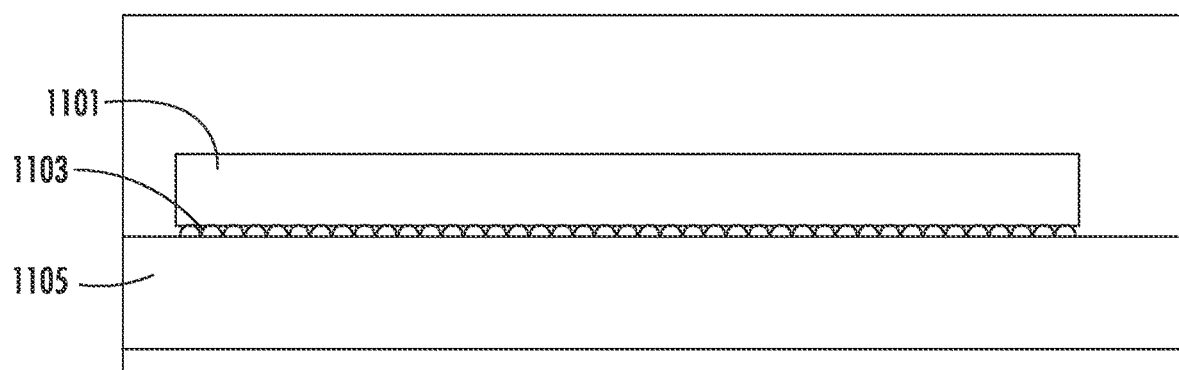
FIG. 9 illustrates an example diagram of an example lens array in accordance with various examples of the present disclosure.

Referring now to FIG. 9, an example diagram illustrating an example lens array is shown. In particular, an example sample testing device may comprise an example imaging component 1101 coupled to the waveguide 1105 through an example lens array 1103. In some examples, the lens array 1103 may direct light received from the waveguide 1006 to the imaging component 1101.

Similar to the example lens array 1008 described above in connection with FIG. 8, the example lens array 1103 may comprise at least one optical lens. In some examples, each optical lens of the lens array 1103 may have a shape similar to a prism shape. For example, each optical lens of the lens array 1103 may be a right angle prism lens. In such an example, each of the optical lens may be arranged in a parallel arrangement with another optical lens without overlap or gaps.

In some examples, a lens component (for example, lens component 826 described above in connection with FIG. 8) may be positioned between the lens array 1103 (for example, micro lens array) and the imaging component 1101.

While the description above provides an example pattern of an example micro lens array, it is noted that the scope of the present disclosure is not limited to the description above. In some examples, an example micro lens array may comprise one or more additional and/or alternative elements. For example, one or more optical lens of the micro lens array may be in shape(s) other than a prism shape. Additionally, or alternatively, one or more optical lens of the micro lens array may be placed in a hexagonal array.

In some examples, the lens array 1103 may be disposed on the first surface of the waveguide 1105 through a wafer process with direct etching or etching with post thermal forming. For example, direct etching with grey scale mask may create micro lens with any surface shape, such as spherical lens or micro prism. Additionally, or alternatively, thermal forming may form spherical surface lenses. Additionally, or alternatively, other manufacturing processes and/or techniques may be implemented for the disposed the lens array disposed on the surface of the waveguide 1105.

While the description above provides an example of coupling mechanism between the example imaging component 1101 and the waveguide 1105, it is noted that the scope of the present disclosure is not limited to the description above. In some examples, one or more additional and/or alternative elements may be implemented to provide a coupling mechanism. For example, a single micro lens may be implemented to couple example imaging component 1101 with the waveguide 1105.

In some examples, the sample opening of an interferometry-based sample testing devices may be less than 0.1 millimeter. As such, it may be technically challenging to deliver the sample medium to the waveguide layer through the sample opening.

Figure 10:
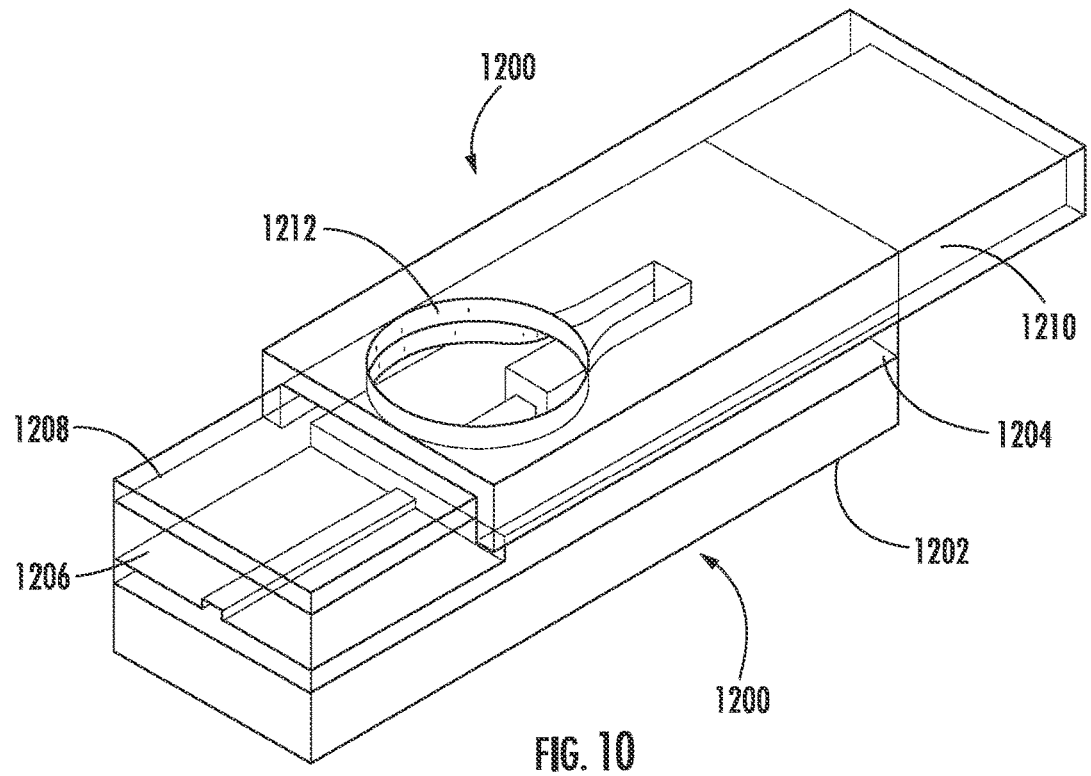
FIG. 10 illustrates an example perspective view of an example sample testing device in accordance with various examples of the present disclosure.
Figure 11:
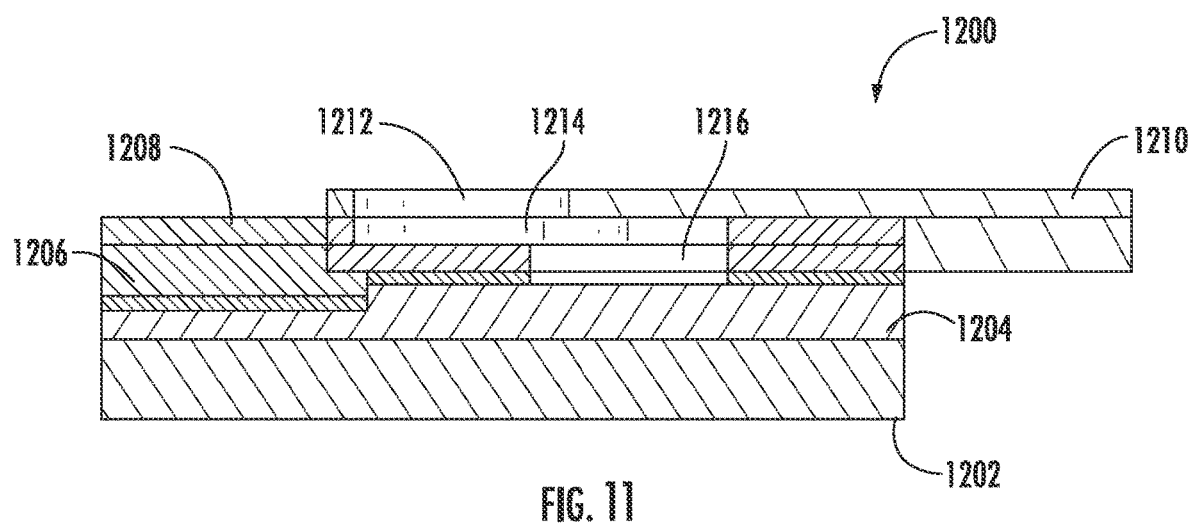
FIG. 11 illustrates an example side-section view of the example sample testing device of FIG. 10 in accordance with various examples of the present disclosure.

Some examples of the present disclosure may overcome various technical challenges. For example, an example sample testing device may comprise an opening layer and/or a cover layer. Referring now to FIGS. 10 and 11, example views of an example sample testing device 1200 in accordance with examples of the present disclosure are illustrated.

In the example shown in FIG. 10 and FIG. 11, the example sample testing device 1200 may comprise a waveguide. In some examples, the waveguide may comprise one or more layers, such as a substrate layer 1202, a waveguide layer 1204, and an interface layer 1206, similar to the interface layer 208, the waveguide layer 206, and the substrate layer 204 described above in connection with FIG. 2.

In some examples, the waveguide may have a sample opening on a first surface. For example, as shown in FIG. 10 and FIG. 11, the interface layer 1206 of the waveguide may comprise a sample opening 1216. Similar to the sample opening 222 described above in connection with FIG. 2, the sample opening 1216 may be configured to receive a sample medium.

In some examples, the sample testing device 1200 may comprise an opening layer disposed on the first surface of the waveguide. For example, as shown in FIG. 10 and FIG. 11, the opening layer 1208 may be disposed on a top surface of the interface layer 1206 of the waveguide.

In some examples, the opening layer 1208 may comprise a first opening 1214. In some examples, the first opening 1214 may at least partially overlap with the sample opening 1216 of the interface layer 1206. For example, as shown in FIG. 11, the first opening 1214 of the opening layer 1208 may cover the sample opening 1216 of the interface layer 1206. In some examples, the first opening 1214 of the opening layer 1208 may have a diameter larger than the diameter of the sample opening 1216 of the interface layer 1206.

In some examples, the opening layer 1208 may be formed with silicon wafer process as an additional oxide layer. In some examples, the first opening 1214 may be etched.

In the example shown in FIG. 10 and FIG. 11, the example sample testing device 1200 may comprise a cover layer 1210.

In some examples, the cover layer 1210 may be placed on in the packaging process with polymer molding, such as PMMA.

In some examples, the cover layer 1210 may be coupled to the waveguide of the sample testing device 1200. In some examples, the coupling between the cover layer 1210 and the waveguide may be implemented via at least one sliding mechanism. For example, the cross-section of the cover layer 1210 may be in a shape similar to the letter "n." Sliding guards may be attached to an inner surface of each leg of cover layer 1210, and corresponding rail tracks may be attached on one or more side surfaces of the waveguide (for example, a side surface of the interface layer 1206). As such, the cover layer 1210 may slide between a first position and a second position as defined by the sliding guards and the rail tracks.

While the description above provides an example of sliding mechanism, it is noted that the scope of the present disclosure is not limited to the description above. In some examples, an example sliding mechanism may comprise one or more additional and/or alternative elements and/or structures. For example, the cover layer 1210 may comprise a t-slot slider disposed on a bottom surface of the cover layer 1210, and the interface layer 1206 may comprise a corresponding t-slot track disposed on a top surface of the interface layer 1206.

In some examples, the sliding mechanism may be in contact with the substrate layer 1202 and/or the interface layer 1206, such that it may not be in contact with the waveguide layer 1204. In some examples, there will be no optical characteristics change of the waveguide layer 1204 due to the addition of sliding mechanism.

In some examples, the cover layer 1210 may comprise a second opening 1212. In some examples, the second opening 1212 of the cover layer 1210 may be in a circular shape. In some examples, the second opening 1212 of the cover layer 1210 may be in other shapes.

In some examples, the size of the second opening 1212 (for example, a diameter or a width) may be between 0.5 millimeters and 2.5 millimeters. In comparison, the size of the sample opening 1216 (for example, a diameter or a width) may be less than 0.1 millimeters. In some examples, the size of the second opening 1212 and/or the size of the sample opening 1216 may have other value(s).

As described above, the cover layer 1210 may be coupled to the waveguide of the sample testing device 1200 via at least one sliding mechanisms. In such an example, the cover layer 1210 may be positioned on top of the opening layer 1208, and may be movable between a first position and a second position.

FIG. 10 and FIG. 11 illustrates an example where the cover layer 1210 is at the first position. As shown, when the cover layer 1210 is at the first position, the second opening 1212 of the cover layer 1210 may overlap with the first opening 1214 of the opening layer 1208.

Figure 12:
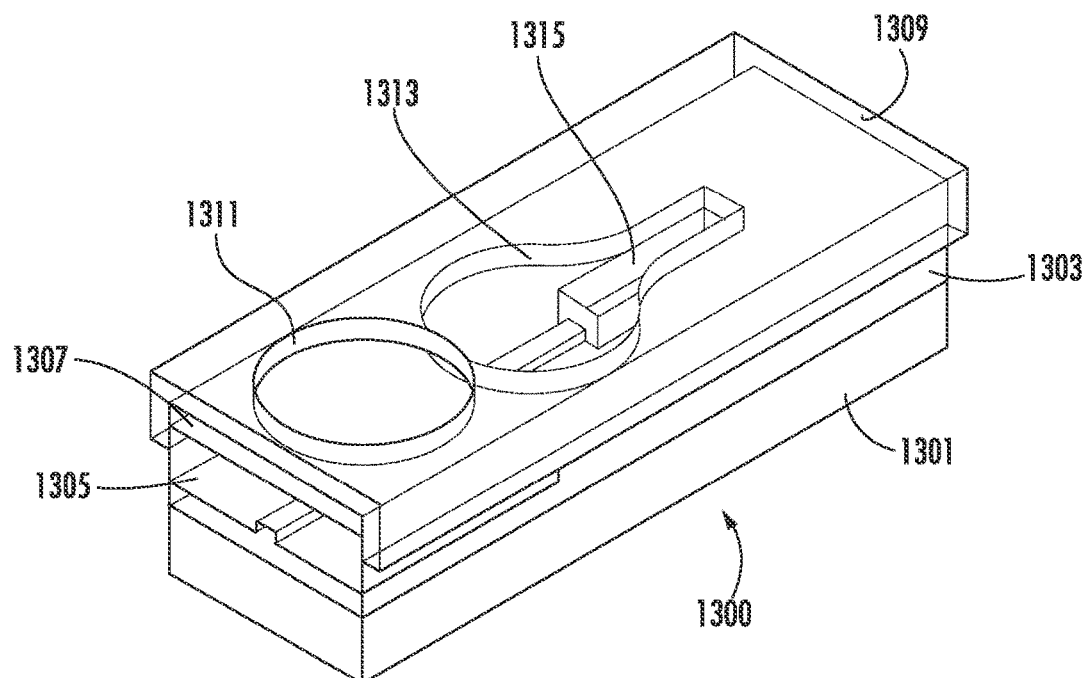
FIG. 12 illustrates an example perspective view of an example sample testing device in accordance with various examples of the present disclosure.
Figure 13:
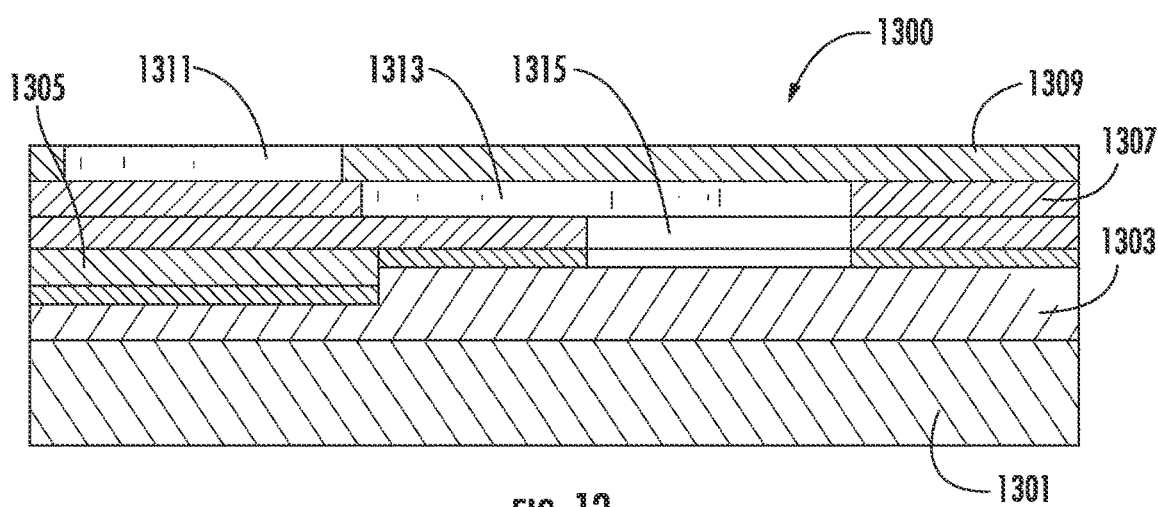
FIG. 13 illustrates an example side-section view of the example sample testing device of FIG. 12 in accordance with various examples of the present disclosure.

Referring now to FIG. 12 and FIG. 13, example views of an example sample testing device 1300 in accordance with examples of the present disclosure are illustrated.

In the example shown in FIG. 12 and FIG. 13, the example sample testing device 1300 may comprise a waveguide. In some examples, the waveguide may comprise one or more layers, such as a substrate layer 1301, a waveguide layer 1303, and an interface layer 1305, similar to the substrate layer 1202, the waveguide layer 1204, and the interface layer 1206 described above in connection with FIG. 10 and FIG. 11.

In some examples, the waveguide may have a sample opening on a first surface. For example, as shown in FIG. 12 and FIG. 13, the interface layer 1305 of the waveguide may comprise a sample opening 1315. Similar to the sample opening 1216 described above in connection with FIG. 10 and FIG. 11, the sample opening 1315 may be configured to receive a sample medium.

In some examples, the sample testing device 1300 may comprise an opening layer disposed on the first surface of the waveguide. For example, as shown in FIG. 12 and FIG. 13, the opening layer 1307 may be disposed on a top surface of the interface layer 1305 of the waveguide.

In some examples, the opening layer 1307 may comprise a first opening 1313. In some examples, the first opening 1313 may at least partially overlap with the sample opening 1315 of the interface layer 1305. For example, as shown in FIG. 13, the first opening 1313 of the opening layer 1307 may cover the sample opening 1315 of the interface layer 1305. In some examples, the first opening 1313 of the opening layer 1307 may have a diameter larger than the diameter of the sample opening 1315 of the interface layer 1305.

In the example shown in FIG. 12 and FIG. 13, the example sample testing device 1300 may comprise a cover layer 1309, similar to the cover layer 1210 described above in connection with FIG. 10 and FIG. 11.

In some examples, the cover layer 1309 may be coupled to the waveguide of the sample testing device 1300. In some examples, the coupling between the cover layer 1309 and the waveguide may be implemented via at least one sliding mechanism, similar to those describe in connection with the cover layer 1210 in connection with FIG. 10 and FIG. 11.

In some examples, the cover layer 1309 may comprise a second opening 1311. In some examples, the second opening 1311 of the cover layer 1309 may comprise a circular shape. In some examples, the second opening 1311 of the cover layer 1309 may comprise other shapes.

As described above, the cover layer 1309 may be coupled to the waveguide of the sample testing device 1300 via at least one sliding mechanism. In such an example, the cover layer 1309 may be positioned on top of the opening layer 1307, and may be movable between a first position and a second position.

FIG. 12 and FIG. 13 illustrate an example where the cover layer 1309 is at the second position. As shown, when the cover layer 1309 is at the second position, the second opening 1311 of the cover layer 1309 may not overlap with the first opening 1313 of the opening layer 1307.

In some examples, additional latching or toggle features may be implemented to secure the cover layer 1309 to the first position or the second position. For example, a slidable latch bar may be attached to a side surface of the cover layer 1309, and the waveguide may comprise a first recess portion and a second recess portion on a side surface of the waveguide. In some examples, when the first recess portion receives the slidable latch bar, the cover layer 1309 may be secured to the first position. In some examples, when the second recess portion receives the slidable latch bar, the cover layer 1309 may be secured to the second position.

While the description above provides an example of latching or toggle features, it is noted that the scope of the present disclosure is not limited to the description above. In some examples, an example latching or toggle features may comprise one or more additional and/or alternative elements.

In some examples, interferometry-based sample testing devices (for example, but not limited to, bimodal waveguide interferometer-based sample testing devices) may require additional space for imaging components including, for example, an imaging component and lens component. However, the capacity to reduce the size of the sample testing device (for example, but not limited to, chip size) may be limited. Thus, a sample testing device may require extra space for output fringe imaging functionality.

Some examples of the present disclosure may overcome various technical challenges. For example, by introducing backside illumination and imaging, the output fringe area may be shared with the sampling area to reduce the size of the sample testing device/sensor chip. The cost of the sample testing device may be reduced and the product size and/or cost may be reduced.

In accordance with various examples of the present disclosure, a dual-surface (for example, but not limited to, double-sided) waveguide sample testing device may be provided based on, for example, but not limited to, utilizing backside illumination image sensor technologcy, For example, a first surface (for example, but not limited to, upper surface or top surface) of the sample testing device may be used as the sample area and a second surface (for example, but not limited to, backside or bottom surface) may be used for illumination and imaging.

In some examples, during example manufacturing processes, after fabrication of the silicon wafer, the waveguide (for example, the waveguide layer as described above) may be transferred unto a glass wafer. In some examples, the silicon substrate (for example, the substrate layer as described above) may be modified to allow backside access to the sample testing device. For example, an additional opening may be formed on the backside of the sample testing device through an etching process.

While the description above provides an example process for manufacturing a sample testing device, it is noted that the scope of the present disclosure is not limited to the description above. In some examples, an example process may comprise one or more additional and/or alternative steps and/or elements. For example, additional layer(s) may be added to further improve the light coupling efficiency of the input and output of the sample testing device.

In various examples, the imaging component, lens component, and/or light source may fixedly and/or removably integrate with (for example, but not limited to, interface, connect with and/or the like) the sample testing device in a variety of configurations and arrangements. The imaging component, the lens component, and/or the light source may be integrated via any available surface of the sample testing device. For instance, the imaging component and lens component may fixedly and/or removably integrate with the sample testing device via one or more apertures, fittings and/or connectors at a lateral end of the sample testing device. In other examples, the imaging component, the lens component and/or the light source may integrate with the sample testing device via one or more apertures, fittings and/or connectors on the bottom surface (for example, but not limited to, backside) or upper surface of the sample testing device.

Figure 14:
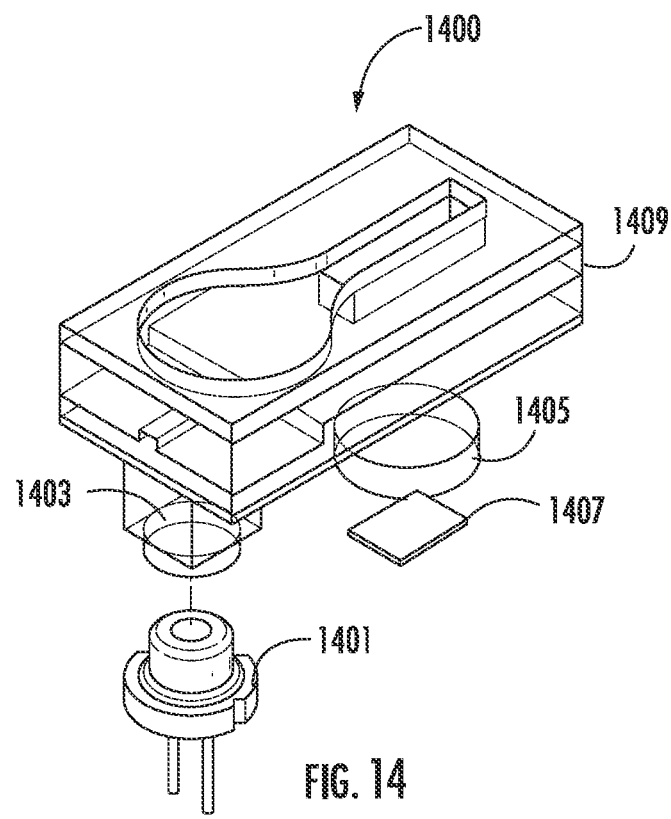
FIG. 14 illustrates an example perspective view of an example sample testing device in accordance with various examples of the present disclosure.

FIG. 14 illustrates a perspective view of an example sample testing device 1400 in accordance with various examples of the present disclosure. In some examples, the example sample testing device 1400 may comprise an alternatively configured imaging component 1407, lens component 1405 and/or light source 1401.

In the example shown in FIG. 14, the light source 1401 may fixedly and/or removably integrate with (for example, but not limited to, interface, connect to and/or the like) the bottom surface (for example, but not limited to, backside) of the sample testing device 1400 via a connection to an integrated optical component 1403. The integrated optical component 1403 may be fixedly and/or removably integrated via an aperture, fitting, connector and/or combinations thereof. Additionally, the imaging component 1407 and the lens component 1405 may directly and/or removably integrate with (for example, but not limited to, interface, connect to and/or the like) the bottom surface (for example, but not limited to, backside) of the sample testing device 1400 via a different aperture, fitting, connector and/or combinations thereof.

In some examples, the imaging component 1407 and the lens component 1405 may comprise a micro lens array directly integrated in the substrate layer, or any other layer, of the sample testing device 1400. In examples where the imaging component 1407, the lens component 1405 and the light source 1401 are integrated via a bottom surface (for example, but not limited to, backside) of the sample testing device 1400, a user may interact with, hold and/or handle the top surface of the sample testing device 1400. Additionally, the top surface of the sample testing device 1400 may provide support and/or stabilize the sample testing device 1400. In some examples, attachments may be provided to the top surface to improve handling of the sample testing device 1400. In various examples, fixedly and/or removably integrating components (e.g., but not limited to, the imaging component 1407 and the lens component 1405) with the sample testing device 1400 reduces the space requirements of the sample testing device 1400, providing a compact and efficient solution.

Accordingly, light may be coupled into the sample testing device 1400 via the light source 1401 through the bottom surface (for example, but not limited to, backside) of the sample testing device 1400. In some examples, the light may enter the waveguide 1409 located in-between the top surface of the sample testing device 1400 and the bottom surface (for example, but not limited to, backside) of the sample testing device 1400, and may travel from the point of entry adjacent the light source 1401/integrated optical component 1403 laterally through the waveguide 1409 (for example, but not limited to, via one or more optical channels). In some examples, the light may travel towards the imaging component 1407/lens component 1405 at the opposite end of the sample testing device 1400. In some examples, as will be described in detail further herein, a processing component (for example, a processor) may be electronically coupled to the imaging component 1407, and may be configured to analyze the imaging data (for example, fringe data) to determine, for example but not limited to, changes in refractive index within the waveguide 1409.

Figure 15:
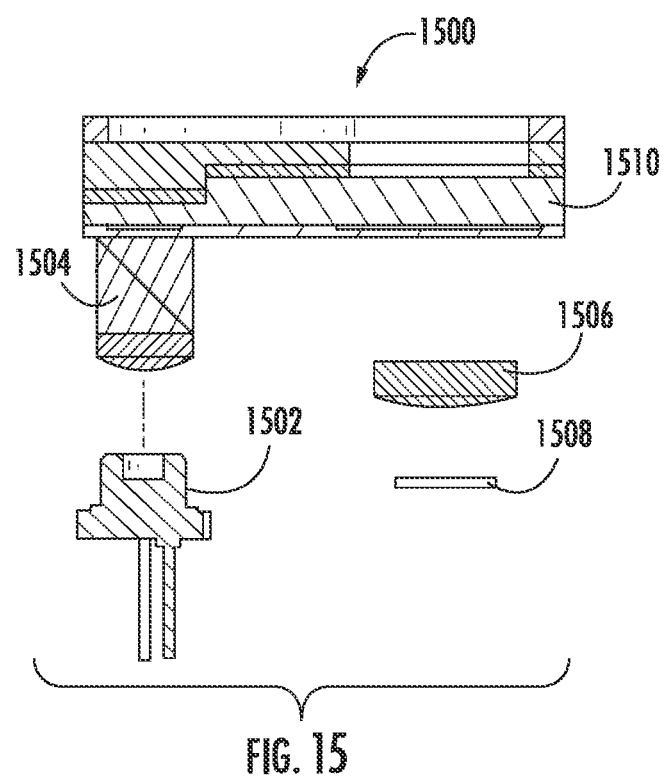
FIG. 15 illustrates an example side-section view of example sample testing device in accordance with various examples of the present disclosure.

FIG. 15 illustrates a side view of the alternatively configured example sample testing device of FIG. 14 with an alternatively configured imaging component 1508, lens component 1506 and light source 1502. As shown, the light source 1502 may fixedly and/or removably integrate with (for example, but not limited to, interface, connect to and/or the like) the bottom surface (for example, but not limited to, backside) of the sample testing device 1500 via a connection to an integrated optical component 1504. The integrated optical component 1504 may be directly and/or removably integrated via an aperture, fitting, connector and/or combinations thereof. Additionally, or alternatively, the imaging component 1508 and the lens component 1506 may directly and/or removably integrate with (for example, but not limited to, interface, connect to and/or the like) the bottom surface of the sample testing device 1500 via a different aperture, fitting, connector and/or combinations thereof.

In some examples, the imaging component 1508 and the lens component 1506 may comprise a micro lens array directly integrated in the substrate layer, or any other layer, of the sample testing device 1500. In examples where the imaging component 1508, the lens component 1506 and the light source 1502 are integrated via a bottom surface (for example, but not limited to, backside) of the sample testing device 1500, a user may interact with, hold and/or handle the top surface of the sample testing device 1500. Additionally, or alternatively, the top surface of the sample testing device 1500 may provide support and/or stabilize the sample testing device 1500. In some examples, the sample testing device 1400 may include an support structure for mounting/supporting the waveguide 1409 thereon. An example support structure may comprise a structure disposed adjacent at least one surface (e.g., side surface) of the waveguide 1409.

Accordingly, light may be coupled into the sample testing device 1500 via the light source 1502 through the bottom surface (for example, but not limited to, backside) of the sample testing device 1500. The light enters the waveguide 1510 located in-between the top surface of the sample testing device 1500 and the bottom surface (for example, but not limited to, backside) of the sample testing device 1500 and travels from the point of entry adjacent the light source 1502/integrated optical component 1504 laterally through the waveguide 1510 (for example, but not limited to, via one or more optical channels) towards the imaging component 1508/lens component 1506 at the opposite end of the sample testing device 1500.

In various examples, interferometry-based sample testing devices (for example, but not limited to, bimodal waveguide interferometer-based sample testing devices) described herein may provide "lab-on-a-chip" solutions for mobile applications. However, the practical integration may be limited by the light source and imaging (for example, but not limited to, fringe detection) capabilities. For example, technical challenges may include designing a simple device capable of integrating with a user computing device (for example, but not limited to, mobile application) form factor.

Some examples of the present disclosure may overcome various technical challenges. For example, size reduction in combination with backside illumination and sensing may effectively reduce the chip sensor size and/or supporting components size. In some examples, the reduced size low-profile sensor module may be integrated with a mobile device such as a mobile terminal for mobile point-of-care applications. In some examples, backside illumination and interferometry-based sample testing devices with integrated input light sources and direct imaging sensors may achieve a total module height lower than 6 millimeters, and may therefore enable integrations into device such as mobile phone. For example, an example bimodal waveguide interferometer sample testing device may be integrated with mobile devices to provide point-of-care applications in the quick screening of a virus with reliable results.

In various examples, the sample testing device may comprise a mobile point-of-care component. The mobile point-of-care component may comprise an attachment configured to receive a user computing device (for example, but not limited to, mobile device, handheld terminal, PDA and/or the like) configured to be attached to the sample testing device. For example, the mobile point-of-care component may be a mobile phone compatible form-factor solution. The sample testing device may comprise an integrated and/or miniaturized package of component configured to be compatible with the user computing device (for example, but not limited to, a mobile device, handheld terminal, PDA, tablet and/or the like) similar to point-of-sale products and devices.

Figure 16A:
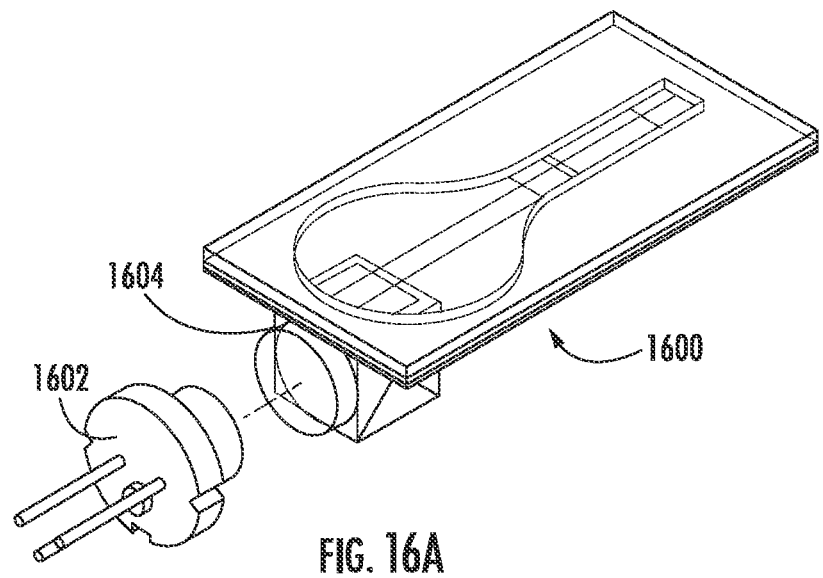
FIG. 16A illustrates an example perspective view of an example mobile point-of-care component in accordance with various examples of the present disclosure.
Figure 16B:
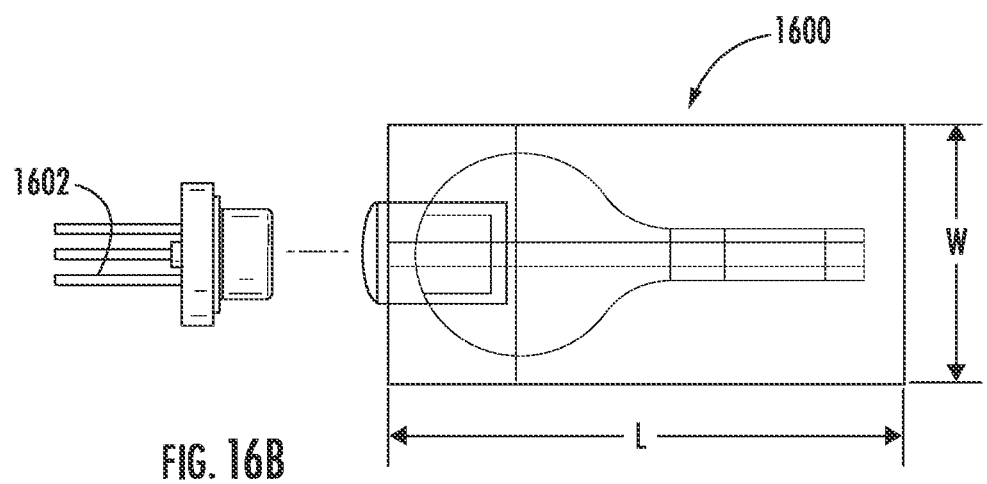
FIG. 16B illustrates an example top view of the example mobile point-of-care component of FIG. 16A in accordance with various examples of the present disclosure.
Figure 16C:
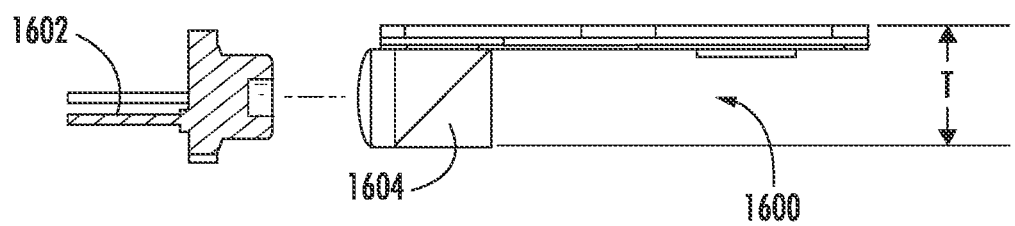
FIG. 16C illustrates an example side-section view of the example mobile point-of-care component of FIG. 16A in accordance with various examples of the present disclosure.

FIG. 16A to FIG. 16C illustrate various views of an example mobile point-of-care component 1600 that may be suitable for integrating (for example, but not limited to, attaching) a sample testing device with a user computing device. In particular, FIG. 16A illustrates an example profile view, FIG. 16B illustrates an example top view, and FIG. 16B illustrates an example side view of the mobile point-of-care component 1600. In some examples, the upper surface of the mobile point-of-care component 1600 may configured to be removably integrated with a user computing device. For example, the user computing device (e.g., mobile device) may slide/insert into an attachment or adjacent a surface of the mobile point-of-care component 1600.

As shown in FIG. 16B, the profile of the mobile point-of-care component 1600 may have a length that is approximately 20 millimeters and a width that is approximately 10 millimeters, corresponding with the form factor for an example user computing device (for example, but not limited to, a mobile device). The mobile point-of-care component 1600 may be fixedly or removably integrated with the sample testing device via the light source 1602/integrated optical component 1604. For example the mobile point-of-care component 1600 may be integrated with the sample testing device via apertures, fittings, connectors and/or combinations thereof.

As shown in FIG. 16C, the profile height, "T", of the mobile point-of-care component 1600 may be approximately 6 millimeters, suitable for compatibility with various conventionally sized user computing devices. As illustrated, the sample testing device may be positioned beneath the mobile point-of-care component 1600, adjacent the integrated optical component. Other configurations may be realized.

While the description above provides example measurements of mobile point-of-care component, it is noted that the scope of the present disclosure is not limited to the description above. In some examples, an example mobile point-of-care component have one or more measurements that may be less than or more than those values described above, In some examples the light source 1602 and integrated optical component 1604 may be integrated into the mobile point-of-care component 1600 assembly, user computing device assembly and/or the like. The output from the light source 1602/integrated optical component 1604 may be transmitted directly to one or more processors of the user computing device (e.g., a mobile device spare camera port).

In some examples, the mobile point-of-care component 1600 may integrate the sample testing device and the user computing device such that hardware components may be shared between them. For example, the sample testing device and the user computing device may utilize the same sensor, optical component and/or the like to reduce the number of hardware components in the sample testing device. In some examples, the user computing device chassis (for example, but not limited to, mobile device chassis) may be positioned upon or adjacent the mobile point-of-care component 1600 using fasteners, holders, stands, connectors, cables and/or the like.

Additionally, the mobile point-of-care component 1600 may include additional user device computing hardware and/or other sub-systems (not depicted) for providing various user computing device functionality. For example, an example user computing device chassis (for example, but not limited to, mobile device chassis) may be positioned on top of the mobile point-of-care component 1600, such that the user interface is provided (for example, but not limited to, accessible) to receive user inputs. In some examples, the mobile point-of-care component 1600 may include hardware and software to enable integration with the sample testing device. In some examples, the sample testing device may include processing means to enable wireless communication with computing devices/entities (e.g., capable of transmitting data wirelessly to a computing device/entity). In some embodiments, the sample testing device may transmit data (e.g., images) to a user computing entity (e.g., mobile device) through wired or wireless means. For example, the sample testing device may transmit images via a mobile device processor camera port using an MIPI serial imaging data connection.

In some examples, it should be appreciated that the user computing device (for example, but not limited to, mobile device) may be integrated with the mobile point-of-care component 1600 and sample testing device for functioning as a back-facing apparatus. In such examples, the user computing device optical components, sensors and/or the like may be commonly used. For example, the user computing device may be integrated with additional custom circuitry and/or computing hardware (not depicted) housed by the mobile point-of-care component 1600 and/or integrated with processing circuitry and/or conventional computing hardware of the user computing device (for example, but not limited to, a CPU and/or memory via a bus) for further processing captured and/or processed data from the sample testing device.

In some examples, bimodal waveguide interferometer biosensors may exhibit high sensitivity in the sample refractive index measurement. Additionally, the result may also be highly sensitive to the environmental temperature. As such, there is a need to maintain a stable temperature during operations.

Some examples of the present disclosure may overcome various technical challenges. In some examples, proposed thermally controlled waveguide interferometer sample testing devices described herein may maintain constant temperatures (for example, within a temperature range) to ensure sensor output accuracy.

In some examples, heating/cooling component (for example, but not limited to, a heating and/or cooling element, plate, pad and/or the like) may be provided to adjust the temperature of the waveguide sample testing device. In some examples, an on-chip temperature sensor may be utilized to monitor the sample testing device/chip temperature. In some examples, multiple point temperate sensors may be arranged at each corner of the sample testing device substrate layer to monitor uniformity and confirm thermal equilibrium.

In some examples, an insulating case may be used to isolate the sensor chip from the ambient environment with only limited access and/or opening areas for sample opens (or sample windows) and light input/output. An additional heating/cooling component (for example, but not limited to, a heating and/or cooling pad) may be added to one or more surfaces (for example, but not limited to, the upper surface) of the waveguide sample testing device to further improve temperature uniformity. An example sample testing device may include a resistive heating pad, built-in conductive coating, additional Peltier cooling plate and/or the like.

In some examples, multi-point temperature sensors may be arranged to improve temperature measurement accuracy. In some examples, sample tests under different temperature conditions may be achieved by setting the temperature control to different values. In some examples, data on the sample result and temperature may be collected. In some examples, testing may be facilitated as a result of minimum heating mass.

In some examples, the sample testing device may comprise a thermally controlled waveguide housing configured to maintain a constant temperature with respect to the waveguide. The thermally controlled waveguide housing may be or comprise a casing or sleeve. The thermally controlled waveguide housing may comprise a heating and/or cooling pad and/or an insulating case. In some examples, the one or more sensors in the substrate layer may monitor and adjust the temperature of the waveguide during operations. For example, the temperature may be limited to a suitable range (for example, but not limited to, between 10-40 degrees Celsius).

Figure 17:
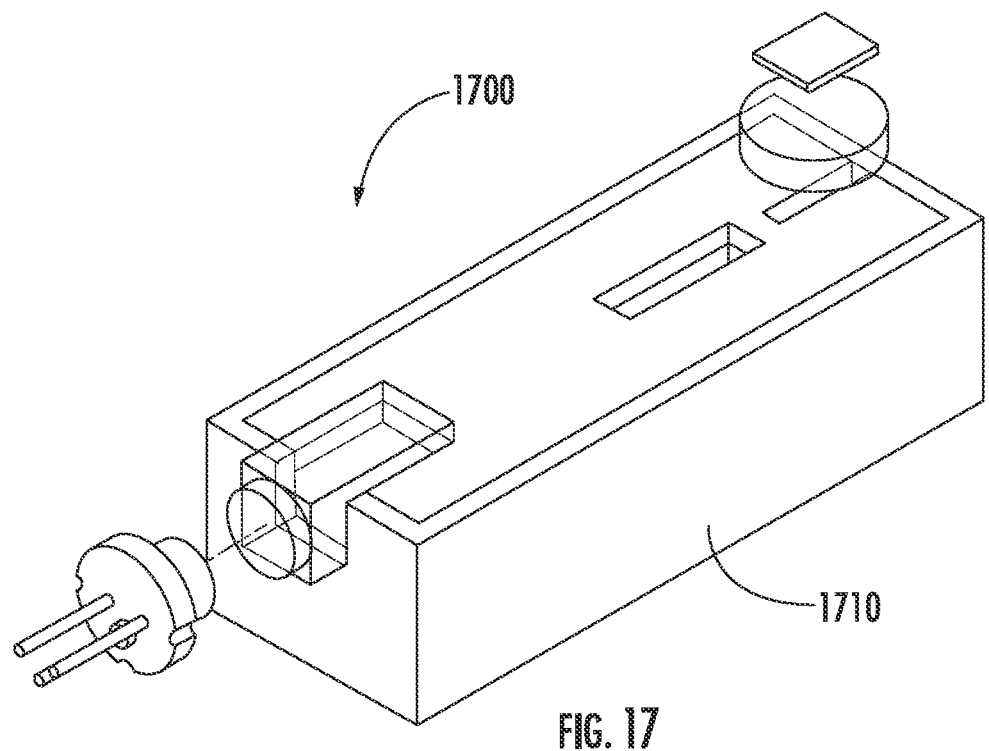
FIG. 17 illustrates an example perspective view of an example thermally controlled waveguide housing in accordance with various examples of the present disclosure.

FIG. 17 illustrates an example thermally controlled waveguide housing 1710 encasing an example waveguide 1700 (for example, but not limited to, embodied as an integrated chip). The waveguide 1700 (including the thermally controlled waveguide housing) may have a thickness ranging between 1 and 3 millimeters. The thermally controlled waveguide housing 1710 may be less than 0.2 millimeters thick. An example thermally controlled waveguide housing 1710 may be manufactured using packaging processes (e.g., polymer over molding). In another example, an example thermally controlled waveguide housing may comprise one or more directly coated surfaces of the sample testing device.

While the description above provides example measurements of waveguide 1700 and the thermally controlled waveguide housing 1710, it is noted that the scope of the present disclosure is not limited to the description above. In some examples, an example waveguide 1700 and the thermally controlled waveguide housing 1710 may have other values.

In some examples, the thermally controlled waveguide housing 1710 may comprise a thermally insulated semiconductor material, thermo-conductive polymer, ceramic, silicon and/or the like. Additionally and/or alternatively, the thermally controlled waveguide housing 1710 may be or comprise a thin film and/or coating, for example, silicon or dioxide polymer. The waveguide 1700 may exhibit a low thermal mass such that the temperature of the waveguide 1700 may be controlled to a precise level (for example, but not limited to, within an accuracy of 1 degree Celsius) in a short amount of time. For example, the temperature of the waveguide 1700 may be modulated/calibrated in less than 10 seconds.

While the description above provides example materials and/or characteristics of waveguide 1700 and the thermally controlled waveguide housing 1710, it is noted that the scope of the present disclosure is not limited to the description above. In some examples, an example waveguide 1700 and the thermally controlled waveguide housing 1710 may comprise other materials and/or having other characteristics.

Figure 18:
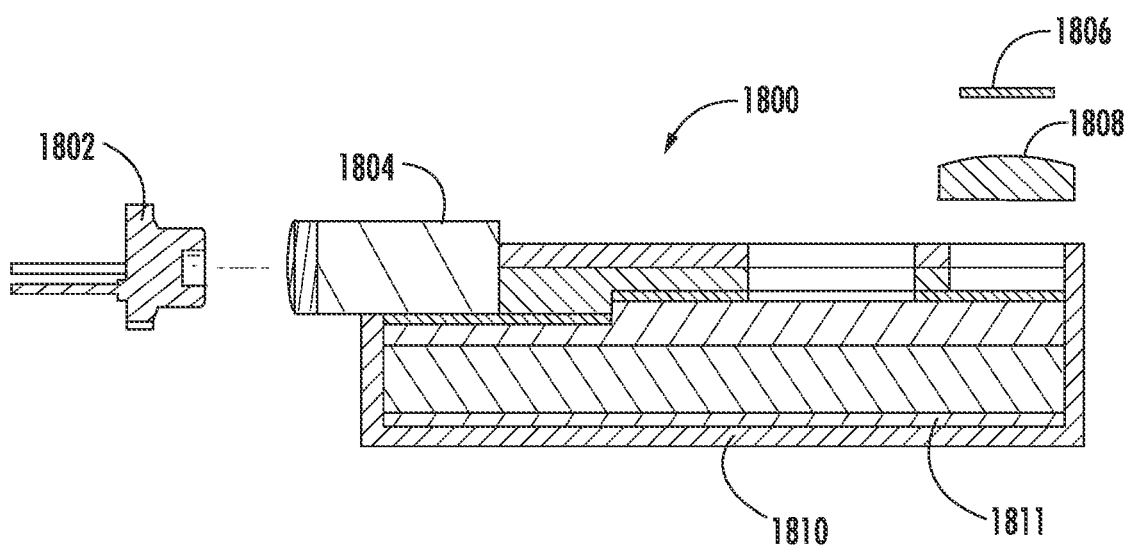
FIG. 18 illustrates an example side-section view of an example thermally controlled waveguide housing in accordance with various examples of the present disclosure.

FIG. 18 illustrates a side view of an example waveguide 1800 and thermally controlled waveguide housing 1810. Additionally, or alternatively, the thermally controlled waveguide housing 1810 may include one or more additional layers. For example, the thermally controlled waveguide housing 1810 may include an intermediary layer 1811 to provide insulation and/or facilitate electrical isolation. Additionally, or alternatively, the intermediary layer 1811 may comprise a heating/cooling pad as described above in connection to FIG. 17.

In some examples, the thermally controlled waveguide housing 1810 may be formed using semiconductor/integrated circuit packaging techniques/processes (for example, but not limited to, a thermally insulative polymer over-molding techniques/processes). The thermally controlled waveguide housing 1810 may comprise thermally insulative compounds or materials. The thermally controlled waveguide housing 1810 may include one or more apertures providing openings for accessing and/or interfacing with the waveguide 1800. For example, an aperture may provide access to the interface layer (not depicted) within the thermally controlled waveguide housing 1810. As shown, the waveguide 1800 may comprise a second aperture through which a light source 1802 and an integrated optical component 1804 may interface (for example, but not limited to, connect with) the waveguide 1800. Additionally, the waveguide 1800 may comprise a third aperture through which the imaging component 1806 and the lens component 1808 may interface (for example, but not limited to, connect with) the waveguide 1800. In some example examples, one or more thin films and/or coatings may be applied to the waveguide 1800 or the thermally controlled waveguide housing 1810 using silicon processes. In some examples, the thin films and/or coatings may be applied only to the upper surface and bottom surface of the waveguide 1800 and/or the thermally controlled waveguide housing 1810. In such examples, thin edge leaking may be negligible as the thickness of the waveguide 1800 may be small relative to its length and width.

In some examples, achieving accurate testing results from a waveguide may require controlled temperature in the surrounding environment (for example, but not limited to, the entire laboratory, medical facility and/or the like) to reduce or eliminate temperature inference with testing results. An example thermally controlled waveguide housing 1810 may facilitate individual level control of the waveguide using one or more temperature sensors (for example, but not limited to, multipoint temperature sensors) integrated within the substrate layer. For example, a sensing diode may be integrated (for example, but not limited to, bonded) within the substrate layer comprising silicon. In some examples, the sensing diode may be integrated (for example, but not limited to, bonded) to a different waveguide layer. In some examples, current passing through the sensing diode may be monitored in order to increase or decrease the temperature associated with the waveguide 1800 substrate layer, such that the waveguide 1800 may maintain a constant temperature to ensure sensor output accuracy and testing stability and accuracy. In some examples, the waveguide may cover an area of approximately 0.5 square inches. The temperature of the waveguide/sample testing device may be continuously monitored and controlled. For example, a control algorithm in an example chip may continuously monitor temperature data and provide optimized control in response to any temperature variations.

While the description above provides an example of controlling temperature associated with the waveguide, it is noted that the scope of the present disclosure is not limited to the description above. In some examples, temperature control may be achieved through other means and/or via other device(s).

In some examples, bimodal waveguide interferometers may exhibit high sensitivity under bio-chemical refractive index testing conditions. However, the result may be highly sensitive to the temperature. For example, the temperature stability requirement may be 0.001 degree Celsius to achieve the required level of test accuracy, which may pose technical challenges in real-world applications.

Some examples of the present disclosure may overcome various technical challenges. In some examples, by introducing built-in reference channels, the temperature related measurement variation may be self-calibrated to eliminate temperature related measurement error. For example, the lab-on-a-chip sample testing device may consist of a bimodal waveguide interferometer with additional two adjacent channels for reference. The close arranged same structure (for example, but not limited to, $SiO_2$) clad reference channels may eliminate the need for temperature related accurate control and compensation. Additionally, or alternatively, closed reference cells may be included in the reference channels, filled with known reference bio-chemical solutions to further improve accuracy. The bio-chemical solutions may comprise pure water, known viruses and the like. The temperature control may be combined with heating/cooling and temperature sensing via sensors to collect the sample test results under different temperature conditions. In some examples, the temperature accuracy requirement is only needed to within 1 degree Celsius level.

In various examples, the sample testing device may comprise a waveguide configured to be coupled with and/or receive input from a light source utilizing methods such as diffraction grating, end firing, direct coupling, prism coupling, and/or the like. The waveguide may be or comprise an integrated chip.

In some examples, the waveguide may be or comprise a three-dimensional planar waveguide interferometer comprising a plurality of layers. In some examples, the waveguide may comprise at least a substrate layer (defining the bottom of the sample testing device) having a waveguide layer deposited thereon. Additionally, or alternatively, an interface layer may be deposited on or above the waveguide layer. The waveguide may be fabricated as a unitary body or component in accordance to techniques similar to semiconductor fabrication techniques. In some examples, additional intermediary layers may be provided.

Figure 19:
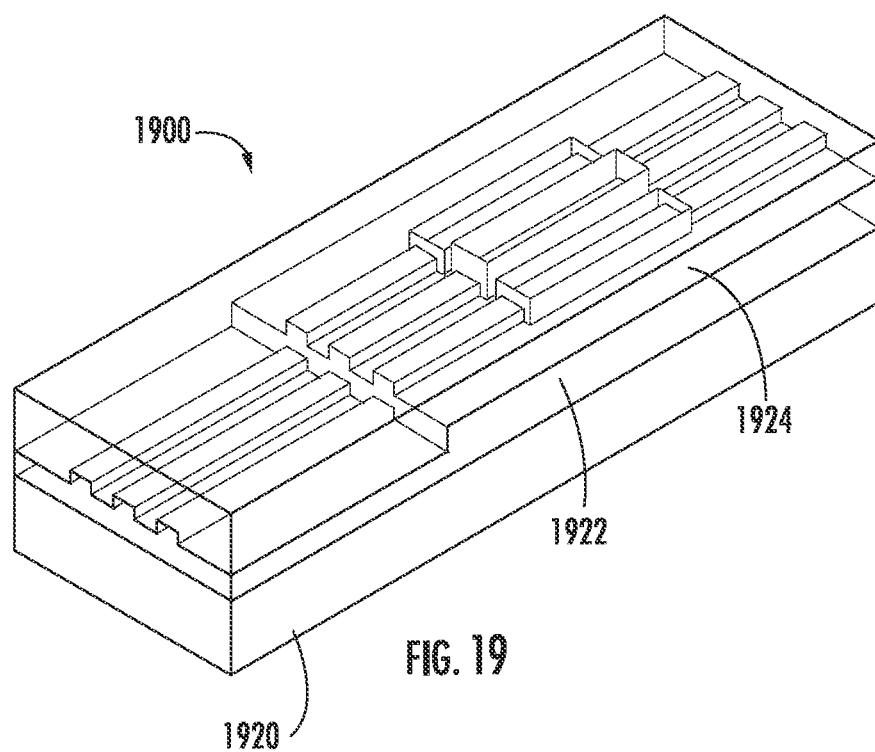
FIG. 19 illustrates an example perspective view of an example waveguide in accordance with various examples of the present disclosure.

FIG. 19 illustrates an example waveguide 1900 comprising a substrate layer 1920, an interface layer 1924 defining a top surface of the waveguide 1900 and a waveguide layer 1922 therebetween. In some embodiments, a flow channel plate maybe positioned on the top surface of the waveguide 1900, details of which are described herein.

The waveguide layer 1922 may itself comprise one or more layers and/or regions (for example, but not limited to, films of transparent dielectric material such as silicon nitrate). The waveguide layer 1922 may comprise a transparent medium configured to receive and couple light laterally from a first/input end of the waveguide layer 1922 to an opposite end/distal end of the waveguide layer 1922. The waveguide layer 1922 may be configured to enable a plurality of propagating modes, for example, a zero-order mode and a first-order mode. For example, a waveguide layer 1922 with a stepped profile may correspond with a zero-order mode and a first-order mode.

As illustrated in FIG. 19, the waveguide layer 1922 may comprise a unitary body having a first region with a first width/thickness (corresponding with the x-direction when the waveguide is viewed in FIG. 19) and a second region having a second width/thickness that is different from the width/thickness of that of the first region. As shown, the waveguide layer 1922 may define a stepped profile, with a first region corresponding with a first/shorter profile and a second region corresponding with a second/taller profile. Each waveguide layer region may correspond with different dispersions of light/energy therein and thus may correspond with a different refractive index from the other regions and layers in the waveguide 1900.

During operations, as light is coupled into the waveguide 1900 and travels from a first region corresponding with a first/shorter profile of the waveguide layer to a second region corresponding with a second/taller profile, the difference between the refractive index of the first region and the refractive index of the second region causes different dispersions of light corresponding with a zero-order mode in the first region and a first-order mode in the second region. As described above, the zero-order mode and first-order mode correspond with two different light beams having different optical path lengths corresponding with different interference fringe patterns. For example, as described above, an interference fringe pattern may occur when there is at least a partial phase difference between the beam of light reflected from the region corresponding with the zero-order mode and the region corresponding with the first-order mode. An example waveguide with a stepped profile may exhibit a phase difference when the beams of light traveling reaches the intersection between the two different regions (i.e., the step portion). For instance, the interference fringe pattern associated with a zero-order mode may be a singular bright spot surrounded by a dim edge, whereas the interference fringe pattern associated with a first-order mode may be more than one bright spot (for example, but not limited to, two bright spots) each surrounded by a dim edge.

In some examples, additional regions with different widths/thicknesses may be included to provide additional order modes.

The dispersions of light and corresponding interference fringe patterns may be detected and measured in the sample testing device's sensing layer/environment, for instance in the substrate layer (for example, but not limited to, using one or more sensors in the substrate layer). Additionally, or alternatively, when surface conditions change at the top surface of the sample testing device, for instance in the interface layer (for example, but not limited to, when a medium is deposited thereon), such surface condition changes may induce changes to the measured refractive index and/or evanescent field right above the surface of the waveguide. Corresponding changes to interference fringe patterns may be measured, detected and/or monitored. In some examples, the interface layer above the waveguide layer may include one or more sample openings (or sample windows) and/or opening/windows configured to receive medium thereon (for example, but not limited to, liquids, molecules and/or combinations thereof). Accordingly, the output from the waveguide layer may change in response to the medium(s) located above in the interface layer.

As illustrated in FIG. 19 and discussed above, the waveguide layer 1922 may define a stepped profile. As shown, the thickness/width of the second region (corresponding with the taller profile/step) may be greater than the thickness/width of the first region (corresponding with the shorter profile/step) of the waveguide layer 1922. In some examples, the thickness/width of the second region may be at least twice the width of the first region.

A waveguide with a single optical channel/optical path may pose technical challenges when used in testing applications. For example, such systems may be sensitive to changes in environmental conditions (for example, but not limited to, temperature changes) that may obscure test results (for example, but not limited to, interference fringe patterns). These challenges may be addressed by including at least one reference channel in the waveguide and ensuring identical environmental conditions within the waveguide during operations.

An example waveguide may comprise at least one test optical channel (also referred to as sample channel) and one reference channel, each comprising an optical path configured to confine light laterally through the waveguide layer in the waveguide. The output of each testing/reference channel may be independently measured and/or monitored during operations to ensure uniformity of testing and environmental conditions that may result in inaccurate results (for example, but not limited to, inaccurate interference fringe patterns caused by ambient conditions). A light source may be configured to uniformly illuminate all of the testing/reference channels in the waveguide.

For each of the plurality of optical channels, small refractive index variations and or induced index changes (for example, but not limited to, changes in dispersion of the light along the corresponding optical path) may be independently measured and tested (for example, but not limited to, in the substrate layer) to identify a corresponding output (for example, but not limited to, interference fringe pattern) associated with each optical channel. Data describing the outputs may be captured and transferred for further operations such as storing, analyzing, testing and/or the like.

In some examples, the substrate layer may function as the sensing layer/environment of the sample testing device. The substrate layer may be or comprise a semiconductor integrated circuit/chip (for example, but not limited to, a silicon oxide chip or wafer). An example integrated circuit/chip may include a plurality of sensors, transistors, resistors, diodes, capacitors and/or the like. The substrate layer may have a lower refraction index than the waveguide layer above. The substrate layer may comprise a protective sealing film eliminating sensitivity to changes in the sensing environment therein.

The interface layer may comprise an optically transparent material such as glass or a transparent polymer coupled to and located directly above the waveguide layer. Deposits of medium on the surface of the interface layer may induce changes to the refractive index in the optical channels/waveguide layer beneath.

A reference window associated with a reference channel may be clad, sealed or accessible for receiving deposits of reference medium thereon (for example, but not limited to, air, water, a known biochemical sample and/or the like).

A sample window may be configured to receive a sample medium (for example, but not limited to, molecule, liquid and/or combinations thereof) for testing. In some examples, a sample medium (for example, but not limited to, biochemical sample) deposited on the sample window may interact with the surface and/or a medium thereon. For example, through physical attraction (for example, but not limited to, surface tension) or a chemical reaction (for example, but not limited to, chemical bonding, antibody reaction and/or the like). The surface of the sample window may be configured to interact with a particular type of medium or type of molecule in a medium. In some embodiments, the sample medium may be provided to a flow channel that is positioned on the sample window, details of which are described herein.

Figure 20A:
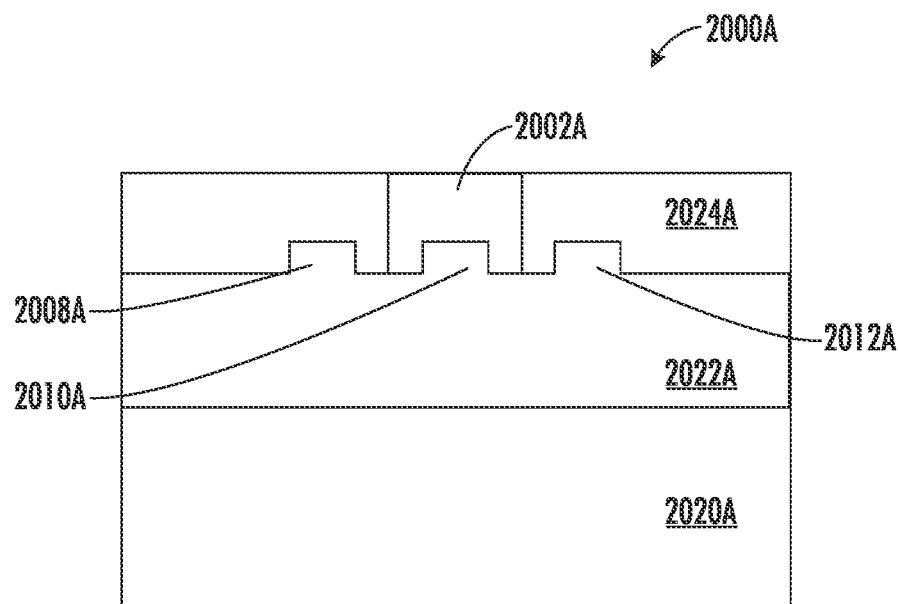
FIG. 20A illustrates an example side-section view of an example waveguide in accordance with various examples of the present disclosure.
Figure 20B:
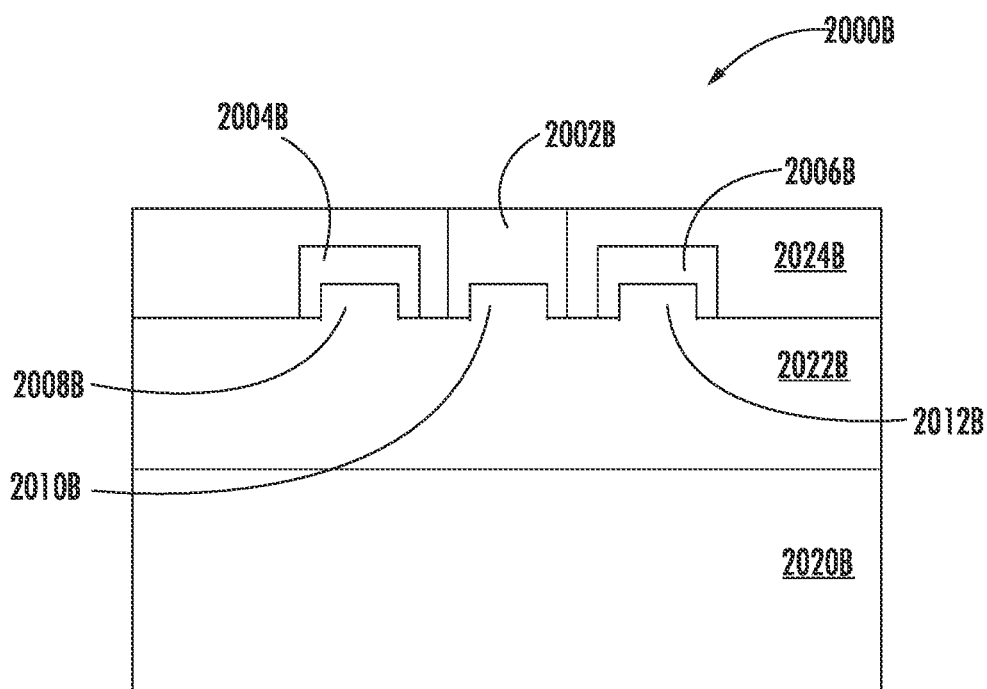
FIG. 20B illustrates an example side-section view of an example waveguide in accordance with various examples of the present disclosure.

FIG. 20A and FIG. 20B show side-section views of exemplary configurations of optical channels in waveguides. As shown, each waveguide 2000A/2000B comprises a substrate layer 2020A/2020B, a waveguide layer 2022A/2022B and an interface layer 2024A/2024B.

Referring to FIG. 20A, the waveguide layer 2022A may comprise a first sample channel 2010A associated with a sample window 2002A in the interface layer 2024A, a first reference channel 2008A and a second reference channel 2012A. As shown, the first and second reference channels 2008A, 2012A may be clad (for example, but not limited to, a silicon oxide clad reference without a reference medium therein) for testing purposes.

Referring to FIG. 20B, the waveguide layer 2022B may comprise a first sample channel 2010B associated with a sample window 2002B in the interface layer 2024B, a first reference channel 2008B associated with a first reference window 2004B in the interface layer 2024B, and a second reference channel 2012B associated with a second reference window 2006B in the interface layer 2024B. Each reference window 2004B, 2006B may be sealed and contain the same or different reference mediums (for example, but not limited to, air, water, a biochemical sample and/or the like) for testing purposes. Alternatively, in some examples, one reference channel may be clad and a second optical channel may be sealed with a medium in the associated reference window therein.

While the description above provides some example configurations, it is noted that the scope of the present disclosure is not limited to the description above. In some examples, an example may comprise one or more additional and/or alternative elements. For example, less than two or more than two reference channels may be implemented.

Referring back to FIG. 20A and FIG. 20B, the sample window 2002A/2002B may be configured to receive a deposit of a sample medium (for example, but not limited to, molecule, biochemical sample, virus and/or the like) on the surface of the interface layer. Example sample testing device components may be reusable, disposable and/or comprise combinations of reusable and disposable portions. In some embodiments, the sample window 2002A/2002B may comprise one or more biological or chemical elements (for example, antibodies) disposed on the surface to attached certain molecules in the sample medium for testing, similar to those described above. In some embodiments, the sample window 2002A/2000B may be cleaned after each use (e.g., using distilled water, isopropyl alcohol and/or the like). In some embodiments, the sample medium may be received via a flow channel, details of which are described herein.

The substrate layer (for example, but not limited to, one or more sensors in the substrate layer of the waveguide) may detect and measure local changes in the measured refractive index caused by changes in the direction of travel of the light corresponding with different sample mediums deposited on the sample window 2002A/2002B.

The waveguide layer may comprise a plurality of sample channels, reference channels, sample windows and/or combinations thereof. The sample channels and reference channels in the waveguide layer may be substantially parallel to one another and further be associated with openings/windows in the interface layer above.

Figure 21:
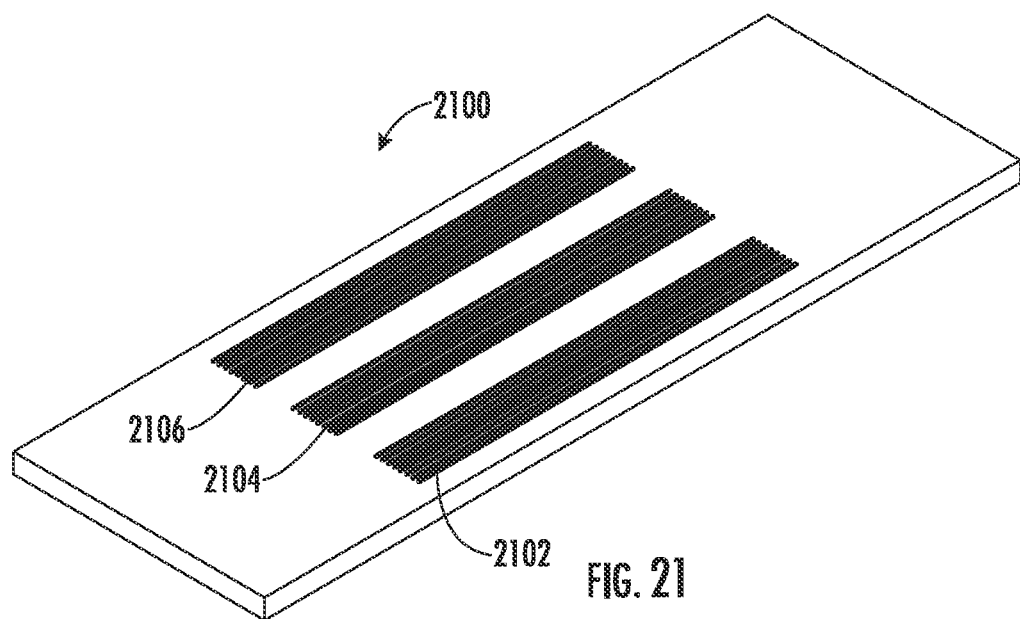
FIG. 21 illustrates an example perspective view of an example waveguide in accordance with various examples of the present disclosure.
Figures 22, 23:
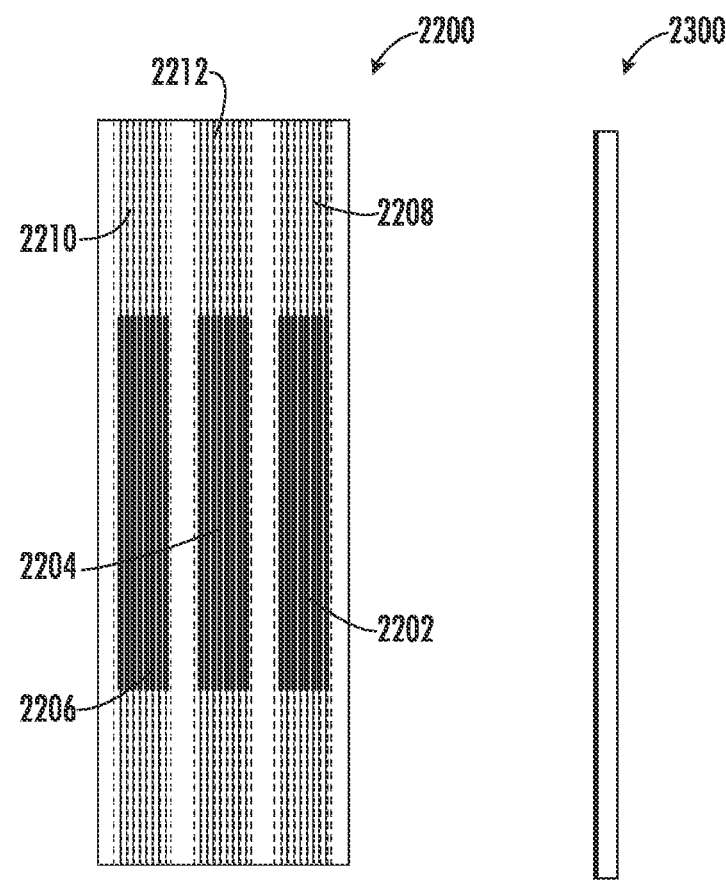
FIG. 22 illustrates an example top view of an example waveguide in accordance with various examples of the present disclosure.
FIG. 23 illustrates an example side view of an example waveguide in accordance with various examples of the present disclosure.

FIG. 21 to FIG. 23 illustrate various views of an example waveguide that may be manufactured in accordance with methods that are similar to semiconductor manufacturing techniques and as described herein.

Referring now to FIG. 21, an example waveguide 2100 comprising a plurality of sample windows 2102, 2104, 2106 each associated with a plurality of optical channels (not depicted).

FIG. 22 illustrates a top view of an example waveguide 2200 comprising a plurality of sample windows 2202, 2204, 2206 each associated with a plurality of buried optical channels 2208, 2210, 2212. Each example optical channel 2208, 2210, 2212 may have a width less than 50 nm, a length ranging between 1-5 millimeters, and a depth less than 1 micron, for example between 0.1-0.3 micron. Each optical channel 2208, 2210, 2212 may be laterally spaced approximately 0.1 millimeters from a neighboring/adjacent optical channel.

FIG. 23 illustrates a side view of an example waveguide 2300 having a width that is approximately less than 1 millimeters thick (for example, but not limited to, between 0.2-0.3 millimeters).

While the description above provides some example measurements, it is noted that the scope of the present disclosure is not limited to the description above. In some examples, an example may comprise one or more elements that have measurement(s) that are different from those described above.

In some examples, a waveguide may be formed using manufacturing techniques and/or processes similar to those used for semiconductor and integrated circuit fabrication.

Figure 24:
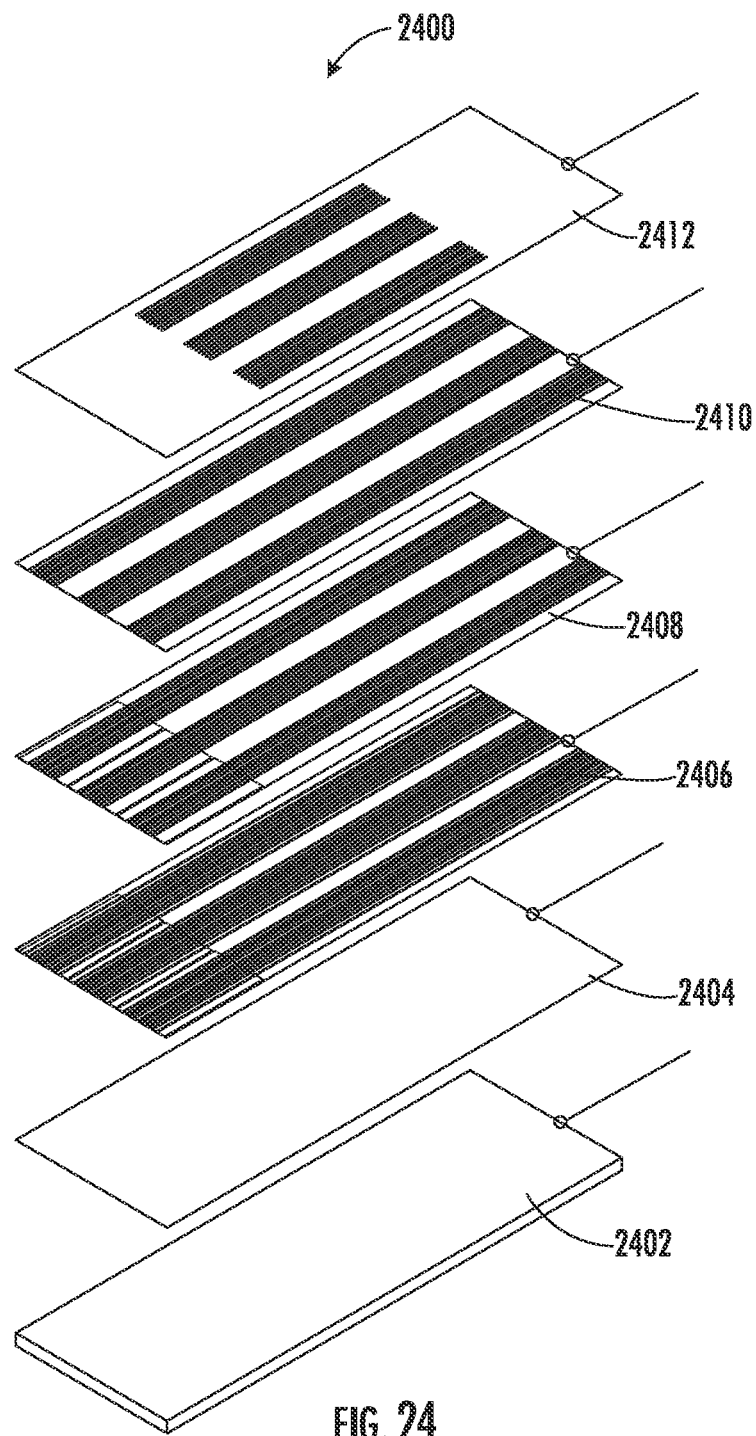
FIG. 24 illustrates an example method for providing an example waveguide in accordance with various examples of the present disclosure.

FIG. 24 illustrates an example fabrication method for producing a waveguide 2400 in accordance with various examples of the present disclosure. A plurality of layers/components may be coupled together/layered under suitable laboratory conditions to provide the waveguide 2400. As shown, a substrate layer 2402, an intermediary layer 2404, a plurality of waveguide layers 2406, 2408, 2410 and an interface layer 2412, may be coupled together to produce the waveguide 2400. During an example manufacturing process, after fabrication of a silicon wafer, the waveguide layers 2406, 2408, 2410 may be transferred unto a glass wafer.

"Edge firing" refers to the mechanism of directing light into a waveguide through a side surface of the waveguide (e.g. an "edge"). Edge firing waveguide faces many technical difficulties, including alignment of the waveguide properly to the light source. This may be caused by a variety of factors. For example, the sub-micron scale of a cross-section of a waveguide may cause the optical alignment requirement goes beyond mass production product capability. For example, on-chip grating coupler may experience wafer process difficulty in alignment.

In accordance with some examples of the present disclosure, on-chip micro CPC (Compound Parabolic Concentrator) lens array may reduce optical alignment requirement more than ten times to allow mass production. For example, the micro lens array may be precisely produced with silicon wafer process. In some embodiments, a single chip, direct edge firing waveguide (without additional coupler) may allow a waveguide sensing product having a reduced size and/or a lower production cost.

In some embodiments, a micro CPC lens array may be arranged at the input edge of the waveguide. The output end of each concentrator lens of the micro CPC lens array may be aligned to one waveguide channel. The input end of each concentrator lens may cover the input area for high coupling efficiency. In some embodiments, the on-chip micro lens may be produced with silicon process with high precision.

In some embodiments, a single chip, direct edge firing waveguide (without additional coupler) may reduce the application instrument complexity and cost, while requiring only minimum component count. In some embodiments, a micro CPC lens array may increase the light input area by more than 3700 times. In some embodiments, the light source may be simplified with a collimation module to further reduce the product size and cost.

Figure 25:
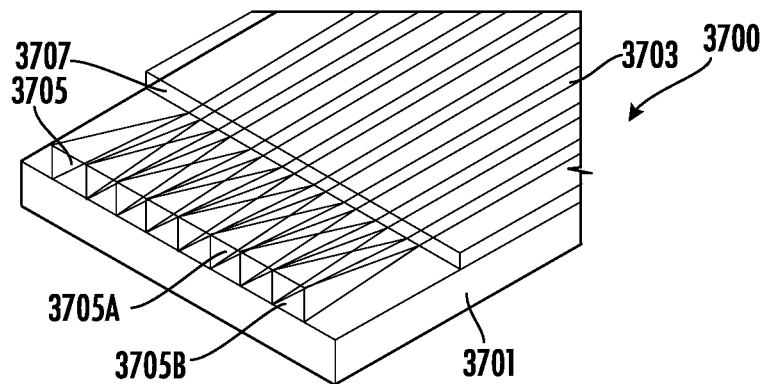
FIG. 25 illustrates an example view of a portion of an example sample testing device in accordance with various examples of the present disclosure.

Referring now to FIG. 25, a portion of an example sample testing device 3700 is shown. In the example shown in FIG. 25, the example sample testing device 3700 comprises a substrate 3701, a waveguide 3703 disposed on the substrate 3701, and a lens array 3705 disposed on the substrate 3701.

Similar to the substrate layer described above, the substrate 3701 may provide mechanical support for various components of the sample testing device. For example, the substrate 3701 may provide mechanical support for the waveguide 3703 and the lens array 3705.

In some embodiments, the substrate 3701 may comprise material such as, but not limited to, glass, silicon oxide, and polymer.

In some examples, the waveguide 3703 and/or the lens array 3705 may be disposed on top of the substrate 3701 through various means, including but not limited to, mechanical means (for example, a binding clip) and/or chemical means (such as the use of adhesive material (e.g. glue)).

In some embodiments, the lens array 3705 is configured to direct light to an input edge (for example, the input edge 3707 shown in FIG. 25) of the waveguide 3703.

In some embodiments, the lens array 3705 comprises a compound parabolic concentrator (CPC) lens array. As an example, the compound parabolic concentrator (CPC) lens array comprises a plurality of concentrator lens (for example, concentrator lens 3705A, concentrator lens 3705B). In the example shown in FIG. 25, the output end of each concentrator lens is aligned to an optical channel of the waveguide 3703 (for example, an input opening of the corresponding optical channel), and the input end of each concentrator lens is aligned with an input light source, details of which are described here.

In some embodiments, the lens array 3705 comprises a micro CPC lens array. In some embodiments, the lens array 3705 comprises an asymmetric CPC lens array. In some embodiments, the lens array 3705 comprises an asymmetric micro CPC lens array.

Figure 26:
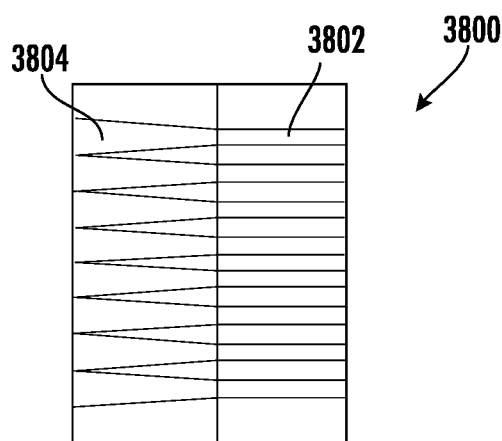
FIG. 26 illustrates an example view of a portion of an example sample testing device in accordance with various examples of the present disclosure.

Referring now to FIG. 26, a portion of a top view of an example sample testing device 3800 is shown. In the example shown in FIG. 26, the example sample testing device 3800 may comprise a lens array that includes, for example but not limited to, concentrator lens 3804. The example sample testing device 3800 may also comprise a waveguide that may comprise, for example but not limited to, an optical channel 3802. As described above and will be described in more details herein, light may travel through the optical channel (for example, the optical channel 3802) of the waveguide.

In the example shown in FIG. 26, the output end of the concentrator lens 3804 is aligned to the input edge of the optical channel 3802. As such, the lens array may improve the precision of directing light into the waveguide.

Figure 27:
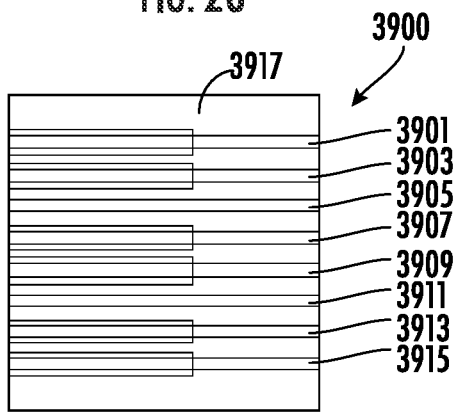
FIG. 27 illustrates an example view of a portion of an example sample testing device in accordance with various examples of the present disclosure.

Referring now to FIG. 27, a portion of a top view of an example sample testing device 3900 is shown. In the example shown in FIG. 27, the example waveguide 3917 of the example sample testing device 3900 may comprise a plurality of optical channels. For example, the waveguide 3917 may comprise a reference channel 3901, a reference channel 3903, a sample channel 3907, a sample channel 3909, a reference channel 3913 and a reference channel 3915. In some embodiments, the example waveguide 3917 may comprise one or more buried optical channels, where the lens array does not direct light into the burned optical channels. For example, the example waveguide 3917 may comprise a buried reference channel 3905 and a buried reference channel 3911.

As will be described in more detail herein, the sample channel 3907 and/or the sample channel 3909 may each comprise or share a sample window for receiving sample to be tested. The reference channel 3901, the reference channel 3903, the reference channel 3913, the reference channel 3915, the buried reference channel 3905 and/or the buried reference channel 3911 may be sealed and contain the same or different reference mediums (for example, but not limited to, air, water, a biochemical sample, and/or the like) for testing purposes. Additionally, or alternatively, in some examples, one or more of the reference channels may be cladded and one or more of the reference channels may be sealed with a medium in the associated reference window.

Figure 28B:
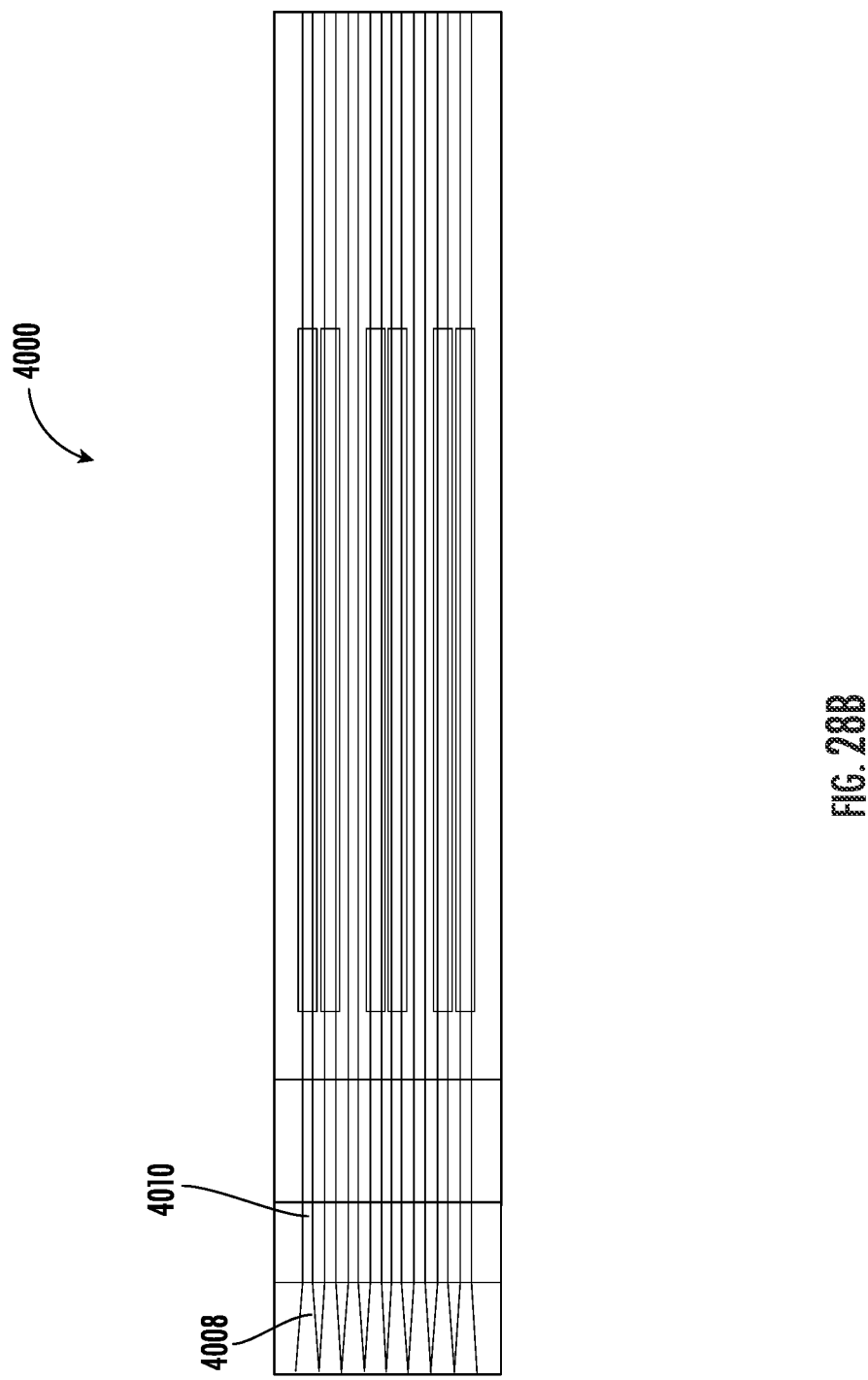
FIG. 28B illustrates an example view of an example sample testing device in accordance with various examples of the present disclosure.

With reference to FIG. 28A and FIG. 28B, an example sample testing device 4000 is shown. Similar to those described above in connection with FIG. 25, FIG. 26, and FIG. 27, the example sample testing device 4000 may comprise a substrate 4002, a waveguide 4004, and a lens array 4006. In some embodiments, the waveguide 4004 may comprise one or more optical channels (for example, the reference channel 4008). In some embodiments, the lens array 4006 may comprise one or more concentrator lenses (for example, the concentrator lens 4010).

In some embodiments, the lens array 4006 is configured to direct light to an input edge of the waveguide 4004. For example, each of the concentrator lens is configured to direct light into an input edge of an optical channel of the waveguide 4004. As shown in the example of FIG. 28A and FIG. 28B, the output edge of the concentrator lens 4010 is coupled to and aligned with an input edge of the reference channel 4008.

In some embodiments, the lens array 4006 is also aligned with a light source. For example, one or more optical elements may be implemented to direct light into the lens array (for example, to the input edge of each of the concentrator lens).

Figure 29:
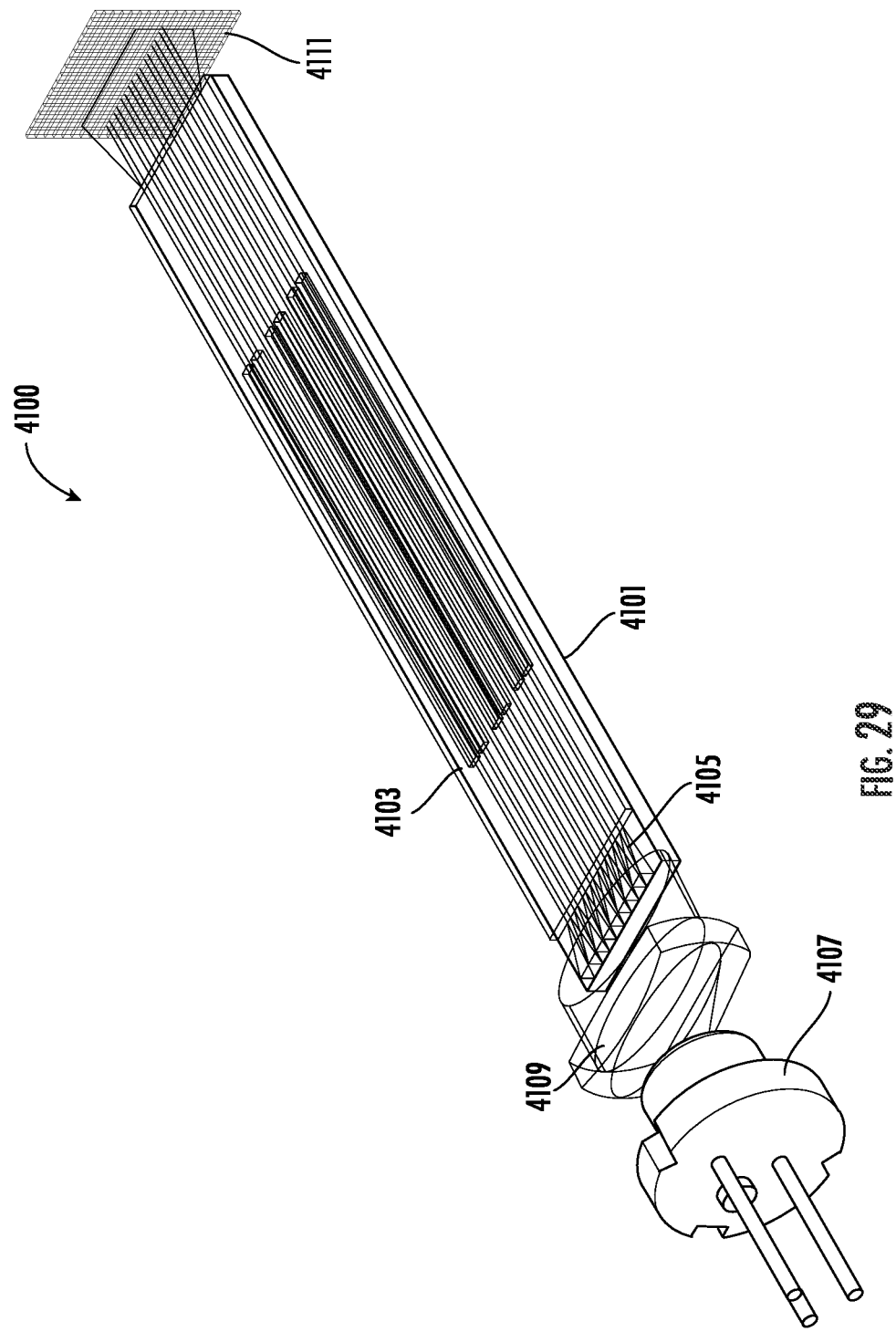
FIG. 29 illustrates an example view of an example sample testing device in accordance with various examples of the present disclosure.

Referring now to FIG. 29, an example sample testing device 4100 is shown. Similar to those described above, the example sample testing device 4100 may comprise a substrate 4101, a waveguide 4103, and a lens array 4105. The lens array 4105 may be configured to direct light to an input edge of the waveguide 4103, similar to those described above.

In the example shown in FIG. 29, the sample testing device 4100 may comprise a light source 4107 and an integrated optical component 4109.

Similar to those described above, the light source 4107 may be configured to produce, generate, emit, and/or trigger the production, generation, and/or emission of light (including but not limited to a laser light beam). The light source 4107 may be coupled to the integrated optical component 4109, and light may travel from the light source 4107 to the integrated optical component 4109. Similar to those described above, the integrated optical component 4109 may collimate, polarize, and/or couple light to the lens array 4105.

Similar to those described above, the lens array 4105 may be configured to direct light to an input edge of the waveguide 4103. For example, each of the concentrator lens of the lens array 4105 is configured to direct light into an input edge of an optical channel of the waveguide (for example, a reference channel or a sample channel). Light travels through the corresponding reference channel or the corresponding sample channel, and may be detected by an imaging component 4111. In some embodiments, the imaging component 4111 may be disposed on an output edge of the waveguide 4103 to collect interferometry data.

It is noted that the scope of the present disclosure is not limited to those described above. In some embodiments of the present disclosure, features from various figures may be substituted and/or combined. For example, while FIG. 25, FIG. 26, FIG. 27, FIG. 28A, FIG. 28B and FIG. 29 illustrate example lens arrays for directing light to the openings of the sample channel or the reference channel, one or more additional or alternative optical elements may be implemented to direct the light to the openings of the sample channel or the reference channel, including but not limited to, the integrated optical component 804 shown in FIG. 4 above.

A multi-channel waveguide (e.g. a waveguide that comprises multiple optical channels) may comprise one or more beam-splitter splitter components (such as Y splitters, U splitters, an/or S splitters) to illuminate the multiple optical channels. However, many beam splitters may face technical limitations, difficulties, and/or application constrains due to the silicon wafer process.

Figure 30:
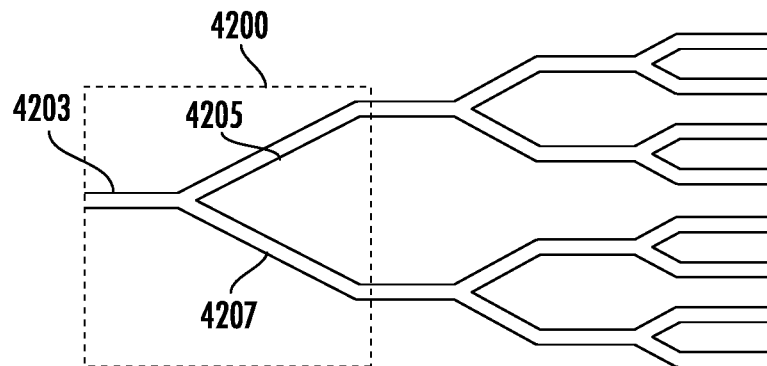
FIG. 30 illustrates a portion of an example waveguide in accordance with various examples of the present disclosure.

For example, FIG. 30 illustrates a portion of an example top view of a waveguide. In the example shown in FIG. 30, the waveguide may comprise one or more Y splitters. For example, the waveguide may comprise an example Y splitter 4200.

The Y splitter 4200 may be shaped similar to a letter "Y" and splits one light beam into two. For example, light may travel from the bottom of the "Y" to the two top branches of the "Y." Referring to the Y splitter 4200 illustrated in FIG. 30, light may travel into the input edge 4203, be split into two, and exit from output edges 4205 and 4207.

In some embodiments, one or more Y splitters may be connected in parallel, such that light may exit an output edge of one Y splitter and enter an input edge of anther Y splitter. In the example shown in FIG. 30, the multiple Y splitters may be connected so as to provide a plurally of optical channels described herein (for example, sample channels and/or reference channels).

However, the Y splitter may face production limitation in providing an uniformed light splitting structure. Additionally, for more than two optical channels, multiple Y splitters may be needed, and the excessive axial chip space may be required.

Figure 31:
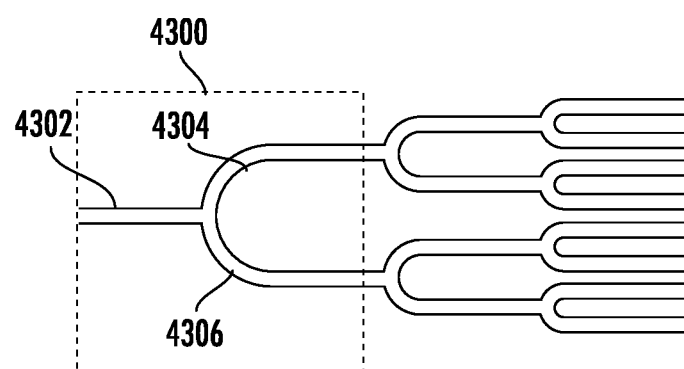
FIG. 31 illustrates a portion of an example waveguide in accordance with various examples of the present disclosure.

As another example, FIG. 31 illustrates a portion of an example top view of a waveguide. In the example shown in FIG. 31, the waveguide may comprise one or more U splitters. For example, the waveguide may comprise an example U splitter 4300.

The U splitter 4300 may be shaped similar to a letter "U" and splits one light beam into two. For example, light may travel from the bottom of the "U" to the two top branches of the "U." Referring to the U splitter 4300 illustrated in FIG. 31, light may travel into the input edge 4302, be split into two, and exit from the output edges 4304 and branch 4306.

In some embodiments, one or more U splitters may be connected in parallel, such that light may exit an output edge of one U splitter and enter an input edge of anther U splitter. In the example shown in FIG. 31, the multiple U splitters may be connected so as to provide a plurally of optical channels described herein (for example, sample channels and/or reference channels).

Similar to the Y splitter example described above, the U splitter may face production limitation in providing an uniformed light splitting structure. The U splitter may also provide a narrower separation between optical channels, which may cause light interference among optical channels.

Figure 32:
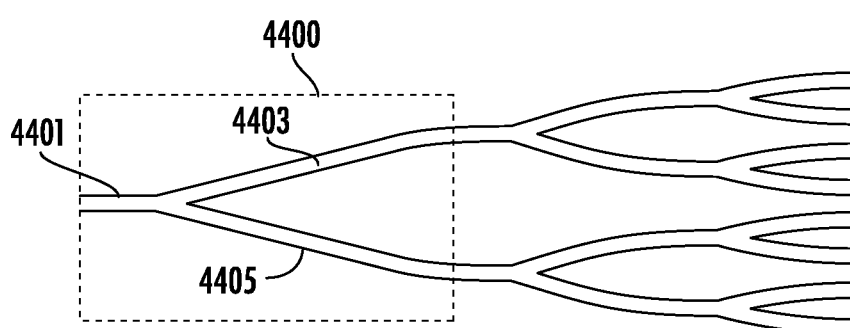
FIG. 32 illustrates a portion of an example waveguide in accordance with various examples of the present disclosure.

As another example, FIG. 32 illustrates a portion of an example top view of a waveguide. In the example shown in FIG. 32, the waveguide may comprise one or more S splitters. For example, the waveguide may comprise an example S splitter 4400.

The S splitter 4400 may split one light beam into two. Referring to the S splitter 4400 illustrated in FIG. 32, light may travel into the input edge 4401, be split into two, and exit from the output edges 4403 and 4405.

In some embodiments, one or more S splitters may be connected in parallel, such that light may exit an output edge of one S splitter and enter an input edge of anther S splitter. In the example shown in FIG. 32, the multiple S splitters may be connected so as to provide a plurally of optical channels described herein (for example, sample channels and/or reference channels).

Similar to the Y splitter example and the U splitter example described above, the S splitter may face production limitation in providing an uniformed light splitting structure. The S splitter may also require extra axial chip space for the S transition, and may face limitation in directing the light along the strait section angles among the S splitters.

As described above, in some embodiments, a micro CPC lens array may be arranged at the input edge of the waveguide. The output end of each concentrator lens of the micro CPC lens array may be aligned to one optical channel. The input end of each concentrator lens may cover an input area for high coupling efficiency. In some embodiments, the on-chip micro lens may be produced with silicon process with high precision.

As such, in accordance with various examples of the present disclosure, flood-illuminated multichannel waveguide may eliminate the beam splitter by flood illuminating the multi-channels with direct end-fire through a micro CPC lens array. In some embodiments, an over-sized laser source may provide light into the micro CPC lens array. In some embodiments, light in illuminated waveguide may be guided to the sensing sections through the curved optical channels, and the curved portion of the optical channels may compensate and optimize the uniformity of light with minimum chip space requirement.

Figure 33A:
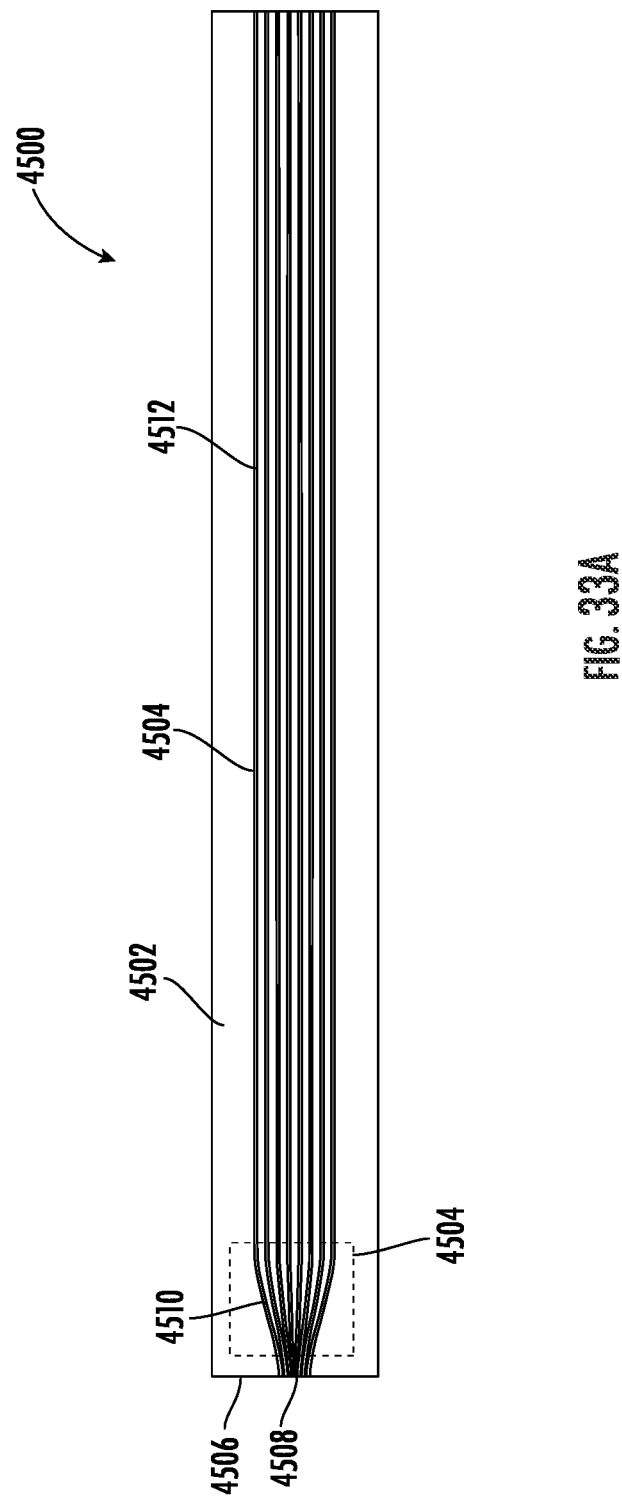
FIG. 33A illustrates a portion of an example waveguide in accordance with various examples of the present disclosure.
Figure 33B:
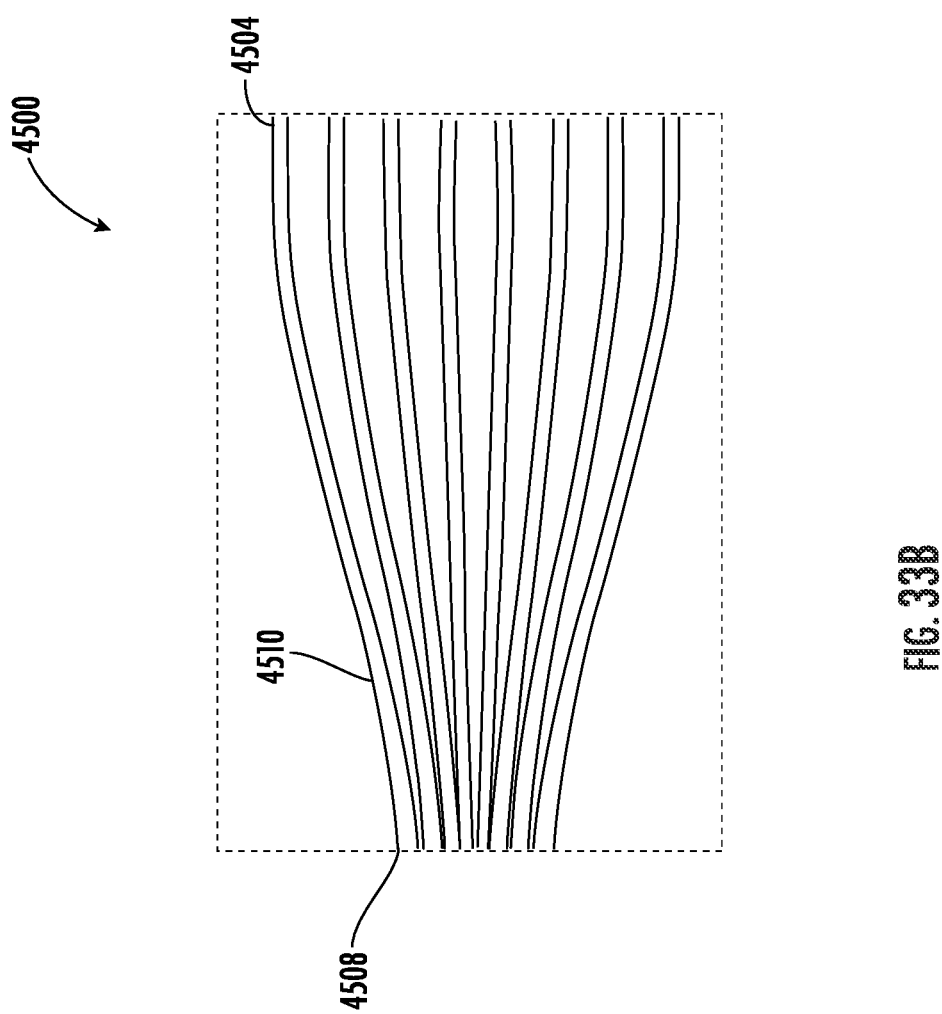
FIG. 33B illustrates a portion of an example waveguide in accordance with various examples of the present disclosure.

Referring now to FIG. 33A and FIG. 33B, an example top view 4500 of at least a portion of an example waveguide 4502 is illustrated. In particular, FIG. 33B zooms in and illustrates a portion (which is the optical channel 4504) of the top view shown in FIG. 33A.

In some embodiments, the example waveguide 4502 may be a flood-illuminated multichannel waveguide.

In the example shown in FIG. 33A, the waveguide 4502 may comprise an input edge 4506 for receiving light from a light source. The input edge 4506 of the waveguide 4502 may comprise a plurality of multi-channel input waveguide openings (also referred to as "input openings" herein), and each of the plurality of input openings corresponds to an opening for an optical channel for receiving input light. For example, the input edge 4506 may comprise an input opening 4508.

In some embodiments, the input edge of the waveguide is configured to receive light. In some embodiments, each of the plurality of input openings is configured to receive light. For example, light may travel onto the input edge 4506, and the input edge 4506 may be configured to receive light. As described above, the input edge 4506 may comprise an input opening 4508. As such, the input opening 4508 may be configured to receive the light. Light may travel through the corresponding optical channel 4504. In some embodiments, the plurality of optical channels (including optical channel 4504) are each configured to guide the light from a corresponding input opening through the corresponding optical channel.

In some embodiments, the input openings of the plurality of optical channels may have the same width. In some embodiments, the input openings of the plurality of optical channels may have different widths. For example, the different widths of the input openings may balance the energy received between optical channels under a single Gaussian profile illumination.

In some embodiments, the input openings of the optical channels may be perpendicular to the input edge of the waveguide. In some embodiments, the input openings of the optical channels may not be perpendicular to the input edge of the waveguide, which may, for example, eliminate the curved space that is required in other splitters (for example, in S splitters).

In some embodiments, each of the plurality of optical channels comprises a curved portion and a straight portion. As an example, in the example shown in FIG. 33A and FIG. 33B, the optical channel 4504 may comprise a curved portion 4510 and a straight portion 4512. In some embodiments, the straight portion 4512 is connected to the curved portion 4510, allowing light to travel from the input opening of the optical channel to the output opening of the optical channel.

In the example shown in FIG. 33A and FIG. 33B, the curved portion 4510 may gradually deviate from the input opening 4508, and may provide a convergent angle for guiding the light through the optical channel 4504. As the light reaches the end of the curved portion 4510, light may travel to the straight portion 4512 and eventually exit the optical channel 4504. As such, the curved portion 4510 may provide polynomial curves to couple the light beam into the sensor waveguide section with optimum uniformity by redirection and compensation.

As shown in FIG. 33A and FIG. 33B, the straight portions of the optical channels may be separated from one other, therefore creating separation between the ends of the optical channels. The separation distance between the ends of optical channels may be determined based on the process capability. For example, small separation may have less energy loss in the flood illumination. In some embodiments, flood illumination with over-sized illumination light spot (for example, an over-sized laser source) at the waveguide input may reduce the alignment requirement due to the slow beam convergent angles. For example, the misalignment sensitivity may be more than ten times less than an end-fire waveguide illumination that does not implement examples of the present disclosure. While there may be energy loss from over-sized illumination and gap energy loss between input ends, examples of the present disclosure may provide sufficient light coupling efficiency for a low power diode laser input and imaging component output with high signal-to-noise ratio.

Referring now to FIG. 34, an example sample testing device 4600 is shown. Similar to those described above, the example sample testing device 4600 may comprise a light source 4601, an integrated optical component 4603, a waveguide 4605, and an imaging component 4607.

Similar to those described above, the light source 4601 may be configured to produce, generate, emit, and/or trigger the production, generation, and/or emission of light (including but not limited to a laser light beam). The light source 4601 may be coupled to the integrated optical component 4603, and light may travel from the light source 4601 to the integrated optical component 4603. Similar to those described above, the integrated optical component 4603 may collimate, polarize, and/or couple light to the waveguide 4605. For example, the integrated optical component 4603 may collimate, polarize, and/or couple light to each of the input opening of the plurality of optical channels within the waveguide 4605. Light travels through the plurality of optical channels (for example, reference channels and/or sample channels), and may be detected by an imaging component 4607. In some embodiments, the imaging component 4607 may be disposed on an output edge of the waveguide 4605 to collect interferometry data.

In the example shown in FIG. 34, the waveguide 4605 may comprise a sensing section 4609 on the top surface the waveguide 4605. The sensing section 4609 may comprise, for example, one or more sample windows of the sample channels for receiving the sample to be tested, and/or one or more reference windows of the reference channels for storing same or different reference mediums (for example, but not limited to, air, water, a biochemical sample, and/or the like) for testing purposes.

In some embodiments, one or more optical channels may share a sample window, therefore forming a joint sample channel. In some embodiments, one or more optical channels may share a reference window, thereby forming a joint reference channel. In some embodiments, the sensing section 4609 may correspond to the straight portions of the optical channel (e.g. without any curved portions).

It is noted that the scope of the present disclosure is not limited to those described above. In some embodiments of the present disclosure, features from various figures may be substituted and/or combined. For example, as described above, the plurality of optical channels described above may be implemented in a waveguide to create one or more sample channels and one or more reference channels as described in other figures.

Waveguide edge input and output may require coupling components (such as, but not limited to, prism or grating) added to a waveguide. In some embodiments, prism may require additional space. In some embodiments, grating may face wavelength dependency issues. Both prism and grating cannot support broadband, and may suffer efficiency loss.

Direct edge coupling may be implemented to couple prism or grating to a waveguide. However, direct edge coupling with post-polished edges may cause production difficulties during the manufacturing process, and may result in high cost in the mass production of a waveguide (for example, packaged as a waveguide chip). As such, there is a need for design and/or mechanism on direct edge coupling that overcomes these difficulties and allows mass production of waveguide chip.

In accordance with various examples of the present disclose, a sample testing device is provided. In some embodiments, the sample testing device may comprise direct edge coupling mechanism that may achieve optical edge quality. For example, during the manufacturing process, edges of the waveguide may be etched to create recessed optical interface edges, such that the waveguide, after dicing (e.g. a finished chip), maintains optical quality of the light input and output surfaces at selected edges. By eliminating the post-polishing process, the optical surface quality of edge surface may be guaranteed with silicon wafer process. As such, the waveguide can be mass produced with the highest efficiency (for example, as a lab-on-a-chip product).

In some embodiments, the surfaces of optical interface edges may be achieved with etching at the end of layer-by-layer manufacturing process for the waveguide. The surfaces of optical interface edges may be etched through all layers, and may have optically clear quality to allow light to directly enter and exit to the waveguide with minimum loss. In other words, the optical interface edges allow focused light to directly enter the waveguide from light source as well as directly exit the waveguide to an imaging component (for example, a photo sensor). In some embodiments, optical components (such as lenses) may be added to further improve the coupling efficiency.

Figure 35A:
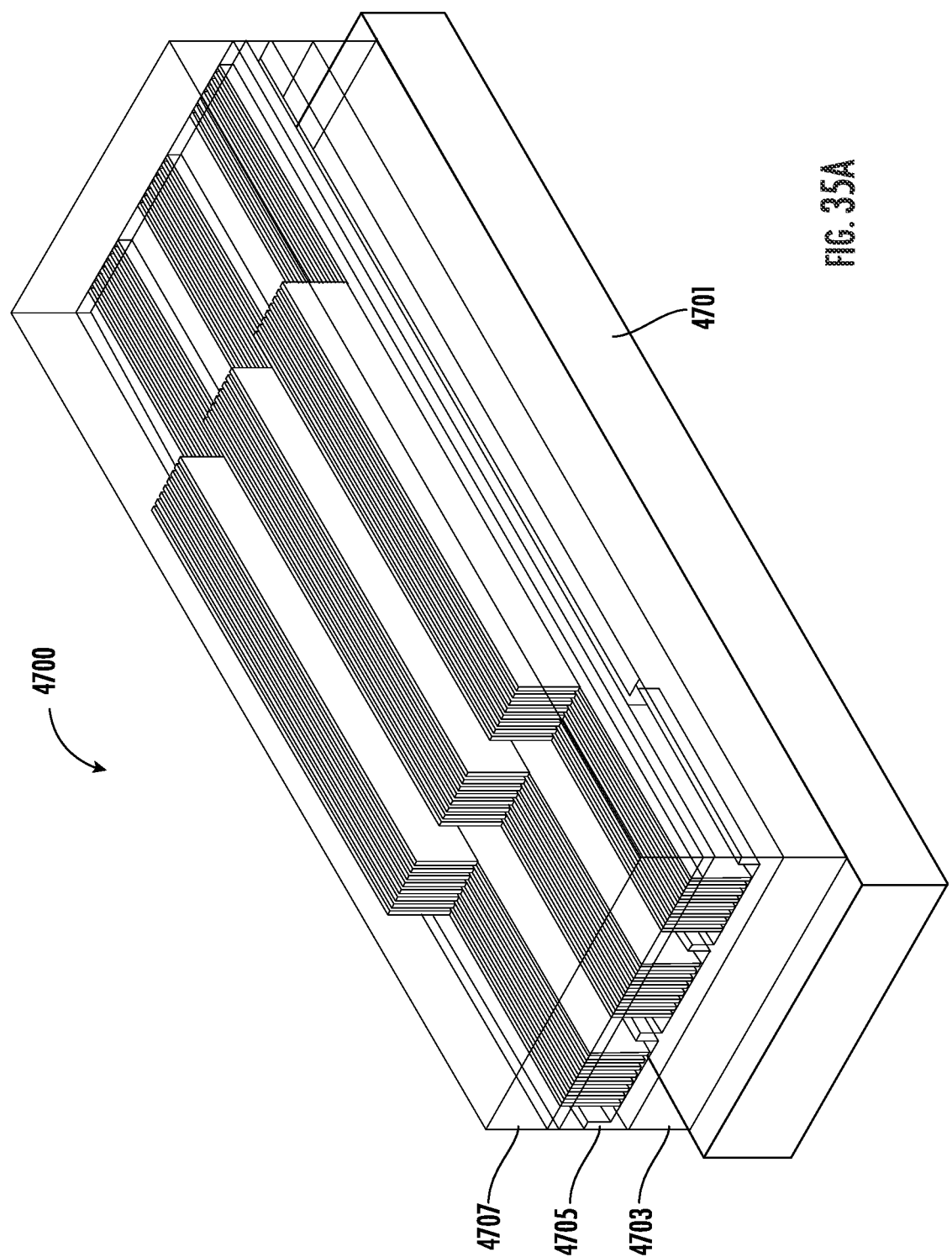
FIG. 35A illustrates an example sample testing device in accordance with various examples of the present disclosure.
Figure 35B:
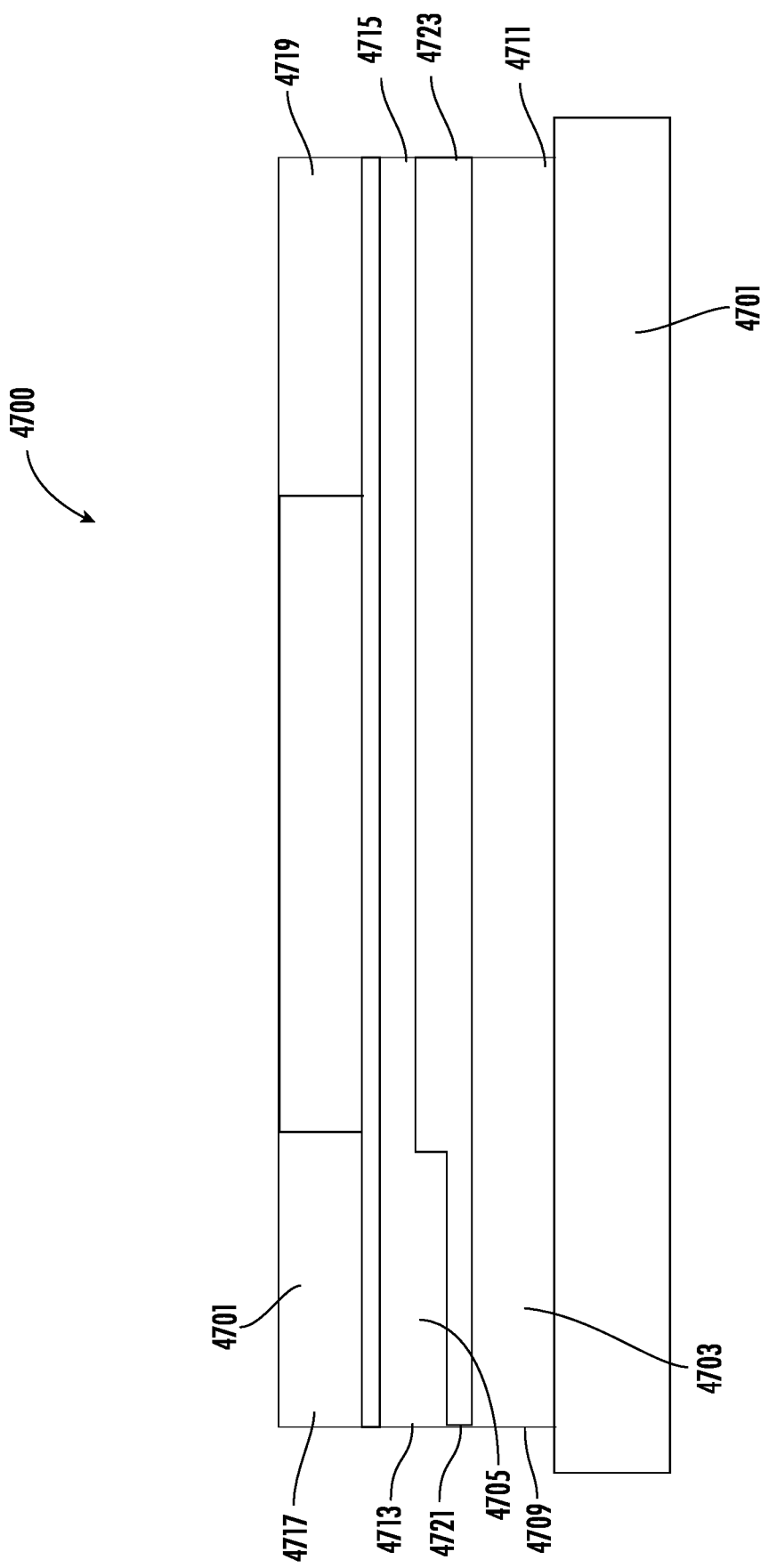
FIG. 35B illustrates an example sample testing device in accordance with various examples of the present disclosure.

Referring now to FIG. 35A and FIG. 35B, an example sample testing device 4700 is illustrated. In particular, the example sample testing device 4700 may be fabricated through various example processes described herein.

In the example shown in FIG. 35A, the example sample testing device 4700 may comprise multiple layers. For example, the example sample testing device 4700 may comprise a substrate layer 4701, an intermediate layer 4703, a waveguide layer 4705, and an interface layer 4707, similar to those described above.

For example, the substrate layer 4701 may comprise material such as, but not limited to, glass, silicon oxide, and polymer. The intermediate layer 4703 may be attached to the substrate layer 4701 through more fastening mechanisms and/or attaching mechanisms, including not limited to, chemical means (for example, adhesive material such as glues), mechanical means (for example, one or more mechanical fasteners or methods such as soldering, snap-fit, permanent and/or non-permeant fasteners), and/or suitable means.

In some embodiments, the waveguide layer 4705 comprise a waveguide (for example, a waveguide that include one or more optical channels). For example, the waveguide layer of the sample testing device may include a layer that comprises $SiO_2$, a layer that comprises $Si3N4$, and a layer that comprises $SiO_2$. In some embodiments, the waveguide layer 4705 may be attached to the intermediate layer 4703 through more fastening mechanisms and/or attaching mechanisms, including not limited to, chemical means (for example, adhesive material such as glues), mechanical means (for example, one or more mechanical fasteners or methods such as soldering, snap-fit, permanent and/or non-permeant fasteners), and/or suitable means.

In some embodiments, the interface layer 4707 may comprise one or more interface elements, such as, but not limited to, one or more sample windows and/or one or more reference windows, similar to those described above. In some embodiments, the interface layer 4707 may be attached to the waveguide layer 4705 through more fastening mechanisms and/or attaching mechanisms, including not limited to, chemical means (for example, adhesive material such as glues), mechanical means (for example, one or more mechanical fasteners or methods such as soldering, snap-fit, permanent and/or non-permeant fasteners), and/or suitable means.

In some embodiments, to achieve optical edge quality, the first edge of the intermediate layer, the first edge of the waveguide layer, the second edge of the intermediate layer, and the second edge of the waveguide layer may be etched during the method. Referring now to FIG. 35B, various etched edges are shown.

In some embodiments, the intermediate layer 4703 may comprise a first edge 4709 and a second edge 4711. In some embodiments, light may enter the intermediate layer 4703 through the first edge 4709. In some embodiments, light may exit the intermediate layer 4703 through the second edge 4711.

In some embodiments, the waveguide layer 4705 may comprise a first edge 4713 and a second edge 4715. In some embodiments, light may enter the waveguide layer 4705 through the first edge 4713. In some embodiments, light may exit the waveguide layer 4705 through the second edge 4715.

In some embodiments, the interface layer 4707 may comprise a first edge 4717 and a second edge 4719. In some embodiments, light may enter the interface layer 4707 through the first edge 4717. In some embodiments, light may exit the interface layer 4707 through the second edge 4719.

During the method for the sample testing device 4700, subsequent to attaching various layers, the first edge 4709 of the intermediate layer 4703, the first edge 4713 of the waveguide layer 4705, and the first edge 4717 of the interface layer 4707 may be etched together, such that the first edge 4709 of the intermediate layer 4703, the first edge 4713 of the waveguide layer 4705, and the first edge 4717 of the interface layer 4707 may be recessed from an edge of the substrate layer 4701. As shown in FIG. 35B, light may travel into the waveguide layer 4705 through an input opening 4721 of the waveguide layer 4705. As such, the etched first edge 4709 of the waveguide layer 4705 may become a recessed optical edge that may provide improve optical quality with less light loss.

Similarly, during the method for the sample testing device 4700, subsequent to attaching various layers, the second edge 4711 of the intermediate layer 4703, the second edge 4715 of the waveguide layer 4705, and the second edge 4719 of the interface layer 4707 may be etched together, such that the second edge 4711 of the intermediate layer 4703, the second edge 4715 of the waveguide layer 4705, and the second edge 4719 of the interface layer 4707 may be recessed from an edge of the substrate layer 4701. As shown in FIG. 35B, light may travel out of the waveguide layer 4705 through an output opening 4723 of the waveguide layer 4705. As such, the etched second edge 4715 of the waveguide layer 4705 may become a recessed optical edge that may provide improve optical quality with less light loss.

In some embodiments, subsequent to etching the first edge 4709 of the intermediate layer 4703, the first edge 4713 of the waveguide layer 4705, and the first edge 4717 of the interface layer 4707, the method may further comprise coupling a light source to the first edge 4713 of the waveguide layer 4705. In some embodiments, subsequent to etching the second edge 4711 of the intermediate layer 4703, the second edge 4715 of the waveguide layer 4705, and the second edge 4719 of the interface layer 4707, the method may further comprise coupling an imaging component to the second edge 4715 of the waveguide layer 4705.

The light source may be configured to produce, generate, emit, and/or trigger the production, generation, and/or emission of light (including but not limited to a laser light beam). For example, the light source may include, but not limited to, laser diodes (for example, violet laser diodes, visible laser diodes, edge-emitting laser diodes, surface-emitting laser diodes, and/or the like). As described above, light may be emitted from the light source and enter the sample testing device 4700 through the input opening 4721 on the first edge 4713 of the waveguide layer 4705. As the first edge 4713 has been etched during the method, the light may enter the waveguide layer 4705 with less loss. As described above, light may exit the sample testing device 4700 through the output opening 4723 on the second edge 4715 of the waveguide layer 4705. As the second edge 4715 has been etched during the method, the light may exit the waveguide layer 4705 with less loss.

As such, the sample testing device 4700 may be designed with recessed edges for optical input and output (for example, as a direct edge coupling waveguide chip). In some embodiments, safety margin may be implemented during the etching process to ensure the quality of the optical interface edge, without causing damage in the process and handling.

In some embodiments, one or more layer of the sample testing device 4700 (for example, the intermediate layer 4703, the waveguide layer 4705, and/or the interface layer 4707, together as a direct edge optical coupling assembly) may be registered to surface of the substrate layer 4701 for high precision alignment.

In some embodiments, index matching fluid may be applied to various edges to allow high numerical aperture optical application for high coupling efficiency. For example, fluid having a refractive index that matches the refractive index of the waveguide layer 4705 may be applied on the first edge 4713 and/or the second edge 4715. Additionally, or alternatively, fluid having a refractive index that matches the refractive index of the intermediate layer 4703 may be applied on the first edge 4709 and/or the second edge 4711. Additionally, or alternatively, fluid having a refractive index that matches the refractive index of the interface layer 4707 may be applied on the first edge 4717 and/or the second edge 4719.

In various embodiments of the present disclosure, an example sample testing device may be in the form of a lab-on-a-chip (LOC) device that comprises a micro sensor chip (for example, a waveguide layer) and on-chip micro fluidics (for example, a an on-chip fluidics layer). Technical difficulty exist in fabricating the add-on micro fluidics with miniaturization, and it can be technically challenging when packaging microchip with micro fluidics.

In some embodiments, an optical virus sensor with on-chip micro fluidics may be precisely formed with silicon wafer process by adding cover glass with build-in fluid input opening (or inlet) and an output opening (or outlet) in the chip scale sensor packaging process. The wafer-processed micro fluids may reduce the cost associated with adding precisely molded fluidics, and the chip scale package may eliminate the process of assembling the precisely molded fluidics.

As such, various embodiments of the present disclosure may provide wafer level packaging process with high precision and low cost, minimum sensor dimensions for miniaturized instrument integration, glass surface fluid interface with quick and easy connection and seal, and/or direct edge optical input and output to simplify optical assembly.

Figure 36:
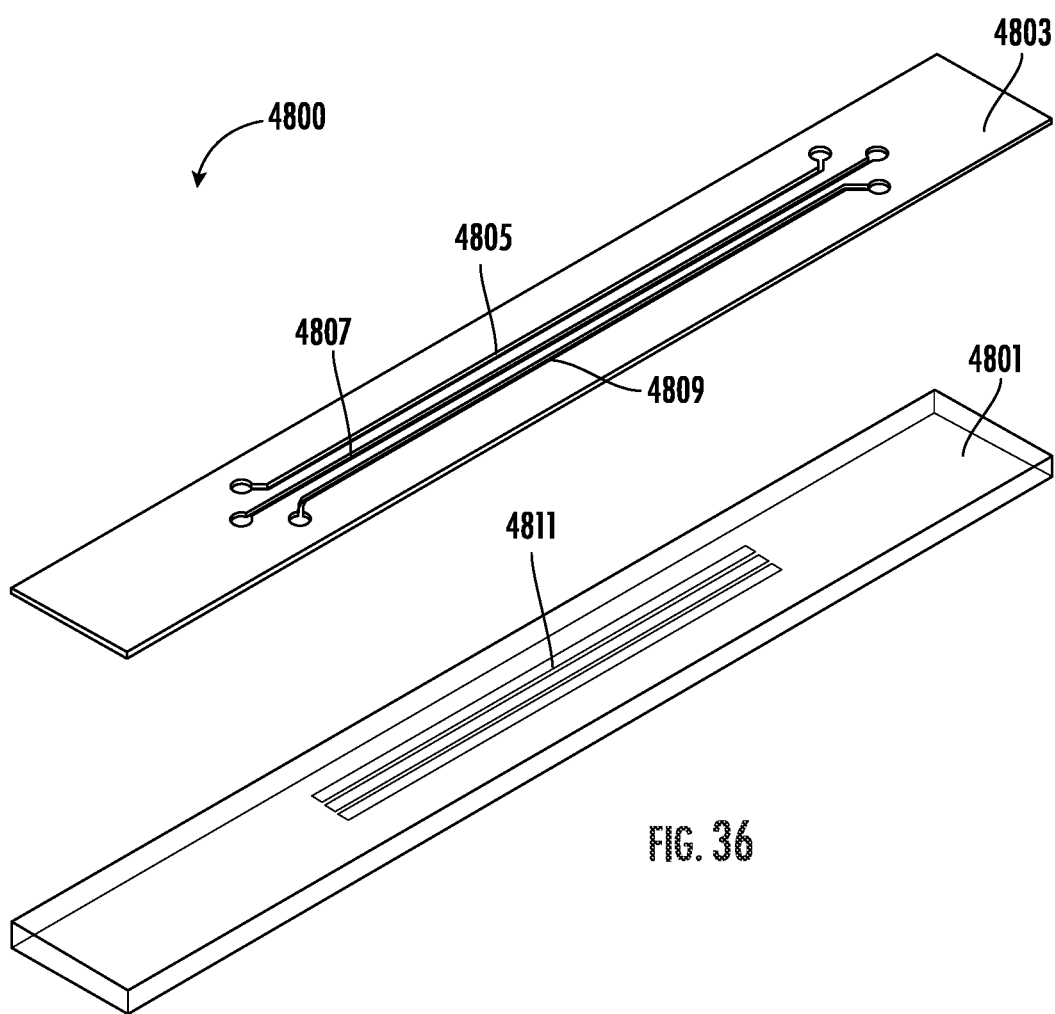
FIG. 36 illustrates an example sample testing device in accordance with various examples of the present disclosure.

Referring now to FIG. 36, an example apparatus 4800 is illustrated. In some embodiments, the example apparatus 4800 may be a waveguide with on-chip fluidics that may be manufactured in accordance with embodiments of the present disclosure.

In the example shown in FIG. 36, to manufacture the example apparatus 4800, an example method may include producing a waveguide layer 4801 and producing an on-chip fluidics layer 4803. As described herein, the on-chip fluidics layer (or the component for providing on-chip fluidics) may also be referred to as a "flow channel plate."

In various embodiments of the present disclosure, the waveguide layer 4801 may be manufactured or fabricated in accordance with various examples described herein. For example, the waveguide layer 4801 may provide one or more waveguides that comprise optical channel(s) (for example, the optical channel 4811) in accordance with embodiments of the present disclosure.

As shown in FIG. 36, the on-chip fluidics layer 4803 may comprise a plurality of flow channels that provide a flow path for sample medium. In the example shown in FIG. 36, the on-chip fluidics layer 4803 may comprise a flow channel 4805, a flow channel 4807, and a flow channel 4809. Each of the flow channel 4805, the flow channel 4807, and the flow channel 4809 may be in the form of an gap that connects an input aperture to an output aperture.

In some embodiments, the on-chip fluidics layer 4803 may comprise polymer SU-8 material. Additionally, or alternatively, the on-chip fluidics layer 4803 may comprise other material(s).

In some embodiments, the example method may include attaching the on-chip fluidics layer 4803 to a top surface of the waveguide layer 4801. In particular, the plurality of flow channels of the on-chip fluidics layer 4803 (for example, the flow channel 4805, the flow channel 4807, and the flow channel 4809) may be aligned on top of the optical channel(s) of the waveguide layer 4801 (for example, the flow channel 4807 may be aligned on top of the optical channel 4811).

Figure 37:
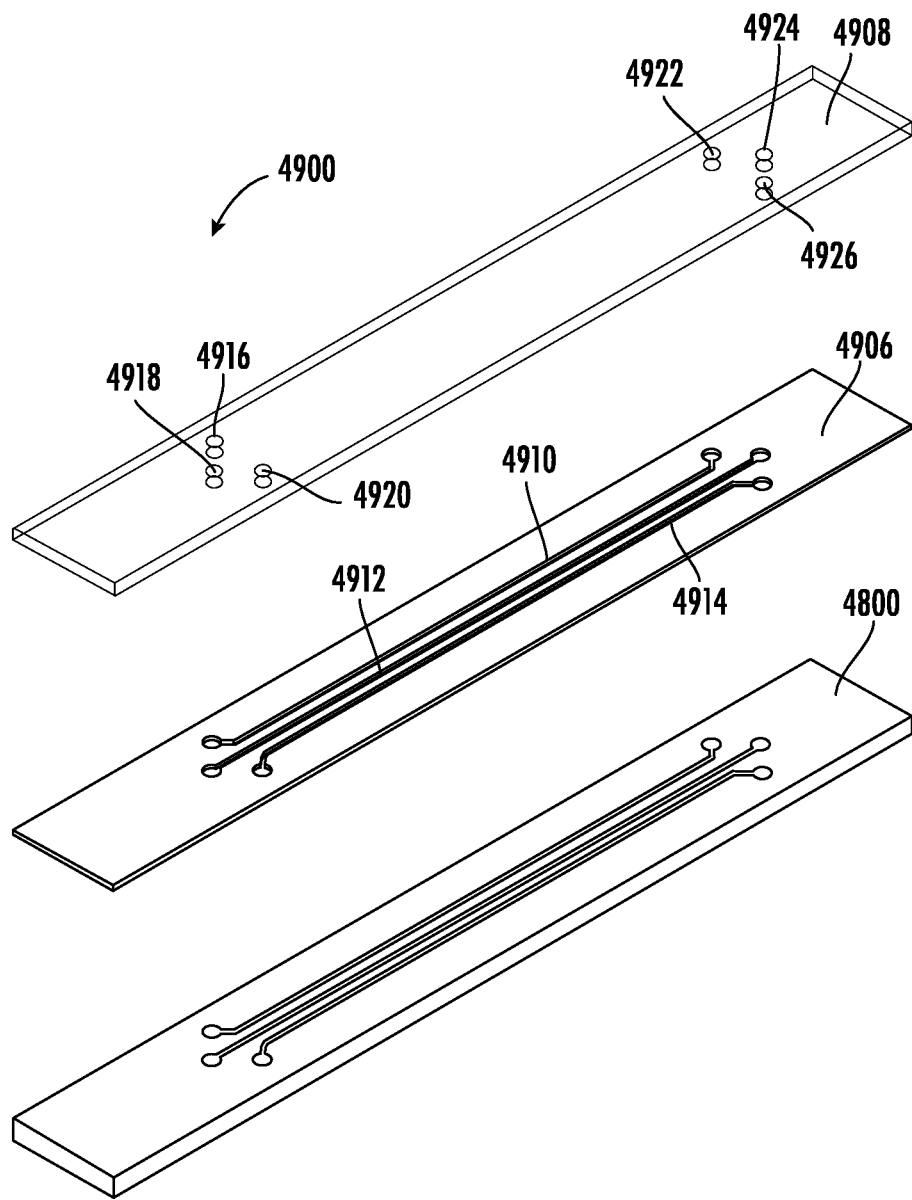
FIG. 37 illustrates an example sample testing device in accordance with various examples of the present disclosure.

Referring now to FIG. 37, an example apparatus 4900 is illustrated. In particularly, the example apparatus may be manufactured in accordance with embodiments of the present disclosure.

In the example shown in FIG. 37, to manufacture the example apparatus 4900, an example method may include producing an adhesive layer 4906, attaching the adhesive layer 4906 on a top surface of the apparatus 4800, and attaching a cover glass layer 4908 on a top surface of the adhesive layer 4906. In some embodiments, the apparatus 4800 may be a waveguide with on-chip fluidics layer that is fabricated in accordance with various examples described herein.

The adhesive layer 4906 may comprise suitable material such as, but not limited to, silicon. In some embodiments, adhesive material may be disposed on a top surface of the adhesive layer 4906 and/or a bottom surface of the adhesive layer 4906, such as, but not limited to, chemical glue.

As shown in FIG. 37, the adhesive layer 4906 may comprise a plurality of flow channels that provide a flow path for sample medium. In the example shown in FIG. 37, the adhesive layer 4906 may comprise a flow channel 4910, a flow channel 4912, and a flow channel 4914. Each of the flow channel 4910, the flow channel 4912, and the flow channel 4914 may be in the form of an gap that connects an input aperture to an output aperture.

In some embodiments, the plurality of flow channels of the adhesive layer 4906 may be aligned with and/or overlap with the plurality of flow channels of the on-chip fluidics layer of the apparatus 4800 as described above. As described above, the apparatus 4800 may comprise an on-chip fluidics layer on the top surface. After attaching the adhesive layer 4906 on a top surface of the apparatus 4800, each of the flow channels of the adhesive layer 4906 may be aligned with and/or overlap with one of the flow channels of the on-chip fluidics layer of the apparatus 4800.

Referring back to FIG. 37, the cover glass layer 4908 may comprise material such as glass material.

The cover glass layer 4908 may comprise one or more input openings and one or more output openings. For example, the cover glass layer 4908 may comprise an input opening 4916, an input opening 4918, and an input opening 4920. Sample medium may enter through the input opening 4916, the input opening 4918, and the input opening 4920. The cover glass layer 4908 may comprise an output opening 4922, an output opening 4924, and an output opening 4926. Sample medium may exit through the output opening 4922, the output opening 4924, and the output opening 4926.

In some embodiments, the input openings and the output openings of the cover glass layer 4908 may be aligned with and/or overlap with the input apertures and the output apertures of the flow channels in the adhesive layer 4906. As described above, each of the flow channels in the adhesive layer 4906 may connect an input aperture with an output aperture. After attaching the cover glass layer 4908 on a top surface of the adhesive layer 4906, each of the input openings of the cover glass layer 4908 may be aligned with and/or overlap with one of the input apertures of the adhesive layer 4906, and each of the output openings of the cover glass layer 4908 may be aligned with and/or overlap with one of the output apertures of the adhesive layer 4906.

Figure 38:
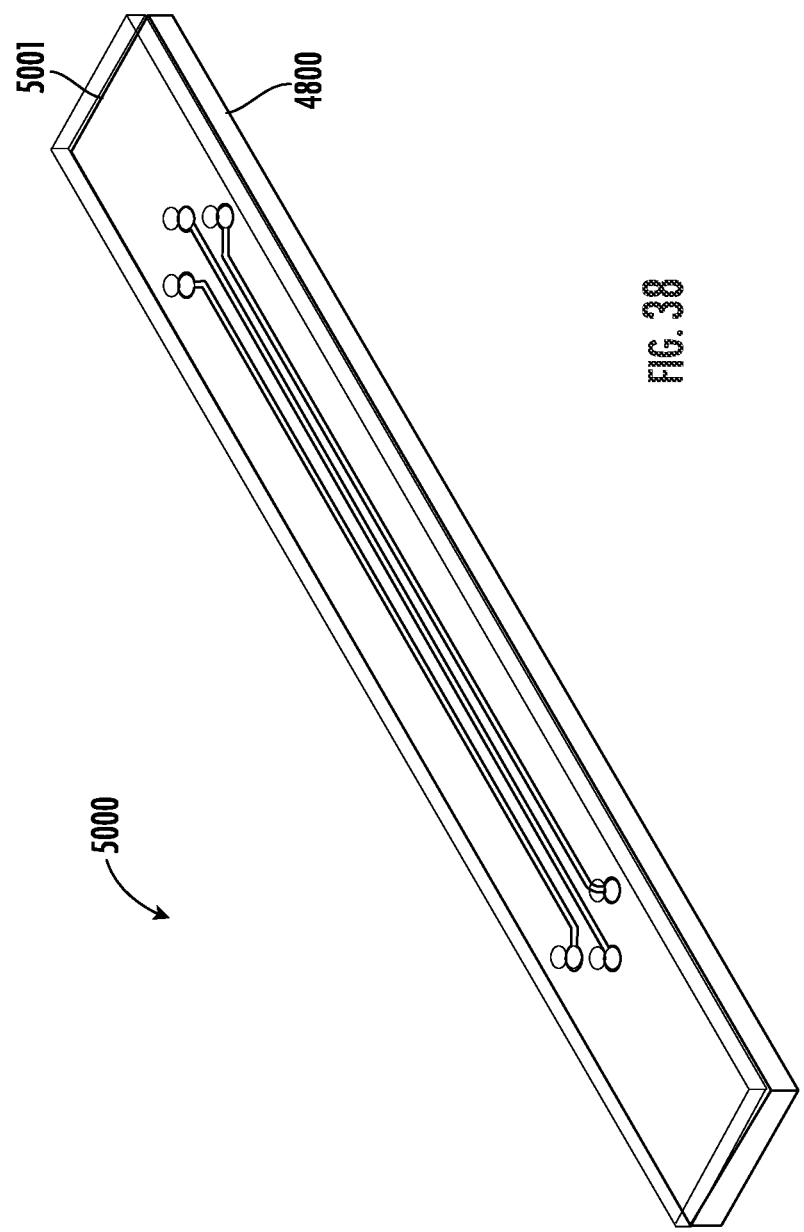
FIG. 38 illustrates an example sample testing device in accordance with various examples of the present disclosure.

Referring now to FIG. 38, an example apparatus 5000 is illustrated. In particularly, the example apparatus 5000 may be manufactured in accordance with embodiments of the present disclosure.

In the example shown in FIG. 38, to manufacture the example apparatus 5000, an example method may include producing an apparatus 4800, and attaching a cover glass component 5001 to the apparatus 4800. In some examples, the apparatus 4800 may be a waveguide with on-chip fluidics that is fabricated in accordance with various examples described herein. In some examples, the cover glass component 5001 may comprise a cover glass layer and an adhesive layer that are fabricated in accordance with various examples described herein.

In some embodiments, the example apparatus 5000 may be diced into individual sensors with protective films attached.

In various examples of the present disclosure, photonic integrated circuit may require precision alignment between optical input and output, which may limit its application in the mass production and mass deployment. For example, lab-on-a-chip photonic integrated circuit devices may need field serviceable solution and require precise alignment, which may limit its applications.

As described above, various examples of the present disclosure may provide a sample testing device that comprises a waveguide (for example, a waveguide interferometer sensor). In many applications, the waveguide may only tolerate <+/−5 micron, <+/−2 micron, <+/−10 micron alignment error in the X direction (which is along waveguide surface), in the Y direction (which is perpendicular to waveguide surface) and in the Z direction (which is a distance from light source to waveguide input end). However, many sensor packaging process can only achieve +/−25 micron die placement accuracy. As such, the best effort active alignment placement process may not meet this requirement with limited mass production capacity, and there is a need for an effective solution for the field serviceable application in alignment.

In accordance with various examples of the present disclosure, deep silicon edge etching techniques may be used, as described above. The etched edges may also provide alignment surface features to directly align the waveguide device to micron and submicron level. In some embodiments, the direct alignment device may be used in mass production with no alignment adjustment needed and may achieve high production efficiency. Further, direct drop-in assembly process may also be used when replace the waveguide without the need for a special tool.

In various examples of the present disclose, deep etching techniques may be implemented on the substrate edges of the silicon waveguide to provide alignment features in X and Z directions with relative alignment accuracy up to the level of silicon wafer process feature size, which may be less than 1 tenth of micron. In some embodiments, the alignment feature(s) in the Z direction may use silicon top surface as reference with relative accuracy to the level of silicon wafer film layer thickness, which may be less than 1 hundredths of micron.

In some embodiments, the fitting mechanism for aligning the waveguide in an alignment arrangement may include pushing the waveguide be elastically positioned against the alignment features with direct contact. In some embodiments, the final integration alignment error is the combination of the alignment feature error and contact gaps between the waveguide and the alignment features, which may achieve the submicron level with clean contact surfaces.

In some embodiments, chip scale package may be used with recessed cover glass to expose the alignment features. For example, a spring loaded seating interface may be designed to secure the waveguide relative to the alignment feature surfaces. In some embodiments, a fluid gasket component (for example, silicone fluid gasket) and a thermal pad may provide compression force for contact alignment without additional mechanism.

Figure 39A:
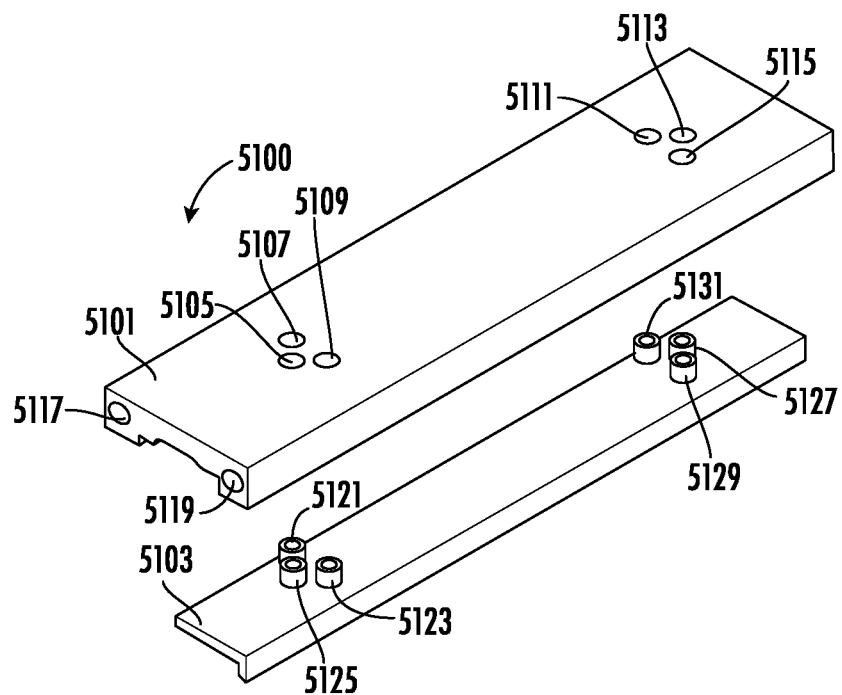
FIG. 39A illustrates an example waveguide holder component in accordance with various examples of the present disclosure.
Figure 39B:
FIG. 39B illustrates an example waveguide holder component in accordance with various examples of the present disclosure.
Figure 39C:
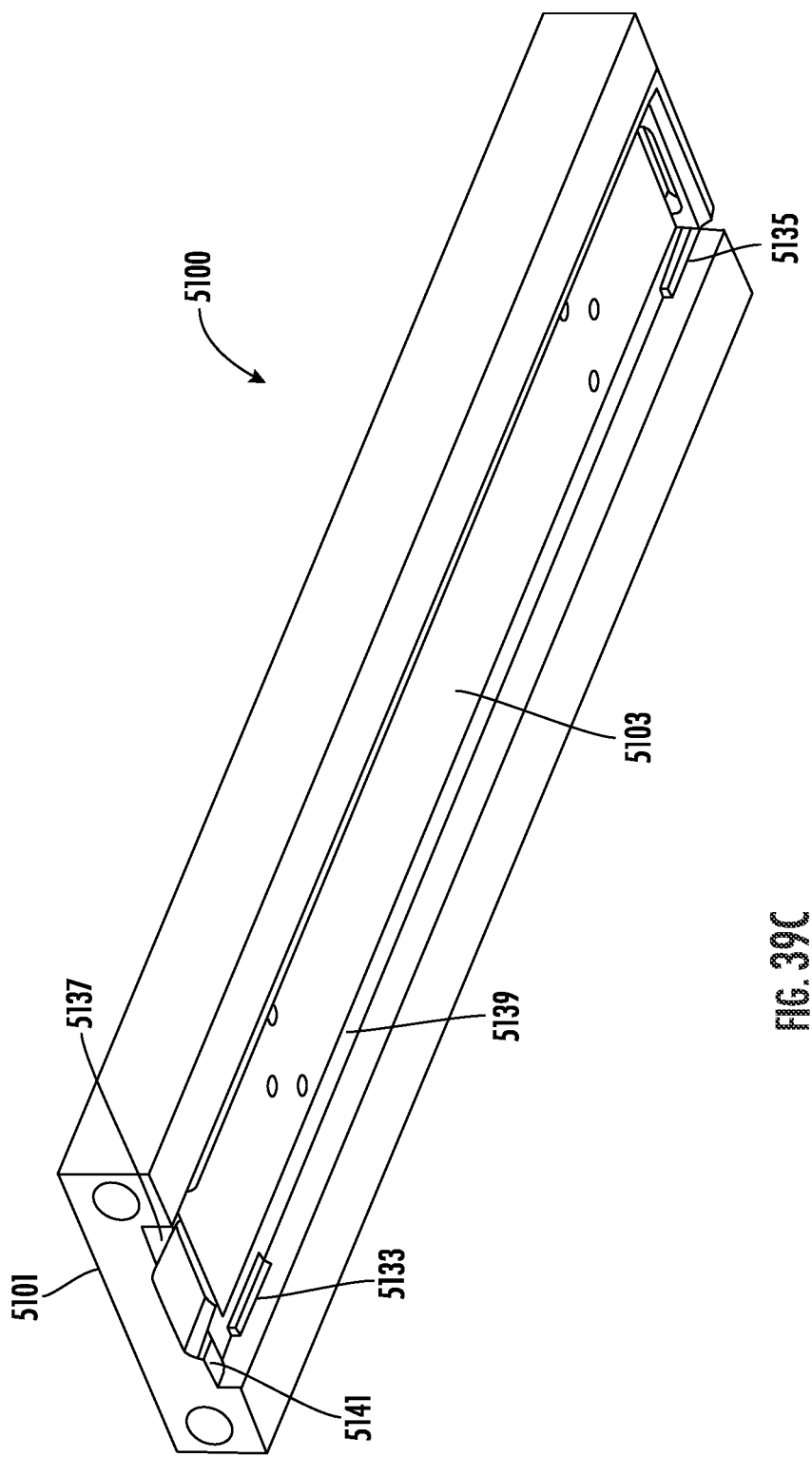
FIG. 39C illustrates an example waveguide holder component in accordance with various examples of the present disclosure.

Referring now to FIG. 39A, FIG. 39B, and FIG. 39C, example views of an example waveguide holder component are illustrated. In particular, FIG. 39A illustrates an example exploded view of an example waveguide holder component 5100, FIG. 39B illustrates an example top view of the example waveguide holder component 5100, and FIG. 39C illustrates an example angled view of the example waveguide holder component 5100.

Referring back to FIG. 39A, the example waveguide holder component 5100 may comprise a holder cover element 5101 and a fluid gasket element 5103.

In some embodiments, the holder cover element 5101 may comprise one or more openings on a top surface of the holder cover element 5101. For example, the holder cover element 5101 may comprise an input opening 5105, an input opening 5107, and an input opening 5109. When the example waveguide holder component 5100 is in use, sample or reference media may travel through the input opening 5105, the input opening 5107, and/or the input opening 5109 and may enter into a waveguide. The holder cover element 5101 may comprise an output opening 5111, an output opening 5113, and an output opening 5115. When the example waveguide holder component 5100 is in use, sample may travel through the output opening 5111, the output opening 5113, and/or the output opening 5115, and may exit from the waveguide.

In some embodiments, the holder cover element 5101 may comprise one or more alignment features on a side surface for aligning a light source. For example, the one or more alignment features may be in the form of surface depressions (for example, the surface depression 5117 and the surface depression 5119 shown in FIG. 39A). When the light source is coupled to the waveguide to provide input light, the light source may comprise protrusions on its side surface that may correspond to the surface depression 5117 and the surface depression 5119, therefore enabling the light source to be correctly aligned with the waveguide.

Referring back to FIG. 39A, the fluid gasket element 5103 may comprise one or more channels or inlets/outlets protruding from the top surface of the fluid gasket element 5103. For example, the fluid gasket element 5103 may comprise an inlet 5121, an inlet 5123, and an inlet 5125. The inlet 5121 may be coupled to the input opening 5107 of the holder cover element 5101. The inlet 5123 may be coupled to the input opening 5109 of the holder cover element 5101. The inlet 5125 may be coupled to the input opening 5105 of the holder cover element 5101. When the example waveguide holder component 5100 is in use, sample or reference media may travel through input opening 5107 to the inlet 5121, through the input opening 5109 to the inlet 5123, and/or through the input opening 5105 to the inlet 5125, and may enter into a waveguide. In the example shown in FIG. 39A, the fluid gasket element 5103 may comprise an outlet 5131, an outlet 5127, and an outlet 5129. The outlet 5131 may be coupled to the output opening 5111 of the holder cover element 5101. The outlet 5127 may be coupled to the output opening 5113 of the holder cover element 5101. The outlet 5129 may be coupled to the output opening 5115 of the holder cover element 5101. When the example waveguide holder component 5100 is in use, sample or reference media may travel through the outlet 5131 to the output opening 5111, through the outlet 5127 to the output opening 5113, and/or through the outlet 5127 to the output opening 5115, and may exit from a waveguide.

As such, the inlet 5121, the inlet 5123, the inlet 5125, the outlet 5131, the outlet 5127, and/or the outlet 5129 may enable the fluid gasket element 5103 to be secured to the holder cover element 5101 while allowing sample or reference media to travel through. When in use, the fluid gasket element 5103 may be positioned between the holder cover element 5101 and a waveguide.

In some embodiments, the fluid gasket element 5103 may provide compression force on the waveguide to contact the alignment features of the waveguide holder component 5100 (for example, causing the etched edges of the waveguide to be against the alignment features, details of which are described herein).

Referring now to FIG. 39B and FIG. 39C, various example alignment features associated with the waveguide holder component 5100 are shown.

For example, the waveguide holder component 5100 may comprise at least an alignment feature 5133 and an alignment feature 5135. In particular, the alignment feature 5133 and the alignment feature 5135 may be in the form of protrusions from an inner side surface of the waveguide holder component 5100. In some embodiments, the alignment feature 5133 and the alignment feature 5135 may be referred to as X-direction alignment features as they are configured to align a waveguide in a X direction (e.g. a direction that is in parallel with the direction of optical channels in the waveguide). For example, the waveguide may comprise one or more etched and/or recessed edges (details of which are described herein), and the etched and/or recessed edges may be pushed against the alignment feature 5133 and/or the alignment feature 5135 (which may elastically contract) of the waveguide holder component 5100 in an alignment arrangement, so as to securely and correctly align the waveguide in the X direction.

Additionally, or alternatively, the waveguide holder component 5100 may comprise at least an alignment feature 5137 and an alignment feature 5139. In particular, the alignment feature 5137 and the alignment feature 5139 may be in the form of grooves on an inner surface of the waveguide holder component 5100. In some embodiments, the alignment feature 5133 and the alignment feature 5135 may be referred to as Y-direction alignment features as they are configured to align a waveguide in a Y direction (e.g. a direction that is perpendicular to the direction of optical channels in the waveguide), details of which are described herein. For example, the waveguide may comprise one or more etched and/or recessed edges (details of which are described herein), and the etched and/or recessed edges may be pushed against the alignment feature 5133 and/or the alignment feature 5135 (which may elastically contract) of the waveguide holder component 5100 in an alignment arrangement, so as to securely and correctly align the waveguide in the Y direction.

Additionally, or alternatively, the waveguide holder component 5100 may comprise at least an alignment feature 5141. In particular, the alignment feature 5141 may be in the form of a protrusion on an inner side surface of the waveguide holder component 5100. In some embodiments, the alignment feature 5141 may be referred to as Z-direction alignment features as it is configured to align a waveguide in a Z direction (e.g. a direction that is from the light source to the input end of the waveguide). For example, the waveguide may comprise one or more etched and/or recessed edges (details of which are described herein), and the etched and/or recessed edges may be pushed against the alignment feature 5141 of the waveguide holder component 5100 in an alignment arrangement, so as to securely and correctly align the waveguide in the Z direction.

Figure 40A:
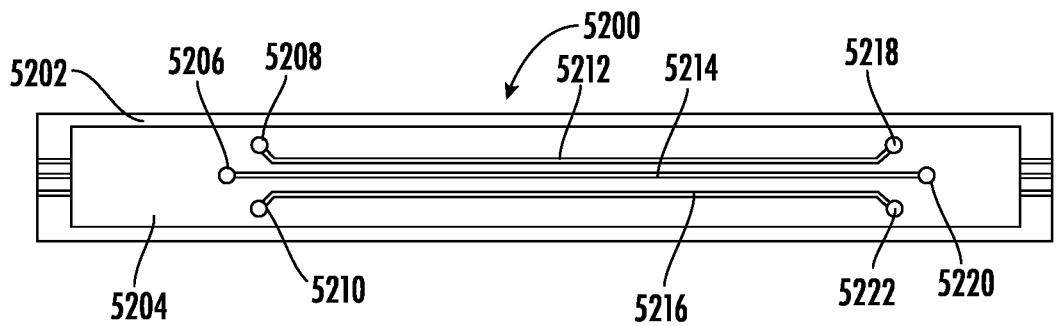
FIG. 40A illustrates an example waveguide in accordance with various examples of the present disclosure.
Figure 40B:
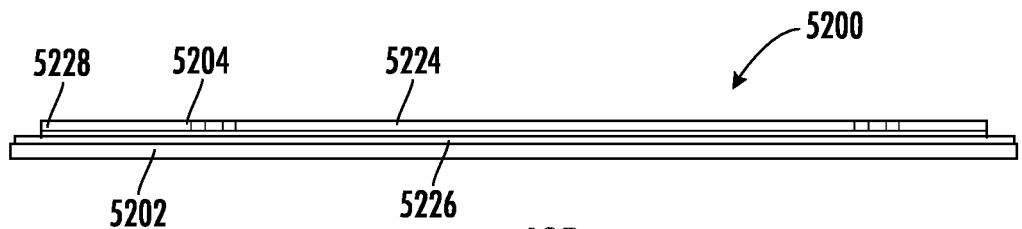
FIG. 40B illustrates an example waveguide in accordance with various examples of the present disclosure.
Figure 40C:
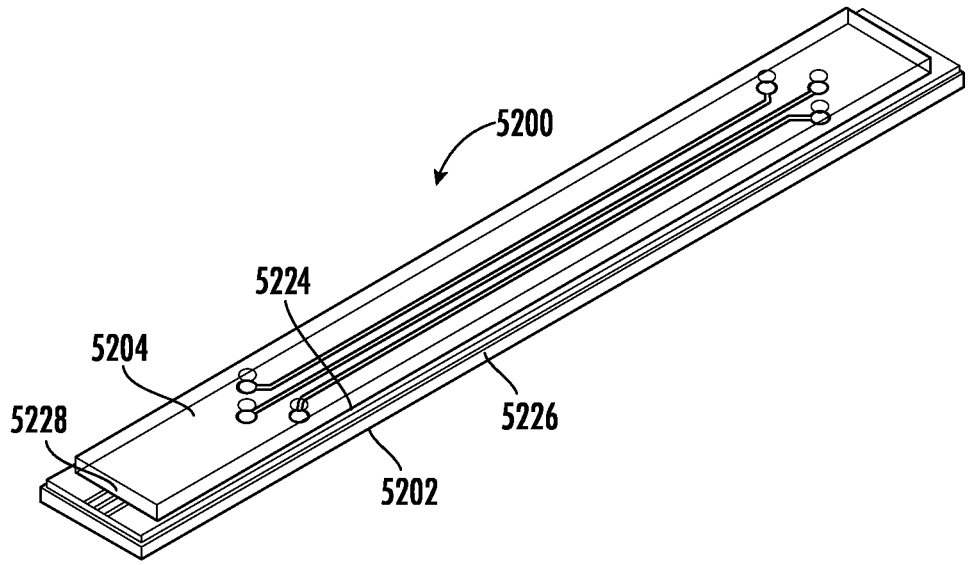
FIG. 40C illustrates an example waveguide in accordance with various examples of the present disclosure.

Referring now to FIG. 40A, FIG. 40B, and FIG. 40C, an example waveguide 5200 is shown. In various embodiments, the example waveguide 5200 may comprise a waveguide layer element 5202 and a cover glass layer 5204 disposed on a top surface of the waveguide layer element 5202.

In some embodiments, the cover glass layer 5204 may comprise transparent material such as, but not limited to, glass. In some embodiments, the cover glass layer 5204 may comprise one or more openings. For example, the cover glass layer 5204 may comprise an input opening 5208, an input opening 5206, and/or an input opening 5210, and sample may enter the waveguide 5200 through the input opening 5208, the input opening 5206, and/or the input opening 5210. The cover glass layer 5204 may comprise an output opening 5218, an output opening 5220, and/or an output opening 5222, and sample may exit the waveguide 5200 through the output opening 5218, the output opening 5220, and/or the output opening 5222.

In some embodiments, a channel may connect an input opening with an output opening. For example, sample or reference media may enter through the input opening 5208, travel through the channel 5212, and exit from the output opening 5218. Additionally, or alternatively, sample or reference media may enter through the input opening 5206, travel through the channel 5214, and exit from the output opening 5220. Additionally, or alternatively, sample or reference media may enter through the input opening 5210, travel through the channel 5216, and exit from the output opening 5222.

In some embodiments, the cover glass layer 5204 may comprise at least one recessed edge. Referring now to FIG. 40B and FIG. 40C, the edge 5224 of cover glass layer 5204 may be recessed from the edge of the waveguide layer element 5202. The recessed edge 5224 may be fabricated through, for example but not limited to, an example etching process described above. In some embodiments, the recessed edge 5224 of the cover glass layer 5204 may support and guide the correct alignment of the waveguide 5200.

For example, the recessed edge 5224 may be pushed against the alignment feature 5133 and the alignment feature 5135 of the waveguide holder component 5100 shown in FIG. 39B and FIG. 39C when the waveguide 5200 is correctly aligned with the waveguide holder component 5100 in the X direction.

In some embodiments, the waveguide layer element 5202 may comprise one or more waveguide layer and a substrate layer. As discussed above, the edges of the waveguide layer of the waveguide layer element 5202 may be etched.

For example, in the example shown in FIG. 40B, the edge 5226 of the waveguide layer may be etched and become a recessed edge. In some embodiments, the resultant recessed edge of the waveguide layer of the waveguide layer element 5202 may support and guide the correct alignment of the waveguide 5200. For example, the etched edge 5226 may be pushed against the alignment feature 5133 and the alignment feature 5135 of the waveguide holder component 5100 shown in FIG. 39B and FIG. 39C when the waveguide 5200 is correctly aligned with the waveguide holder component 5100 in the Y direction.

Additionally, or alternatively, as described above, the input edge 5228 of the waveguide layer may be etched and become a recessed edge. In some embodiments, the resultant recessed edge of the waveguide layer of the waveguide layer element 5202 may support and guide the correct alignment of the waveguide 5200. For example, the etched edge 5228 may be pushed against the alignment feature 5141 of the waveguide holder component 5100 shown in FIG. 39B and FIG. 39C when the waveguide 5200 is correctly aligned with the waveguide holder component 5100 in the Z direction.

Figure 41B:
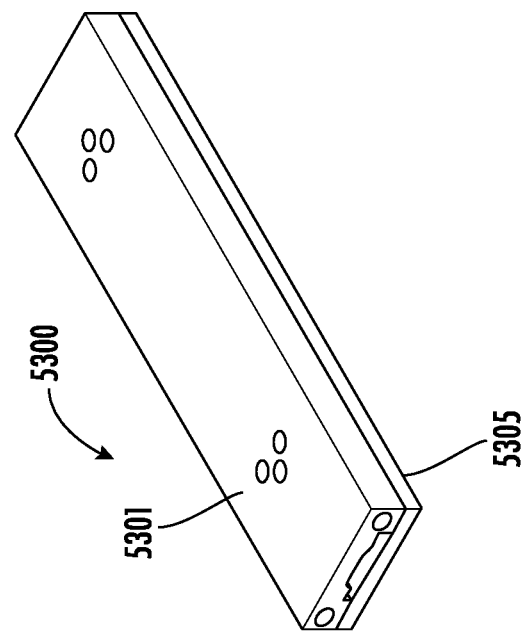
FIG. 41B illustrates an example sample testing device in accordance with various examples of the present disclosure.
Figure 41A:
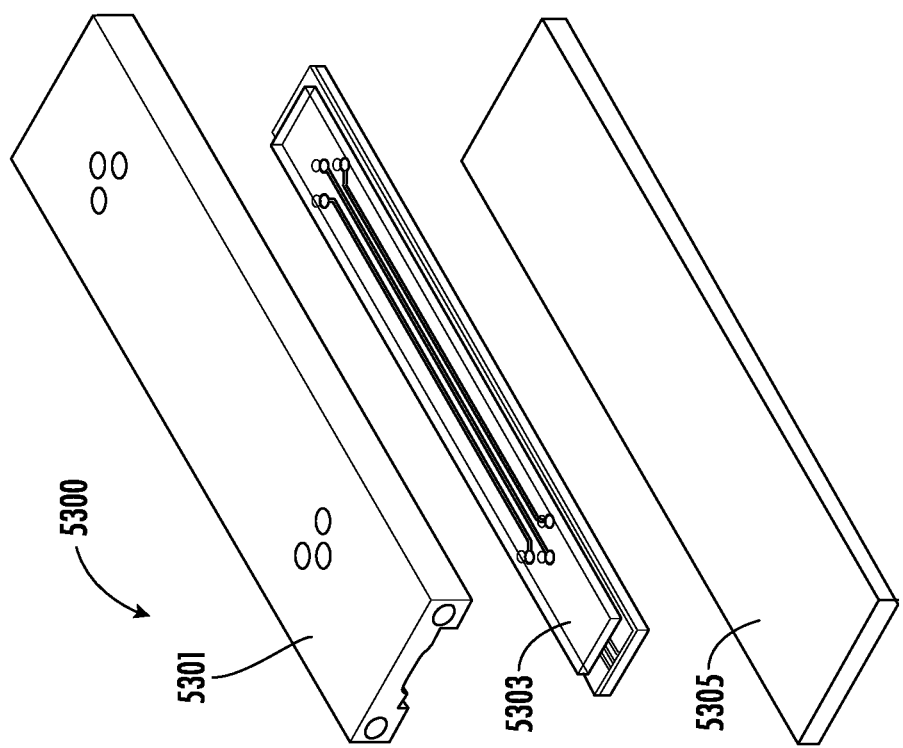
FIG. 41A illustrates an example sample testing device in accordance with various examples of the present disclosure.

Referring now to FIG. 41A and FIG. 41B, example views of an example sample testing device 5300 are illustrated. In particular, the example sample testing device 5300 may comprise a waveguide holder component 5301, a waveguide 5303, and a thermal pad 5305.

In some embodiments, the waveguide holder component 5301 may be similar to the waveguide holder component 5100 described above in connection with FIG. 39A, FIG. 39B, and FIG. 39C. For example, the waveguide holder component 5301 may comprise at least one alignment feature. In some embodiments, the at least one alignment feature may support and guide the alignment of the waveguide 5303. In some embodiments, the at least one etched edge of the waveguide 5303 may be pushed against the at least one alignment feature of the waveguide holder component in an alignment arrangement.

In some embodiments, the thermal pad 5305 may be configured to provide thermal control of the waveguide 5303. In some embodiments, the thermal pad 5305 may provide compression force to the top surface of the waveguide 5303 for precision alignment.

Immunoassay based sensors may only be suitable for one time use. As an example, pregnancy test is a disposable lateral immunoassay device, and the low cost associated with producing the pregnancy test may justify the disposable nature of such test. However, in many applications, disposable sensors may cause material waste and challenges in disposing possible bio-hazards. There is a need for a reusable sensor that can be refreshed on-site.

In accordance with various embodiments of the present disclosure, an optical immunoassay sensor (such as various sample testing devices described herein) may provide real-time continuous detecting and monitoring of virus in airborne aerosol or breathe exhale and nasal swab or saliva.

In some embodiments, a refreshable optical immunoassay sensor may comprise a waveguide (for example, a waveguide evanescent sensor) with silicon nitride waveguide on the silicon oxide buffered silicon substrate. A layer of silane may be added on a silicon oxide coated silicon nitride top in the waveguide for antibody to attach. The waveguide with optimum distance from the top of the antibody to the top of the silicon nitride enables the best detection sensitivity for the virus bonding activities induced by the antibody.

In some embodiments, the waveguide may be illuminated with laser light from light input end. The refractive index change in the evanescent field may introduce interference pattern change in the output field, which may be captured by an imaging component. Data from the imaging component is then processed and reported with the virus detection results.

In some embodiments, an antibody solution may be applied through the sample channel of an example sample testing device described herein. After an incubation time, distilled water or buffer solution is delivered through the sample channel to wash away unattached antibody, leaving a uniform antibody layer on the sensing surface. For example, the buffer solution may be in the form of an aqueous solution that can resist pH change when an acidic or a base (for example, from a sample) is added to the buffer solution. For example, a buffer solution may comprise a mixture of weak acid and its conjugate base, or vice versa. During the test, the sample medium is fed through the sample channel. Specifically targeted virus may be captured and form a layer of bonded and immobilized virus on the sensing surface. The sample testing device may then detect the existence of the virus and its concentration level.

In some embodiments, after positive detection of a specific virus, cleaning fluid may be flushed through the sample channel to clean the sensing surface. After cleaning, the antibody solution is reapplied through the sample channel and the waveguide is ready for another test.

As described above, micro fluidics (for example, an on-chip fluidics layer) may be disposed on the top surface of the waveguide, which may allow fluids (such as sample medium and reference mediums) to flow on top of and apply to the sensing area with optimum flow rate and concentration for virus detection, as well as providing optimized cleaning and refreshing.

Referring now to FIG. 42A, FIG. 42B, FIG. 42C, and FIG. 42D, an example waveguide 5400 and associated methods are illustrated.

Figure 42A:
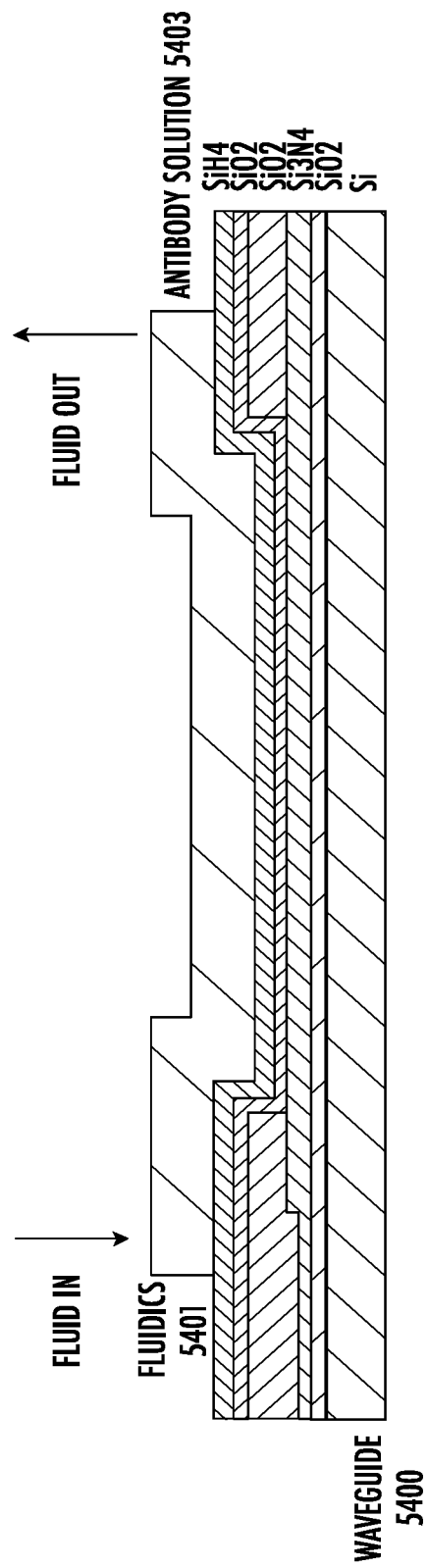
FIG. 42A illustrates an example waveguide in accordance with various examples of the present disclosure.

In the example shown in FIG. 42A, FIG. 42B, FIG. 42C, and FIG. 42D, the example waveguide 5400 may be an example sample testing device in accordance with various examples of the present disclosure. For example, the waveguide 5400 may comprise a substrate layer comprising Si. The waveguide 5400 may comprise a waveguide layer disposed on top of the substrate layer, and may comprise a layer of SiO2, a layer of Si3N4 disposed on top of the layer of SiO2, and one or more layers of SiO2 disposed on top of the layer of SiO2. The waveguide 5400 may further comprise a layer of SiH4, as shown in FIG. 42A.

In some embodiments, the waveguide 5400 may comprise a fluidics component 5401 disposed on the top surface of the waveguide 5400. For example, the fluidics component 5401 may be an on-chip fluidics layer described herein.

Referring now to FIG. 42A, an antibody solution 5403 may be applied through the sample channel of the fluidics component 5401 and/or the waveguide 5400. For example, the antibody solution 5403 may be injected through an input opening of the sample channel and exit from an output opening of the sample channel. In some embodiments, the antibody solution 5403 may comprise suitable antibodies based on the virus to be detected. In some embodiments, the waveguide 5400 may comprise a layer of silane added on a silicon oxide coated silicon nitride top for antibody to attach.

Subsequent to applying the antibody solution, there is an incubation time period for the antibody to attach. After the incubation time period has passed, a buffer solution (such as distilled water) may be delivered through the sample channel to wash away unattached antibody.

Figure 42B:
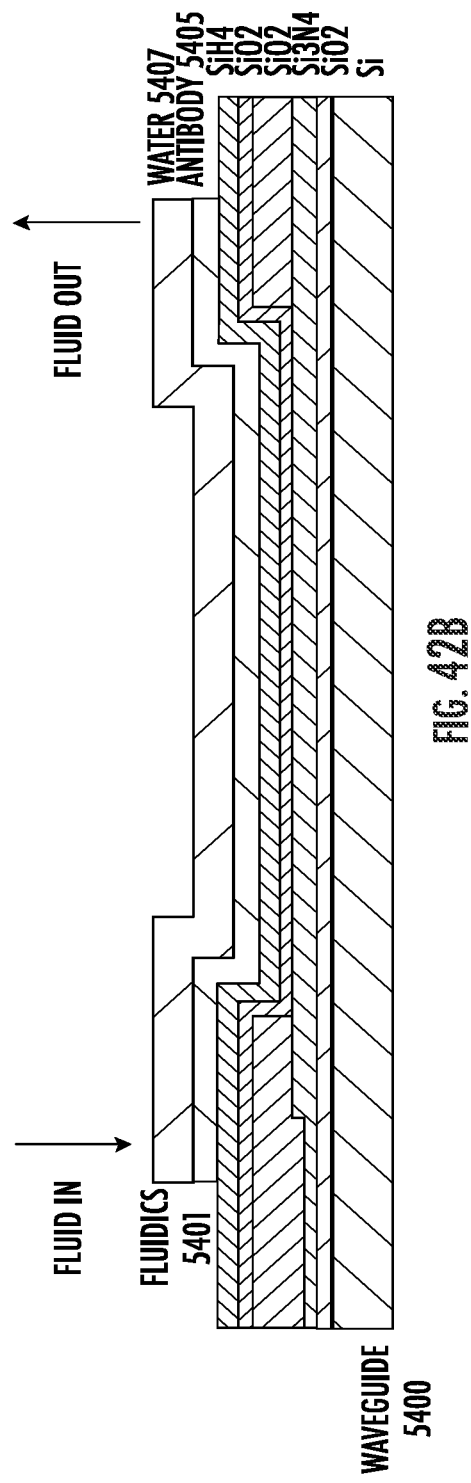
FIG. 42B illustrates an example waveguide in accordance with various examples of the present disclosure.
Figure 47C:
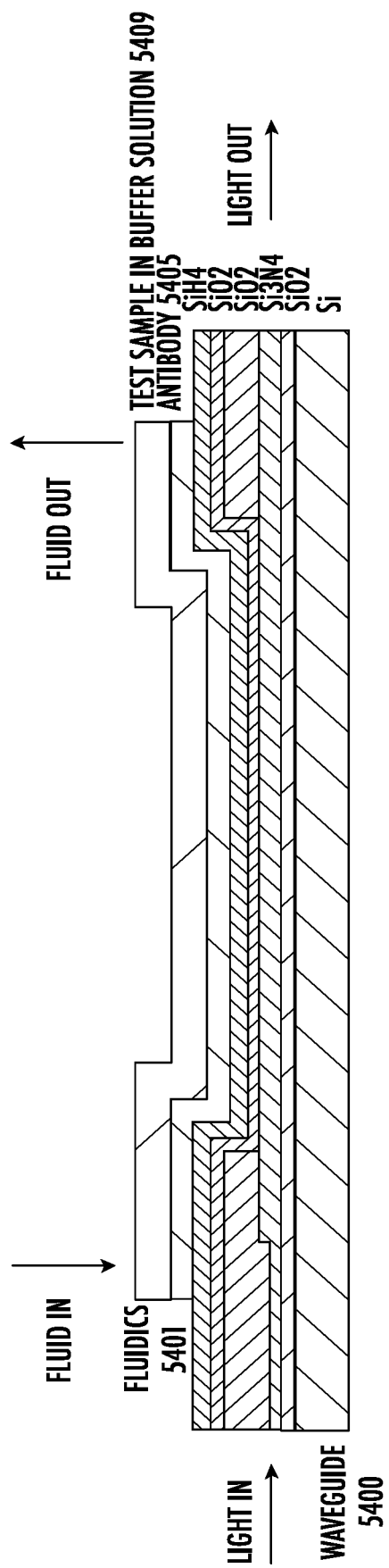
FIG. 47 illustrates an example flowchart illustrating example operations in accordance with various examples of the present disclosure.

Referring now to FIG. 42B, the buffer solution in the form of the water 5407 may be applied through the sample channel of the fluidics component 5401 and/or the waveguide 5400. For example, the water 5407 may be injected through an input opening of the sample channel and exit from an output opening of the sample channel. The water 5407 may wash away unattached antibody from the sample channel, leaving a uniform layer of antibody 5405 on the sensing surface.

While the description above provides an example of water as a buffer solution, it is noted that the scope of the present disclosure is not limited to the description above. In some examples, an example buffer solution may comprise one or more additional and/or alternative chemicals and/or compounds.

Referring now to FIG. 42C, during the test, the sample medium may be applied through the sample channel of the fluidics component 5401 and/or the waveguide 5400. For example, the sample medium may be injected through an input opening of the sample channel and exit from an output opening of the sample channel. In some embodiments, the sample may be fed into the buffer solution 5409. Specific targeted virus may be captured by the antibody 5405, which may form a layer of bonded and immobilized virus on the sensing surface. The sample testing device may then detect the existence of the virus and its concentration level.

Figure 42D:
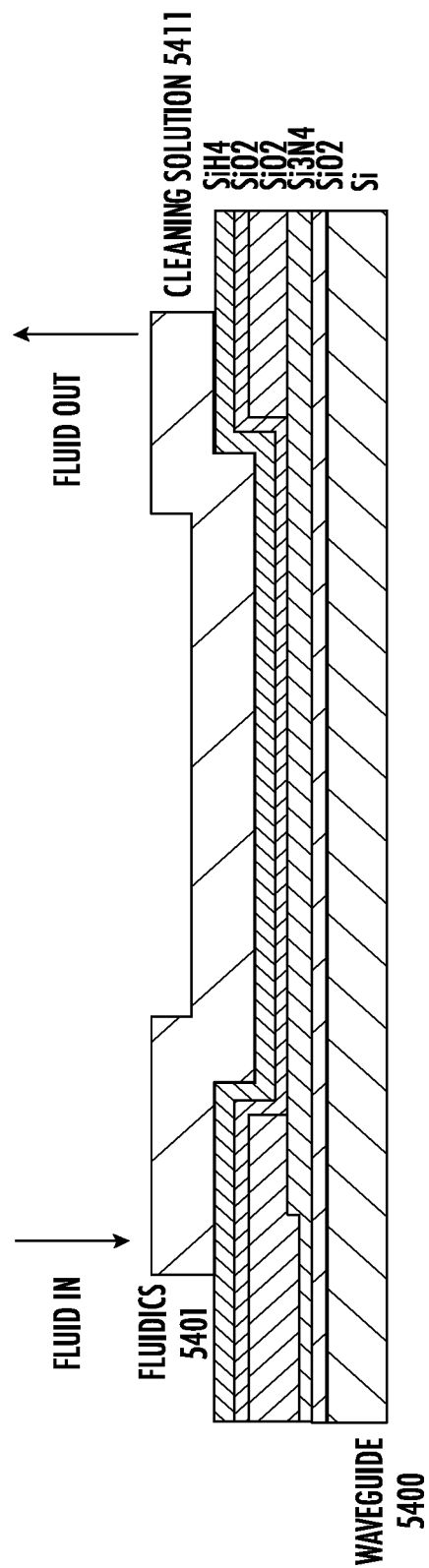
FIG. 42D illustrates an example waveguide in accordance with various examples of the present disclosure.

Referring now to FIG. 42D, a cleaning solution 5411 may be flushed through the sample channel to clean sensing surface (for example, after the positive detection of the virus). In some embodiments, the cleaning solution 5411 may remove the virus and/or the antibody from the sensing surface. In some embodiments, the cleaning solution 5411 may comprise suitable chemicals and/or compound, include, but not limited to, ethanol. After cleaning, the antibody solution 5403 is reapplied through the sample channel as shown in FIG. 42A, and the waveguide is ready for another test.

Embodiment apparatuses may perform any of the various processes, methodologies, and/or computer-implemented methods for advanced sensing and processing described herein, for example as described herein with respect to various figures herein. In some contexts, one or more embodiments may be configured with additional and/or alternative modules embodied in hardware, software, firmware, or a combination thereof, for performing all or some of such methodologies. For example, one or more embodiments includes additional and/or alternative hardware, software, and/or firmware configured for performing one or more processes for processing interference fringe data embodying interference fringe pattern(s) for purposes of identifying and/or classifying an unidentified sample medium. In this regard, a sample testing device, such as those discussed herein and including, without limitation, an interferometer, may include or otherwise be communicatively linked with additional modules embodied in hardware, software, firmware, and/or a combination thereof, for performing such additional or alternative processing operations. It should be appreciated that, in some embodiments, such additional modules embodied in hardware, software, firmware, and/or a combination thereof, may additionally or alternatively perform one or more core operations with respect to the functioning of the sample testing device, for example activating and/or adjusting one or more light sources, activating and/or adjusting one or more imaging component(s). In at least one example context, such additional and/or alternative modules embodied in hardware, software, firmware, and/or any combination thereof may be configured to perform the operations of the processes described below with respect to various figures herein, which may be performed alone or in conjunction hardware, software, and/or firmware of a sample testing device, or in conjunction with one or more hardware, software, and/or firmware modules of the sensing apparatus.

Although one or more components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the terms "module," and/or "circuitry" as used herein with respect to components of any of the example apparatuses should therefore be understood to include particular hardware configured to perform the functions associated with the particular module as described herein.

Additionally or alternatively, the terms "module" and/or "circuitry" should be understood broadly to include hardware and, in some embodiments, software and/or firmware for configuring the hardware. For example, in some embodiments, "module" and "circuitry" may include processing circuitry, storage media, network interfaces, input/output devices, supporting modules for interfacing with one or more other hardware, software, and/or firmware modules, and the like. In some embodiments, other elements of the apparatus(es) may provide or supplement the functionality of the particular module. For example, a processor (or processors) may perform one or more operations and/or provide processing functionality to one or more associated modules, a memory (or memories) may provide storage functionality for one or more associated modules, and the like. In some embodiments, one or more processor(s) and/or memory/memories are specially configured to communicate in conjunction with one another for performing one or more of the operations described herein, for example as described herein with respect to various figures herein.

Figure 45:
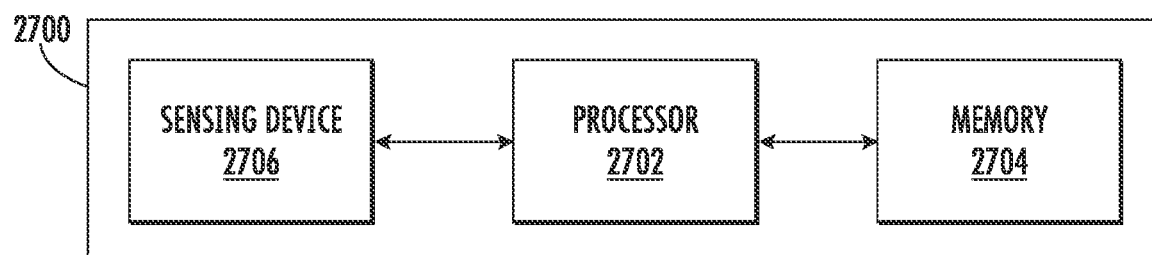
FIG. 45 illustrates an example block diagram of an example apparatus for sensing and/or processing in accordance with various examples of the present disclosure.

FIG. 45 illustrates a block diagram of an example apparatus for advanced sensing and processing, in accordance with at least one example embodiment of the present disclosure. In this regard, the apparatus 2700 as depicted may be configured to perform one, some, or all of the methodologies disclosure herein. In at least one example embodiment, the apparatus 2700 embodies an advanced interferometry apparatus configured to perform the interferometry processes described herein and one or more of the advanced sensing and/or processing methodologies described herein with respect to various figures herein.

As depicted, apparatus 2700 includes a sample testing device 2706. The sample testing device may comprise and/or embody one or more devices, embodied in hardware, software, firmware, or a combination thereof, for projecting one or more interference fringe patterns associated with an unidentified sample medium, and/or capturing sample interference fringe data representing the interference fringe pattern(s) for processing. In some embodiments, for example, the sample testing device 2706 comprises or is otherwise embodied by one or more interferometry devices and/or components thereof, for example at least a waveguide, at least one light source, at least one imaging component, supporting hardware for such components, and/or the like. In at least one example embodiment, the sample testing device 2706 is embodied by one or more apparatuses described herein, for example with respect to various figures herein, and/or components thereof. For example, in some embodiments, the sample testing device embodies an interferometry apparatus configured as described herein with respect to such figures.

Apparatus 2700 further includes processor 2702 and memory 2704. The processor 2702 (and/or co-processor or any other processing circuitry assisting or otherwise associated with the processor(s)) may be in communication with the memory 2704 via a bus for passing information among components of the apparatus. The memory 2704 may be non-transitory and may include, for example, one or more volatile and/or non-volatile memories. In other words, for example, the memory 2704 may be an electronic storage device (e.g., a computer readable storage medium). The memory 2704 may be configured to store information, data, content, applications, instructions, or the like, for enabling the apparatus 2700 to carry out various functions in accordance with example embodiments of the present disclosure. In this regard, the memory 2704 may be preconfigured to include computer-coded instructions (e.g., computer program code), and/or dynamically be configured to store such computer-coded instructions for execution by the processor 2702.

The processor 2702 may be embodied in any one of a myriad of ways. In one or more embodiments, for example, the processor 2702 includes one or more processing devices, processing circuitry, and/or the like, configured to perform independently. Additionally or alternatively, in some embodiments, the processor 2702 may include one or more processing devices, processing circuitry, and/or the like, configured to operate in tandem. In some such embodiments, the processor 2702 include one or more processors configured to communicate via a bus to enable independent execution of instructions, pipelining, an/or multi-threading. Alternatively or additionally still, in some embodiments, the processor 2702 is embodied entirely by an electronic hardware circuit specially designed for performing the operations described herein. The use of the term "processor," "processing module," and/or "processing circuitry" may be understood to include a single-core processor, a multi-core processor, multiple processors internal to the apparatus, other central processing unit(s) ("CPU"), microprocessor(s), integrated circuit(s), field-programmable gate array(s), application specific integrated circuit(s), and/or remote or "cloud" processors.

In an example embodiment, the processor 2702 may be configured to execute computer-coded instructions stored in one or more memories, such as the memory 2704, accessible to the processor 2702. Additionally or alternatively, the processor 2702 may be configured to execute hard-coded functionality. As such, whether configured by hardware or software means, or configured by a combination thereof, the processor 2702 may represent an entity (e.g., physically embodied in circuitry) capable of performing the operations in accordance with embodiment(s) of the present disclosure when configured accordingly. Alternatively, as another example, when the processor is embodied as an executor of software instructions, the instructions may specifically configure the processor 2702 to perform the algorithm and/or operations described herein when the instructions are executed.

In at least one example embodiment, the processor 2702, alone or in conjunction with the memory 2704, is configured to provide light source tuning functionality, as described herein. In at least one example context, the processor 2702 is configured to perform one or more of the operations described herein with respect to FIG. 50 and FIG. 51. For example, in at least one example embodiment, the processor

2702 is configured to adjust a temperature control to affect a sensing environment. Additionally or alternatively, in at least one example embodiment, the processor 2702 is configured to initiate a calibration setup event associated with a light source. Additionally or alternatively, in at least one example embodiment, the processor 2702 is configured to capture reference interference fringe data representing a calibrated interference fringe pattern in a calibrated environment, for example projected via a reference channel of a waveguide. Additionally or alternatively, in at least one example embodiment, the processor 2702 is configured to compare a reference interference fringe data with stored calibration interferometer data, for example to determine a refractive index offset between the reference interference fringe data and the stored calibration interference data. Additionally or alternatively, in at least one example embodiment, the processor 2702 is configured to tune the light source based on the refractive index offset. In one or more embodiments, the processor 2702 is configured to adjust a voltage level applied to the light source to adjust a light wavelength associated with the light source, and/or are configured to adjust a current level applied to the light source to adjust a light wavelength associated with the light source. In some embodiments, the processor 2702 may include or be associated with supporting hardware for adjusting one or more components of a sample testing device, for example to adjust a drive current and/or voltage for one or more light source(s), to activate one or more imaging component(s) and/or otherwise receive image data (e.g., interference fringe data) captured by an imaging component.

Additionally or alternatively, in at least one example embodiment, the processor 2702, alone or in conjunction with the memory 2704, is configured to provide refraction index processing functionality, such as to process data and determine one or more refractive index curve(s), as described herein. In at least one example context, the processor 2702 is configured to perform one or more of the operations described herein with respect to various figures herein. For example, in at least one example embodiment, the processor 2702 is configured to receive first interference fringe data for an unidentified sample medium and associated with a first wavelength. Additionally or alternatively, in at least one example embodiment, the processor 2702 is configured to receive second interference fringe data for the unidentified sample medium and associated with a second wavelength. Additionally or alternatively, in at least one example embodiment, the processor 2702 is configured to derive refractive index curve data based on the first interference fringe data and the second interference fringe data. Additionally or alternatively, in at least one example embodiment, the processor 2702 is configured to determine sample identity data based on the refractive index curve data. In some embodiments, to receive the first interference fringe data and second interference fringe data, the processor 2702 is configured to trigger a light source to generate the first projected light of the first wavelength and the second projected light of the second wavelength, and capture the first interference fringe data representing a first interference fringe pattern from the first projected light of the first wavelength, and capture the second interference fringe data representing a second interference fringe pattern based on the second projected light of the second wavelength. In some embodiments, to determine the sample identity data based on the refractive index curve, the processor 2702 is configured to query a refractive index data based on the refractive index curve, and/or a refractive index curve and a sample temperature, for example where the sample identity data corresponds to a stored refractive index curve that best matches the refractive index curve data.

Additionally or alternatively, in at least one example embodiment, the processor 2702, alone or in conjunction with the memory 2704 is configured to provide interference fringe data processing functionality, such as to process interference fringe data and identify and/or classify a sample based on such processing, as described herein. In at least one example context, the processor 2702 is configured to perform one or more of the operations described herein with respect to various figures herein. For example, in at least one example embodiment, the processor 2702 is configured to receive sample interference fringe data for an unidentified sample medium. Additionally or alternatively, in at least one example embodiment, the processor 2702 is configured to provide at least the sample interference fringe data to a trained sample identification model. Additionally or alternatively, in at least one example embodiment, the processor 2702 is configured to receive, from the sample identification model, sample identity data associated with the sample interference fringe data. In some such embodiments, additionally or alternatively, the processor 2702 is configured to collect a plurality of interference fringe data associated with a plurality of known identity labels. In some such embodiments, additionally or alternatively, the processor 2702 is configured to store, in a training database, each of the plurality of interference fringe data with the plurality of known sample identity labels. In some such embodiments, additionally or alternatively, the processor 2702 is configured to train the trained sample identification model from the training database. Additionally or alternatively, in some embodiments, the processor 2702 is configured to determine an operational temperature associated with a sample environment, and provide the operational temperature and the sample interference fringe data to the trained sample identification model to receive the sample identity data. In some embodiments, to receive the sample interference fringe data for the unidentified sample medium, the processor 2702 is configured to trigger a light source to generate a projected light of a determinable wavelength and capture, using an imaging component, the sample interferometer data representing a sample interference fringe pattern associated with the projected light.

In at least one example embodiment, the processor 2702 includes a first sub-processor configured for controlling some or all components of the sample testing device 2706, and a second sub-processor for processing interference fringe data captured by the sample testing device 2706 and/or adjusting one or more components of the sample testing device 2706 (e.g., adjusting a drive current and/or drive voltage for a light source). In some such embodiments, the first sub-processor may be located within the sample testing device 2706 for controlling the various components described herein, and the second sub-processor may be located separate from the sample testing device 2706 but communicatively linked to enable the operations described herein.

Figure 46:
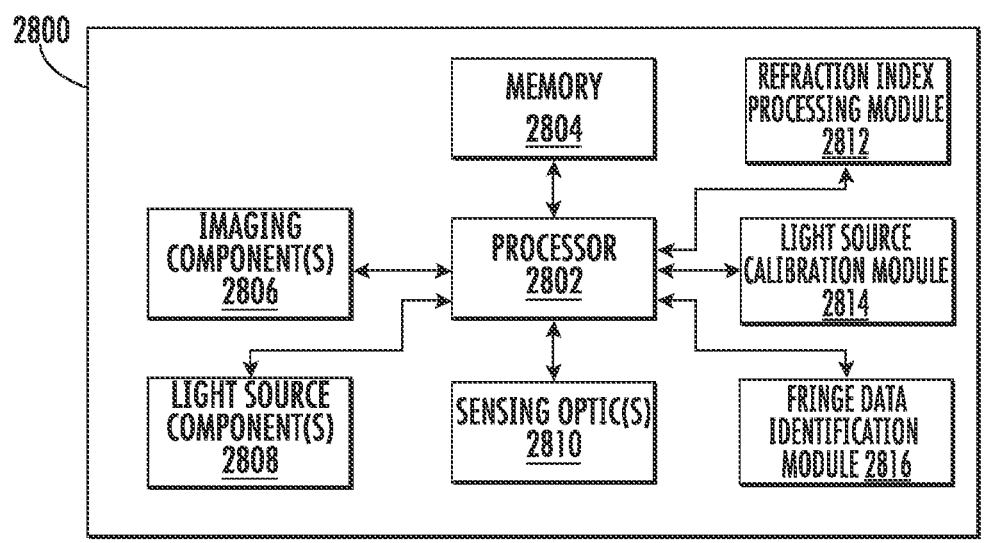
FIG. 46 illustrates an example block diagram of an example apparatus for sensing and/or processing in accordance with various examples of the present disclosure.

FIG. 46 illustrates a block diagram of another example apparatus for advanced sensing and processing, in accordance with at least one example embodiment of the present disclosure. In this regard, the apparatus 2800 as depicted may be configured to perform one, some, or all of the methodologies disclosure herein. In at least one example embodiment, the apparatus 2800 embodies an advanced interferometry apparatus configured to perform the interferometry processes described herein and one or more of the advanced sensing and/or processing methodologies described herein with respect to various figures herein.

The apparatus 2800 may include various components, such as one or more imaging component(s) 2806, one or more light source(s) 2808, one or more sensing optic(s) 2810, processor 2802, memory 2804, refraction index processing module 2812, light source calibration module 2814, and fringe data identification module 2816. In some embodiments, one or more components are entirely optional (e.g., a refraction index processing module, light source calibration module, fringe data identification module, and/or the like), and/or one or more components may be embodied in part or entirely by another component and/or module associated with the apparatus 2800 (e.g., the refraction index processing module, light source calibration module, and/or fringe data identification module combined with the processor). The components similarly named to those described with respect to FIG. 45, such as the processor 2802 and/or memory 2804, may be configured similarly as described with respect to the similarly named components of FIG. 45. Similarly, the imaging component(s) 2806 may be embodied and/or similarly configured to those similarly named components as described herein with respect to various figures, light source(s) 2808 may be embodied and/or similarly configured to those similarly named components as described herein with respect to various figures, and/or sensing optic(s) 2810 may be embodied and/or similarly configured to those similarly named components as described herein with respect to various figures.

As illustrated, the apparatus 2800 includes the refraction index processing module 2812. In some embodiments, the refraction index processing module 2812, alone or in conjunction with one or more other components such as the processor 2802 and/or memory 2804, to provide light source tuning functionality as described herein. In at least one example context, the refraction index processing module 2812 is configured to perform one or more of the operations described herein with respect to FIG. 50 and FIG. 51. For example, in at least one example embodiment, the refraction index processing module 2812 is configured to adjust a temperature control to affect a sensing environment. Additionally or alternatively, in at least one example embodiment, the refraction index processing module 2812 is configured to initiate a calibration setup event associated with a light source. Additionally or alternatively, in at least one example embodiment, the refraction index processing module 2812 is configured to capture reference interference fringe data representing a calibrated interference fringe pattern in a calibrated environment, for example projected via a reference channel of a waveguide. As described herein, the reference channel may include a known material associated with a known and/or determinable refractive index for one or more wavelength(s) and/or operating temperatures. Additionally or alternatively, in at least one example embodiment, the refraction index processing module 2812 is configured to compare a reference interference fringe data with stored calibration interferometer data, for example to determine a refractive index offset between the reference interference fringe data and the stored calibration interference data. Additionally or alternatively, in at least one example embodiment, the refraction index processing module 2812 is configured to tune the light source based on the refractive index offset. In one or more embodiments, the refraction index processing module 2812 is configured to adjust a voltage level applied to the light source to adjust a light wavelength associated with the light source, and/or are configured to adjust a current level applied to the light source to adjust a light wavelength associated with the light source. In some embodiments, the refraction index processing module 2812 may include or be associated with supporting hardware for adjusting one or more components of a sample testing device, for example to adjust a drive current and/or voltage for one or more light source(s), to activate one or more imaging component(s) and/or otherwise receive image data captured by an imaging component.

As illustrated, the apparatus 2800 further comprises the light source calibration module 2814. Additionally or alternatively, in at least one example embodiment, the light source calibration module 2814, alone or in conjunction with one or more other components such as the processor 2802 and/or memory 2804, is configured to provide refraction index processing functionality, such as to process data and determine one or more refractive index curve(s), as described herein. In at least one example context, the light source calibration module 2814 is configured to perform one or more of the operations described herein with respect to FIG. 47 to FIG. 49. For example, in at least one example embodiment, the light source calibration module 2814 is configured to receive first interference fringe data for an unidentified sample medium and associated with a first wavelength. Additionally or alternatively, in at least one example embodiment, the light source calibration module 2814 is configured to receive second interference fringe data for the unidentified sample medium and associated with a second wavelength. Additionally or alternatively, in at least one example embodiment, the light source calibration module 2814 is configured to derive refractive index curve data based on the first interference fringe data and the second interference fringe data. Additionally or alternatively, in at least one example embodiment, the light source calibration module 2814 is configured to determine sample identity data based on the refractive index curve data. In some embodiments, to receive the first interference fringe data and second interference fringe data, the light source calibration module 2814 is configured to trigger a light source to generate the first projected light of the first wavelength and the second projected light of the second wavelength, and capture the first interference fringe data representing a first interference fringe pattern from the first projected light of the first wavelength, and capture the second interference fringe data representing a second interference fringe pattern based on the second projected light of the second wavelength. In some embodiments, to determine the sample identity data based on the refractive index curve, the light source calibration module 2814 is configured to query a refractive index data based on the refractive index curve, and/or a refractive index curve and a sample temperature, for example where the sample identity data corresponds to a stored refractive index curve that best matches the refractive index curve data.

As illustrated, the apparatus 2800 further comprises the fringe data identification module 2816. Additionally or alternatively, in at least one example embodiment, the fringe data identification module 2816, alone or in conjunction with one or more other components such as the processor 2802 and/or memory 2804, is configured to provide interference fringe data processing functionality, such as to process interference fringe data and identify and/or classify a sample based on such processing, as described herein. In at least one example context, the fringe data identification module 2816 is configured to perform one or more of the operations described herein with respect to FIG. 52 to FIG. 54. For example, in at least one example embodiment, the fringe data identification module 2816 is configured to receive sample interference fringe data for an unidentified sample medium. Additionally or alternatively, in at least one example embodiment, the fringe data identification module 2816 is configured to provide at least the sample interference fringe data to a trained sample identification model. Additionally or alternatively, in at least one example embodiment, the fringe data identification module 2816 is configured to receive, from the sample identification model, sample identity data associated with the sample interference fringe data. In some such embodiments, additionally or alternatively, the fringe data identification module 2816 is configured to collect a plurality of interference fringe data associated with a plurality of known identity labels. In some such embodiments, additionally or alternatively, the fringe data identification module 2816 is configured to store, in a training database, each of the plurality of interference fringe data with the plurality of known sample identity labels. In some such embodiments, additionally or alternatively, the fringe data identification module 2816 is configured to train the trained sample identification model from the training database. Additionally or alternatively, in some embodiments, the fringe data identification module 2816 is configured to determine an operational temperature associated with a sample environment, and provide the operational temperature and the sample interference fringe data to the trained sample identification model to receive the sample identity data. In some embodiments, to receive the sample interference fringe data for the unidentified sample medium, the fringe data identification module 2816 is configured to trigger a light source to generate a projected light of a determinable wavelength and capture, using an imaging component, the sample interferometer data representing a sample interference fringe pattern associated with the projected light. It should be appreciated that, in some embodiments, the fringe data identification module 2816 may include a separate processor, specially configured field programmable gate array (FPGA), and/or a specially configured application-specific integrated circuit (ASIC), and/or the like.

In some embodiments, one or more of the aforementioned components is combined to form a single module. The single combined module may be configured to perform some or all of the functionality described herein with respect to the individual modules combined to form the single combined module. For example, in at least one embodiment, the refraction index processing module 2812, light source calibration module 2814, and/or fringe data identification module 2816, and the processor 2802 embodied by a single module. Additionally or alternatively, in some embodiments, one or more of the modules described above may be configured to perform one or more of the actions described with respect to such modules.

Some embodiments provided herein are configured for refraction index processing functionality, such as to process data and determine one or more refractive index curve(s) associated with an unidentified sample medium as described herein. In this respect, conventional implementations have failed to use individual refractive index determinations to accurately perform sample classification and/or identification. Accordingly, conventional implementations for sample classification and identification are deficient with respect to performing such classification and/or identification utilizing refractive index processing for an unidentified sample. In this regard, one or more embodiments are provided that are configured to determine a refractive index curve associated with an unidentified sample medium, and/or utilizing the determined refractive index curve(s) to identify and/or otherwise classify an unidentified sample medium. For example, in at least one example context, the apparatus 2700 and/or 2800 are configured to perform such functionality based on captured data representing projected interference fringe pattern. It should be appreciated example interference fringe patterns described with respect to FIG. 45 to FIG. 54 may be embodied in a manner similar to those described herein with respect to various figures herein.

Figure 43:
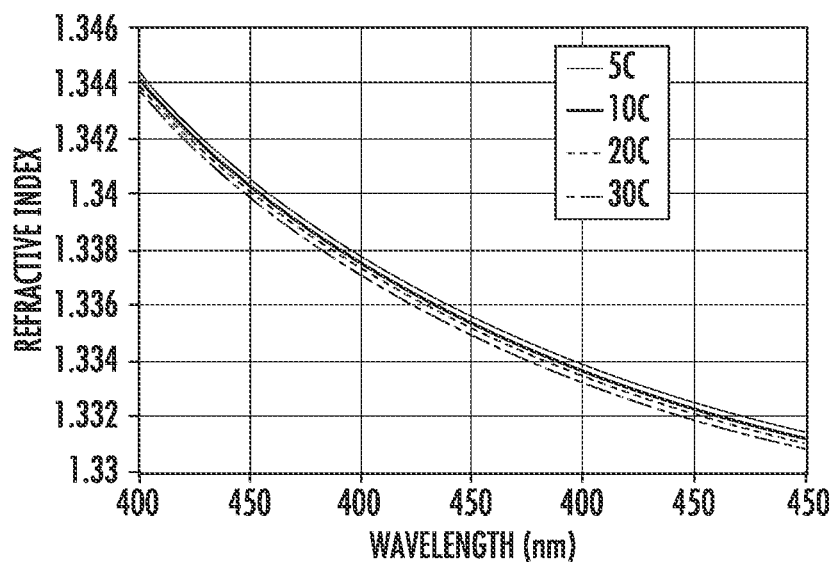
FIG. 43 illustrates an example graphical visualization in accordance with various examples of the present disclosure.

FIG. 43 depicts an example graphical visualization of a plurality of derived refractive index curves. For illustrative ad explanatory purposes, the refractive index curves depicted may be associated with a water sample. In this regard, the refractive index curve may be determined from captured interference fringe data projected through the sample. As described herein, in some embodiments, a refractive index curve associated with a particular medium (e.g., a known sample medium or an unidentified sample medium) is derivable based on any of number of datapoints, for example any number of interference fringe datapoints, associated with the particular medium. For example, a refractive index curve associated with an identified sample medium or unidentified sample medium may be derived from the associated datapoints using one or more algorithms (e.g., mathematical calculations), interpolation, and/or the like.

As depicted, the various refractive index curves are further associated with various operating temperatures. For example, a first refractive index curve is depicted for the sample at the operational temperature of 5 degrees Celsius (C), a second refractive index curve is depicted for the sample at the operational temperature of 10 C, a third refractive index curve is depicted for the sample at the third operational temperature of 20 C, and a fourth refractive index curve is depicted for the sample at the fourth operational temperature of 30 C. It should be appreciated that, for a given sample, any number of refractive index curves may be derived for various operational temperatures. For example, in at least one example context, a single refractive index curve are derived for a sample at a single operational temperature. In another example context, a plurality of refractive index curves are derived for a sample at a plurality of operational temperature.

In some embodiments, each refractive index curve is derived from a plurality of interference fringe data embodying captured representations of interference fringe patterns produced by light with various wavelengths. For example, an apparatus, such as apparatus 2700 and/or 2800, may be configured to project a first light beam of a first wavelength to produce a first interference fringe pattern for capturing and processing. The apparatus may further capture first interference fringe data representing the first interference fringe pattern associated with the first wavelength, and derive therefrom a first refractive index associated with the first wavelength. In some embodiments, the apparatus may further associate the first refractive index with both the first wavelength and an operational temperature. In this regard, the first wavelength may be predefined, driven by the apparatus and determinable therefrom (e.g., from memory), and/or determinable through communication with one or more light sources producing light at the first wavelength.

The apparatus may further be configured to project a second light beam of a second wavelength to produce a second interference fringe pattern for capturing and processing. In this regard, the second interference fringe pattern may represent a different interference pattern due to the change in wavelength of the light that is utilized to project the second interference fringe pattern. In this regard, the apparatus may further capture second interference fringe data representing the second interference fringe pattern associated with the second wavelength and derive therefrom a second refractive index associated with the second wavelength. In some embodiments, the apparatus may further associate the second refractive index with both the second wavelength and the operational temperature. In this regard, the second wavelength may be predefined, driven by the apparatus and determinable therefrom, and/or determinable through communication with one or more light sources producing light at the second wavelength.

In some embodiments, the apparatus may similarly derive any number of additional refractive indices associated with any number of wavelengths. In this respect, each of the derived refractive indices serves as a datapoint for the derived refractive index curve associated with a given wavelength at a particular operational temperature. Thus, in some such embodiments, the refractive index curve for a given operational temperature may be derived from the various refractive indices, for example through algorithmic calculation and/or interpolation between the determined refractive indices representing datapoints along the refractive index curve. In this regard, each refractive index associated with a particular operational temperature may serve as a datapoint along the refractive index curve that corresponds to that operational temperature. Accordingly, in some example contexts, a plurality of refractive index curves associated with a plurality of operational temperatures for a given sample medium may be generated, where each of the refractive index curves may be determined based on the plurality of interference fringe data each representing an individual refractive index datapoint for the given sample, light wavelength, and operational temperature.

In some embodiments, the apparatus may include and/or otherwise have access to a refractive index database that stores interference fringe data, and/or data derived therefrom (e.g., modulation, frequency, and phase) representing refractive index datapoints for a particular sample, operational temperature, and wavelength. In this regard, the refractive index database may be populated with datapoints associated with a known identity label for a given sample. Furthermore, based on the interference fringe data associated with each sample, one or more refractive index curve(s) may similarly be determined and associated with a known sample identity label. For example, the database may be utilized to retrieve data associated with each sample identity label and operational temperature, and based on the interference fringe data associated with each sample identity label and operational temperature a corresponding refractive index curve may be derived. Accordingly, a newly derived refractive index curve associated with an unidentified sample medium and known operational temperature can be compared to the refractive index curves derived for samples of known sample identity labels in the database to determine sample identity data, such as a sample identity label, associated with the unidentified sample medium. For example, the apparatus may compare the newly derived refractive index curve for the unidentified sample medium with the refractive index curves for known sample labels (e.g., where the refractive index curves for the known identity labels are stored in the refractive index database or derived from the information stored therein). Further, in some embodiments the apparatus may be configured to determine the refractive index curve at the particular operational temperature at which the interference fringe data was captured for the unidentified sample medium that matches and/or best matches the newly derived refractive index curve for the unidentified sample medium at the operational temperature. In some embodiments, for example, the unidentified sample medium is identified and/ or classified based on the sample identity data (e.g., a sample identity label) associated with the refractive index curve that best matches the refractive index curve for the unidentified sample medium. It should be appreciated that the curve that matches and/or best matches the refractive index curve for the unidentified sample medium may be determined utilizing any one of a myriad of error calculation algorithms, distance algorithms, and/or the like, and/or other custom algorithms for comparing the similarity of two curves.

Figure 47:
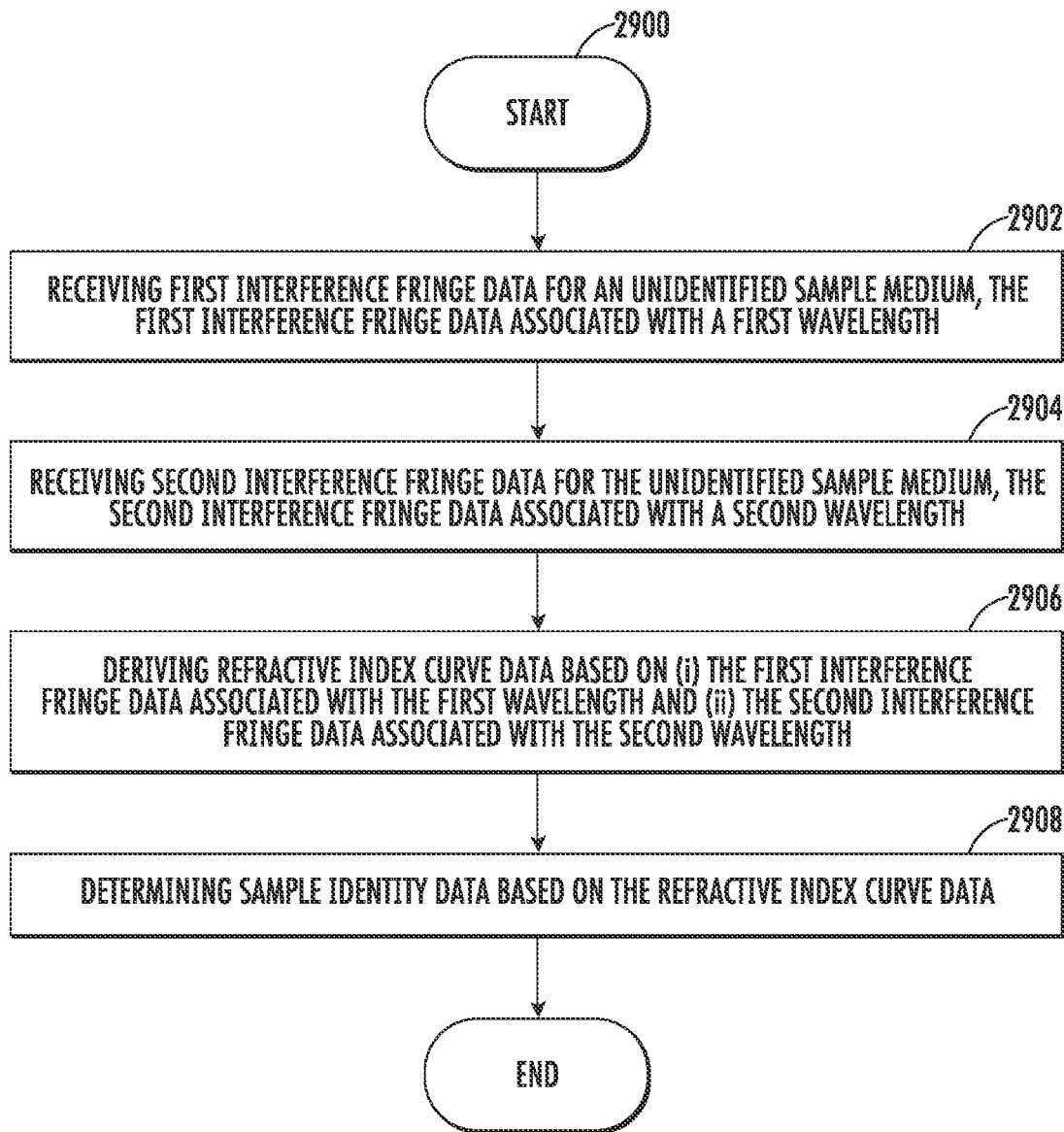

FIG. 47 illustrates a flowchart including example operations of an example process 2900 for refraction index processing, specifically to identify sample identity data associated with an unidentified sample medium, in accordance with at least one example embodiment of the present disclosure. It should be appreciated that the various operations form a process that may be executed via one or more computing devices and/or modules embodied in hardware, software, and/or firmware (e.g., a computer-implemented method). In some embodiments, the process 2900 is performed by one or more apparatus(es), for example the apparatus 2700 and/or 2800 as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 2900 may be stored on one or more non-transitory computer-readable storage mediums of a computer program product, for example for execution via one or more processors associated with, or otherwise in execution with, the non-transitory computer-readable storage medium of the computer program product.

The process 2900 begins at block 2902. At block 2902, the process 2900 comprises receiving first interference fringe data for an unidentified sample medium, wherein the first interference fringe data is associated with a first wavelength. In some such embodiments, the first interference fringe data embodies a captured representation of an interference fringe pattern produced by light of the first wavelength, for example via a waveguide. In some such embodiments, the first interference fringe data is captured by one or more imaging component(s) associated with the projected first interference fringe pattern. Additionally or alternatively, in some embodiments, the first interference fringe data is received from another associated system, loaded from a database embodied on a local and/or remote memory device, and/or the like. In some embodiments, the first interference fringe data is similarly associated with an operational temperature for the waveguide and/or unidentified sample medium during capture of the first interference fringe data. The first interference fringe data, in some embodiments, may be used to derive a first interferometer refractive index for the unidentified sample medium associated with the first wavelength and the operational temperature.

In some embodiments, the interference fringe data represents the refractive index change resulting from introduction of a sample medium into a flow channel. In this regard, the separation between the refractive index due to introduction of the sample medium may be calculated. For example, in a circumstance where the change amount is k times the original separation of an interference fringe pattern, the optical path difference may equate to $2k\pi$. In some embodiments, with respect to known geometry of the flow channel, the refractive index change is calculatable as the path optical different of ΔnL, where Δn is the refractive index change and L is the equivalent physical length of the optical path associated with the flow channel.

At block 2904, the process 2900 further comprises receiving second interference fringe data for the unidentified sample medium, wherein the second interferometer data is associated with a second wavelength. In this regard, in some embodiments, the second interference fringe data embodies a captured representation of a second interference fringe pattern produced by light of the second wavelength, for example via a waveguide. In some embodiments, a second light source may be activated to produce the second light. In other embodiments, the same light source is adjusted to produce both the first light associated with the first interference fringe data and the second light associated with the second interference fringe data, for example by adjusting a drive current and/or drive voltage to the light source from a first value associated with the first wavelength to a second value associated with the second wavelength. In some embodiments, the second interference fringe data is similarly associated with the operational temperature for the waveguide and/or unidentified sample medium during capture of the second interference fringe data, which may be the same or nearly the same (e.g., within a predetermined threshold) from the operational temperature during capture of the first interference fringe data. The second interference fringe data, in some embodiments, may be used to derive a second interferometer refractive index for the unidentified sample medium, where the second interferometer refractive index is associated with the second wavelength and the operational temperature.

It should be appreciated that the process 2900 may further include receiving any number of additional interference fringe data associated with a myriad of wavelengths. For example, third interference fringe data may be received associated with a third wavelength, and/or fourth interference fringe data may be received associated with a fourth wavelength. Any such additional interference fringe data may be received in a manner similar to that of the first and/or second interference fringe data described above with respect to blocks 2902 and/or 2904.

At block 2906, the process 2900 further comprises deriving refractive index curve data based on (i) the first interference fringe data associated with the first wavelength, and (ii) the second interference fringe data associated with the second wavelength. In some such embodiments, for example, a first refractive index is derived from the first interference fringe data, and a second refractive index is derived from the second interference fringe data. The first and second refractive indices may be used to derive the refractive index curve data associated with the unidentified sample medium. In some embodiments, the refractive index curve data is derived from the first and second interference fringe data using one or more algorithms and/or mathematical calculations. Alternatively or additionally, in some embodiments, the refractive index curve data is derived based on interpolation between the refractive indices. It should be appreciated that in contexts where one or more additional interference fringe data are received, the refractive index curve data may further be derived based on the first interference fringe data, second interference fringe data, and one or more additional interference fringe data.

At block 2908, the process 2900 further comprises determining sample identity data based on the refractive index curve data. In some embodiments, the sample identity data is determined by determining the refractive index curve data at the operational temperature most closely matches known refractive index curve data for a sample associated with known sample identity data. For example, if the sample refractive index curve data most closely corresponds to known refractive index curve data associated with a known sample identity label (e.g., distilled water), the sample refractive index curve data may similarly be determined to embody the same known sample identity label (e.g., to represent distilled water). In circumstances where the sample refractive index curve data may match more than one known refractive index curve data, the determined sample identity data may embody statistical data based on the similarity between the sample refractive index curve data and each of the known refractive index curve data. An example implementation for determining the sample identity data based on the refractive index curve data is described herein with respect to FIG. 49.

Figure 48:
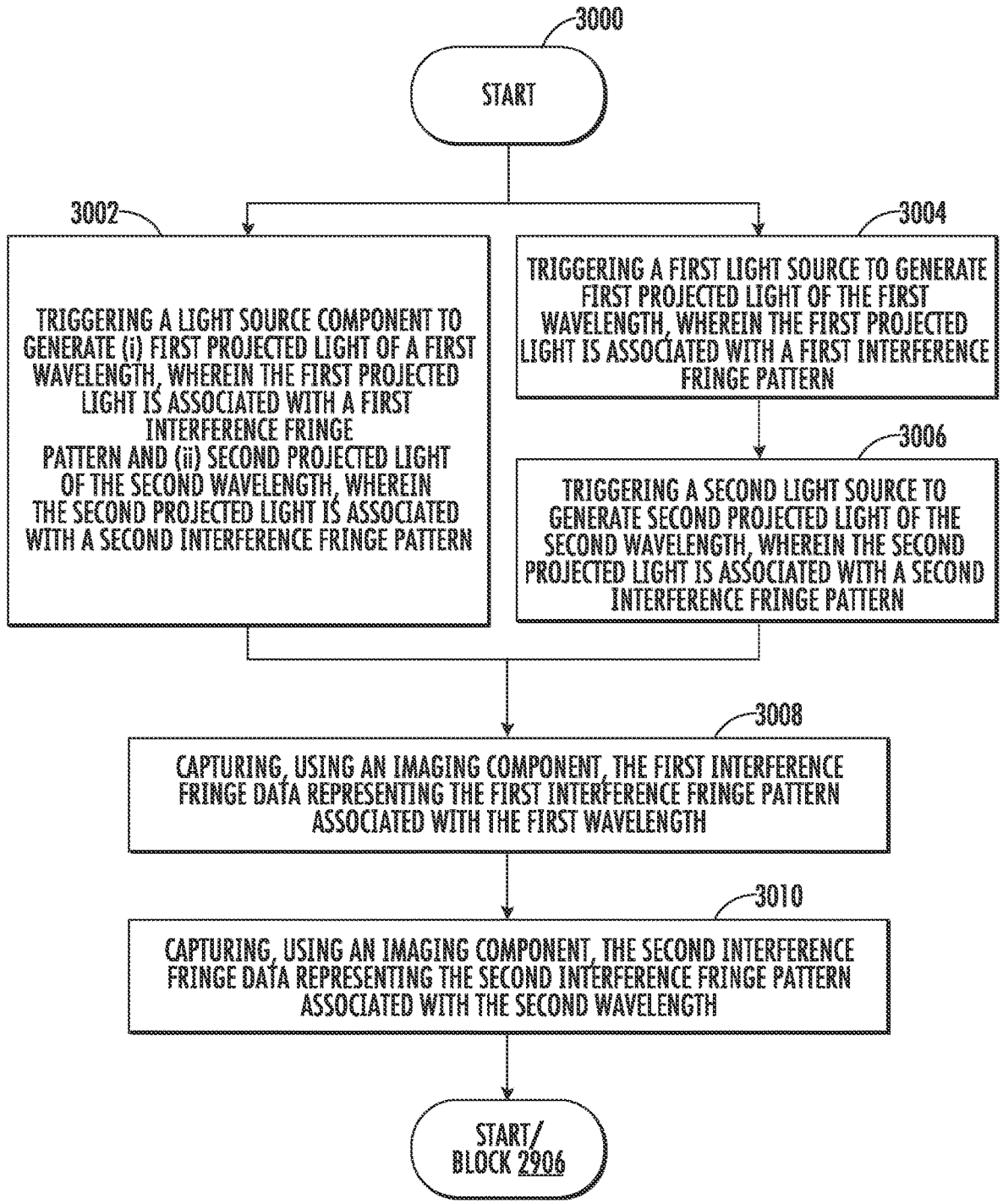
FIG. 48 illustrates an example flowchart illustrating example operations in accordance with various examples of the present disclosure.

FIG. 48 illustrates a flowchart including additional example operations of an example process 3000 for refraction index processing, specifically for receiving at least a first interference fringe data associated with a first wavelength and a second interference fringe data associated with a second wavelength for an unidentified sample medium, in accordance with at least one example embodiment of the present disclosure. It should be appreciated that the various operations form a process that may be executed via one or more computing devices and/or modules embodied in hardware, software, and/or firmware (e.g., a computer-implemented method). In some embodiments, the process 3000 is performed by one or more apparatus(es), for example the apparatus 2700 and/or 2800 as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 3000 may be stored on one or more non-transitory computer-readable storage mediums of a computer program product, for example for execution via one or more processors associated with, or otherwise in execution with, the non-transitory computer-readable storage medium of the computer program product.

As illustrated, the process 3000 begins at block 3002 or block 3004. In some embodiments, the process begins after one or more operations of another process, such as the process 2900 described herein. Additionally or alternatively, in at least one embodiment, flow returns to one or more operations of another process, such as the process 2900, upon completion of the process illustrated with respect to the process 3000. For example, as illustrated, in some embodiments, flow returns to block 2906 upon completion of block 3010.

In some embodiments, the process 3000 begins at block 3002, for example in circumstances where a single light source is utilized to produce multiple interference fringe patterns associated with multiple wavelengths. At block 3002, the process 3000 comprises triggering a light source to generate (i) first projected light of a first wavelength, wherein the first projected light is associated with a first interferometer fringe pattern and (ii) second projected light of the second wavelength, wherein the second projected light is associated with a second interferometer fringe pattern. In this regard, the light source may first be triggered with a first drive current, or drive voltage, associated with the first wavelength, and subsequently triggered with a second drive current, or drive voltage, associated with the second wavelength. In other embodiments, the light source may generate a single light beam that is split and/or otherwise manipulated by one or more optical components into two sub-beams. One or more of the sub-beams may be manipulated to match the desired first and second wavelengths. It should be appreciated that, as described herein, the light source may be a component of a sample testing device, waveguide, and/or similar apparatus, as described herein.

In other embodiments, the process 3000 begins at block 3004, for example in circumstances where multiple light sources components are utilized to produce light of different wavelengths associated with the first and second interferometer data. At block 3004, the process 3000 comprises triggering a first light source to generate first projected light of the first wavelength, wherein the first projected light is associated with a first interference fringe pattern. In some embodiments, the first light source is triggered based on a first drive current, or first drive voltage, to cause the first light source to produce the first light of the first wavelength. In some embodiments, the first projected light is manipulated through one or more optical components, for example components of a waveguide, to produce the first interference fringe pattern from the first projected light. In some embodiments, a processor and/or associated module of a sensing apparatus as described herein is configured to generate one or more signals to cause triggering of the first light source to the appropriate first wavelength.

At block 3006, the process 3000 further comprises triggering a second light source to generate second projected light of the second wavelength, wherein the second projected light is associated with a second interference fringe pattern. In this regard, in some embodiments, the second light source is triggered based on a second drive current, or second drive voltage, to cause the second light source to produce the second light of the second wavelength. In at least some such embodiments, the first drive current or voltage is different from the second drive current or voltage, such that the light produced by the first and second light sources are of distinct wavelengths. In some embodiments, the second projected light is manipulated through one or more optical components, for example components of a waveguide, to produce the second interference fringe pattern from the second projected light. In some embodiments, the processor and/or associated module of a sensing apparatus as described herein is configured to generate one or more signals to cause triggering of the second light source to the appropriate second wavelength.

Upon completion of block 3004 or 3006, flow proceeds to block 3008. At block 3008, the process 3000 includes capturing, using an imaging component, the first interference fringe data representing the first interference fringe pattern associated with the first wavelength. In this regard, the first interference fringe pattern is dependent on the first wavelength, such that the captured data represents a different interference pattern for each different wavelength. The first interference fringe data may be processed to determine a refractive index associated with the interference pattern. In some embodiments, the imaging component is included in and/or otherwise associated with a sample testing device, waveguide, and/or the like, for example as described herein. In this regard, the imaging component may be triggered by one or more processor(s) and/or associated module(s) associated therewith, for example as described herein. In at least one embodiment, the imaging component is embodied by, or a subcomponent of, a separate apparatus communicatively linked with one or more hardware, software, and/or firmware devices for processing such captured image data.

At block 3010, the process 3000 includes capturing, using the imaging component, the second interference fringe data representing the second interference fringe pattern associated with the second wavelength. In this regard, the second interference fringe pattern is dependent on the second wavelength, such that the captured data represents a different interference pattern than the first interferometer pattern associated with the first wavelength. The second interference fringe data may be processed to determine a second refractive index associated with the second interference pattern. In some embodiments, the imaging component is included in and/or otherwise associated with the same sample testing device, waveguide, and/or the like, for example as described herein. In this regard, the imaging component may be triggered by one or more processor(s) and/or associated module(s) associated therewith, for example as described herein.

In some embodiments, the first interference fringe data is captured upon triggering projection of a first light of a first wavelength, and the second interference fringe data is captured upon triggering projection of a second light of a second wavelength. In this regard, in some embodiments, block 3008 may occur in parallel with one or more operations as described, for example upon projection of the first light at block 3002 or block 3004. Similarly, in some embodiments, block 3010 may occur in parallel with one or more operations as described, for example upon projection of the first light at block 3002 or block 3006.

Figure 49:
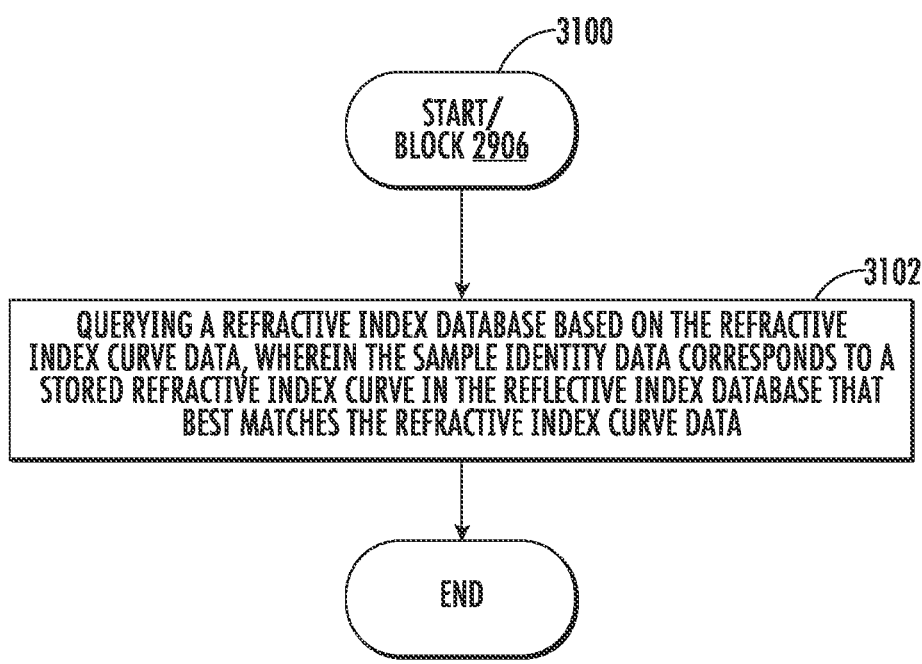
FIG. 49 illustrates an example flowchart illustrating example operations in accordance with various examples of the present disclosure.

FIG. 49 illustrates a flowchart including additional example operations of an example process 3100 for refraction index processing, specifically for determining sample identity data based on the refractive index curve data, in accordance with at least one example embodiment of the present disclosure. It should be appreciated that the various operations form a process that may be executed via one or more computing devices and/or modules embodied in hardware, software, and/or firmware (e.g., a computer-implemented method). In some embodiments, the process 3100 is performed by one or more apparatus(es), for example the apparatus 2700 and/or 2800 as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 3100 may be stored on one or more non-transitory computer-readable storage mediums of a computer program product, for example for execution via one or more processors associated with, or otherwise in execution with, the non-transitory computer-readable storage medium of the computer program product.

The process 3100 begins at block 3102. In some embodiments, the process begins after one or more operations of another process, such as after block 2906 of the process 2900 described herein. Additionally or alternatively, in at least one embodiment, flow returns to one or more operations of another process, such as the process 2900, upon completion of the process illustrated with respect to the process 3100.

At block 3102, the process 3100 comprises querying a refractive index database based on the refractive index curve data, wherein the sample identity data corresponds to a stored refractive index curve in the refractive index database that best matches the refractive index curve data. In some embodiments, the refractive index database is further queried based on an operational temperature, for example the operational temperature at which the first and/or second interference fringe data representing interference patterns for the unidentified sample medium were captured. In this regard, the refractive index database may be queried to identify data associated with the same operational temperature, and further derive associated refractive index curve data therefrom for comparison with the sample refractive index curve data. The sample refractive index curve data may be compared with the stored refractive index curves retrieved from the database, and/or derived from the data retrieved therefrom, to determine the best match to the sample refractive index curve data. For example, in some embodiments, one or more error and/or distance algorithms may be utilized to determine the stored refractive index curve that best matches the refractive index curve data for the unidentified sample medium, In this manner, by determining a known refractive index curve that is associated with known sample identity data and the best match to the sample refractive index curve, the sample identity data associated with the closest known refractive index curve may represent the identity and/or classification of the unidentified sample medium, and/or statistical information associated therewith.

Some embodiments provided herein are configured for fine tuning a light source, such as to refine the wavelength of the light output by the light source to (or closed to) a desired wavelength. In this regard, the light source may be fine-tuned to account for environmental effects, for example discrepancies in projected interference patterns due to shifts caused by the operational temperature. In at least one example context, the apparatus 2700 and/or 2800 are configured to perform such functionality to fine tune the light output by the light source.

Figure 44:
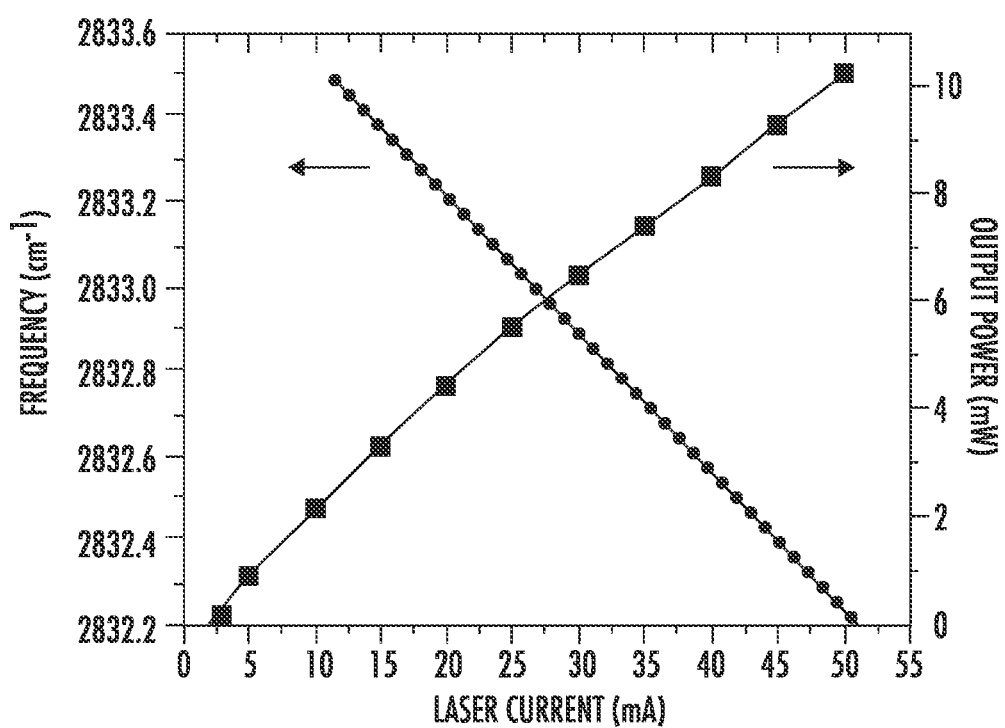
FIG. 44 illustrates an example graphical visualization in accordance with various examples of the present disclosure.

FIG. 44 depicts an example graphical visualization of variable adjustment for fine tuning output of a light source. In this regard, the light source may be tuned as depicted in the visualization. For example, in at least one example implementation, as the output power of the light source is increased, the wavelength of the light produced by the light source is decreased. In this regard, the drive current may be adjusted (e.g., increased or decreased) to adjust the wavelength of the light produced by the light source to, or closer to (e.g., within an acceptable error threshold), a desired wavelength. For example, in a circumstance where the operating temperature of the sample environment causes the wavelength of the light produced by the light source to decrease, the drive current to the light source may be adjusted to decrease the output power of the light source and to increase the wavelength of the produced light. The light source may be adjusted such that the wavelength of the light output by the light source approaches and/or matches a desired and/or calibrated wavelength. It should be appreciated that, in other embodiments, the drive voltage applied to the light source may be adjusted to effectuate adjustment of the light source. In some embodiments, the light source includes or is otherwise associated with supporting hardware for adjusting the light source, such as by adjusting the current driving the light source.

Figure 50:
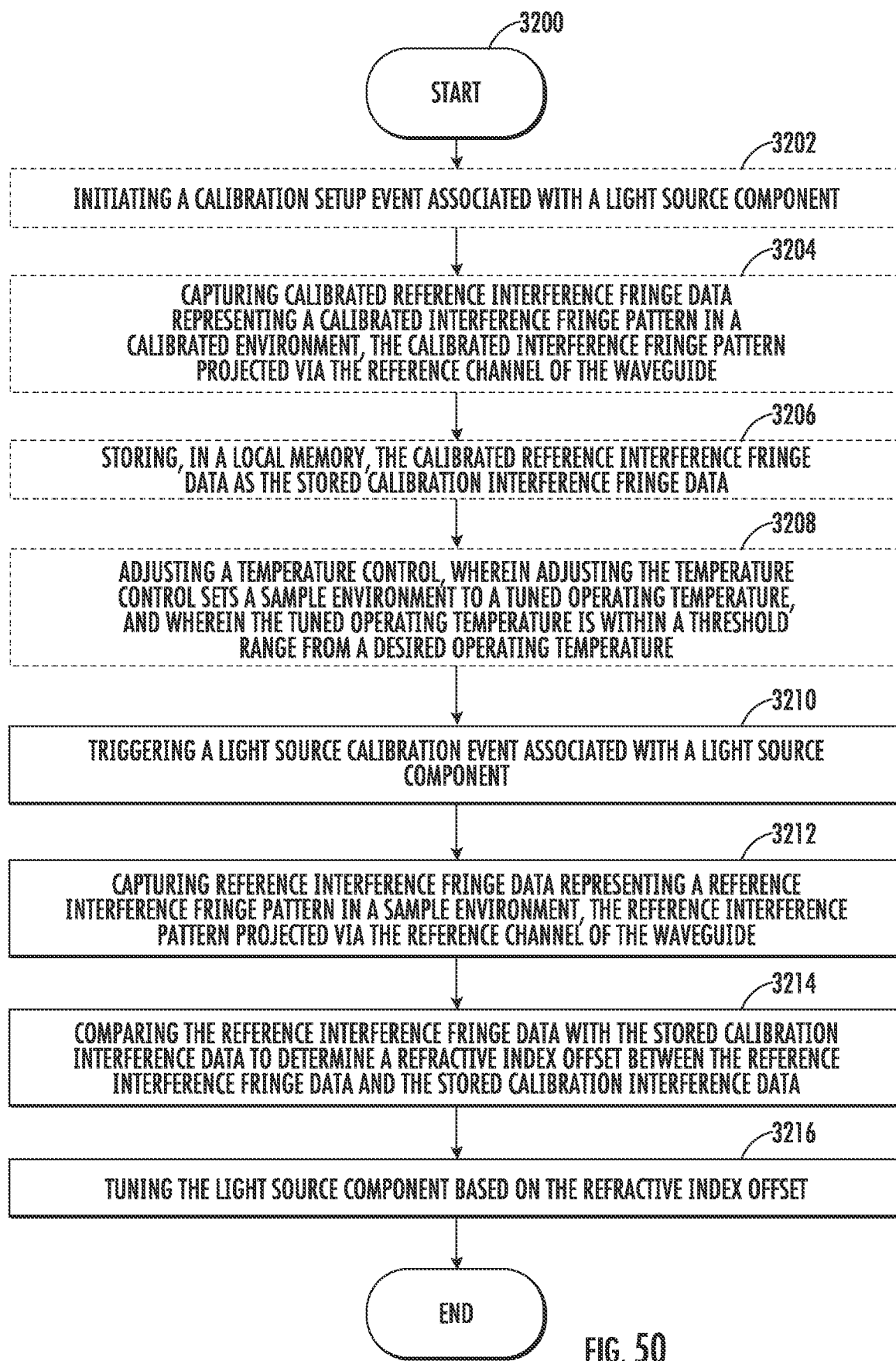
FIG. 50 illustrates an example flowchart illustrating example operations in accordance with various examples of the present disclosure.

FIG. 50 illustrates a flowchart including example operations of an example process 3200 for light source tuning, specifically to fine tune the wavelength of the light produced by a light source to calibrate the light source, in accordance with at least one example embodiment of the present disclosure. It should be appreciated that the various operations form a process that may be executed via one or more computing devices and/or modules embodied in hardware, software, and/or firmware (e.g., a computer-implemented method). In some embodiments, the process 3200 is performed by one or more apparatus(es), for example the apparatus 2700 and/or 2800 as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 3200 may be stored on one or more non-transitory computer-readable storage mediums of a computer program product, for example for execution via one or more processors associated with, or otherwise in execution with, the non-transitory computer-readable storage medium of the computer program product.

The process 3200 begins at block 3202. At block 3202, the process 3200 further comprises initiating a calibration setup event associated with a light source. In this regard, the calibration setup event may trigger use of a reference channel for storing data for calibration data, for example calibrated reference interference data, for use in one or more later calibration operations. In some embodiments, the calibration setup event is initiated during a factory setup of an apparatus, computer program product, and/or the like. Alternatively or additionally, in some embodiments, the calibration setup event is initiated automatically, for example upon activation of apparatus 2700 and/or 2800, the sample testing device, and/or the like. Alternatively or additionally, the calibration setup event may be initiated automatically in response to activation of an operation for determining sample identity data associated with an unidentified sample medium. Alternatively or additionally still, in one or more embodiments, the calibration setup event may be initiated in response to user interaction specifically indicating initiation of the calibration setup event, for example in response to predefined user interaction with one or more hardware, software, and/or firmware components for initiating the calibration setup event.

At block 3204, the process 3200 further comprises capturing calibrated reference interference fringe data representing a calibrated interference fringe pattern in a calibrated environment, the calibrated interference fringe pattern projected via the reference channel of the waveguide. In this regard, the calibrated interference pattern may be projected through a reference medium located in the reference channel (e.g., $SiO_2$) that is used for outputting one or more reference interference fringe patterns for calibration purposes (e.g., for tuning and/or otherwise calibrating a wavelength output by a light source). The calibrated environment, in some embodiments, comprises a calibrated operating temperature. In this regard, the sample testing device, waveguide, and/or the like, may be calibrated at an earlier operation, for example at block 3202 or before initiation of the process 3200. By projecting an interference fringe pattern via the reference channel of the waveguide, the interference fringe pattern represents a pre-calibrated result that may be captured and compared to in future circumstances to determine whether one or more properties of the apparatus (e.g., a wavelength of the light produced by a light source) has changed. Such properties may change over time due to any one or more of a myriad of reasons, for example due to deterioration of one or more components of the apparatus, changes in the operating environment, and/or the like.

At block 3206, the process 3200 further comprises storing, in a local memory, the calibrated reference interference fringe data as the stored calibration interference fringe data. In this regard, the stored calibration interference fringe data may be retrieved from the local memory for use in a subsequent calibration operation. For example as described herein with respect to blocks 3210-3216. For example the calibrated reference interference fringe data may embody pre-calibrated interference fringe data for comparison with later-captured interference fringe data to determine how to adjust one or more light source to re-calibrate, or better calibrate, the wavelength of the light produced by the light source. In some embodiments, for example, the calibrated reference interference fringe data comprises modulation data, frequency data, phase data, and/or a combination thereof, associated with a projected calibration interference fringe pattern. It should be appreciated that refractive index datapoints and/or a refractive index curve associated with the calibration interference fringe pattern may again be determined from the stored calibrated reference interference fringe data.

At block 3208, the process 3200 further comprises adjusting a temperature control, wherein adjusting the temperature sets a sample environment to a tuned operating temperature, and wherein the tuned operating temperature is within a threshold range from a desired operating temperature. The temperature control may be a component of a sample testing device, such as an interferometer device, the apparatus 2700 and/or apparatus 2800 as described herein, and/or the like, that enables altering of the operational temperature at which the apparatus functions. In this regard, the sample environment may be adjusted such that the light projected through a sample medium (e.g., in a sample channel) is adjusted towards a desired and/or calibrated wavelength. For example, a waveguide may be calibrated for operation at a particular calibrated operating temperature. The tuned operating temperature may be coarsely tuned (e.g., within a threshold range) from the desired operating temperature corresponding to a calibrated operating temperature, such that an exact temperature tuning is not required via the temperature control.

At block 3210, the process 3200 further comprises triggering a light source calibration event associated with a light source. In some embodiments, reference captured interference fringe data may be monitored to determine when the difference in between the stored data and captured data exceeds a predetermined threshold (e.g., the shift in refraction index exceeding a predetermined maximum shift before calibration occurs). Additionally or alternatively, in at least one embodiment, the light source calibration event is triggered upon determination that a predetermined length of time has passed from the setup event and/or a previously triggered light source calibration event. Additionally or alternatively, in at least one embodiment, the light source calibration event is triggered automatically, for example upon initiation of an operation for identifying a sample medium as described herein. Additionally or alternatively, in at least one embodiment, the light source calibration event is initiated after a predetermined and/or variable number of sample medium identification events are initiated.

At block 3212, the process 3200 further comprises capturing reference interference fringe data representing a reference interference fringe pattern in a sample environment, the reference interference pattern projected via the reference channel of the waveguide. The reference interference fringe data may be captured similarly to the calibrated reference interference fringe data as described with respect to block 3204. Due to any of a myriad of effects (passing of time, differences between the calibrated environment and sample environment, degradation of one or more optical components, and/or the like), the projected reference interference pattern may be associated with a different refractive index from that of the pre-calibrated pattern represented by the stored calibration interference data.

At block 3214, the process 3200 further comprises, comparing the reference interference fringe data with the stored calibration interference data to determine a refractive index offset between the reference interference fringe data and the stored calibration interference data. In some embodiments, for example, the reference interference fringe data is processed to derive a first refractive index associated with the first interference fringe pattern represented by the reference interference fringe data. Similarly, in some embodiments for example, the stored calibration interference data is processed to derive a second refractive index associated with the second interference fringe pattern represented by the stored calibration interference fringe data. In this regard, the first refractive index and the second refractive index may be compared to determine the refractive index offset between the two interference fringe patterns. In some such embodiments, the refractive index offset represents the change in the projected reference pattern due to changes in environment (e.g., operating temperature changes from a calibrated temperature to a sample temperature), deterioration of one or more optical and/or hardware device components, changes in the wavelength of the light produced by the light source, and/or the like.

In this regard, in some embodiments, the amount of refractive index offset is a result of the waveguide structural and thermal change. The equivalent length change associated with the refractive index offset may be derived, and/or otherwise calculated, therefrom. Accordingly, in some embodiments, the proportion of the equivalent length change equates to the amount of wavelength proportional change that should be adjusted via tuning of the light source, as described herein, to compensate for the offset.

At block 3216, the process 3200 further comprises tuning the light source based on the refractive index offset. In some embodiments, the light source is tuned to adjust the wavelength of the light output by the light generation component. For example, in at least one embodiment, one or more values associated with operating the light source are tuned, or otherwise adjusted, based on the refractive index offset between the reference interference fringe data and the stored calibration interference data. In this regard, by tuning the light source, the reference interference fringe pattern produced via the reference channel is adjusted to more closely match the calibrated interference fringe pattern represented by the stored calibration interference data. Example operations for tuning the light source are further described herein with respect to FIG. 51.

Figure 51:
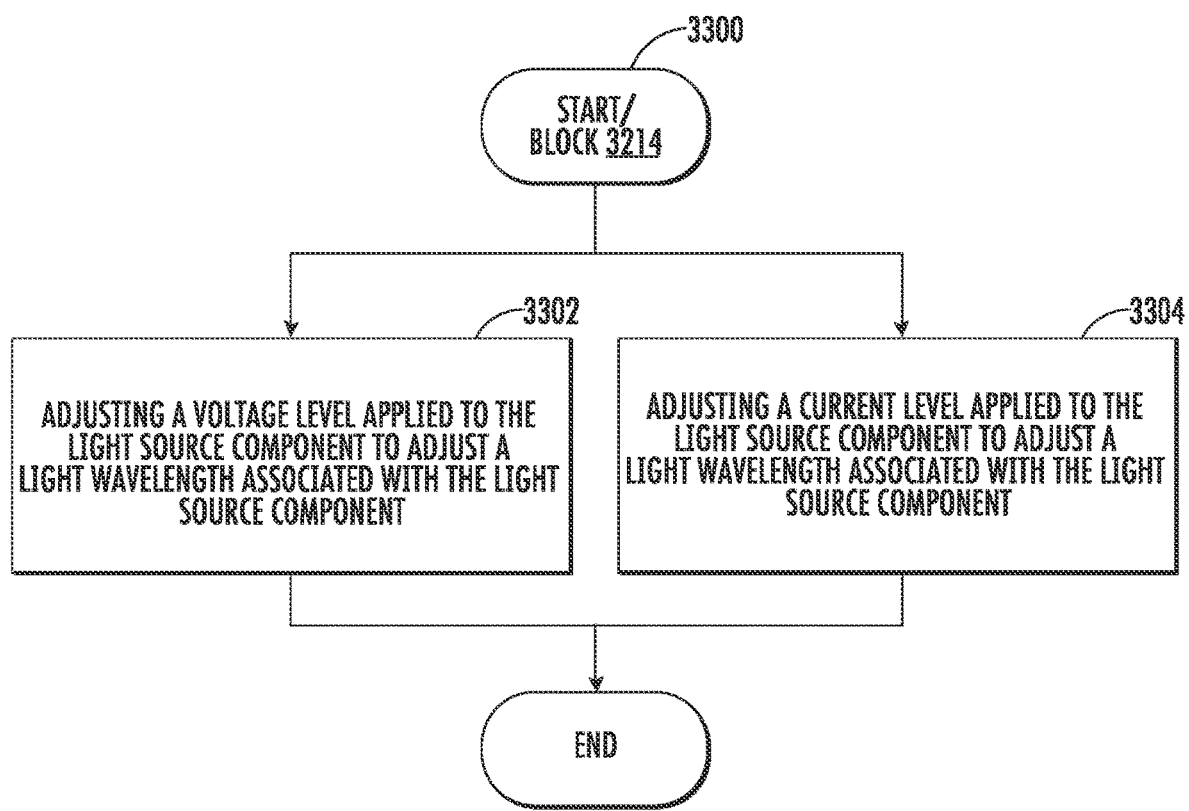
FIG. 51 illustrates an example flowchart illustrating example operations in accordance with various examples of the present disclosure.

FIG. 51 illustrates a flowchart including additional example operations of an example process 3300 for refraction index processing, specifically for tuning a light source, in accordance with at least one example embodiment of the present disclosure. It should be appreciated that the various operations form a process that may be executed via one or more computing devices and/or modules embodied in hardware, software, and/or firmware (e.g., a computer-implemented method). In some embodiments, the process 3300 is performed by one or more apparatus(es), for example the apparatus 2700 and/or 2800 as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 3300 may be stored on one or more non-transitory computer-readable storage mediums of a computer program product, for example for execution via one or more processors associated with, or otherwise in execution with, the non-transitory computer-readable storage medium of the computer program product.

The process 3300 begins at block 3302 and/or block 3304. In some embodiments, the process begins after one or more operations of another process, such as after block 3214 of the process 3200 described herein. Additionally or alternatively, in at least one embodiment, flow returns to one or more operations of another process, such as the process 3200, upon completion of the process illustrated with respect to the process 3300.

At block 3302, the process 3300 includes adjusting a voltage level applied to the light source to adjust a light wavelength associated with the light source. In this regard, by adjusting the voltage level applied to the light source, the light produced by the light source may similarly be altered based on the adjustment amount, for example as depicted and described with respect to FIG. 44. In some embodiments, the voltage level to be applied to the light source is stored in one or more components, such as in a cache, memory device, and/or the like. Alternatively or additionally, in some embodiments, a processor and/or associated module transmits one or more signals to the light source and/or supporting hardware to cause the voltage level applied to the light source to be adjusted. In some such embodiments, an adjustment value (e.g., how much to adjust the voltage level applied to the light source) is determined based on the refractive index offset between the reference interference fringe data and the stored calibration interference data. In this regard, the larger the offset between the two data (e.g., caused by larger changes in operation of the waveguide, and/or associated components), the larger adjustments will be made to attempt to recalibrate the apparatus.

Alternatively or additionally, in some embodiments, the process 3300 begins at block 3304. At block 3304, the process 3300 further comprises adjusting a current level applied to the light source to adjust a light wavelength associated with the light source. In this regard, by adjusting the current level applied to the light source, the light produced by the light source may similarly be altered based on the adjustment amount, for example as depicted and described with respect to FIG. 44. In some embodiments, the current level to be applied to the light source is stored in one or more components for subsequent activations of the light source. In some embodiments, a processor and/or associated module transmits one or more signals to the light source and/or supporting hardware to cause the current level applied to the light source to be adjusted. In some such embodiments, an adjustment value (e.g., how much to adjust the current level applied to the light source) is determined based on the refractive index offset. In this regard, the larger the offset between the two data (e.g., caused by larger changes in operation of the waveguide, and/or associated components), the larger the adjustment that will be made in attempt to recalibrate the apparatus. It should be appreciated that in some embodiments, hardware, software, and/or firmware is included to drive the current level applied to trigger a light source as preferred over other properties, such as voltage, resistance, and/or the like.

It should be appreciated that, in some embodiments, both voltage and current are adjusted to effectuate a change in the wavelength associated with the light source. Accordingly in some embodiments, the process 3300 includes both blocks 3302 and 3304. In other embodiments, adjustments are driven only to one of voltage and/or current to effectuate tuning of the light source.

Some embodiments provided herein are configured for processing interference fringe data to enable sample identification and/or classification, such utilizing one or more statistical and/or machine learning modules, associated with at least one example embodiment herein. In this regard, the features of the interference fringe data representing produced interference fringe patterns may be processed by one or more statistical, machine learning, and/or algorithmic models.

By utilizing statistical, machine learning, and/or algorithmic models, sample identity data (e.g., sample label data and/or statistical information such as one or more confidence score(s) associated therewith) may be determined for an unidentified sample medium utilizing such models. In this regard, such implementations may be utilized even in contexts where other attempted sample identity data determination(s) may not succeed. For example, such image-based classification and/or identification may be utilized even in circumstances where a refractive index change in a sample medium under test may be insufficient to identify such sample identity data.

It should be appreciated that embodiments may include machine learning models, statistical models, and/or other models trained on any one or more of a myriad of types of interference fringe data. For example, in at least one embodiment, a model (e.g., a sample identification model) is trained based on interference fringe data embodying raw representations of captured interference patterns. Alternatively or additionally, in at least one embodiment, a model is trained based on interference fringe data embodying refractive index data, and/or data associated therewith such as a modulation, frequency, and/or phase. The type of data utilized for training may be selected based on one or more factors, such as the specific task to be performed, available training data, and/or the like. In this regard, by receiving interference fringe data, and/or associated input data such as an operational temperature, the model may provide data indicating a statistical closest matching label associated with the input data based on corresponding interference fringe data corresponding to the same or a similar operational temperature.

In some such embodiments, the sample testing device (e.g., a waveguide) is configured to capture interference fringe data associated with a sample medium being tested for purposes of performing identification and/or classification of the sample medium. The captured interference fringe data may further be associated with a known and/or determinable operating temperature and/or wavelength associated with the light produced by the light source. Thus, the captured interference fringe data and/or data derived therefrom, may be input into a trained sample identification model (e.g., embodied by one or more statistical, algorithmic, and/or machine learning model(s)) alone or together with the operating temperature value and/or a determined wavelength to improve generate sample identity data associated with the sample medium.

The trained sample identification model, in some embodiments, is trained on a plurality of data samples associated with known sample identity label (e.g., samples for which a classification is known). In this regard, a training database may be constructed including data, such as interference fringe data, associated with any number of known sample mediums. In at least one example context, the training database is configured to store processed captured representations of interference fringe pattern(s), for example by storing a modulation value, frequency value, and/or phase value to minimize the required storage space while maintaining all raw information available via the interference fringe pattern. In this regard, the raw fringe data may then be inverse reconstructed to the test sample effective temperature-spectral refractive index distribution in the sampled area. Additionally or alternatively, in some embodiments, the training database includes interference fringe data associated with such known sample mediums at various operating temperatures and/or associated with various wavelengths. In this regard, the training database may be used to train the sample identification model(s) to identify any number of sample mediums, and further identify such sample mediums based on interference fringe data associated with varying temperatures and/or wavelengths. In yet other implementations the training database may include any number of additional data types, for example sample density profile, particle count, average size and/or dimensions of sample medium, and/or the like.

In at least one example context, the interference fringe data processing for advanced sample identification methodologies described herein may be used for virus identification, such as to identify novel COVID-19 as distinguished from other viruses. In this regard, a sensing apparatus, such as a waveguide interferometer biosensor described herein, may be used to capture interference fringe data associated with a sample medium (e.g., a virus specimen) under various spectral wavelength and temperature conditions. Collected virus spectral refractive index data may be collected and stored in a training database that is used to refine and/or otherwise train one or more sample identification model(s) to identify different sample identities (e.g., virus types) with high matching accuracy that improves as the collected dataset expands. In this regard, the inverse transform algorithm can be constructed to reconstruct the refractive index change profile in the testing area, and the sample identification model (e.g., a neural network for example) may be used for classification upon training via the collected training database to output determined identity label(s), confidence score(s) associated with such label(s). Such sample identity data associated with a tested unidentified sample medium (e.g., an identity label and/or confidence score(s) in some embodiments) may be displayed to a user for viewing.

Figure 52:
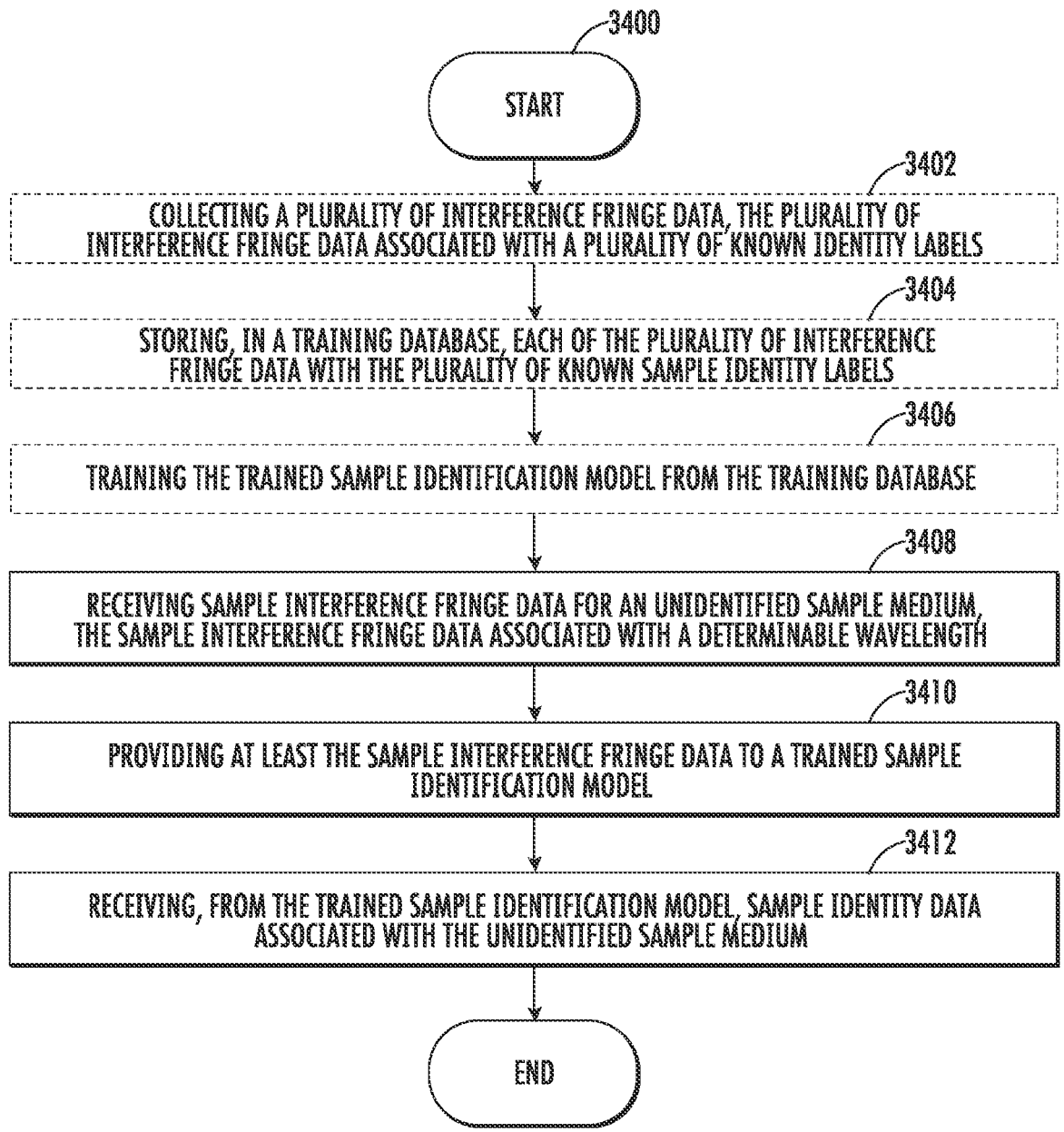
FIG. 52 illustrates an example flowchart illustrating example operations in accordance with various examples of the present disclosure.

FIG. 52 illustrates a flowchart including example operations of an example process 3400 for interference fringe data processing for advanced sample identification, specifically using a trained sample identification module, in accordance with at least one example embodiment of the present disclosure. It should be appreciated that the various operations form a process that may be executed via one or more computing devices and/or modules embodied in hardware, software, and/or firmware (e.g., a computer-implemented method). In some embodiments, the process 3400 is performed by one or more apparatus(es), for example the apparatus 2700 and/or 2800 as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 3400 may be stored on one or more non-transitory computer-readable storage mediums of a computer program product, for example for execution via one or more processors associated with, or otherwise in execution with, the non-transitory computer-readable storage medium of the computer program product.

The process 3400 begins at block 3402. At block 3402, the process 3400 comprises collecting a plurality of interference fringe data, the plurality of interference fringe data associated with a plurality of known identity labels. In this regard, a sample testing device, such as the apparatus 2700 or 2800 described herein, may be utilized to produce an interference fringe pattern for a sample medium having a known identity (e.g., associated with a known identity label). The captured interference fringe data may be stored locally, and/or transmitted to another system (such as an external server) over a wired and/or wireless communicate network for storage and/or processing of the data. For example, in some embodiments the captured interference fringe data is transmitted over a wireless communication network (e.g., the Internet) accessible to the sample testing device for storage in a central database server together with sample identity data (e.g., a known identity label) provided by the user. In this manner, the collected interference fringe data each correspond to sample identity data, such as a known identity label, that the user knows to be correct. Thus, such data may be used for purposes of training one or more model(s) with statistical certainty. The central database server may be further configured to train one or more models based on such data, and/or communicate with another server, device, system, and/or the like that is configured for performing such model training. The server, device, system, and/or the like that performs the model training may additionally or alternatively be configured to provide the trained model for use by a sample testing device and/or associated processing apparatus, for example the apparatuses 2700 and/or 2800. It should be appreciated that as the number of collected interference fringe data increases, the model(s) trained on such data are likely to operate with improved accuracy as opposed to training with small data sets.

At block 3404, the process 3400 further comprises storing, in a training database, each of the plurality of interference fringe data with the plurality of known sample identity labels. In this regard, each interference fringe data, and/or data derived therefrom (e.g., that represents the interference fringe data) may be stored to the training database with an additional data value embodying the known identity label. Thus, each data record stored in the training database may be retrieved together with the corresponding correct identity label for the associated sample medium. In some embodiments, each of the plurality of interference fringe data is also stored together with a corresponding wavelength for the light utilized to generate a corresponding interference fringe pattern, and/or a sample temperature at which the projection of the interference fringe pattern and subsequent capturing occurred.

At block 3406, the process 3400 further comprises training the trained sample identification model from the training database. In this regard, training may involve fitting a sample identification model to the data represented in the training database. It should be appreciated that such operations may include segmenting the training database into one or more subgroupings of data, for example a training set and one or more test sets, and/or the like. Accordingly, upon completion of training the model, the trained sample identification model is configured to generate identity label data for newly provided interference fringe data, wavelength, and/or temperature, such as for an unidentified sample medium. The trained sample identification model may be stored on and/or otherwise made accessible to the sample testing device for use in identifying and/or otherwise classifying unidentified sample medium(s).

It should be appreciated that blocks 3402-3406 embody a sub-process for training a trained sample identification. Accordingly, such blocks may be performed alone or in conjunction with the remaining blocks depicted and described with respect to process 3400.

At block 3408, the process 3400 further comprises receiving sample interference fringe data for an unidentified sample medium, the sample interference fringe data associated with a determinable wavelength. In some such embodiments, the interference fringe data embodies a captured representation of an interference fringe pattern produced by light of the determinable wavelength, for example via a waveguide and/or other sample testing device. In some embodiments, the determinable wavelength may be determined based on communication with the light source and/or one or more associated components (e.g., a processor and/or associated module configured for controlling the light source) as described herein. As described, in some such embodiments, the interference fringe data is captured by one or more imaging component(s) associated with the projected interference fringe pattern. Additionally or alternatively, in some embodiments, the interference fringe data is received from another associated system, loaded from a database embodied on a local and/or remote memory device, and/or the like. In some embodiments, the interference fringe data is similarly associated with an operational temperature for the waveguide and/or unidentified sample medium during capture of the interference fringe data.

At block 3410, the process 3400 further comprises providing at least the sample interference fringe data to a trained sample identification model. At block 3412, the process 3400 further comprises receiving, from the trained sample identification model, sample identity data associated with the unidentified sample medium. In this regard, the trained sample identification model is configured to generate the sample identity data based on processing the sample interference fringe data. It should be appreciated that, in this regard, the trained sample identification model may analyze various features embodied in the data, and determine sample identity data and/or statistical information associated therewith that is most likely for the unidentified sample. For example, in at least one example embodiment, the trained sample identification model generates and/or otherwise outputs sample identity data comprising a sample identity label for a most likely classification (e.g., associated with the highest statistical probability) for the unidentified sample medium. In at least one example embodiment, the trained sample identification model generates and/or otherwise outputs statistical sample identity data representing a likelihood that the unidentified sample medium corresponds to each of one or more sample identity labels. For example, in the context of virus classification, the statistical sample identity data may comprise a first likelihood of a virus sample being an influenza virus based on the corresponding interference fringe data as opposed to a common cold virus. It should be appreciated that, in some embodiments, the trained sample identification model is provided the sample interference fringe data and additional data, for example operational temperature data as described herein. In at least one example embodiment, the trained sample identification model comprises a deep neural network. In some example embodiments, the trained sample identification model comprises a convolutional neural network.

Figure 53:
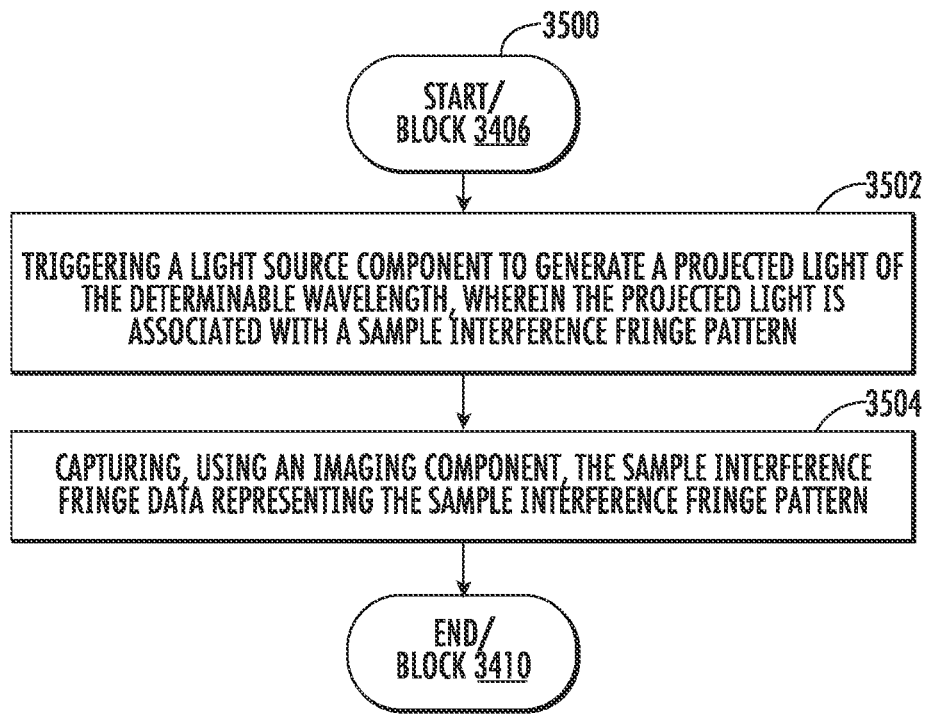
FIG. 53 illustrates an example flowchart illustrating example operations in accordance with various examples of the present disclosure.

FIG. 53 illustrates a flowchart including additional example operations of an example process 3500 for interference fringe data processing for advanced sample identification, specifically for receiving at least the interference fringe data associated with a determinable wavelength for an unidentified sample medium, in accordance with at least one example embodiment of the present disclosure. It should be appreciated that the various operations form a process that may be executed via one or more computing devices and/or modules embodied in hardware, software, and/or firmware (e.g., a computer-implemented method). In some embodiments, the process 3500 is performed by one or more apparatus(es), for example the apparatus 2700 and/or 2800 as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 3500 may be stored on one or more non-transitory computer-readable storage mediums of a computer program product, for example for execution via one or more processors associated with, or otherwise in execution with, the non-transitory computer-readable storage medium of the computer program product.

As illustrated, the process 3500 begins at block 3502. In some embodiments, the process begins after one or more operations of another process, such as after block 3406 of the process 3400 as described herein. Additionally or alternatively, in at least one embodiment, flow returns to one or more operations of another process, such as the process 3400, upon completion of the process illustrated with respect to the process 3500. For example, as illustrated, in some embodiments, flow returns to block 3410 upon completion of block 3504.

As illustrated, process 3500 begins at block 3502. At block 3502, the process 3500 comprises triggering a light source to generate a projected light of the determinable wavelength, wherein the projected light is associated with a sample interference fringe pattern. In this regard, the sample interference fringe pattern is associated with the unidentified sample. In some embodiments, the light source is triggered based on a drive current, or drive voltage, to cause the light source to produce the light of the determinable wavelength. In some embodiments, the projected light is manipulated through one or more optical components, for example components of a waveguide or other sample testing device, to produce the sample interference fringe pattern from the projected light. In some embodiments, a processor and/or associated module of a sensing apparatus as described herein is configured to generate one or more signals to cause triggering of the light source to the appropriate determinable wavelength.

At block 3504, the process 3500 includes capturing, using an imaging component, the sample interference fringe data representing the sample interference fringe pattern associated with the determinable wavelength. In this regard, the sample interference fringe pattern is dependent on the determinable wavelength, such that the captured data represents a specific interference pattern corresponding to the determinable wavelength. In some embodiments, the imaging component is included in and/or otherwise associated with a sample testing device, waveguide, and/or the like, for example as described herein. In this regard, the imaging component may be triggered by one or more processor(s) and/or associated module(s) associated therewith, for example as described herein. The captured sample interference fringe data may subsequent be input into the trained sample identification module for purposes of identifying and/or otherwise classifying the unidentified sample.

Figure 54:
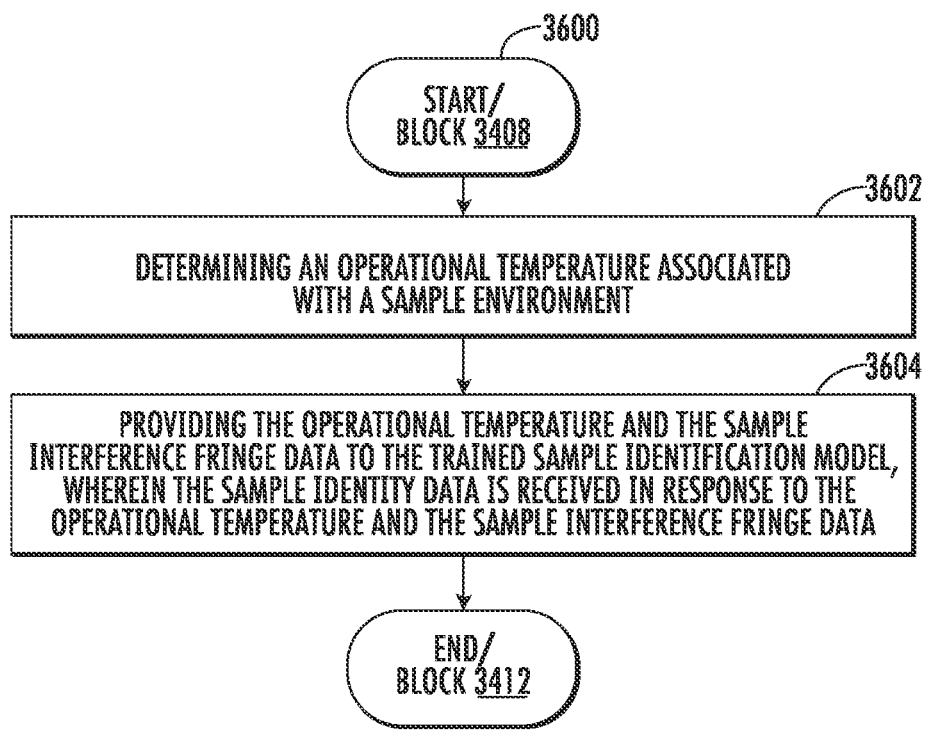
FIG. 54 illustrates an example flowchart illustrating example operations in accordance with various examples of the present disclosure.

FIG. 54 illustrates a flowchart including additional example operations of an example process 3600 for interference fringe data processing for advanced sample identification, specifically for generating sample identity data based on at least sample interference fringe data and an operational temperature, in accordance with at least one example embodiment of the present disclosure. It should be appreciated that the various operations form a process that may be executed via one or more computing devices and/or modules embodied in hardware, software, and/or firmware (e.g., a computer-implemented method). In some embodiments, the process 3600 is performed by one or more apparatus(es), for example the apparatus 2700 and/or 2800 as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 3600 may be stored on one or more non-transitory computer-readable storage mediums of a computer program product, for example for execution via one or more processors associated with, or otherwise in execution with, the non-transitory computer-readable storage medium of the computer program product.

As illustrated, the process 3600 begins at block 3602. In some embodiments, the process begins after one or more operations of another process, such as after block 3408 of the process 3400 as described herein. Additionally or alternatively, in at least one embodiment, flow returns to one or more operations of another process, such as the process 3400, upon completion of the process illustrated with respect to the process 3600. For example, as illustrated, in some embodiments, flow returns to block 3412 upon completion of block 3604.

As illustrated, process 3600 begins at block 3602. At block 3602, the process 3600 comprises determining an operational temperature associated with a sample environment. In some embodiments, the sample environment comprises a defined sample channel within which the unidentified sample medium is located for testing (e.g., for identification purposes), and/or through which light is projected. In some embodiments, the operational temperature is monitored and/or otherwise determined using temperature monitoring device(s), such as one or more temperature monitoring hardware devices. It should be appreciated that the operational temperature may be read from such temperature monitoring devices for purposes of determining the operational temperature associated with the sample environment, and/or otherwise associated with the sample medium, during testing of the unidentified sample medium. In other embodiments, the operational temperature is predetermined. In yet other embodiments, the sample environment may include an operational temperature associated with the entirety of a sample testing device, waveguide, associated apparatus such as the apparatus 2700 or 2800, and/or the like. It should be appreciated that, in some embodiments, temperature sensors associated with a sample testing device, waveguide, and/or the like may be utilized for monitoring and/or otherwise controlling the operational temperature for testing sample mediums as described herein.

At block 3604, the process 3600 further comprises providing the operational temperature and the sample interference fringe data to the trained sample identification model, wherein the sample identity data is received in response to the operational temperature and the sample interference fringe data. In this regard, the trained sample identification model may be configured to generate and/or otherwise output sample identity data for the unidentified sample based on such input data. Thus, the trained sample identification model is configured to accurately output sample identity label(s), and/or statistical information associated therewith, for individual unidentified sample medium(s) while accounting for shifts in the interference fringe pattern associated with changes in the operating temperature of the sample environment. In other embodiments, as described herein, the trained sample identification model may be trained to further receive one or more additional input data elements, such as a wavelength associated with the sample interference fringe data, and/or the like.

Bi-modal waveguide interferometer sensors may have the advantage of high sensitivity and low manufacturing process requirement, and silicon wafer process may be implemented to mass produce bi-modal interferometer sensors. However, many bi-modal interferometer fringe analysis based on bi-modal interferometer sensors may have limitations. For example, bi-modal interferometer fringe analysis based on ratio of fringe shift fail to provide accurate results.

In accordance with various embodiments of the present disclosure, an enhanced bi-modal waveguide interferometer fringe pattern analysis process may be provided, where the enhanced analysis process may include additional feature extractions. For example, instead of calculating ratio of amplitudes sampled at two side of the fringe pattern, the enhanced analysis process may use statistical metrics to extract pattern amplitude (sum), pattern center shift amount (mean), pattern distribution width (standard deviation), pattern profile non-symmetricity (skewness), and/or pattern distribution outliers (kurtosis). The enhanced analysis process may increase the bi-modal interferometer sensitivity by detecting detailed differences among the test sample and reference media.

Figure 55:
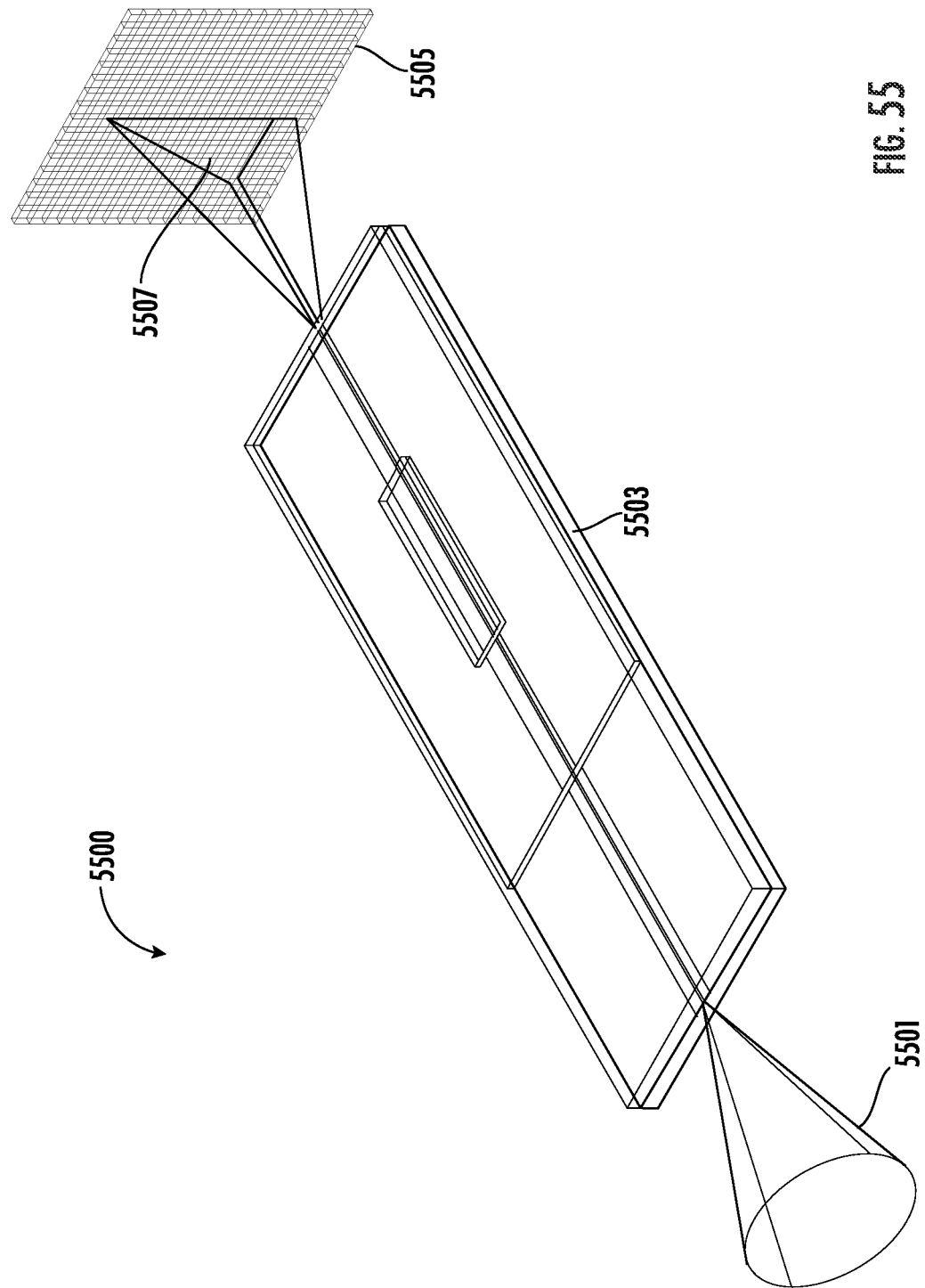
FIG. 55 illustrates an example infrastructure in accordance with various examples of the present disclosure.

Referring now to FIG. 55, an example diagram illustrating an example infrastructure 5500 is shown.

In the example shown in FIG. 55, a light source 5501 may provide light to the sample testing device 5503. In some examples, the light source 5501 may be configured to produce, generate, emit, and/or trigger the production, generation, and/or emission of light. The example light source 5501 may include, but is not limited to, laser diodes (for example, violet laser diodes, visible laser diodes, edge-emitting laser diodes, surface-emitting laser diodes, and/or the like. In some examples, the light source 5501 may be configured to generate light having a spectral purity within a predetermined threshold. For example, the light source 5501 may comprise a laser diode that may generate a single-frequency laser beam. Additionally, or alternatively, the light source 5501 may be configured to generate light that having variances in spectral purity. For example, the light source 5501 may comprise a laser diode that may generate a wavelength-tunable laser beam. In some examples, the light source 5501 may be configured to generate light having a broad optical spectrum.

In some embodiments, the sample testing device 5503 may comprise a waveguide (for example, bi-modal waveguide). As light travels through the sample testing device 5503, an interferometric fringe pattern may be generated at the output end of the sample testing device 5503 as described herein. In the example shown in FIG. 55, an area imaging component 5505 may be arranged at the output end of the sample testing device 5503 to directly capture the image 5507 of the interferometric fringe pattern to generate interference fringe data.

In accordance with various examples of the present disclosure, the interference fringe data and the interferometric fringe pattern may be analyzed with statistical process to obtain one or more statistical metrics. Example statistical metrics may include, but not limited to, a sum associated with the interference fringe data/interferometric fringe pattern, a mean associated with the interference fringe data/interferometric fringe pattern, a standard deviation associated with the interference fringe data/interferometric fringe pattern, a skewness associated with the interference fringe data/interferometric fringe pattern, and/or a Kurtosis value associated with the interference fringe data/interferometric fringe pattern. By comparing these statistical metrics associated with an unidentified sample medium to statistical metrics associated with an identified reference medium, the identity of the unidentified sample medium may be determined, and the result may have higher accuracy with higher confidence level.

Figure 56:
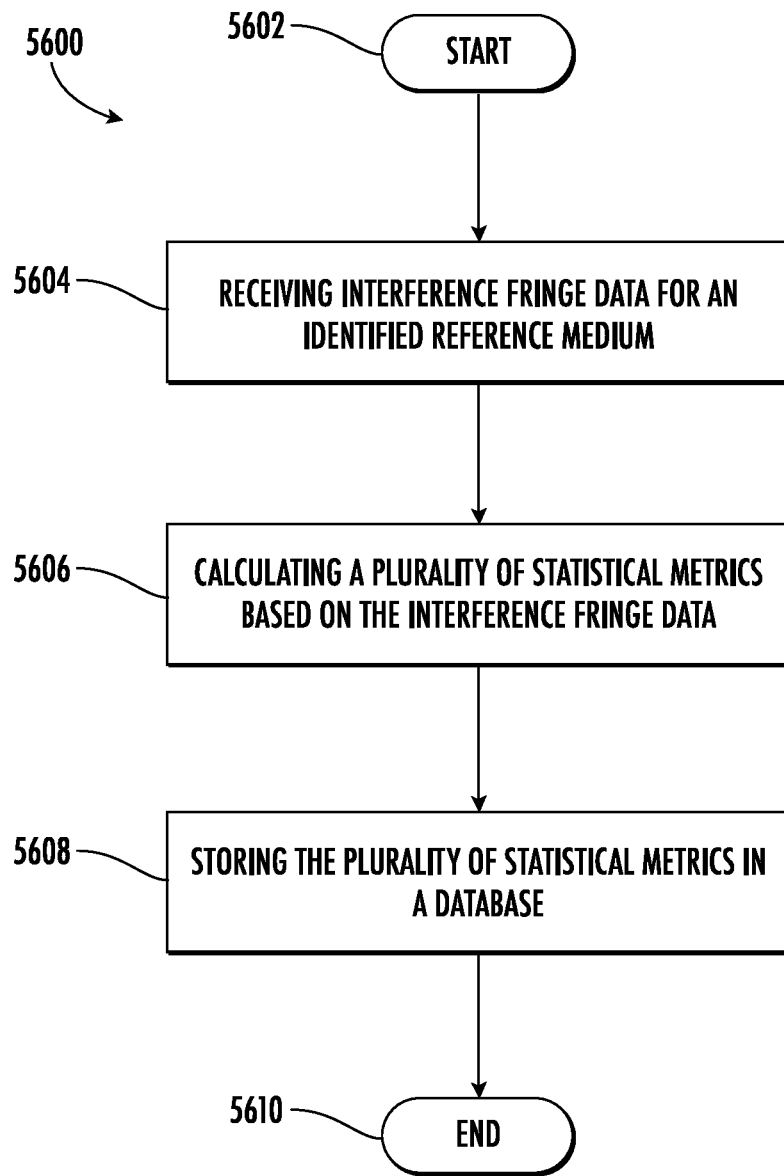
FIG. 56 illustrates an example flowchart in accordance with various examples of the present disclosure.
Figure 57:
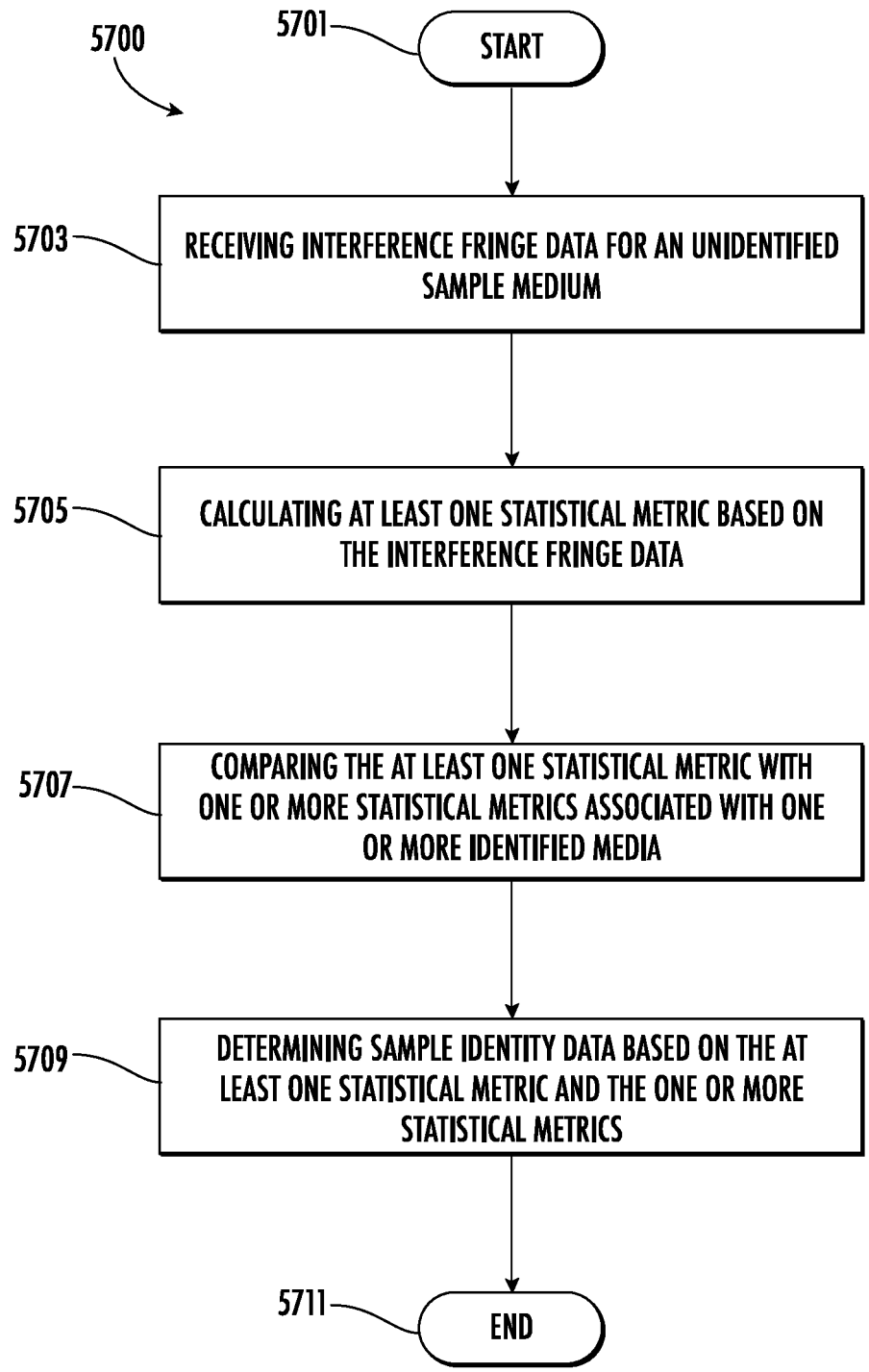
FIG. 57 illustrates an example flowchart in accordance with various examples of the present disclosure.
Figure 58:
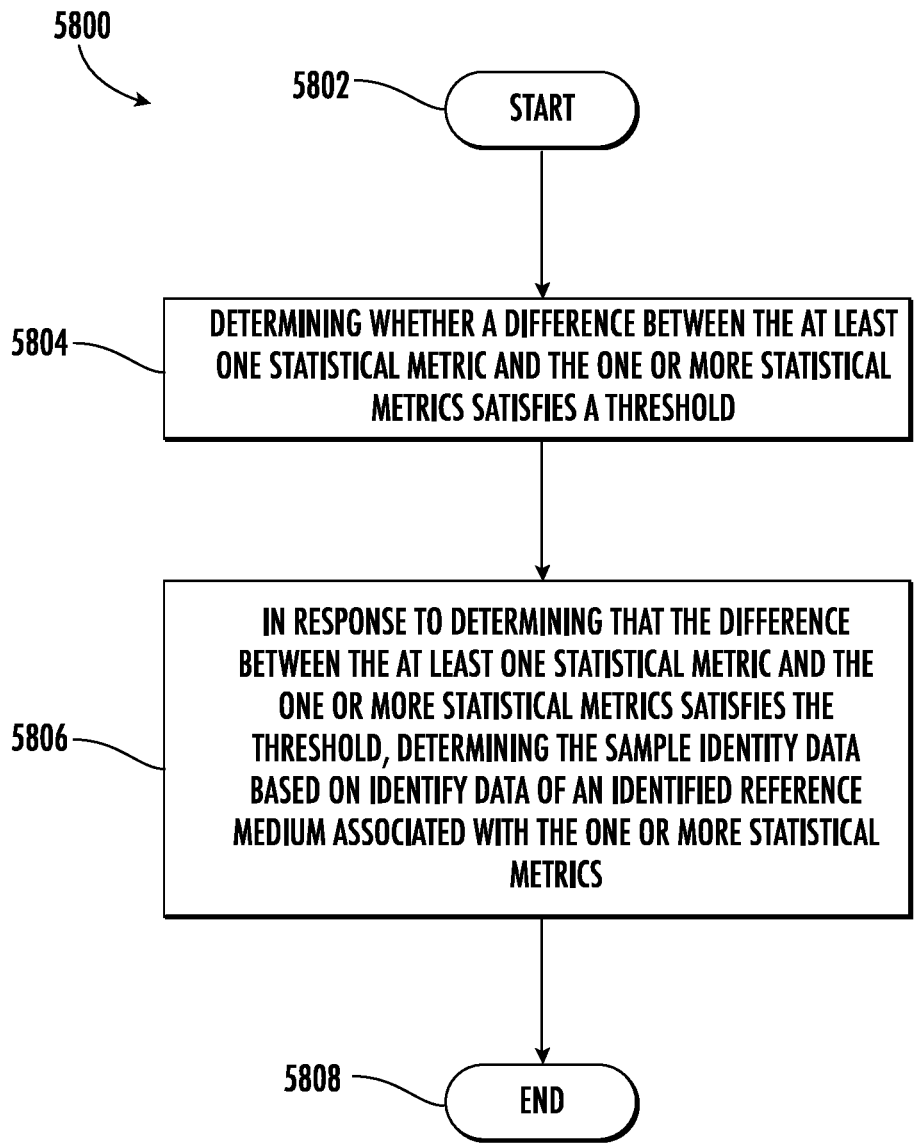
FIG. 58 illustrates an example flowchart in accordance with various examples of the present disclosure.

Referring now to FIG. 56, FIG. 57, and FIG. 58, various example methods associated with examples of the present disclosure are illustrated.

Referring now to FIG. 56, the example process 5600 may start at block 5602.

At block 5604, the process 5600 may comprise receiving interference fringe data for an identified reference medium.

In some embodiments, the interference fringe data embodies a captured representation of an interference fringe pattern produced by light and via a sample testing device in accordance with embodiments of the present disclosure (for example, a waveguide). In some embodiments, the fringe data is captured by one or more imaging component(s) associated with the projected interference fringe pattern. Additionally or alternatively, in some embodiments, the interference fringe data is received from another associated system, loaded from a database embodied on a local and/or remote memory device, and/or the like.

The interference fringe data, in some embodiments, may be used to derive one or more statistical metrics, as described herein.

At block 5606, the process 5600 may comprise calculating a plurality of statistical metrics based on the interference fringe data.

In some embodiments, the process 5600 may comprise calculating a sum associated with the interference fringe data. The sum may represent the area under the pattern distribution (for example, a total energy received as the result of the optical efficiency).

In some embodiments, the process 5600 may comprise calculating a mean associated with the interference fringe data. The mean may represent a center shift of the pattern. For example, the mean may represent the total path length difference between two modes of the waveguide that is introduced by the refractive index change.

In some embodiments, the process 5600 may comprise calculating a standard deviation associated with the interference fringe data. The standard deviation may represent a width of the pattern, including variation of the refractive index over the sample area.

In some embodiments, the process 5600 may comprise calculating a skewness associated with the interference fringe data. The skewness may represent a symmetry of the pattern, including any additional sample response difference under two modes of the waveguide.

In some embodiments, the process 5600 may comprise calculating a Kurtosis value associated with the interference fringe data. The Kurtosis value may represent the shape of the pattern and identify extra outlier of the sample response (for example, the degree of the shape being tall or flat).

At block 5608, the process 5600 may comprise storing the plurality of statistical metrics in a database.

At block 5610, the process 5600 ends.

Referring now to FIG. 57, the example process 5700 may start at block 5701.

At block 5703, the process 5700 may comprise receiving interference fringe data for an unidentified sample medium.

In some embodiments, the interference fringe data embodies a captured representation of an interference fringe pattern produced by light and via a sample testing device in accordance with embodiments of the present disclosure (for example, a waveguide). In some embodiments, the fringe data is captured by one or more imaging component(s) associated with the projected interference fringe pattern. Additionally or alternatively, in some embodiments, the interference fringe data is received from another associated system, loaded from a database embodied on a local and/or remote memory device, and/or the like.

At block 5705, the process 5700 may comprise calculating at least one statistical metric based on the interference fringe data.

In some embodiments, the process 5700 may comprise calculating a sum associated with the interference fringe data. The sum may represent the area under the pattern distribution (for example, a total energy received as the result of the optical efficiency).

In some embodiments, the process 5700 may comprise calculating a mean associated with the interference fringe data. The mean may represent a center shift of the pattern. For example, the mean may represent the total path length difference between two modes of the waveguide that is introduced by the refractive index change.

In some embodiments, the process 5700 may comprise calculating a standard deviation associated with the interference fringe data. The standard deviation may represent a width of the pattern, including variation of the refractive index over the sample area.

In some embodiments, the process 5700 may comprise calculating a skewness associated with the interference fringe data. The skewness may represent a symmetry of the pattern, including any additional sample response difference under two modes of the waveguide.

In some embodiments, the process 5700 may comprise calculating a Kurtosis value associated with the interference fringe data. The Kurtosis value may represent the shape of the pattern and identify extra outlier of the sample response (for example, the degree of the shape being tall or flat).

At block 5707, the process 5700 may comprise comparing the at least one statistical metric with one or more statistical metrics associated with one or more identified media.

For example, the process 5700 may comprise comparing the sum associated with the interference fringe data for the unidentified sample medium with one or more sums, each associated with the interference fringe data for an identified reference medium, and calculating one or more differences. The process 5700 may comprise determining whether each of the differences satisfies a threshold, details of which are described in connection with at least FIG. 58.

Additionally, or alternatively, the process 5700 may comprise comparing the mean associated with the interference fringe data for the unidentified sample medium with one or more means, each associated with the interference fringe data for an identified reference medium, and calculating one or more differences. The process 5700 may comprise determining whether each of the differences satisfies a threshold, details of which are described in connection with at least FIG. 58.

Additionally, or alternatively, the process 5700 may comprise comparing the standard deviation associated with the interference fringe data for the unidentified sample medium with one or more standard deviations, each associated with the interference fringe data for an identified reference medium, and calculating one or more differences. The process 5700 may comprise determining whether each of the differences satisfies a threshold, details of which are described in connection with at least FIG. 58.

Additionally, or alternatively, the process 5700 may comprise comparing the skewness associated with the interference fringe data for the unidentified sample medium with one or more skewnesses, each associated with the interference fringe data for an identified reference medium, and calculating one or more differences. The process 5700 may comprise determining whether each of the differences satisfies a threshold, details of which are described in connection with at least FIG. 58.

Additionally, or alternatively, the process 5700 may comprise comparing the Kurtosis value associated with the interference fringe data for the unidentified sample medium with one or more Kurtosis values, each associated with the interference fringe data for an identified reference medium, and calculating one or more differences. The process 5700 may comprise determining whether each of the differences satisfies a threshold, details of which are described in connection with at least FIG. 58.

Additionally, or alternatively, other statistical metrics may be used.

At block 5709, the process 5700 may comprise determining sample identity data based on the at least one statistical metric and the one or more statistical metrics.

In some embodiments, the sample identity data may provide an identity of the unidentified sample medium (for example, a type of virus in the sample medium). In some embodiments, the sample identity data may be determined based on the difference(s) values between statistical metrics associated with the interference fringe data for the unidentified sample medium and one or more statistical metrics, each associated with the interference fringe data for an identified reference medium, details of which are described in connection with at least FIG. 58.

At block 5711, the process 5700 ends.

Referring now to FIG. 58, the example process 5800 may start at block 5802.

At block 5804, the process 5800 may comprise determining whether a difference between the at least one statistical metric and the one or more statistical metrics satisfies a threshold.

For example, the process 5800 may comprise determining whether the difference between a sum associated with the unidentified sample medium and a sum associated with an identified reference medium satisfies a threshold. For example, the threshold may be a predetermined value based on the error toleration of the system, and the difference satisfies the threshold when the difference is less than the threshold.

Additionally, or alternatively, the process 5800 may comprise determining whether the difference between a mean associated with the unidentified sample medium and a mean associated with an identified reference medium satisfies a threshold. For example, the threshold may be a predetermined value based on the error toleration of the system, and the difference satisfies the threshold when the difference is less than the threshold.

Additionally, or alternatively, the process 5800 may comprise determining whether the difference between a standard deviation associated with the unidentified sample medium and a standard deviation associated with an identified reference medium satisfies a threshold. For example, the threshold may be a predetermined value based on the error toleration of the system, and the difference satisfies the threshold when the difference is less than the threshold.

Additionally, or alternatively, the process 5800 may comprise determining whether the difference between a skewness associated with the unidentified sample medium and a skewness associated with an identified reference medium satisfies a threshold. For example, the threshold may be a predetermined value based on the error toleration of the system, and the difference satisfies the threshold when the difference is less than the threshold.

Additionally, or alternatively, the process 5800 may comprise determining whether the difference between a Kurtosis value associated with the unidentified sample medium and a Kurtosis value associated with an identified reference medium satisfies a threshold. For example, the threshold may be a predetermined value based on the error toleration of the system, and the difference satisfies the threshold when the difference is less than the threshold.

Additionally, or alternatively, the other statistical metrics may be used.

At block 5806, the process 5800 may comprise determining the sample identity data based on identify data of an identified reference medium associated with the one or more statistical metrics in response to determining that the difference between the at least one statistical metric and the one or more statistical metrics satisfies the threshold.

For example, if the difference between the sum of the unidentified sample medium and the sum of reference medium A satisfies its corresponding threshold, the process 5800 may comprise determining that the unidentified sample medium is associated with reference medium A (for example, the unidentified sample medium has the same type of virus as the reference medium A).

Additionally, or alternatively, if the difference between the mean of the unidentified sample medium and the mean of reference medium A satisfies its corresponding threshold, the process 5800 may comprise determining that the unidentified sample medium is associated with reference medium A (for example, the unidentified sample medium has the same type of virus as the reference medium A).

Additionally, or alternatively, if the difference between the standard deviation of the unidentified sample medium and the standard deviation of reference medium A satisfies its corresponding threshold, the process 5800 may comprise determining that the unidentified sample medium is associated with reference medium A (for example, the unidentified sample medium has the same type of virus as the reference medium A).

Additionally, or alternatively, if the difference between the skewness of the unidentified sample medium and the skewness of reference medium A satisfies its corresponding threshold, the process 5800 may comprise determining that the unidentified sample medium is associated with reference medium A (for example, the unidentified sample medium has the same type of virus as the reference medium A).

Additionally, or alternatively, if the difference between the Kurtosis value of the unidentified sample medium and the Kurtosis value of reference medium A satisfies its corresponding threshold, the process 5800 may comprise determining that the unidentified sample medium is associated with reference medium A (for example, the unidentified sample medium has the same type of virus as the reference medium A).

In some examples, the process 5800 may comprise determining that more than one difference satisfies its corresponding threshold. In such examples, the process 5800 may determine the identity data based on the reference medium associated with the greatest number of statistical metrics that satisfy the threshold. For example, if three of the differences between statistical metrics of the unidentified sample medium and statistical metrics of reference medium A satisfy their corresponding thresholds, while four of the differences between statistical metrics of the unidentified sample medium and statistical metrics of reference medium B satisfy their corresponding thresholds, the process 5800 may determine that the unidentified sample medium is associated with reference medium B.

At block 5808, the process 5800 ends.

It is noted that the scope of the present disclosure is not limited to those described above. In some embodiments of the present disclosure, features from various figures may be substituted and/or combined. For example, the statistical metrics described in connection with FIG. 55 to FIG. 58 may be used in connection with the example processes described above in connection with FIG. 47 to FIG. 54. As an example, the statistical metric may be used to train a sample identification model described above in connection with FIG. 52.

Fluid virus detection may either require complicated operation (such as lab test) or suffer from slow response time or limited sensitivity (such as paper based test). There is a need for a simple, quick, and accurate clinic or public use fluid virus sensor.

In accordance with various embodiments of the present disclosure, an universal fluid virus sensor is provided. The universal fluid virus sensor may optically sense the fluid refractive index change based on immunoassay. The miniature apparatus with disposable-reusable sensor cartridge may report the result in minutes.

Figure 59:
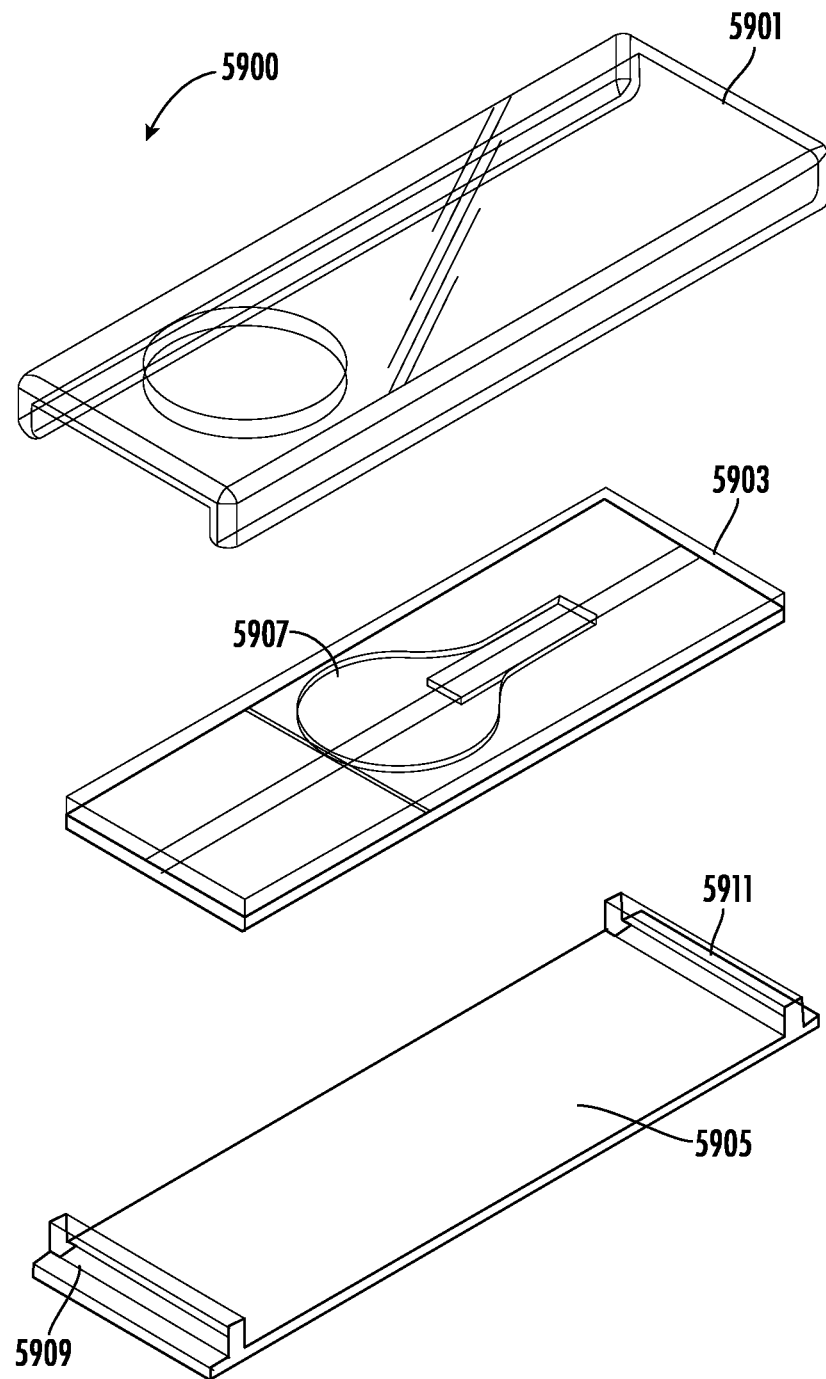
FIG. 59 illustrates an example exploded view of an example sensor cartridge in accordance with various examples of the present disclosure.

Referring now to FIG. 59, an example exploded view of an example sensor cartridge 5900 is provided. In the example shown in FIG. 59, the example sensor cartridge 5900 may comprise a cover layer 5901, a waveguide 5903, and a substrate layer 5905.

Similar to various examples described herein, the waveguide 5903 may comprise a sample opening 5907 on a first surface. Similar to various the sample openings described herein, the sample opening 5907 may be configured to receive a sample medium.

Similar to various examples described herein, the cover layer 5901 may be coupled to the waveguide 5903. In some examples, the coupling between the cover layer 5901 and the waveguide 5903 may be implemented via at least one sliding mechanism. For example, the cross-section of the cover layer 5901 may be in a shape similar to the letter "n." Sliding guards may be attached to an inner surface of each leg of cover layer 5901, and corresponding rail tracks may be attached on one or more side surfaces of the waveguide 5903. As such, the cover layer 5901 may slide between a first position and a second position as defined by the sliding guards and the rail tracks, details of which are shown in FIG. 60A, FIG. 60B, FIG. 61A, and FIG. 61B.

Referring back to FIG. 59, the waveguide 5903 may be securely fastened to the substrate layer 5905. For example, the waveguide 5903 may comprise an input window 5909 and an output window 5911. Each of the input window 5909 and the output window 5911 is in the form of a rib protruding from the surface of the substrate layer 5905. The waveguide 5903 may be snap fitted between the input window 5909 and the output window 5911, and light may travel into the waveguide 5903 through the input window 5909 and exit from the output window 5911. As such, the input window 5909 and the output window 5911 may each provide optically clear path for the light to travel.

In some embodiments, the substrate layer 5905 may comprise thermally conductive material for temperature sensing and control. For example, the substrate layer 5905 may comprise glass material. Additionally, or alternatively, the substrate layer 5905 may comprise other material(s).

In some embodiments, the example sensor cartridge 5900 may have a length of 1.3 inches, a width of 0.4 inches, and a height of 0.1 inches. In some embodiments, the size(s) of the example sensor cartridge 5900 may be of other value(s).

Figure 60A:
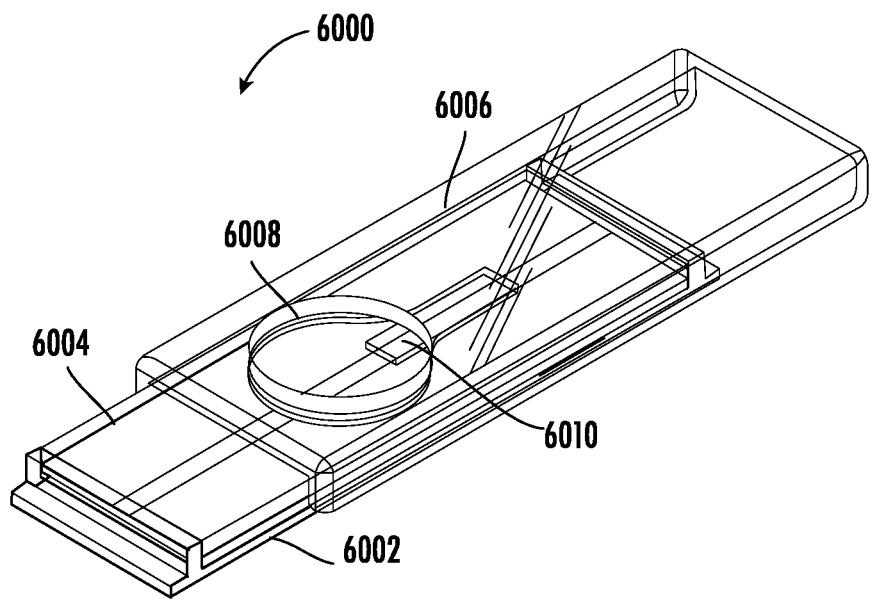
FIG. 60A illustrates an example view of an example sensor cartridge in accordance with various examples of the present disclosure.
Figure 60B:
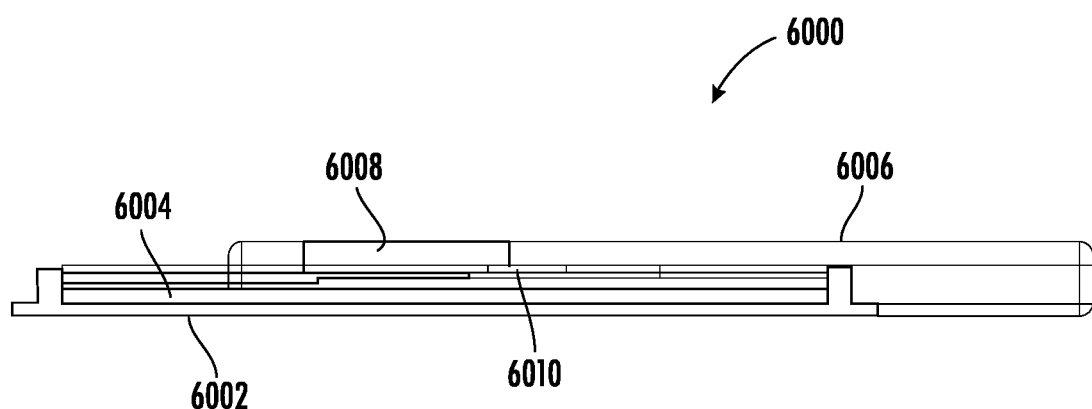
FIG. 60B illustrates an example view of an example sensor cartridge in accordance with various examples of the present disclosure.

Referring now to FIG. 60A and FIG. 60B, example views of an example sensor cartridge 6000 is provided. In particular, the example sensor cartridge 6000 comprises a cover layer 6006, a waveguide 6004, and a substrate layer 6002, similar to those describe above.

In the example shown in FIG. 60A and FIG. 60B, the cover layer 6006 is at the first position (e.g. an "open position"). As shown, when the cover layer 6006 is at the first position, the opening 6008 of the cover layer 6006 may overlap with the opening 6010 of the waveguide 6004. As described above, the waveguide 6004 may comprise antibody for attracting molecules in the sample medium and/or comprise reference medium for temperature control. The opening 6008 accepts the sample medium to be tested, such as buffered saliva, nasal swab, and throat swab.

Figure 61A:
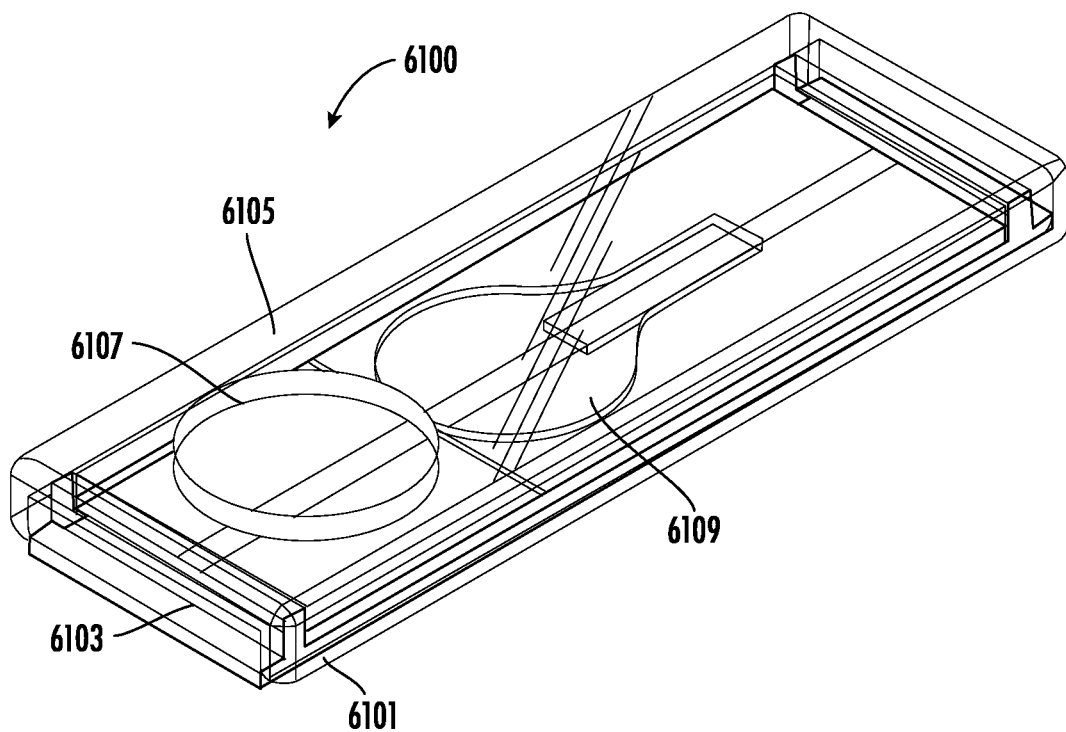
FIG. 61A illustrates an example view of an example sensor cartridge in accordance with various examples of the present disclosure.
Figure 61B:
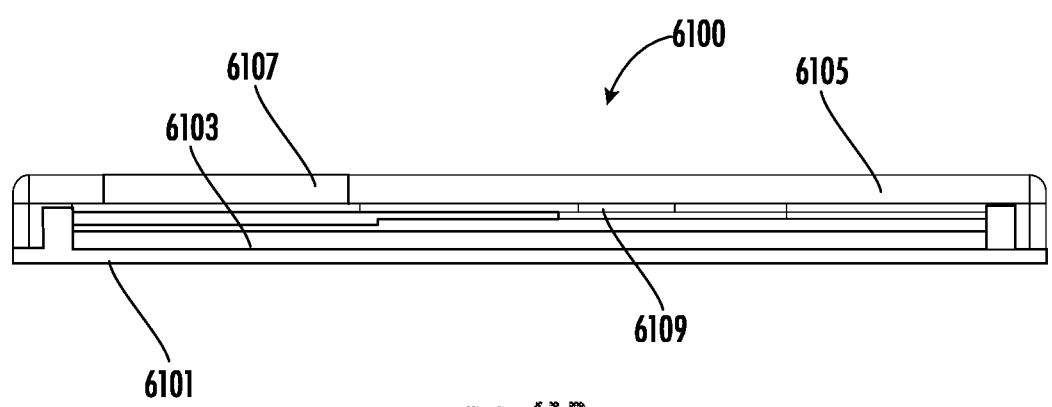
FIG. 61B illustrates an example view of an example sensor cartridge in accordance with various examples of the present disclosure.

Referring now to FIG. 61A and FIG. 61B, example view of an example sensor cartridge 6100 is provided. In particular, the example sensor cartridge 6100 comprises a cover layer 6105, a waveguide 6103, and a substrate layer 6101, similar to those describe above.

In the example shown in FIG. 61A and FIG. 61B, the cover layer 6105 is at the second position (e.g. a "closed position"). As shown, when the cover layer 6105 is at the second position, the opening 6107 of the cover layer 6105 may not overlap with the opening 6109 of the waveguide 6103.

In some embodiments, the example sensor cartridge 6100, in a closed position, may be inserted into a slot of an analyzer apparatus, details of which are described herein.

Referring now to FIG. 62, an example view 6200 is shown. In particular, the example view 6200 illustrates an example sensor cartridge 6202 and an analyzer apparatus 6204. The example sensor cartridge 6202 may be similar to various example sensor cartridges described herein.

The analyzer apparatus 6204 may comprise a slot base 6206 for securely fastening the sensor cartridge 6202 to the analyzer apparatus 6204 (for example, but not limited to, through a snap-fit mechanism).

In some embodiments, the slot base 6206 may comprise a thermal pad that provides temperature sensing capabilities (for example, the thermal pad may comprise one or more temperature sensors embedded within). The thermal pad may monitor and control the temperature of the sensor cartridge 6202 to ensure the measurement accuracy of the sample reflective index.

In some embodiments, the analyzer apparatus 6204 may comprise one or more optical windows (for example, the optical window 6208) that is in a perpendicularly arrangement with the surface of the slot base 6206. When the sensor cartridge 6202 is inserted on the slot base 6206, an optical window (for example, the optical window 6208) may be aligned with an input window of the example sensor cartridge 6202 so that the analyzer apparatus 6204 may provide light to the example sensor cartridge 6202, and/or another optical window (for example, the optical window 6208) may be aligned with an output window of the example sensor cartridge 6202 so that the analyzer apparatus 6204 may receive interferometric infringe pattern.

In the example shown in the FIG. 62, the analyzer apparatus 6204 may comprise a light indicator 6210 disposed on the surface, which may indicate the optical sensing result. For example, the light indicator 6210 may adjust its color and/or flashing based on whether the analyzer apparatus 6204 is ready, whether the analyzer apparatus 6204 is busy, whether virus is determined, whether there is an error, and/or the like.

In some embodiments, the analyzer apparatus 6204 may comprise a plurality of circuitries disposed within. For example, the analyzer apparatus 6204 may comprise a processing circuitry for analyzing the interferometric infringe pattern. The analyzer apparatus 6204 may comprise a communication circuitry for transmitting analysis data to other devices (such as mobile phone or tablet) via wired or wireless means (such as via Wi-Fi, Bluetooth, and/or the like). In some embodiments, the circuitries may be powered by one or more batteries that are suitable for wireless charging.

In some embodiments, the analyzer apparatus 6204 may be hermetically sealed so that it is airtight. In particular, the optical interface through the optical windows between sensor cartridge 6202 and the analyzer apparatus 6204 may reduce the need for wired connection, while enabling the analyzer apparatus 6204 to be hermetically sealed for easy sterilization.

In some embodiments, the analyzer apparatus 6204 may comprise a built-in internal reflection automatic UV sterilizer for sterilizing the surface of the analyzer apparatus 6204. For example, the UV sterilizer may be disposed within the analyzer apparatus 6204. As described above, the analyzer apparatus 6204 may communicate data wirelessly, therefore providing touchless operation and lower the risk of contamination.

Figure 63B:
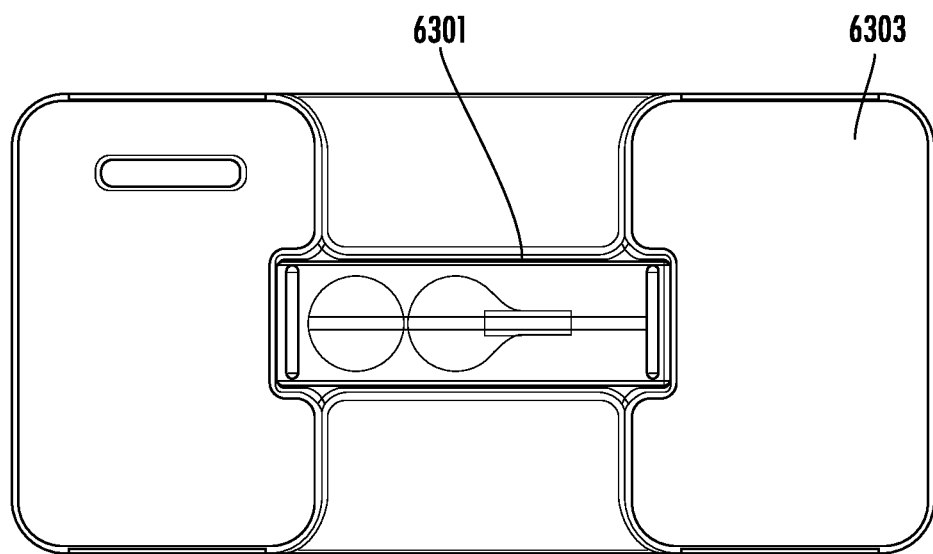
FIG. 63B illustrates an example sample testing device in accordance with various examples of the present disclosure.
Figure 63C:
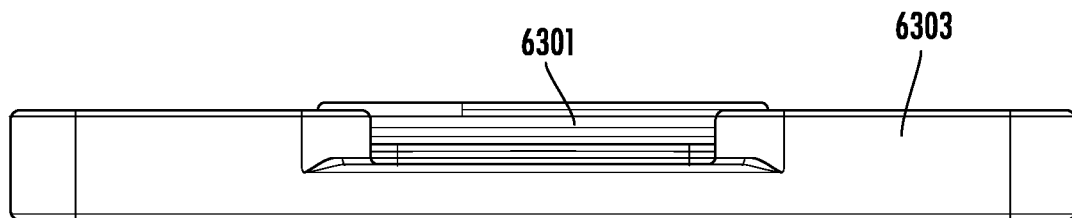
FIG. 63C illustrates an example sample testing device in accordance with various examples of the present disclosure.

Referring now to FIG. 63A, FIG. 63B, and FIG. 63C, example views of an example sensor cartridge 6301 that has been inserted into an analyzer apparatus 6303 are illustrated. In particular, FIG. 63A illustrates an example prospective view, FIG. 63B illustrates an example top view, and FIG. 63C illustrates an example side view.

In some embodiments, the analyzer apparatus 6303 may have a length of 80 millimeters, a width of 40 millimeters, and a height of 10 millimeters. In some embodiments, the size(s) of the analyzer apparatus 6303 may be of other value(s).

It is noted that the scope of the present disclosure is not limited to those described above. In some embodiments of the present disclosure, features from various figures may be substituted and/or combined. For example, various features associated with the sample testing device that comprises a sliding cover as illustrated in FIG. 10 to FIG. 13 (for example, the sliding mechanism) may be implemented in the example sensor cartridge described above.

Integrated airborne virus detection can provide early warnings in the field. For example, an integrated airborne virus detection system may be integrated into a HVAC system or an AC unit. However, technical challenges exist in detecting airborne virus due to the potentially low concentration level of virus in the air, and the requirements of high aerosol sampling efficiency with high virus detection sensitivity may limit the application of point-of-care device for detecting airborne virus. As such, there is a need for a compact aerosol virus detection device that provides real-time virus detection capabilities.

Some electrostatic precipitator aerosol samplers may comprise a high voltage electrode, a grid ground and a liquid collector. Such samplers may be limited in implementation because of the grid ground requirement. In various embodiments of the present disclosure, the integrated sensor may use the waveguide to function as part of electrostatic precipitator to eliminate the ground grid requirement in the electrical precipitators described above. For example, the metal top of the waveguide may directly collect the aerosol particle without liquid collector and/or fluidic system to maximize the collection efficiency.

Some waveguide interferometers may have non-conductive dielectric top surface with non-window area masked with opaque oxide, and sample medium may be delivered by the fluidics added on the top of the waveguide interferometers. In various embodiments of the present disclosure, the integrated electrostatic precipitator waveguide may comprise a metal layer at the top surface for the non-window area shielding without the need for additional process. The metal layer may be connected to the system ground and serve as electrostatic precipitator ground. Aerosol samples may be directly deposited on to the sensing surface without extra air-to-liquid interface, minimizing the collection efficiency loss and improving detection accuracy.

As such, the direct interface design of a sample testing device in various embodiments of the present disclosure may allow bioaerosol particle collecting, biochemical virus binding, and virus detection on a single lab-on-a-chip structure. The air flow tunnel of the sample testing device may provide an electrical field formed by positive electrode and metal layer (also referred to as the ground grid layer) on the top surface of the waveguide. Electrostatic precipitation may push the airborne bio-aerosol to the top surface of the waveguide. The pre-coated antibody on the waveguide may bind and immobilize the specific virus particle, and the waveguide may detect virus based on the refractive index change.

In accordance with various embodiments of the present disclosure, an example sample testing device may comprise a waveguide (for example, a bi-modal waveguide interferometer sensor) and a sampler component (for example, an electrostatic aerosol sampler). The sampler component may provide an electrostatic flow tunnel that may bind airborne virus to a surface of the waveguide. In some embodiments, the sampler component may enable compact field collection of bioaerosol. In some embodiments, the waveguide may provide a lab-on-a-chip structure to detect virus based on potential refractive index change due to the airborne virus.

Figure 64A:
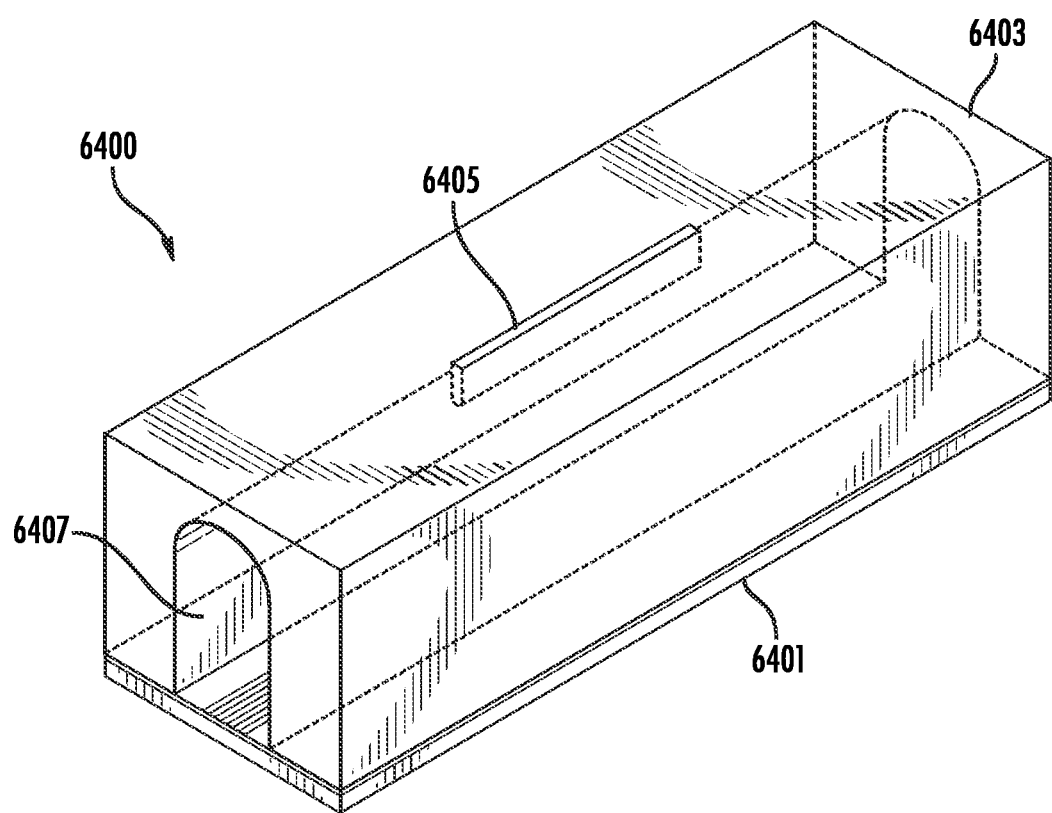
FIG. 64A illustrates an example sample testing device in accordance with various examples of the present disclosure.
Figure 64B:
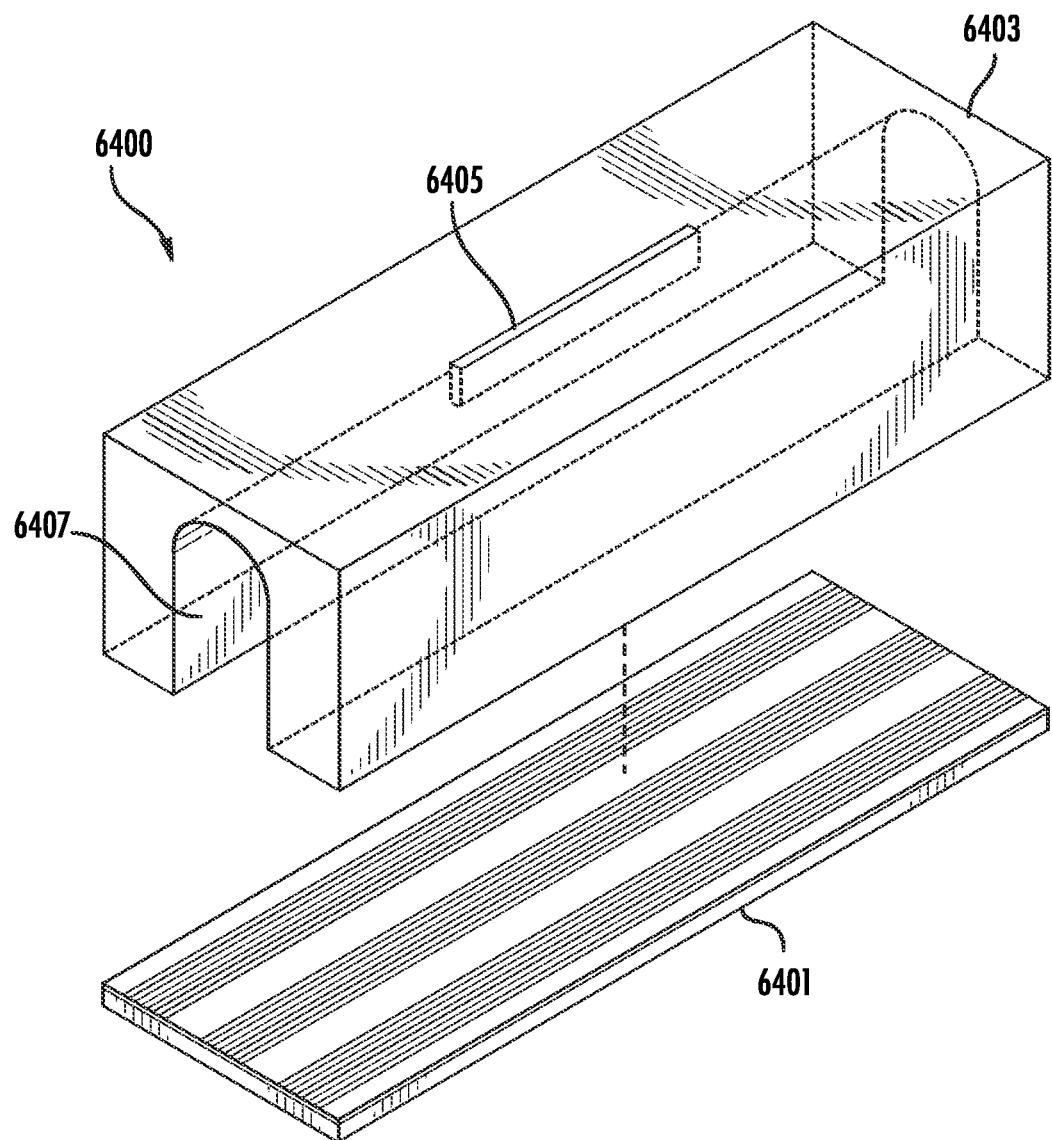
FIG. 64B illustrates an example sample testing device in accordance with various examples of the present disclosure.
Figure 64C:
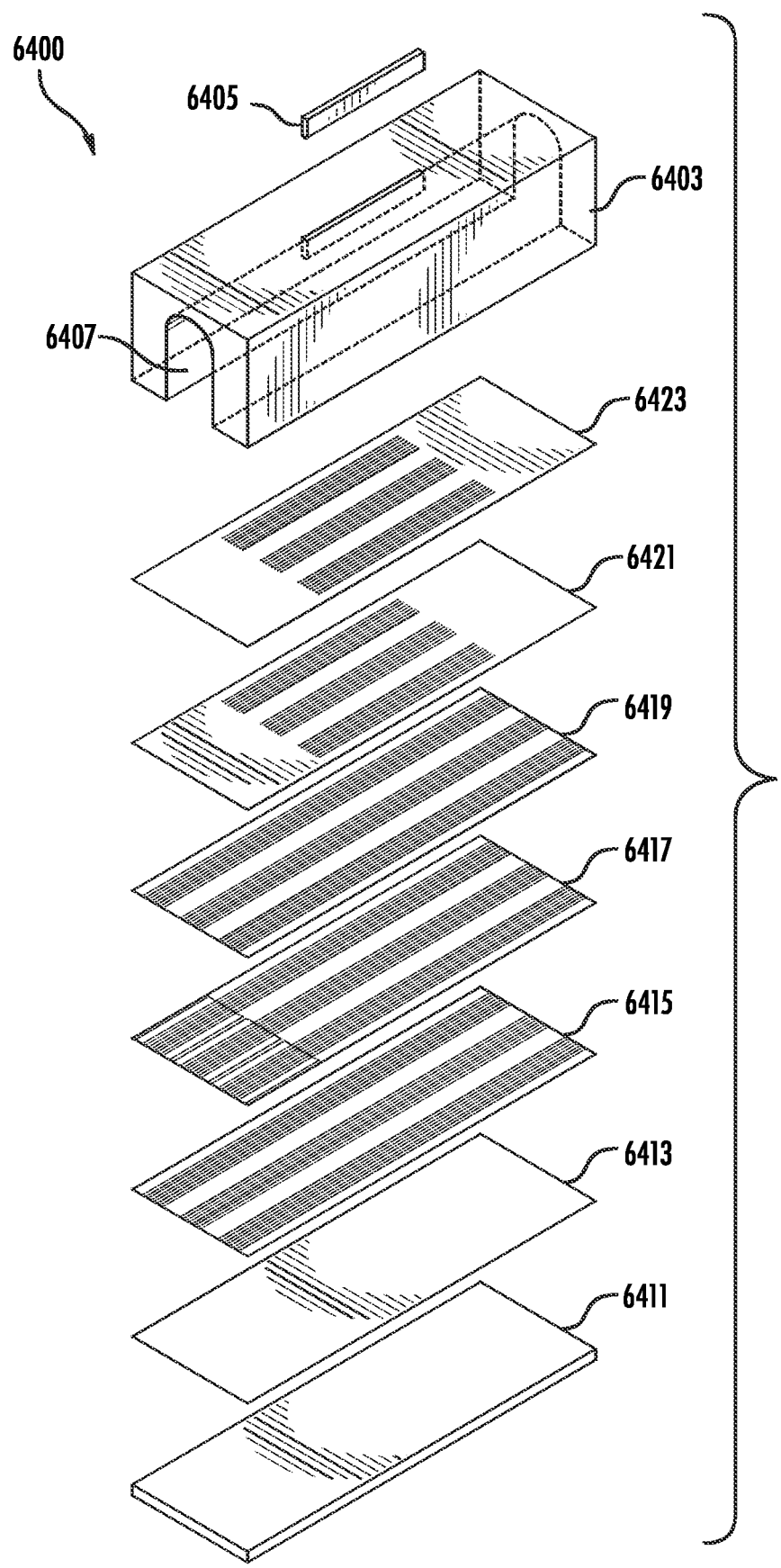
FIG. 64C illustrates an example sample testing device in accordance with various examples of the present disclosure.

Referring now to FIG. 64A, FIG. 64B, and FIG. 64C, an example sample testing device 6400 is illustrated.

As shown in FIG. 64A and FIG. 64B, the example sample testing device 6400 may comprise a waveguide 6401 and a sampler component 6403.

In some embodiments, the sampler component 6403 may be disposed on a top surface of the waveguide 6401. In some examples, the sampler component 6403 may be disposed on the top surface of the waveguide 6401 through one or more fastening mechanisms and/or attaching mechanisms, including not limited to, chemical means (for example, adhesive material such as glues), mechanical means (for example, one or more mechanical fasteners or methods such as soldering, snap-fit, permanent and/or non-permeant fasteners), and/or suitable means.

Figure 65A:
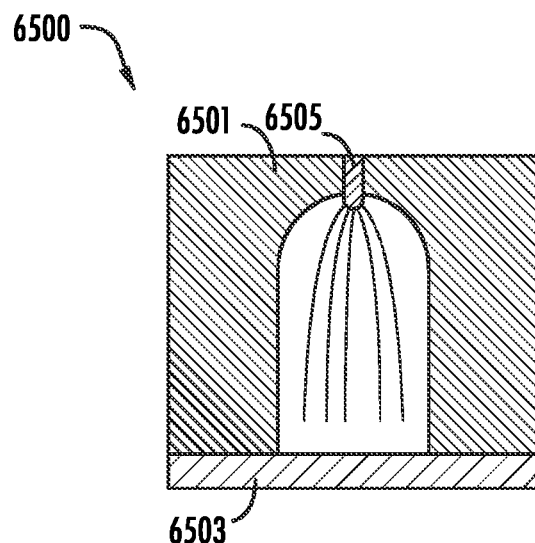
FIG. 65A illustrates a portion of an example sample testing device in accordance with various examples of the present disclosure.
Figure 65B:
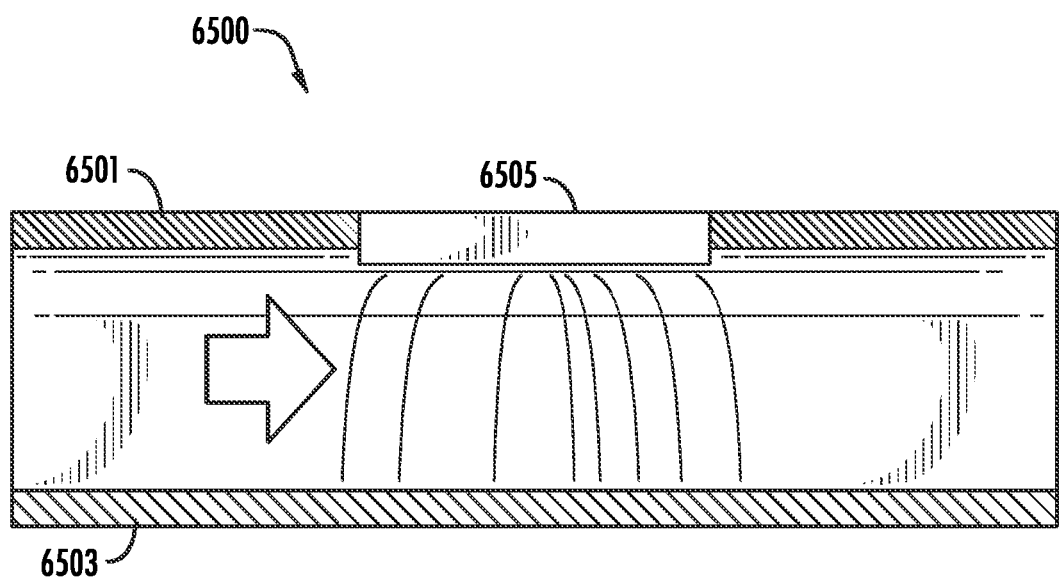
FIG. 65B illustrates a portion of an example sample testing device in accordance with various examples of the present disclosure.

In the example shown in FIG. 64A, a cross section of the sampler component 6403 may be in a shape similar to an upside-down letter "U" in the English alphabet. As such, the sampler component 6403 may provide a flow tunnel 6407 that allows air to flow through. In some embodiments, the flow tunnel may be an electrostatic flow tunnel. Referring now to FIG. 65A and FIG. 65B, example views of an example sample testing device 6500 are illustrated.

FIG. 65A illustrates an example cross sectional view of an example sample testing device 6500 along a width of the example sample testing device 6500. The example sample testing device 6500 may comprise a sampler component 6501 disposed on a top surface of a waveguide 6503. In the example shown in FIG. 65A, the example sampler component 6501 may comprise an anode element 6505. In some embodiments, the anode element 6505 may be in the form of an electrode that may be positively charged. In some embodiments, a top surface of the waveguide 6503 may comprise a layer that is connected to the ground. As such, the anode element 6505 and the top surface of the waveguide 6503 may create an electrical field in the flow tunnel.

Referring now to FIG. 65B, which illustrates another example cross sectional view of the example sample testing device 6500 along a length of the example sample testing device 6500. As air flows through the flow tunnel (for example, in the direction as shown by the arrow), the electrical field created by the anode element 6505 and the top surface of the waveguide 6503 may cause aerosol within the flow tunnel to be attracted to or bonded on a top surface of the waveguide 6503.

Referring back to FIG. 64A and FIG. 64B, the sampler component 6403 may comprise an anode element 6405, similar to the anode element 6505 described above. For example, the anode element 6405 and the top surface of the waveguide 6401 may create an electrical field within the flow tunnel 6407 of the sampler component 6403, and aerosol in the flow tunnel 6407 may be attracted to or bonded on the top surface of the waveguide 6401.

In some embodiments, the anode element 6405 may be embedded within the sampler component 6403. For example, the anode element 6405 may be embedded in the center middle portion of the sampler component 6403. In some embodiments, the anode element 6405 may be in contact with the air in the flow tunnel 6407.

Referring now to FIG. 64C, an exploded view of the example sample testing device 6400 is illustrated. In particular, FIG. 64C illustrates various layers associated with the waveguide 6401.

For example, the waveguide 6401 may comprise a silicon substrate layer 6411. The waveguide 6401 may comprise a SiO2 cladding layer 6413 disposed on top of the silicon substrate layer 6411. The waveguide 6401 may comprise a Si3N4 waveguide core layer 6415 (which may provide one or more waveguide elements) disposed on top of the SiO2 cladding layer 6413. The waveguide 6401 may comprise a SiO2 planner layer 6417 disposed on top of the Si3N4 waveguide core layer 6415. The waveguide 6401 may comprise a poly Si light shield layer 6419 (which may shield stray light) disposed on top of the SiO2 planner layer 6417. The waveguide 6401 may comprise a SiO2 cladding window layer 6421 disposed on top of the poly Si light shield layer 6419. The waveguide 6401 may comprise an aluminum grid layer 6423 (which may be connected to the ground) disposed on top of the SiO2 cladding window layer 6421.

To protect airplane passengers from airborne virus (for example, but not limited to, SARS-COV-II), there is a need to provide effective, real-time monitoring of the air in the cabin of an airplane to detect airborne virus.

In accordance with various embodiments of the preset disclosure, an airborne bioaerosol virus sensor may be deployed in the airplane cabin with minimum impact to the flight operation. In some embodiments, the airborne bioaerosol virus sensor may be in the form of a plug-in devices that can be added to an AC outlet (for example, the AC outlet near the bottom of the seat) to monitor bio-aerosol in the air of the airplane cabin. As such, the flight safety may be improved with real-time monitoring and control.

Referring now to FIG. 66A, FIG. 66B, FIG. 66C, and FIG. 66D, an example sample testing device 6600 is illustrated. In particular, the example sample testing device 6600 may provide an airborne bioaerosol virus sensor described above.

Figure 66A:
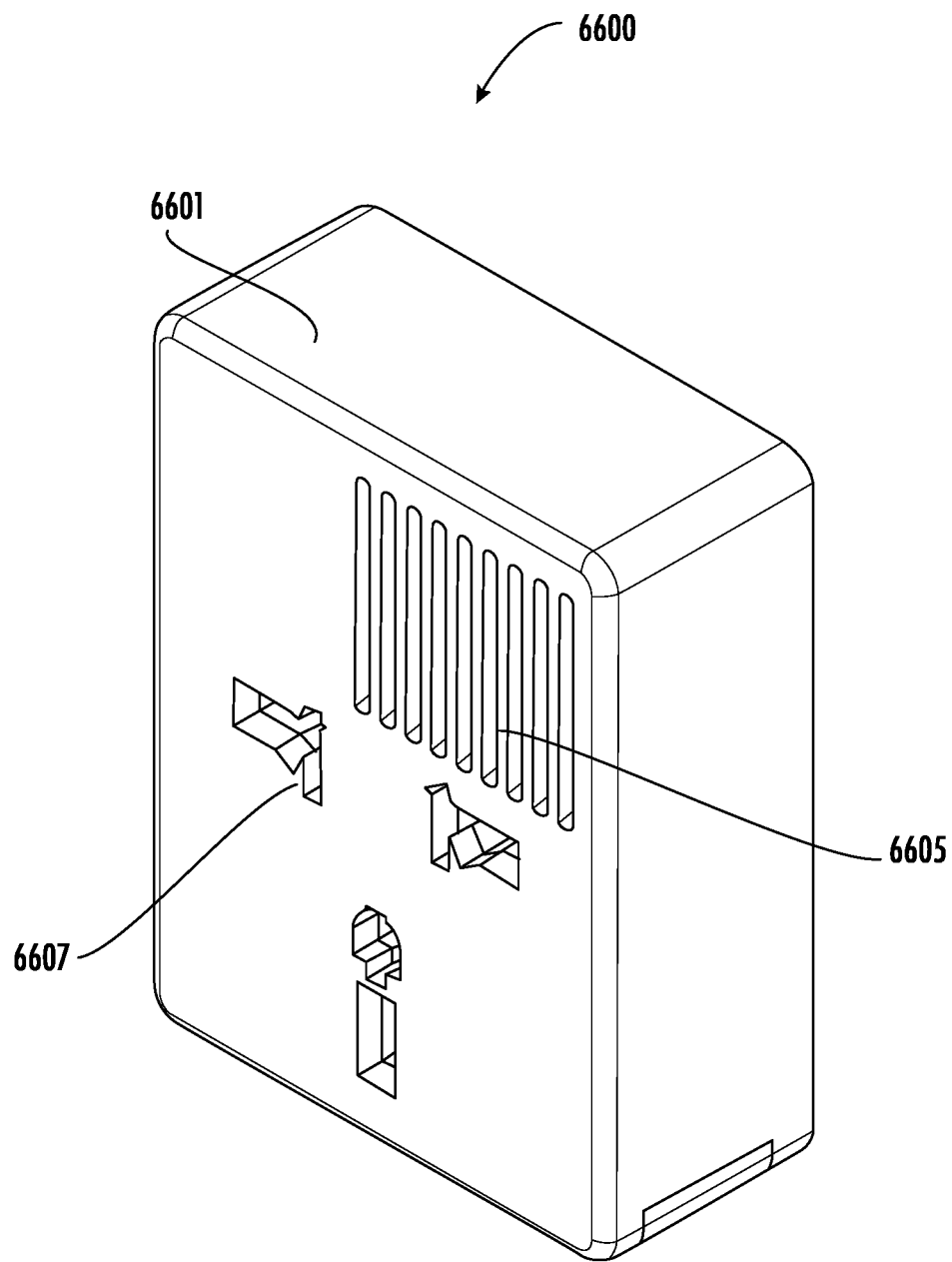
FIG. 66A illustrates an example sample testing device in accordance with various examples of the present disclosure.

Referring now to FIG. 66A, the example sample testing device 6600 may comprise a shell component 6601.

In some embodiments, the shell component 6601 may comprise a plurality of airflow opening elements 6605, allowing air to be circulated into the sample testing device 6600, details of which are described herein.

In some embodiments, the shell component 6601 may comprise a power outlet element 6607 dispose on a front surface. As described above, the sample testing device 6600 may be plugged into an AC outlet. The power outlet element 6607 may pass the electricity from the AC outlet to another device when the other device is plugged into the power outlet element 6607.

Figure 66B:
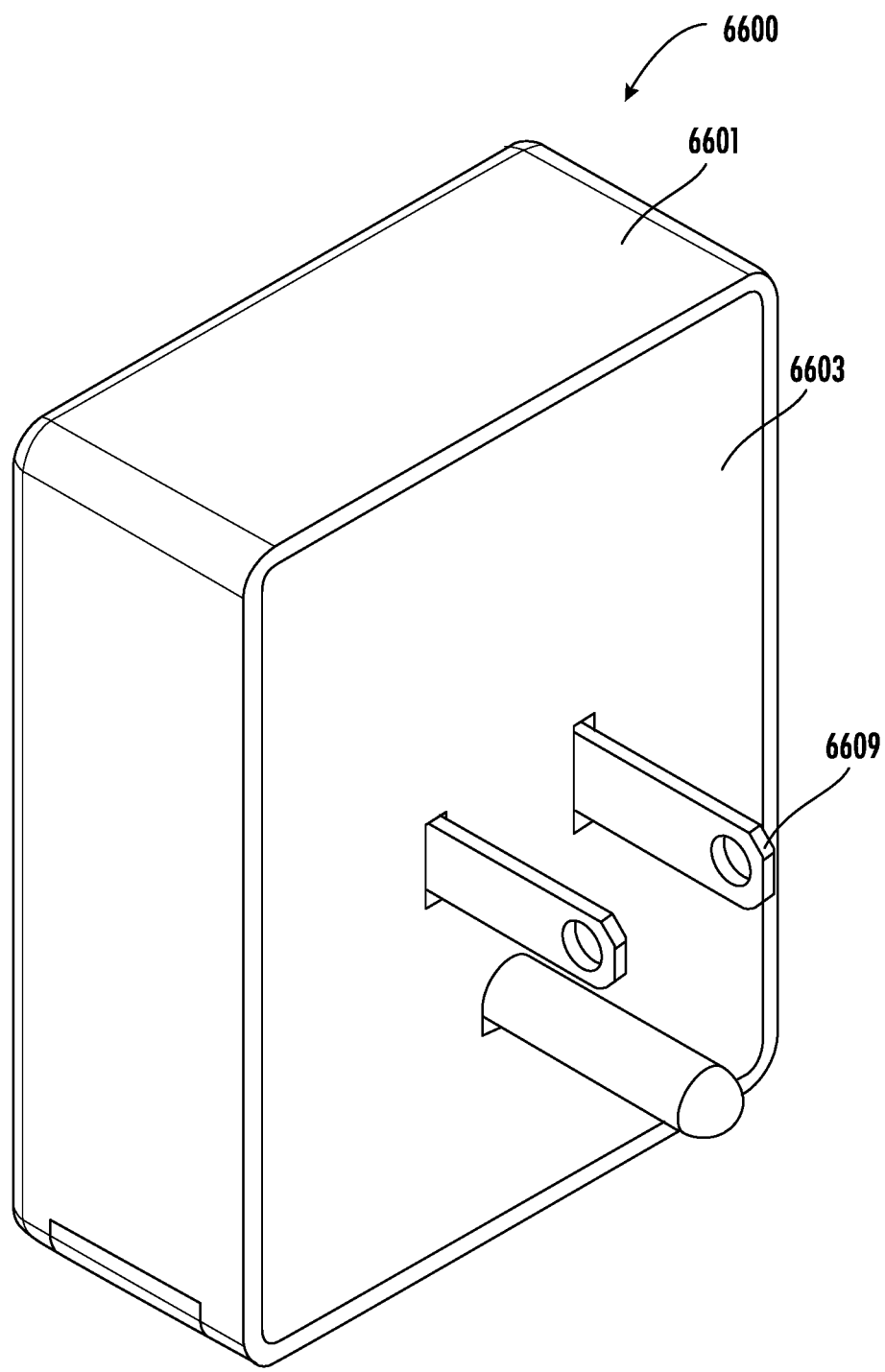
FIG. 66B illustrates an example sample testing device in accordance with various examples of the present disclosure.

Referring now to FIG. 66B, the example sample testing device 6600 may comprise a base component 6603. As shown, the shell component 6601 may be securely fastened to the base component 6603.

As discussed above, the example sample testing device 6600 may be plugged into an AC outlet. In the example shown in FIG. 66B, the base component 6603 may comprise power plug element 6609. When the power plug element 6609 is plugged into the AC outlet, electricity may flow from the AC outlet to the sample testing device 6600, and may power the sample testing device 6600. As described above, the shell component 6601 may comprise the power outlet element 6607 dispose on a front surface. In such an example, the example sample testing device 6600 may further pass electricity to another device that is plugged into the power outlet element 6607.

Figure 66C:
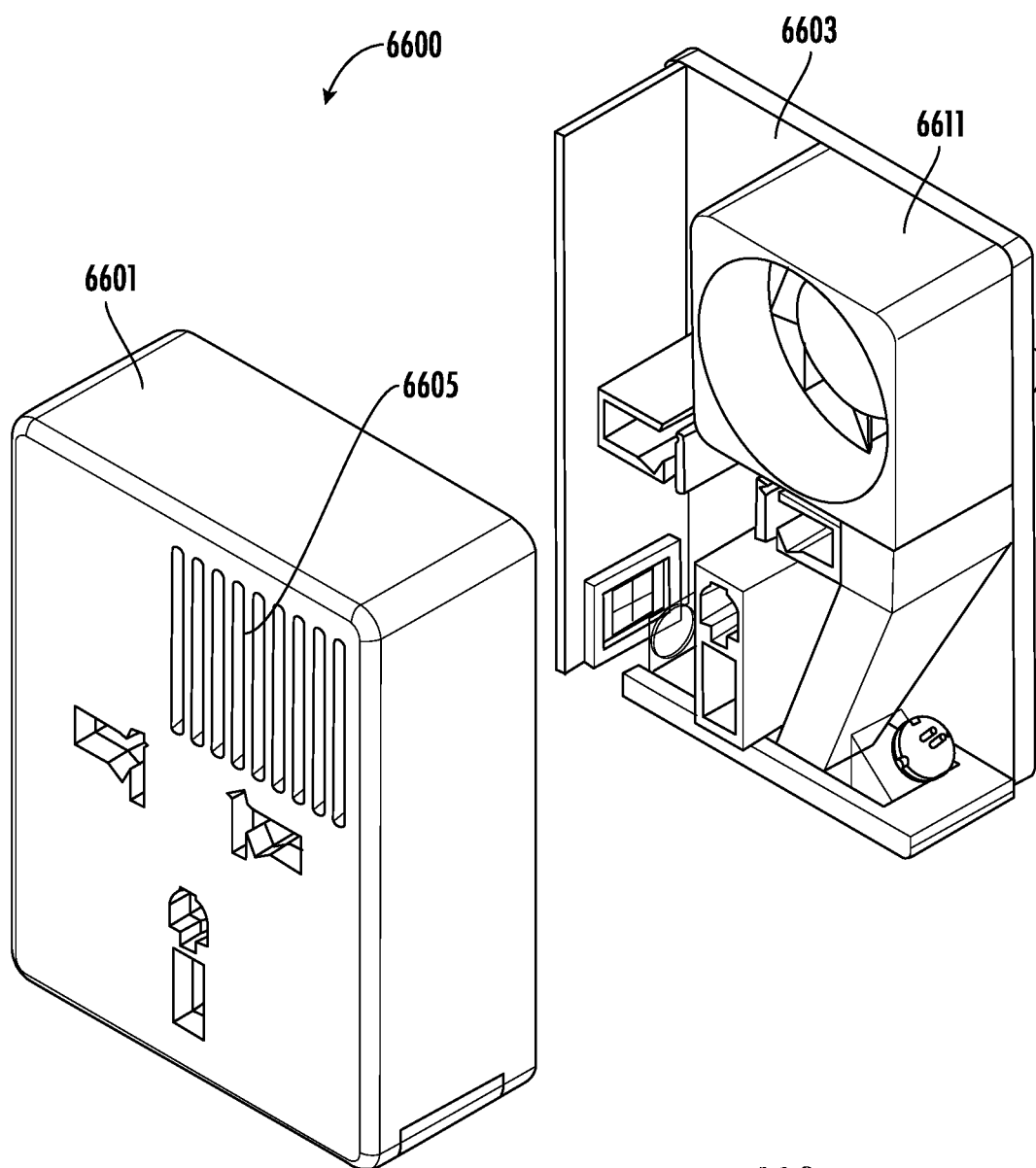
FIG. 66C illustrates an example sample testing device in accordance with various examples of the present disclosure.

Referring now to FIG. 66C, an exploded view of the example sample testing device 6600 is illustrated.

In some embodiments, the example sample testing device 6600 may comprise an air blower element 6611 disposed on an inner surface of the base component 6603. In some embodiments, the air blower element 6611 may comprise one or more apparatuses that create an air flow, such as, but not limited to, a fan. In some embodiments, the air blower element 6611 may be positioned on the base component 6603 corresponding to the position of the airflow opening elements 6605 on the shell component 6601. In such example, when the air blower element 6611 is powered on and in operation, the air blower element 6611 may create an air flow, where air may flow into the sample testing device 6600 through the airflow opening elements 6605, travel within the sample testing device 6600 (details of which are described herein), and exit from the sample testing device 6600 through an opening (for example, through the airflow opening elements 6605 and/or another opening).

Figure 66D:
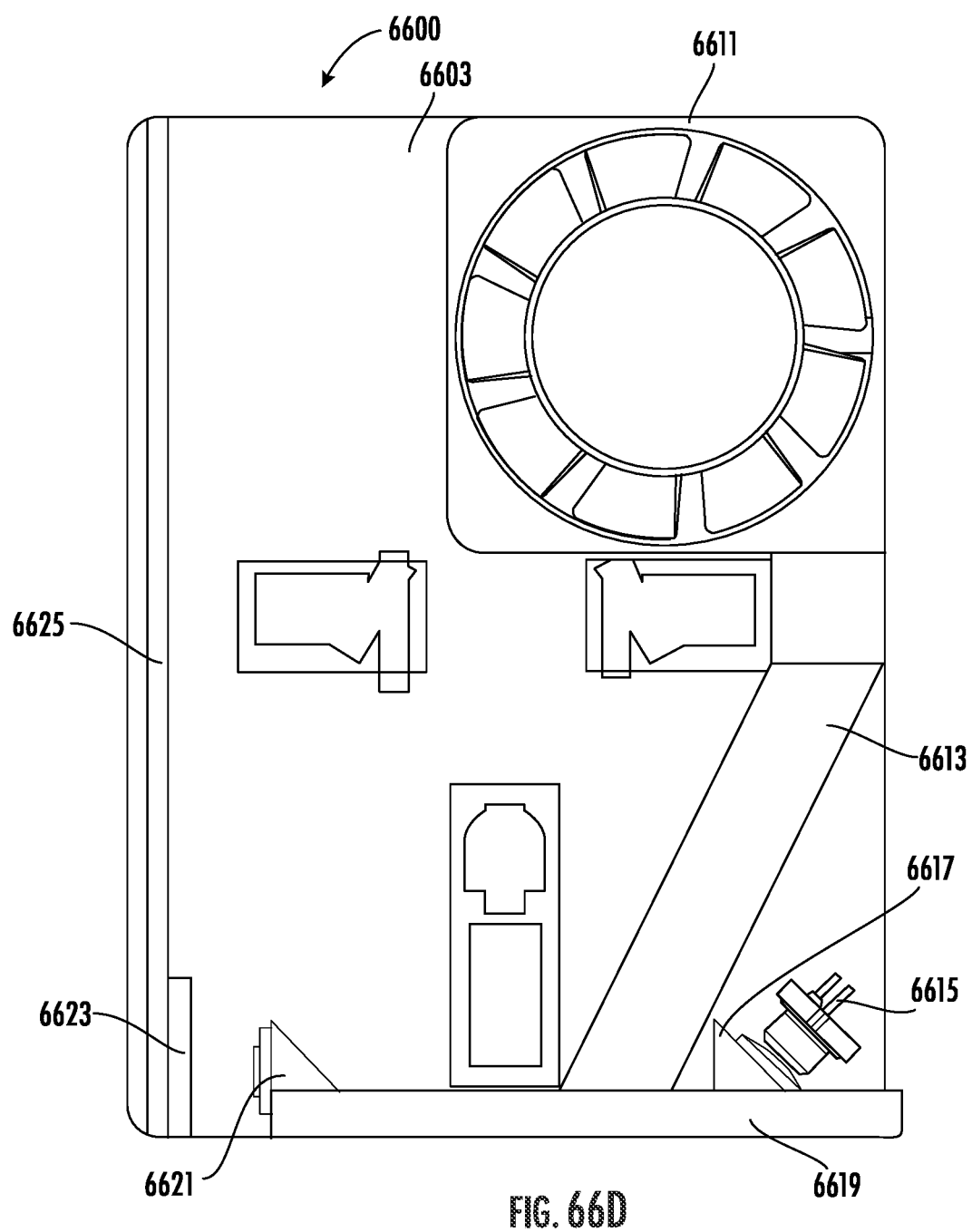
FIG. 66D illustrates an example sample testing device in accordance with various examples of the present disclosure.

Referring now to FIG. 66D, an example view of the base component 6603 is shown.

As disclosure above, the air blower element 6611 may be disposed on an inner surface of the base component 6603. A aerosol sampler component 6613 may be connected to the air blower element 6611 to sample the aerosol from the air.

For example, the aerosol sampler component 6613 may provide a tunnel that allows air to flow from the air blower element 6611 onto the example waveguide 6619. In some embodiments, the aerosol sampler component 6613 may create an electrical field to bind or attract aerosol to the waveguide 6619, similar to those described herein.

In some embodiments, the light source 6615 may provide input light to the waveguide 6619 through an integrated optical component 6617.

Similar to those described above, the light source 6615 may be configured to produce, generate, emit, and/or trigger the production, generation, and/or emission of light (including, but not limited to, a laser light beam). The light source 6615 may be coupled to the integrated optical component 6617, and light may travel from the light source 6615 to the integrated optical component 6617. Similar to those described above, the integrated optical component 6617 may collimate, polarize, and/or couple light to the waveguide 6619. For example, the integrated optical component 6617 may be disposed on a top surface of the waveguide 6619, and may direct light through an input opening of the waveguide 6619.

In some embodiments, the sample testing device 6600 may comprise a lens component 6621 disposed on the top surface of the waveguide 6619. For example, the lens component 6621 may at least partially overlap with an output opening of the waveguide 6619, such that light exiting from the waveguide 6619 may pass through the lens component 826.

In some examples, the lens component 6621 may comprise one or more optical imaging lens, such as but not limited to one or more lens having spherical surface(s), one or more lens having parabolic surface(s) and/or the like. In some examples, the lens component 6621 may redirect and/or adjust the direction of the light that exits from the waveguide 6619 towards an imaging component 6623. In some examples, the imaging component 6623 may be disposed on an inner surface of the base component 6603.

Similar to those described above, the imaging component 6623 may be configured to detect an interference fringe pattern. For example, the imaging component 6623 may comprise one or more imagers and/or image sensors (such as an integrated 1D, 2D, or 3D image sensor). Various examples of the image sensors may include, but are not limited to, a contact image sensor (CIS), a charge-coupled device (CCD), or a complementary metal-oxide semiconductor (CMOS) sensor, a photodetector, one or more optical components (e.g., one or more lenses, filters, mirrors, beam splitters, polarizers, etc.), autofocus circuitry, motion tracking circuitry, computer vision circuitry, image processing circuitry (e.g., one or more digital signal processors configured to process images for improved image quality, decreased image size, increased image transmission bit rate, etc.), verifiers, scanners, cameras, any other suitable imaging circuitry, or any combination thereof.

In some embodiments, the imaging component 6623 may be electronically coupled to a sensor board element 6625. In some embodiments, the sensor board element 6625 may comprise circuitries such as, but not limited to, a processor circuitry, a memory circuitry, and a communications circuitry.

For example, the processor circuitry may be in communication with the memory circuitry via a bus for passing data/information, including data generated by the imaging component 6623. The memory circuitry is non-transitory and may include, for example, one or more volatile and/or non-volatile memories. The processor circuitry may carry out one or more example methods described herein to detect the presence of virus based on the data generated by the imaging component 6623.

In some embodiments, when the processor circuitry determines that there is virus present in the air, the processor circuitry may generate a warning signal. The processor circuitry may pass the warning signal to the communications circuitry through a bus, and the communications circuitry may transmit the warning signal to another device (for example, a central controller on the airplane) via wired or wireless means (for example, Wi-Fi).

In some embodiments, based on the warning signals, one or more actions may be taken. For example, the central controller on the airplane may adjust the air flow in the airplane to clean out the virus. Additionally, or alternatively, the central controller may render a warning message on a display, and one or more flight crew may initiate disinfecting the plane and/or replace the waveguide 6619.

While the description above provides an example implementation of the sample testing device 6600 within an airplane, it is noted that the scope of the present disclosure is not limited to the description above. In some examples, an example sample testing device 6600 may be implemented in other environments and/or situations.

In accordance with various embodiments of the present disclosure, a multichannel waveguide can test multiple fluid samples simultaneously to provide accurate results with multiple references, which may require highly synchronized delivery and control of multiple fluids into the fluid cover. However, it can be technically challenging to provide synchronized delivery and control of multiple fluids. For example, some systems may utilize multiple pumps, where each pump is configured to deliver one type of fluid (e.g., a sample medium for testing, a known reference medium for reference, and/or the like) into one flow channel. In order to deliver the multiple fluids (such as sample medium and/or reference medium) to different channels at the same time, such systems may require one or more splitters and/or cylinders connected to the pumps. However, a system that implements multiple splitters and/or cylinders may result in non-uniformed delivery of fluids (such as sample medium and/or reference medium) between channels, causing differences in the testing results and providing unreliable solutions to sample testing.

In accordance with various embodiments of the present disclosure, a single pump multichannel fluidics system is provided. In some embodiments, a single pump continuously deliveries a buffer solution that flows through multiple flow channels in serial. Each of the flow channels is formed between a fluid cover, a flow channel plate, and a waveguide. In some embodiments, multiple fluids (including sample medium and reference medium) are preloaded and/or injected to valves of the single pump multichannel fluidics system. In some embodiments, when conducting testing of the sample medium, valves are switched to insert the fluids (such as, but not limited to, sample medium, reference medium, and/or the like) into the flow of the buffer solution through the flow channels. In some embodiments, the tubing length between the valve(s) and the flow channel(s) are predetermined based on the timing for switching different valves, such that each flow channel will receive the fluid at the same time, providing more accurate result(s) for testing and further analysis.

As such, in accordance with examples of the present disclosure, an example single pump multichannel fluidics system may provide buffer solution to all channels with the same flow rate, under the same pressure, at same temperature. In some embodiments, multiple valves (each of which is connected to a flow channel through a buffer loop) may be provided for injecting fluids (such as, but not limited to, sample medium, reference medium) to the example single pump multichannel fluidics system, which can guarantee a consistent volume for all injected fluids. In some embodiments, by synchronizing the timing for switching the valves based on lengths of buffer loops between the valves and the flow channels, providing same-time fluid sensing and analysis accuracy.

Figure 67A:
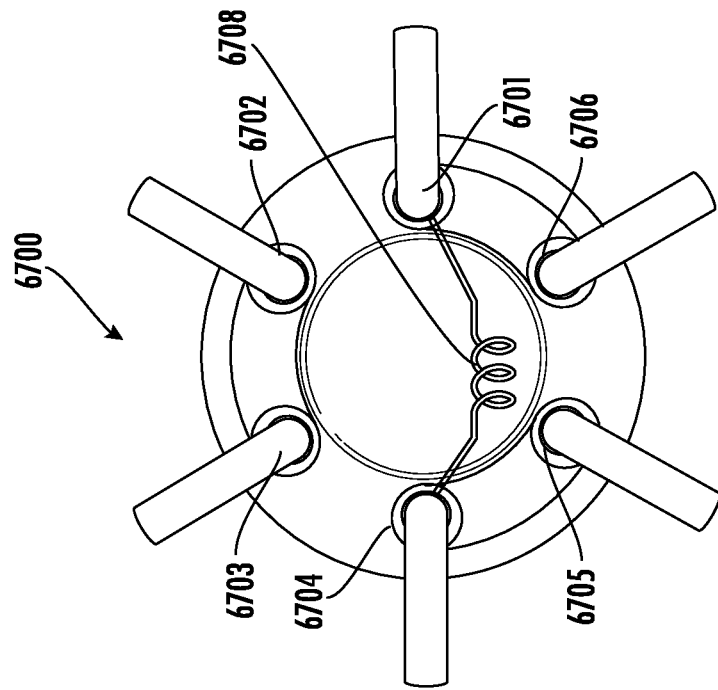
FIG. 67A illustrates an example component associated with an example sample testing device in accordance with various examples of the present disclosure.
Figure 67B:
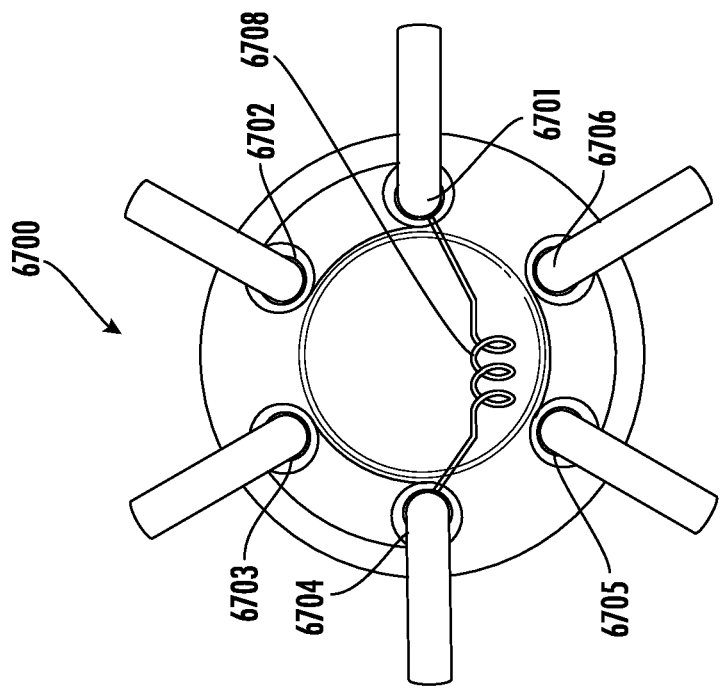
FIG. 67B illustrates an example component associated with an example sample testing device in accordance with various examples of the present disclosure

Referring now to FIG. 67A and FIG. 67B, example configurations associated with an example valve 6700 are illustrated. In the example shown in FIG. 67A and FIG. 67B, the example valve is a 2-configuration 6-port valve.

In particular, FIG. 67A illustrates the example valve 6700 in a first configuration, and FIG. 67B illustrates the example valve 6700 in a second configuration. In some embodiments, the example valve 6700 may comprise a first port 6701, a second port 6702, a third port 6703, a fourth port 6704, a fifth port 6705 and a sixth port 6706.

In the example shown in FIG. 67A, when in the first configuration, the first port 6701 and the second port 6702 are connected within the example valve 6700. In other words, when in the first configuration, a fluid may flow into the example valve 6700 through the first port 6701 and flow out of the example valve 6700 through the second port 6702, or may flow into the example valve 6700 through the second port 6702 and flow out of the example valve 6700 through the first port 6701.

Similarly, when in the first configuration, the third port 6703 and the fourth port 6704 are connected within the example valve 6700. In other words, when in the first configuration, a fluid may flow into the example valve 6700 through the third port 6703 and flow out of the example valve 6700 through the fourth port 6704, or may flow into the example valve 6700 through the fourth port 6704 and flow out of the example valve 6700 through the third port 6703.

Similarly, when in the first configuration, the fifth port 6705 and the sixth port 6706 are connected within the example valve 6700. In other words, when in the first configuration, a fluid may flow into the example valve 6700 through the fifth port 6705 and flow out of the example valve 6700 through the sixth port 6706, or may flow into the example valve 6700 through the sixth port 6706 and flow out of the example valve 6700 through the fifth port 6705.

In the example shown in FIG. 67B, when in the second configuration, the first port 6701 and the sixth port 6706 are connected within the example valve 6700. In other words, when in the second configuration, a fluid may flow into the example valve 6700 through the first port 6701 and flow out of the example valve 6700 through the sixth port 6706, or may flow into the example valve 6700 through the sixth port 6706 and flow out of the example valve 6700 through the first port 6701.

Similarly, when in the second configuration, the third port 6703 and the second port 6702 are connected within the example valve 6700. In other words, when in the second configuration, a fluid may flow into the example valve 6700 through the third port 6703 and flow out of the example valve 6700 through the second port 6702, or may flow into the example valve 6700 through the second port 6702 and flow out of the example valve 6700 through the third port 6703.

Similarly, when in the second configuration, the fifth port 6705 and the fourth port 6704 are connected within the example valve 6700. In other words, when in the second configuration, a fluid may flow into the example valve 6700 through the fifth port 6705 and flow out of the example valve 6700 through the fourth port 6704, or may flow into the example valve 6700 through the fourth port 6704 and flow out of the example valve 6700 through the fifth port 6705.

In the example shown in FIG. 67A and FIG. 67B, the first port 6701 is always connected to the fourth port 6704 through a sample loop 6708, whether the example valve 6700 is in the first configuration (FIG. 67A) or the second configuration (FIG. 67B). In other words, when in the first configuration or the second configuration, a fluid may flow into the first port 6701, through the sample loop 6708, and flow out of the fourth port 6704, or may flow into the fourth port 6704, through the sample loop 6708, and flow out of the first port 6701.

In some embodiments, the example valve 6700 may receive a fluid through the second port 6702.

For example, in the first configuration shown in FIG. 67A, the second port 6702 may be connected to a fluid source that is configured to inject a fluid (for example, but not limited to, a sample medium or a reference medium) into the example valve 6700. As described above, in the first configuration, the second port 6702 is connected to the first port 6701, which in turn is connected to the sample loop 6708. As such, the fluid may flow through the sample loop 6708 and arrive at the fourth port 6704. As described above, in the first configuration, the fourth port 6704 is connected to the third port 6703. As such, fluid may exit the valve 6700 through third port 6703.

After the example fluid is injected to the second port 6702 and in the sample loop 6708 while the example valve 6700 is in the first configuration, the example valve 6700 may be switched to the second configuration as shown in FIG. 67B. As described above, in the second configuration, the fourth port 6704 is connected to the fifth port 6705. In some embodiments, the fifth port 6705 may receive buffer solution from a pump or from a previous flow channel through a buffer loop, details of which are described herein.

As described above, the fifth port 6705 is connected to the fourth port 6704, which in turn is connected to the sample loop 6708. As such, after the example valve 6700 is switched to the second configuration, the buffer solution received from the fifth port is mixed with the example fluid in the sample loop 6708 at the fourth port 6704. As described above, the fourth port 6704 is connected to the fifth port 6705 in the second configuration. As such, the fluid may exit the example valve 6700 through the sixth port 6706, which may be connected to a flow channel, details of which are described herein.

Figure 68:
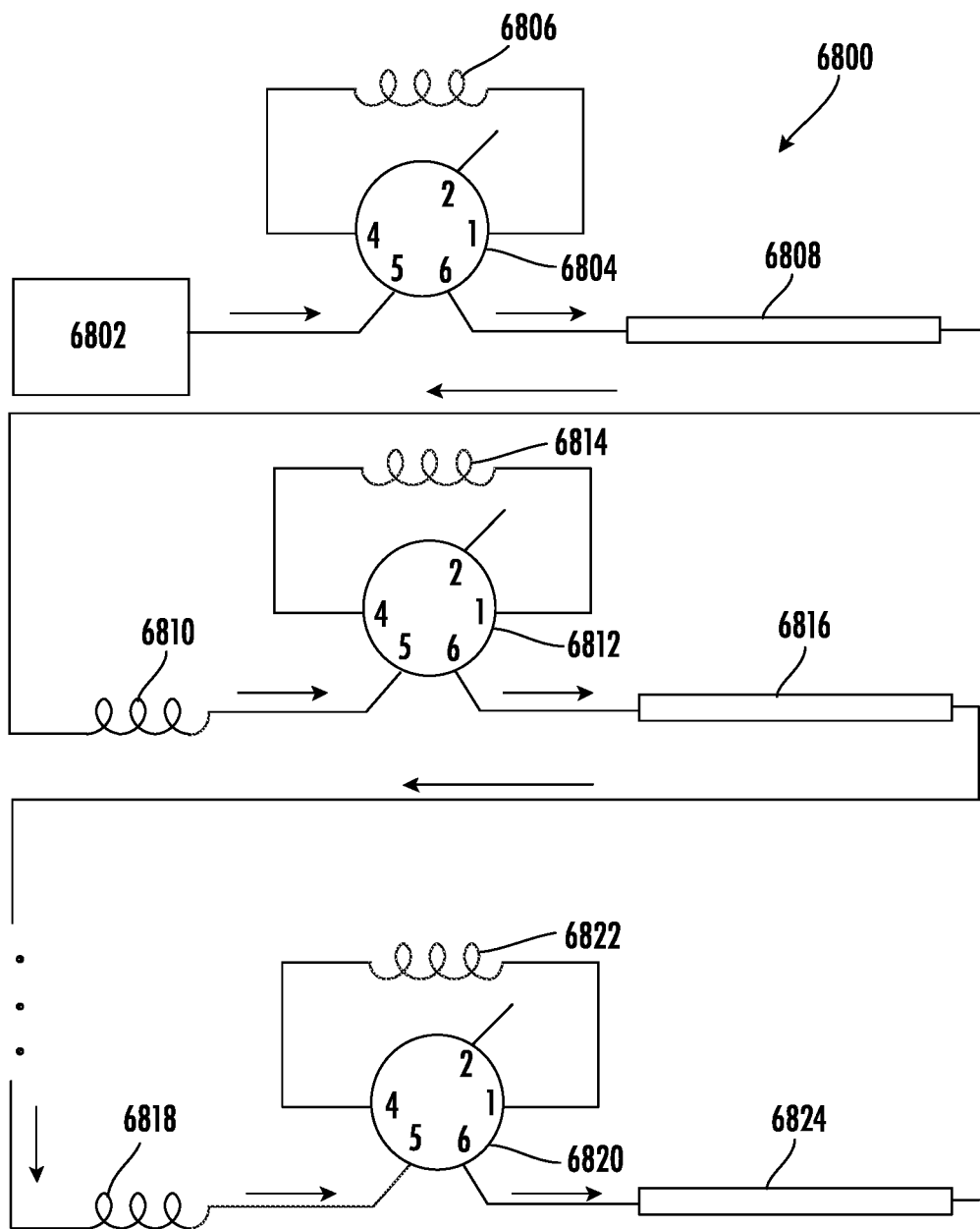
FIG. 68 is an example diagram illustrating an example sample testing device in accordance with various examples of the present disclosure.

Referring now to FIG. 68, an example single pump multichannel fluidics system 6800 is illustrated.

In the example shown in FIG. 68, the example single pump multichannel fluidics system 6800 comprises a pump 6802 that delivers buffer solution to one or more flow channels, including, but not limited to, the first flow channel 6808, the second flow channel 6816, . . . , and the last flow channel 6824. In some embodiments, the one or more flow channels of the example single pump multichannel fluidics system 6800 are connected in serial. For example, the first flow channel 6808 is connected the second flow channel 6816 through a second valve 6812 as shown in FIG. 68. In some embodiments, using a single pump (instead of multiple pumps) provides technical advantages of same flow rate across different flow channels.

In some embodiments, an example single pump multichannel fluidics system may comprise one or more valves. In some embodiments, each of the one or more valves may connect a flow channel to a pump, or may connect two flow channels. In the example shown in FIG. 68, the first valve 6804 is connected to the pump 6802 and the first flow channel 6808, the second valve 6812 is connected to the first flow channel 6808 and the second flow channel 6816, and/or the like.

In some embodiments, to operate the example single pump multichannel fluidics system 6800 shown in FIG. 68, buffer solution may be provided to the one or more flow channels (for example, the first flow channel 6808, the second flow channel 6816, . . . , the last flow channel 6824) by the pump 6802, and example fluids (for example, but not limited to, a sample medium or a reference medium) may be provided to the one or more flow channels (for example, the first flow channel 6808, the second flow channel 6816, . . . , the last flow channel 6824) through the one or more valves (for example, the first valve 6804, the second valve 6812, . . . , the last valve 6820).

In accordance with examples of the present disclosure, an example method of operating the example single pump multichannel fluidics system 6800 is provided.

In some embodiments, the example method may include switching the one or more valves of the example single pump multichannel fluidics system 6800 (for example, the first valve 6804, the second valve 6812, . . . , the last valve 6820) to a first configuration. As described above, in the first configuration, fifth port of the valve is connected to the sixth port of the valve, while the first port is connected to the fourth port through the sample loop.

In some embodiments, the example method may include injecting a buffer solution to the first valve 6804 through the pump 6802. In some embodiments, the example pump 6802 is connected to the fifth port of the first valve 6804. In some embodiments, the sixth port of the first valve 6804 is connected to a first flow channel 6808. As described above, in the first configuration, the fifth port of the first valve 6804 is connected to the sixth port of the first valve 6804. As such, the buffer solution flows from the example pump 6802, through the first valve 6804, and to the first flow channel 6808.

As described above, the first flow channel 6808 is connected to the second flow channel 6816 via one or more components. In the example shown in FIG. 68, the first flow channel 6808 is connected a first buffer loop 6810, which in turn is connected to the second valve 6812, which in turn is connected to the second flow channel 6816. In some embodiments, the length of the first buffer loop 6810 may be determined based on the timing of switching the second valve 6812 from the first configuration to the second configuration, details of which are described herein.

Similar to those described above, the sixth port of the second valve 6812 is connected to a second flow channel 6816. As described above, in the first configuration, the fifth port of the second valve 6812 is connected to the sixth port of the second valve 6812. As such, the buffer solution flows from the first buffer loop 6810, through the second valve 6812, and to the second flow channel 6816.

In some embodiments, one or more sets of valves and flow channels may be connected in serial, so that the buffer solution may flow from the example pump 6802 through the various flow channels to the last buffer loop 6818. Similar to those described above, the last buffer loop 6818 is connected to the last valve 6820, which in turn is connected to the last flow channel 6824. In some embodiments, the last flow channel 6824 is the last flow channel in the series of flow channels of the example single pump multichannel fluidics system 6800.

In some embodiments, while the first valve 6804 is in the first configuration, the example method further comprises providing first fluid (for example, but not limited to, a sample medium or a reference medium) to the first valve 6804 through the second port of the first valve 6804. As descried above, the second port of the first valve 6804 is connected to first port of the first valve 6804 when the first valve 6804 is in the first configuration, and the first port of the first valve 6804 is connected to the forth port of the first valve 6804 through a first sample loop 6806. As such, the first fluid may flow into the first sample loop 6806.

Additionally, or alternatively, while the second valve 6812 is in the first configuration, the example method further comprises providing second fluid (for example, but not limited to, a sample medium or a reference medium) to the second valve 6812 through the second port of the second valve 6812. As descried above, the second port of the second valve 6812 is connected to first port of the second valve 6812 when the second valve 6812 is in the first configuration, and the first port of the second valve 6812 is connected to the forth port of the second valve 6812 through a second sample loop 6814. As such, the second fluid may flow into the second sample loop 6814.

Additionally, or alternatively, while the last valve 6820 is in the first configuration, the example method further comprises providing last fluid (for example, but not limited to, a sample medium or a reference medium) to the last valve 6820 through the second port of the last valve 6820. As descried above, the second port of the last valve 6820 is connected to first port of the last valve 6820 when the last valve 6820 is in the first configuration, and the first port of the last valve 6820 is connected to the forth port of the last valve 6820 through a last sample loop 6822. As such, the last fluid may flow into the last sample loop 6822.

In some embodiments, the example method further comprises switching the first valve 6804 from the first configuration to the second configuration. As described above, after the first valve 6804 is switched from the first configuration to the second configuration, the first port of the first valve 6804 is no longer connected to the second port of the first valve 6804. Instead, when the first valve 6804 is at the second configuration, the first port is connected to the sixth port of the first valve 6804, and the fifth port is connected to the fourth port of the first valve 6804. As such, after the first valve 6804 is switched to the second configuration, the buffer solution may continuously be injected to the first valve 6804 through the fifth port (which is connected to the fourth port when the first valve 6804 is in the second configuration). Subsequently, the buffer solution may exit the fourth port and flow through the first sample loop 6806.

As described above, the first sample loop 6806 is connected to the first port and may contain the first fluid. The buffer solution may be combined with the first fluid and flow to the first port. As described above, the first port is connected to the sixth port when the first valve 6804 is in the second configuration, and the buffer solution may exit the first valve 6804 through the sixth port. As described above, the sixth port of the first valve 6804 is connected to the first flow channel 6808, and the buffer solution with the first fluid may flow through the first flow channel 6808.

As described above, after the buffer solution exits the first flow channel 6808, the buffer solution may further flow through a first buffer loop 6810. In some embodiments, the example method further comprises switching the second valve 6812 from the first configuration to the second configuration.

As described above, after the second valve 6812 is switched from the first configuration to the second configuration, the first port of the second valve 6812 is no longer connected to the second port of the second valve 6812. Instead, when the second valve 6812 is at the second configuration, the first port is connected to the sixth port of the second valve 6812, and the fifth port is connected to the fourth port of the second valve 6812. As such, after the second valve 6812 is switched to the second configuration, the buffer solution may flow from the first buffer loop 6810 to the second valve 6812 through the fifth port (which is connected to the fourth port when the second valve 6812 is in the second configuration). Subsequently, the buffer solution may exit the fourth port and flow through the second sample loop 6814.

As described above, the second sample loop 6814 is connected to the first port and may contain the second fluid. The buffer solution may be combined with the second fluid and flow to the first port. As described above, the first port is connected to the sixth port when the second valve 6812 is in the second configuration, and the buffer solution may exit the second valve 6812 through the sixth port. As described above, the sixth port of the second valve 6812 is connected to the second flow channel 6816, and the buffer solution with the second fluid may flow through the second flow channel 6816.

In some embodiments, the first buffer loop 6810 may enable the mixture of the buffer solution and the first fluid to enter the first flow channel 6808 at the same time as the mixture of the buffer solution and the second fluid entering the second flow channel 6816. In some embodiments, the first buffer loop 6810 may prevent the first fluid from being mixed with the second fluid. To achieve the above-mentioned objectives, the length of the first buffer loop 6810 may be calculated based at least in part on the time period between the time of switching the first valve 6804 from the first configuration to the second configuration and the time of switching the second valve 6812 from the first configuration to the second configuration. For example, the length L of the first buffer loop 6810 may be calculated based on the following equation:

$$L = \frac{T \times Q}{\pi \times r^2}$$

In the above example, T is the time period between the time of switching the first valve 6804 from the first configuration to the second configuration and the time of switching the second valve 6812 from the first configuration to the second configuration. Q is the flow rate of injecting the buffer solution by the pump 6802. r is the radius of the first buffer loop 6810. As described in the equation above, the length L of the first buffer loop 6810 is equal to the volume of flow (during the time period between the time of switching the first valve 6804 from the first configuration to the second configuration and the time of switching the second valve 6812 from the first configuration to the second configuration) divided by the cross-sectional area of the first buffer loop 6810. In some embodiments, the length L of the first buffer loop 6810 prevents the buffer solution that has been mixed with the first fluid (and exits the first flow channel 6808) from interacting with the second fluid (after the second valve 6812 is switched from the first configuration to the second configuration), while enables the mixture of the buffer solution and the first fluid to enter the first flow channel 6808 at the same time as the mixture of the buffer solution and the second fluid entering the second flow channel 6816.

In some embodiments, the example single pump multichannel fluidics system 6800 further comprises one or more additional valves that are connected in serial, and the example method further comprises switching each of the one or more additional valves in sequence.

For example, as shown in FIG. 68, the example single pump multichannel fluidics system 6800 further comprises a last buffer loop 6818. The last buffer loop 6818 connects a second-to-last flow channel to the last valve 6820, and the last valve 6820 is connected to the last flow channel 6824. In some embodiments, the example method further comprises switching the last valve 6820 from the first configuration to the second configuration. As described above, after the last valve 6820 is switched from the first configuration to the second configuration, the first port of the last valve 6820 is no longer connected to the second port of the last valve 6820. Instead, when the last valve 6820 is at the second configuration, the first port is connected to the sixth port of the last valve 6820, and the fifth port is connected to the fourth port of the last valve 6820. As such, after the last valve 6820 is switched to the second configuration, the buffer solution may flow from the last buffer loop 6818 to the last valve 6820 through the fifth port (which is connected to the fourth port when the last valve 6820 is in the second configuration). Subsequently, the buffer solution may exit the fourth port and flow through the last sample loop 6822. As described above, the last sample loop 6822 is connected to the first port and may contain the last fluid. The buffer solution may be combined with the last fluid and flow to the first port. As described above, the first port is connected to the sixth port when the last valve 6820 is in the second configuration, and the buffer solution may exit the last valve 6820 through the sixth port. As described above, the sixth port of the last valve 6820 is connected to the last flow channel 6824, and the buffer solution may flow through the last flow channel 6824.

In some embodiments, the last buffer loop 6818 may enable the mixture of the buffer solution and a second-to-last fluid to enter a second-to-last flow channel at the same time as the mixture of the buffer solution and the last fluid entering the last flow channel 6824. In some embodiments, the last buffer loop 6818 may prevent the second-to-last fluid from being mixed with the last fluid. To achieve the above-mentioned objectives, the length of the last buffer loop 6818 may be calculated based at least in part on the time period between the time of switching the second-to-last valve from the first configuration to the second configuration and the time of switching the last valve 6820 from the first configuration to the second configuration. For example, the length L of the last buffer loop 6818 may be calculated based on the above equation.

As such, in accordance with various embodiments of the present disclosure, an example single pump multichannel fluidics system 6800 enables synchronized delivery of multiple fluids into their corresponding flow channels.

Figure 69A:
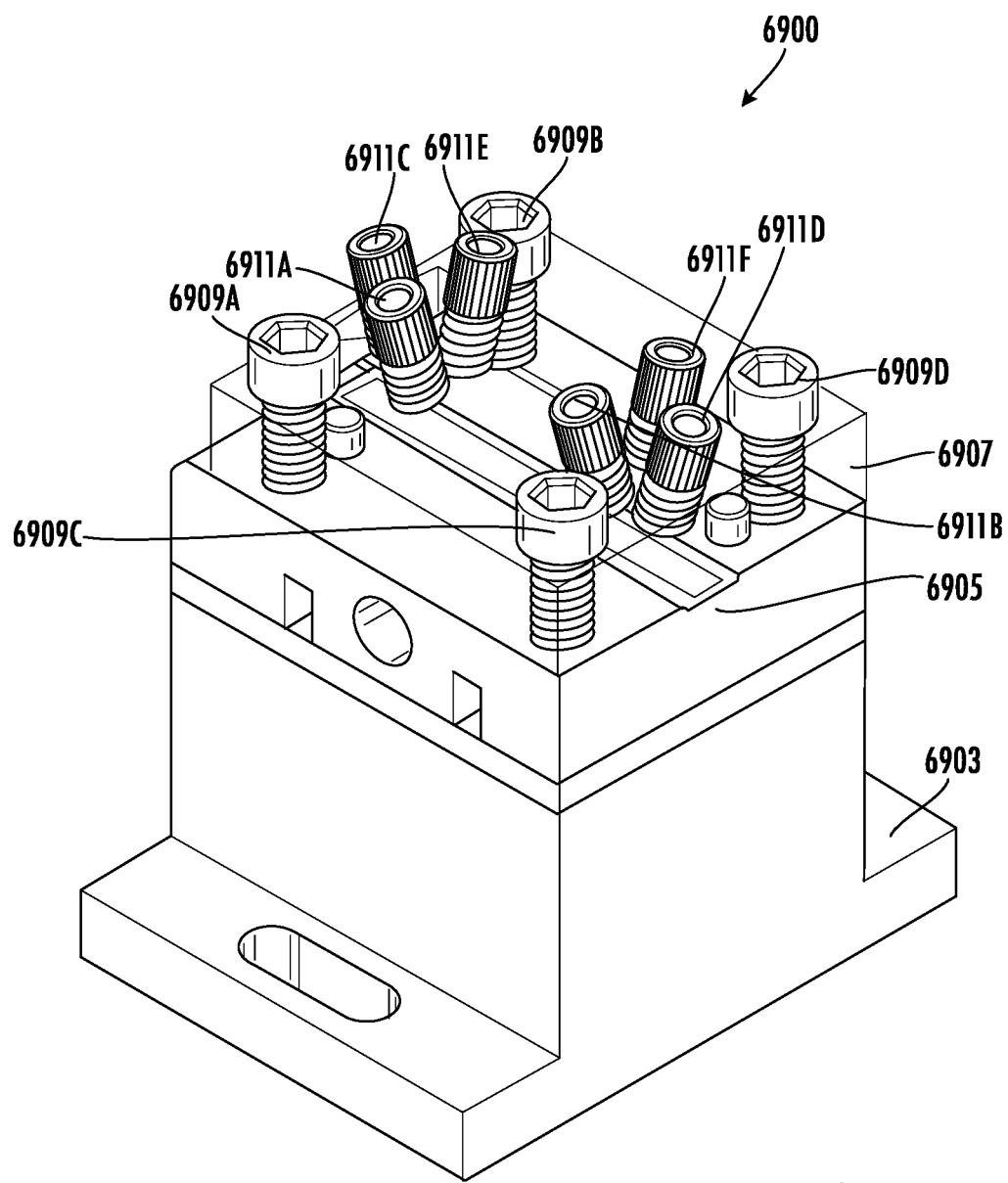
FIG. 69A illustrates an example perspective view associated with an example sample testing device in accordance with various examples of the present disclosure.

Referring now to FIG. 69A and FIG. 69B, example views associated with an example multichannel waveguide device 6900 is illustrated. In particular, FIG. 69A illustrates an example perspective view of the multichannel waveguide device 6900, while FIG. 69B illustrates an example exploded view of the multichannel waveguide device 6900.

As shown in FIG. 69A and FIG. 69B, the multichannel waveguide device 6900 may comprise a fluid cover 6907 that is secured to a multichannel waveguide 6905. In some embodiments, the multichannel waveguide device 6900 comprises a multichannel waveguide 6905 disposed on a top surface of a thermally insulated base 6903. In some embodiments, the multichannel waveguide 6905 is based on one or more examples of waveguides described above. For example, the multichannel waveguide 6905 may comprise one or more sample channels and/or one or more reference channels, similar to those described above. In some embodiments, the thermally insulated base 6903 prevents environmental temperature from interfering with the multichannel waveguide 6905, similar to the various thermally insulated components described above.

In the example shown in FIG. 69A and FIG. 69B, the fluid cover 6907 is secured to the multichannel waveguide 6905 through one or more screws (such as, but not limited to, screw 6909A, screw 6909B, screw 6909C, screw 6909D). For example, the fluid cover 6907 may comprise one or more threaded holes (such as, but not limited to, threaded hole 6913A, threaded hole 6913C, threaded hole 6913D), and the each of the one or more screws may pass through one or more threaded holes, where threads on the inside of the threaded hole mesh with threads of the screw.

In some embodiments, a flow channel plate 6915 may be positioned between the fluid cover 6907 and the multichannel waveguide 6905. In particular, the flow channel plate 6915 may comprise one or more ditches that are etched on a surface of the flow channel plate 6915. When the flow channel plate 6915 is positioned underneath the fluid cover 6907, the bottom surface of the fluid cover 6907 and the one or more ditches form one or more flow channels. When the flow channel plate 6915 is positioned on the multichannel waveguide 6905 (for example, based on one or more alignment techniques described herein), each of the one or more flow channels may be positioned above one of the sample channels or one of the reference channels of the multichannel waveguide 6905. In some embodiments, an inlet tube and an outlet tube may be connected to each of the flow channels, so that a sample medium, a reference medium, and/or a buffer solution may flow to each of the flow channels through an inlet tube and exit from each of the flow channels through an outlet tube.

For example, an inlet tube 6911A may be inserted through the fluid cover 6907 and connected to a first end of a flow channel on the flow channel plate 6915, and an outlet tube 6911B may be inserted through the fluid cover 6907 and connected to a second end of the flow channel on the flow channel plate 6915. In this example, a sample medium or a reference medium may flow from the inlet tube 6911A, through the flow channel, and exit from the outlet tube 6911B. In some embodiments, the inlet tube 6911A is connected to the sixth port of a valve, similar to those described above. In some embodiments, the outlet tube 6911B is connected to a buffer loop, similar to those described above.

Additionally, or alternatively, an inlet tube 6911C may be inserted through the fluid cover 6907 and connected to a first end of a flow channel on the flow channel plate 6915, and an outlet tube 6911D may be inserted through the fluid cover 6907 and connected to a second end of the flow channel on the flow channel plate 6915. In this example, a sample medium or a reference medium may flow from the inlet tube 6911C, through the flow channel, and exit from the outlet tube 6911D. In some embodiments, the inlet tube 6911C is connected to the sixth port of a valve, similar to those described above. In some embodiments, the outlet tube 6911D is connected to a buffer loop, similar to those described above.

Additionally, or alternatively, an inlet tube 6911E may be inserted through the fluid cover 6907 and connected to a first end of a flow channel on the flow channel plate 6915, and an outlet tube 6911F may be inserted through the fluid cover 6907 and connected to a second end of the flow channel on the flow channel plate 6915. In this example, a sample medium or a reference medium may flow from the inlet tube 6911E, through the flow channel, and exit from the outlet tube 6911F. In some embodiments, the inlet tube 6911E is connected to the sixth port of a valve, similar to those described above. In some embodiments, the outlet tube 6911F is connected to a buffer loop, similar to those described above.

Figure 70A:
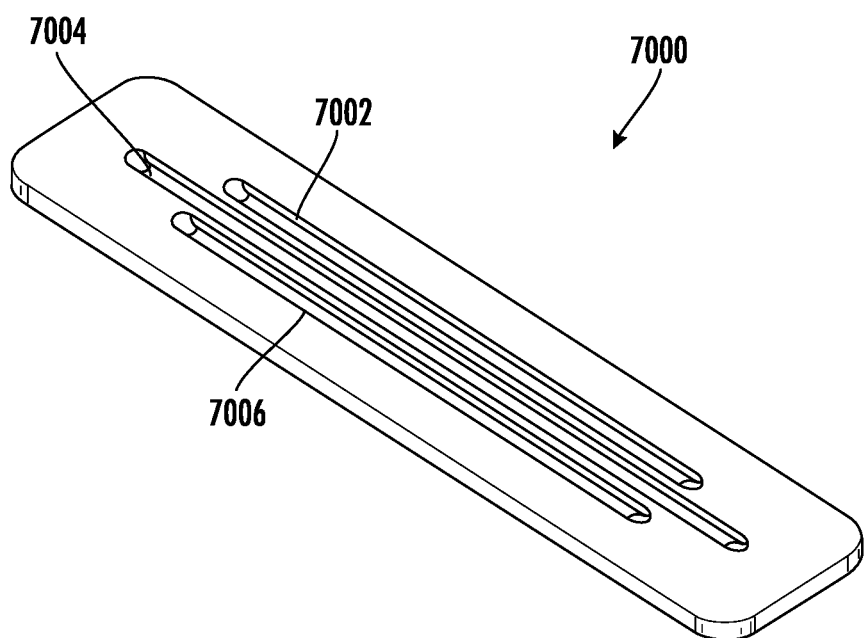
FIG. 70A illustrates an example perspective view of an example component associated with an example sample testing device in accordance with various examples of the present disclosure.
Figure 70B:
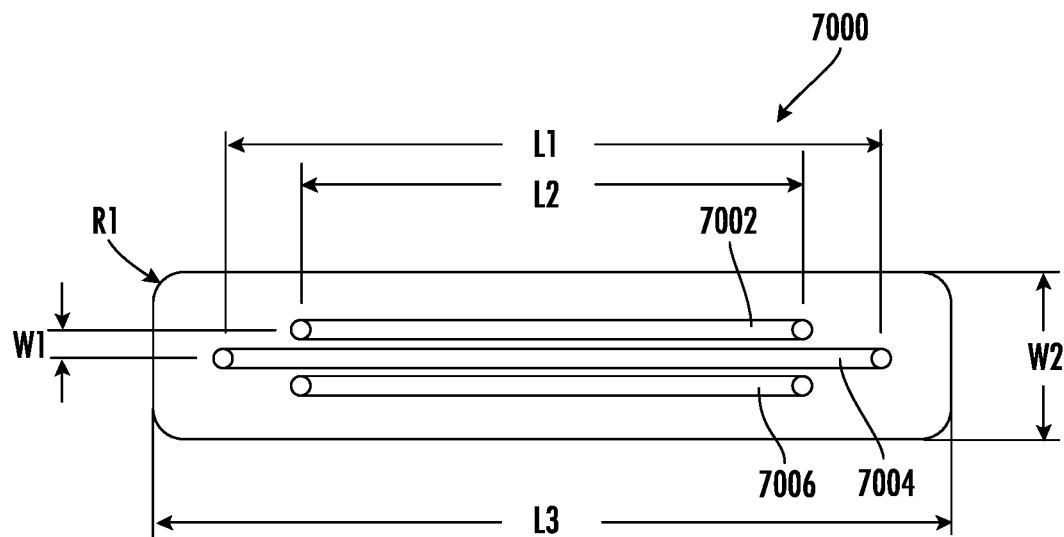
FIG. 70B illustrates an example top view of an example component associated with an example sample testing device in accordance with various examples of the present disclosure.
Figure 70C:
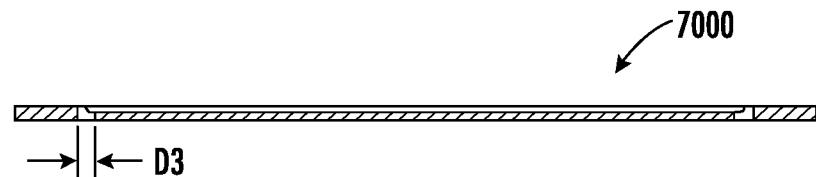
FIG. 70C illustrates an example side view of an example component associated with an example sample testing device in accordance with various examples of the present disclosure.
Figure 70D:
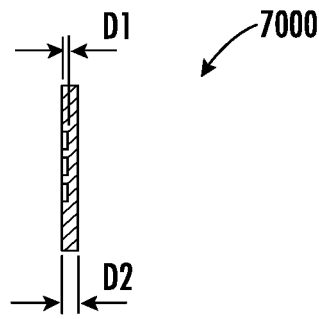
FIG. 70D illustrates an example side view of an example component associated with an example sample testing device in accordance with various examples of the present disclosure.

Referring now to FIG. 70A, FIG. 70B, FIG. 70C, and FIG. 70D, example views associated with an example flow channel plate 7000 is illustrated. In particular, FIG. 70A illustrates an example perspective view of the flow channel plate 7000, FIG. 70B illustrates an example top view of the flow channel plate 7000, FIG. 70C illustrates an example side view of the flow channel plate 7000, and FIG. 70D illustrates another example side view of the flow channel plate 7000.

In the example shown in FIG. 70A, FIG. 70B, FIG. 70C, and FIG. 70D, the example flow channel plate 7000 comprises a first flow channel 7002, a second flow channel 7004, and a third flow channel 7006. As described above, each of the first flow channel 7002, the second flow channel 7004, and the third flow channel 7006 is formed between an etched ditch on a surface of the flow channel plate 7000 and a bottom surface of a fluid cover (underneath which the example flow channel plate 7000 is positioned).

As shown in FIG. 70B, in some embodiments, the first flow channel 7002 and/or the third flow channel 7006 may have a length L2 of 16 centimeters. In some embodiments, the second flow channel 7004 may have a length L1 of 21 centimeters. In some embodiments, the example flow channel plate 7000 may have a length L3 of 25.6 centimeters. In some embodiments, the example flow channel plate 7000 may have a width W2 of 5.3 centimeters. In some embodiments, the distance W1 between the first flow channel 7002 and the second flow channel 7004 (and/or the distance between the second flow channel 7004 and the third flow channel 7006) is 0.9 centimeters. In some embodiments, one or more of the above-referenced measurements may be of other values.

As shown in FIG. 70C, in some embodiments, a diameter D3 of an end of a flow channel is 0.6 centimeters. In some embodiments, the diameter D3 may be of other values.

As shown in FIG. 70D, in some embodiments, the etched depth D1 of each flow channel is 0.2 centimeters. In some embodiments, the width D2 of the flow channel plate 7000 is 0.5 millimeters. In some embodiments, one or more of the above-referenced measurements may be of other values.

Figure 71:
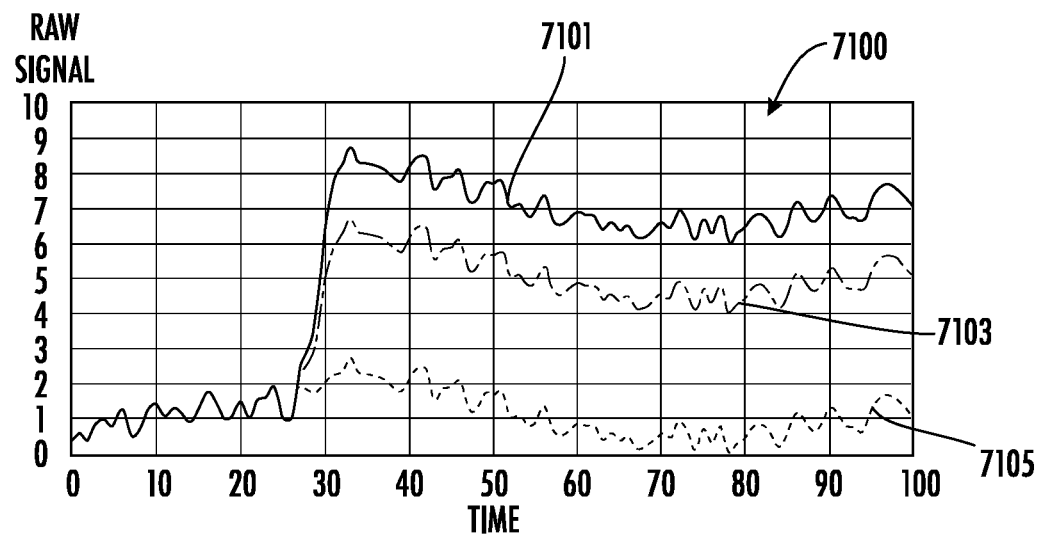
FIG. 71 illustrates an example diagram showing example raw response signals from an example sample testing device in accordance with various examples of the present disclosure.
Figure 72:
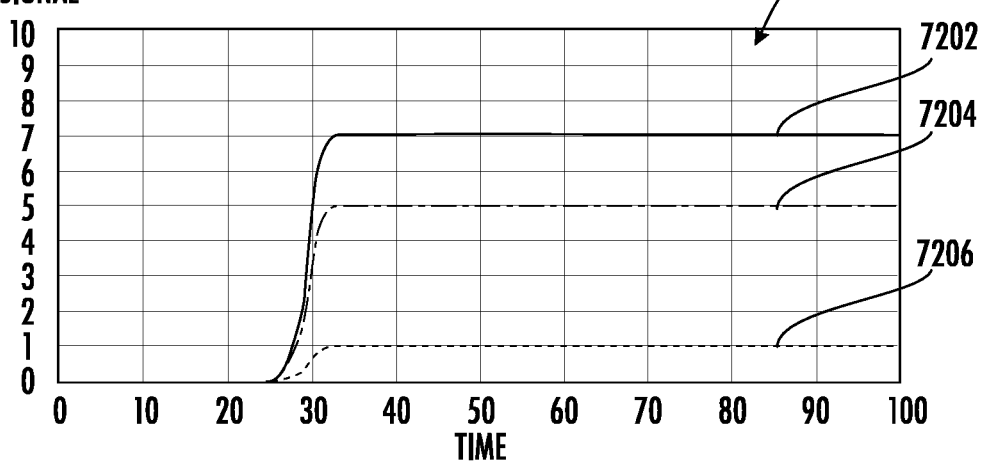
FIG. 72 illustrates an example diagram showing example normalized response signals from an example sample testing device in accordance with various examples of the present disclosure.

Referring now to FIG. 71 and FIG. 72, example diagrams illustrating example testing results are provided. In particular, the diagram 7100 shown in FIG. 71 illustrates example raw signals that contain noise, and the diagram 7200 shown in FIG. 72 illustrates example processed signals where noise has been removed.

As shown in FIG. 71 and FIG. 72, example signals from three flow channels are illustrated. For example, curve 7101 of FIG. 71 illustrates example raw signals generated by an example imaging component based on detecting the sample medium or the reference medium in a first flow channel, and curve 7202 of FIG. 72 illustrates example processed signals based on the raw signals from the first flow channel. As another example, curve 7103 of FIG. 71 illustrates example raw signals generated by an example imaging component based on detecting the sample medium or the reference medium in a second flow channel, and curve 7204 of FIG. 72 illustrates example processed signals based on the raw signals from the second flow channel. As another example, curve 7105 of FIG. 71 illustrates example raw signals generated by an example imaging component based on detecting the sample medium or the reference medium in a third flow channel, and curve 7206 of FIG. 72 illustrates example processed signals based on the raw signals from the third flow channel.

In the example shown in FIG. 71 and FIG. 72, an example of three channels may allow testing the sample medium using at least a first reference medium as a negative reference (for example, distilled water) and a second reference medium as a positive reference (for example, targeted virus surrogate). For example, the sample medium, the first reference medium, and the second reference medium may be a first fluid, a second fluid, and a third fluid, respectively, which may be injected to a first valve, a second valve, and a third valve of a single pump multichannel fluidics system, respectively. The buffer solution may be injected to the single pump multichannel fluidics system using a pump.

In some embodiments, the three different fluids (for example, one sample medium and two reference mediums) may travel through the three flow channels after the valves are switched. In some embodiments, the signals from the three flow channels may be used to quantitatively provide test results based on processing with negative and positive references. As multichannel test is performed under the same condition, common noise and variations (such as sensing system thermal, structural change and drifting) may be cancelled out by processing signals from different channels, as shown in diagram 7200 of FIG. 72.

While the description above provides some examples of using three flow channels, it is noted that the scope of the present disclosure is not limited to the description above. For example, in some embodiments, a single flow channel may be implemented in an example flow channel plate, and the single flow channel may be positioned on top of a waveguide to cover one or more sample channels and/or one or more reference channels in the waveguide. In some embodiments, more flow channels can be arranged with different target surrogates to have multiple results in one test. In some embodiments, multiple sensors can be arranged in each channel to provide error correction and noise reduction. In some embodiments, buried sensing region can be added to provide absolute reference to compensate the sensor signal variations with signals from the ambient environment.

As describes above, an example sample testing device in accordance with embodiment of the present disclosure may implement a light source that emits a laser light beam to a waveguide. It is noted that devices based on optical waveguides are finding use in various applications, from biosensing to quantum computing to communications and data processing. In some of those applications, the waveguides are a permanent part of the system. But in others, and especially in biosensing applications, they may need to be removable and disposable, which poses some technical challenges as laser light must generally be correctly coupled into a waveguide before it can be used. Correctly coupling the laser light to a waveguide generally requires aligning the waveguide to the focus of the laser (or to a fiber or another waveguide in which the light in already confined) to within a few microns. Such an requirement can be beyond the tolerances that can be achieved by machining or manufacturing of mechanical parts.

As such, the waveguide needs to be actively aligned to the light source after it is inserted into the system. However, manual alignment can be time consuming and requires a skilled operator. Moreover, the kinds of shock and vibration associated with normal use (e.g. setting a device down on a table, bumping it with an elbow, a loud machine running nearby) can move the waveguide relative to the light source by at least a few microns, requiring the alignment process to be repeated.

In accordance with various embodiments of the present disclosure, a laser alignment system that provides automated alignment of a laser light to a waveguide is provided. For example, various embodiments of the present disclosure may comprise features that can provide signals to an automated alignment system even when the laser source is initially badly misaligned to the waveguide. Various embodiments of the present disclosure may allow lower cost actuators (which may drift over time) to be used during alignment by providing feedback signals (which can be used to correct for drift).

Various embodiments of the present disclosure may provide various technical advantages over other systems, including, but not limited to, providing feedback even when the laser is badly misaligned with the waveguide. Various embodiments of the present disclosure are compatible with inexpensive, high drift actuators used in a continuous active servo control process.

In various embodiments of the present disclosure, an example method is provided. The example method may include patterning at least some optical features on the waveguide chip, and some optical features on the holder in which the waveguide chip is mounted. In some embodiments, as a laser source emits a laser light on one of the optical features, the optical feature may cause a redirection of the laser light (for example, only high spatial frequency or low spatial frequency light are redirected) and/or change in its characteristics (for example, a change in the light intensity). In some embodiments, an imaging component as described above (such as a camera pixel array or one or more photodiodes) may be positioned at specific locations to detect the laser light. In some embodiments, the camera pixel array or one or more photodiodes may convert the detected laser light into signals, which may be transmitted to a processor. Based on the signals, the processor may send control signals to an actuator or a motor to move the light source so that it is correctly aligned with the waveguide (additionally, or alternatively, to move the waveguide so that it is correctly aligned with the light source).

For example, based on the signals, the processor may send control signals to the actuator or the motor indicating which direction the light source should move in the "horizontal"

dimension (e.g. in the plane of the waveguide chip). In some embodiments, the laser light may be redirected from grating couplers patterned into the waveguide itself, such that, even if the laser source is initially far misaligned in the horizontal dimension, the laser source can be re-aligned to a waveguide leading to the grating coupler. In some embodiments, the grating couplers may redirect these laser light vertically onto a camera pixel array or one or more photodiodes, and the resulting signals differ when the laser source is aligned to one side of the waveguide chip as compared to when the laser source is aligned to the other side of the waveguide chip. As such, the signals generated by the camera pixel array or one or more photodiodes can indicate which way the laser source (or the waveguide chip) needs to move to be correctly aligned (for example, to the input coupler that is configured to receive the laser light and direct it to the waveguide chip).

Additionally, or alternatively, in the "vertical" dimension (e.g. in the plane that is normal to the waveguide chip), signals are reflected onto one or more photodiodes or camera pixel arrays differently from parts of the mount that is below the chip than from parts of the mount that is above the chip.

Figure 73A:
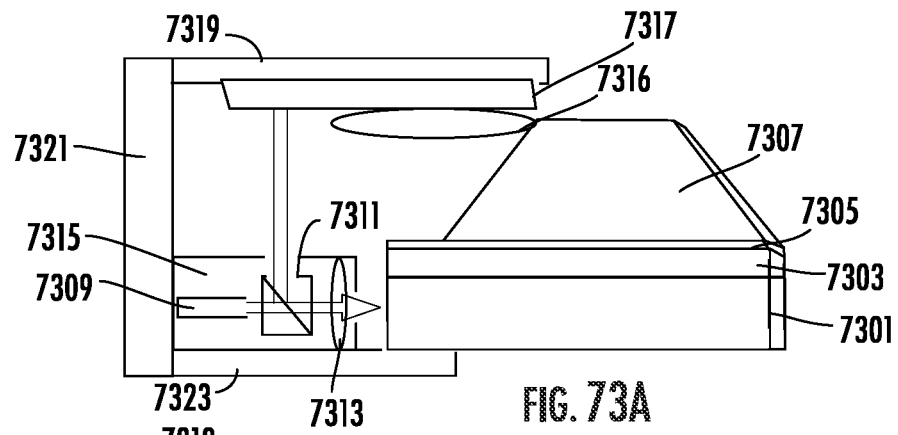
FIG. 73A illustrates an example cross-sectional side view associated with at least a portion of an example sample testing device and an example laser alignment device in accordance with various examples of the present disclosure.
Figure 73B:
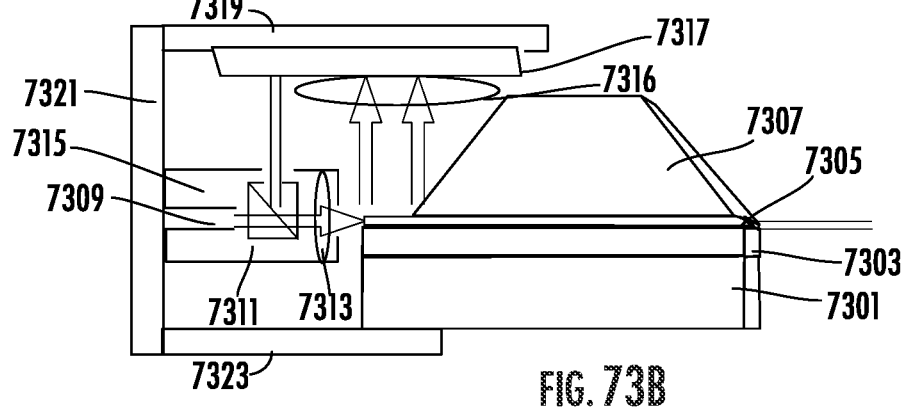
FIG. 73B illustrates an example cross-sectional side view associated with at least a portion of an example sample testing device and an example laser alignment device in accordance with various examples of the present disclosure.
Figure 73C:
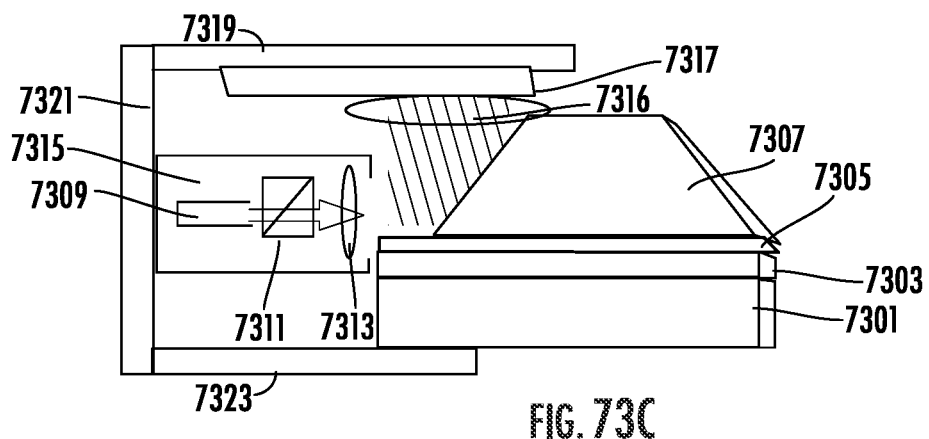
FIG. 73C illustrates an example cross-sectional side view associated with at least a portion of an example sample testing device and an example laser alignment device in accordance with various examples of the present disclosure.

Referring now to FIG. 73A, FIG. 73B, and FIG. 73C, example diagrams illustrating an example method of aligning a laser source to a waveguide chip in a vertical dimension is illustrated. In particular, the example method illustrated in FIG. 73A, FIG. 73B, and FIG. 73C may align the laser source with the waveguide chip in the vertical direction based on signals detected by a camera pixel array. In some embodiments, examples illustrated herein may provide many technical advantages, including but not limited to, providing robust alignment against background light pollution, accommodating for laser intensity variation, and avoiding interference from spurious reflections or scattering.

In the example shown in FIG. 73A, FIG. 73B, and FIG. 73C, a waveguide mount 7301, a waveguide chip including multiple layers (for example, a first layer 7303 and a second layer 7305), and a fluid cover 7307 are illustrated. In some embodiments, the waveguide chip is mounted on a top surface of the waveguide mount 7301. In some embodiments, the fluid cover 7307 is mounted on a top surface of the waveguide chip. In some embodiments, the second layer 7305 is mounted on a top surface of the first layer 7303.

In some embodiments, the waveguide mount 7301 and the waveguide chip may have different reflectivity rate of reflecting laser light. For example, the waveguide mount 7301 may have a 95% reflectivity rate. Additionally, or alternatively, the first layer 7303 of the waveguide chip may comprise silicon and have a 40% reflectivity rate. Additionally, or alternatively, the second layer 7305 of the waveguide chip may comprise silicon oxide that has a 4% reflectively rate.

Referring now to FIG. 73A, in some embodiments, the example method may comprise aiming the laser source 7309 at the waveguide mount 7301. In particular, the laser source 7309 may emit a laser light, and the laser light may travel through a beam splitter 7311 and a collimator 7313, similar to those described above. As the laser source 7309 is aimed at the waveguide mount 7301, and the waveguide mount 7301 has a 95% reflectivity rate, the waveguide mount 7301 may reflect the laser light back to the beam splitter 7311, and the beam splitter 7311 redirects the laser light upwards in a vertical dimension towards an imaging component 7317 (for example, a camera pixel array).

In some embodiments, the example method may include maximizing the brightness of the laser light detected by the imaging component 7317 based on tipping and/or tilting the beam splitter 7311.

In some embodiments, the example method may comprise causing movement of the laser source 7309 upwards in the vertical dimension. In the example shown in FIG. 73A, the laser source 7309, the beam splitter 7311, and the collimator 7313 are secured within a laser housing 7315 and aligned with one another. In some embodiments, the laser housing 7315 is moveably positioned on a vertical support wall 7321. For example, the laser housing 7315 may be attached to one or more sliding mechanisms (for example, a slider/track mechanism described above), and the position of the laser housing 7315 on the one or more sliding mechanisms is controlled by one or more actuators or motors (for example, the actuator or the motor may control the position of the slider on the track). As described above, the actuator or the motor is controlled by a processor, and the example method may comprise transmitting control signals from the processor to the actuator or the motor, such that the laser source 7309 moves upwards in the vertical dimension.

In some embodiments, one or more horizontal support walls (for example, the horizontal support wall 7319 and the horizontal support wall 7323) are disposed on an inner surface of the vertical support wall 7321. In the example shown in FIG. 73A, FIG. 73B, and FIG. 73C, the imaging component 7317 is mounted on the horizontal support wall 7319.

In some embodiments, the example method may comprise causing, by a processor, a laser source or an optical element from which it is refracted or reflected to move in a vertical dimension until detecting a change in the back-reflected power from the surface. In some embodiments, the characteristic reflectivity of the dielectric in which the waveguide is embedded can be used as a signal to indicate when the laser is incident on that film. For example, as the laser source 7309 continues to move upwards in the vertical dimension, the laser light emitted by the laser source 7309 arrives at the first layer 7303. As described above, the first layer 7303 has a reflectivity rate of 40%, compared the 95% reflectivity rate of the waveguide mount 7301. As such, the light received by the imaging component 7317 becomes dimmer as the laser source 7309 moves upwards in the vertical dimension from aiming at the waveguide mount 7301 to aiming at the first layer 7303.

In some embodiments, as the laser source 7309 continues to move upwards in the vertical dimension, the laser light emitted by the laser source 7309 arrives at the second layer 7305, as shown in FIG. 73B. As described above, the second layer 7305 has a reflectivity rate of 4%, compared the 40% reflectivity rate of the first layer 7303. As such, the light received by the imaging component 7317 becomes dimmer as the laser source 7309 moves upwards in the vertical dimension from aiming at the first layer 7303 to aiming at the second layer 7305.

In some embodiments, once the laser light emitted by the laser source 7309 arrives at the second layer 7305, the imaging component 7317 may detect grating coupler spots due to reflected laser light from grating couplers etched at the second layer 7305. In some embodiments, the reflected laser light from grating couplers travels through the collimator 7316 mounted on the imaging component 7317, forming the one or more grating coupler spots detected by the imaging component 7317.

In some embodiments, once the imaging component detects the one or more grating coupler spots, the example method further comprises causing the vertical movement of the laser source 7309 to stop, and initiating horizontal movement of the laser source 7309. In some embodiments, once the one or more grating coupler spots appear, the processor may determine that the laser source 7309 is correctly aligned in the vertical dimension, and may start the alignment of the laser source in the horizontal dimension. Details associated with the alignment in the horizontal dimension are described further in connection with at least FIG. 74, FIG. 75A, and FIG. 75B.

In some embodiments, as laser source 7309 continuously moving upwards in the vertical dimension, the laser source 7309 may inadvertently move from aiming at the second layer 7305 to aiming as the fluid cover 7307, as shown in FIG. 73C. In some embodiments, the fluid cover 7307 may comprise additional grating on the surface. When the laser source 7309 emits laser light toward the fluid cover 7307, the imaging component 7317 may detect additional spots due to laser light redirected by the additional grating on the surface of the fluid cover 7307. In some embodiments, these additional spots appear at locations that are different and away from the grating coupler spots detected by the imaging component when the laser light aims at the second layer 7305. Based on these locations, the processor may determine that the laser source 7309 has moved upwards and passed the second layer 7305, and may cause the laser source 7309 to move downwards in the vertical dimension.

Figure 74:
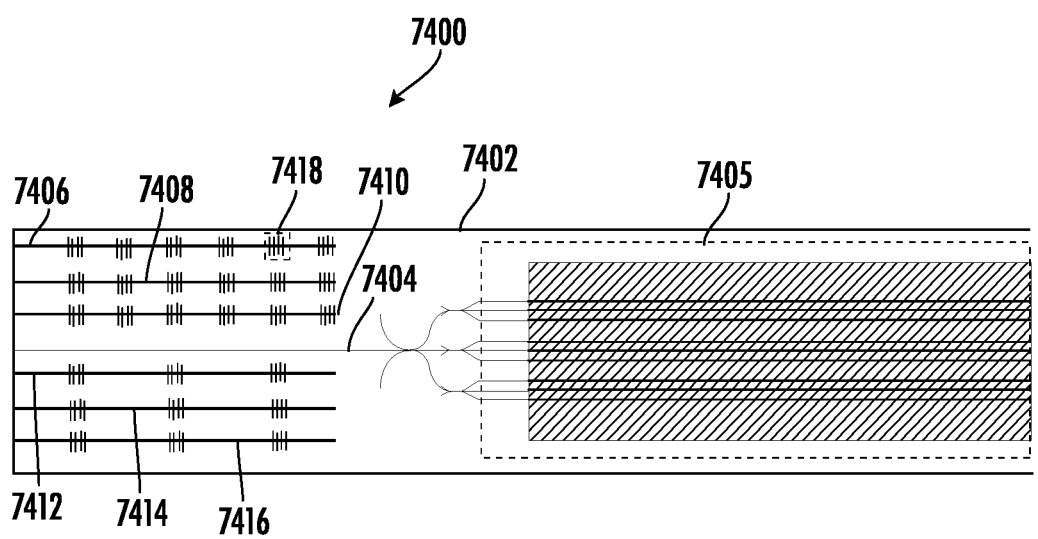
FIG. 74 illustrates an example top view associated with at least a portion of an example sample testing device in accordance with various examples of the present disclosure.

Referring now to FIG. 74, an example top view 7400 of an example waveguide chip 7402 is illustrated. In particular, the example top view 7400 illustrates example grating couplers patterns on the example waveguide chip 7402, which may facilitate the alignment of the laser source in the horizontal dimension as described above.

In the example shown in FIG. 74, the example waveguide chip 7402 may comprise an optical channel 7404, which corresponds to the correct channel that the laser source should be aiming at when it is correctly aligned (for example, a sample channel or a reference channel of the waveguide). In some embodiments, a fluid cover 7405 may be disposed on a top surface of the example waveguide chip 7402.

In some embodiments, the example waveguide chip 7402 may comprise one or more additional alignment channels, such as, but not limited to, alignment channel 7406, alignment channel 7408, alignment channel 7410, alignment channel 7412, alignment channel 7414, and alignment channel 7416.

In some embodiments, each of the alignment channels may comprise one or more grating couplers that are etched on the alignment channel (for example, a grating coupler 7418 of alignment channel 7406). In some embodiments, each of the grating couplers redirect laser light at a particular spatial frequency. As described above, the redirected laser light may further form one or more grating coupler spots as detected the imaging component. As such, based on the spatial frequency of detected grating coupler spot, the processor may cause movement of the laser source in the horizontal dimension so that the laser source is correctly aligned with the waveguide chip.

In the example shown in FIG. 74, the optical channel 7404 may divide the waveguide chip 7402 to two sides: one or more alignment channels (including the alignment channel 7406, the alignment channel 7408, the alignment channel 7410) are etched on a first side from the optical channel 7404, while one or more alignment channels (including the alignment channel 7412, the alignment channel 7414, the alignment channel 7416) are etched on a second side from the optical channel 7404. In some embodiments, alignment channels etched on the first side from the optical channel 7404 may comprise grating couplers that redirect laser light at a spatial frequency that is different from a spatial frequency in which grating couplers from alignment channels etched on the second side from the optical channel 7404 redirect the laser light.

For example, the alignment channel 7406, the alignment channel 7408, the alignment channel 7410 may comprise grating couplers that redirect the laser light at a low spatial frequency, and the alignment channel 7412, the alignment channel 7414, the alignment channel 7416 may comprise grating couplers that redirect the laser light at a high spatial frequency.

Figure 75A:
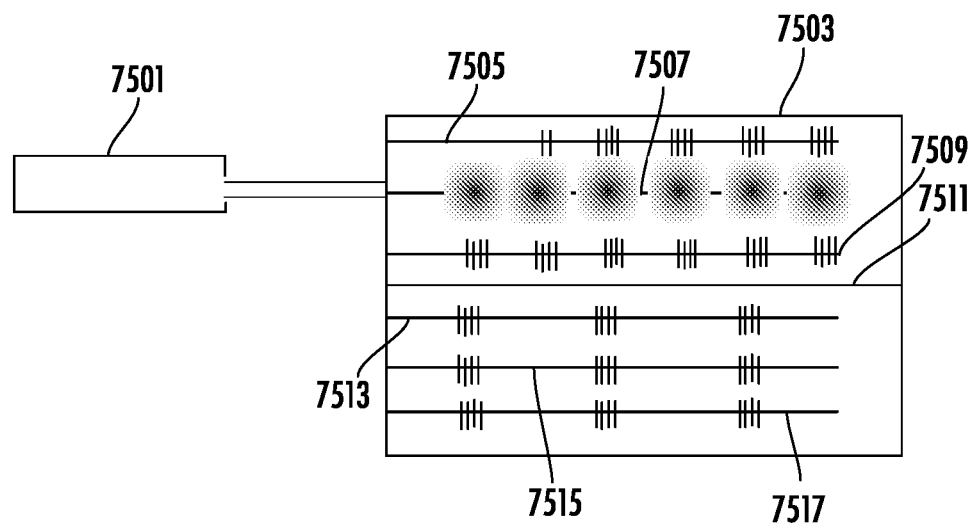
FIG. 75A illustrates an example top view associated with at least a portion of an example sample testing device and an example laser alignment device in accordance with various examples of the present disclosure.
Figure 75B:
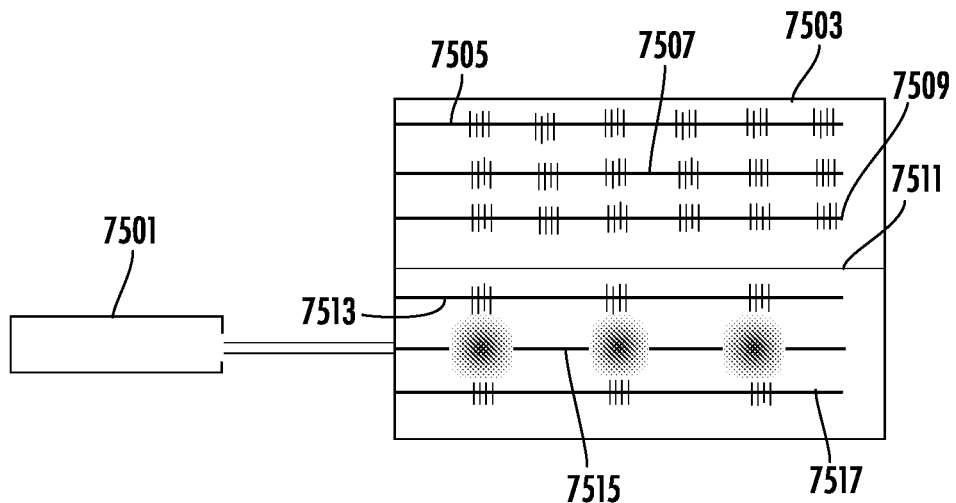
FIG. 75B illustrates an example top view associated with at least a portion of an example sample testing device and an example laser alignment device in accordance with various examples of the present disclosure.

Referring now to FIG. 75A and FIG. 75B, example diagrams illustrating an example method of aligning a laser source to a waveguide chip in a horizontal dimension are illustrated. In particular, the example method illustrated in FIG. 75A and FIG. 75B may align the laser source with the waveguide chip in the horizontal dimension based on signals detected by a camera pixel array.

Similar to the waveguide chip 7402 described above in connection with FIG. 74, the waveguide chip 7503 shown in FIG. 75A and FIG. 75B may comprise an optical channel 7511, which corresponds to the correct channel that the laser source should be aiming at when it is correctly aligned (for example, a sample channel or a reference channel of the waveguide). The example waveguide chip 7503 may comprise one or more additional alignment channels, such as, but not limited to, alignment channel 7505, alignment channel 7507, and alignment channel 7509 that are positioned on a first side from the optical channel 7511, as well as alignment channel 7513, alignment channel 7515, and alignment channel 7517 that are positioned on a second side from the optical channel 7511.

Similar to those described above, the alignment channel 7505, the alignment channel 7507, and the alignment channel 7509 may redirect laser light at a high spatial frequency, while the alignment channel 7513, the alignment channel 7515, and the alignment channel 7517 may redirect the laser light at a low spatial frequency. In some embodiments, each of the alignment channel 7505, the alignment channel 7507, and the alignment channel 7509, the alignment channel 7513, the alignment channel 7515, and the alignment channel 7517 may redirect the laser light at a different spatial frequency.

In some embodiments, an example method may comprise causing the laser source or an optical element from which it is refracted or reflected to move in a horizontal dimension in a direction indicated by a pattern of light diffracted from gratings formed in the waveguide or waveguides to either side of the target area for coupling into a main functional waveguide or a main channel of the waveguide. In some embodiments, the position or spatial frequency of the gratings being different on one side of the target area than the other as described herein. For example, the laser source 7501 may move in the horizontal dimension by an actuator or a motor, and the imaging component may detect one or more grating coupler spots as described above. For example, when the imaging component detects one or more grating coupler spots having a high spatial frequency, the processor may determine that the laser source 7501 has moved too far to the left side, and may cause the laser source 7501 to move towards the right side as shown in FIG. 75A. As used herein, the relative sides of "left" and "right" are based on viewing from the direction of the laser light from the laser source 7501 toward the waveguide chip 7503. As another example, when the imaging component detects one or more grating coupler spots having a low spatial frequency, the processor may determine that the laser source 7501 has moved too far to the right side, and may cause the laser source 7501 to move towards the left side as shown in FIG. 75B. In some embodiments, each of the alignment channel 7505, the alignment channel 7507, and the alignment channel 7509, the alignment channel 7513, the alignment channel 7515, and the alignment channel 7517 may redirect the laser light at a different spatial frequency. In such embodiments, the processor can determine the position of the laser source 7501 based on the detected spatial frequency, and may case the laser source 7501 to move accordingly. In some embodiments, the processor may cause the laser source to be continuously moving in the horizontal dimension until the laser source 7501 is correctly aligned in the horizontal dimension.

Figure 76A:
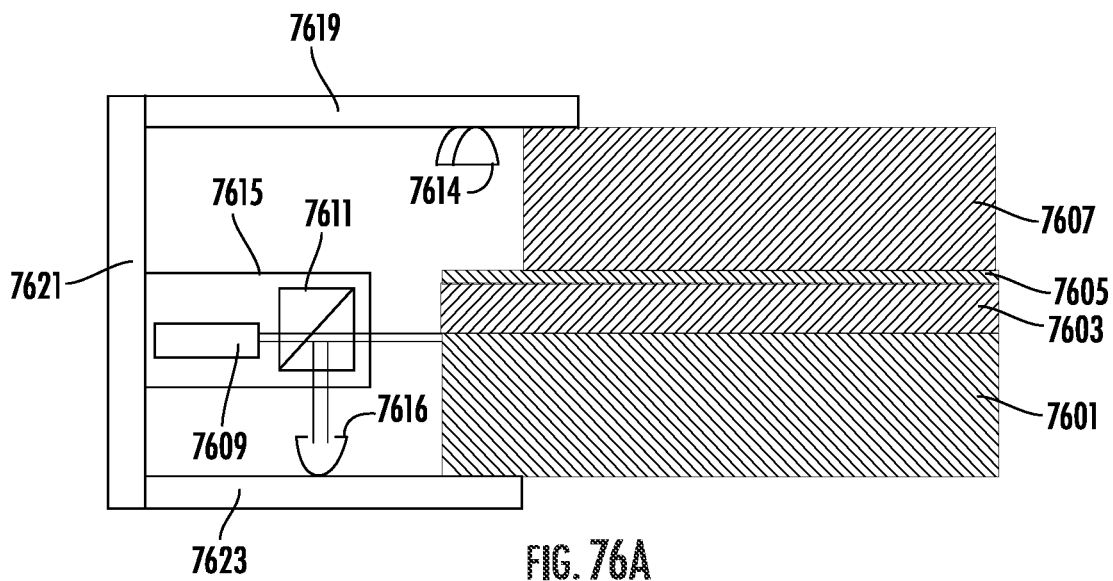
FIG. 76A illustrates an example cross-sectional side view associated with at least a portion of an example sample testing device and an example laser alignment device in accordance with various examples of the present disclosure.
Figure 76B:
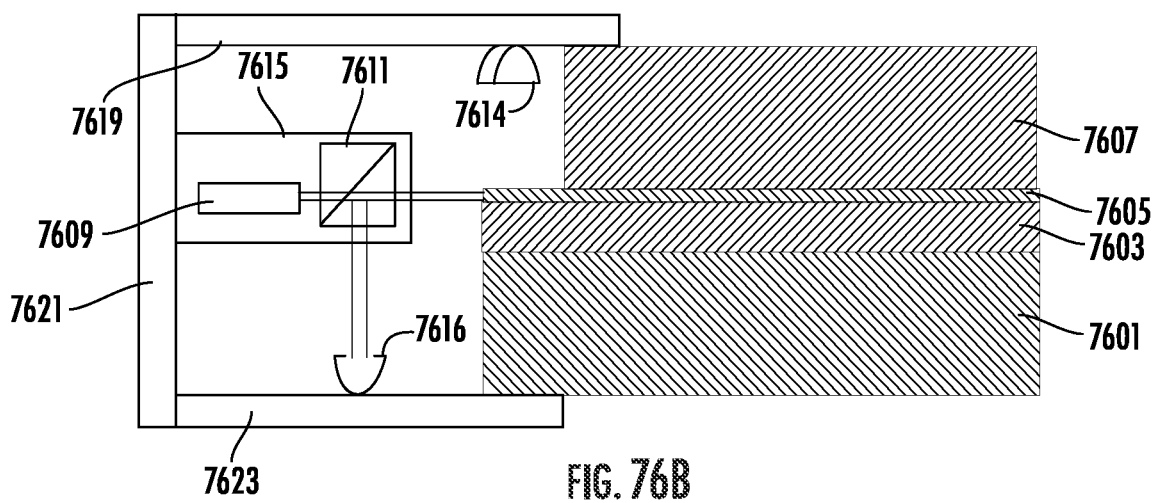
FIG. 76B illustrates an example cross-sectional side view associated with at least a portion of an example sample testing device and an example laser alignment device in accordance with various examples of the present disclosure.
Figure 76C:
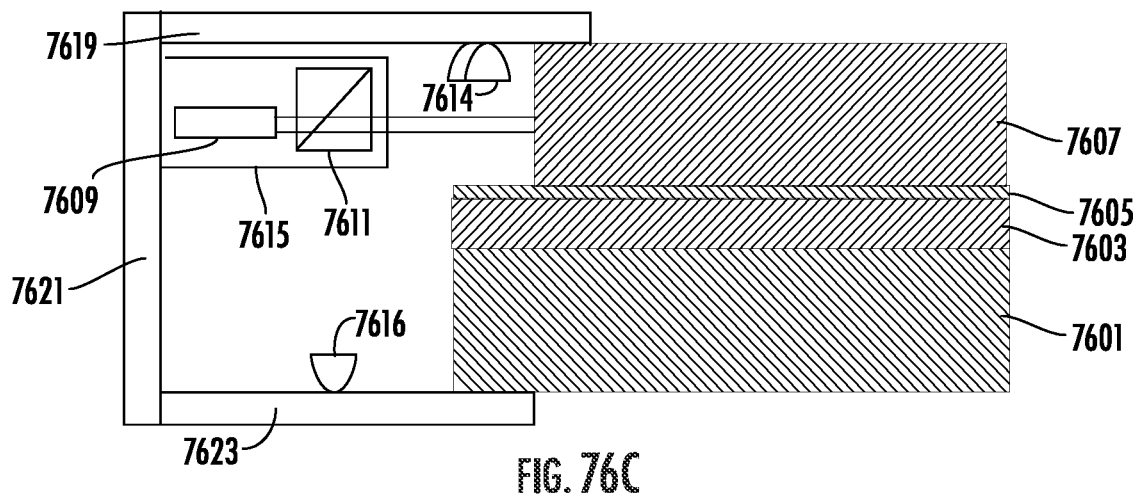
FIG. 76C illustrates an example cross-sectional side view associated with at least a portion of an example sample testing device and an example laser alignment device in accordance with various examples of the present disclosure.

Referring now to FIG. 76A, FIG. 76B, and FIG. 76C, example diagrams illustrating an example method of aligning a laser source to a waveguide chip in a vertical dimension is illustrated. In particular, the example method illustrated in FIG. 76A, FIG. 76B, and FIG. 76C may align the laser source with the waveguide chip in the vertical direction based on signals detected by one or more photodiodes.

In the example shown in FIG. 76A, FIG. 76B, and FIG. 76C, a waveguide mount 7601, a waveguide chip including multiple layers (for example, a first layer 7603 and a second layer 7605), and a fluid cover 7607 are illustrated. In some embodiments, the waveguide chip is mounted on a top surface of the waveguide mount 7601. In some embodiments, the fluid cover 7607 is mounted on a top surface of the waveguide chip. In some embodiments, the second layer 7605 is mounted on a top surface of the first layer 7603.

In some embodiments, the waveguide mount 7601 and the waveguide chip may have different reflectivity rate of reflecting laser light. For example, the waveguide mount 7601 may have a 95% reflectivity rate. Additionally, or alternatively, the first layer 7603 of the waveguide chip may comprise silicon and have a 40% reflectivity rate. Additionally, or alternatively, the second layer 7605 of the waveguide chip may comprise silicon oxide that has a 4% reflectively rate.

Referring now to FIG. 76A, in some embodiments, the example method may comprise aiming the laser source 7609 at the waveguide mount 7601. In particular, the laser source 7609 may emit a laser light, and the laser light may travel through a beam splitter, similar to those described above. As the laser source 7609 is aimed at the waveguide mount 7601, and the waveguide mount 7601 has a 95% reflectivity rate, the waveguide mount 7601 may reflect the laser light based on the beam splitter 7611, and the beam splitter 7611 redirects the laser light upwards in a vertical dimension towards a photodiode 7616.

In some embodiments, the example method may comprise causing movement of the laser source 7609 upwards in the vertical dimension. In the example shown in FIG. 76A, the laser source 7609 and the beam splitter 7611 are secured within a laser housing 7615 and aligned with one another. In some embodiments, the laser housing 7615 is moveably positioned on a vertical support wall 7621. For example, the laser housing 7615 may be attached to one or more sliding mechanisms (for example, a slider/track mechanism described above), and the position of the laser housing 7615 on the one or more sliding mechanisms is controlled by one or more actuators or motors (for example, the actuator or the motor may control the position of the slider on the track). As described above, the actuator or the motor is controlled by a processor, and the example method may comprise transmitting control signals from the processor to the actuator or the motor, such that the laser source 7609 moves upwards in the vertical dimension.

In some embodiments, one or more horizontal support walls (for example, the horizontal support wall 7619 and the horizontal support wall 7623) are disposed on an inner surface of the vertical support wall 7621. In the example shown in FIG. 76A, FIG. 76B, and FIG. 76C, one or more photodiodes 7614 is mounted on the horizontal support wall 7619.

In some embodiments, as the laser source 7609 continues to move upwards in the vertical dimension, the laser light emitted by the laser source 7609 arrives at the first layer 7603. As described above, the first layer 7603 has a reflectivity rate of 40% (compared the 95% reflectivity rate of the waveguide mount 7601). As such, the light received by the photodiode 7616 becomes dimmer as the laser source 7609 moves upwards in the vertical dimension from aiming at the waveguide mount 7601 to aiming at the first layer 7603.

In some embodiments, as the laser source 7609 continues to move upwards in the vertical dimension, the laser light emitted by the laser source 7609 arrives at the second layer 7605, as shown in FIG. 76B. As described above, the second layer 7605 has a reflectivity rate of 4% compared the 40% reflectivity rate of the first layer 7603. As such, the light received by the photodiode 7616 becomes dimmer as the laser source 7609 moves upwards in the vertical dimension from aiming at the first layer 7603 to aiming at the second layer 7605.

In some embodiments, the processing circuitry may determine that the laser source 7609 is aiming at the second layer 7605 based on the detected reflectivity rate.

Figure 77:
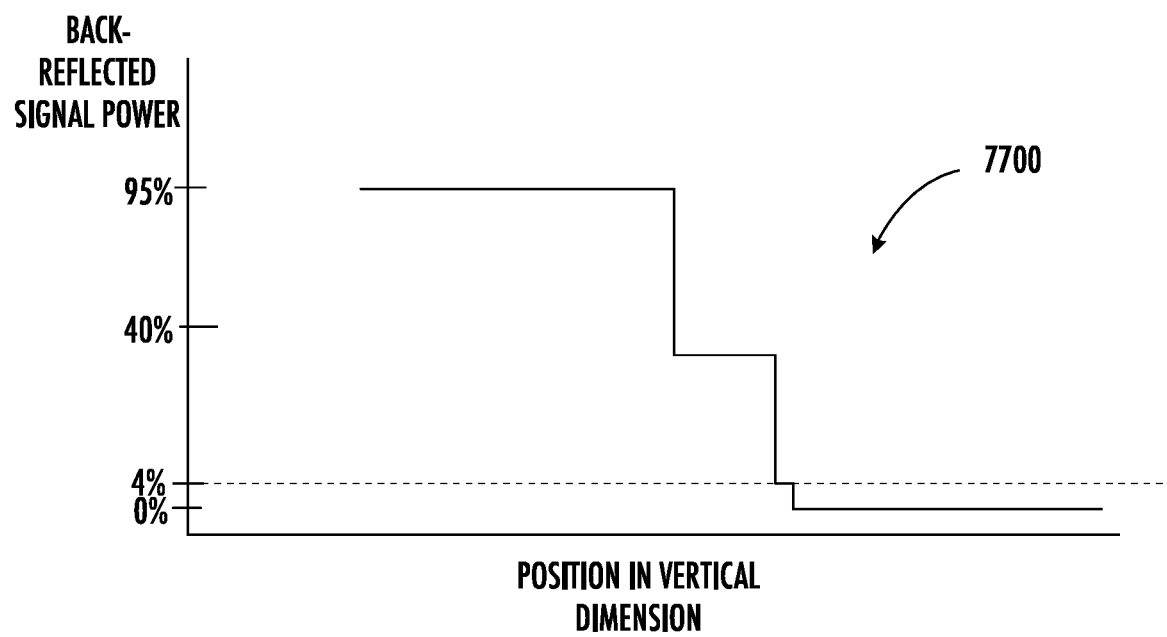
FIG. 77 illustrates an example diagram showing example signals from an example laser alignment device in accordance with various examples of the present disclosure.

Referring now to FIG. 77, an example diagram 7700 is illustrated. In particular, the example diagram 7700 illustrates an example relationship between the back-reflected signal power (for example, as detected by the photodiode 7616 shown in FIG. 76A to FIG. 76C) and the position of the laser source (for example, the laser source 7609) in the vertical dimension.

In the example diagram 7700, the example threshold of back-reflected signal power is set at 4%, which corresponds to the reflectivity rate of the second layer. In some embodiments, the back-reflected signal power may be calculated by dividing the power of light signal detected by the photodiode by the power of the light as emitted by the laser source. In some embodiments, a power monitor diode is implemented to distinguish between laser power change and reflectivity change.

In some embodiments, when the detected back-reflected signal power is above 4%, the processor may cause the laser source to move upwards in the vertical dimension (as shown in FIG. 76A). When the detected back-reflected signal power is below 4%, the processor may cause the laser source to move downwards in the vertical dimension (as described further in details in connection with at least FIG. 76C). In some embodiments, when the detected back-reflected signal power is approximately 4% (for example, within 15 um), the processor determines that the laser source is correctly aligned in the vertical direction.

Referring back to FIG. 76B, in some embodiments, once the processor determines that the laser source 7609 is aiming at the second layer 7605, the example method further comprises causing the vertical movement of the laser source 7609 to stop, and initiating horizontal movement of the laser source 7609. In some embodiments, the processor may determine that the laser source 7609 is correctly aligned in the vertical dimension, and may start the alignment of the laser source in the horizontal dimension. Details associated with the alignment in the horizontal dimension are described further in connection with at least FIG. 78, FIG. 79A, and FIG. 79B.

In some embodiments, as laser source 7609 continuously moving upwards in the vertical dimension, the laser source 7609 may inadvertently move from aiming at the second layer 7605 to aiming as the fluid cover 7607, as shown in FIG. 76C. In some embodiments, the fluid cover 7607 may have a low reflectivity rate, and the photodiode 7616 may detect little to no reflected light, indicating a below-threshold back-reflected signal power as shown in FIG. 77. In this example, the processor may determine that the laser source 7609 has moved too upwards and passed the second layer 7605, and may cause the laser source 7609 to move downwards in the vertical dimension.

Figure 78:
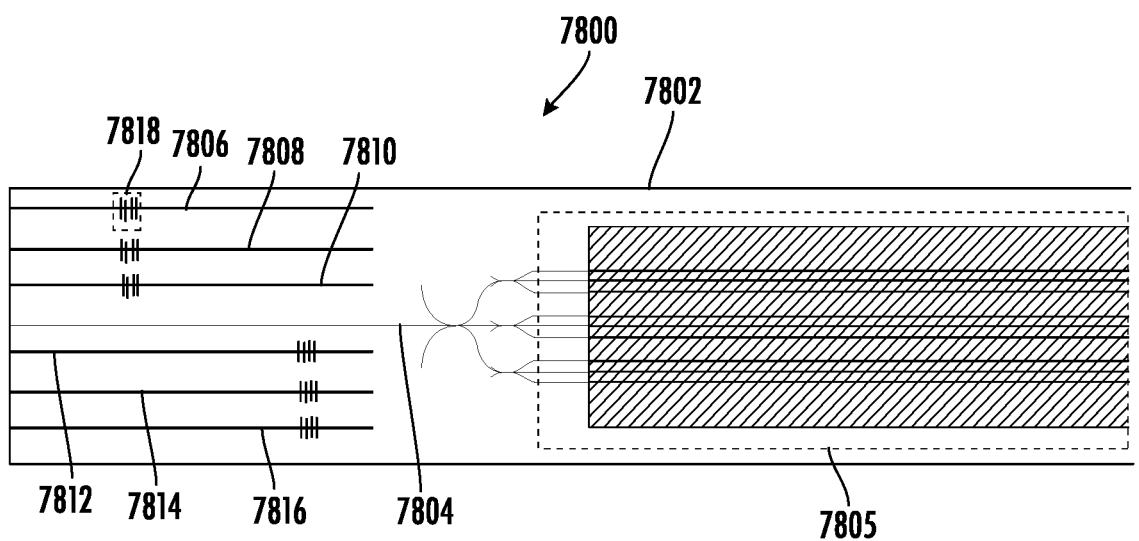
FIG. 78 illustrates an example top view associated with at least a portion of an example sample testing device in accordance with various examples of the present disclosure.

Referring now to FIG. 78, an example top view 7800 of an example waveguide chip 7802 is illustrated. In particular, the example top view 7800 illustrates example grating couplers patterns on the example waveguide chip 7802, which may facilitate the alignment of the laser source in the horizontal dimension as described above.

In the example shown in FIG. 78, the example waveguide chip 7802 may comprise an optical channel 7804, which corresponds to the correct channel that the laser source should be aiming at when it is correctly aligned (for example, a sample channel or a reference channel of a waveguide). In some embodiments, a fluid cover 7805 may be disposed on a top surface of the example waveguide chip 7802.

In some embodiments, the example waveguide chip 7802 may comprise one or more additional alignment channels, such as, but not limited to, alignment channel 7806, alignment channel 7808, alignment channel 7810, alignment channel 7812, alignment channel 7814, and alignment channel 7816. In some embodiments, each of the alignment channels may comprise one or more grating couplers that are etched on the alignment channel (for example, a grating coupler 7818 of alignment channel 7806).

In the example shown in FIG. 78, the optical channel 7804 may divide the waveguide chip 7802 to two sides: one or more alignment channels (including the alignment channel 7806, the alignment channel 7808, the alignment channel 7810) are etched on a first side from the optical channel 7804, while one or more alignment channels (including the alignment channel 7812, the alignment channel 7814, the alignment channel 7816) are etched on a second side from the optical channel 7804. In some embodiments, alignment channels etched on the first side from the optical channel 7804 may comprise grating couplers that located in their respective alignment channels differently from the respective locations of the grating couplers in the alignment channels on the second side from the optical channel 7804.

For example, the alignment channel 7806, the alignment channel 7808, and the alignment channel 7810 may comprise grating couplers that are located closer to the laser source as compared to the locations of the grating couplers in the alignment channel 7812, the alignment channel 7814, and the alignment channel 7816. As described above, each of the grating couplers may redirect laser light (for example, upwards in the vertical dimension). In some embodiments, one or more photodiodes are positioned above each of the grating couplers to receive the reflected laser light from each of the grating couplers. In some embodiments, based on which of the one or more photodiodes detects the reflected laser light, the processor may align the laser source in the horizontal dimension.

Figure 79A:
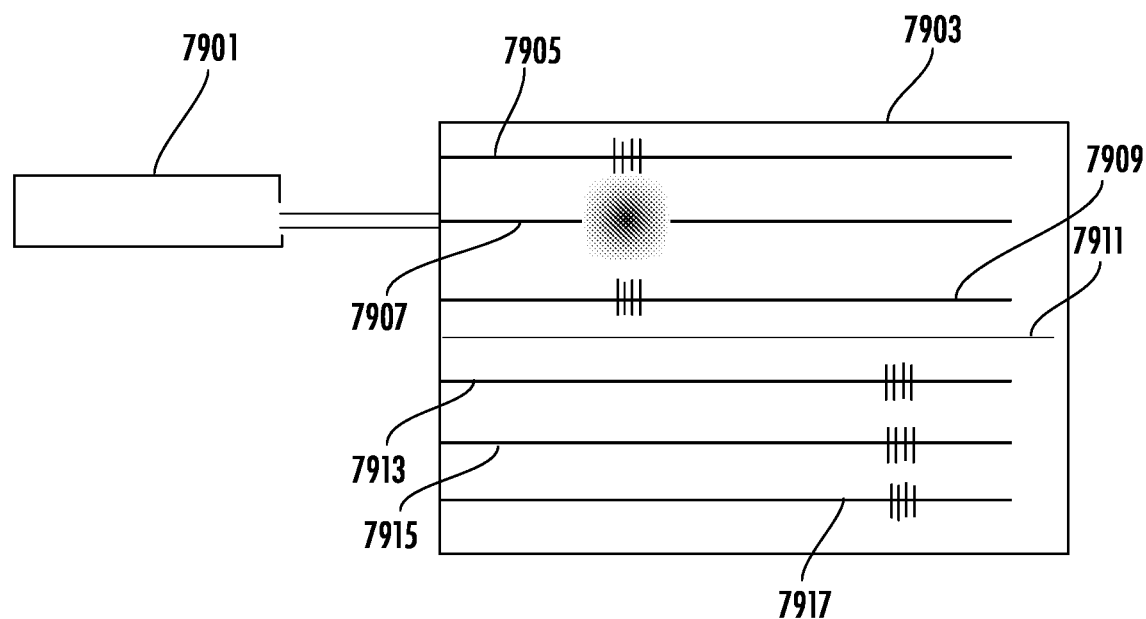
FIG. 79A illustrates an example top view associated with at least a portion of an example sample testing device and an example laser alignment device in accordance with various examples of the present disclosure.
Figure 79B:
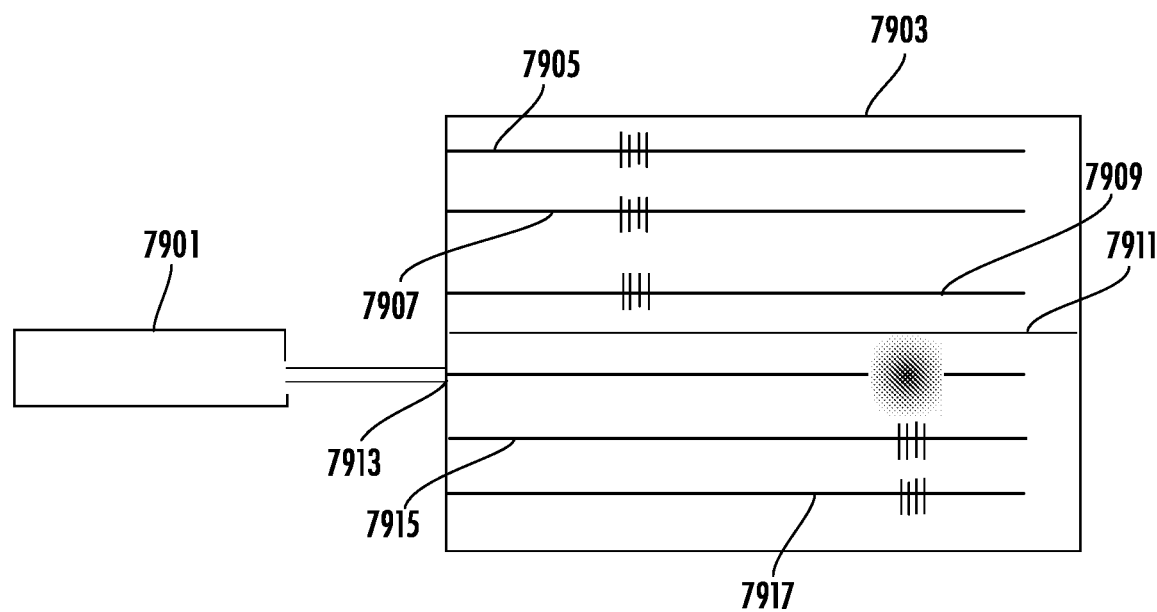
FIG. 79B illustrates an example top view associated with at least a portion of an example sample testing device and an example laser alignment device in accordance with various examples of the present disclosure.

Referring now to FIG. 79A and FIG. 79B, example diagrams illustrating an example method of aligning a laser source to a waveguide chip in a horizontal dimension is illustrated. In particular, the example method illustrated in FIG. 79A and FIG. 79B may align the laser source with the waveguide chip in the horizontal dimension based on signals detected by one or more photodiodes.

Similar to the waveguide chip 7802 described above in connection with FIG. 78, the waveguide chip 7903 shown in FIG. 79A and FIG. 79B may comprise an optical channel 7911, which corresponds to the correct channel that the laser source should be aiming at when it is correctly aligned (for example, a sample channel or a reference channel of a waveguide). The example waveguide chip 7903 may comprise one or more additional alignment channels, such as, but not limited to, alignment channel 7905, alignment channel 7907, and alignment channel 7909 that are positioned on a first side from the optical channel 7911, as well as alignment channel 7913, alignment channel 7915, and alignment channel 7917 that are positioned on a second side from the optical channel 7911.

As illustrated in FIG. 79A and FIG. 79B, the grating couplers of the alignment channel 7905, the alignment channel 7907, and the alignment channel 7909 are positioned closer to laser source 7901 as compared to the positions of the grating couplers of the alignment channel 7913, the alignment channel 7915, and the alignment channel 7917. In some embodiments, one or more photodiodes may be positioned above the grating couplers of the alignment channel 7905, the alignment channel 7907, and the alignment channel 7909, and one or more photodiodes may be positioned above the grating couplers of alignment channel 7913, alignment channel 7915, and alignment channel 7917.

In some embodiments, the laser source 7901 may move in the horizontal dimension by an actuator or a motor, and one or more photodiodes may detect one or more signals as described above. For example, when the one or more photodiodes positioned above the grating coupler of alignment channel 7907 detect reflected laser light, the processor may determine that the laser source 7901 has moved too far to the left side, and may cause the laser source 7051 to move towards the right side as shown in FIG. 79A. As used herein, the relative sides of "left" and "right" are based on viewing from the direction of the laser light from the laser source 7901 toward the waveguide chip 7903. As another example, when the one or more photodiodes positioned above the grating coupler of alignment channel 7913 detect reflected laser light, the processor may determine that the laser source 7901 has moved too far to the right side, and may cause the laser source 7901 to move towards the left side as shown in FIG. 79B. In some embodiments, the processor may cause the laser source to be continuously moving in the horizontal dimension until the laser source 7901 is correctly aligned based on none of the photodiodes detect any reflected laser light.

In some embodiments, an example method for aligning the laser source with the waveguide chip is provided. In some embodiments, when aligning the laser source to the waveguide in the vertical dimension or the horizontal dimension, the actuator or the motor may cause the laser source to take approximately 100 um steps of movements in the direction as determined by the processor, and stop when a threshold is met based on the examples described above (for example, when the spatial frequency changes or when the photodiode detects reflected light). In some embodiments, examples of the present disclosure may engage fine control motors. Additionally, or alternatively, when aligning the laser source to the waveguide in the vertical dimension or the horizontal dimension, the actuator or the motor may cause the laser source to sweep continuously in the direction as determined by the processor, until the target threshold is crossed. Once the target threshold is crossed, the processor may cause the laser source to move in the opposite direction until the target threshold is crossed again. This process may be repeated to determine the optimum location for aligning the laser source (for example, the exact location where the target threshold is crossed).

One of the many technical challenges associated with sample testing (for example, when testing for the presence of a virus in a collected sample) is false negative or false positive readings. For example, in an antigen or molecular test, there is a need to identify and eliminate false negative readings. When the test result of a sample (for example, collected through a swab or a breath/aerosol sampling device) is negative, it can be challenging to determine whether the result is negative because there is no viral content in the collected sample, or whether because there is an insufficient amount of sample that has been collected.

Various embodiments of the present disclosure may overcome the above-referenced challenges. For example, during the sample collection of breath aerosol for a viral test, the collected sample may comprise one or more proteins, bio-chemicals or enzymes that are naturally present in the breath aerosol regardless of whether there is viral content (e.g. regardless of whether the breath aerosol is contagious with virus). The concentration level of such proteins, bio-chemicals, and/or enzymes in the collected sample may be analyzed, which may provide basis for determining whether a sufficient amount of sample has been collected. As such, various embodiments of the presence disclosure may reduce or eliminate the possibilities of reporting a false negative result.

Figure 80:
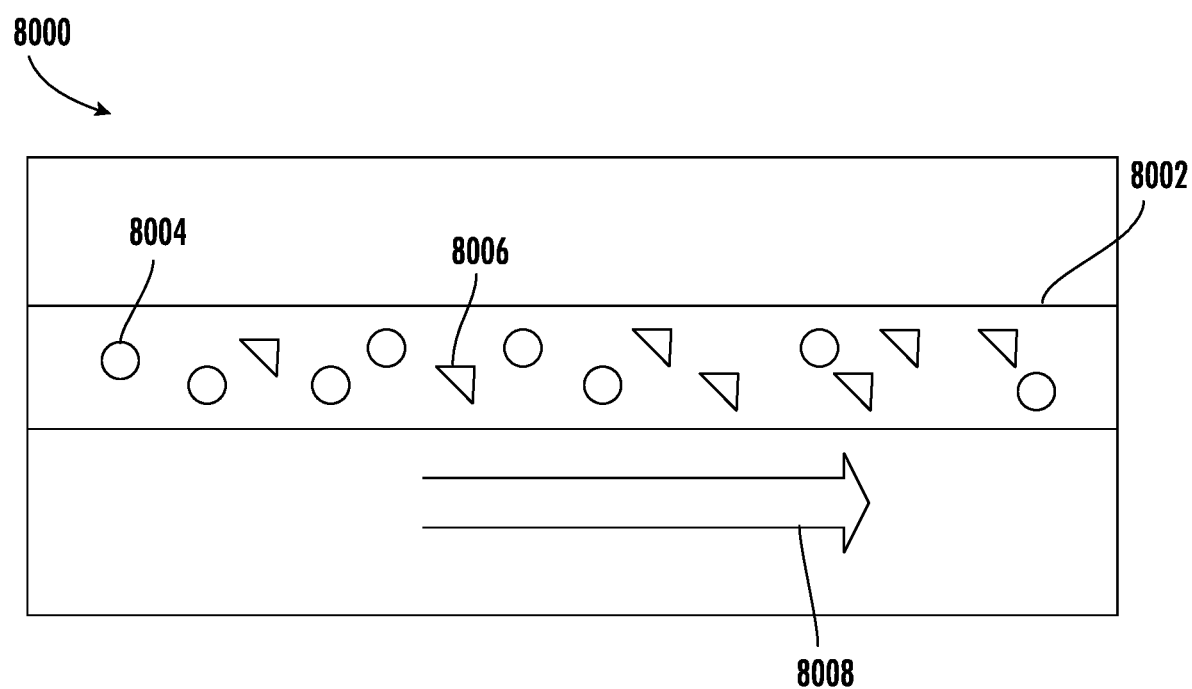
FIG. 80 illustrates an example diagram showing an example flow channel and example non-viral indicator of biological content and example viral indicator of biological content in accordance with various examples of the present disclosure.

Referring now to FIG. 80, an example diagram 8000 is illustrated. In particular, the example diagram 8000 illustrates a sample medium flows through a flow channel 8002 of a waveguide in the direction as shown by arrow 8008. For example, the waveguide may be configured to receive sample medium comprising non-viral indicator of the biological content and viral indicator of the biological content.

In some embodiments, the collected sample medium may comprise both viral indicator of biological content 8004 and non-viral indicator of biological content 8006. In the present disclosure, the term "viral indicator of biological content" refers to proteins/bio-chemicals/enzymes in a collected sample that indicate the presence of a biological content to be detected by a sample testing device in the collected sample. Examples of viral indicator of biological content may include, but are not limited to, viruses to be detected by the sample testing device, protein fragments associated the viruses to be detected by the sample testing device, and/or biomarkers associated with a virus state or condition. The term "non-viral indicator of biological content" refers to proteins/bio-chemicals/enzymes that are always present in a collected sample, regardless of whether biological content to be detected by a sample testing device is present in the collected sample. Examples of non-viral indicator of biological content may include, but are not limited to, certain amino acid, certain volatile organic compounds and/or the like that are always present in the exhale breath.

Figure 81:
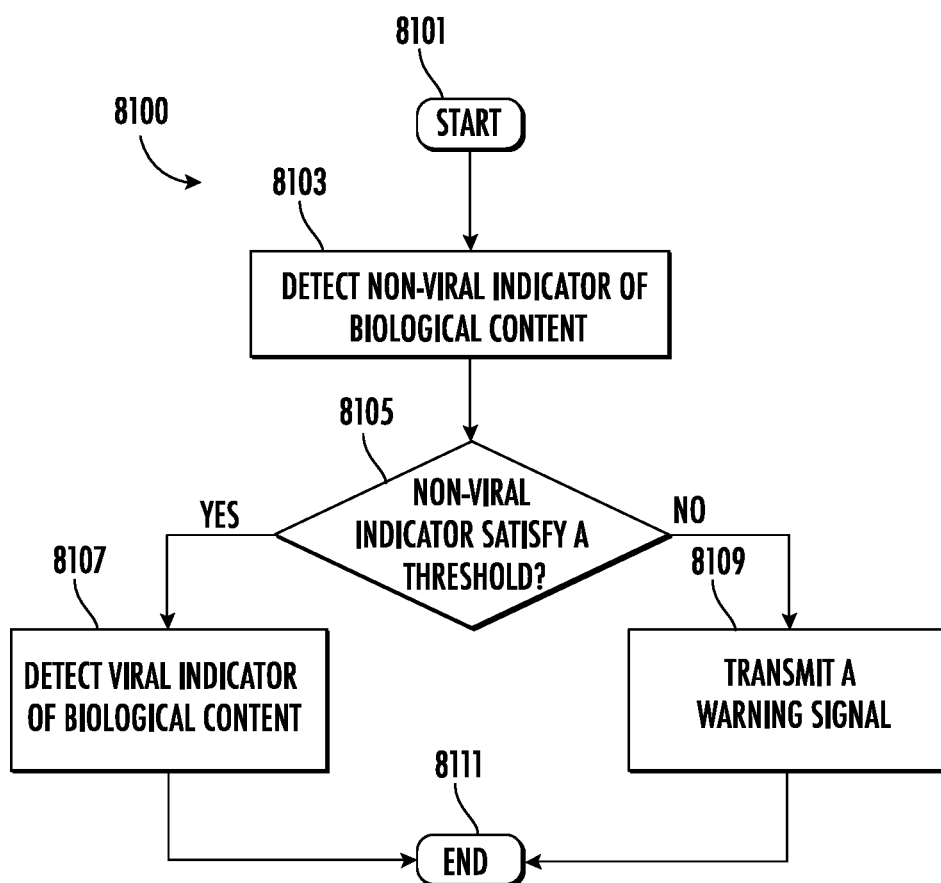
FIG. 81 illustrates an example diagram showing an example method in accordance with various examples of the present disclosure.

Referring now to FIG. 81, an example method 8100 is illustrated. In particular, the example method 8100 illustrates utilizing a minimum viable concentration of proteins, bio-chemicals and/or enzymes to determine whether a sufficient amount of sample has been collected. Once the minimum concentrations is confirmed in the collected sample, it can be determined that a sufficient amount of sample has been collected for an accurate testing.

The example method 8100 starts at step/operation 8101 and proceeds to step/operation 8103. At step/operation 8103, the example method 8100 includes detecting the non-viral indicator of biological content in a collected sample and/or determining a concentration level of the non-viral indicator of biological content in the collected sample.

In some embodiments, the example method 8100 may implement various sample testing devices in accordance with the present disclosure to detect the non-viral indicator of biological content in a collected sample. For example, the collected sample may be provided to a flow channel described herein. In some embodiments, the flow channel may be configured to detect a concentration level of the non-viral indicator of biological content. As an example, the flow channel may detect that the collected sample comprises 0.5 mass per milliliter of non-viral indicator of biological content in the collected sample.

Referring back to FIG. 81, at step/operation 8105, the example method 8100 includes determining whether a concentration level of non-viral indicator of biological content satisfies a threshold.

In some embodiments, the threshold may be determined based on the non-viral indicator of biological content and/or the viral indicator of biological content that is to be tested. For example, if a type of non-viral indicator of biological content normally has a concentration level among 1 mass per milliliter in a collected sample, the threshold may be set at 1 mass per milliliter. As another example, if detecting a type of viral indicator of biological content requires that the non-viral indicator of biological content to be at a concentration level of at least 2 mass per milliliter, the threshold may be adjusted based on the 2 mass per milliliter concentration level.

In some embodiments, the threshold may be determined based on collecting multiple samples and calculating a mean or an average concentration level of the non-viral indicator of biological content in the samples. In some embodiments, the threshold may be determined in other ways.

Referring back to FIG. 81, if, at step/operation 8105, the concentration level of non-viral indicator of biological content satisfies a threshold, the example method 8100 proceeds to step/operation 8107. At step/operation 8107, the example method 8100 includes detecting the amount of viral indicator of biological content.

Continuing from the above example, if the threshold is 0.2 mass per milliliter, and the concentration level of the non-viral indicator of biological content detected at step/operation 8103 is 0.5 mass per milliliter, the concentration level of the non-viral indicator of biological content satisfies the threshold. In other words, a sufficient amount of sample has been collected to ensure accurate testing.

In some embodiments, the example method 8100 may implement various sample testing devices in accordance with the present disclosure to detect the amount of viral indicator of biological content in a collected sample. For example, the collected sample may be provided to a flow channel described herein. In some embodiments, the flow channel may be configured to detect a concentration level of the viral indicator of biological content.

Referring back to FIG. 81, if, at step/operation 8105, the amount of non-viral indicator of biological content does not satisfy a threshold, the example method 8100 proceeds to step/operation 8109. At step/operation 8109, the example method 8100 includes transmitting a warning signal.

Continuing from the above example, if the threshold is 1 mass per milliliter, and the concentration level of the non-viral indicator of biological content detected at step/operation 8103 is 0.5 mass per milliliter, the concentration level of the non-viral indicator of biological content does not satisfy the threshold. In other words, a sufficient amount of sample has not been collected.

In some embodiments, the warning signal may be generated by a processor and transmitted to a display device (such as, but not limited to, a computer display). For example, the warning signal may cause the display device to render a message warning the user that a sufficient amount of sample has not been collected, and/or that the testing result may be inaccurate. In some embodiments, the user may discard the collected sample, and may initiate the collection of a new sample.

Referring back to FIG. 81, subsequent to step/operation 8107 and/or step/operation 8109, the example method 8100 ends at step/operation 8111.

Figure 82:
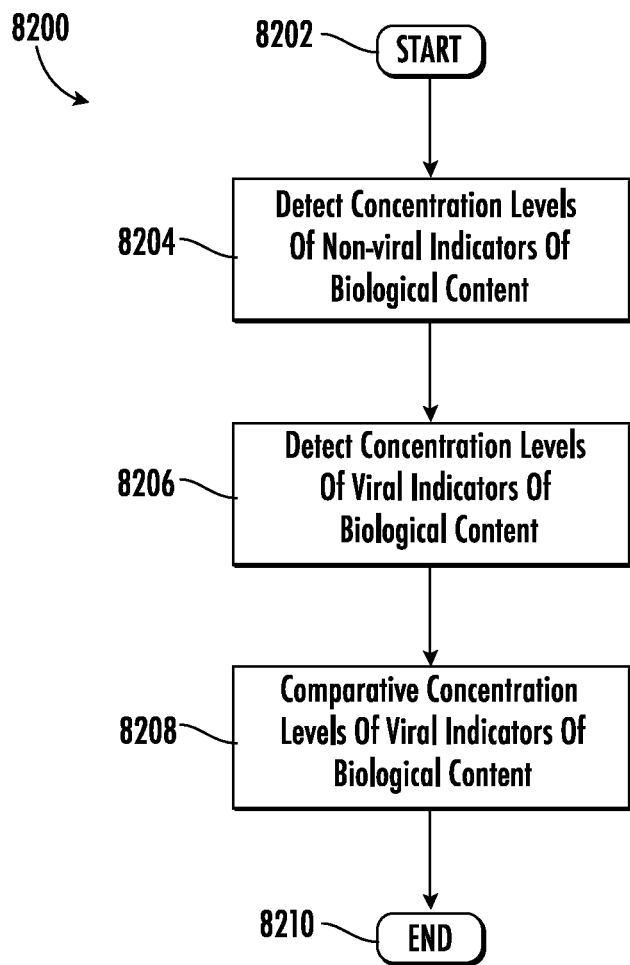
FIG. 82 illustrates an example diagram showing an example method in accordance with various examples of the present disclosure.

Referring now to FIG. 82, an example method 8200 is illustrated. In particular, the example method 8200 illustrates utilizing concentration levels of non-viral indicators of biological content to impute comparative concentration levels of viral indicators of biological content in different collected samples.

The example method 8200 starts at step/operation 8202 and proceeds to step/operation 8204. At step/operation 8204, the example method 8200 includes detecting concentration levels of non-viral indicators of biological content in multiple collected samples.

Similar to those described above in connection with at least step/operation 8103 of FIG. 81, in some embodiments, the example method 8200 may implement various sample testing devices in accordance with the present disclosure to detect concentration levels of the non-viral indicators of biological contents in collected samples.

As an example, the example method 8200 may determine that a first collected sample comprises 0.8 mass per milliliter of non-viral indicator of biological content, and a second collected sample comprises 1.8 mass per milliliter of non-viral indicator of biological content.

At step/operation 8206, the example method 8200 includes detecting concentration levels of viral indicators of biological content in multiple collected samples.

Similar to those described above in connection with at least step/operation 8107 of FIG. 81, in some embodiments, the example method 8200 may implement various sample testing devices in accordance with the present disclosure to detect concentration levels of the viral indicators of biological contents in collected samples.

As an example, the example method 8200 may determine that a first collected sample comprises 0.4 mass per milliliter of viral indicator of biological content, and a second collected sample comprises 0.6 mass per milliliter of viral indicator of biological content.

Referring back to FIG. 82, at step/operation 8208, the example method 8200 includes calculating comparative concentration levels of viral indicators of biological content in multiple collected samples.

In the present disclosure, the term "comparative concentration level of viral indicators of biological content" refers to a normalized concentration level of a viral indicator of biological content in a collected sample of multiple collected samples based on the concentration level of a non-viral indicator of biological content in multiple collected samples. In some embodiments, the concentration level of non-viral indicator of biological content may serve as a standard for normalizing the concentration level of viral indicators of biological content in different collected samples. In some embodiments, a comparative concentration level of viral indicator of biological content may be calculated based on the following equation:

$$C_c = \frac{C_v}{C_{nv}}$$

In the above equation, $C_c$ stands for the comparative concentration level of a viral indicator of biological content, $C_v$ stands for a concentration level of a viral indicator of biological content, and $C_{nv}$ stands for a concentration level of a non-viral indicator of biological content.

Continuing from the example above, the first collected sample has a 0.8 mass per milliliter of non-viral indicator of biological content and 0.4 mass per milliliter of viral indicator of biological content. As such, the comparative concentration level of a viral indicator of biological content of the first collected sample is 0.5. The second collected sample has a 1.8 mass per milliliter of non-viral indicator of biological content and 0.6 mass per milliliter of viral indicator of biological content. As such, the comparative concentration level of a viral indicator of biological content of the second collected sample is 0.33. In such an example, the first collected sample has a higher comparative concentration level of a viral indicator of biological content than that of the second collected sample, which indicates that the first collected sample can be more contagious than the second collected sample.

Referring back to FIG. 82, subsequent to step/operation 8208, the example method 8100 ends at step/operation 8210.

Many multichannel waveguide illumination suffers from technical challenges such as, but not limited to, input beam splitter causing non-uniformity lasers between channels, low light efficiency, high input power requirements, and/or the like. For example, the higher the number of channels, the higher the total input power that is required to illuminate these channel, and the required total input power can be too high to be practical. As such, there is a need for alternative light input method for a multichannel waveguide.

In various embodiments of the present disclosure, a sample testing device (such as a multichannel waveguide biosensor) can detect multiple virus types simultaneously to effectively overcoming technical challenges associated with detecting virus variants. In some embodiments, an example sample testing device (such as a scanning multichannel waveguide biosensor) uses a laser beam that scans through each waveguide channel for providing input to the waveguide channels. With scanning laser beam input, only one channel is illuminated at a time, which ensures that the input power of the laser beam to each channel in the waveguide is the same. As such, various embodiments of the present disclosure provide a mechanism of providing laser beam input having the same power to multiple channels. In some embodiments, an example sample testing device (such as a scanning multichannel waveguide biosensor) can provide line scan with pitch and roll control (optionally along with a piezo-electric actuator), which can satisfy the multichannel waveguide input alignment requirement. As such, various embodiments of the present disclosure provide electromagnetic scan and alignment control that provide low cost solution. In addition to various advantages such as input power efficiency, providing laser light to one channel at a time also eliminates crosstalk and unwanted interference between neighboring channels, which provides clean signals that improve sensitivity for low concentration bio detection.

Figure 83A:
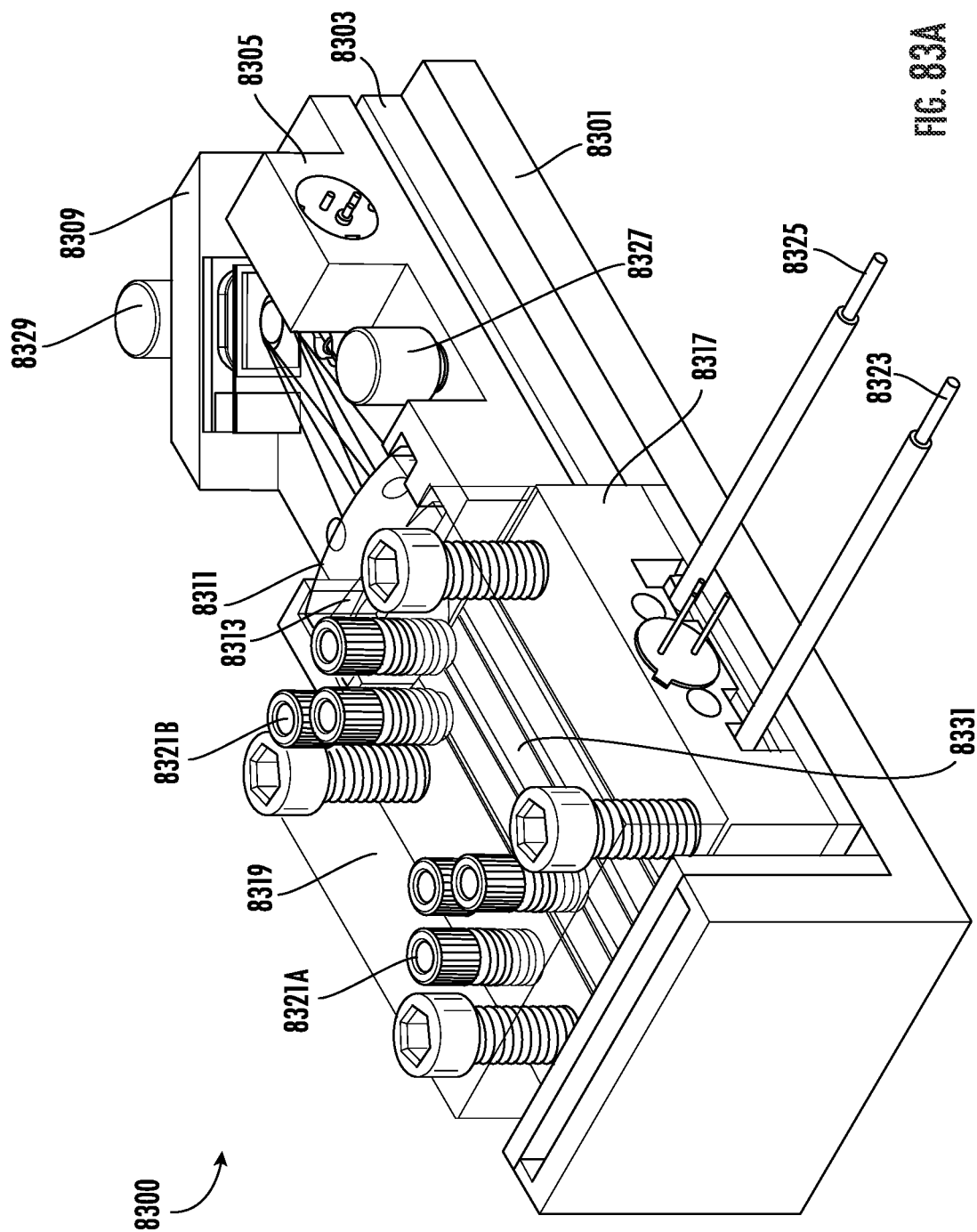
FIG. 83A illustrates an example perspective view of a sample testing device in accordance with various examples of the present disclosure.
Figure 83B:
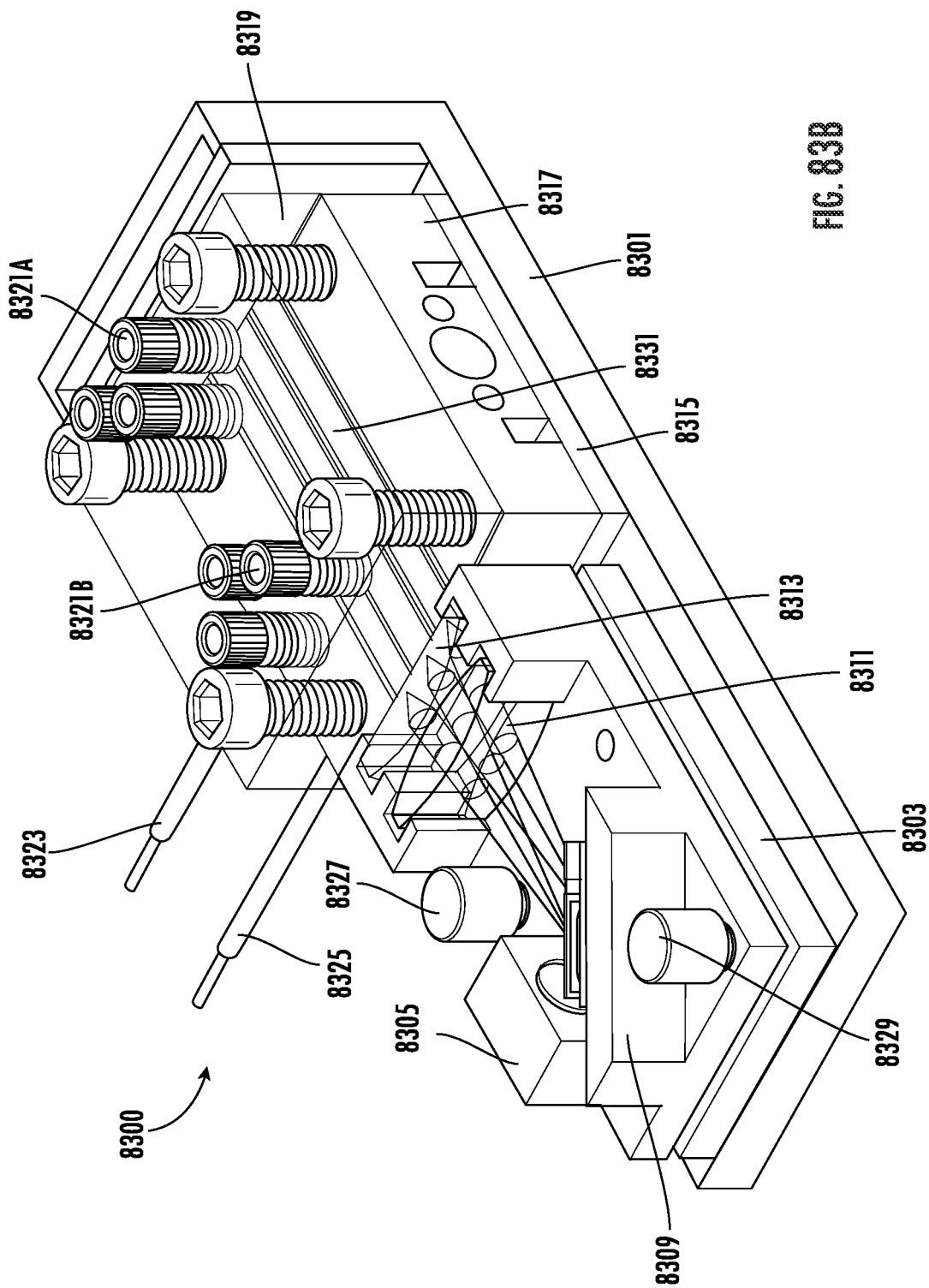
FIG. 83B illustrates another example perspective view of a sample testing device in accordance with various examples of the present disclosure.
Figure 83C:
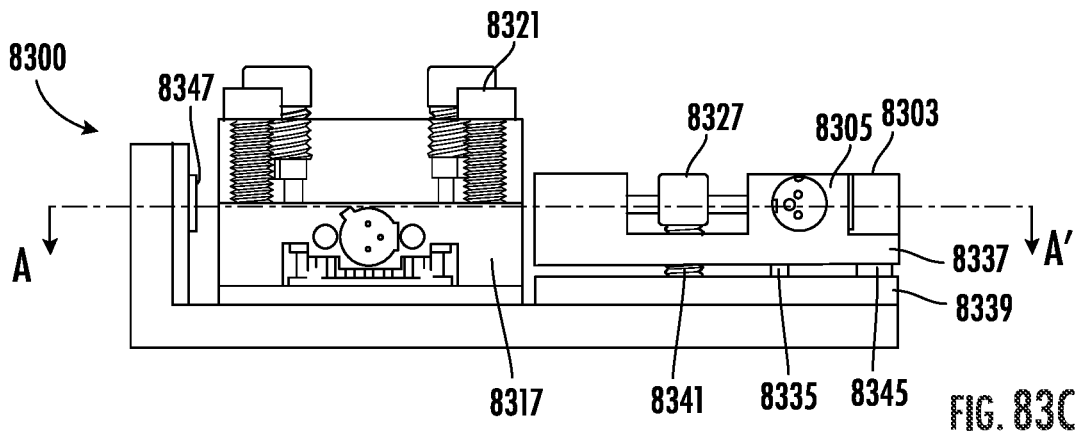
Figure 83D:
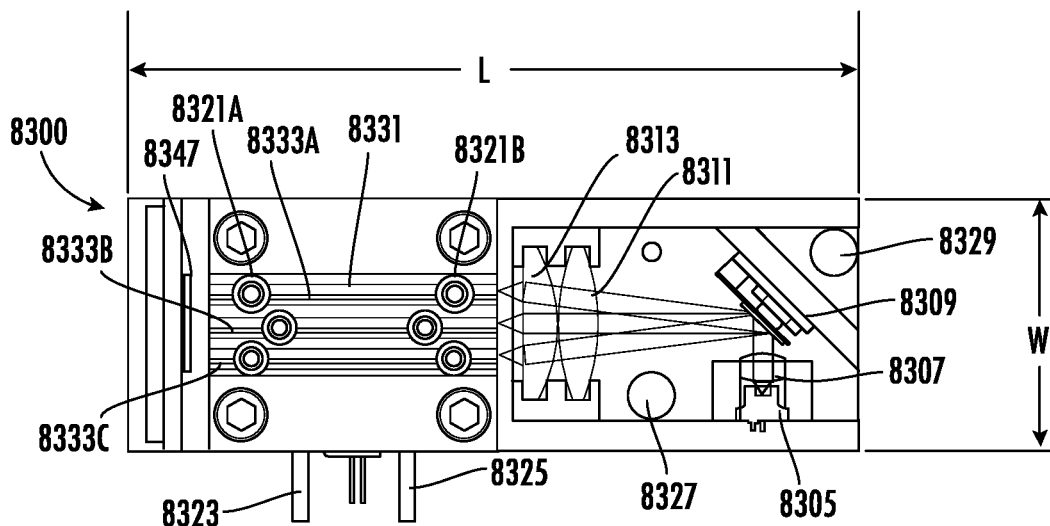
Figure 83E:
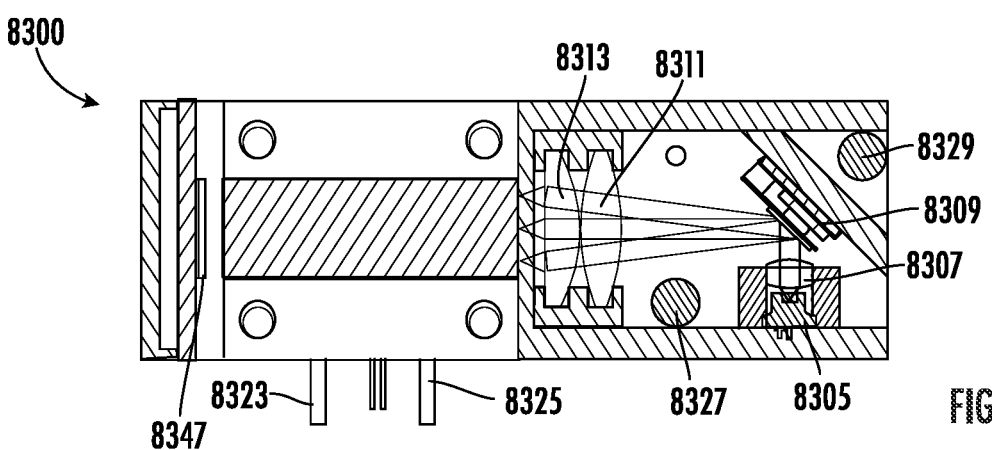

Referring now to FIG. 83A to FIG. 83E, various example views associated with a sample testing device 8300 are illustrated. In particular, FIG. 83A illustrates an example perspective view of the sample testing device 8300. FIG. 83B illustrates another example perspective view of the sample testing device 8300. FIG. 83C illustrates an example side view of the sample testing device 8300. FIG. 83D illustrates an example top view of the sample testing device 8300. FIG. 83E illustrates an example cross sectional view of the sample testing device 8300 along the line A-A' shown in FIG. 83C and viewing in the direction as shown by the arrows.

Referring now to FIG. 83A and FIG. 83B, the example sample testing device 8300 comprises a waveguide platform 8301. In some embodiments, an aiming control base 8303 and a waveguide base 8317 are disposed on a top surface of the waveguide platform 8301. In some embodiments, the aiming control base 8303 is disposed adjacent to the waveguide base 8317.

In some embodiments, a laser source 8305 is disposed on a top surface of the aiming control base 8303. In some embodiments, the laser source 8305 may comprise a laser diode that is configured to emit a laser beam, similar to those described herein. In some embodiments, laser light from the laser diode of the laser source 8305 is collimated with collimating lens 8307 as shown in FIG. 83E. In some embodiments, the collimated laser beam is reflected by a scan element 8309 (which may comprise a electro-magnetic scan mirror) to form line scanning laser beam. In some embodiments, the scanning laser beam is refocused with various lens (such as f-theta lens). For example, as show in FIG. 83A, FIG. 83B, FIG. 83D and FIG. 83E, the scanning laser beam is refocused by a focusing lens 8311 and subsequently by a field lens 8313.

In some embodiments, the scan element 8309 is mounted on the aiming control base 8303. In some embodiments, the aiming control base 8303 may comprise at least two electro-magnetic actuators for pitch control and roll control of the aiming control base 8303 (such as the electro-magnetic actuator 8327 and the electro-magnetic actuator 8329). In some embodiments, the electro-magnetic actuators may adjust the pitch and roll of the aiming control base 8303, such that the laser beam reflected from the scan element 8309 may be align to the input end of the waveguide 8331.

For example, referring now to FIG. 83C, the aiming control base 8303 may comprise a bearing ball 8335 that is inserted between a bottom surface of a top portion 8337 of the aiming control base 8303 and a top surface of a bottom portion 8339 of the aiming control base 8303. In such an example, components such as laser source 8305 and scan element 8309 a disposed on a top surface of the top portion 8337 of the aiming control base 8303. Additionally, or alternatively, each of the electro-magnetic actuators may comprise a retaining spring between the top portion 8337 and the bottom portion 8339. In some embodiments, the retaining spring is configured to adjust the distance between the top portion 8337 and the bottom portion 8339 at a given location. For example, each of the retaining spring 8341 (of the electro-magnetic actuator 8327) and the retaining spring 8345 (of the electro-magnetic actuator 8329) may adjust the distance between the top portion 8337 and the bottom portion 8339 at their respective locations, thereby adjusting the pitch and roll of the aiming control base 8303.

Additionally, or alternatively, the aiming control base 8303 may comprise one or more piezo actuators that is configured to adjust the position of the aiming control base 8303 relative to the waveguide base 8317.

In some embodiments, the waveguide base 8317 comprises a waveguide 8331 that has a plurality of channels. In some embodiments, a multichannel waveguide may comprise multiple channel that can be arranged in three groups for negative reference channel 8333A, sample channel 8333B and positive reference channel 8333C. Similar to those described above, each group comprises open window channels and/or buried reference channels. For example, the sample channel 8333B may comprise an open window channel that is coated various target antibodies for detecting multiple virus variants in one test. In some embodiments, the negative reference channel 8333A and positive reference channel 8333C comprise buried reference channels that are pre-arranged to provide real-time references to cancel thermal and structural interference that may cause waveguide signal variations and drifting to ensure high sensitivity for low concentration virus detection, similar to those described above.

In some embodiments, the refocused scanning beam illuminates waveguide 8331 from channel to channel. In the example shown in FIG. 83D, the scanning beam may illuminate channel 8333A, and then illuminate channel 8333B, and then illuminate channel 8333C. In some embodiments, the scan element 8309 is configured to adjust the angle of the laser beam from the laser source 8305 to form the scanning beam, details of which are described herein.

In some embodiments, the sample testing device 8300 further comprises a fluid cover 8319. Similar to those described above, the fluid cover 8319 is disposed on a top surface of the waveguide base 8317, forming multiple flow channels. In some embodiments, each of the flow channels may comprise at least one inlet (for example, inlet 8321A) that is configured to receive and provide a sample to the flow channel and at least one outlet (for example, outlet 8321B) that is configured to discharge a sample from the flow channel.

In some embodiments, each of multiple flow channels is disposed on top of at least one of the channels (negative reference channel(s), sample channel(s) and/or positive reference channel(s)) of the waveguide 8331. For example, referring now to FIG. 83D, in some embodiments, negative reference channel(s) 8333A is covered with reference medium having no virus that is from the corresponding flow channel. In some embodiments, sample channel(s) 8333B is covered with sample medium for detection that is from the corresponding flow channel. In some embodiments, positive reference channel(s) 8333C is covered with target virus surrogates that are from the corresponding flow channel.

In some embodiments, the sample testing device 8300 further comprises an imaging component 8347 that is configured to detect an interference fringe pattern, similar to those described above.

In some embodiments, the sample testing device 8300 further comprises thermal insulator 8315 that is disposed between the waveguide platform 8301 and the waveguide base 8317. In some embodiments, the thermal insulator 8315 comprises thermal insulating materials that may minimize or reduce the impact of interference fringe pattern caused by temperature fluctuation. Additionally, or alternatively, the sample testing device 8300 comprises a thermal sensor 8325 that is in electronic communication with a heating/colling pad 8323. For example, based on the temperature detected by the thermal sensor 8325, a processor may adjust the temperature of the heating/colling pad 8323 so as to minimize or reduce the interference caused by temperature fluctuation.

In some embodiments, the size of the sample testing device 8300 may be designed based on system requirements. For example, the sample testing device 8300 shown in FIG. 83D may have a width W of 26 millimeters and a length L of 76 millimeters. In some embodiments, the width and/or length of the sample testing device 8300 may be of other values.

Figure 84A:
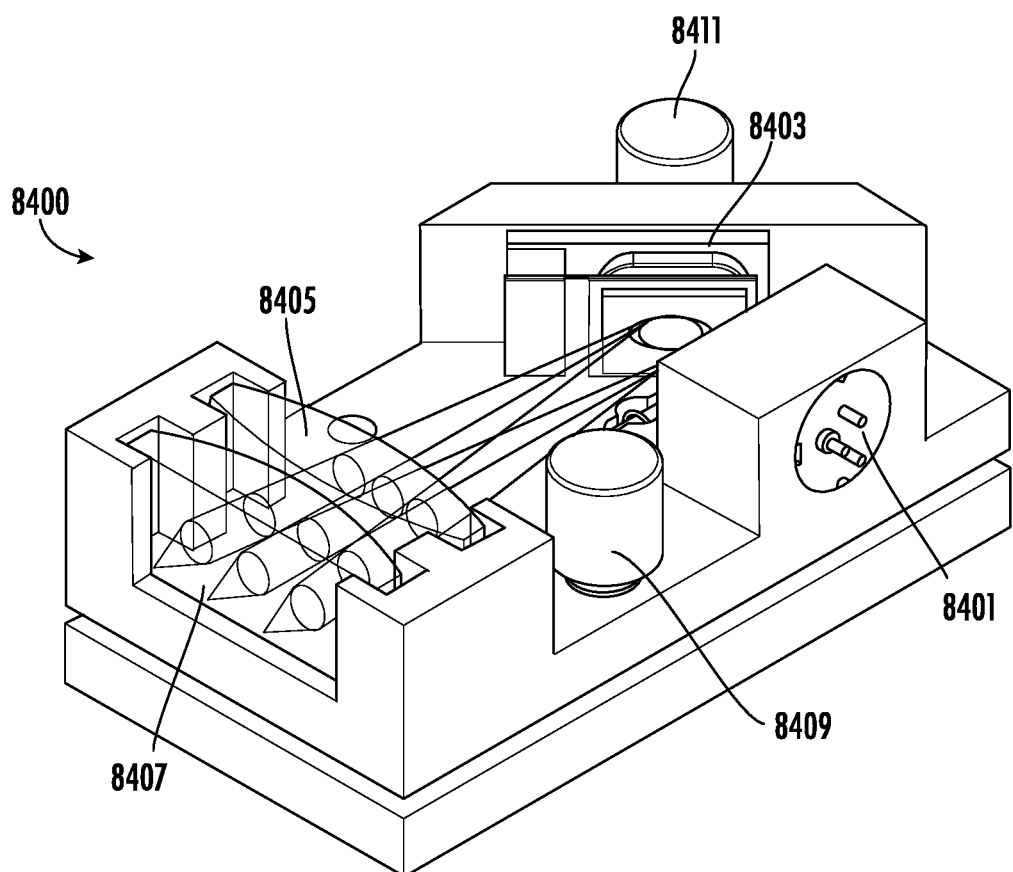
Figure 84B:
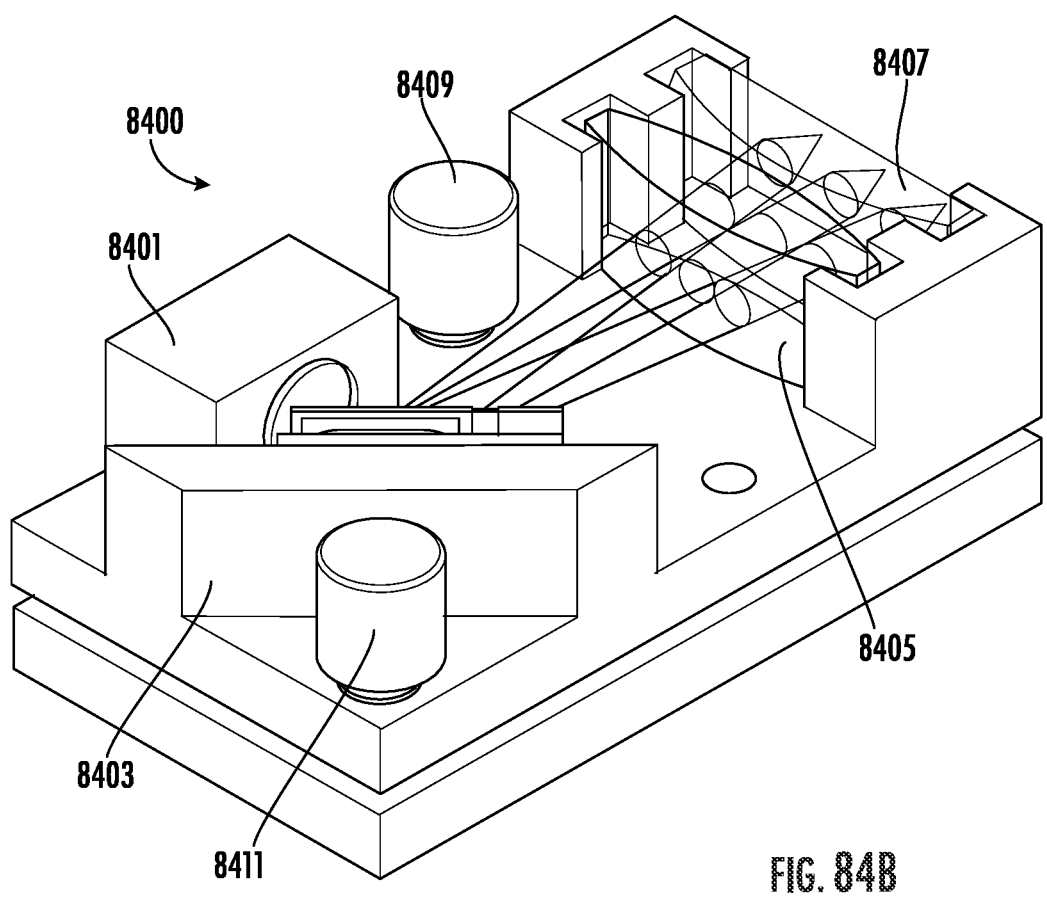
Figure 84C:
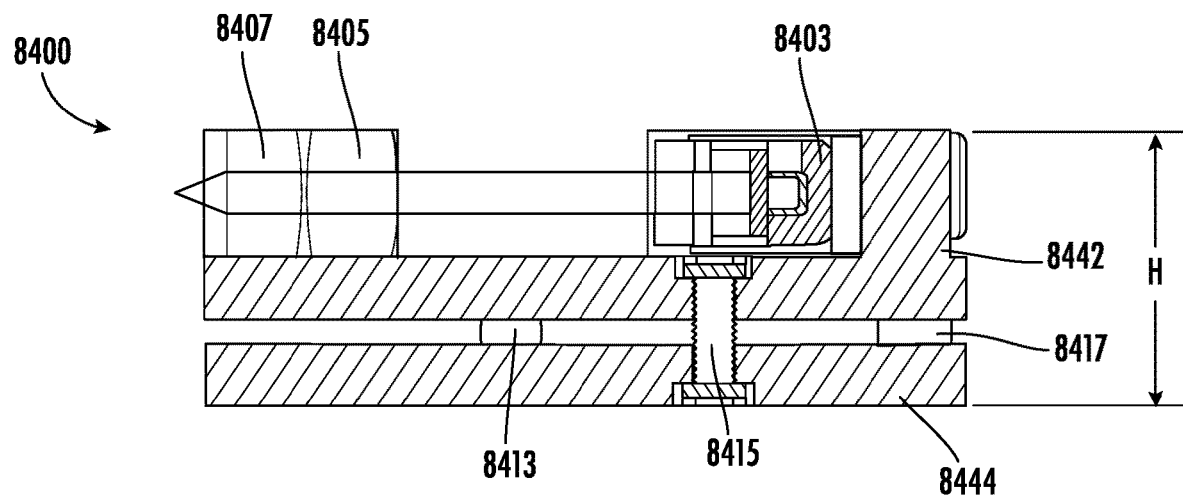
Figure 84D:
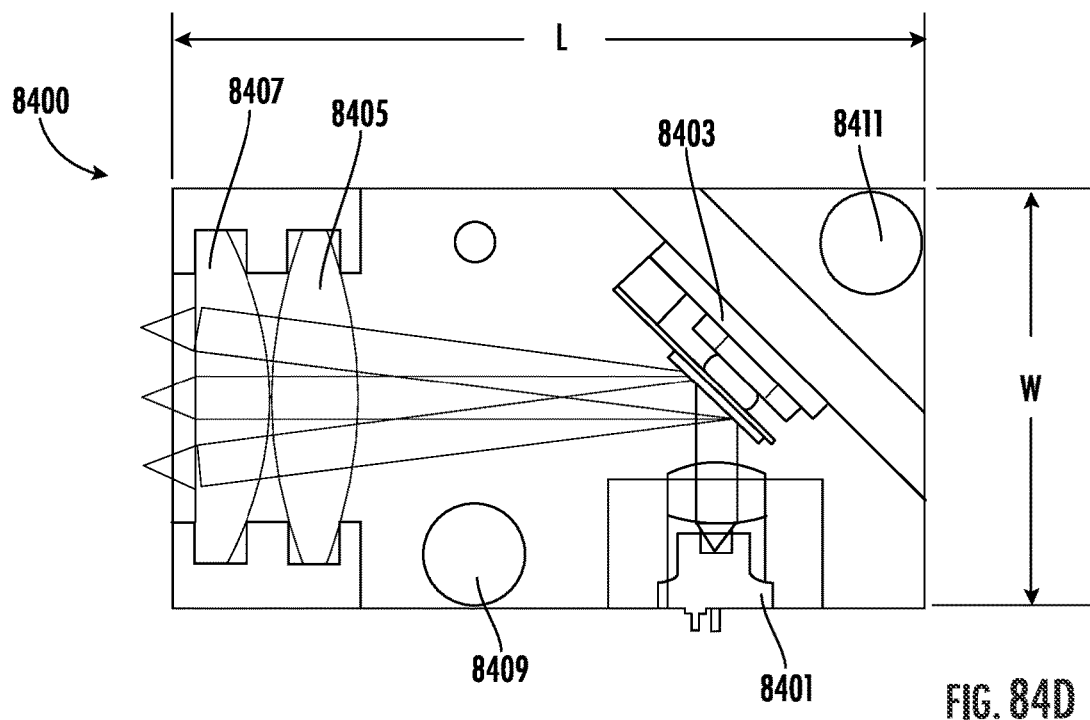

Referring now to FIG. 84A to FIG. 84D, various example views associated with an aiming control base 8400 are illustrated. In particular, FIG. 84A illustrates an example perspective view of the aiming control base 8400. FIG. 84B illustrates another example perspective view of the aiming control base 8400. FIG. 84C illustrates an example side view of the aiming control base 8400. FIG. 84D illustrates an example top view of the aiming control base 8400.

Similar to those described above in connection with FIG. 83A to FIG. 83E, the aiming control base 8400 may comprise at least a laser source 8401 that is configured to emit a laser beam. In some embodiments, the laser beam travels to the scan element 8403, which redirects to the lease beam towards the focusing lens 8405. In some embodiments, subsequent to passing through the focusing lens 8405, the laser beam further passes through the field lens 8407 and arrive at an input end of a waveguide, similar to those described above.

In some embodiments, the aiming control base 8400 may comprise one or more electro-magnetic actuators (for example, electro-magnetic actuator 8411 and electro-magnetic actuator 8409). In the example shown in FIG. 84C, the aiming control base may comprise a bearing ball 8413, and each of the one or more electro-magnetic actuators may comprise one or more retaining springs (for example, retaining spring 8415 and retaining spring 8417) that is configured to adjust distances between a top portion 8442 and a bottom portion 8444 of the aiming control base 8400 at one or more locations of the aiming control base 8400, so as to control the roll and pitch of the aiming control base 8400, similar to those described above.

In some embodiments, the size of the aiming control base 8400 may be designed based on system requirements. For example, as shown in FIG. 84C the height H of the aiming control base 8400 may be 13 millimeters. Additionally, or alternatively, as shown in FIG. 84D, the length L of the aiming control base 8400 may be 36 millimeters, and/or the width of the aiming control base 8400 may be 26 millimeters. Additionally, or alternatively, the height, length, and/or the width of the aiming control base 8400 may be of other values.

Figure 85A:
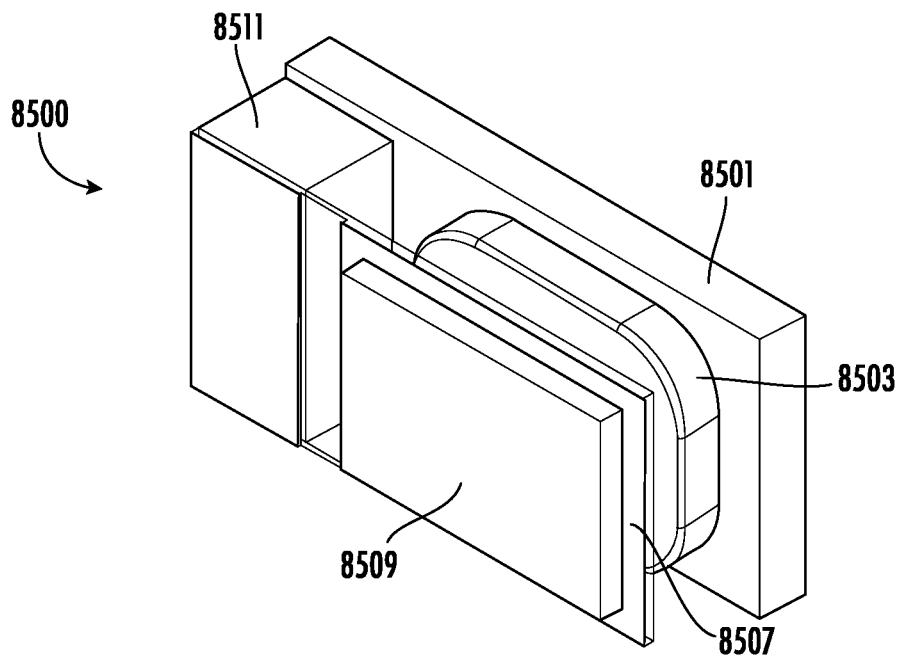
Figure 85B:
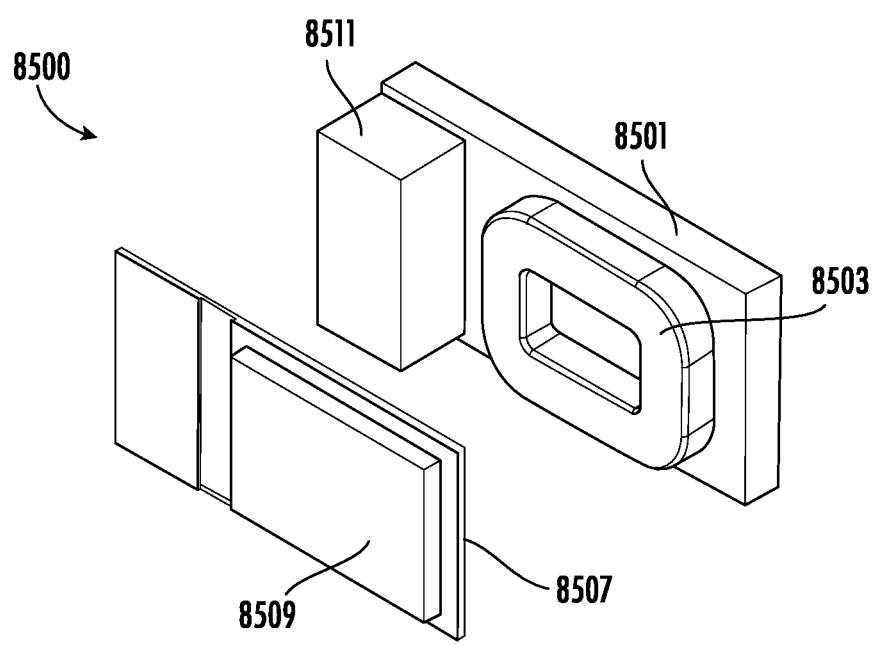
Figure 85C:
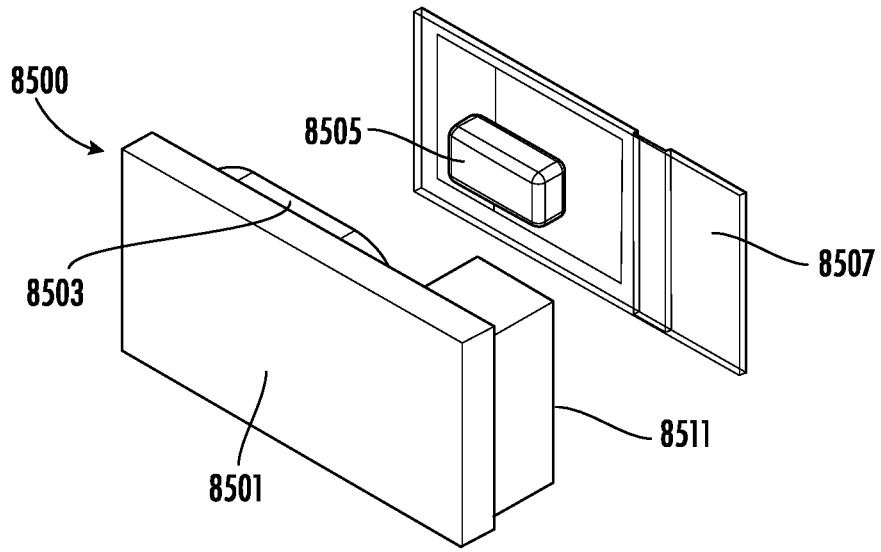
Figure 85D:
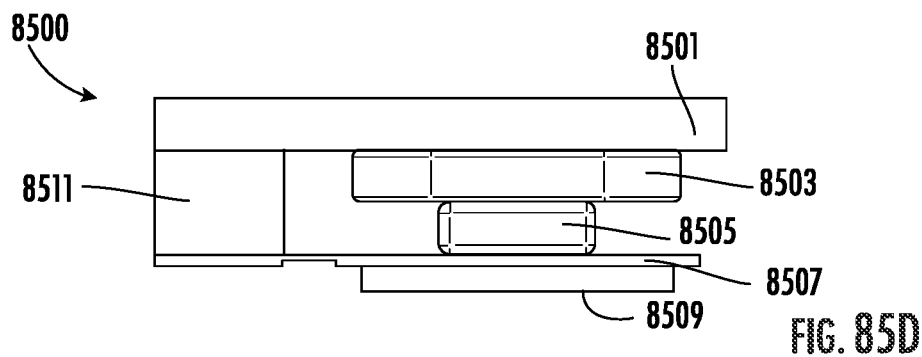
Figure 85E:
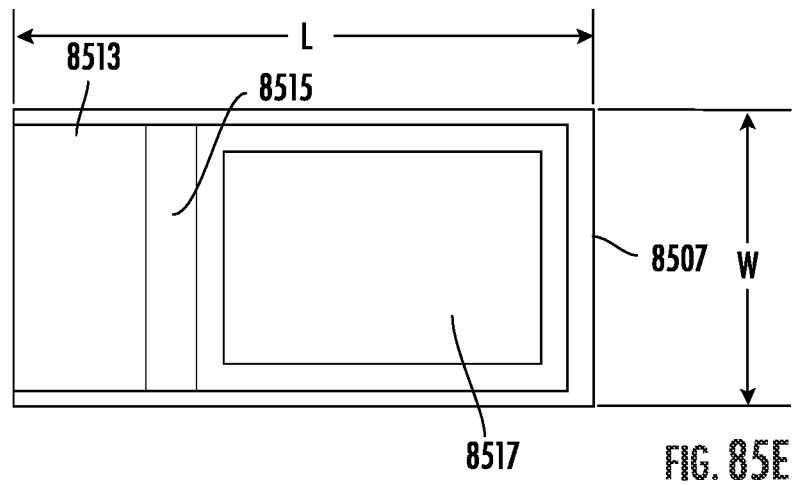

Referring now to FIG. 85A to FIG. 85E, various example views associated with a scan element 8500 are illustrated. In particular, FIG. 85A illustrates an example perspective view of the scan element 8500. FIG. 85B illustrates another example exploded view of the scan element 8500. FIG. 85C illustrates another example exploded view of the scan element 8500. FIG. 85D illustrates an example side view of the scan element 8500. FIG. 85E illustrates an example perspective view of a resonant flex 8507 of the scan element 8500.

In the examples shown in FIG. 85A to FIG. 85E, the example scan element 8500 comprises a substrate 8501, a coil 8503, a magnet 8505, a resonant flex 8507, a scan mirror 8509, and a spacer 8511.

As shown in FIG. 85A and FIG. 85B, the coil 8503 is disposed on a surface of the substrate 8501. As shown in FIG. 85B, FIG. 85C, and FIG. 85D, the magnet 8505 is disposed on a first surface of the resonant flex 8507, and the scan mirror 8509 is disposed on a second surface of the resonant flex 8507 opposite of the first surface. In some embodiments, the spacer 8511 attaches the substrate 8501 to the resonant flex 8507 and aligns the magnet 8505 to be within a central ring formed by the coil 8503.

In some embodiments, when electric current passes through the coil 8503, an electromagnetic field is formed, causing the magnet 8505 to move towards or away from the coil 8503. In some embodiments, the strength of the electromagnetic field is controlled by the amount of the electric current passing through the coil 8503. As such, by adjusting the electric current in the coil 8503, the movement of the magnet 8505 can be adjusted. Because the magnet 8505 is disposed on the resonant flex 8507, which in turn attaches the scan mirror 8509, the position of scan mirror 8509 may be adjusted based on the strength of the electromagnetic field. As such, by adjusting the electric current in the coil 8503, the position of the scan mirror 8509 may be adjusted, which in turn directs the laser beam to scan from channel to channel as described above.

FIG. 85E illustrates an example resonant flex 8507. In some embodiments, a surface of the resonant flex 8507 comprises a first portion 8513 attached to the spacer 8511 and a third portion 8517 attached to the magnet 8505. In some embodiments, the resonant flex 8507 comprises a middle hinge 8515 between the first portion 8513 and the third portion 8517. In some embodiments, the middle hinge 8515 is flexible.

In some embodiments, the size of the resonant flex 8507 may be designed based on system requirements. For example, the resonant flex 8507 may have a length L of 11 millimeters and a width W of 5.6 millimeters. In some embodiments, the length L and/or the width W may be of other values.

In various applications, a sample testing device (such as a waveguide virus sensor) requires micro fluidics to delivery sample medium and reference medium with controlled flow rate and injection timing. Various embodiments of the present disclosure provide an integrated waveguide virus sensor cartridge (also referred to as "waveguide cartridge") comprising a waveguide, flow channels, a cartridge body, and a fluid cover to that are configured to provide controlled flow rate and injection timing of sample medium and reference medium. In some embodiments, a waveguide cartridge allows for quick plug-in application with alignment features. In some embodiments, enclosed and sealed waveguide cartridge is disposable in accordance with bio-hazards control protocols to satisfy clinic use requirement.

Referring now to FIG. 86A to FIG. 86F, an example waveguide cartridge 8600 is illustrated. In particular, FIG. 86A illustrates an example perspective view of the waveguide cartridge 8600 from the top. FIG. 86B illustrates an example perspective view of the waveguide cartridge 8600 from the bottom. FIG. 86C illustrates an example exploded view of the waveguide cartridge 8600. FIG. 86D illustrates an example top view of the waveguide cartridge 8600. FIG. 86E illustrates an example side view of the waveguide cartridge 8600. FIG. 86F illustrates an example bottom view of the waveguide cartridge 8600. In some embodiments, the waveguide cartridge 8600 may be a single use cartridge. In some embodiments, the waveguide cartridge 8600 may be implemented together with a specimen collector and receive sample such as respiratory/breath aerosol specimen (e.g. exhaled aerosols) and/or a nasal swab specimen.

As shown in FIG. 86C, the example waveguide cartridge 8600 comprises a waveguide 8601, a flow channel plate 8603, a cartridge body 8605, a fluid cover 8607, an exhaust filter 8609, and a cartridge cover 8611. In some embodiments, the flow channel plate 8603 may be embodied as a flow gasket in accordance with various examples described herein.

In some embodiments, one or more laser alignment methods, devices, and/or systems may be implemented to align the waveguide 8601 and/or waveguide cartridge 8600 to a laser source so as to reduce the system turnaround time (for example, less than five minutes). In some embodiments, the temperature of the waveguide 8601 may remain uniform throughout testing of the sample by implementing one or more temperature control techniques described herein. In some embodiments, a bottom surface of the flow channel plate 8603 is disposed on a top surface of the waveguide 8601. In some embodiments, each of the flow channels in the flow channel plate 8603 are aligned with one of the sample channel or reference channel in the waveguide 8601, similar to those described above.

In some embodiments, a bottom surface of the cartridge body 8605 is disposed on a top surface of the flow channel plate 8603. As described further herein, the bottom surface of the cartridge body 8605 comprises a plurality of inlet ports and outlet ports. In some embodiments, each of the output ports provides sample medium or reference medium to one of the flow channels in the flow channel plate 8603, and each of the input ports receives sample medium or reference medium from one of the flow channels in the flow channel plate 8603, details of which are described herein.

In the example shown in FIG. 86C, the cartridge body 8605 comprises a buffer reservoir 8613, a reference port 8619, a sample port 8625, and an exhauster chamber 8631.

In some embodiments, the fluid cover 8607 is disposed on a top surface of the cartridge body 8605. In some embodiments, the fluid cover 8607 comprises an actuator push 8615, a reference injection tube 8621, and a sample injection tube 8627. In some embodiments, the actuator push 8615 is aligned on top of the buffer reservoir 8613 of the cartridge body 8605. In some embodiments, the reference injection tube 8621 is aligned on top of the reference port 8619. In some embodiments, the sample injection tube 8627 is aligned on top of the sample port 8625.

In some embodiments, the exhaust filter 8609 is disposed on a top surface of the cartridge body 8605. In some embodiments, the exhaust filter 8609 is aligned to cover the exhauster chamber 8631 of the cartridge body 8605.

In some embodiments, the cartridge cover 8611 is disposed on top of the fluid cover 8607 and/or the exhaust filter 8609. In some embodiments, the cartridge cover 8611 comprises an actuator opening 8617, a reference opening 8623, a sample opening 8629, and an exhaust opening 8633. In some embodiments, the actuator opening 8617 is aligned on top of the actuator push 8615. In some embodiments, the reference opening 8623 is aligned on top of the reference injection tube 8621. In some embodiments, the sample opening 8629 is aligned on top of the sample injection tube 8627. In some embodiments, the exhaust opening 8633 is aligned on top of the exhaust filter 8609.

In the example shown in FIG. 86B, the corners of the waveguide 8601 are exposed from cartridge body 8605, which allows for optical alignment. In some embodiments, the bottom surface of the waveguide 8601 is also cleared to contact a heating/cooling pad for temperature control.

In some embodiments, heat staking joints method with only local heating may be implemented in assembling the waveguide cartridge 8600 to prevent damage to bio-activated waveguide 8601. Additionally, or alternatively, other methods may be implemented in assembling the waveguide cartridge 8600.

For example, the waveguide cartridge 8600 may be pre-assembled with the cartridge body 8605, fluid cover 8607, exhaust filter 8609, and cartridge cover 8611. Final assembly is performed with heat staking to secure the bio-activated waveguide 8601 and to seal the flow channel plate 8603 between the cartridge body 8605 and the waveguide 8601. In some embodiments, the waveguide cartridge 8600 is then filled with PBS buffer solution (except exhaust/waste chamber), including in the buffer reservoir 8613 and in the flow channels of the flow channel plate 8603.

When using the waveguide cartridge 8600, the waveguide cartridge 8600 is placed in a reading instrument with optical aliment, directly referencing to the waveguide edge features. Injections are then performed with reference medium injection through the reference port 8619 and followed by sample medium injection through the sample port 8625. After injection, the deformable actuator push 8615 is then pushed down, which in turn pushes the buffer solution in the buffer reservoir 8613 to move through the flow channels. In the example of three channels shown in FIG. 86A to FIG. 86F, flows are in the same sequence as PBS buffer solution, fluids and then PBS buffer solution. Fluids include target surrogate in positive reference channel (e.g. positive reference medium), non-virus PBS in negative reference channel (e.g. negative reference medium), and patient sample in sample channel (e.g. sample medium). A serial flow path provides synchronized signals from reference channels and the sample channel so as to accurately derive test results, details of which are described herein.

In some embodiments, the size of the waveguide cartridge 8600 may be designed based on system requirements. For example, a width W of the waveguide cartridge 8600 as shown in FIG. 86D may be 74 millimeters. Additionally, or alternatively, a height H of the waveguide cartridge 8600 as shown in FIG. 86E may be 68 millimeters. Additionally, or alternatively, a length L of the waveguide cartridge 8600 as shown in FIG. 86E may be 31 millimeters. Additionally, or alternatively, a width W' of the waveguide 8601 may be 44 millimeters. Additionally, or alternatively, the width W, the height H, the length L and/or the width W' may be of other values.

Referring now to FIG. 87A to FIG. 87C, an example waveguide 8700 is illustrated. In particular, FIG. 87A illustrates an example perspective view of the waveguide 8700. FIG. 87B illustrates an example top view of the waveguide 8700. FIG. 87C illustrates an example side view of the waveguide 8700.

In the example shown in FIG. 87A to FIG. 87C, the example waveguide 8700 comprises a plurality of channels for sample medium and reference medium. For example, the example waveguide 8700 may comprise a first channel 8701, a second channel 8703, and a third channel 8705. In some embodiments, the first channel 8701 and the third channel 8705 are reference channels (e.g. buried channels). In some embodiments, the second channel 8703 is a sample channel (e.g. an open channel). For example, the second channel 8703 may comprise biological assay reagents immobilized on the surface so as to detect and/or capture pathogens in the sample (such as SARS-CoV2 pathogen), similar to those described above. The capturing induces a refractive index change that modifies the propagation of laser light down the waveguide 8700, similar to those described above. Due to the evanescent transduction mechanism, testing a sample using the example waveguide 8700 requires very little sample preparation. In some embodiments, the first channel 8701 and the third channel 8705 may provide parallel positive and negative control assays that allow for real-time elimination of noise and quantification of the virus load present in the sample. Due to the evanescent transduction mechanism, the diagnostic requires very little sample preparation. In some embodiments, the example waveguide 8700 may comprise less than three or more than three channels. For example, the example waveguide 8700 may comprise eight optical channels that are active in use when testing one or more samples.

As shown in FIGS. 87B and 87C, in some embodiments, the length L1 of the example waveguide 8700 is 31000 microns. In some embodiments, the total length L2 of the channels in the example waveguide 8700 is 30000 microns. In some embodiments, the length L3 of the open window portion of each channel is 15000 microns. In some embodiments, the length L4 of the buried portion of each channel is 8000 microns. In some embodiments, the width W of the example waveguide 8700 is 4400 microns. In some embodiments, the height H of the waveguide 8700 is 400 microns. In some embodiments, one or more measurements of the waveguide 8700 may be of other values.

Referring now to FIG. 88A to FIG. 88D, an example flow channel plate 8800 is illustrated. In particular, FIG. 88A illustrates an example perspective view of the flow channel plate 8800. FIG. 88B illustrates an example top view of the flow channel plate 8800. FIG. 88C illustrates an example cross-sectional view of the flow channel plate 8800 cutting from the A-A' in FIG. 88B and viewing from the direction of the arrow. FIG. 88D illustrates an example side view of the flow channel plate 8800.

In some embodiments, the example flow channel plate 8800 may be manufactured through a PDMS molding process that provides seals between a top surface of the waveguide cartridge and the cartridge body, forming multiple flow channels. In the example shown in FIG. 88A to FIG. 88D, the example flow channel plate 8800 comprises a first flow channel 8802, a second flow channel 8804, and a third flow channel 8806.

In some embodiments, each of the first flow channel 8802, the second flow channel 8804, and the third flow channel 8806 may correspond to one of the channels in the waveguide of the waveguide cartridge. For example, referencing in connection with the waveguide 8700 shown in FIG. 87A to FIG. 87C, the first flow channel 8802, the second flow channel 8804, and the third flow channel 8806 of the example flow channel plate 8800 may be positioned on top of the first channel 8701, the second channel 8703, and the third channel 8705, respectively. In some embodiments, when the waveguide 8700 is positioned within the waveguide cartridge, the waveguide cartridge provides optical access to the inlet and the outlet of the waveguide 8700, such that laser beam may be emitted through the waveguide as described herein.

In some embodiments, each of the flow channel may receive sample from an inlet opening and discharge the sample through an outlet opening. In the example shown in FIG. 88C, a sample may flow from the inlet opening 8808, through the second flow channel 8804, and exits from the second flow channel 8804 through the outlet opening 8810.

In some embodiments, each of the inlet opening 8808 and the outlet opening 8810 may be connected to an outlet port and an inlet port of the cartridge body, details of which are described herein.

Referring now to FIG. 89A to FIG. 89E, an example cartridge body 8900 is illustrated. In particular, FIG. 89A illustrates an example perspective view of the cartridge body 8900 from the top. FIG. 89B illustrates an example perspective view of the cartridge body 8900 from the bottom. FIG. 89C illustrates an example top view of the cartridge body 8900. FIG. 89D illustrates an example bottom view of the cartridge body 8900. FIG. 89E illustrates an example side view of the cartridge body 8900.

In some embodiments, the cartridge body 8900 may be manufactured through a cyclic olefin copolymer (COC) injection molding process. In some embodiments, the cartridge body 8900 may comprise a lower housing, a gasket disposed on the lower housing, and an upper housing disposed on the gasket. In some embodiments, the cartridge body 8900 provide various fluidics, a buffer reservoir 8901, a sample injection port 8921, a sample loop 8925, a reference injection port 8905, a reference loop 8909 and an exhauster chamber 8933. In some embodiments, various loops in the cartridge body 8900 and various channels in the flow channel plate are connected in serial to form a flow path, ensuring the exact same flow rate among sample medium and reference mediums, details of which are described herein. In some embodiments, the cartridge body 8900 may comprise material such as ABS.

For example, referring now to FIG. 89C (an example top view) and FIG. 89D (an example bottom view), port 8911, which is an end port of the reference loop 8909, is connected and provides input fluid to a first flow channel in the flow channel plate. The first flow channel is also connected to port 8913 and outputs fluid to port 8913. As shown in FIG. 89D, port 8913 is one end of the buffer loop 8915, while the other end of the buffer loop 8915 is port 8917 that is connected and provides input fluid to a second flow channel in the flow channel plate. The second flow channel is also connected to port 8919 and outputs fluid to port 8919. As shown in FIG. 89D, port 8919 is one end of the sample loop 8925, while the other end of the sample loop 8925 is port 8927 that is connected and provides input fluid to a third flow channel in the flow channel plate. The third flow channel is also connected to port 8929 and outputs fluid to port 8929.

In some embodiments, the buffer solution may be provided in the buffer reservoir 8901, which is connected to port 8903. In some embodiments, the buffer solution has been degassed and is bubble free. In some embodiments, the buffer solution in the buffer reservoir 8901 may have a volume of more than 95 ml. In some embodiments, the buffer solution in the buffer reservoir 8901 may have a volume of other values. As described above, port 8903 is connected to the reference loop 8909. As described above, when the actuator push of a waveguide cartridge is pushed down, the actuator push in turn pushes the buffer solution in the buffer reservoir 8901 to move through the flow channels.

In some embodiments, reference medium is provided to the reference injection port 8905 (for example, through punch-through injections) and travels to the reference loop 8909 through port 8907 that is connected to reference injection port 8905 after the actuator push of the waveguide cartridge is pushed down. As described above, the end of the reference loop 8909 is port 8911 that is connected to a first channel of the flow channel plate. As such, the reference medium travels through the first channel of the flow channel plate.

As described above, the first channel of the flow channel plate is connected to port 8913. As the reference medium travels through the first channel, it pushes the buffer solution in the first channel to buffer loop 8915 through port 8913. As described above, the end of the buffer loop 8915 is port 8917 that is connected to a second channel. As such, the buffer solution travels through the second flow channel and exits at port 8919, which is connected to the sample loop 8925.

In some embodiments, sample medium is provided to the sample injection port 8921 (for example, through punch-through injections) and travels to the sample loop 8925 through port 8923 that is connected to the sample injection port 8921 after the actuator push of the waveguide cartridge is pushed down. As described above, the end 8927 of the sample loop 8925 is connected to a third channel of the flow channel plate. As such, the sample medium travels through the third channel of the flow channel plate and exits at port 8929.

In some embodiments, port 8929 is connected to the exhauster chamber 8933 through port 8931. As such, the sample may be discharged into the exhauster chamber 8933.

In some embodiments, to meet a requirement of 75 mL of total flow with 30 mL sample injection, the buffer reservoir 8901 volume is more than 95 mL, the exhaust chamber volume is more than 110 mL, and each of the sample loop and reference loop capacity is more than 35 mL. In some embodiments, a steady flow rate range between 5 to 15 uL/min for 10 to 15 minutes may be provided. In some embodiments, one or more of the above-mentioned requirement, flow rate, and/or volumes may be of other values.

In some embodiments, the size of the cartridge body may be designed based on system requirements. For example, the width W of the cartridge body 8900 shown in FIG. 89C may be 7.4 millimeters. The height H of the cartridge body 8900 shown in FIG. 89E may be 7.4 millimeters. The length L of the cartridge body 8900 shown in FIG. 89E may be 31 millimeters. In some embodiments, the width W, height H, and/or the length L of the cartridge body 8900 may be of other values.

Referring now to FIG. 90A to FIG. 90E, an example fluid cover 9000 is illustrated. In particular, FIG. 90A illustrates an example perspective view of the fluid cover 9000 from the top. FIG. 90B illustrates an example perspective view of the fluid cover 9000 from the bottom. FIG. 90C illustrates an example top view of the fluid cover 9000. FIG. 90D illustrates an example side view of the fluid cover 9000. FIG. 90E illustrates an example bottom view of the fluid cover 9000.

In some embodiments, the fluid cover 9000 is deformable and can function as a pump with actuator that is configured to push down the buffer solution in the buffer reservoir under precision displacement control. For example, the fluid cover 9000 may comprise silicon rubber that is formed through an injection molding process. In some embodiments, the fluid cover 9000 may comprise material such as ABS.

In the example shown in FIG. 90A to FIG. 90E, the example fluid cover 9000 comprises an actuator push 9006, a reference injection tube 9004, and a sample injection tube 9002, similar to the actuator push 8615, the reference injection tube 8621, and the sample injection tube 8627 described above in connection with FIG. 86A to FIG. 86F.

Referring now to FIG. 91A to FIG. 91C, an example exhaust filter 9100 is illustrated. In particular, FIG. 91A illustrates an example perspective view of the exhaust filter 9100. FIG. 91B illustrates an example side view of the exhaust filter 9100. FIG. 91C illustrates an example bottom view of the exhaust filter 9100.

In some embodiments, the exhaust filter 9100 may comprise gas permeable PTFE filter exhaust that allows gaseous substance to be released from a waveguide cartridge without causing environment risk.

Referring now to FIG. 92A to FIG. 92C, an example cartridge cover 9200 is illustrated. In particular, FIG. 92A illustrates an example perspective view of the cartridge cover 9200. FIG. 92B illustrates an example top view of the cartridge cover 9200. FIG. 92C illustrates an example side view of the cartridge cover 9200.

In some embodiments, the example cartridge cover 9200 may comprise polycarbonate and be manufactured through an injection molding process. In some embodiments, the example cartridge cover 9200 may comprise one or more additional or alternative materials, and may be manufactured through one or more additional or alternative processes. In the example shown in FIG. 92A to FIG. 92C, the example cartridge cover 9200 comprises an actuator opening 9202, a reference opening 9204, a sample opening 9206, and an exhaust opening 9208, similar to the actuator opening 8617, the reference opening 8623, the sample opening 8629, and the exhaust opening 8633 described above in connection with FIG. 86A to FIG. 86F.

Many communicable diseases/pathogens spread through aerosol droplets, and almost every biological assay that is capable of identifying specific pathogens (viruses, bacteria, etc.) relies on liquid based immunoassays. One of the technical challenges associated with virus detection is how to efficiently collect a sufficient amount of aerosols from a large air volume for subsequent immunoassay. Another technical challenge is to keep the pathogens viable during the sampling process.

Many systems focus on implementing a sampler with a dedicated pump that samples a smaller percentage of the air within a space. Many of these samplers also are designed to identify the RNA/DNA content of the pathogen and therefore are not designed to keep the pathogen viable (e.g. as a whole). Keeping the pathogen whole is critical to assess how contagious the aerosol particles were (for example, non-viable viruses would not infect others, but would still show positive in an RNA analysis).

In accordance with various embodiments of the present disclosure, a sample collection device is integrated into the air conditioner's condenser unit. Referring now to FIG. 93A and FIG. 93B, an example system 9300 in accordance with embodiments of the present disclosure are illustrated.

In the example shown in FIG. 93A and FIG. 93B, the example system 9300 comprises an evaporator unit 9302 and a condenser unit 9304, which may be parts of an air considering unit. In some embodiments, the evaporator unit 9302 comprises an evaporator coil 9308 and a blower 9306. In some embodiments, the condenser unit 9304 comprises a compressor 9318 and a condenser coil 9320, which are connected to the evaporator coil 9308.

In some embodiments, the blower 9306 is configured to draw air into the evaporator unit 9302 and/or push air out of the evaporator unit 9302. In some embodiments, air travels through the evaporator coil 9308. In some embodiments, liquid refrigerant at a low temperature circulates through the evaporator coil 9308. For example, the condenser coil 9320 may release heat absorbed by the liquid refrigerant that has circulated through the evaporator coil 9308, and the compressor 9318 may drive the circulation between the condenser coil 9320 and evaporator coil 9308. In some embodiments, when air drawn by the blower 9306 reaches the evaporator coil 9308, condensation may occur due to the temperature difference between the air and the condenser coil 9320, and liquid may be formed on the outer surface of the evaporator coil 9308. In some embodiments, the liquid formed on the surface may effectively collect aerosol particles from a large percentage of the air in a space that has been driven into the evaporator unit 9302 by the blower 9306.

In the example shown in FIG. 93A, a condensate tray 9310 is positioned underneath the evaporator coil 9308 to collect condensed liquid 9312 dripping from the evaporator coil 9308. In some embodiments, a sample collection device 9316 is connected to the condensate tray 9310 through a conduit 9314. In some embodiments, the sample collection device 9316 may contain buffer solution to keep the pathogens in the condensed liquid 9312 viable before performing immunoassay. For example, the sample collection device 9316 may comprise a container, a storage device, and/or a cartridge, similar to those described above.

Additionally, or alternatively, the condensate tray 9310 may be positioned underneath the condenser coil 9320 in the condenser unit 9304 to collect condensed liquid, and the sample collection device 9316 is connected to the condensate tray 9310 (for example, through a conduit) to receive condensed liquid.

In some embodiments, the evaporator coil 9308 and/or the condenser coil 9320 are modified to more effectively and/or rapidly collect condensed liquid. For example, various embodiments of the present disclosure may comprise coating the evaporator coil 9308 and/or the condenser coil 9320 with one or more hydrophobic layers to promote droplet formation and gravity-based collection of the fluid.

In some embodiments, the condensate tray 9310 could be augmented directly to enable immunoassay. In some embodiments, the condensate tray 9310 may comprise optical surfaces, immobilized antibodies, transduction mechanism, and/or other testing component(s) incorporated into the base of the condensate tray 9310, such as, but not limited to, a sample testing device described herein. Additionally, or alternatively, the condensate tray 9310 may comprise a separate liquid reservoir with buffer solution that could combine with the condensed aerosol liquid, and condensed aerosol liquid with buffer solution may be pumped into a channel of a sample testing device described herein (such as a waveguide) for performing immunoassay, similar to various examples described herein.

As described above, an integrated waveguide virus sensor cartridge requires a precise amount of flow over a waveguide sensor along multiple (for example, three) separate channels that all must flow at the same rate. There are many technical challenges and difficulties in designing an integrated waveguide virus sensor cartridge. For example, the integrated waveguide virus sensor cartridge cannot allow air bubbles to flow over the waveguide, and the integrated waveguide virus sensor cartridge must also allow multiple fluids to flow over the waveguide in a specified order.

Referring now to FIG. 94A, FIG. 94B, FIG. 94C, FIG. 94D, FIG. 94E, an example sample testing device 9400 is provided.

Referring now to FIG. 94A, the example sample testing device 9400 comprises a waveguide cartridge 9402. The waveguide cartridge 9402 comprises a waveguide 9404 having a first reference channel 9406, a second reference channel 9408, and a sample channel 9410. The waveguide cartridge 9402 also comprises a reservoir 9412 for storing a buffer solution and a waste collector 9418 for discharging a solution from the waveguide cartridge 9402. In particular, the reservoir 9412 is connected to the first reference channel 9406. The first reference channel 9406 is connected to the second reference channel 9408. The second reference channel 9408 is connected to the sample channel 9410. The sample channel 9410 is connected to the waste collector 9418.

In some embodiments, as part of assembling the waveguide cartridge 9402, a buffer solution is injected to the first reference channel 9406, the second reference channel 9408, and the sample channel 9410. In some embodiments, all bubbles are removed from the waveguide cartridge 9402 during assembly, and the waveguide cartridge 9402 is a closed system except a reference reservoir 9414 for receiving a reference solution and a sample reservoir 9416 for receiving a sample solution.

FIG. 94B illustrates an example step/operation of connecting a pump 9420 to the reservoir 9412, which pushes the buffer solution from the reservoir 9412 to flush the waveguide 9404. In particular, the buffer solution travels from the reservoir 9412 to the first reference channel 9406, and then to the second reference channel 9408, and then to the sample channel 9410, and then to the waste collector 9418. As shown in FIG. 94B, the first reference channel 9406 is connected to the second reference channel 9408, which in turn is connected to the sample channel 9410.

Subsequent to the step/operation shown in FIG. 94B, FIG. 94C illustrates an example step/operation of injecting a reference solution to the reference reservoir 9414, and injecting a sample solution to the sample reservoir 9416. The pump 9420 continues pushing the buffer solution to the waste collector 9418.

Subsequent to the step/operation shown in FIG. 94C, FIG. 94D illustrates an example step/operation of causing the pump 9420 to push the reference solution from the reference reservoir 9414 to the first reference channel 9406, and push the sample solution from the sample reservoir 9416 to the sample channel 9410.

As shown in FIG. 94D, as shown in FIG. 94D, the reference reservoir 9414 is connected between the reservoir 9412 and the first reference channel 9406, and the sample reservoir 9416 is connected between the second reference channel 9408 and the sample channel 9410. As the pump 9420 continues pushing the buffer solution from the reservoir 9412 to the waveguide cartridge 9402, the buffer solution pushes the reference solution from the reference reservoir 9414 to the first reference channel 9406, and pushes the sample solution from the sample reservoir 9416 to the sample channel 9410.

As the sample solution and the reference solution travel on the waveguide 9404, an imaging component may capture signals such as interference fringe patterns from the waveguide 9404.

Subsequent to the step/operation shown in FIG. 94D, FIG. 94E illustrates an example step/operation of causing the pump 9420 to push buffer solution from the reservoir 9412 to the waveguide 9404 so as to cause the reference solution and the sample solution to move past the 9404, and buffer solution to move to the waste collector 9418. In some embodiments, after the imaging component captures signals as described above, the waveguide cartridge 9402 is discarded in accordance with biohazard safety handling procedures.

As described above, the sample testing device 9400 positions different fluids in a serial path with a single pump pushing the fluids along a single channel. This design requires a precise amount of fluid to be injected into the waveguide cartridge 9402 in multiple locations in order for the serial fluid flow path to position the fluids in the correct locations during testing. This precise amount of fluid makes the operation technically challenging for an unskilled operator to do so by hand. As such, there is a need to simplify the sample testing device 9400, Various embodiments of the present disclosure overcome these technical challenges and difficulties, and satisfy these needs described above.

For example, various embodiments of the present disclosure change the fluid flowing over a waveguide to a parallel flow path using a single fluid source to push the fluid through the system. In some embodiments, the waveguide cartridge has a single onboard valve that changes the flow path for each type of fluid that needs to flow across the waveguide. Various embodiments of the present disclosure use a reservoir of buffer solution that is separate from the waveguide and connected using a port. Various embodiments of the present disclosure also have a separate waste collector that is separate from the waveguide cartridge to collect the fluid that is pushed through the waveguide cartridge. In some embodiments, the waveguide cartridge contains two internal large cavities for injecting a sample and reference solution (for example, a sample reservoir and a reference reservoir). When a fluid is pushed through the system, the valve opens and closes to direct a precise amount of fluid from each of the internal cavities toward channels in the waveguide, and the rest of the fluid is stored with the cavities for disposal.

In some embodiments, the waveguide cartridge has a single port to connect to the buffer reservoir and a single port that connects to the waste collector. The type of porting can be any style including a quick connect port, a threaded port, a pierceable membrane, and/or other type of port. The sample reservoir and the reference reservoir are sealed with a pierceable membrane, which allows fluid to be injected into the waveguide cartridge by an unskilled operator.

Referring to FIG. 95A to FIG. 95J, example diagrams illustrating an example sample testing device 9500 are provided. FIG. 96A to FIG. 96C illustrate an example multiport valve 9600 that can be used in connection with the example sample testing device 9500 illustrated in FIG. 95A to FIG. 95J in accordance with various embodiments of the present disclosure.

Referring now to FIG. 95A to FIG. 95J, an example sample testing device 9500 and an example method for operating the sample testing device 9500 are provided.

Referring now to FIG. 95A, the sample testing device 9500 comprises a waveguide cartridge 9501 and a multiport valve 9529. In some embodiments, the multiport valve 9529 is part of the waveguide cartridge 9501.

In some embodiments, the waveguide cartridge 9501 comprises an inlet 9511 and an outlet 9515. In some embodiments, the inlet 9511 is configured to receive a buffer solution from a reservoir 9513, details of which are described herein. In some embodiments, the outlet 9515 is configured to discharge solutions from waveguide cartridge 9501 to a waste collector 9517, details of which are described herein.

In the example shown in FIG. 95A, in some embodiments, the example sample testing device 9500 comprises a reservoir 9513 that is removably connected to the inlet 9511 of the waveguide cartridge 9501. In some embodiments, the reservoir 9513 stores a buffer solution similar to those described herein. In some embodiments, the sample testing device 9500 comprises a pump 9523 connected to the reservoir 9513. In some embodiments, the pump 9523 is configured to push the buffer solution stored in the reservoir 9513 through a reservoir port 9525. When the reservoir port 9525 is connected to the inlet 9511 of the waveguide cartridge 9501, the pump 9523 is configured to inject the buffer solution from reservoir 9513 through the reservoir port 9525 of the reservoir 9513 and the inlet 9511 into the waveguide cartridge 9501.

In the example shown in FIG. 95A, in some embodiments, the example sample testing device 9500 comprises a waste collector 9517 that is removably connected to the outlet 9515 of the waveguide cartridge 9501. For example, the waste collector 9517 comprises a waste collector port 9527 that can be connected to the outlet 9515 of the waveguide cartridge 9501.

In some embodiments, the waveguide cartridge 9501 comprises a waveguide 9503, similar to various waveguides described herein. In some embodiments, the waveguide 9503 comprises at least one reference channel and at least one sample channel. For example, the waveguide 9503 comprises a first reference channel 9505, a second reference channel 9507, and a sample channel 9509.

In some embodiments, at the initial stage prior to sample testing operations (for example, when the waveguide cartridge 9501 was assembled and/or delivered), the first reference channel 9505, a second reference channel 9507, and the sample channel 9509 are filled with a buffer solution, and all bubbles are removed during assembly of the waveguide cartridge 9501.

In some embodiments, when the sample testing device 9500 is used to conduct sample testing operations, the first reference channel 9505 is configured to receive a reference solution, the second reference channel 9507 is configured to receive a buffer solution, and the sample channel 9509 is configured to receive a sample solution comprising a sample to be tested. For example, in some embodiments, the waveguide cartridge 9501 comprises a reference reservoir 9519 connected to the at least one reference channel (for example, the first reference channel 9505). In some embodiments, the reference reservoir 9519 is configured to receive a reference solution. Additionally, or alternatively, in some embodiments, the waveguide cartridge 9501 comprises a sample reservoir 9521 connected to the at least one sample channel (such as the sample channel 9509). In some embodiments, the sample reservoir 9521 is configured to receive a sample solution.

In some embodiments, a port of the multiport valve 9529 is connected to the inlet 9511 of the waveguide cartridge 9501. In some embodiments, a port of the multiport valve 9529 can be connected to one of the following options: (1) the outlet 9515 of the waveguide cartridge 9501, (2) at least one reference channel and at least one sample channel of the waveguide 9503, or (3) the reference reservoir 9519 and the sample reservoir 9521 of the waveguide cartridge 9501.

In some embodiments, the multiport valve 9529 is configured to provide and/or switch between a plurality of configurations that comprise at least:

(1) a first configuration where the multiport valve 9529 connects the inlet 9511 of waveguide cartridge 9501 to an outlet 9515 of the waveguide cartridge 9501, (2) a second configuration where the multiport valve 9529 connects the outlet 9515 of the waveguide cartridge 9501 to at least one reference channel (for example, the first reference channel 9505 and the second reference channel 9507) and at least one sample channel (for example, the sample channel 9509) of the waveguide 9503, and/or (3) a third configuration where the multiport valve 9529 connects the inlet 9511 of waveguide cartridge 9501 to the reference reservoir 9519 and the sample reservoir 9521 of the waveguide cartridge 9501, details of which are described herein.

Referring now to FIG. 95B, an example step/operation of an example method for operating the sample testing device 9500 is illustrated. In the example shown in FIG. 95B, the example step/operation comprises connecting a reservoir 9513 to an inlet 9511 of a waveguide cartridge 9501 of the sample testing device 9500. In some embodiments, the inlet 9511 of the waveguide cartridge 9501 is connected to the reservoir 9513 via the reservoir port 9525, and the outlet 9515 of the waveguide cartridge 9501 is connected to the waste collector 9517 via the waste collector port 9527.

As described above, in some embodiments, the reservoir 9513 stores a buffer solution and is connected to a pump 9523. In some embodiments, the sample testing device 9500 comprises a multiport valve 9529.

Referring now to FIG. 95C, an example step/operation of an example method for operating the sample testing device 9500 subsequent to the step/operation shown in FIG. 95B is illustrated. In the example shown in FIG. 95C, the example step/operation comprises switching the multiport valve 9529 to a first configuration to connect the inlet 9511 of the waveguide cartridge 9501 to the outlet 9515 of the waveguide cartridge 9501.

In some embodiments, the outlet 9515 is connected to a waste collector 9517. In some embodiments, the example method further comprises causing the pump 9523 to inject the buffer solution the reservoir 9513 to the inlet 9511 of the waveguide cartridge 9501. As such, the multiport valve 9529 connects the reservoir 9513 to the waste collector 9517, and the buffer solution is pushed through the multiport valve 9529 by the pump 9523 so as to purge any air from the sample testing device 9500.

Referring now to FIG. 95D, an example step/operation of an example method for operating the sample testing device 9500 subsequent to the step/operation shown in FIG. 95C is illustrated. In the example shown in FIG. 95D, the example step/operation comprises switching the multiport valve 9529 to a second configuration to connect the inlet 9511 of the waveguide cartridge 9501 to at least one reference channel (for example, the first reference channel 9505 and the second reference channel 9507) and at least one sample channel (for example, the sample channel 9509) of the waveguide 9503 of the waveguide cartridge 9501.

As described above, the pump 9523 is turned on to push the buffer solution from the reservoir 9513. Because the multiport valve 9529 is in the second configuration, the buffer solution is pushed from the reservoir 9513 through the first reference channel 9505, the second reference channel 9507, and the sample channel 9509. In some embodiments, the first reference channel 9505, the second reference channel 9507, and the sample channel 9509 are each connected to the outlet 9515, and the buffer solution may be flushed through the first reference channel 9505, the second reference channel 9507, and the sample channel 9509 (for example, to remove air from these channels) and be discharged from the first reference channel 9505, the second reference channel 9507, and the sample channel 9509 to the waste collector 9517 via the outlet 9515 and the waste collector port 9527.

Referring now to FIG. 95E, an example step/operation of an example method for operating the sample testing device 9500 subsequent to the step/operation shown in FIG. 95D is illustrated. In the example shown in FIG. 95E, the example step/operation comprises releasing a reference solution through the reference reservoir 9519 of the waveguide cartridge 9501 and the sample reservoir 9521 of the waveguide cartridge 9501.

In some embodiments, the sample reservoir 9521 stores a sample solution and is sealed with a pierceable membrane. When the membrane is pierced, the sample solution is released from sample reservoir 9521. Similarly, the reference reservoir 9519 stores a reference solution and is sealed with a pierceable membrane. When the membrane is pierced, the reference solution is released from reference reservoir 9519.

In some embodiments, a sample solution may be injected to the sample reservoir 9521 while the waveguide cartridge 9501 is in use. Similarly, a reference solution may be injected to the reference reservoir 9519 while the waveguide cartridge 9501 is in use.

In some embodiments, the reference reservoir 9519 is connected to the first reference channel 9505. The multiport valve 9529, when in the first configuration, is also connected to the first reference channel 9505. In some embodiments, the connection point between the multiport valve 9529 and the first reference channel 9505 is positioned after the connection point between the reference reservoir 9519 and the first reference channel 9505 in the flow direction, and prior to the waveguide 9503. In the example shown in FIG. 95E, as the pump 9523 pushes the buffer solution through the multiport valve 9529 to the first reference channel 9505, the reference solution released from or injected to the reference reservoir 9519 does not travel to the first reference channel 9505 when the multiport valve 9529 is in the first configuration.

Similarly, in some embodiments, the sample reservoir 9521 is connected to the sample channel 9509. The multiport valve 9529, when in the first configuration, is also connected to the sample channel 9509. In some embodiments, the connection point between the multiport valve 9529 and the sample channel 9509 is positioned after the connection point between the sample reservoir 9521 and the sample channel 9509 in the flow direction, and prior to the waveguide 9503. In the example shown in FIG. 95E, because the pump 9523 pushes the buffer solution through the multiport valve 9529 to the sample channel 9509, the sample solution released from or injected to the sample reservoir 9521 does not travel to the sample channel 9509 when the multiport valve 9529 is in the first configuration.

Referring now to FIG. 95F, an example step/operation of an example method for operating the sample testing device 9500 subsequent to the step/operation shown in FIG. 95E is illustrated. In the example shown in FIG. 95F, the example step/operation comprises switching the multiport valve 9529 to from the second configuration to a third configuration to connect the inlet 9511 of the waveguide cartridge 9501 to the reference reservoir 9519 and the sample reservoir 9521 of the waveguide cartridge 9501.

As described above, the reference reservoir 9519 is connected to the at least one reference channel (for example, the first reference channel 9505), and the sample reservoir is connected to the at least one sample channel (for example, the sample channel 9509). As such, by switching the multiport valve 9529 from the second configuration to the third configuration, the reservoir 9513 is connected to the multiport valve 9529, which in turn is connected to the reference reservoir 9519, which in turn is connected to the outlet 9515. At the same time, the reservoir 9513 is connected to the multiport valve 9529, which in turn is connected to the second reference channel 9507, which in turn is connected to the outlet 9515. At the same time, the reservoir 9513 is connected to the multiport valve 9529, which in turn is connected to the sample reservoir 9521, which in turn is connected to the sample channel 9509, which in turn is connected to the outlet 9515.

Referring now to FIG. 95G, an example step/operation of an example method for operating the sample testing device 9500 subsequent to the step/operation shown in FIG. 95F is illustrated. In the example shown in FIG. 95G, the example step/operation comprises causing the pump 9523 to simultaneously push the reference solution from the reference reservoir 9519 through the first reference channel 9505, push the buffer solution from the reservoir port 9525 through the second reference channel 9507, and push the sample solution from the sample reservoir 9521 through the sample channel 9509.

Similar to various embodiments described herein, as the sample solution travels through the sample channel 9509 of the waveguide 9503 (and the reference solution travels through the first reference channel 9505 of the waveguide 9503), an imaging component may capture signals such as interference fringe patterns from the waveguide 9503.

In some embodiments, the amount of the reference solution and the amount of the sample solution that are pushed to the first reference channel 9505 and the sample channel 9509, respectively, may be controlled based on various means. For example, the sample reservoir 9521 and the reference reservoir 9519 each stores a predetermined amount of sample solution and reference solution, respectively, and each sealed with a pierceable membrane. When the membranes are pierced (for example, in connection with FIG. 95E), the predetermined amount of sample solution and reference solution are released.

Additionally, or alternatively, the amount of the reference solution and the amount of the sample solution may be controlled based on the amount of time that the multiport valve 9529 is in the third configuration. For example, the time duration because the time point that the multiport valve 9529 is switched from the second configuration to the third configuration (as shown in FIG. 95F) and the time point that the multiport valve 9529 is switched from the third configuration to the second configuration (as will be described in connection with FIG. 95H) is determined based on the amount of the reference solution/the sample solution that is needed to conduct an accurate testing.

Referring now to FIG. 95H, an example step/operation of an example method for operating the sample testing device 9500 subsequent to the step/operation shown in FIG. 95G is illustrated. In the example shown in FIG. 95H, the example step/operation comprises switching the multiport valve 9529 from the third configuration back to the second configuration to connect the inlet 9511 of the waveguide cartridge 9501 to at least one reference channel (for example, the first reference channel 9505 and the second reference channel 9507) and at least one sample channel (for example, the sample channel 9509) of the waveguide 9503 of the waveguide cartridge 9501.

In some embodiments, after the imaging component captures signals such as interference fringe patterns from the waveguide 9503, the multiport valve 9529 is switched back to the second configuration from the third configuration. As shown in FIG. 95H, in the third configuration, the multiport valve 9529 bypasses the reference reservoir 9519 and the sample reservoir 9521, and connects the reservoir 9513 directly to the first reference channel 9505 and the sample channel 9509.

Figure 95I:
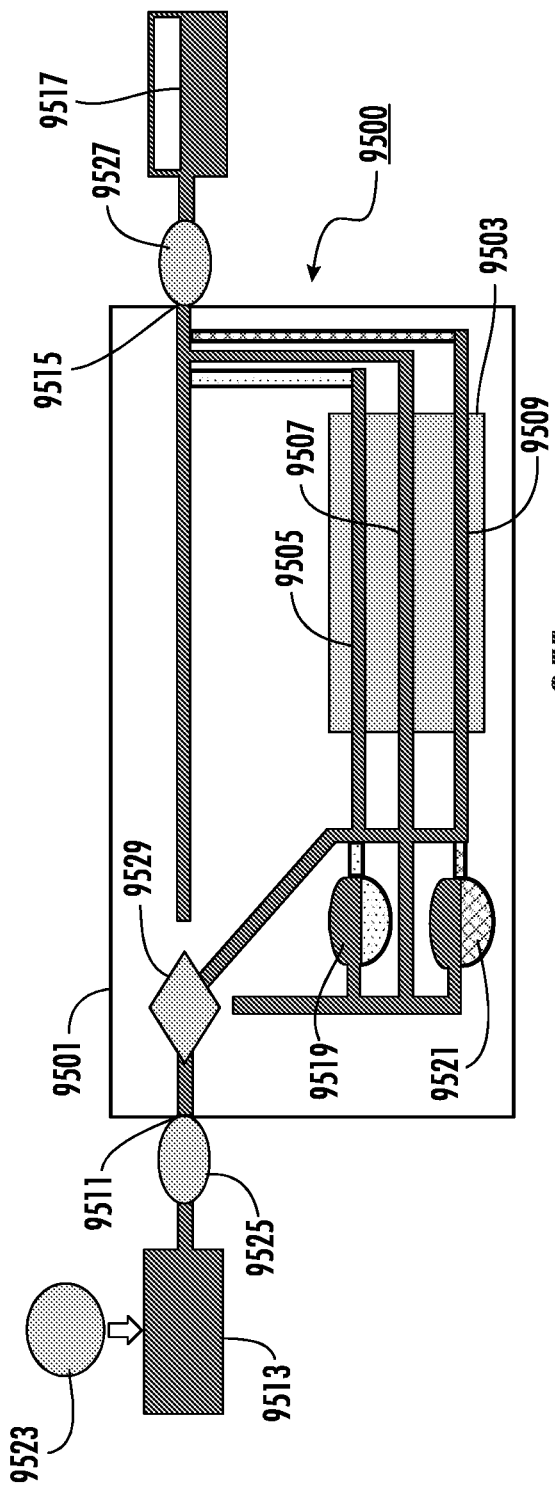

Referring now to FIG. 95I, an example step/operation of an example method for operating the sample testing device 9500 subsequent to the step/operation shown in FIG. 95H is illustrated. In the example shown in FIG. 95I, the example step/operation comprises causing the pump 9523 to push buffer solution through the first reference channel 9505 and the sample channel 9509.

As described above, the multiport valve 9529 bypasses the reference reservoir 9519 and the sample reservoir 9521 in the third configuration. As such, the pump 9523 pushes buffer solution through the first reference channel 9505 and the sample channel 9509. As the first reference channel 9505 and the sample channel 9509 are connected to the outlet 9515 of the waveguide cartridge 9501 (which is connected to the waste collector 9517), the pump 9523 flushes the reference solution in the first reference channel 9505 and the sample solution in the sample channel 9509 to the waste collector 9517.

Figure 95J:
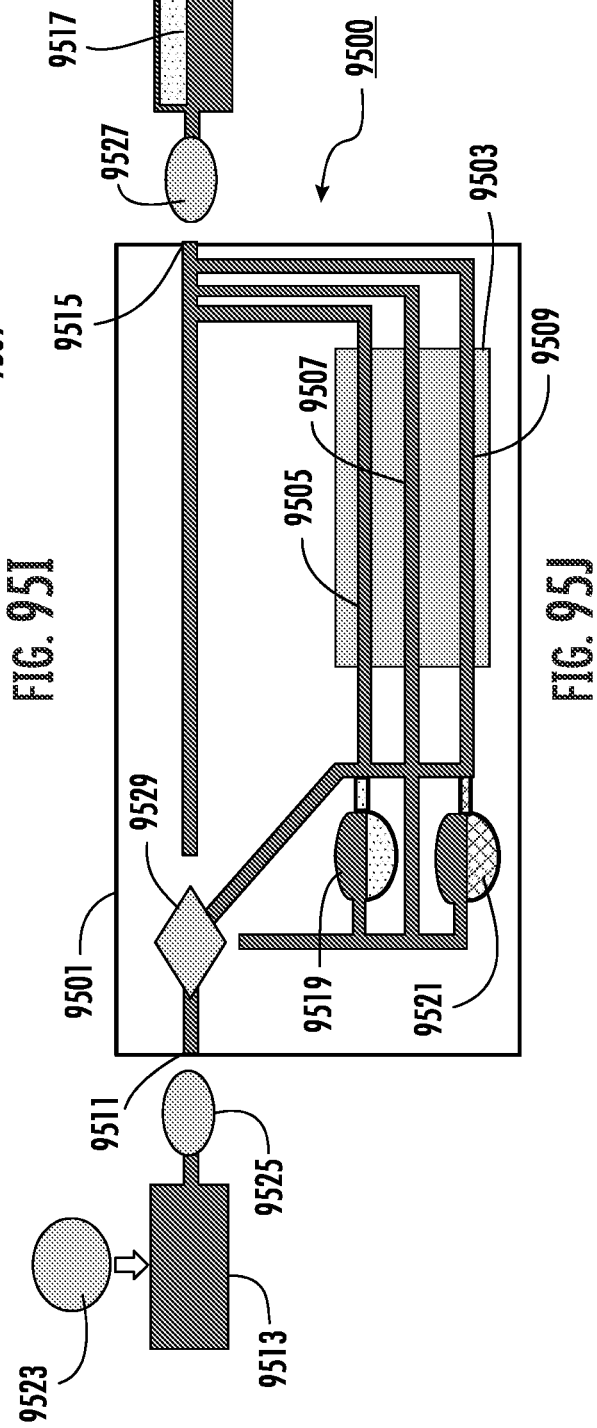

Referring now to FIG. 95J, an example step/operation of an example method for operating the sample testing device 9500 subsequent to the step/operation shown in FIG. 95I is illustrated. In the example shown in FIG. 95J, the example step/operation comprises disconnecting the reservoir 9513 and the waste collector 9517 from the waveguide cartridge 9501.

In some embodiments, after the sample testing potation is done, the inlet 9511 of the waveguide cartridge 9501 is disconnected from the inlet 9511 of the reservoir 9513, and the outlet 9515 of the waveguide cartridge 9501 is disconnected from the outlet 9515 of the reservoir 9513. In some embodiments, the waveguide cartridge 9501 may be discarded in accordance with biohazard safety handling procedures.

Referring now to FIG. 96A, FIG. 96B, and FIG. 96C, an example multiport valve 9600 that can be used in connection with the example sample testing device 9500 shown in FIG. 95A to FIG. 95J in accordance with various embodiments of the present disclosure is illustrated.

As described above, the example multiport valve 9529 of the example sample testing device 9500 may provide three different configurations. Accordingly, FIG. 96A illustrates a first configuration of the example multiport valve 9600, FIG. 96B illustrates a second configuration of the example multiport valve 9600, and FIG. 96C illustrates a third configuration of the example multiport valve 9600.

In the example shown in FIG. 96A to FIG. 96C, the example multiport valve 9600 comprises a valve housing 9602 and a moveable piston 9604.

In some embodiments, a plurality of channels is connected to the valve housing 9602, including a plurality of inlet channels and a plurality of outlet channels. In the example shown in FIG. 96A to FIG. 96C, a first inlet channel 9612, a second inlet channel 9614, a third inlet channel 9616, and a fourth inlet channel 9618 are connected to the valve housing 9602. In particular, a first end each of the first inlet channel 9612, the second inlet channel 9614, the third inlet channel 9616, and the fourth inlet channel 9618 is connected to a different opening on the valve housing 9602, while a second end each of the first inlet channel 9612, the second inlet channel 9614, the third inlet channel 9616, and the fourth inlet channel 9618 is connected to the same inlet port 9620. In operation, the inlet port 9620 is connected to a pump.

Additionally, a first outlet channel 9624, the second outlet channel 9626, a third outlet channel 9628, a fourth outlet channel 9630, a fifth outlet channel 9632 and a sixth outlet channel 9634 are connected to the valve housing 9602. In particular, a first end of the first outlet channel 9624, the second outlet channel 9626, the third outlet channel 9628, the fourth outlet channel 9630, the fifth outlet channel 9632 and the sixth outlet channel 9634 is connected to a different opening on the valve housing 9602. A second end of the first outlet channel 9624 is connected to the first outlet port 9636, which is connected to a waste collector (for example, connected to an outlet of a waveguide cartridge that is in turn connected to the waste collector). A second end of the second outlet channel 9626, the third outlet channel 9628, and the fourth outlet channel 9630 is connected to a second outlet port 9638, which is connected to a waveguide (for example, each of them connected to a different channel on the waveguide). A second end of the fifth outlet channel 9632 and the sixth outlet channel 9634 is connected to a third outlet port 9640, which is connected to a reservoir (for example, one of them connected to the sample reservoir and the other to the reference reservoir).

In some embodiments, the moveable piston 9604 is positioned within the valve housing 9602 and is movable. For example, a plurality of rolling balls (such as the rolling ball 9606) may be positioned between an inner surface of the valve housing 9602 and the outer surface of the moveable piston 9604.

In some embodiments, the movement of the moveable piston 9604 may be controlled by an actuator within or outside of the example multiport valve 9600. For example, the moveable piston 9604 may be directly connected to a motor that enables the moveable piston 9604 to move in two different directions. Additionally, or alternatively, the actuator may press on the moveable piston 9604 in one direction, and a spring (for example, located inside of a waveguide cartridge) may press the moveable piston 9604 in the opposite direction. Additionally, or alternatively, actuators are positioned on each side of the example multiport valve 9600, and each actuator causes the moveable piston 9604 to move in opposite directions (for example, an actuator causes the moveable piston 9604 to move in the left direction and another actuator causes the moveable piston 9604 to move in the right direction). While the description above provides some example ways of controlling the movement of the moveable piston 9604, it is noted that the scope of the present disclosure is not limited to the description above. In some examples, the movement of the moveable piston 9604 may be controlled in other ways.

In some embodiments, the moveable piston 9604 comprises various portions including connecting portions (such as the connecting portion 9608) and blocking portions (such as the blocking portion 9610). In some embodiments, a connecting portion is configured to connect two openings on the valve housing 9602 such that a liquid can flow from one opening from the other opening. In some embodiments, a blocking portion is configured to disconnect or block two openings on the valve housing 9602 such that a liquid cannot flow from one opening from the other opening.

As described above, the example multiport valve 9600 is in the first configuration in FIG. 96A. In particular, when in the first configuration, the moveable piston 9604 is moved within the valve housing 9602 in such a way that the fourth inlet channel 9618 is connected to the first outlet channel 9624 by a connecting portion of the moveable piston 9604, while the first inlet channel 9612, the second inlet channel 9614, and the third inlet channel 9616 are not connected to any of the outlet channels due to the blocking portions of the moveable piston 9604.

In some embodiments, the fourth inlet channel 9618 is connected to the inlet port 9620, which in turn is connected to the pump and the reservoir storing buffer solution. The first outlet channel 9624 is connected to the first outlet port 9636, which in turn is connected to a waste collector. As such, when in the first configuration, the example multiport valve 9600 causes the pump to push buffer solution from the reservoir to the waste collector, while direct paths from the pump to the waveguide and to the reservoirs are sealed off.

As described above, the example multiport valve 9600 is in the second configuration in FIG. 96B. In particular, when in the second configuration, the moveable piston 9604 is moved within the valve housing 9602 in such a way that the third inlet channel 9616 is connected to the second outlet channel 9626 via a connecting portion of the moveable piston 9604, the second inlet channel 9614 is connected to the third outlet channel 9628 via a connecting portion of the moveable piston 9604, and the first inlet channel 9612 is connected to the fourth outlet channel 9630 via a connecting portion of the moveable piston 9604. The fourth inlet channel 9618 is not connected to any of the outlet channels.

In some embodiments, the first inlet channel 9612, the second inlet channel 9614, and the third inlet channel 9616 are connected to the inlet port 9620, which in turn is connected to the pump and the reservoir storing buffer solution. The second outlet channel 9626, the third outlet channel 9628, and the fourth outlet channel 9630 are connected to the waveguide (for example, each of them connected to a channel of the waveguide). As such, when in the second configuration, the example multiport valve 9600 causes the pump to push the buffer solution from the reservoir to channels on the waveguide (for example, the at least one sample channel and the at least one reference channel such as the first reference channel 9505, the second reference channel 9507, and the sample channel 9509) shown in connection with FIG. 95A to FIG. 95J), while direct paths from the pump to the waste collector and to the reservoirs are sealed off.

As described above, the example multiport valve 9600 is in the third configuration in FIG. 96C. In particular, when in the third configuration, the moveable piston 9604 is moved within the valve housing 9602 in such a way that the first inlet channel 9612 is connected to the fifth outlet channel 9632 via a connecting portion of the moveable piston 9604, the second inlet channel 9614 is connected to the third outlet channel 9628 via a connecting portion of the moveable piston 9604, and the third inlet channel 9616 is connected to the sixth outlet channel 9634 via a connecting portion of the moveable piston 9604. The fourth inlet channel 9618 is not connected to any of the outlet channels.

In some embodiments, the first inlet channel 9612, the second inlet channel 9614, and the third inlet channel 9616 are connected to the inlet port 9620, which in turn is connected to the pump and the reservoir storing buffer solution. The fifth outlet channel 9632 and the sixth outlet channel 9634 may be connected to one of the sample reservoir or the reference reservoir, while the third outlet channel 9628 may be connected to one of the reference channels on the waveguide (such as the second reference channel 9507 shown above in connection with FIG. 95A to FIG. 95J). As such, when in the third configuration, the example multiport valve 9600 causes the pump to push buffer solution through the sample reservoir and the reference reservoir, while the direct path from the pump to the waste collector is sealed off.

Referring now to FIG. 97A and FIG. 97B, example diagrams illustrating an example sample testing device 9700 are provided. FIG. 98A, FIG. 98B, and FIG. 98C illustrate an example multiport valve 9800 that can be used in connection with the example sample testing device 9700 illustrated in FIG. 97A and FIG. 97B in accordance with various embodiments of the present disclosure. FIG. 99A and FIG. 99B illustrate an example valve 9900 that can be used in connection with the example sample testing device 9700 illustrated in FIG. 97A and FIG. 97B in accordance with various embodiments of the present disclosure Referring now to FIG. 97A and FIG. 97B, the example sample testing device 9700 comprises a waveguide 9701 and a multiport valve 9709.

In some embodiments, the waveguide 9701 comprises at least one reference channel and at least one sample channel. In the example shown in FIG. 97A and FIG. 97B, the waveguide 9701 comprises a buffer channel 9703, a reference channel 9705, and a sample channel 9707, similar to those described above.

In some embodiments, the multiport valve 9709 comprises at least one buffer solution port (such as the first buffer solution port 9719, the second buffer solution port 9721, and the third buffer solution port 9723), at least one reference solution port (such as the first reference solution port 9711 and the second reference solution port 9731), and at least one sample solution port (such as the first sample solution port 9715 and the second sample solution port 9733).

In some embodiments, the buffer reservoir 9717 stores buffer solution and is connected to the first buffer solution port 9719, second buffer solution port 9721, and the third buffer solution port 9723 of the multiport valve 9709. In some embodiments, the reference reservoir 9710 stores reference solution and is connected to the first reference solution port 9711 and the second reference solution port 9731 of the multiport valve 9709. In some embodiments, the sample reservoir 9713 stores sample solution and is connected to the first sample solution port 9715 and the second sample solution port 9733. In some embodiments, the waste collector 9753 is connected to the first waste port 9735 and the second waste port 9737 of the multiport valve 9709. In some embodiments, the buffer channel 9703 of the waveguide 9701 is connected to the buffer channel port 9725. In some embodiments, the reference channel 9705 is connected to the first reference channel port 9727 and the second reference channel port 9739. In some embodiments, the sample channel 9707 is connected to the first sample channel port 9729 and the second sample channel port 9741.

In some embodiments, the multiport valve 9709 comprises a plurality of connectors, and the multiport valve 9709 is configured to provide a plurality of configurations where connectors connect different ports in different configurations. In particular, FIG. 97A illustrates a first configuration, and FIG. 97B illustrates a second configuration.

Referring now to FIG. 97A, in the first configuration, the multiport valve 9709 connects the at least one buffer solution port to the at least one reference channel and the at least one sample channel. For example, the connector 9743 of the multiport valve 9709 connects the first buffer solution port 9719 to the buffer channel port 9725. The connector 9745 of the multiport valve 9709 connects the second buffer solution port 9721 to the first reference channel port 9727, the connector 9747 of the multiport valve 9709 connects the third buffer solution port 9723 to the first sample channel port 9729.

In operation, a pump is connected to the buffer reservoir 9717 to push the buffer solution from the buffer reservoir 9717 to the buffer channel 9703, the reference channel 9705, and the sample channel 9707. The buffer solution travels through these channels and is discharged to the waste collector 9753.

In the first configuration, the connector 9749 of the multiport valve 9709 connects the first waste port 9735 to the first reference solution port 9711, and the connector 9751 of the multiport valve 9709 connects the second waste port 9737 to the first sample solution port 9715. As such, the reference solution from the reference reservoir 9710 flows to the waste collector 9753 without passing through any channels of the waveguide 9701, and the sample solution from the sample reservoir 9713 flows to the waste collector 9753 without passing through any channels of the waveguide 9701.

Referring now to FIG. 97B, in the second configuration, the multiport valve 9709 connects the reference solution port to the at least one reference channel and the sample solution port to the at least one sample channel. For example, the connector 9743 of the multiport valve 9709 connects the first buffer solution port 9719 to the buffer channel port 9725, the connector 9749 of the multiport valve 9709 connects the first reference solution port 9711 to the second reference channel port 9739, and the connector 9751 of the multiport valve 9709 connects the first sample solution port 9715 to the second sample channel port 9741.

Further, in the second configuration, the connector 9745 of the multiport valve 9709 connects the second buffer solution port 9721 to the second reference solution port 9731, and the connector 9747 of the multiport valve 9709 connects the third buffer solution port 9723 to the second sample solution port 9733. In operation, a pump is connected to the buffer reservoir 9717 to push the buffer solution from the buffer reservoir 9717 to the buffer channel 9703 and then to the waste collector 9753. The pump pushes liquid from the buffer reservoir 9717 to the reference reservoir 9710 (which stores reference solution), and in turn pushes the reference solution from the reference reservoir 9710 to the reference channel 9705 via the first reference solution port 9711 and the second reference channel port 9739. Similarly, the pump pushes liquid from the buffer reservoir 9717 to the sample reservoir 9713 (which stores sample solution), and in turn pushes the sample solution from the sample reservoir 9713 to the sample channel 9707 via the first sample solution port 9715 and the second sample channel port 9741. Subsequently, the reference solution and the sample solution are pushed to the waste collector 9753.

Referring now to FIG. 98A, FIG. 98B, and FIG. 98C, an example multiport valve 9800 that can be used in connection with the example sample testing device 9700 shown in FIG. 97A and FIG. 97B in accordance with various embodiments of the present disclosure is illustrated.

As described above, the example multiport valve 9709 of the example sample testing device 9700 may provide two different configurations. Accordingly, FIG. 98B illustrates a second configuration of the example multiport valve 9800 and FIG. 96C illustrates a first configuration of the example multiport valve 9800. FIG. 98A illustrates example components associated with the multiport valve 9800.

In some embodiments, the multiport valve 9800 comprises a valve base 9804 and a flexible membrane 9806 defining a flow channel. In particular, the flow channel is configured to receive buffer solution from the buffer inlet 9802 (for example, as pushed from a reservoir by the pump).

In some embodiments, a plurality of outlet channels is connected to the channel defined by the valve base 9804 and the flexible membrane 9806. In particular, a first outlet channel 9808, a second outlet channel 9810, a third outlet channel 9812, a fourth outlet channel 9814, a fifth outlet channel 9816, and a sixth outlet channel 9818 are connected to the flow channel defined by the valve base 9804 and the flexible membrane 9806 (e.g., connected to a bottom surface of the valve base 9804).

In particular, a first end of the first outlet channel 9808, the second outlet channel 9810, the third outlet channel 9812, the fourth outlet channel 9814, the fifth outlet channel 9816, and the sixth outlet channel 9818 is connected to a different opening on the valve base 9804. In some embodiments, a second end of the fourth outlet channel 9814 is connected to a waste collector via the outlet port 9820 (for example, connected to an outlet of a waveguide cartridge that is in turn connected to the waste collector). In some embodiments, a second end of the first outlet channel 9808, the second outlet channel 9810, and the third outlet channel 9812 is connected to a waveguide via the outlet port 9822 (for example, each of them connected to a different channel on the waveguide). In some embodiments, a second end of the fifth outlet channel 9816 and the sixth outlet channel 9818 is connected to a reservoir via the outlet port 9824 (for example, one of them connected to the sample reservoir and the other to the reference reservoir).

In some embodiments, the example multiport valve 9800 comprises a rigid block 9826 and a rigid block 9828. The rigid block 9826 comprises two rigid bars, and the rigid block 9828 comprises three rigid bars. An actuator may exert a vertical force on the rigid block 9826 and/or the rigid block 9826 onto the flexible membrane 9806, and the rigid block 9826 and/or the rigid block 9826 close different portions of the flow channel defined by the flexible membrane 9806 and the valve base 9804. In some embodiments, one or more actuators may be multiple solenoids, and each of them pushes one of the rigid block 9826 or the rigid block 9826 to open/close off the flow channel defined by the valve base 9804 and the flexible membrane 9806. In some embodiments, an actuator may press both rigid block 9826 and the rigid block 9826 through pressing or rotating actions.

As shown in FIG. 98B, when the multiport valve 9800 is in the second configuration, the actuator may push the rigid block 9828 onto the flexible membrane 9806, and the three bars of the rigid block 9828 may block three different portions of the flow channel defined by the flexible membrane 9806 and the valve base 9804.

In particular, after the rigid block 9828 is pressed onto the flexible membrane 9806, the three bars of the rigid block 9828 are positioned between the opening for the first outlet channel 9808 and the opening for the fifth outlet channel 9816, between the opening for the second outlet channel 9810 and the opening for the third outlet channel 9812, and between the opening for the sixth outlet channel 9818 and the opening for the fourth outlet channel 9814, respectively. As such, the actuator presses the flexible membrane 9806 against the bottom surface of the valve base 9804 to seal off path to waveguide (e.g., blocking the buffer solution from traveling through the first outlet channel 9808, the second outlet channel 9810, and the third outlet channel 9812) and opens the paths to reservoirs (e.g., enabling the buffer solution to travel from the buffer inlet 9802 to the fifth outlet channel 9816 and to the sixth outlet channel 9818).

As shown in FIG. 98C, when the multiport valve 9800 is in the first configuration, the actuator may push the rigid block 9826 onto the flexible membrane 9806, and the two bars of the rigid block 9826 may block two different portions of the flow channel defined by the flexible membrane 9806 and the valve base 9804.

In particular, after the rigid block 9826 is pushed onto the flexible membrane 9806, the two bars of the rigid block 9826 are positioned between the opening for the fifth outlet channel 9816 and the opening for the second outlet channel 9810, and between the opening for the third outlet channel 9812 and the opening for the sixth outlet channel 9818, respectively. As such, the actuator presses the flexible membrane 9806 against the bottom surface of the valve base 9804 to seal off paths to reservoirs (e.g., blocking the buffer solution from traveling through the fifth outlet channel 9816 and to the sixth outlet channel 9818) and opens paths to waveguide (e.g. enabling the buffer solution to travel from the third outlet channel 9812 to the first outlet channel 9808, to the second outlet channel 9810, and to the third outlet channel 9812).

Referring now to FIG. 99A and FIG. 99B, an example valve 9900 is illustrated. In particular, the example valve 9900 can be used in connection with the example sample testing device 9700 shown in FIG. 97A to FIG. 97B and/or provide the multiport valve 9800 shown in FIG. 98A to FIG. 98C in accordance with various embodiments of the present disclosure is illustrated In some embodiments, the example valve 9900 comprises a flexible member 9904 positioned on a fixed member 9902. In some embodiments, the flexible member 9904 comprises a blocking member 9906. In some embodiments, the example valve 9900 is configured to provide different configurations based on the position of the blocking member 9906.

In some embodiments, the fixed member 9902 defines a first opening 9908 and a second opening 9910. In the example shown in FIG. 99A, when an upwards force is exerted on the flexible member 9904 (for example, via an actuator), the example valve 9900 is in the first configuration. In the first configuration, a solution may flow from one of the first opening 9908 or the second opening 9910, and exit from the other opening as the blocking member 9906 of the flexible member 9904 does not block the flow of solution.

In the example shown in FIG. 99B, when a downward force is exerted on the flexible member 9904 (for example, via an actuator), the example valve 9900 is in the second configuration. In the second configuration, the blocking member 9906 blocks one of the first opening 9908 or the second opening 9910, which blocks the flow of solution in the example valve 9900.

Sample testing devices such as waveguide virus sensors use antibodies to immobilize specific viruses on the waveguide sensing surface to detect targeted viruses. Sample channels in many waveguides have an effective width (e.g., the width of effective sensing area) of 4 micron with a pitch (e.g., a channel-to-channel distance) of 250 micron. As such, for many waveguides that implement uniformly coated antibodies, only $4/250=1.6\%$ of immobilized viral particles can be sensed by these narrow waveguides. For example, because areas that are not effective areas (for example, areas that are outside of the sample channels) may be coated by the antibody, virus in a sample may be immobilized to these non-effective sensing areas. Immobilization can happen over the entire antibody coated surface, but only viruses on the narrow effective sensing area can be detected. As such, the virus detection capability of many waveguides is limited to only detecting samples that have a high concentration level of virus.

To solve the low efficiency problem in detection of immobilized viral particles due to the narrow waveguide in wider waveguide pitch, narrow antibody coating is needed to closely match the width of the waveguide sensing width. As such, there is a need for precision narrow antibody coating to improve the limit of detection.

Various embodiments of the present disclosure overcome these technical challenges and difficulties, and satisfy these needs described above.

For example, various embodiments of the present disclosure provide a precision narrow antibody coating that can push the limit of detection of the waveguide sensor 60 times as compared to uniformly coated antibody. In some embodiments, antibodies are first coated uniformly over the entire sensing surface of the die on the wafer ring after dicing. In some embodiments, the antibody coating is then partially deactivated with only matching waveguide area remaining active. In some embodiments, the photolithographic-like process can achieve semiconductor process accuracy to have matching antibody narrow patterns for the best detection efficiency.

In some embodiments, the optical deactivating light source can be UV, VIS or near IR. In some embodiments, a photolithographic-like process leaves antibodies on unexposed areas alive for immobilization virus sensing. Additionally, or alternatively, the narrow antibody pattern can be directly printed with an inkjet like process. Additionally, or alternatively, the precision antibody coating approach provided in accordance with various embodiments of the present disclosure can be applied to the sensor types other than waveguide, such as lateral flow immunoassay to improve the sensitivity.

As such, various embodiments of the present disclosure may provide technical improvements. For example, various embodiments of the present disclosure may provide precision narrow antibody coating and improve the limit of detection. As another example, the narrow antibody coating allows wide fluid channels to overcome difficulties due to narrow fluid channels in fabrication and operation processes. Additionally, or alternatively, non-parallel flow direction needs to be implemented in the fluidics to allow high immobilization efficiency of all viral particles.

Referring now to FIG. 100A, FIG. 100B, and FIG. 100C, an example method for manufacturing a sample testing device is provided. In particular, FIG. 100A, FIG. 100B, and FIG. 100C illustrate an example of precision coating of antibodies.

As shown in FIG. 100A, the example method comprises providing at least one ultraviolet (UV) shielding mask (such as the UV shielding mask 10000A and the UV shielding mask 10000B). In some embodiments, the UV shielding mask comprises material that block UV light. In some embodiments, the size of the UV shielding mask is the same as the size of the sampling area for the waveguide. For example, a width W of the UV shielding mask 10000A is 4 um. In some embodiments, the width W can be other values.

Referring now to FIG. 100B, the example method comprises uniformly coated antibody on a surface of a waveguide layer 10004 of the sample testing device 10002, covering the sampling area of the waveguide layer with the at least one UV shielding mask (for example, the UV shielding mask 10000A and the UV shielding mask 10000B).

In some embodiments, the waveguide layer 10004 may be part of a sensing die. In some embodiments, the antibody may be covered uniformly on the entire sensing surface with die on the wafer ring after dicing the sensing dice.

In some embodiments, the UV shielding mask 10000A and the UV shielding mask 10000B are attached to areas of the surface of the waveguide layer 10004 that correspond to the sensing areas. For example, a length L between the UV shielding mask 10000A and the UV shielding mask 10000B may be 250 um. In some embodiments, the length L can be other values.

Referring now to FIG. 100C, the example method comprises projecting a UV light onto the surface of the waveguide layer 10004, and, subsequent to projecting the UV light onto the surface of the waveguide layer 10004, removing the UV shielding mask (for example, the UV shielding mask 10000A and the 10000B) from the waveguide layer 10004.

In some embodiments, when the UV light is projected onto the surface of the waveguide layer 10004, the UV light deactivates antibody on the surface of the waveguide layer 10004 that is not covered by any UV shielding mask, such as an area 10006 that is not covered by either the UV shielding mask 10000A or the UV shielding mask 10000B. In some embodiments, the UV light does not deactivate antibodies on the surface of the waveguide layer 10004 that is covered by a UV shielding mask (which comprises UV blocking material), such as the area 10008A and the area 10008B.

As such, the surface of the waveguide layer 10004 comprises a sampling area that includes the area 10008A and the area 10008B and a non-sampling area that includes the area 10006.

In some embodiments, subsequent to removing the UV shielding mask from the waveguide layer 10004, the example method comprises attaching a flow channel plate onto the surface of the waveguide layer. In some embodiments, the flow channel plate defines a plurality of flow channels, and the example method further comprises aligning the plurality of flow channels of the flow channel plate with the sampling area (for example, the area 10008A and the area 10008B) on the surface of the waveguide layer 10004. The flow channels may receive a sample solution that may contain virus. The waveguide layer 10004 of the sample testing device cause immobilization of virus to only happen in the match narrow area (e.g., area 10008A and the area 10008B) where all binding viral particles can be detected because antibodies on other areas (such as area 10006) have been deactivated by the UV light.

While the description above provides an example of using UV light deactivating antibodies on the surface of the waveguide layer, it is noted that the scope of the present disclosure is not limited to the description above. In some examples, an example method may use other types of optical deactivating light source (such as, but not limited to, VIS or near IR) to deactivate antibodies on the surface of the waveguide layer. In such embodiments, the example method may implement shielding mask(s) that comprise material for blocking light from the corresponding optical deactivating light source.

Referring now to FIG. 101, an example sample testing device 10100 is illustrated. In the example shown in FIG. 101, the example sample testing device 10100 comprises a plurality of layers, such as, but not limited to, a substrate layer 10101, an intermediary layer 10103, a plurality of waveguide layers 10105, 10107, 10109 and an interface layer 10111, similar to those described above.

Referring now to FIG. 102A to FIG. 102E, an example waveguide 10200 is illustrated.

In the example, shown in FIG. 102A, the example waveguide 10200 may comprise a plurality of channels/windows for receiving solutions (e.g., sample solutions, buffer solutions, reference solutions, etc.), such as, but not limited to, a channel 10202, a channel 10204, and a channel 10206. In some embodiments, the example waveguide 10200 may comprise six total channels/windows. In some embodiments, the example waveguide 10200 may comprise less than or more than six channels/windows. In some embodiments, the example waveguide 10200 may comprise an input region 10222.

In some embodiments, each channel may have a length L1 of 15 mm and a width W1 of 50 um. In some embodiments, the pitch P1 (e.g., a distance between each channel) may be 250 um. In some embodiments, L1, W1, and/or P1 may be of other values.

In some embodiments, a distance L2 between the edge of the waveguide 10200 and the edge of a channel may be 8 mm. In some embodiments, L2 may be of other values.

Figure 102B:
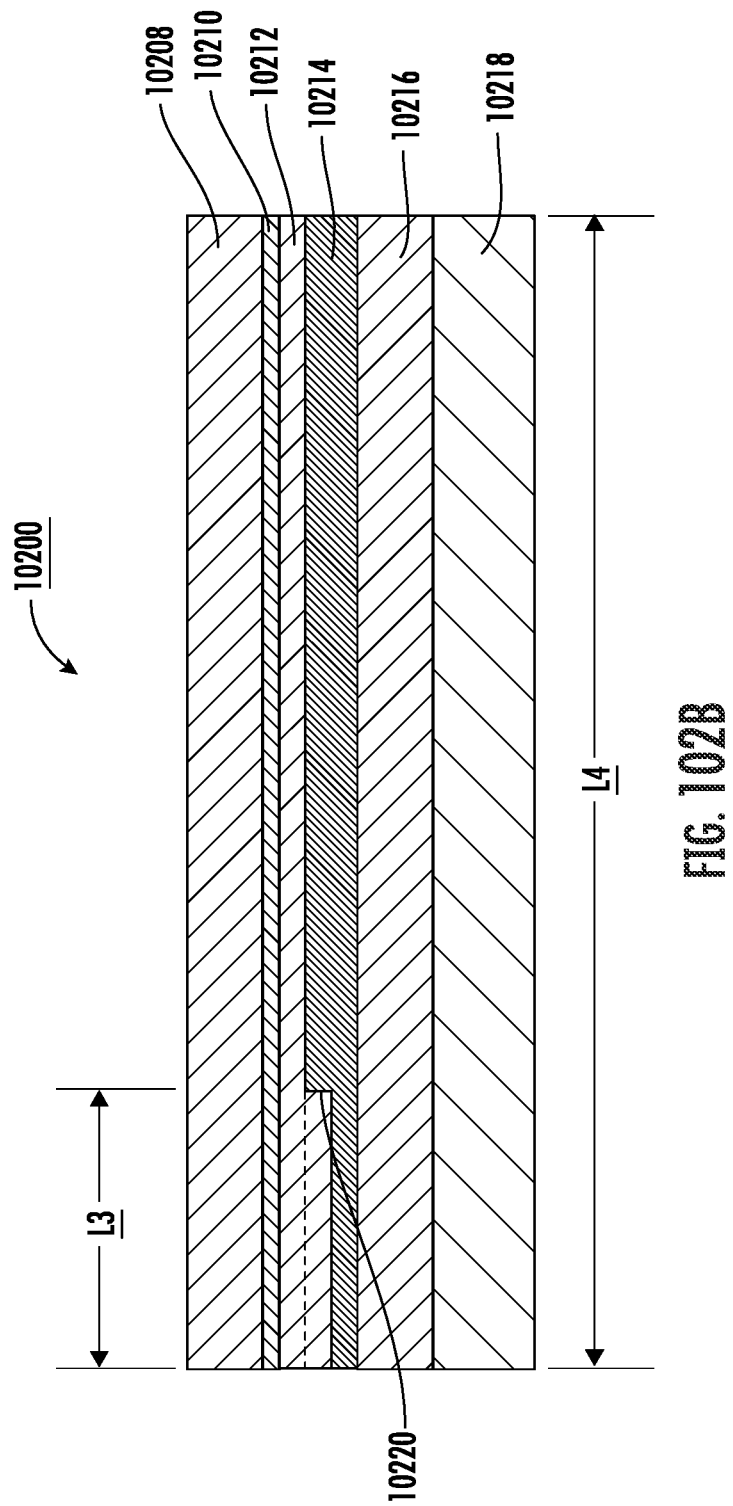
Figure 102C:
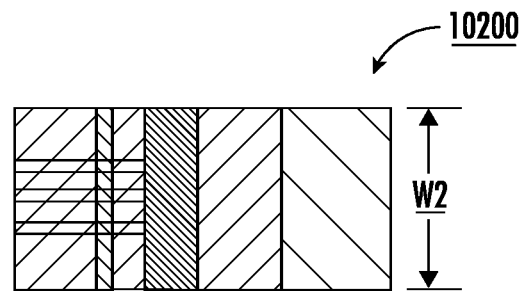
Figure 102D:
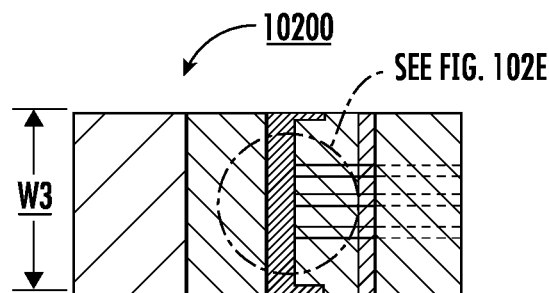

Referring now to FIG. 102B, FIG. 102C and FIG. 102D, additional views of the waveguide 10200 are illustrated. In particular, FIG. 102B illustrates an example cross-section view of the waveguide 10200 from the cut line A-A' and viewing in the direction as shown by the arrows. FIG. 102C illustrates an example cross-section view of the waveguide 10200 from the cut line B-B' and viewing in the direction as shown by the arrows. FIG. 102C illustrates an example cross-section view of the waveguide 10200 from the cut line C-C' and viewing in the direction as shown by the arrows.

As shown in FIG. 102B, the waveguide 10200 may comprise a plurality of layers. For example, the layer 10208 may comprise etched windows and materials such as SiO2. The layer 10208 is positioned on top of the layer 10210, which may comprise etched slots and materials such as poly. The layer 10210 is positioned on top of the layer 10212, which may comprise etched slots and materials such as SiO2. The layer 10212 is positioned on top of the layer 10214, which may comprise etched ribs and materials such as Si3N4. The layer 10214 is positioned on top of the layer 10216, which may comprise materials such as SiO2. The layer 10216 is positioned on top of the layer 10218, which may comprise materials such as silicon.

In the example shown in FIG. 102B, the waveguide 10200 may have a total length L4 of 310 mm. In some embodiments, the total length L4 may be of other values.

In the example shown in FIG. 102B, the layer 10214 may comprise a recessed portion 10220 that is recessed from an edge of the waveguide 10200. In some embodiments, a distance L3 between the edge of the waveguide 10200 and the edge of the recessed portion may be 75 mm. In some embodiments, the distance L3 may be of other values.

Referring now to FIG. 102C, a width W2 of the waveguide 10200 may be 4.4 mm. In some embodiments, the width W2 can be of other values.

Referring now to FIG. 102D, a width W3 of input region 10222 may be 3.9 mm. In some embodiments, the width W3 can be of other values.

Figure 102E:
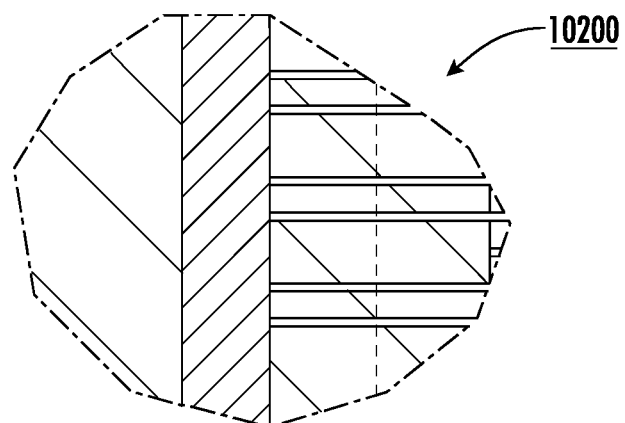

FIG. 102E illustrates a zoomed view of the area circled in FIG. 102D. As shown in FIG. 102E, the waveguide 10200 may comprise a total of six unburied channels, and may additionally include two buried channels.

Referring now to FIG. 103A to FIG. 103D, an example waveguide 10300 is illustrated.

As shown in FIG. 103A, an example top view of the example waveguide 10300 is illustrated. In some embodiments, the total top length L1 of the example waveguide 10300 may be 31 mm, and the width W1 of the example waveguide 10300 may be 4.46 mm. In some embodiments, L1 and/or W1 may be of other values.

In some embodiments, the example waveguide 10300 may comprise a plurality of channels. In some embodiments, the length L2 of the channels may be 15 mm. In some embodiments, a distance L3 between an edge of the channel to an edge of the waveguide 10300 may be 8 mm. In some embodiments, L2 and/or L3 may be of other values.

In some embodiments, a width W2 of the recession portion within the example waveguide 10300 (for example, similar to those described above in connection with at least FIG. 102B) may be 4.4 mm. In some embodiments, W2 may be of other values.

Referring now to FIG. 103B, an example side view of the example waveguide 10300 is illustrated. In the example shown in FIG. 103B, the example waveguide 10300 may have a total bottom length L4 of 31.06 mm. In some embodiments, L4 may be of other values.

Figure 103C:
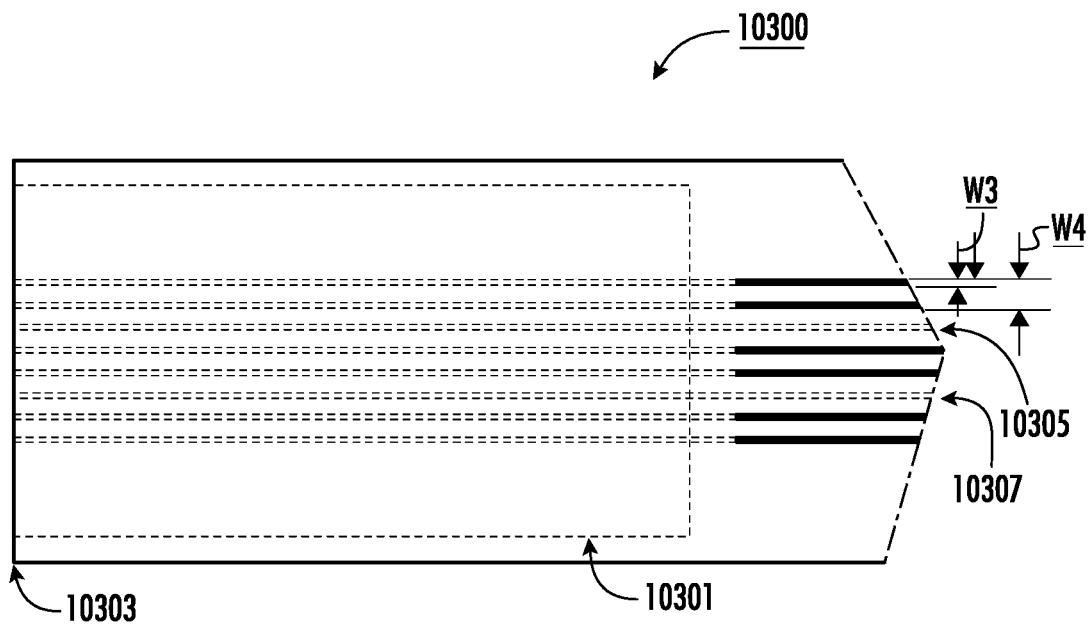

Referring now to FIG. 103C, a zoomed view of the portion circled in FIG. 103A is illustrated. In particular, FIG. 103C illustrates an input edge 10303 of the example waveguide 10300 and an input region 10301. In some embodiments, the example waveguide 10300 may comprise unburied channels and buried channel(s) such as a buried channel 10305 and the buried channel 10307. In some embodiments, each channel may have a width W3 of 50 um, and a distance W4 between two channels is 250 um. In some embodiments, W3 and W4 may be of other values.

Figure 103D:
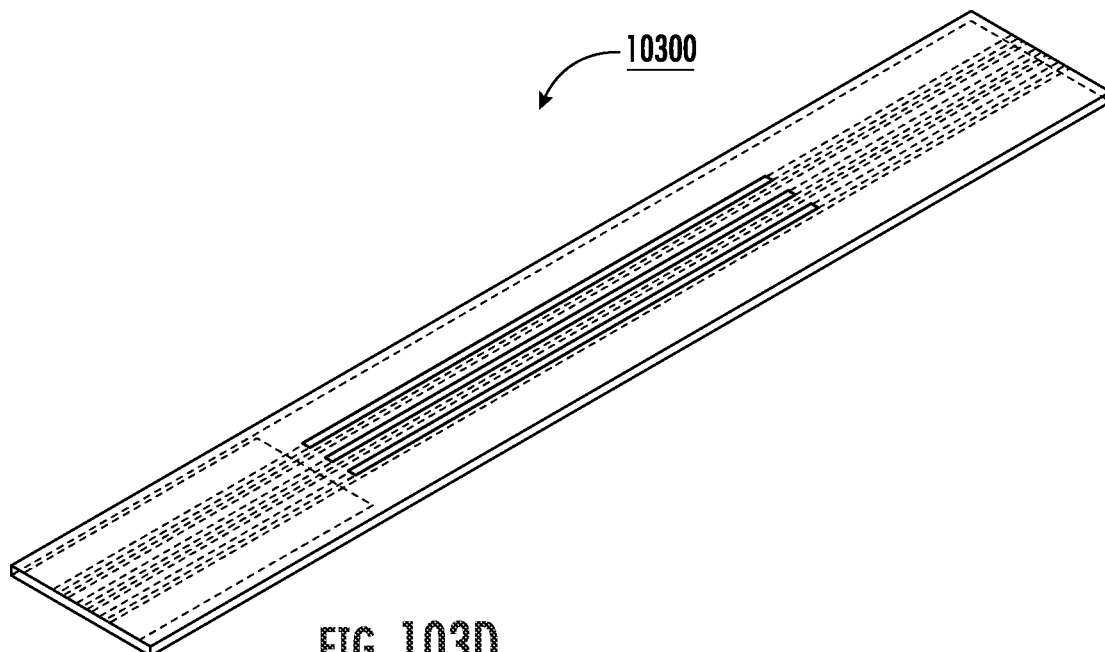

FIG. 103D provides a perspective view of the example waveguide 10300.

In many instances, difficulties due to on-chip beam-splitter fabrication can limit the applications of multichannel waveguide, and direct waveguide edge coupling suffers from problems such as low efficiency and high scattering.

Various embodiments of the present disclosure overcome these problems. For example, various embodiments of the present disclosure provide a micro-lensed fiber array edge-fire waveguide sensor that can achieve high efficiency direct edge coupling using fiber array with added matching micro-lens array. The direct array edge-fire enables multichannel waveguide sensor applications in multi-virus detection with multiple test specimens and references passing through different channels.

In some embodiments, a single mode laser diode is coupled to a 1 by 8 micro-lensed fiber array through a 1 by 8 fiber coupler. As such, a focused laser beam array is directly coupled into multiple channels of a waveguide at the input edge of the waveguide. In some embodiments, array beams pass through the waveguide with top sensing surface exposed to the sample specimens and references. The resulting fringe patterns are directly captured by an imaging component such as an image sensor without an imaging lens. In some embodiments, implementing direct edge coupling and edge imaging in a waveguide sensor require minimum components and provide easy implementation in low-cost volume production applications.

Referring now to FIG. 104A, FIG. 104B, and FIG. 104C, a sample testing device 10400 is provided. In particular, FIG. 104A illustrates an example perspective view of the sample testing device 10400, FIG. 104B illustrates an example top view of the sample testing device 10400, and FIG. 104C illustrates an example side view of the sample testing device 10400.

In some embodiments, the sample testing device 10400 is a micro-lensed fiber array edge-fire waveguide sensor that comprises a light source coupler 10402, a waveguide 10404, and an imaging component 10406.

In some embodiments, the light source coupler 10402 comprises an optical fiber array 10408 and an optical fiber holder 10410. In some embodiments, the optical fiber array 10408 is secured within the optical fiber holder 10410.

In some embodiments, the optical fiber array 10408 comprises eight optical fibers. In some embodiments, the optical fiber array 10408 may comprise less than or more than eight optical fibers. In some embodiments, an end of each optical fiber is connected to the same laser source (such as a laser diode), and the optical fibers are configured to convey laser light from the laser source.

In some embodiments, the waveguide 10404 comprises at least one optical channel 10412. In some embodiments, the at least one optical channel 10412 is aligned with the light source coupler 10402. For example, referring now to FIG. 104B, each of the optical fiber in the optical fiber array 10408 of the light source coupler 10402 is directly aligned to an input edge of one of the at least one optical channel 10412 of the waveguide 10404 through direct edge coupling. As such, laser light may travel onto the at least one optical channel 10412 of the waveguide 10404 as guided by the optical fibers in the optical fiber array 10408.

In some embodiments, the light source coupler 10402 comprises a micro lens array 10414 disposed on a first edge surface of the optical fiber holder 10410. In some embodiments, each optical fiber in the optical fiber array 10408 is aligned to one micro lens of the micro lens array 10414, and each micro lens of the micro lens array 10414 is aligned to one of the at least one optical channel 10412 of the waveguide 10404. As such, the laser light emitted by the laser source may travel through an optical fiber in the optical fiber array 10408 and a micro lens of the micro lens array 10414, and arrive at the at least one optical channel 10412 of the waveguide 10404.

Referring now to FIG. 104C, in some embodiments, the imaging component 10406 (such as an image sensor) directly captures multichannel fringe image from the at least one optical channel 10412 of the waveguide 10404 without using an imaging lens.

Figure 105B:
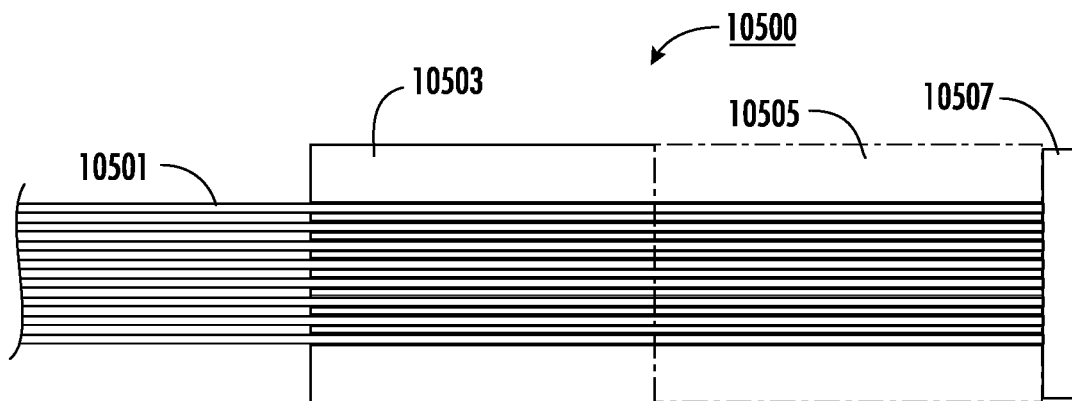
Figure 105C:
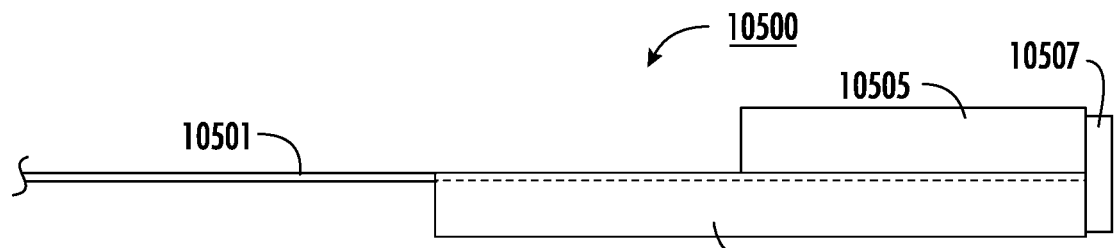
Figure 105D:
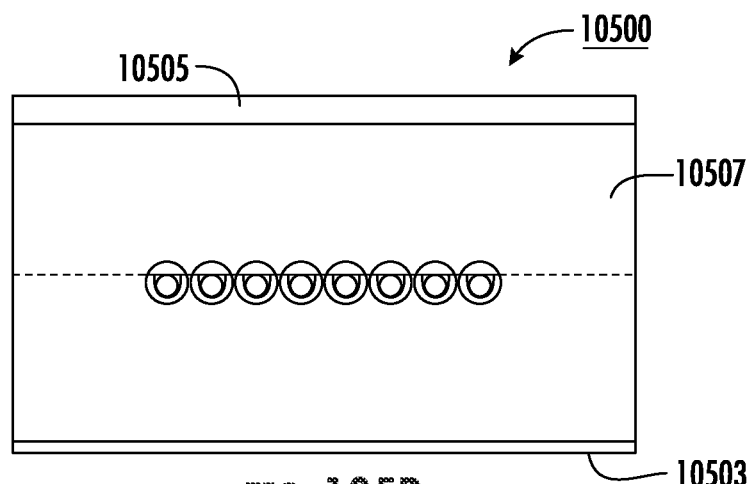

Referring now to FIG. 105A to FIG. 105D, an example light source coupler 10500 in accordance with various embodiments of the present disclosure is illustrated. In particular, FIG. 105A illustrates an example perspective view of the example light source coupler 10500. FIG. 105B illustrates an example top view of the example light source coupler 10500. FIG. 105C illustrates an example side view of the example light source coupler 10500. FIG. 105D illustrates an example end view of the example light source coupler 10500.

As shown in FIG. 105A, FIG. 105B, FIG. 105C, and FIG. 105D, in some embodiments, the optical fiber holder 10502 comprises a top holder component 10505 and a bottom holder component 10503. In some embodiments, the optical fiber array 10501 is secured between the top holder component 10505 and the bottom holder component 10503.

In some embodiments, the bottom holder component 10503 comprises a v-groove array.

In some embodiments, the optical fiber array 10501 is fastened to the v-groove array of the bottom holder component 10503, additional details of which are illustrated and described in connection with at least FIG. 106A and FIG. 106B. Additionally, or alternatively, the optical fiber array 10501 may be attached to the bottom holder component 10503 through chemical glue. For example, the optical fiber array 10501 may be attached to a surface of the bottom holder component 10503 that is not covered by the top holder component 10505 through chemical glue.

In some embodiments, an edge surface of the top holder component 10505 and an edge surface of the bottom holder component 10503 together form a first edge surface of the optical fiber holder 10502, and an end of each optical fiber in the optical fiber array 10501 is extended onto the first edge surface of the optical fiber holder 10502. In some embodiments, the micro lens array 10507 is disposed on the first edge surface of the optical fiber holder 10502, and the optical fibers in the optical fiber array 10501 are aligned to the micro lens in the micro lens array 10507. In some embodiments, the optical fiber array 10501 is configured to redirect light from a laser source into at least one optical channel of a waveguide through the micro lens array 10507.

Referring now to FIG. 106A and FIG. 106B, an example optical fiber holder 10600 of an example light source coupler in accordance with various embodiments of the present disclosure is illustrated. In particular, FIG. 106A illustrates an example first end view of the example optical fiber holder 10600, and FIG. 106B illustrates an example second end view of the example optical fiber holder 10600.

In FIG. 106A, the example optical fiber holder 10600 is viewed from the edge surface where the micro lens array 10602 is disposed on.

As described above, the micro lens array 10602 comprises at least one micro lens 10601. In some embodiments, a radius R1 of the at least one micro lens 10601 is 0.24 mm. In some embodiments, a distance D1 between the micro lenses in the micro lens array 10602 is 0.25 mm. In some embodiments, the radius R1 and/or the distance D1 may be of other values.

In FIG. 106B, the example optical fiber holder 10600 is viewed from the edge surface where optical fibers from an optical fiber array are received.

As described above, the optical fibers are secured between the top holder component 10604 and the bottom holder component 10606 of the example optical fiber holder 10600. In some embodiments, the bottom holder component 10606 comprises a v-groove array 10608, and the optical fiber array is placed on the v-groove array 10608.

In some embodiments, a distance D2 between two v-grooves of the v-groove array 10608 is 0.25 mm. In some embodiments, the distance D2 may be of other values.

As shown in FIG. 106B, in some embodiments, the v-groove array is aligned with the micro lens array 10602. For example, the distance between v-grooves in the v-groove array 10608 is the same as the distance between micro lenses in the micro lens array 10602. As such, when an optical fiber array is placed on the v-groove array 10608, the optical fiber array is aligned to the micro lens array 10602.

In some embodiments, the number of optical fibers in the optical fiber array, the number of v-grooves in the v-groove array, and the number of micro lenses in the micro lens array are the same.

Referring now to FIG. 107, an example waveplate 10700 of an optical fiber from an example optical fiber array conveying laser light in accordance with various embodiments of the present disclosure is illustrated. In particular, the optical fiber is orientated so that the connector key 10701 of the optical fiber is aligned to the slow axis of the waveplate 10700, and the fast axis of the waveplate 10700 is aligned to the plane of the v-groove array.

Referring now to FIG. 108, an example view of an example light source coupler 10800 in accordance with various embodiments of the present disclosure is illustrated.

In particular, FIG. 108 illustrates that a bottom holder component 10802 of the example light source coupler 10800 has a length L1. In some embodiments, the length L1 may be 10 mm. In some embodiments, the length L1 may be of other values. In some embodiments, the light source coupler 10800 may be fabricated with a zero-degree D0 polish so that the fast axis of the optical fiber is aligned to the plane of the v-groove array as described above in connection with at least FIG. 107.

Referring now to FIG. 109A to FIG. 109C, an example micro lens array 10900 in accordance with various embodiments of the present disclosure is illustrated. In particular, FIG. 109A illustrates an example perspective view of the example micro lens array 10900. FIG. 109B illustrates an example side view of the example micro lens array 10900. FIG. 109C illustrates an example front view of the example micro lens array 10900.

As shown in FIG. 109A, the example micro lens array 10900 may comprise at least one micro lens 10903. As shown in FIG. 109B, the at least one micro lens 10903 may have a depth D1 of 0.07 mm, and the micro lens array 10900 may have a depth D2 of 1 mm. In some embodiments, the depth D1 and/or the depth D2 may be of other values.

As shown in FIG. 109C, the example micro lens array 10900 may have a length L1 of 2.4 mm and a height H1 of 1.8 mm. In some embodiments, the length L1 and/or the height H1 may be of other values. The at least one micro lens 10903 may have a radius R1 of 0.24 mm, and a distance D3 between two micro lenses may be 0.25 mm. In some embodiments, R1 and/or D3 may be of other values.

There are many technical challenges and difficulties associated with sensing multiple species quantitatively at the same time. For example, many sample testing devices can only determine whether an unknown sample contains one particular type (and variant) of virus. If it is determined that the unknown sample does not contain this particular type (and variant) of virus, another test may be needed to determine whether the unknown sample contains another type (and variant) of virus. For example, a virus may have multiple variants, and it can be necessary to test an unknown sample against all the variants. As these sample testing devices can only test the sample against one variant of virus, they hinder the process of sample testing and cause delays in virus detection.

Various embodiments of the present disclosure overcome these technical challenges and difficulties, and satisfy these needs described above. For example, various embodiments of the present disclosure may combine multiple bioassays and a multi-way calibration using standard linear algebra methods (such as, but not limited to, principal component analysis (PCA)), and may enable a multi-plex test using the multiple optical channels within the waveguide for discrete bioassays. For example, various embodiments of the present disclosure may determine that an unknown sample is associated with a certain type of virus (for example, SARS-CoV2) but is associated with an unknown variant.

Referring now to FIG. 110, a computer-implemented method 11000 for calibrating a sample testing device is provided. In some embodiments, the sample testing device comprises a plurality of sample channels (for example, a plurality of sample channels from a waveguide in accordance with various examples described herein).

The example method 11000 starts at step/operation 11002 and proceeds to step/operation 11004. At step/operation 11004, the example method 11000 comprises causing a known sample associated with a sample type to be provided to the plurality of sample channels. In this example, the known sample is associated with a known type and variant of sample (for example, a known type and variant of a virus) and/or a known concentration level of the sample (for example, a known concentration level of a virus).

In some embodiments, each of the plurality of sample channels is coated with a plurality of antibodies for detecting a plurality of sample types. For example, referring now to FIG. 112A and FIG. 112B, example diagrams illustrating an example waveguide 11200 are provided.

Similar to the various examples provided above, the example waveguide 11200 comprises a plurality of sample channels, and each channel may be coated with a plurality of antibodies 11202. In some embodiments, a sample is provided through a sample channel (for example, the sample comprising virus 11206' as shown in FIG. 112A or virus 11206 as shown in FIG. 112B that flows through the sample channel in the direction as shown by the arrow 11204), similar to the various examples described above.

In some embodiments, when a known sample associated with a sample type is provided to the plurality of sample channels, the interference fringe patterns from the plurality of sample channels may change.

For example, if the sample contains a particular type and variant of virus, and the surface of the sample channel of a waveguide is coated with an antibody for that particular type and variant of virus, as the sample travels through the sample channel, the antibody binds strongly with the virus, keeping the virus at the surface. The increase in the number of virions at the surface (due to the chemical and/or biological reaction between the antibody and the virions) may cause a change in the evanescent field of the waveguide, which may in turn change the interference fringe pattern from the waveguide.

Referring now to FIG. 112B, when the sample comprising the virus 11206 is provided to the sample channel of the waveguide 11200 that is coated with the antibody 11202 for the virus 11206, the antibody 11202 attracts the virus 11206 to the surface of the sample channel, causing a change in the refractive index of the sample channel. When a laser source 11208 emits a laser light to the sample channel of the waveguide 11200, as shown, the interaction between the virus 11206 and the antibody 11202 causes a change in the interference fringe pattern from the waveguide 11200 as detected by the imaging component 11210.

Referring now to FIG. 113A, an example diagram illustrating example signal magnitudes of signals from a sample channel (labeled as "measure") and two control/reference channels (labeled as "negative control" and "positive control") are illustrated. As shown in FIG. 113A, the signal magnitude from the sample channel is not at the bottom end of the signal magnitude range (e.g. due to a change in the interference fringe pattern), which indicates that the sample is of the sample type and variant (for example, a type and variant of virus) for which the sample channel is configured to detect.

As further illustrated in FIG. 114A, example signal magnitudes from a sample channel for testing SARS-Cov2 (labeled as "SARS-Cov2 Test Channel") and two control/reference channels (labeled as "(−) Control Channel" for negative control and "(+) Control Channel" for positive control are illustrated. As shown in FIG. 114A, the signal magnitude from the SARS-Cov2 Test Channel is not at the bottom end of the signal magnitude range (for example, within a positive signal range of the corresponding test channel), which indicates that the sample comprises the SARS-Cov2 virus (or its variant) for which the SARS-Cov2 Test Channel is configured to detect.

In some examples, if the sample contains a particular type and variant of virus, and the surface of the sample channel of a waveguide is coated with an antibody for that peculiar type of type but not the particular variant of virus, there may still be some chemical and/or biological reactions that change the interference fringe pattern from the waveguide, although such a change may not be as significant as the change where the surface of the sample channel of a waveguide is coated with an antibody for that particular variant.

In some examples, if the sample contains a particular type and variant of virus, and the surface of the sample channel of a waveguide is coated with an antibody for a different type of virus, there may be no chemical and/or biological reactions that change the interference fringe pattern from the waveguide. For example, in the sample shown in FIG. 112A, the antibody 11202 coated on the sample channel of the waveguide 11200 is not for the type of virus 11206' that flows through the sample channel, and the change in the interference fringe pattern from the waveguide 11200 as detected by the imaging component 11210 is minimum or does not exist.

Referring now to FIG. 113B, an example diagram illustrating example signal magnitudes from a sample channel (labeled as "measure") and two control/reference channels (labeled as "negative control" and "positive control") are illustrated. As shown in FIG. 113B, the signal magnitude from the sample channel is at the bottom end of the signal magnitude range, which indicates that the sample is not of the sample type for which the sample channel is configured to detect.

As further illustrated in FIG. 114B, example signal magnitudes from a sample channel for testing SARS-Cov2 (labeled as "SARS-Cov2 Test Channel") and two control/reference channels (labeled as "(−) Control Channel" for negative control and "(+) Control Channel" for positive control) are illustrated. As shown in FIG. 114B, the signal magnitude from the SARS-Cov2 Test Channel is at the bottom end of the signal magnitude range (e.g. outside of the positive signal range associated with the corresponding test channel), which indicates that the sample does not comprise the SARS-Cov2 virus (or its variant) for which the SARS-Cov2 Test Channel is configured to detect.

In some embodiments, each of the plurality of sample channels is coated with a different antibody than that of another of the plurality of sample channels. For example, a first sample channel is coated with antibody A1 for detecting a particular variant of virus T1, a second sample channel is coated with antibody A2 for detecting a particular variant of virus T2, and a third sample channel is coated with antibody A3 for detecting a particular variant of virus T3. In some embodiments, virus T1, virus T2, and virus T3 are variants of the same type of virus T.

In some embodiments, only one of the plurality of sample channels is coated with an antibody for detecting the sample type and variant associated with the known sample. For example, if the known sample is associated with a particular type and variant of virus T1, then only one of the plurality of sample channels is coated with the antibody A1 for detecting a particular type and variant of virus T1.

Additionally, referring back to FIG. 110, the step/operation 11002 of the example method 11000 may comprise causing at least one control substance to be provided to at least one control channel (or reference channel) in some embodiments.

As described above, in some embodiments, the at least one control channel (or reference channel) may be coated with a known substance associated with a known and/or determinable refractive index for one or more wavelength(s) and/or operating temperatures. In some embodiments, the at least one control channel (or reference channel) may not be coated with any substance.

In some embodiments, each time a sample (whether a known sample or an unknown sample) is provided to a sample channel in a waveguide, at least one control substance is also provided to the control channel (or reference channel) of the waveguide. The at least one control substance may comprise a known substance, and changes in the refractive index caused by the known substance interacting with the known substance coated in the control/reference channel is known and/or determinable.

Referring back to FIG. 110, subsequent to step/operation 11004, the example method 11000 proceeds to step/operation 11006. At step/operation 11006, the example method 11000 comprises recording a plurality of calibration signals received from the plurality of sample channels and detected by an imaging component. For example, the signal magnitude associated with the plurality of calibration signals may be recorded.

As described above, as the known sample travels through the plurality of sample channels, the interference fringe patterns from the plurality of sample channels may change, which may be detected and recorded by an imaging component (such as an image sensor). The interference fringe patterns may serve as calibration signals that are associated with the presence of a particular type, variant, and concentration level of virus. For example, the signal magnitude of each calibration signal is recorded.

Continuing from the example above, the known sample contains a type of virus T1, and the waveguide comprises a first sample channel is coated with antibody A1 for detecting a particular variant of virus T1, a second sample channel is coated with antibody A2 for detecting a particular variant of virus T2, and a third sample channel is coated with antibody A3 for detecting a particular variant of virus T3. In this example, an imaging sensor records calibration signals (e.g., interference fringe patterns) from the first sample channel, the second sample channel, and the third sample channel. As the first sample channel is coated with the antibody for a particular variant of virus in the known sample, the changes in interference fringe patterns from the first sample channel may be more significant than changes in the interference fringe patterns from the second sample channel and the third sample channel.

Referring now to FIG. 116, FIG. 117, FIG. 118, FIG. 119, and FIG. 120, example diagrams illustrating example signal magnitudes of calibration signals from an example waveguide are provided.

In the example shown in FIG. 116, FIG. 117, FIG. 118, FIG. 119, and FIG. 120, the example waveguide channel may comprise two control/reference channels that include a (−) control channel and a (+) control channel. The example waveguide channel may also comprise four sample channels, including a SARS-CoV2 Variant 1 Test Channel, a SARS-CoV2 Variant 2 Test Channel, a SARS-CoV2 Variant 3 Test Channel, and a SARS-CoV2 Variant 4 Test Channel.

For example, the SARS-CoV2 Variant 1 Test Channel may be coated with antibodies for detecting SARS-CoV2 Variant type 1. The SARS-CoV2 Variant 2 Test Channel may be coated with antibodies for detecting SARS-CoV2 Variant type 2. The SARS-CoV2 Variant 3 Test Channel may be coated with antibodies for detecting SARS-CoV2 Variant type 3. The SARS-CoV2 Variant 4 Test Channel may be coated with antibodies for detecting SARS-CoV2 Variant type 4.

Referring now to FIG. 116 and FIG. 117, example diagrams illustrating example signal magnitudes of calibrating signals associated with known samples are provided. In particular, FIG. 116 and FIG. 117 illustrate different signal magnitudes due to samples that comprise SARS-CoV2 Variant type 1 but at different concentration levels.

In the example shown in FIG. 116, the sample comprises a first concentration level of SARS-CoV2 Variant type 1, causing the signal magnitude of the calibration signal from the SARS-CoV2 Variant 1 Test Channel to be at a middle portion within the magnitude range of calibration signals from the SARS-CoV2 Variant 1 Test Channel (e.g. within a positive signal range of that test channel). In the example shown in FIG. 117, the sample comprises a second concentration level of SARS-CoV2 Variant type 1, causing the signal magnitude of the calibration signal from the SARS-CoV2 Variant 1 Test Channel to be near a higher end of the magnitude range of calibration signals from the SARS-CoV2 Variant 1 Test Channel (e.g., within a positive signal range of that test channel). In some embodiments, the first concentration level is lower than the second concentration level. In addition, because the sample does not comprise SARS-CoV2 Variant type 2, SARS-CoV2 Variant type 3, and SARS-CoV2 Variant type 4, the signal magnitudes of calibration signals from the SARS-CoV2 Variant 2 Test Channel, the SARS-CoV2 Variant 3 Test Channel and the SARS-CoV2 Variant 4 are at or near the bottom end of their corresponding signal magnitude ranges.

Similarly, FIG. 118 illustrates signal magnitudes associated with a known sample that comprises SARS-CoV2 Variant type 2 at a particular concentration level. In the example shown in FIG. 118, the sample causes the signal magnitude of the calibration signal from the SARS-CoV2 Variant 2 Test Channel to be at a middle portion within the magnitude range of calibration signals from the SARS-CoV2 Variant 2 Test Channel (e.g., within a positive signal range of that test channel). Because the sample does not comprise SARS-CoV2 Variant type 1, SARS-CoV2 Variant type 3, and SARS-CoV2 Variant type 4, the signal magnitudes of calibration signals from the SARS-CoV2 Variant 1 Test Channel, the SARS-CoV2 Variant 3 Test Channel and the SARS-CoV2 Variant 4 Test Channel are at or near the bottom end of their corresponding signal ranges (e.g., outside a positive signal range of that test channel).

Similarly, FIG. 119 illustrates signal magnitudes associated with a known sample that comprises SARS-CoV2 Variant type 3 at a particular concentration level. In the example shown in FIG. 119, the sample causes the signal magnitude of the calibration signal from the SARS-CoV2 Variant 3 Test Channel to be at a middle portion within the magnitude range of calibration signals from the SARS-CoV2 Variant 3 Test Channel (e.g., within a positive signal range of that test channel). Because the sample does not comprise SARS-CoV2 Variant type 1, SARS-CoV2 Variant type 2, and SARS-CoV2 Variant type 4, the signal magnitudes of calibration signals from the SARS-CoV2 Variant 1 Test Channel, the SARS-CoV2 Variant 2 Test Channel and the SARS-CoV2 Variant 4 Test Channel are at or near the bottom end of their corresponding signal ranges (e.g., outside a positive signal range of that test channel).

Similarly, FIG. 120 illustrates signal magnitudes associated with a known sample that comprises SARS-CoV2 Variant type 4 at a particular concentration level. In the example shown in FIG. 120, the sample causes the signal magnitude of the calibration signal from the SARS-CoV2 Variant 4 Test Channel to be at a middle portion within the magnitude range of calibration signals from the SARS-CoV2 Variant 4 Test Channel (e.g., within a positive signal range of that test channel). Because the sample does not comprise SARS-CoV2 Variant type 1, SARS-CoV2 Variant type 2, and SARS-CoV2 Variant type 3, the signal magnitudes of calibration signals from the SARS-CoV2 Variant 1 Test Channel, the SARS-CoV2 Variant 2 Test Channel and the SARS-CoV2 Variant 3 Test Channel are at or near the bottom end of their corresponding signal ranges (e.g., outside a positive signal range of that test channel).

Additionally, in some embodiments, step/operation 11004 of the example method 11000 may comprise recording at least one control signal received from the at least one control channel. For example, at least one signal magnitude associated with the at least one control signal may be recorded after the at least one control substance is provided to the at least one control channel. Referring to the examples shown in FIG. 116 to FIG. 120, the signal magnitude of a control signal from the negative control channel ("(−) control channel") and the signal magnitude of a control signal from the positive control channel ("(+) control channel") are recorded.

Referring back to FIG. 110, subsequent to step/operation 11006, the example method 11000 proceeds to step/operation 11008. At step/operation 11008, the example method 11000 comprises determining whether the at least one control signal is within a control signal range. For example, the example method 11000 may determine whether a signal magnitude of the at least one control signal is within the control signal range of signal magnitude. In some embodiments, the control signal range may be determined based on the environment where the waveguide is placed (e.g. temperature of the environment).

Referring now to FIG. 115A to FIG. 115C, example diagram illustrating example signal magnitudes of signals from a sample channel (labeled as "SARS-CoV2 Test Channel") and two control/reference channels (labeled as "(−) Control Channel" and "(+) Control Channel") are illustrated.

In the example shown in FIG. 115A, the signal magnitude of the control signal from the "(−) Control Channel" is higher than the control signal range of signal magnitude range of "(−) Control Channel" and therefore is not within the signal magnitude range. The signal magnitude of the control signal from the "(+) Control Channel" is lower than the control signal range of "(+) Control Channel" and therefore is not within the signal magnitude range.

In the example shown in FIG. 115B, the signal magnitude of the control signal from the "(−) Control Channel" is within the signal magnitude range of "(−) Control Channel". The signal magnitude of the control signal from the "(+) Control Channel" is lower than the signal magnitude range of "(+) Control Channel" and therefore is not within the signal magnitude range.

In the example shown in FIG. 115C, the signal magnitude of the control signal from the "(−) Control Channel" is higher than the signal magnitude range of "(−) Control Channel" and is not within the signal magnitude range of "(−) Control Channel". The signal magnitude of the control signal from the "(+) Control Channel" within the signal magnitude range of "(+) Control Channel."

Referring back to FIG. 110, if, at step/operation 11008, the example method 11000 determines that the at least one control signal is not within the control signal range of signal magnitude, the example method 11000 proceeds to step/operation 11012. At step/operation 11012, the example method 11000 comprises generating an error message.

For example, if any one of the signal magnitudes of control signals is not within the corresponding control signal range of signal magnitude (for example, as shown in FIG. 115A to FIG. 115C), the example method 11000 may comprise generating an error message indicating that the calibration is invalid and may transmit the error message to a client device.

If, at step/operation 11008, the example method 11000 determines that the at least one control signal is within the control signal range of signal magnitude, the example method 11000 proceeds to step/operation 11010. At step/ operation 11010, the example method 11000 comprises generating a dataset indicating data connections between the sample type, variant, and/or concentration level, and the plurality of calibration signals.

In some embodiments, a processor may generate a dataset based on the calibration signals recorded at step/operation 11006 and may establish a data connection between the sample type, variant, and/or concentration level of the sample that is provided to the plurality of sample channels at step/operation 11004 and the calibration signals. For example, the processor may generate a dataset that correlates a signal magnitude of a calibration signal from one sample channel with (1) a sample type/variant and (2) a concentration level associated with the sample that is provided to that sample channel.

Continuing from the example above, the processor may generate a dataset that comprises signal magnitudes of calibration signals received from the first sample channel, the second sample channel, and the third sample channel, and indicates data connections between the virus type/variant A1 (and a concentration level of the virus type/variant A1) and these calibration signals.

Referring back to FIG. 110, subsequent to step/operation 11010, the example method 11000 proceeds to step/operation 11014 and ends.

In some embodiments, to calibrate the waveguide, the example method 11000 may be repeated by providing different known samples associated with different sample variants of the same type of virus to the plurality of sample channels.

Continuing from the example above, a known sample contains a variant of virus T2 may be provided to a first sample channel coated with antibody A1 for detecting a particular variant T1 of the virus, a second sample channel coated with antibody A2 for detecting a particular variant T2 of the virus, and a third sample channel coated with antibody A3 for detecting a particular variant T3 of the virus. A plurality of calibration signals received from the plurality of sample channels are recorded, and a dataset is generated indicating data connections between the sample variant T2 and these plurality of calibration signals. Additionally, a known sample contains a variant of virus T3 may be provided to a first sample channel coated with antibody A1 for detecting a particular variant T1 of a virus, a second sample channel coated with antibody A2 for detecting a particular variant T2 of the virus, and a third sample channel coated with antibody A3 for detecting a particular variant T3 of the virus. A plurality of calibration signals received from the plurality of sample channels are recorded, and a dataset is generated indicating data connections between the sample variant T3 and these plurality of calibration signals.

In some embodiments, the example method 11000 may be repeated. In each repetition, a known sample associated with a different sample type or variant is provided, and one of the sample channels is coated with antibodies for that sample type or variant. The repetition stops when all sample types and variants that the plurality of antibodies coated on the plurality of sample channels can detect have been provided to the plurality of sample channels. Through this repetition process, the processor may generate a complete library of datasets that indicate connections between different sets of calibration signals from different channels, different sample types/variants/concentration levels.

For example, referring now to FIG. 116, a processor may generate a dataset that correlates the signal magnitude of the calibration signal received from the SARS-CoV2 Variant 1 Test Channel, the signal magnitude of the calibration signal received from the SARS-CoV2 Variant 2 Test Channel, the signal magnitude of the calibration signal received from the SARS-CoV2 Variant 3 Test Channel, and the signal magnitude of the calibration signal received from the SARS-CoV2 Variant 4 Test Channel with a sample type of SARS-CoV2 Variant 1 and a concentration level based on the known sample that is provided to these channels. Referring now to FIG. 118, the processor may generate a dataset that correlates the signal magnitude of the calibration signal received from the SARS-CoV2 Variant 1 Test Channel, the signal magnitude of the calibration signal received from the SARS-CoV2 Variant 2 Test Channel, the signal magnitude of the calibration signal received from the SARS-CoV2 Variant 3 Test Channel, and the signal magnitude of the calibration signal received from the SARS-CoV2 Variant 4 Test Channel with a sample type of SARS-CoV2 Variant 2 and a concentration level based on the known sample that is provided to these channels. Referring now to FIG. 119, the processor may generate a dataset that correlates the signal magnitude of the calibration signal received from the SARS-CoV2 Variant 1 Test Channel, the signal magnitude of the calibration signal received from the SARS-CoV2 Variant 2 Test Channel, the signal magnitude of the calibration signal received from the SARS-CoV2 Variant 3 Test Channel, and the signal magnitude of the calibration signal received from the SARS-CoV2 Variant 4 Test Channel with a sample type of SARS-CoV2 Variant 3 and a concentration level based on the known sample that is provided to these channels. Referring now to FIG. 120, the processor may generate a dataset that correlates the signal magnitude of the calibration signal received from the SARS-CoV2 Variant 1 Test Channel, the signal magnitude of the calibration signal received from the SARS-CoV2 Variant 2 Test Channel, the signal magnitude of the calibration signal received from the SARS-CoV2 Variant 3 Test Channel, and the signal magnitude of the calibration signal received from the SARS-CoV2 Variant 4 Test Channel with a sample type of SARS-CoV2 Variant 4 and a concentration level based on the known sample that is provided to these channels.

Referring now to FIG. 111, a computer-implemented method 11100 for operating a sample testing device is provided. In some embodiments, the sample testing device comprises a plurality of sample channels (for example, a plurality of sample channels from a waveguide in accordance with various examples described herein). In some embodiments, the sample testing device comprises at least one control channel (or reference channel), similar to those described above.

The example method 11100 starts at step/operation 11101 and proceeds to step/operation 11103. At step/operation 11103, the example method 11100 comprises causing an unknown sample to be provided to the plurality of sample channels. In this example, the unknown sample is associated with an unknown type of sample and/or an unknown concentration level of the sample.

Similar to those described above, the plurality of sample channels is coated with a plurality of antibodies for detecting a plurality of sample types, variants, and/or concentration levels, similar to those described above in connection with at least step/operation 11004 of FIG. 110. For example, a first sample channel is coated with antibody A1 for detecting a particular type/variant T1 of a virus, a second sample channel is coated with antibody A2 for detecting a particular type/variant T2 of a virus, and a third sample channel is coated with antibody A3 for detecting a particular type/variant T3 of the virus. In some embodiments, virus T1, virus T2, and virus T3 are variants of the same virus T.

In some embodiments, each of the plurality of sample types is associated with a set of calibration signals from a plurality of calibration signals. For example, the set of calibration signals associated with each of the plurality of sample types may be recorded based at least in part on the example method 11000 described above in connection with FIG. 110.

Continuing from the above example, the virus type/variant T1 (and its concentration level) may be associated with a first set of calibration signals from the first sample channel, the second sample channel, and the third sample channel. The virus type/variant T2 (and its concentration level) may be associated with a second set of calibration signals from the first sample channel, the second sample channel, and the third sample channel. The virus type/variant T3 (and its concentration level) may be associated with a third set of calibration signals from the first sample channel, the second sample channel, and the third sample channel.

In some embodiments, when an unknown sample is provided to the plurality of sample channels, the interference fringe patterns from the plurality of sample channels may change, similar to those described above in connection with at least FIG. 110.

Additionally, in some embodiments, step/operation 11103 of the example method 11100 may comprise causing a control substance to be provided to at least one control channel, similar to those described above in connection with at least FIG. 110.

Referring back to FIG. 111, subsequent to step/operation 11103, the example method 11100 proceeds to step/operation 11105. At step/operation 11105, the example method 11100 comprises recording a plurality of sample signals received from the plurality of sample channels and detected by an imaging component. In some embodiments, the example method 11100 may comprise recording signal magnitudes of these sample signals, similar to those described above.

Additionally, in some embodiments, step/operation 11105 of the example method 11100 may comprise recording at least one control signal received from the at least one control channel, similar to those described above. In some embodiments, the example method 11100 may comprise recording signal magnitudes of these control signals, similar to those described above.

As described above, as the unknown sample travels through the plurality of sample channels, the sample signals (e.g., interference fringe patterns) from the plurality of sample channels may change, which may be detected and recorded by an imaging component (such as an image sensor).

Continuing from the example above, the unknown sample travels through a first sample channel coated with antibody A1 for detecting a particular type/variant of virus T1, a second sample channel coated with antibody A2 for detecting a particular type/variant of virus T2, and a third sample channel coated with antibody A3 for detecting a particular type/variant of virus T3. In this example, an imaging sensor records sample signals (e.g., interference fringe patterns) from the first sample channel, the second sample channel, and the third sample channel.

Referring back to FIG. 111, subsequent to step/operation 11105, the example method 11100 proceeds to step/operation 11107. At step/operation 11107, the example method 11100 comprises determining whether the at least one control signal is within a control signal range.

In some embodiments, the example method 11100 may determine whether the at least one control signal is within the control signal range similar to those described above in connection with at least step/operation 11008 of FIG. 110 above.

Referring back to FIG. 110, if, at step/operation 11107, the example method 11100 determines that the at least one control signal is not within the control signal range of signal magnitude, the example method 11100 proceeds to step/operation 11123. At step/operation 11123, the example method 11100 comprises generating an error message.

For example, the example method 11100 may comprise generating an error message indicating that the testing is invalid and may transmit the error message to a client device, similar to step/operation 11012 of FIG. 110 described above.

Referring back to FIG. 111, if, at step/operation 11107, the example method 11100 determines that the at least one control signal is within the control signal range of signal magnitude, the example method 11100 proceeds to step/operation 11109. At step/operation 11109, the example method 11100 comprises retrieving a plurality of datasets indicating a plurality of data connections between the plurality of sample types/variants/concentration levels and a plurality of calibration signals.

For example, the plurality of datasets may be retrieved from a library of datasets that indicate connections between different sets of calibration signals from different channels in the waveguide and different sample types/variants/concentration levels. In some embodiments, the library of datasets may be generated based at least in part on the example method 11000 described above in connection with at least FIG. 110.

Continuing from the example above, a processor may retrieve a plurality of datasets indicating data connections between virus type/variant/concentration level of virus T1 and the calibration signals from the first sample channel, the second sample channel, and the third sample channel, data connections between virus type/variant/concentration level of virus T2 and the calibration signals from the first sample channel, the second sample channel, and the third sample channel, and data connections between virus type/variant/concentration level of virus T3 and the calibration signals from the first sample channel, the second sample channel, and the third sample channel.

Referring back to FIG. 111, subsequent to step/operation 11109, the example method 11100 proceeds to step/operation 11111. At step/operation 11111, the example method 11100 comprises determining whether the sample signals recorded at step/operation 11105 corresponds to the calibration signals from the plurality of datasets retrieved at step/operation 11109.

In some embodiments, a processor may determine whether the plurality of sample signals recorded at step/operation 11105 matches the set of calibration signals associated with each sample type/variant from the plurality of datasets retrieved at step/operation 11109.

Referring back to FIG. 111, if the processor determines that the sample signals recorded at step/operation 11105 correspond to the calibration signals from the plurality of datasets retrieved at step/operation 11109, the example method 11100 proceeds to step/operation 11115. At step/operation 11115, the example method 11100 includes reporting a positive test of known/calibrated variant of the unknown sample that corresponds to the variant associated with the matching calibration signals.

Continuing from the example above, the processing element determines whether the plurality of sample signals (e.g., from the first sample channel, from the second sample channel, and from the third sample channel) matches the set of calibration signals (e.g. from the first sample channel, from the second sample channel, and from the third sample channel) associated the virus type A1. If so, the processor determines that the unknown virus is associated with the virus type A1. If not, the processor determines that the unknown virus is not associated with the virus type A1.

In other words, when an unknown sample is provided to these channels, the processor may compare the signal magnitudes from these channels, and may determine whether these signal magnitudes match those recorded in the datasets. For example, as described above in connection with FIG. 116 to FIG. 120, an example waveguide may comprise a SARS-CoV2 Variant 1 Test Channel, a SARS-CoV2 Variant 2 Test Channel, a SARS-CoV2 Variant 3 Test Channel, and a SARS-CoV2 Variant 4 Test Channel. The processor may generate and store datasets associating a sample type/variant (SARS-CoV2 Variant 1, SARS-CoV2 Variant 2, SARS-CoV2 Variant 3, or SARS-CoV2 Variant 4) and a concentration level with the signal magnitudes from these channels. In some embodiments, the processor may compare the plurality of sample signals with different sets of calibration signals when determining whether the sample signals match the calibration signals.

If there is a match, then the processor determines that the unknown sample is associated with the sample type and the concentration level that is recorded in the dataset. For example, if the signal magnitudes of sample signals from the SARS-CoV2 Variant 1 Test Channel, the SARS-CoV2 Variant 2 Test Channel, the SARS-CoV2 Variant 3 Test Channel, and the SARS-CoV2 Variant 4 Test Channel match those shown in FIG. 116, the processor determines that the unknown sample is associated with the SARS-CoV2 Variant 1 and a concentration level based on the known sample provided in association with FIG. 116.

As described above, the sample channels of a waveguide may be coated with different antibodies for different variants associated with the same type of virus, and a dataset associating signal magnitudes of calibration signals with each variant type/variant and concentration level may be generated, similar to those described above in connection with at least FIG. 110.

In some embodiments, in response to determining that the plurality of sample signals does not match any set of calibration signals at step/operation 11111, the example method 11100 proceeds to step/operation 11113. As step/operation 11113, the example method 11100 determines whether at least one signal magnitude of at least one of the sample signal received from a test channel and recorded at step/operation 11105 is within the signal positive range of that test channel.

As illustrated above, the signal magnitude from each test channel may indicate whether the sample is at least associated with or related to the variant corresponding to the test channel. For example, if the signal magnitude of a sample signal received from a test channel is at a bottom portion of the magnitude signal range (for example, a zero value), the sample is not associated with or related to the virus (and the variant) that the corresponding test channel is configured to detect. If the signal magnitude of a sample signal received from a test channel is at a middle or top portion of the magnitude signal range (for example, a positive value), the sample is at least marginally related to or associated with the virus (and the variant) that the corresponding test channel is configured to detect.

Referring back to FIG. 111, if the example method 11100 determines that at least one signal magnitude of a sample signal from a test channel is within a positive signal range of that channel, the example method 11100 proceeds to step/operation 11117. At step/operation 11117, the example method 11100 reports a positive test result of an unknown variant. For example, the example method 11100 reports that the unknown sample is associated with an unknown variant of the virus (for example, the unknown sample comprises an unknown variant of the virus).

In some embodiments, when an unknown sample is provided to the waveguide, an example method may comprise determining that at least one signal magnitude of a sample signal from at least one sample channel is not at a bottom portion of the sample range (for example, there is a change in the refractive index of that channel), which indicates the presence of at least a virus. However, the example method may also comprise determining that the set of signal magnitudes of sample signals do not match any of those associated with the datasets. For example, sample signals from at least one of the channels do not match calibration signals from the corresponding at least one channel as recorded in the datasets. In such an example, the example method may further comprise determining that the unknown sample is associated with the same type of virus as the type of virus for which the antibodies coated on the waveguide can detect, but is associated with a different, unknown variant of the virus than those variants for which the antibodies coated on the waveguide can detect.

Referring to FIG. 121, for example, an unknown sample is provided to the waveguide comprising the SARS-CoV2 Variant 1 Test Channel (coated with antibodies for Variant 1 of SARS-CoV2), the SARS-CoV2 Variant 2 Test Channel (coated with antibodies for Variant 2 of SARS-CoV2), the SARS-CoV2 Variant 3 Test Channel (coated with antibodies for Variant 3 of SARS-CoV2), and the SARS-CoV2 Variant 4 Test Channel (coated with antibodies for Variant 4 of SARS-CoV2). As shown in FIG. 121, the signal magnitudes of sample signals from the SARS-CoV2 Variant 1 Test Channel, the SARS-CoV2 Variant 3 Test Channel, and the SARS-CoV2 Variant 4 Test Channel are not at a bottom portion of their corresponding signal ranges, indicating the presence of SARS-CoV2 virus. However, the set of signal magnitudes of sample signals from those four channels do not entirely match signal magnitudes of calibration signals from those four channels shown in any of FIG. 116 to FIG. 119. As such, the example method determines that the sample comprises a SARS-CoV2 type virus, but is not Variant 1, Variant 2, Variant 3, or Variant 4.

Referring back to FIG. 111, if the example method 11100 determines that none of the signal magnitudes of sample signals from a test channel is within a positive signal range of these channels, the example method 11100 proceeds to step/operation 11119. At step/operation 11119, the example method 11100 reports a negative test result that the unknown sample is not associated with the virus (e.g., does not comprise the virus).

For example, if all sample signals received from test channels are zero (e.g. not within a positive signal range), the example method 11100 determines that the unknown sample does not comprise the virus.

Referring back to FIG. 111, subsequent to step/operation 11123, step/operation 11115, step/operation 11117, and/or step/operation 11119, the example method 11100 proceeds to step/operation 11121 and ends.

Many sample testing devices utilize antibody immobilization assay to detect target virus in pathogen detection. The limitation is that the detection can only detect one specific pathogen in one test, and there is a need to detect more than one pathogen in a single test. One typical example is the test for detecting different SARS-CoV2 variants.

In accordance with various embodiments of the present disclosure, instant multi-pathogen tests are provided. An instant multi-pathogen test uses a multi-channel virus sensor to detect many different types of pathogens in a single test with a single drop of sample. In some embodiments, the instant test eliminates the multiple tests with reduced test time and test samples. As such, various embodiments of the present disclosure provide a high efficiency, high specificity multi-pathogen test that can replace multiple, separate tests.

In some embodiments, for a waveguide comprising n sample channels (also referred to as test channels), the waveguide can be configured to detect a total of $(2^n-1)$ types of viruses. For example, an eight-channel waveguide sensor may comprise six (6) active test channels and two (2) reference channels. The number of virus types that the six active test channels can detect simultaneously can be calculated as:

$$2^6-1=63$$

In other words, the six active test channels can detect a total of 63 types of viruses, which can be enough to cover the most interested virus types in sample testing.

Referring now to FIG. 122, an example method 12200 for sample testing using a waveguide and a plurality of antibody collections for detecting a plurality of sample types is provided. In some embodiments, the waveguide comprises a plurality of sample channels.

The example method 12200 starts at step/operation 12202 and proceeds to step/operation 12204. At step/operation 12204, the example method 12200 comprises producing a plurality of antibody mixtures using the plurality of antibody collections.

In some embodiments, each of the plurality of antibody collections comprises antibodies for detecting a particular type/variant of virus. In some embodiments, each of the plurality of antibody mixtures comprises at least two different antibodies from the plurality of antibody collections.

In some embodiments, when producing the plurality of antibody mixtures, the method further comprises determining a total number of the plurality of sample channels of the waveguide, and selecting a total number of antibody collections from the plurality of antibody collections based at least in part on the total number of the plurality of sample channels.

In some embodiments, the total number of the plurality of antibody mixtures produced at step/operation 12204 is the same as the total number of the plurality of sample channels. In such embodiments, an unique antibody mixture is produced for each of the plurality of sample channels in a waveguide.

In some embodiments, when a total number of sample channels is n, a total number $m=2^n-1$ of antibody collections is needed to produce to the antibody mixtures. For example, if there are two sample channels, then three antibody collections are needed to produce antibody mixtures. If there are three sample channels, then seven antibody collections are needed to produce antibody mixtures. If there are four sample channels, then fifteen antibody collections are selected to produce antibody mixtures.

In some embodiments, to produce a total of n antibody mixtures to be coated on a total of n sample channels from a total of m different antibody collections, step/operation 12204 may comprise implementing a combination selection algorithm to add antibodies from different antibody collections to different combinations of antibody mixtures that are to be coated on different sample channels. For example, antibodies from each one of the m different antibody collections may be added to one of the n antibody mixtures, two of the n antibody mixtures, . . . , or n of the n antibody mixtures. In particular, antibodies from each antibody collection are added to a different combination of antibody mixtures as compared to a combination of antibody mixture(s) to which other antibodies from other antibody collections are added. In other words, antibodies from different antibody collections are added to different combinations of antibody mixtures, such that no two antibody collections are added to the same combination of antibody mixtures.

As an example, to produce a total of three (3) antibody mixtures for three (3) sample channels (for example, channel 1, channel 2, and channel 3), step/operation 12204 may determine that a total of $3^2-1=7$ antibody collections are needed (for example, antibody collections A, B, C, D, E, F, and G). In such an example, antibodies from antibody collection A may be added to the antibody mixture for channel 1 only, antibodies from antibody collection B may be added to the antibody mixture for channel 2 only, antibodies from antibody collection C may be added to the antibody mixture for channel 3 only, antibodies from antibody collection D may be added to the antibody mixtures for channel 1 and channel 2, antibodies from antibody collection E may be added to the antibody mixtures for channel 1 and channel 3, antibodies from antibody collection F may be added to the antibody mixtures for channel 2 and channel 3, and antibodies from antibody collection G may be added to the antibody mixtures for channel 1, channel 2, and channel 3.

In some embodiments, step/operation 12204 may comprise adding an antibody from an antibody collection to only one of the plurality of antibody mixtures. Additionally, or alternatively, step/operation 12204 may comprise adding an antibody from an antibody collection to all of the plurality of antibody mixtures. Additionally, or alternatively, step/operation 12204 may comprise adding an antibody from an antibody collection to all except one of the plurality of antibody mixtures.

For example, if a waveguide comprises two sample channels, the following two antibody mixtures may be produced:

| Antibody Mixture | Antibody Collection | | |
|---|---|---|---|
| | A | B | C |
| 1 | X | | X |
| 2 | | X | X |

In the above example, the first antibody mixture comprises antibodies from the antibody collection A and the antibody collection C, and the second antibody mixture comprises antibodies from the antibody collection B and the antibody collection C.

As another example, if a waveguide comprises three sample channels, the following three antibody mixtures may be produced:

| Antibody Mixture | Antibody Collection | | | | | | |
|---|---|---|---|---|---|---|---|
| | A | B | C | D | E | F | G |
| 1 | X | | X | | X | | X |
| 2 | | X | X | | | X | X |
| 3 | | | | X | X | X | X |

As another example, if a waveguide comprises four sample channels, the following four antibody mixtures may be produced:

| Antibody Mixture | Antibody Mixtures | | | | | | | | | | | | | | |
|---|---|---|---|---|---|---|---|---|---|---|---|---|---|---|---|
| | A | B | C | D | E | F | G | H | I | J | K | L | M | N | O |
| 1 | X | | | | X | X | X | | | | | X | X | X | X |
| 2 | | X | | | X | | | X | X | | X | | X | X | X |
| 3 | | | X | | | X | | X | | X | X | X | | X | X |
| 4 | | | | X | | | X | | X | X | X | X | | | X |

Referring back to FIG. 122, subsequent to step/operation 12204, the example method 12200 proceeds to step/operation 12206. At step/operation 12206, the example method 12200 comprises coating the plurality of sample channels with the plurality of antibody mixtures. In some embodiments, each of the plurality of sample channels is coated with a different antibody mixture.

As described above, each of the plurality of sample channels is coated with an unique antibody mixture, and no two sample channels are coated with the same antibody mixture.

Continuing from the 3-channel implementation example above, a total of ($2^3-1=7$) types of antibody mixtures are produced and arranged in binary sequence with each channel coated mixture of conjugating antibodies:

| Channel Number | Antibody Mixtures | | | | | | |
|---|---|---|---|---|---|---|---|
| | A | B | C | D | E | F | G |
| 1 | X | | X | | X | | X |
| 2 | | X | X | | | X | X |
| 3 | | | | X | X | X | X |

Referring back to FIG. 122, subsequent to step/operation 12206, the example method 12200 proceeds to step/operation 12208. At step/operation 12208, the example method 12200 comprises providing a sample to the plurality of sample channels to cause the plurality of sample channels to generate a plurality of test signals.

As described above, if the sample contains a virus, and the surface of the sample channel of a waveguide is coated with an antibody for that type/variant of virus, as the sample travels through the sample channel, the antibody attracts the virus towards the surface. The chemical and/or biological reaction between the antibody and the virus may cause a change in the evanescent field of the waveguide, which may in turn change the interference fringe pattern from the waveguide. In some examples, if the sample contains a virus, and the surface of the sample channel of a waveguide is coated with an antibody for that type but a different variant of virus, there may still be some chemical and/or biological reaction changing the interference fringe pattern from the waveguide, although such a change may not be as significant as the change where the surface of the sample channel of a waveguide is coated with an antibody for that virus. In some examples, if the sample contains a virus, and the surface of the sample channel of a waveguide is coated with an antibody for a different type of virus, there may not be chemical and/or biological reaction and no change of the interference fringe pattern from the waveguide.

In some embodiments, the plurality of test signals (e.g. interference fringe patterns) may be detected by an imaging component, similar to those described above.

Referring back to FIG. 122, subsequent to step/operation 12208, the example method 12200 proceeds to step/operation 12210. At step/operation 12210, the example method 12200 comprises determining a sample type/variant from the plurality of sample types/variants that corresponds to the sample based at least in part on the plurality of test signals.

In some embodiments, the test signal from a sample channel indicates either (1) one of the antibodies from the antibody mixture coated on the sample channel is targeted for the virus within the sample, or (2) none of the antibodies from the antibody mixture coated on the sample channel is targeted for the virus (if any) within the sample. In some embodiments, a processor may analyze the test signals from different sample channels to determine the sample type/variant of the sample, details of which are described in connection with at least FIG. 123.

Referring back to FIG. 122, subsequent to step/operation 12210, the example method 12200 proceeds to step/operation 12212 and ends.

Referring now to FIG. 123, a computer-implemented method 12300 for determining a sample type associated with a sample is provided.

The example method 12300 starts at step/operation 12301 and proceeds to step/operation 12303. At step/operation 12303, the example method 12300 comprises receiving a plurality of test signals from a plurality of sample channels associated with the sample.

In some embodiments, each of the plurality of sample channels is coated with an antibody mixture for detecting a plurality of sample types/variants, similar to those described above in connection with at least FIG. 122.

In some embodiments, each of the plurality of test signals is an interference fringe pattern from a sample channel of the waveguide that indicates whether there is a change in the evanescent field of the waveguide due to chemical and/or biological reaction between the antibody mixture and the sample, similar to those described above. In some embodiments, a processor may receive the plurality of test signals from an imaging component.

Referring back to FIG. 123, subsequent to step/operation 12305, the example method 12300 proceeds to step/operation 12305. At step/operation 12305, the example method 12300 comprises determining, for a sample channel of the plurality of sample channels, whether a test signal of the plurality of test signals from the sample channel indicates that the sample is associated with at least one of the plurality of sample types associated with the antibody mixture coated on the sample channel.

In some embodiments, a processor may compare the test signal with a threshold signal to determine whether the test signal indicates that the antibody mixture coated on the sample channel attracts the virus in the sample. If the test signal satisfies the threshold signal, the processor determines that the antibody mixture coated on the sample channel attracts the virus in the sample, and the sample is associated with at least one of the plurality of sample types/variants associated with the antibody mixture coated on the sample channel. If the test signal does not satisfy the threshold signal, the processor determines that the antibody mixture coated on the sample channel does not attract the virus (if any) in the sample, and the sample is not associated with any one of the plurality of sample types/variants associated with the antibody mixture coated on the sample channel.

Referring back to FIG. 123, if, at step/operation 12305, the example method 12300 determines that the test signal is associated with at least one of the plurality of sample types, the example method 12300 proceeds to step/operation 12307. At step/operation 12307, the example method 12300 comprises adding the plurality of sample types/variants as sample type/variant candidates for the sample type/variant associated with the sample in response to determining that the test signal indicates the sample is associated with at least one of the plurality of sample types.

Continuing from the 3-channel implement example above, the three channels may be coated with antibody mixtures in accordance with the table below:

| Channel Number | Antibody Mixtures | | | | | | |
|---|---|---|---|---|---|---|---|
| | A | B | C | D | E | F | G |
| 1 | X | | X | | X | | X |
| 2 | | X | X | | | X | X |
| 3 | | | | X | X | X | X |

For example, the sample signals from channel 2 may indicate that the sample is associated with the at least one of the plurality of sample types/variants associated with the antibodies coated on channel 2. In such an example, the processor may add sample types/variants B, C, F, and G to the pool of sample type/variant candidates associated with the sample. In other words, the processor determines that the sample type/variant is one of B, C, F, and G.

In some embodiments, the example method comprises determining an overlapping sample type/variant candidate based on different test signals. For example, if channel 1, channel 2, and channel 3 all indicate that the sample is associated with the at least one of the plurality of sample types associated with the antibodies coated on channel 1, channel 2, and channel 3, the processor add sample types/variants A, C, E, G to the pool of sample type/variant candidates based on the testing signal from channel 1, sample types/variants B, C, F, G to the pool of sample type/variant candidates based on the testing signal from channel 2, and sample types/variants D, E, F, G to the pool of sample type/variant candidates based on the testing signal from channel 3. The processor may determine that sample type G is the overlapping sample type among these sample type/variant candidates, and may determine the sample type/variant of the sample as sample type/variant G.

Referring back to FIG. 123, if, at step/operation 12305, the example method 12300 determines that the test signal is not associated with at least one of the plurality of sample types, the example method 12300 proceeds to step/operation 12309. At step/operation 12309, the example method 12300 comprises eliminating the plurality of sample types/variants as sample type/variant candidates for the sample type/variant associated with the sample in response to determining that the test signal does not indicate the sample is associated with at least one of the plurality of sample types/variants.

Continuing from the 3-channel implement example above, the sample signal from channel 2 may indicate that the sample is not associated with any one of the plurality of sample types/variants associated with the antibodies coated on channel 2. In such an example, the processor may eliminate sample types/variants B, C, F, and G from the pool of sample type/variant candidates associated with the sample. In other words, the processor determines that the sample type/variant is none of B, C, F, and G.

In some embodiments, the processor may analyze each test signal from each of the sample channels in accordance with example method 12300 to add and/or eliminate sample types/variants to and/or from the sample type/variant candidates until only one sample type remains.

Continuing from the 3-channel implement example above, upon testing, one drop of sample passes through all channels simultaneously. The 3-channel sensor output signals provide status of test specimen immobilized with various combinations of antibodies over the three channels. The test result is then derived by decoding for virus type A, B, C, D, E, F, G as summarized in the table below ("0" indicates that the sample is not associated with any one of the plurality of sample types associated with the antibodies coated on channel, and "1" indicates that the sample is associated with the at least one of the plurality of sample types associated with the antibodies coated on channel):

| Test Signal | | | |
|---|---|---|---|
| Channel 3 | Channel 2 | Channel 1 | Virus Type Detected |
| 0 | 0 | 0 | No Detection |
| 0 | 0 | 1 | A |
| 0 | 1 | 0 | B |
| 0 | 1 | 1 | C |
| 1 | 0 | 0 | D |
| 1 | 0 | 1 | E |
| 1 | 1 | 0 | F |
| 1 | 1 | 1 | G |

Alternatively, a 3-channel test can be arranged as three groups to test seven virus types. In such an example, each group utilizes two channels. In this implementation, each group has two side-by-side channels coated with the same mixture of antigens. The redundancy of two increases the test accuracy and confidence level. As an example, in the first group, two channel are coated with the antibodies from the same combinations of antibody collections (for example, antibodies from antibody collections A, C, E, and G). In the second group, two channel are coated with the antibodies from the same combinations of antibody collections (for example, antibodies from antibody collections B, C, F, G). In the third group, two channel are coated with the antibodies from the same combinations of antibody collections (for example, antibodies from antibody collections D, E, F, G). The side-to-side changes between the channels can provide indications of test accuracy/confidence level of the test results.

As illustrated in the example above, for virus detection of a higher number of types, few more channels are needed. For example, 12 active testing channels can detect up to ($2^{12}$–

1)=4095 types of virus in a single test with a single drop of the sample, sufficient to cover the SARS-CoV2 variants.

In some embodiments, different antibody mixing encoding and result decoding can be arranged to meet some special requirements and complications, such as when certain combinations of the antibody mixing might not be allowed.

In some embodiments, encoded mixing assay can also be applied to detection methods other than a multichannel waveguide sensor, such as lateral flow immunoassay, to achieve the goal of having a single test with a single drop of sample that test different types/variants.

In some embodiments, other special arrangements can be added into the list of mixtures to introduce specific feature signals for sensor calibration and error corrections, such as positive and negative control/references, as well as redundancy to increase the levels of accuracy and confidence.

Referring back to FIG. 123, subsequent to step/operation 12307 and/or step/operation 12309, the example method 12300 proceeds to step/operation 12311 and ends.

In various embodiments of the present disclosure, multichannel interferometer fringe patterns can be captured directly with a single area imaging sensor without an imaging lens. To prevent optical cross talks between channels, various embodiments of the present disclosure provide an imager baffle component.

In particular, there may be cross talks between and among channels of a multichannel interferometer. For example, optical signals (such as, but not limited to, interferometer fringe patterns) from one channel may overlap with optical signals (such as, but not limited to, interferometer fringe patterns) from another optical channel when the optical signals exit from the waveguide. In particular, the multichannel output from the waveguide is effectively light projection from a multi-slit grating or a diffraction grating, which can introduce unwanted interference patterns.

In some embodiments, to limit and/or avoid cross talks and unwanted interferences between channels of the waveguide, an imager baffle component (such as a multi-fin baffle and/or a baffle with multiple optical slots) can be added between the interferometer output edge of the waveguide and an imaging component.

In some embodiments, the imaging component may comprise a sensor cover glass and/or a protective window that may prevent and/or limit the imager baffle component from reducing unwanted cross talks between channels of the waveguide. In such embodiments, the imager baffle component may be in the form of an integrated baffle that is integrated with the imaging component and with direct mask pattern markings on both surfaces of the protective window. In the present disclosure, the term "imager baffle component" and the term "integrated baffle" are interchangeable.

Referring now to FIG. 124A, FIG. 124B, and FIG. 124C, a sample testing device 12400 is provided. In particular, FIG. 124A illustrates an example top view of the sample testing device 12400, FIG. 124B illustrates an example perspective view of the sample testing device 12400, and FIG. 124C illustrates an example zoomed view of at least a portion of the sample testing device 12400.

In the example shown in FIG. 124A and FIG. 124B, the sample testing device 12400 comprises a light source coupler 12403, a waveguide 12408, and an imaging component 12412, similar to the sample testing device 10400 illustrated and described above in connection with at least FIG. 104A and FIG. 104B.

For example, the light source coupler 12403 comprises an optical fiber holder 12404, and optical fiber array 12402 is secured within the optical fiber holder 12404. In some embodiments, an end of each optical fiber is connected to the same laser source (such as a laser diode), and the optical fibers are configured to convey laser light from the laser source), similar to the sample testing device 10400 illustrated and described above in connection with at least FIG. 104A and FIG. 104B.

Additionally, in the example shown in FIG. 124A, the light source coupler 12403 comprises a micro lens array 12406 disposed on a first edge surface of the optical fiber holder 12404. In some embodiments, each optical fiber in the optical fiber array 12402 is aligned to one micro lens of the micro lens array 12406, and each micro lens of the micro lens array 12406 is aligned to one of the at least one optical channel of the waveguide 12408 (such as, but not limited to, the optical channel 12410). As such, the laser light emitted by the laser source may travel through an optical fiber in the optical fiber array 12402 and a micro lens of the micro lens array 12406, and arrive at the at least one optical channel of the waveguide 12408.

In some embodiments, as the laser light travels through the at least one optical channel of the waveguide 12408, an interference fringe pattern may be the output from the at least one optical channel, and such interference fringe pattern may arrive at the imaging component 12412, as shown in the example illustrated in FIG. 124A and FIG. 124B.

Referring now to FIG. 124C, a zoomed view of a portion of the waveguide 12408 and a portion of the imaging component 12412 is illustrated.

In the example shown in FIG. 124C, the waveguide 12408 comprises a plurality of optical channels, including a first optical channel 12410A and a second optical channel 12410B. For example, the first optical channel 12410A may be adjacent to the second optical channel 12410B as shown in FIG. 124C. In some embodiments, as laser light travels through the first optical channel 12410A and the second optical channel 12410B, interference fringe patterns may be generated and exit from the first optical channel 12410A and from the second optical channel 12410B, separately. For example, as laser light travels through the first optical channel 12410A, the first interference fringe pattern 12416A may be the output from the first optical channel 12410A. Similarly, as the laser light travels through the second optical channel 12410B, the second interference fringe pattern 12416B may be the output from the second optical channel 12410B.

In some embodiments, the imaging component 12412 is positioned at the output end of the optical channels of the waveguide 12408. For example, the imaging component 12412 may comprise a sensing area 12414 that detects and/or receives interference fringe patterns, similar to those described above.

In the example shown in FIG. 124C, the interference fringe patterns received by the sensing area 12414 of the imaging component 12412 may comprise noise and/or cross talks between and/or among different optical channels of the waveguide 12408. For example, the first interference fringe pattern 12416A and the second interference fringe pattern 12416B may at least particularly overlap and/or interfere with one another prior to arriving at the sensing area 12414, causing cross talks between the first interference fringe pattern 12416A and the second interference fringe pattern 12416B. As shown in FIG. 124C, the sensing area 12414 may receive cross talks (e.g. optical signals where interference fringe patterns from different optical channels overlap with one another). As such, the accuracy of the testing results can be impacted.

As described above, various embodiments of the present disclosure overcome the above-referenced challenges. For example, various embodiments of the present disclosure may provide an imager baffle component that reduces and/or eliminates cross talks of interference fringe patterns between different channels.

Referring now to FIG. 125A and FIG. 125B, an imager baffle component 12500 is illustrated. In particular, FIG. 125A illustrates an example perspective view of the imager baffle component 12500, and FIG. 125B illustrates an example top view of the imager baffle component 12500.

In the example shown in FIG. 125A, the imager baffle component 12500 may be in a shape similar to a cuboid shape. As described further herein, the imager baffle component 12500 may be positioned between an output end of the waveguide and the sensing area of the imagining component. For example, the imager baffle component 12500 may be disposed on the sensing area of the imaging component, details of which are described herein.

While the description above describes an example of imager baffle component in a cuboid shape, it is noted that the scope of the present disclosure is not limited to the description above. In some examples, an example imager baffle component may comprise one or more additional and/or alternative elements. For example, the imager baffle component may be in a cube shape, a sphere shape, and/or the like.

In some embodiments, the imager baffle component 12500 may comprise one or more optical slots 12501. Referring now to FIG. 125B, each of the optical slots 12501 may be in the form of an opening that allows optical signals such as interference fringe patterns to travel through. For example, each of the optical slots 12501 may be in the shape of a rectangle. In some embodiments, one or more of the optical slots 12501 may be in shape(s) other than a rectangle shape.

In some embodiments, each of the optical slots 12501 is aligned with an output end of one of the optical channels from the waveguide. For example, as optical signals (such as interference fringe patterns) travel from an output end of an optical channel, the optical signals may travel through an optical slot of the imager baffle component. At least because optical signals (such as interference fringe patterns) from each optical channel travel through an individual, corresponding slot of the imager baffle component, the imager baffle component avoids optical signals from different optical channels overlapping or cross talking with one another, and therefore improves the accuracy of testing results.

In the example shown in FIG. 125A and FIG. 125B, the optical slots 12501 may be positioned on a center portion of the imager baffle component 12500. In some embodiments, the optical slots may be positioned in a different portion of the imager baffle component 12500.

Referring now to FIG. 126A, FIG. 126B, and FIG. 126C, an imager baffle component 12600 is illustrated. In particular, FIG. 126A illustrates an example top view of the imager baffle component 12600, FIG. 126B illustrates an example perspective view of the imager baffle component 12600, and FIG. 126C illustrates an example cross-sectional view of the imager baffle component 12600.

As shown in FIG. 126A, the imager baffle component 12600 may have a width W1 and a length L1. In some embodiments, the length L1 may be in the range between 9 millimeters and 13 millimeters. In some embodiments, the length L1 may be 11 millimeters. In some embodiments, the width W1 may be in the range between 4.6 millimeters and 8.6 millimeters. In some embodiments, the width W1 may be 6.6 millimeters. In some embodiments, the length of the optical slot 12602 may be between one fifth and one third of the length L1 of the imager baffle component 12600. For example, the length of the optical slots 12602 may be 4 millimeters.

While the description above provides some example sizes and/or size ranges of the imager baffle component 12600 and the optical slots 12602, it is noted that the scope of the present disclosure is not limited to the description above. In some examples, the sizes of the example imager baffle component 12600 and/or the sizes of the optical slots 12602 may be other value(s) and/or within other size range(s).

Referring now to FIG. 126C, an example cross-sectional view of the imager baffle component 12600 is shown. In particular, FIG. 126C illustrates an example cross-sectional view when the imager baffle component 12600 is cut through the A-A' line and viewed from the direction shown by the arrows.

In the example shown in FIG. 126C, the imager baffle component 12600 may comprise one or more elements, layers, and/or coatings.

For example, the imager baffle component 12600 may comprise a glass substrate 12604. In some embodiments, the glass substrate 12604 may have a first surface and a second surface that is opposite to the first surface. For example, the first surface may be a rectangular surface of a cuboid, and the second surface may be a rectangular surface that is on the opposite side of the cuboid.

In some embodiments, the imager baffle component comprises a first optical coating 12606A and a second optical coating 12606B. For example, the first optical coating 12606A is disposed on the first surface of the glass substrate 12604, the second optical coating 12606B is disposed on the second surface of the glass substrate 12604.

In some embodiments, at least one of the first optical coating 12606A and/or the second optical coating 12606B comprises one or more neutral density filters. In some embodiments, the neutral density filter may reduce or modify the intensity of light in all wavelengths and/or the color(s) of light equally, causing no changes in the hue of color rendition of the light. In some embodiments, the neutral density filter may prevent or reduce the amount of unnecessary optical signals (for example, interference fringe patterns) from entering the imaging component. In some embodiments, a neutral density filter can be implemented within either optical coating (e.g. the first optical coating 12606A and/or the second optical coating 12606B) and/or within the glass substrate 12604.

In some embodiments, at least one of the first optical coating 12606A and/or the second optical coating 12606B comprises one or more narrow bandpass filters and/or one or more anti-reflection (AR) filters. For example, the narrow bandpass filter may isolate a narrow region of the infra-red spectrum.

In some embodiments, the imager baffle component 12600 comprises a first mask pattern 12608A disposed on the first optical coating 12606A and/or a second mask pattern 12608B disposed on the second optical coating 12606B.

For example, in some embodiments, the first mask pattern 12608A is printed on the first optical coating 12606A. Additionally, or alternatively, the second mask pattern 12608B is printed on the second optical coating 12606B. As an example, after/on top of optical coatings, mask ruling patterns may be directly added on both surfaces of the glass substrate 12604 (for example, the first optical coating 12606A and/or the second optical coating 12606B) by utilizing silk screen printing.

Additionally, or alternatively, in some embodiments, the first mask pattern 12608A is etched on the first optical coating 12606A. Additionally, or alternatively, in some embodiments, the second mask pattern 12608B is etched on the second optical coating 12606B. For example, photo chemical etching can achieve fine mask pattern features (for example, for a multichannel waveguide that has optical channels with fine pitch control). In some embodiments, photo chemical etching can be applied before optical coating (for example, on the glass substrate) and/or after optical coating (for example, on the optical coating) to create the first mask pattern and/or the second mask pattern.

In some embodiments, the first mask pattern 12608A and the second mask pattern 12608B form the plurality of optical slots 12602 of the imager baffle component 12600. For example, through printing and/or etching as described above, the optical slots 12602 may be formed that allow optical signals (such as interference fringe patterns) to individually travel through a corresponding optical slot without overlapping with one another, similar to those described above.

As shown in FIG. 126C, the imager baffle component 12600 may have a thickness T1 between 0.5 millimeters and 1.5 millimeters. In some embodiments, the imager baffle component 12600 may have a thickness T1 of 1 millimeters. In some embodiments, the imager baffle component 12600 may have a thickness T1 within other size ranges and/or other sizes.

Referring now to FIG. 127, a sample testing device 12700 is provided. As shown in the example of FIG. 127, the sample testing device 12700 comprises a waveguide 12707 and an imager baffle component 12711.

In the example shown in FIG. 127, the sample testing device 12700 comprises a light source coupler 12703, similar to the sample testing device 12400 illustrated and described above in connection with at least FIG. 124A. For example, the light source coupler 12703 comprises an optical fiber holder 12704, and optical fiber array 12701 is secured within the optical fiber holder 12704. In some embodiments, an end of each optical fiber is connected to the same laser source (such as a laser diode), and the optical fibers are configured to convey laser light from the laser source), similar to the sample testing device 12400 illustrated and described above in connection with at least FIG. 124A.

Additionally, in the example shown in FIG. 127, the light source coupler 12703 comprises a micro lens array 12705 disposed on a first edge surface of the optical fiber holder 12704. In some embodiments, each optical fiber in the optical fiber array 12701 is aligned to one micro lens of the micro lens array 12705, and each micro lens of the micro lens array 12705 is aligned to one of the at least one optical channel of the waveguide 12707 (such as, but not limited to, the optical channel 12709). As such, the laser light emitted by the laser source may travel through an optical fiber in the optical fiber array 12701 and a micro lens of the micro lens array 12705 and arrive at the at least one optical channel of the waveguide 12707.

In some embodiments, as the laser light travels through the at least one optical channel of the waveguide 12707, an interference fringe pattern may be exit from the at least one optical channel. For example, in some embodiments, the waveguide 12707 comprises a plurality of optical channels, such as the optical channel 12709. In this example, an interference fringe pattern may be the output from the optical channel 12709.

In some embodiments, the imager baffle component 12711 is disposed on an imaging component 12713. For example, the imager baffle component 12711 may be attached to the imaging component 12713 and/or replace the protective window of the imager baffle component 12711.

In some embodiments, the imager baffle component 12711 comprises a plurality of optical slots, such as, but not limited to, the optical slot 12717 as shown in FIG. 127. In some embodiments, each of the plurality of optical slots of the imager baffle component 12711 is aligned with one of the plurality of optical channels of the waveguide 12707. In the example shown in FIG. 127, the channel output end 12715 of the optical channel 12709 of the waveguide 12707 is aligned with the optical slot 12717 of the imager baffle component 12711. In such an example, as laser light travels through the optical fiber array 12701 and through the optical channel 12709, an interference fringe pattern may be generated and travel through the channel output end 12715 of the optical channel 12709. The interference fringe pattern may travel through the optical slot 12717 of the imager baffle component 12711 and arrive at the imaging component 12713. As each interference fringe pattern travels through an individual optical slot that is different from the ones through which other interference fringe patterns from other optical channels travel, overlapping of interference fringe patterns and cross talks of optical signals from different optical channels can be reduced and/or eliminated.

As described above, the imager baffle component 12711 may be in the form of a single element integrated imager baffle that can replace the protective window and/or the optical filter of the imaging component 12713 and can serve as an imager baffle, therefore improving the accuracy of testing results and reducing the size of the sample testing device 12700.

There are many technical challenges in manufacturing and using a sample testing device. For example, in order to generate accurate test results, the operations of an example sample testing device require a smooth flow of fluid (e.g., at a constant or target velocity) through the one or more fluid channels of the sample testing device.

By way of example, as described above, FIG. 97A depicts an example sample testing device 9700 comprising a waveguide 9701 and a multiport valve 9709. In the example shown in FIG. 97A, the waveguide 9701 comprises at least a buffer channel 9703, a reference channel 9705, and a sample channel 9707. As noted above, during operations, a pump/actuator is operatively connected to the buffer reservoir 9717 to push (e.g., transport) the buffer solution from the buffer reservoir 9717 to the buffer channel 9703, the reference channel 9705, and the sample channel 9707. The buffer solution travels through these channels and is discharged into the waste collector 9753.

Accordingly, it should be understood that an example sample testing device may comprise one or more fluid channels that are each configured to transport fluid therethrough and into a waste collector. Each of the plurality of fluid channels may be operatively coupled to a pump or piston style actuator that operates to facilitate fluid flow at a near-constant velocity through the example sample testing device in order to ensure that measurements generated by the example testing device are accurate.

In various embodiments, the sample testing device needs to be configured to withstand variations in friction or force, including back pressure generated by the sample testing device during operations. Additionally, in some examples, one or more of the fluid channels may become plugged or obstructed (e.g., due to a remaining patient specimen, contaminant or microscopic particle(s) being trapped in the example fluid channel during operations). In such examples, if obstruction of the one or more fluid channels remains undetected, the example sample testing device may generate inaccurate test results (e.g., false negative or false positive results) during use.

Systems and methods for determining a fault condition with respect to at least one fluid channel of a sample testing device in accordance with various embodiments of the present disclosure are provided. In some examples, a method may comprise monitoring a current measurement signal of a sample testing device pump or actuator that is operatively coupled to the at least one fluid channel. In some examples, the method may comprise responsive to detecting an above-threshold current value or a current measurement signal that is above or below a target current range, providing an indication of the fault condition. In some examples, the above-threshold current value is 120 mA. In some examples, a nominal current measurement signal is between 60-80 mA. In some examples, the sample testing device pump or actuator comprises a motion controller and a voice coil actuator. In some examples, monitoring the current output comprises obtaining current measurements from within the motion controller of the sample testing device via an ammeter. In some examples, the target current range is determined based at least in part on a machine learning technique. In some examples, the machine learning technique is utilized to identify temporary increases in force or pressure from true obstructions based at least in part on time-weighted analysis. In some examples, providing the indication of the fault condition comprises generating an alert for presentation via a user interface of a user computing entity that is in electronic communication with the sample testing device.

In some embodiments, in order to maintain proper flow of fluid through the example sample testing device, based at least in part on one or more detected parameters (e.g., a detected load, pressure or force), a motion controller that is operatively coupled to a pump/actuator may cause an increase or decrease to a current output of the pump/actuator in order to drive the pump/actuator to inject fluid (e.g., a test liquid) into one or more flow channels of an example sample testing device at a target velocity. By way of example, the example motion controller may provide a control indication to cause the example pump/actuator to supply a larger amount of current in response to detecting a large amount of force or back pressure (e.g., over 1 pound) associated with the sample testing device. Similarly, the example motion controller may provide a control indication to cause an example pump/actuator to supply a smaller amount of current in response to detecting a small amount of force or back pressure (e.g., between 0.3 and 0.4 pounds) associated with the sample testing device.

Referring now to FIG. 128, an example system 12800 in accordance with various embodiments of the present disclosure is provided. As depicted in FIG. 128, the example system 12800 comprises a controller component 12801, one or more sensing elements 12802, a pump/actuator 12803 and a current monitoring circuit 12805. The example system 12800 may be or comprise at least a portion of a sample testing device.

As depicted in FIG. 128, the example system 12800 comprises a controller component 12801 (e.g., motion controller). In various examples, as depicted, the example controller component 12801 is operatively coupled to and in electronic communication with the one or more sensing element(s) 12802 and the pump/actuator 12803 such that they can exchange data/information with one another. In some embodiments, based at least in part on the one or more detected parameters, the controller component 12801 may operate (e.g., provide control indications) to control one or more operations of the pump/actuator 12803. For example, the controller component 12801 may provide control indications in order to regulate a current output of the pump/actuator 12803. As such, the controller component 12801 may determine an amount of force or pressure associated with the sample testing device and provide a control indication to cause the pump/actuator 12803 to generate a particular current output in order to inject fluid into one or more flow channels of an example sample testing device at a target velocity.

As depicted in FIG. 128, the system 12800 comprises one or more sensing elements 12802. In various embodiments, the one or more sensing elements 12802 may be or comprise pressure sensors, load sensors, force sensors and/or the like that are configured to determine one or more parameters (e.g., a detected load, pressure or force) with respect to the sample testing device. Thus, the one or more sensing elements 12802 may provide additional information/data regarding the current state of the system/sample testing device in order to for use in controlling operations of the controller component 12801 (e.g., motion controller and/or pump or actuator).

As further depicted in FIG. 128, the example system comprises a current monitoring circuit 12805. In various examples, the current monitoring circuit 12805 is operatively coupled to the controller component 12801 and/or pump/actuator 12803 and is configured to monitor a current output of the pump/actuator 12803. In some examples, the current monitoring circuit 12805 may be configured to obtain current measurements with respect to an example controller component (e.g., motion controller) via an ammeter, as discussed below.

Referring now to FIG. 129, another example system 12900 in accordance with various embodiments of the present disclosure is provided. The example system 12900 may be similar or identical to the system 12800 discussed above in connection with FIG. 128. In various embodiments, as depicted, the example system 12900 comprises at least a motion controller 12902 and a voice coil actuator 12904. In various embodiments, the example motion controller 12902 and voice coil actuator 12904 are operatively coupled to and in electronic communication with one another such that they can exchange data/information with one another. In various examples, the motion controller 12902 is configured to control one or more operations of a sample testing device (e.g., a pump or voice coil actuator 12904 of the example sample testing device).

As depicted in FIG. 129, the example system 12900 comprises a motion controller 12902. The motion controller 12902 may operate to control one or more operations of a sample testing device, and in particular, the voice coil actuator 12904 of the sample testing device. As depicted in FIG. 129, the motion controller 12902 comprises one or more circuitries (e.g., processing elements, logic and/or the like). The motion controller 12902 may determine an amount of force or pressure associated with one or more flow channels of the example sample testing device and provide a control indication to cause the voice coil actuator 12904 to generate a particular current output in order to inject fluid into the one or more flow channels of the example sample testing device at a target velocity. As illustrated, the motion controller 12902 comprises target position and/velocity determination circuitry 12902A, position control circuitry 12902B, velocity control circuitry 12902C and current control circuitry 12902D. Additionally, as depicted, the motion controller 12902 comprises stall/obstruction logic/circuitry 12902E that is configured to obtain current measurements from within the motion controller 12902 of the sample testing device (e.g., via an ammeter).

As noted above, and as depicted in FIG. 12900, the example system 12900 comprises a voice coil actuator 12904 that is operatively coupled to the motion controller 12902. In various embodiments, the voice coil actuator 12904 comprises one or more circuitries (e.g., processing elements, logic and/or the like). As illustrated, the voice coil actuator 12904 comprises linear motor output circuitry 12904A and an encoder 12904B. In various examples, the voice coil actuator 12904 is configured to generate a force in order to push buffer solution through one or more channels of a sample testing device. The amount of force generated may be proportional to an amount of current provided by the motion controller 12902 (e.g., via the current control circuitry 12902D). Accordingly the voice coil actuator 12904, may operate to push (e.g., transport) buffer solution through one or more channels of a sample testing device at a target velocity based at least in part on one or more control indications provided by the motion controller 12902. Additionally, as depicted, the voice coil actuator 12904 may provide feedback (e.g., via the linear motor output circuitry 12904A and the encoder 12904B) to motion controller 12902 based upon which the motion controller 12902 may modify various operational parameters (e.g., position and/or velocity control via the position control circuitry 12902B and the velocity control circuitry 12902C).

Referring now to FIG. 130, an example flowchart 13000 illustrating example operations in accordance with various examples of the present disclosure is provided. It should be appreciated that the various operations form a process that may be executed via one or more computing devices and/or modules embodied in hardware, software, and/or firmware (e.g., a computer-implemented method). In some embodiments, the process 13000 is performed by one or more apparatus(es), for example, a sample testing device as described herein. In this regard, the apparatus may include or otherwise be configured with one or more memory devices having computer-coded instructions stored thereon, and/or one or more processor(s) (e.g., processing modules) configured to execute the computer-coded instructions and perform the operations depicted. Additionally or alternatively, in some embodiments, computer program code for executing the operations depicted and described with respect to process 13000 may be stored on one or more non-transitory computer-readable storage mediums of a computer program product, for example for execution via one or more processors associated with, or otherwise in execution with, the non-transitory computer-readable storage medium of the computer program product.

The process 13000 begins at block 13002. At block 13002, the process 13000 comprises monitoring, via a current monitoring circuit (such as, but not limited to, the current monitoring circuit 12805 discussed above in connection with FIG. 128 or stall/obstruction logic/circuitry 12902E discussed above in connection with FIG. 129), a current output of a sample testing device pump/actuator.

At block 13004, the process comprises determining whether the detected current is within a target current range. In some embodiments, the target current range may be or comprise an operational current range associated with a sample testing device pump/actuator (e.g., nominal range of 60-80 mA, with a current measurement threshold/detection limit of 120 mA, indicating abnormally high pressure). In some embodiments, machine learning techniques may be utilized to determine target parameters (e.g., a nominal current range, as well as upper and lower control limits) associated with the sample testing device pump/actuator in order to improve accuracy of fault detection operations. In some embodiments, machine learning techniques may be utilized to identify temporary increases in force such as friction, from true obstructions using time-weighted analysis.

In some embodiments, in an instance in which the detected current is with a target current range, the process 13000 returns to block 13002 where the current output of the sample testing device pump/actuator continues to be monitored.

In some embodiments, in an instance in which the detected current in not within the target current range, the process 13000 continues to block 13006.

At block 13006, the process 13000 comprises providing an indication of a fault condition. In some examples, providing an indication of a fault comprises generating an alert for presentation via a user interface of a user computing entity that is in electronic communication with the sample testing device.

Referring now to FIG. 131, a graph 13100 depicting example measurements of an example apparatus (e.g., a pump or voice coil actuator, such voice coil actuator 12904 that is operatively coupled to motion controller 12902), in accordance with various embodiments of the present disclosure is provided.

As depicted in FIG. 131, the x-axis represents a plurality of instances in time. As depicted, the y-axis represents a detected current measurement signal (e.g., current draw) associated with the example apparatus (e.g., pump or voice coil actuator).

As depicted in FIG. 131, the current measurement signal is within a nominal current range (e.g., approximately 60 mA) between 0 seconds and 200 seconds. In various examples, the nominal current range may be between 60-80 mA. Additionally, the example apparatus may be associated with a target current measurement range or current measurement threshold. For example, as depicted, the example apparatus is associated with a current measurement threshold 13102 of 120 mA. As further illustrated, around 200 seconds, a spike (indicative of a fault or abnormal condition) occurs. Thereafter, between 200 seconds and 600 seconds, the current measurement signal depicted by the line 13101 is above the current measurement threshold 13102 (i.e., 120 mA). In various examples, the spike and/or above-threshold current measurement signal/value may be indicative of abnormally high pressure conditions, a fault or obstruction, and/or the like of one or more flow channel of an example sample testing device. Responsive to detecting the above-threshold current measurement signal/value, the example sample testing device may provide an indication of a fault (e.g., via a user interface of a user computing entity that is in electronic communication with the sample testing device).

Accordingly, FIG. 131 demonstrates that a detected current measurement signal associated with an example apparatus (e.g., pump or voice coil actuator) may be monitored in order to identify operational faults (e.g., due to obstruction in one or more flow channels of a sample testing device).

A substance/liquid delivery system is a type of system that is configured to deliver substance and/or liquid from one location to another location. As an example, a substance/liquid delivery system may be in the form of one or more sample channels in a waveguide (as described above) that can deliver buffer solutions and/or sample solutions. As another example, a substance/liquid delivery system may be in the form of, such as but not limited to, a pipe, a conduit, a tube, and/or the like that is configured to deliver substance and/or liquid from one location to another location.

There are many technical challenges and difficulties associated with substance/liquid delivery systems. For example, many substance/liquid delivery systems are required to deliver different types of substance/liquid at different time points and/or according to a delivery sequence. As an example, a substance/liquid delivery system may receive a first type of substance/liquid at the beginning of the delivery sequence. Once the first type of liquid has completely traveled through the delivery system, the substance/liquid delivery system may receive and deliver a second type of substance/liquid.

However, it can be difficult to predict accurately if a substance/liquid has completely traveled through a substance/liquid delivery system. For example, referring now to FIG. 132, an example method 13200 associated with a waveguide is illustrated. In particular, FIG. 132 illustrates an example delivery sequence associated with the sample channel (i.e. a substance/liquid delivery system) of a waveguide.

The example method 13200 shown in FIG. 132 starts at step/operation 13202. Subsequent to and/or in response to step/operation 13202, the example method 13200 proceeds to step/operation 13204. At step/operation 13204, the example method 13200 causes a first injection of a buffer solution to a sample channel of a waveguide.

As described above, a surface of the sample channel of the waveguide may be coated with antibodies for a virus. For example, the waveguide may be part of a sample testing device configured to detect and/or determine the presence of the virus in the sample solution (for example, a liquid solution that captures aerosols from the breath of a user) in accordance with various embodiments of the present disclosure. In circumstances where molecules of the virus are present in the sample solution, the antibodies coated on the surface of the sample channel may pull the molecules towards the surface of the sample channel.

In some embodiments, one or more preservative chemicals (such as, but not limited to, sugar) may be coated on the surface of the sample channel to preserve the antibodies on the surface of the sample channel prior to the waveguide being used by a user. For example, there is a time gap between the time when the sample testing device (and the waveguide) is manufactured and the time when the sample testing device is used by a user. Without the one or more preservative chemicals, antibodies coated on the surface of the sample channel may become inactive during this time gap as they are exposed to air. The one or more preservative chemicals may cover the antibodies on the surface of the sample channel, preserving these antibodies and prolonging the shelf life of the sample testing device.

In some embodiments, when a user starts using the sample testing device, the user may inject or cause an injection of a buffer solution to the sample channel. Examples of a buffer solution include, but not limited to, water. As the buffer solution travels along the sample channel, the buffer solution may purge, remove and/or wash off the one or more preservative chemicals from the surface of the sample channel (and from the antibodies), without removing the antibodies from the surface of the sample channel.

In some embodiments, the sample channel of the waveguide may be connected to a pump that is configured to inject buffer solutions to the sample channel in accordance with various embodiments described herein. In such embodiments, the pump may be in electronic communication with a processor and/or controller (as described above), such that the processor and/or controller can transmit instructions to the pump and cause the first injection of the buffer solution to the sample channel of the waveguide.

Referring back to FIG. 132, subsequent to and/or in response to step/operation 13204, the example method 13200 proceeds to step/operation 13206. At step/operation 13206, the example method 13200 causes a second injection of a sample solution to the sample channel of the waveguide.

In some embodiments, after a sufficient amount of the buffer solution are injected into the sample channel of the waveguide, all preservative chemicals are purged, removed and/or washed off from the surface of the sample channel, exposing the antibodies. In some embodiments, the example method 13200 causes the second injection of the sample solution after the buffer solution injected at step/operation 13204 has completely traveled through the sample channel.

In some embodiments, the user may inject a sample solution to the sample channel, and the sample testing device can start detecting whether the sample solution comprises a virus that the antibodies are targeted for. In some embodiments, the processor and/or controller may cause the second injection of the sample solution to the sample channel by a pump in accordance with various embodiments described herein.

Referring back to FIG. 132, subsequent to and/or in response to step/operation 13206, the example method 13200 proceeds to step/operation 13208 and ends.

As illustrated in the example above, it is important to determine when the one or more preservative chemicals have been completely washed off or purged from the surface of the sample channel and/or when the buffer solution has completely traveled through the sample channel, so that the sample solution can be injected into the sample channel. If the sample solution is injected into the sample channel prior to the one or more preservative chemicals have been completely washed off or purged from the surface and/or prior to the buffer solution has completely traveled through the sample channel, the one or more preservative chemicals and/or the buffer solution may cause inaccuracies in results generated by the sample testing device (for example, the one or more preservative chemicals may prevent the virus from being bounded to antibodies on the surface of the sample channel).

In addition, if certain concentrations of substance/liquid (for example, but not limited to, a certain concentration of buffer solution in the sample channel) must be achieved before a subsequent operation (for example, but not limited to, injecting the sample solution to the sample channel) can begin, a direct measurement of the substance/liquid in question (for example, a measurement of the current concentration level of the substance/liquid) is desired.

As noted above, many systems and methods do not accurately predict if a substance/liquid has completely traveled through a substance/liquid delivery system. Hence, a more appropriate solution is required to identify with confidence that a fluid transition has been completed.

Various embodiments of the present disclosure overcome these technical challenges and difficulties, and provide various technical benefits and advantages. Referring now to FIG. 133A, FIG. 133B, and FIG. 133C an example method 13300 in accordance with various embodiments of the present disclosure is illustrated.

In particular, the example method 13300 illustrates an example of identifying a "purge complete" condition of the sample channel based on the refractive index change as the one or more preservative chemicals are washed off from the sample channel and antibodies. For example, the example method 13300 illustrates using laser beams that pass through a fluid carrying channel (such as the sample channel of a waveguide) and impinge upon an imaging sensor to determine change in refractive index. Based on the refractive index, a substance in the fluid can be identified. If two or more substances are expected in the observation area at different times, then a fluid transition completion can be identified. As such, various embodiments of the present disclosure can optimize cycle time and fluid requirements and measure the variation in the wash process. In some embodiments, a solution of buffer and dissolved preservative have a different refractive index than the buffer solution alone. As such, when the transition of the channel from a condition where it is covered in preservative to a "purge complete" condition can be observed based on the refractive index change. Similarly, the refractive indexes of when a channel is dry and when a channel is wet are different. As such, the transitions of the dry-to-wet in a channel can also be observed based on the refractive index change.

The example method 13300 shown in FIG. 133A starts at step/operation 13302. Subsequent to and/or in response to step/operation 13302, the example method 13300 proceeds to step/operation 13304. At step/operation 13304, the example method 13300 causes a laser source to emit a laser beam through a sample channel of a waveguide.

In some embodiments, the laser source may be configured to produce, generate, and/or emit laser beams. Examples of the laser source may include, but not limited to, laser diodes (for example, violet laser diodes, visible laser diodes, edge-emitting laser diodes, surface-emitting laser diodes, and/or the like.

Referring now to FIG. 134A, an example sample testing device 13400A in accordance with various embodiments of the present disclosure is illustrated. In particular, the example sample testing device 13400A comprises a laser source 13401A, a waveguide having a sample channel 13403A (e.g. a substance/liquid delivery system), and an imaging sensor 13405A.

As illustrated in the example shown in FIG. 134A, the laser source 13401A is positioned adjacent to an input end of the sample channel 13403A, and the imaging sensor 13405A is positioned adjacent to an output end of the sample channel 13403A. In some embodiments, buffer solutions and/or sample solutions can be injected to the sample channel through an opening at the input end of the sample channel and exit the sample channel through an opening at the output end of the sample channel.

In some embodiments, a user may turn on the laser source and cause the laser source to emit the laser beam through the sample channel. In some embodiments, a processor and/or controller may cause the laser source to emit the last beam. For example, the laser source may be aligned with the input end of the sample channel and in electronic communications with the processor and/or controller. The processor and/or controller may transmit instructions to an actuator of the laser source to cause the laser source to emit the laser beam.

When a laser source emits a laser beam through the sample channel of the waveguide, the laser beam may travel through the sample channel (e.g. through the air in the sample channel) and arrive at the imaging sensor 13405A. In some embodiments, the imaging sensor 13405A is an imaging component in accordance with various examples provided herein. For example, the imaging sensor 13405A may include, but not limited to, a photodetector, a contact image sensor (CIS), a charge-coupled device (CCD), a complementary metal-oxide semiconductor (CMOS) sensor, and/or the like. As shown in FIG. 134A, after the laser beam emitted by the laser source 13401A travels through the sample channel 13403A (e.g. through the air in the sample channel), the laser beam arrives at a first sensing region 13407A of the imaging sensor 13405A (e.g. the laser beam activates the first sensing region 13407A of the imaging sensor 13405A).

Referring back to FIG. 133A, subsequent to and/or in response to step/operation 13304, the example method 13300 proceeds to step/operation 13306. At step/operation 13306, the example method 13300 receives first imaging data from the imaging sensor.

For example, as shown in FIG. 134A, after the laser beam arrives at a first sensing region 13407A of the imaging sensor 13405A, the imaging sensor 13405A may generate first imaging data. In some embodiments, the first imaging data may indicate a location of the first sensing region 13407A where the laser beam arrives/activates on the imaging sensor 13405A.

In some embodiments, the imaging sensor 13405A may transmit the first imaging data to the processor and/or controller.

Referring back to FIG. 133A, subsequent to and/or in response to step/operation 13306, the example method 13300 proceeds to step/operation 13310. At step/operation 13310, the example method 13300 causes a first injection of a buffer solution to the sample channel of the waveguide.

For example, a user may inject or cause an injection of a buffer solution to the sample channel (for example, through an input opening at the input end of the sample channel). Examples of a buffer solution include, but not limited to, water. As described above, the one or more preservative chemicals (such as, but not limited to, sugar) may be coated on the surface of the sample channel and/or on the antibodies to preserve those antibodies prior to the waveguide being used by a user. As the buffer solution travels along the sample channel, the buffer solution may purge, remove and/or wash off the one or more preservative chemicals from the surface of the sample channel and from the antibodies.

In some embodiments, the waveguide may be connected to a pump that is configured to inject buffer solutions to a sample channel of the waveguide, similar to those described above. In such embodiments, the pump may be in electronic communication with a processor and/or controller as described above, such that the processor and/or controller can transmit instructions to the pump and cause the first injection of the buffer solution to the sample channel of the waveguide.

Referring back to FIG. 133A, subsequent to and/or in response to step/operation 13310, the example method 13300 proceeds to block A, which connects FIG. 133A to FIG. 133B. Referring now to FIG. 133B, subsequent to and/or in response to block A (i.e. subsequent to and/or in response to step/operation 13310), the example method 13300 proceeds to step/operation 13314. At step/operation 13314, the example method 13300 receives second imaging data from the imaging sensor. In some embodiments, the second imaging data is received from the imaging sensor after the first injection of the buffer solution at step/operation 13310.

For example, referring now to FIG. 134B, an example sample testing device 13400B in accordance with various embodiments of the present disclosure is illustrated, similar to the example sample testing device 13400A illustrated above in connection with FIG. 134A. In particular, the example sample testing device 13400B comprises a laser source 13401B, a waveguide having a sample channel 13403B (e.g. a substance/liquid delivery system), and an imaging sensor 13405B.

Similar to the example sample testing device 13400A illustrated above in connection with FIG. 134A, the laser source 13401B is positioned adjacent to an input end of the sample channel 13403B, and the imaging sensor 13405B is positioned adjacent to an output end of the sample channel 13403B.

In the example shown in FIG. 134B, the laser source continues emitting the laser beam through the sample channel of the waveguide, and the buffer solution is injected into the sample channel. The laser beam may travel through the sample channel (e.g. through the buffer solution that has been injected in the sample channel) and arrive at the imaging sensor 13405B. In some embodiments, the imaging sensor 13405B is an imaging component similar to the imaging sensor 13405A described above in connection with FIG. 134A. As shown in FIG. 134B, after the laser beam emitted by the laser source 13401B travels through the sample channel 13403B (e.g. through the buffer solution that has been injected in the sample channel), the laser beam arrives at a second sensing region 13407B of the imaging sensor 13405B (e.g. the laser beam activates the second sensing region 13407B of the imaging sensor 13405B).

After the laser beam arrives at the second sensing region 13407B of the imaging sensor 13405B, the imaging sensor 13405B may generate second imaging data. In some embodiments, the second imaging data may indicate a location of the second sensing region 13407B where the laser beam arrives/activates on the imaging sensor 13405B.

In some embodiments, the imaging sensor 13405B may transmit the second imaging data to the processor and/or controller.

Referring back to FIG. 133B, subsequent to and/or in response to step/operation 13314, the example method 13300 proceeds to step/operation 13318. At step/operation 13318, the example method 13300 calculates a refractive index change value associated with the sample channel based on the first imaging data and the second imaging data.

For example, comparing FIG. 134A with FIG. 134B, the first sensing region 13407A in FIG. 134A is a different sensing region on the imaging sensor than the second sensing region 13407B in FIG. 134B. In some embodiments, the difference is due to a change in the refractive index of the sample channel.

In some embodiments, the change in the refractive index of the sample channel may be caused by the injection of the buffer solution. For example, when the laser beam first travels through the sample channel, there may not be any buffer solution in the sample channel. While the laser beam is continuously emitted and continuously travels through the sample channel, the buffer solution is injected into the sample channel, causing a change in the refractive index of the sample channel that is reflected as a change in the sensing region activated by the laser beam.

Additionally, or alternatively, the change in the refractive index of the sample channel may be caused by the purging/removing the one or more preservative chemicals on the surface of the sample channel. As described above, the buffer solution may purge and/or remove the one or more preservative chemicals from the surface of the sample channel as the buffer solution travels through the sample channel. While the laser beam is continuously emitted and travels through the sample channel, the buffer solution continuously washes away the one or more preservative chemicals from the surface of the sample channel, and the decrease in the amount of one or more preservative chemicals on the surface of the sample channel causes a change in the refractive index of the sample channel that is reflected as a change in the sensing region activated by the laser beam.

In some embodiments, the change in the activated sensing region of the sensor can be measured, and the change in refractive index can be calculated. Continuing from the examples described in connection with FIG. 134A and FIG. 134B, the refractive index change value may be calculated based on a distance between the first sensing region 13407A and the second sensing region 13407B. For example, refractive index change value (i.e. a change in the refractive index of the sample channel) may equal the distance between the first sensing region 13407A and the second sensing region 13407B.

For example, based on the first imaging data received at step/operation 13306 and the second imaging data received at step/operation 13314, the processor and/or controller may calculate a distance between the first sensing region and the second sensing region, and may assign the distance as the refractive index change value.

Referring back to FIG. 133B, subsequent to and/or in response to step/operation 13318, the example method 13300 proceeds to block B, which connects FIG. 133B to FIG. 133C. Referring now to FIG. 133C, subsequent to and/or in response to block B (i.e. subsequent to and/or in response to step/operation 13318), the example method 13300 proceeds to step/operation 13320. At step/operation 13320, the example method 13300 determines whether the refractive index change value corresponds to a predetermined refractive index change value.

In some embodiments, the predetermined refractive index change value is a refractive index change value of the sample channel when the one or more preservative chemicals have been completely washed off or purged from the surface of the sample channel and/or when the buffer solution has completely traveled through the sample channel.

For example, various embodiments of the present disclosure may calculate the predetermined refractive index change value through experiments. For example, various embodiments of the present disclosure may cause the laser source to emit laser beams through the sample channel. The laser source may activate a first experimental sensing region of the imaging sensor when there is no buffer solution in the sample channel. The laser source may activate a second experimental sensing region of the imaging sensor when the sample channel is in a determined condition where the one or more preservative chemicals have been completely washed off or purged from the surface of the sample channel and/or when the buffer solution has completely traveled through the sample channel. In some embodiments, the predetermined refractive index change value is calculated corresponding to a distance between the first experimental sensing region and the second experimental sensing region.

While the description above provides an example of calculating the predetermined refractive index change value, it is noted that the scope of the present disclosure is not limited to the description above. In some examples, an example predetermined refractive index change value may correspond to a refractive index value of the buffer solution.

As described above, various embodiments of the present disclosure may determine a change in substance/liquid/solution in the sample channel based on determining that there is a change in the refractive index of the sample channel. Additionally, or alternatively, based on the refractive index change value and/or the change in the refractive index of the sample channel, the substance/liquid/solution in the sample channel (and/or the concentration level of the substance/liquid/solution in the sample channel) may be identifiable.

For example, example embodiments of the present disclosure may compare the refractive index change value calculated at step/operation 13318 with known refractive index change value(s) associated with known substance(s)/liquid. If there is a match between the refractive index change value calculated at step/operation 13318 and a known refractive index change value, example embodiments of the present disclosure may determine that the substance/liquid in the sample channel is the known substance/liquid corresponding to the known refractive index change value.

Additionally, or alternatively, example embodiments of the present disclosure may compare the refractive index change value calculated at step/operation 13318 with known refractive index change value(s) associated with known concentration levels of substance(s)/liquid. If there is a match between the refractive index change value calculated at step/operation 13318 and a known refractive index change value, example embodiments of the present disclosure may determine that the substance/liquid in the sample channel has a concentration level corresponding to the known concentration level associated with the known refractive index change value.

Referring back to FIG. 133C, if, at step/operation 13320, the example method 13300 determines that the refractive index change value corresponds to a predetermined refractive index change value, the example method 13300 proceeds to step/operation 13322. At step/operation 13322, the example method 13300 causes a second injection of a sample solution to the sample channel of the waveguide.

In some embodiments, if the refractive index change value matches the predetermined refractive index change value, the example method 13300 determines that the one or more preservative chemicals have been completely washed off or purged from the surface of the sample channel and/or the buffer solution has completely traveled through the sample channel. As such, the example method 13300 causes a second injection of the sample solution.

For example, a processor and/or controller may determine whether the refractive index change value calculated at step/operation 13318 matches the predetermined the refractive index change value, and if so, transmit instructions to a pump and cause the second injection of the sample solution to the sample channel by the pump.

If, at step/operation 13320, the example method 13300 determines that the refractive index change value does not correspond to the predetermined refractive index change value, the example method 13300 proceeds to step/operation 13324. At step/operation 13324, the example method 13300 causes a continuing injection of the buffer solution to the sample channel of the waveguide.

In some embodiments, if the refractive index change value does not match the predetermined refractive index change value, the example method 13300 determines that the one or more preservative chemicals have not been completely washed off or purged from the surface of the sample channel and/or the buffer solution has not completely traveled through the sample channel. As such, the example method 13300 causes a continuing injection of the buffer solution to the sample channel of the waveguide so that the one or more preservative chemicals can continue to be washed off or purged from the surface of the sample channel and/or the buffer solution can continue traveling through the sample channel.

For example, a processor and/or controller may determine whether the refractive index change value calculated at step/operation 13318 matches the predetermined the refractive index change value, and if not, transmit instructions to a pump and cause the continuing injection of the buffer solution to the sample channel by the pump.

In some embodiments, subsequent to and/or in response to step/operation 13324, the example method 13300 may return to step/operation 13314. In such embodiments, as the buffer solution continues washing off the one or more preservative chemicals from the surface of the sample channel, the example method 13300 may receive additional imaging data from the imaging sensor, calculate a refractive index change value associated with the sample channel based on the first imaging data and the addition imaging data, and determine whether the refractive index change value corresponds to the predetermined refractive index change value. In some embodiments, this process may be repeated until the refractive index change value corresponds to the predetermined refractive index change value. In other words, example embodiments of the present disclosure may continue injecting the buffer solution to the sample channel of the waveguide until the refractive index change value indicates that the one or more preservative chemicals have been completely washed off or purged from the surface of the sample channel and/or the buffer solution has completely traveled through the sample channel.

Referring back to FIG. 133C, subsequent to and/or in response to step/operation 13322 and/or step/operation 13324, the example method 13300 proceeds to step/operation 13326 and ends.

As illustrated in the example method described above, various embodiments of the present disclosure overcome various technical challenges and difficulties, and provide various technical improvements, including, but not limited to, accurately determining whether a substance/liquid has completely traveled through a liquid delivery system (such as, but not limited to, a sample channel of a waveguide). For example, various embodiments of the present disclosure may arrange a light source (such as, but not limited to, a laser source that emits laser beams) or other refractive index-capturing technology such that the beam or beams (in case of a laser source) pass through a fluid carrying channel (such as, but not limited to, a sample channel of a waveguide) and impinge upon a suitable sensor (such as, but not limited to, an optical imaging sensor). When the beam or beams travels in air, the beam or beams will activate one or more known regions of the sensor. After a substance/liquid is injected into the fluid carrying channel, the beam or beams pass through the substance/liquid in the fluid carrying channel and activate a different region of the sensor. In some embodiments, this change in the activated region of the sensor can be measured, and the change in refractive index can be calculated. In some embodiments, based on the refractive index value and/or the change in the refractive index, the substance/liquid in the fluid carrying channel may be identifiable. If not identifiable, various embodiments of the present disclosure can identify a change in substance. In some examples, if two or more substances are expected in the observation area at different times, various embodiments of the present disclosure can identify with confidence that a transition has been completed (e.g. a substance/fluid has completely traveled through the liquid/substance delivery system).

While the above description provides an example associated with a waveguide, it is noted that the scope of the present disclosure is not limited to waveguide only. Various embodiments associated with FIG. 133A to FIG. 134B may provide wide ranging applications in fluid condition monitoring, and may provide accurate results in applications from nanometers to centimeters and in a variety of fluids. For example, various embodiments associated with FIG. 133A to FIG. 134B may be implemented in medical arenas to differentiate blood, saline, and glycerin. As another example, various embodiments associated with FIG. 133A to FIG. 134B may be implemented in automotive to indicate fluid condition (cooling, lubrication, etc.). As another example, various embodiments associated with FIG. 133A to FIG. 134B may be implemented in pipeline applications to indicate beginning and end of petroleum product runs.

As described above, a sample testing device in accordance with various embodiments of the present disclosure may comprise a multichannel waveguide that defines a plurality of sample channels. In some embodiments, laser beams may be provided to input ends of the sample channels and may exit from the output ends of the sample channels. In some embodiments, an imaging component (for example, an image sensor) may capture laser beams that exit from the output ends and generate test signals. In some embodiments, the test signals may be generated based on or indicate interference fringe patterns from the sample channels as the laser beams travel through the sample channels.

In some embodiments, when a sample solution is provided to the plurality of sample channels, the interference fringe patterns may change, which can be indicated or reflected by changes in test signals. For example, the sample solution may comprise aerosols from a patient's exhaled breath. The sample solution may be injected to the plurality of sample channels of the sample testing device. In some embodiments, the surface of each of the sample channels may be coated with antibodies for one or more particular types of viruses. If the sample solution (e.g. the aerosols) contains a particular type of virus, and the surface of the sample channel is coated with antibodies for that particular type of virus, the antibody binds with the virus, keeping the virus at the surface. The increase in the number of virions at the surface (due to the chemical and/or biological reaction between the antibody and the virions) may cause a change in the evanescent field of the waveguide, which may in turn causes a change in the interference fringe pattern from the sample channel and a change in the test signal generated by the imaging component. As such, based on changes in the test signals, the type of the virus may be determined. For example, if a particular test signal from a particular sample channel indicates a change in the interference fringe pattern, the sample solution may comprise a virus that corresponds to the antibody coated on the surface of the sample channel. For example, if the surface of the sample channel is coated with antibody for the SARS-CoV-2 virus and the test signal from the sample channel indicates a change in the interference fringe pattern, the sample solution comprises the SARS-CoV-2 virus.

However, there are many technical challenges and difficulties in implementing a multichannel waveguide for sample testing. For example, different sample channels in the multichannel waveguide may have thermal differences and/or structural differences. Those differences may impact the wavelengths of laser beams in different sample channels, causing test signals from different channels to vary.

As an example, different sample channels may have differences or deviations in their environmental temperatures. As laser beams travel through these sample channels, the different environmental temperatures may impact the wavelengths of the laser beams differently, and may cause changes in the interference fringe patterns and the test signals. As another example, different sample channels may have differences or deviations in their optical structures. As laser beams travel through these sample channels, the different optical structures may impact the wavelengths of the laser beams differently, and may cause changes in the interference fringe patterns and the test signals. The sample testing device may erroneously determine that such changes in the test signals (caused by thermal differences and/or structural differences) are indicators that the sample solution comprises the virus corresponding to the antibody coated on the surface of the sample channel.

As such, thermal differences and/or structural differences in sample channels in multichannel waveguides may cause different responses (e.g. test signals) from different sample channels, while it is important in quantitative sensing to have all channels in a multi-channel waveguide producing the same baseline response (e.g. prior to injecting the sample solution into the sample channels) in order to perform comparative process (for example, detect whether a sample solution comprises one or more substances that would cause differences in test signals, and/or detect the differences between sample solutions and reference solutions, from different channels).

Various embodiments of the present disclosure overcome these technical challenges and difficulties, and provide various technical advancements and improvements. For example, as interferometric waveguide sensor output signal is dependent on the wavelength of the input laser beam, various embodiments of the present disclosure may change the wavelength of the input laser beam to change the test signals and compensate for wavelength change due to the structural and thermal differences between different sample channels.

In some embodiments, to change the wavelength of the input laser beam, various embodiments of the present disclosure may (1) change the operating temperature of the laser diodes that emits laser beams to sample channels of the multi-channel waveguide, (2) change the drive currents of the laser diodes that cause the laser diodes to emit laser beams to sample channels of the multi-channel waveguide, or (3) add a wavelength adjustment device that provides deformable grating to the fibers through which the laser beams travel to the input ends of the multi-channel waveguide.

In some embodiments, a laser diode may be implemented to emit a laser beam into a sample channel of the waveguide. In some embodiments, the operating temperature of the laser diode can have an impact on the wavelength of the laser beam. For example, an increase in the operating temperature of the laser diode may cause an increase in the wavelength of the laser emitted by the laser diode, while a decrease in the operating temperature of the laser diode may cause a decrease in the wavelength of the laser emitted by the laser diode. As such, an example method may include adjusting the operating temperature of the laser diode based on the wavelength of the laser beam emitted by the laser diode. For example, in response to determining that the wavelength of the laser beam is lower than the desired wavelength, the example method may increase the operating temperature of the laser diode (for example, by increasing the current of the laser diode). In response to determining that the wavelength of the laser beam is higher than the desired wavelength, the example method may decrease the operating temperature of the laser diode (for example, by decreasing the current of the laser diode).

In some embodiments, the laser diode may comprise a laser diode driver that provides current to the laser diode that causes the laser diode to emit laser beams. For example, the laser diode driver may provide a constant current source that delivers drive currents to the laser diode and causes the laser diode to emit laser beams. As the drive current increases, the intensity of the laser beam generated by the laser diode increases, which in turn increases the wavelength of the laser beam. As the drive current decreases, the intensity of the laser beam generated by the laser diode decreases, which in turn decreases the wavelength of the laser beam. As such, an example method may include adjusting the drive current of the laser diode based on the wavelength of the laser beam emitted by the laser diode. For example, in response to determining that the wavelength of the laser beam is lower than the desired wavelength, the example method may increase the drive current of the laser diode. In response to determining that the wavelength of the laser beam is higher than the desired wavelength, the example method may decrease the drive current of the laser diode.

However, there are technical challenges in adjusting the wavelengths of the laser through adjusting the operating temperature and/or the drive current of the laser diode. For example, the driver current correlates to the operating temperature of the laser diode. The higher the drive current, the higher the operating temperature of the laser diode. Because both the operating temperature and the drive current of the laser diode can affect the wavelengths of the laser beams, it can be difficult to determine the suitable operating temperature and the drive current to achieve the suitable wavelengths of the laser beams.

In accordance with various embodiments of the present disclosure, a wavelength adjustment device may be provided that can overcome these technical challenges and difficulties. The wavelength adjustment device may comprise piezoelectric material that can exert/impose adjustable pressure on the optical fiber of the waveguide based on the voltage that is applied on the piezoelectric material. As described above, laser beams may travel through the optical fibers to the input ends of the waveguide. When the voltage changes, the piezoelectric material may expand or condense, and therefore may increase or decrease the pressure exerted or imposed on the optical fiber. When the pressure increases, the optical fiber expands in length, which in turn increases the wavelength of the laser beam that travels through the optical fiber. When the pressure decreases, the optical fiber reduces in length, which in turn decreases the wavelength of the laser beam that travels through the optical fiber. As such, various embodiments of the present disclosure may provide a variable wavelength waveguide that can achieve quantitative sensing with multi-channel samples and reference.

Referring now to FIG. 135A and FIG. 135B, a sample testing device 13500 in accordance with some embodiments of the present disclosure is illustrated. The sample testing device 13500 comprises an example wavelength adjustment device 13501. In particular, FIG. 135A illustrates an example side view of an example sample testing device 13500 with the example wavelength adjustment device 13501 in accordance with various embodiments of the present disclosure. FIG. 135B illustrates an example cross-section view of an example wavelength adjustment device 13501 in accordance with various embodiments of the present disclosure.

Referring now to FIG. 135A, the sample testing device 13500 comprises a laser source 13503, a wavelength adjustment device 13501, a light source coupler 13509, a waveguide 13515, and an imaging component 13517.

In some embodiments, the light source coupler 13509 comprises an optical fiber array 13507 and an optical fiber holder 13511. In some embodiments, the optical fiber array 13507 is secured within the optical fiber holder 13511.

In some embodiments, an end of each optical fiber is connected to the laser source 13503 (such as a laser diode), and each optical fiber conveys a laser beam from the laser source 13503 towards an input end of a sample channel of the waveguide 13515. In some embodiments, the sample channels of the waveguide 13515 are aligned with the light source coupler 13509. For example, each of the optical fiber in the optical fiber array 13507 of the light source coupler 13509 is directly aligned to an input edge of one of the sample channels of the waveguide 13515 through direct edge coupling. As such, laser beams may travel onto the sample channels of the waveguide 13515 as guided by the optical fibers in the optical fiber array 13507.

In some embodiments, the light source coupler 13509 comprises a micro lens array 13513 disposed on a first edge surface of the optical fiber holder 13511. In some embodiments, each optical fiber in the optical fiber array 13507 is aligned to one micro lens of the micro lens array 13513, and each micro lens of the micro lens array 13513 is aligned to one of a sample channel of the waveguide 13515. As such, a laser beam emitted by the laser source 13503 may travel through an optical fiber in the optical fiber array 13507 and a micro lens of the micro lens array 13513, and arrive at an input end of a sample channel of the waveguide 13515.

As described above, the sample testing device 13500 comprises the wavelength adjustment device 13501. In the example shown in FIG. 135A, the wavelength adjustment device 13501 is positioned between the laser source 13503 and the light source coupler 13509. In particular, the optical fiber array 13507 of the light source coupler 13509 (which is connected to the laser source 13503) passes through the wavelength adjustment device 13501.

In some embodiments, the laser source 13503 may be in the form of a semiconductor laser that provides a small range variable wavelength of laser beams and without any complicated tunable structure. For example, the laser source 13503 may comprise a single mode narrow bandwidth diode laser. The wavelength of the diode laser output (e.g. lease beams) varies in the small range, such as +/−0.1 nm. The variation of the wavelength of the diode laser output can change the output from the waveguide (for example, the test signals) with more than two cycles of phase changes.

As described above, the laser source 13503 may be connected to one or more optical fibers in the optical fiber array 13507, and the one or more optical fibers in the optical fiber array 13507 may transmit the laser beams from the laser source 13503 to one or more input ends of one or more sample channels in the waveguide 13515. In some embodiments, the wavelength adjustment device 13501 may adjust the wavelength of the laser beam in each sample channel as needed. For example, the example wavelength adjustment device 13501 comprises one or more compressors, and each of the one or more compressors exerts pressure on one of the fibers from the optical fiber array 13507, so that the channelby-channel outputs can be modified and the output phases from the waveguide can be synchronized, details of which are described herein.

In particular, referring now to FIG. 135B, an example cross-section view of the wavelength adjustment device 13501 is illustrated. In the example shown in FIG. 135B, the wavelength adjustment device 13501 comprises a housing 13521, an optical fiber support base 13527 secured within the housing 13521, and a compressor 13523 positioned within the housing 13521 and above the optical fiber support base 13527.

In some embodiments, the housing 13521 provides a shell or a casing within which one or more compressors (such as the compressor 13523) and the optical fiber support base 13527 may be positioned. In some embodiments, the housing 13521 may provide openings on a first side of the housing 13521 and a second side of the housing 13521 opposite to the first side. In some embodiments, optical fibers of the optical fiber array 13507 may enter the housing 13521 through openings on the first side of the housing 13521, pass through the housing 13521, and exit the housing 13521 through openings on the second side of the housing 13521.

As described above, the wavelength adjustment device 13501 may comprise one or more compressors. In some embodiments, each fiber from the optical fiber array 13507 is positioned between the optical fiber support base 13527 and one of the compressors, so that the wavelength adjustment device 13501 may exert different pressures through the compressors on different fibers from the optical fiber array 13507. In the example shown in FIG. 135B, the optical fiber 13507A is positioned between the compressor 13523 and the optical fiber support base 13527.

In some embodiments, the compressor 13523 may comprise piezoelectric material. In the present disclosure, the term "piezoelectric material" or "piezoelectrics" refer to materials that can expand or contract when voltages are applied on the piezoelectric material or the piezoelectrics. Examples of the piezoelectric materials may include, but are not limited to, piezoelectric crystal, ceramics, quartz, and/or the like.

As an example, the compressor 13523 may comprise a piezoelectric crystal. In some embodiments, the wavelength adjustment device 13501 may comprise a variable power supply 13525 that applies voltage on the compressor 13523. For example, the variable power supply 13525 may comprise a first electrode 13529A that is connected to a first side of the piezoelectric crystal of the compressor 13523 and a second electrode 13529B that is connected to a second side of the piezoelectric crystal of the compressor 13523. The first side is in the polarization direction from the second side. As such, the variable power supply 13525 may provide electrical conduction on the compressor 13523 on its polarization direction through the electrode 13529A and the electrode 13529B.

In this example, when the variable power supply 13525 applies a voltage between the electrode 13529A and the electrode 13529B, the compressor 13523 may exhibit the inverse reverse piezoelectric effect. In particular, the voltage applied in the polarization direction of the piezoelectric crystal may cause the compressor 13523 to deform or expand. In some embodiments, the amount of deformation or expansion of the compressor 13523 correlates to the amount of voltage applied to the piezoelectric crystal. For example, the higher the voltage applied in the polarization direction of the piezoelectric crystal, the more that the piezoelectric crystal expands.

As described above, the optical fiber 13507A is positioned between the compressor 13523 and the optical fiber support base 13527. When voltage is applied to the piezoelectric crystal of the compressor 13523, the piezoelectric crystal expands and exerts pressure on the optical fiber 13507A in response to the voltage. In some embodiments, the optical fiber support base 13527 is secured to a bottom surface of the housing 13521. In some embodiments, the amount of the pressure that the compressor 13523 exerts on the optical fiber 13507A correlates to the amount of deformation or expansion of the piezoelectric crystal of the compressor 13523.

As the piezoelectric crystal of the compressor 13523 exerts pressure onto the optical fiber 13507A, it causes the optical fiber 13507A to elongate or stretch. In some embodiments, the amount that the optical fiber 13507A elongates or stretches correlates to the amount of pressure that the compressor 13523 exerts onto the optical fiber 13507A, which in turn correlates to the amount of deformation or expansion of the compressor 13523, which in turn correlates to the amount of voltage applied to the piezoelectric crystal. As such, the higher the voltage applied to the piezoelectric crystal, the more elongation of the optical fiber 13507A. The lower the voltage applied to the piezoelectric crystal, the less elongation of the optical fiber 13507A.

In some embodiments, the elongation of the optical fiber 13507A causes changes in length of the optical fiber 13507A. The changes in the length of the optical fiber 13507A may cause changes in the wavelength of the laser beam that is reflected between the changing spacing axial periodic high-low refractive index structured Bragg grating in the optical fiber 13507A as the laser beam travels through the optical fiber 13507A. For example, the more that the optical fiber 13507A elongates or stretches, the longer that the optical fiber 13507A becomes, and the longer wavelength of the laser beam that is reflected between increased spacing axial periodic high-low refractive index structured Bragg grating in the optical fiber 13507A. As described above, the amount of elongation of the optical fiber 13507A correlates to the amount of voltage that is applied on the compressor 13523. As such, the wavelength of the laser beam in the optical fiber 13507A may be adjusted through changing the voltage that is applied to the compressor 13523.

As illustrated in the example shown in FIG. 135B, the wavelength adjustment device 13501 may cause tunable gratings on the optical fiber 13507A that can adjust the wavelengths of the laser beam traveling through the optical fiber 13507A. In some embodiments, the wavelength adjustment device 13501 may comprise a compressor for each individual optical fiber, and may apply different voltages on different compressors. As each individual optical fiber provides a laser beam to one of the input ends of one of the sample channels of the waveguide, the wavelength adjustment device 13501 may adjust the wavelengths of laser beams to the sample channels of the waveguide by adjusting the voltages applied on the compressors, so that all laser beams can have the same wavelength or within a narrow band of wavelengths. As such, various embodiments of the present disclosure overcome the technical challenges and difficulties due to the thermal differences and/or structural differences between sample channels of a waveguide, and may provide technical benefits and improvements.

Referring now to FIG. 136, an example block diagram 13600 in accordance with some embodiments of the present disclosure is illustrated. In particular, the example block diagram 13600 illustrates example components associated with a wavelength adjustment device 13602 and an imaging component 13620, as well as example data communications between the example wavelength adjustment device 13602 and the example imaging component 13620.

In the example shown in FIG. 136, the wavelength adjustment device 13602 may comprise a variable power supply 13608, an input/output circuitry 13616, a data storage media 13610, a processing circuitry 13604, and a communications circuitry 13612. Although these components 13608, 13616, 13610, 13604, and 13612 are described with respect to functional limitations, it should be understood that the particular implementations necessarily include the use of particular hardware.

In some embodiments, the variable power supply 13608 may provide adjustable voltage on the compressor of the wavelength adjustment device 13602. In some embodiments, the variable power supply 13608 may be in the form of a direct current (DC) voltage regulator (such as, but not limited to, LM317T) that is coupled to a DC voltage source. In such an example, the DC voltage regulator may apply an adjustable amount of the DC voltage from the DC voltage source to the compressor. Additionally, or alternatively, the variable power supply 13608 may be in other forms. In some embodiments, the variable power supply 13608 may provide a maximum voltage that can be applied to the compressor of the wavelength adjustment device, as well as a minimum voltage (for example, zero) that can be applied to the compressor of the wavelength adjustment device.

In some embodiments, the variable power supply 13608 may be in electronic communications with a processing circuitry 13604. In some embodiments, the processing circuitry 13604 may provide voltage control signals to the variable power supply 13608 that indicate the amount of voltage to be applied to the compressor.

In some embodiments, the processing circuitry 13604 (and/or co-processor or any other processing circuitry assisting or otherwise associated with the processor) may be in communication with a memory via a bus. The memory is non-transitory and may include, for example, one or more volatile and/or non-volatile memories. In other words, for example, the memory may be an electronic storage device (e.g., a computer-readable storage medium). The memory may be configured to store information, data, content, applications, instructions, or the like for enabling the apparatus to carry out various functions in accordance with example embodiments of the present disclosure.

In some embodiments, the wavelength adjustment device 13602 may include the input/output circuitry 13616 that may, in turn, be in communication with the processing circuitry 13604 to provide output to the user and, in some embodiments, to receive an indication of a user input. The input/output circuitry 13616 may comprise a user interface circuitry and may include a display, which may comprise a web user interface, a mobile application, a client device, a kiosk, or the like. In some embodiments, the input/output circuitry 13616 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor.

In some embodiments, the processing circuitry 13604 may be in electronic communications with the data storage media 13610. In some embodiments, the data storage media 13610 may be embodied as a data storage device or devices, as a separate database server or servers, or as a combination of data storage devices and separate database servers. Further, in some embodiments, data storage media 13610 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. More specifically, the data storage media 13610 may encompass one or more data stores configured to store information/data usable in certain embodiments.

In some embodiments, the communications circuitry 13612 may comprise any means such as a device or circuitry embodied in either hardware or a combination of hardware and software that is configured to receive and/or transmit data from/to a network and/or any other device, circuitry, or module in communication with the wavelength adjustment device 13602. In this regard, the communications circuitry 13612 may include, for example, a network interface for enabling communications with a wired or wireless communication network. For example, the communications circuitry 13612 may include one or more network interface cards, antennae, buses, switches, routers, modems, and supporting hardware and/or software, or any other device suitable for enabling communications via a network. Additionally, or alternatively, the communications circuitry 13612 may include the circuitry for interacting with the antenna/antennae to cause transmission of signals via the antenna/antennae or to handle receipt of signals received via the antenna/antennae.

As described above, the communications circuitry 13612 of the wavelength adjustment device 13602 may be in electronic communication with the imaging component 13620. In particular, the imaging component 13620 may comprise an image sensing circuitry 13618 and a communications circuitry 13622. Although these components 13618 and 13616 are described with respect to functional limitations, it should be understood that the particular implementations necessarily include the use of particular hardware.

In some embodiments, the image sensing circuitry 13618 may comprise circuitry that may detect interference fringe patterns from the output ends of the sample channels of the waveguide, and may generate test signals based on the detected interference fringe patterns. For example, the image sensing circuitry 13618 may comprise a contact image sensor (CIS), a charge-coupled device (CCD), or a complementary metal-oxide semiconductor (CMOS) sensor, and/or the like.

In some embodiments, the image sensing circuitry 13618 may be in electronic communications with the communications circuitry 13622. In some embodiments, the image sensing circuitry 13618 may generate test signals, and provide test signals to the communications circuitry 13622. In some embodiments, the communications circuitry 13622 of the imaging component 13620 is similar to the communications circuitry 13612 of the wavelength adjustment device 13602 described above.

In some embodiments, the example wavelength adjustment device may provide different modes, such as, but not limited to a continuous wavelength sweeping mode and a direct wavelength setting mode. Referring now to FIG. 137A to FIG. 138, example methods in accordance with various embodiments of the present disclosure are illustrated. In particular, FIG. 137A and FIG. 137B illustrate an example method 13700 where the example wavelength adjustment device operates in the continuous wavelength sweeping mode. FIG. 138 illustrates an example method 13800 where the example wavelength adjustment device operates in the direct wavelength setting mode.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 137A to FIG. 138 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s). Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 137A and FIG. 137B, the example method 13700 is illustrated. As described above, the example method 13700 illustrates an example where an example wavelength adjustment device operates in a continuous wavelength sweeping mode. In the continuous wavelength sweeping mode, the voltages applied to the compressors are continuously adjusted, causing the laser beams to sweep continuously over the wavelength change range as they enter the input ends of sample channels through the optical fibers. In some embodiments, the output laser beams from the output ends of the sample channels in the waveguide may be continuously detected by an imaging component, and the test signals are recorded. In some embodiments, based on the recorded test signals, the example method 13700 may generate voltage correlation data objects for sample channels that indicate data correlations between voltage applied to the compressors and wavelengths of the laser beams, details of which are described herein.

Referring now to FIG. 137A, the example method 13700 starts at step/operation 13702. In some embodiments, subsequent to step/operation 13702, the example method 13700 proceeds to step/operation 13704. At step/operation 13704, a processing circuitry (for example but not limited to, the processing circuitry 13604 of the wavelength adjustment device 13602 described above in connection with FIG. 136) may receive user input triggering continuous wavelength sweeping mode.

For example, the user may provide user input through the input/output circuitry 13616 of the wavelength adjustment device 13602 described above in connection with FIG. 136. In some embodiments, the user input may indicate a request from the user to trigger the wavelength adjustment device to operate in the continuous wavelength sweeping mode.

Referring back to FIG. 137A, subsequent to and/or in response to step/operation 13704, the example method 13700 proceeds to step/operation 13706. At step/operation 13706, a processing circuitry (for example but not limited to, the processing circuitry 13604 of the wavelength adjustment device 13602 described above in connection with FIG. 136) may cause an increase of voltage applied to the compressor.

For example, subsequent to and/or in response to receiving the user input that triggers the wavelength adjustment device to operate in the continuous wavelength sweeping mode, the processing circuitry 13604 may transmit a control signal to the variable power supply 13608. In some embodiments, the control signal may trigger the variable power supply 13608 to increase the voltage applied to one of the compressors of the wavelength adjustment device (for example, increasing the voltage applied to the piezoelectric material). In some embodiments, the control signal may specify the voltage to be applied to the compressor of the wavelength adjustment device.

In some embodiments, subsequent to receiving the control signal from the processing circuitry 13604, the variable power supply 13608 may increase the voltage applied to the compressor of the wavelength adjustment device. As described above, each compressor may exert pressure on one of the optical fibers that convey laser beams to the sample channels of the waveguide. In some embodiments, an increase in the voltage causes the piezoelectric material in the compressor to expand, which in turn causes an increase in the pressure exerted on the optical fiber. As such, the optical fiber becomes more elongated, which causes the optical fiber to convey a laser beam with a higher wavelength to one of the sample channels of the waveguide.

Referring back to FIG. 137A, subsequent to and/or in response to step/operation 13706, the example method 13700 proceeds to step/operation 13708. At step/operation 13708, a processing circuitry (for example but not limited to, the processing circuitry 13604 of the wavelength adjustment device 13602 described above in connection with FIG. 136) may extract the interference fringe pattern from the test signal received from the imaging component.

As described above in connection with FIG. 136, the imaging component 13620 may comprise an image sensing circuitry 13618 that detects interference fringe patterns from the output ends of sample channels, and generates test signals based on the detected interference fringe patterns. At described above in connection with step/operation 13706 of FIG. 137A, the compressor of the wavelength adjustment device may increase the pressure exerted on the optical fiber that delivers laser beams to the sample channel of the waveguide. In some embodiments, the imaging component may detect the interference fringe pattern from the sample channel associated with the optical fiber on which the increased pressure is exerted.

In some embodiments, the imaging component may generate a test signal that indicates the detected interference fringe pattern, and may transmit the test signal to the wavelength adjustment device. For example, the communications circuitry 13622 of the imaging component 13620 may transmit the test signal to the communications circuitry 13612 of the wavelength adjustment device 13602.

In some embodiments, the processing circuitry 13604 of the wavelength adjustment device 13602 may extract the interference fringe pattern from the test signal. As described above, the wavelength of the laser beam can affect the interference fringe pattern. As such, the interference fringe pattern extracted from the test signal is an indicator of the wavelength of the laser beams.

In some embodiments, the processing circuitry 13604 may further calculate the wavelength of the laser beam exit from the output end of the sample channel. For example, the processing circuitry 13604 may calculate the wavelength based on the extracted interference fringe pattern, similar to those described above in connection with at least FIG. 1 above.

While the description above provides an example of calculating the wavelength of the laser beam output from the sample channel, it is noted that the scope of the present disclosure is not limited to the description above. In some examples, an example method in accordance with embodiments of the present disclosure may calculate the example wavelength of the laser beam output through one or more additional and/or alternative methods.

Referring back to FIG. 137A, subsequent to and/or in response to step/operation 13708, the example method 13700 proceeds to step/operation 13710. At step/operation 13710, a processing circuitry (for example but not limited to, the processing circuitry 13604 of the wavelength adjustment device 13602 described above in connection with FIG. 136) may update a voltage correlation data object to indicate a data correlation between the voltage and the interference fringe pattern.

As described above, the data storage media 13610 of the wavelength adjustment device 13602 may store data and/or information. For example, the data storage media 13610 may store a plurality of voltage correlation data objects. Each of the plurality of voltage correlation data objects may correspond to or be associated with one of the sample channels of the waveguide. In particular, the voltage correlation data object may indicate a plurality of data correlations between the voltages applied to the compressor of the wavelength adjustment device that is associated with a sample channel of the waveguide and the interference fringe patterns from the output end of the sample channel of the waveguide.

As described above, when the voltage applied to the compressor of the wavelength adjustment device increases, the pressure exerted on the optical fiber increases, which in turn causes the optical fiber to elongate and the wavelength of the laser beam through the optical fiber to increase. Because the interference fringe pattern is an indicator of the wavelength of the laser beams, the processing circuitry may determine a data correlation between the voltage applied to the compressor at step/operation 13706 and the interference fringe pattern extracted at step/operation 13708.

In some embodiments, the processing circuitry may update the voltage correlation data object stored in the data storage media 13610 by adding voltage value data according to the voltage applied to the compressor at step/operation 13706, adding interference fringe pattern data according to the interference fringe pattern extract at step/operation 13708, and adding a data correlation indicating an association between the voltage value data and the interference fringe pattern data.

As described above, the processing circuitry may calculate the wavelength of the laser beam exit from the sample channel. In some embodiments, the processing circuitry may update the voltage correlation data object stored in the data storage media 13610 by adding voltage value data according to the voltage applied to the compressor at step/operation 13706, adding wavelength value data calculated based on the interference fringe pattern extract at step/operation 13708, and adding a data correlation indicating an association between the voltage value data and the wavelength data.

Referring now to FIG. 139, an example graph 13900 illustrating voltage value data, wavelength value data, and data correlations between voltage value data and wavelength value data of an example voltage correlation data object is provided. In particular, the example graph 13900 shows data correlations between the voltage value data (x-axis) and the wavelength value data (y-axis). As shown in the example graph 13900, the higher the voltage, the higher the wavelength.

Referring back to FIG. 137A, subsequent to and/or in response to step/operation 13710, the example method 13700 proceeds to step/operation 13712. At step/operation 13712, a processing circuitry (for example but not limited to, the processing circuitry 13604 of the wavelength adjustment device 13602 described above in connection with FIG. 136) may determine whether the voltage applied to the compressor of the wavelength adjustment device reaches the maximum voltage.

As described above, the variable power supply 13608 of the wavelength adjustment device 13602 may provide a range of voltages to the compressor of the wavelength adjustment device. In some embodiments, the processing circuitry 13604 of the wavelength adjustment device may determine whether the voltage applied to the compressor at step/operation 13706 reaches the maximum voltage.

If, at step/operation 13712, the processing circuitry determines that the applied voltage does not reach the maximum voltage, the example method 13700 returns to step/operation 13706. At step/operation 13706, the processing circuitry causes an increase of voltage applied to the compressor of the wavelength adjustment device, similar to those described above.

If, at step/operation 13712, the processing circuitry determines that the applied voltage reaches the maximum voltage, the example method 13700 proceeds to block A, which connects FIG. 137A to FIG. 137B.

Referring now to FIG. 137B, in some embodiments, subsequent to and/or in response to block A (e.g. subsequent to and/or in response to determining that the applied voltage reaches the maximum voltage), the example method 13700 proceeds to step/operation 13714. At step/operation 13714, a processing circuitry (for example but not limited to, the processing circuitry 13604 of the wavelength adjustment device 13602 described above in connection with FIG. 136) may cause a decrease of voltage applied to the compressor.

For example, the processing circuitry 13604 may transmit a control signal to the variable power supply 13608. In some embodiments, the control signal may trigger the variable power supply 13608 to decrease the voltage applied to the compressor of the wavelength adjustment device (for example, increasing the voltage applied to the piezoelectric material) described above in connection with step/operation 13706. In some embodiments, the control signal may specify the voltage to be applied to the compressor of the wavelength adjustment device.

In some embodiments, subsequent to receiving the control signal from the processing circuitry 13604, the variable power supply 13608 may decrease the voltage applied to the compressor of the wavelength adjustment device. As described above, each compressor may exert pressure on one of the optical fibers that convey laser beams to the sample channels of the waveguide. In some embodiments, a decrease in the voltage causes the piezoelectric material in the compressor to contract, which in turn causes a decrease in the pressure exerted on the optical fiber. As such, the optical fiber becomes less elongated, which causes the optical fiber to convey laser beam with a lower wavelength to one of the sample channels of the waveguide.

Referring back to FIG. 137B, subsequent to and/or in response to step/operation 13714, the example method 13700 proceeds to step/operation 13716. At step/operation 13716, a processing circuitry (for example but not limited to, the processing circuitry 13604 of the wavelength adjustment device 13602 described above in connection with FIG. 136) may extract the interference fringe pattern from the received test signal.

As described above in connection with FIG. 136, the imaging component 13620 may comprise an image sensing circuitry 13618 that detects interference fringe patterns from the output ends of sample channels, and generates test signals based on the detected interference fringe patterns. As described above in connection with step/operation 13714 of FIG. 137B, the compressor of the wavelength adjustment device may decrease the pressure exerted on the optical fiber that delivers laser beams to the sample channel of the waveguide. At step/operation 13716, the imaging component may detect the interference fringe pattern from the sample channel associated with the optical fiber on which the decreased pressure is exerted.

In some embodiments, the imaging component may generate a test signal that indicates the detected interference fringe pattern, and may transmit the test signal to the wavelength adjustment device. For example, the communications circuitry 13622 of the imaging component 13620 may transmit the test signal to the communications circuitry 13612 of the wavelength adjustment device 13602.

In some embodiments, the processing circuitry 13604 of the wavelength adjustment device 13602 may extract the interference fringe pattern from the test signal. As described above, the wavelength of the laser beam can affect the interference fringe pattern. As such, the interference fringe pattern extracted from the test signal is an indicator of the wavelength of the laser beams.

In some embodiments, the processing circuitry 13604 may further calculate the wavelength of the laser beam exit from the output end of the sample channel. For example, the processing circuitry 13604 may calculate the wavelength based on the extracted interference fringe, similar to those described above in connection with step/operation 13708.

Referring back to FIG. 137B, subsequent to and/or in response to step/operation 13716, the example method 13700 proceeds to step/operation 13718. At step/operation 13718, a processing circuitry (for example but not limited to, the processing circuitry 13604 of the wavelength adjustment device 13602 described above in connection with FIG. 136) may update a voltage correlation data object to indicate a data correlation between the voltage and the interference fringe pattern.

As described above, the data storage media 13610 of the wavelength adjustment device 13602 may store data and/or information. For example, the data storage media 13610 may store a voltage correlation data object that indicates a plurality of data correlations between the voltages applied to the compressor of the wavelength adjustment device and the interference fringe patterns from the output ends of the sample channels of the waveguide. As described above, when the voltage applied to the compressor of the wavelength adjustment device decreases, the pressure exerted on the optical fiber decreases, which in turn causes the optical fiber to shorten and the wavelength of the laser beam through the optical fiber to decrease. Because the interference fringe pattern is an indicator of the wavelength of the laser beams, the processing circuitry may determine a data correlation between the voltage applied to the compressor at step/operation 13714 and the interference fringe pattern extracted at step/operation 13716.

In some embodiments, the processing circuitry may update the voltage correlation data object stored in the data storage media 13610 by adding voltage value data according to the voltage applied to the compressor at step/operation 13714, adding interference fringe pattern data according to the interference fringe pattern extract at step/operation 13716, and adding a data correlation indicating an association between the voltage value data and the interference fringe pattern data.

As described above, the processing circuitry may calculate the wavelength of the laser beam exit from the sample channel. In some embodiments, the processing circuitry may update the voltage correlation data object stored in the data storage media 13610 by adding voltage value data according to the voltage applied to the compressor at step/operation 13714, adding wavelength value data calculated based on the interference fringe pattern extract at step/operation 13716, and adding a data correlation indicating an association between the voltage value data and the wavelength data.

Referring back to FIG. 137B, subsequent to and/or in response to step/operation 13718, the example method 13700 proceeds to step/operation 13720. At step/operation 13720, a processing circuitry (for example but not limited to, the processing circuitry 13604 of the wavelength adjustment device 13602 described above in connection with FIG. 136) may determine whether the voltage applied to the compressor of the wavelength adjustment device reaches the minimum voltage.

As described above, the variable power supply 13608 of the wavelength adjustment device 13602 may provide a range of voltages to the compressor of the wavelength adjustment device. In some embodiments, the processing circuitry 13604 of the wavelength adjustment device may determine whether the voltage applied to the compressor at step/operation 13706 reaches the minimum voltage.

If, at step/operation 13720, the processing circuitry determines that the applied voltage does not reach the minimum voltage, the example method 13700 returns to step/operation 13714. At step/operation 13714, the processing circuitry causes a decrease of voltage applied to the compressor of the wavelength adjustment device, similar to those described above.

If, at step/operation 13720, the processing circuitry determines that the applied voltage reaches the minimum voltage, the example method 13700 proceeds to step/operation 13722 and ends.

In some embodiments, the example method 13700 that is illustrated in FIG. 137A and FIG. 137B may be repeated to generate/update voltage correlation data objects for all the sample channels of the waveguide.

For example, if, at step/operation 13720, the processing circuitry determines that the applied voltage reaches the minimum voltage, the example method 13700 may proceed to determine voltage correlation data objects for all the sample channels of the waveguide have been generated/updated. If the processing circuitry determines that one of the sample channels is not associated with any of the voltage correlation data objects stored in the data storage media 13610, the example method 13700 may proceed with generating/updating a voltage correlation data object for that sample channel similar to those described above.

For example, if the voltage correlation data object does not include data correlations associated with a sample channel of the waveguide, the processing circuitry may cause an increase or decrease of voltage applied to the compressor of the wavelength adjustment device that is in contact with an optical fiber delivering laser beam to that sample channel (for example, based on step/operation 13706 and step/operation 13714), which in turn causes the optical fiber to elongate or contract. In some embodiments, the processing circuitry may extract interference fringe pattern from the corresponding sample channel, and generate/update the voltage correlation data object for that sample channel based on the voltage applied to the compressor and the interference fringe pattern (for example, based on step/operation 13710 and step/operation 13718). Additionally, or alternatively, the processing circuitry may calculate the wavelength of the laser beam based on the interference fringe pattern, and generate/update the voltage correlation data object for that sample channel based on the voltage applied to the compressor and the wavelength of the laser beam In some embodiments, the processing circuitry may repeat the example method 13700 to different sample channels of the waveguide by adjusting voltages applied to different compressors of the wavelength adjustment device and generating/updating the voltage correlation data objects for all sample channels of the waveguide. As such, when the wavelength adjustment device operates in the continuous wavelength sweeping mode, the wavelength adjustment device may generate/update voltage correlation data objects for the sample channels, and each voltage correlation data object indicates data colorations between (1) voltages applied to each compressor for each optical fiber that delivers a laser beam to the corresponding sample channel and (2) the corresponding interference fringe pattern data from the sample channel or the corresponding wavelength data of the laser beam exiting from the sample channel. In some embodiments, based on the voltage correlation data objects, the wavelength adjustment device may operate in a direct wavelength setting mode that sets the wavelength for laser beams in each sample channel, details of which are described herein.

Referring now to FIG. 138, the example method 13800 is illustrated. As described above, the example method 13800 illustrates an example where an example wavelength adjustment device operates in a direct wavelength setting mode. In wavelength setting mode, each channel is characterized to find required wavelength as triggered by the voltage applied on the compressor of the wavelength adjustment device. As such, the laser can then be set to each wavelength for each sample channel to have matching wavelengths or matching interference fringe pattern outputs. In some embodiments, the example method 13800 may be carried out prior to the sample solution being injected to any of the sample channels, so as to make sure that the baseline output from the sample channels are the same. In some embodiments, the synchronized baseline outputs can be directly used in the further analysis (e.g. after the sample solution is injected to the sample channels).

In the example shown in FIG. 138, the example method 13800 starts at step/operation 13802. In some embodiments, subsequent to step/operation 13802, the example method 13800 proceeds to step/operation 13804. At step/operation 13804, a processing circuitry (for example but not limited to, the processing circuitry 13604 of the wavelength adjustment device 13602 described above in connection with FIG. 136) may receive user input triggering direct wavelength setting mode.

For example, the user may provide user input through the input/output circuitry 13616 of the wavelength adjustment device 13602 described above in connection with FIG. 136. In some embodiments, the user input may indicate a request from the user to trigger the wavelength adjustment device to operate in the direct wavelength setting mode.

Referring back to FIG. 138, subsequent to and/or in response to step/operation 13804, the example method 13800 proceeds to step/operation 13806. At step/operation 13806, a processing circuitry (for example but not limited to, the processing circuitry 13604 of the wavelength adjustment device 13602 described above in connection with FIG. 136) may retrieve voltage correlation data objects associated with sample channels of the waveguide.

As described above, the data storage media 13610 of the wavelength adjustment device 13602 may store a plurality of voltage correlation data objects. For example, the processing circuitry 13604 of the wavelength adjustment device 13602 may generate/update the plurality of voltage correlation data objects based at least in part on the example method 13700 described above in connection with FIG. 137A and FIG. 137B, and may store the plurality of voltage correlation data objects in the data storage media 13610 of the wavelength adjustment device 13602.

Referring back to FIG. 138, subsequent to and/or in response to step/operation 13806, the example method 13800 returns back to step/operation 13808. At step/operation 13808, a processing circuitry (for example but not limited to, the processing circuitry 13604 of the wavelength adjustment device 13602 described above in connection with FIG. 136) may determine overlapping interference fringe pattern data among the voltage correlation data objects.

As described above, each of the voltage correlation data objects is associated with a sample channel of the waveguide, and indicates interference fringe pattern data associated with the sample channel (for example, triggered by different voltages applied to the corresponding compressor). In some embodiments, the processing circuitry may traverse interference fringe pattern data from different voltage correlation data objects associated with different sample channels, and select at least a part of the interference fringe pattern data as the overlapping interference fringe pattern data that is the same in different voltage correlation data objects associated with the different sample channels. For example, the processing circuitry may select an interference fringe pattern that is shared among the voltage correlation data objects, which may correlate to different voltage data in different voltage correlation data objects.

While the example described above illustrates an example of determining the overlapping interference fringe pattern data, it is noted that the scope of the present disclosure is not limited to the example above. As described above, each of the voltage correlation data objects may indicate wavelength data associated with a sample channel (for example, triggered by different voltages applied to the corresponding compressor). In some embodiments, the processing circuitry may traverse wavelength data from different voltage correlation data objects associated with different sample channels, and select at least a part of the wavelength data as overlapping wavelength data that is the same in different voltage correlation data objects associated with the different sample channels. For example, the processing circuitry may select a wavelength that is shared among the voltage correlation data objects, which may correlate to different voltage data in different voltage correlation data objects.

Referring back to FIG. 138, subsequent to and/or in response to step/operation 13808, the example method 13800 returns back to step/operation 13810. At step/operation 13810, a processing circuitry (for example but not limited to, the processing circuitry 13604 of the wavelength adjustment device 13602 described above in connection with FIG. 136) may determine voltages corresponding to the overlapping interference fringe pattern data.

As described above, each of the voltage correlation data objects comprises a plurality of data correlations between the voltage data and the interference fringe pattern data for a sample channel. In some embodiments, based on the data correlations, the processing circuitry may determine a voltage or voltage data that corresponds to the overlapping interference fringe pattern data for the sample channel. For example, the processing circuitry may determine a voltage applied to a compressor of the wavelength adjustment device that triggers the interference fringe pattern from a sample channel to match the one according to the overlapping interference fringe pattern data. The processing circuitry may reiterate the process for all sample channels of the waveguide, and determine a voltage applied to each compressor so that the interference fringe pattern from all sample channels match the one according to the overlapping interference fringe pattern data.

While the example described above illustrates an example of determining voltages corresponding to the overlapping interference fringe pattern data, it is noted that the scope of the present disclosure is not limited to the example above. As described above, an example method in accordance with various embodiments of the present disclosure may determine, additionally or alternatively, the overlapping wavelength data. In some embodiments, based on the data correlations of a voltage correlation data object associated with a sample channel, the processing circuitry may determine a voltage or voltage data that corresponds to the overlapping wavelength data for that sample channel. For example, the processing circuitry may determine a voltage applied to a compressor of the wavelength adjustment device that triggers the wavelength of a laser beam from a sample channel to match the one according to the overlapping wavelength data. The processing circuitry may reiterate the process for all sample channels of the waveguide, and determine a voltage applied to each compressor so that the wavelengths from all sample channels match the one according to the overlapping wavelength data.

Referring back to FIG. 138, subsequent to and/or in response to step/operation 13810, the example method 13800 returns back to step/operation 13812. At step/operation 13812, a processing circuitry (for example but not limited to, the processing circuitry 13604 of the wavelength adjustment device 13602 described above in connection with FIG. 136) may cause voltages determined at step/operation 13810 to be applied to compressors of the wavelength adjustment device As described above, the voltages determined at step/operation 13810 causes the interference fringe patterns from different sample channels to be the same, and/or the wavelengths of laser beams from different sample channels to be the same. As such, in the direct wavelength setting mode, the example wavelength adjustment device enables the sample channels in the waveguide to provide quantitative sensing with the highest sensitivity by removing common mode noise and drifting caused by sensor thermal, structural, optical and electrical uncertainties, thereby minimize errors in the sensing data and maximize the sensor speed.

Referring back to FIG. 138, subsequent to and/or in response to step/operation 13812, the example method 13800 proceeds to step/operation 13814 and ends.

Many virus detection assays use specific antibodies that are targeted for specific virus to perform virus detection. Such virus detection assays are plagued by many technical difficulties and challenges. For example, to detect multiple virus types or virus variants, multiple specimen collections and multiple antigen tests are required, which can limit the speed of multi-virus detection in the clinic application.

Various embodiments of the present disclosure overcome these technical challenges and difficulties, and may provide various technical advancements and improvements. For example, various embodiments of the present disclosure provides a testing method for multi-virus detection by utilizing bio-chemical fusion prepared with multiple samples, as well as by utilizing multiple antigens coated on the sample channels. The testing method can be performed with a virus sensor that only requires a reduced number of channels, and the virus type/virus variant can be detected in a single test with a single specimen collection.

Referring now to FIG. 140, an example method 14000 in accordance with various embodiments of the present disclosure is illustrated. In particular, the example method 14000 determines a sample type of a sample in the sample mixture in accordance with various embodiments of the present disclosure.

In the example shown in FIG. 140, the example method 14000 starts at step/operation 14002. Subsequent to and/or in response to step/operation 14002, the example method 14000 proceeds to step/operation 14004. At step/operation 14004, the example method 14000 may include producing a plurality of antibody mixtures using a plurality of sample antibody collections.

In accordance with various embodiments of the present disclosure, antibody mixtures (also referred to as antigen fusions) can be implemented by mixing several or many selected antibodies (also referred to as antigens) from a plurality of sample antibody collections. In some embodiments, each of the plurality of sample antibody collections may comprise antibodies for a particular type/variant of virus that is the example method 14000 is implemented to detect. For example, if the example method 14000 is implemented to detect virus type A, virus type B, and virus type C, the example method 14000 may comprise producing a first sample antibody collection comprising antibodies for detecting virus type A, a second sample antibody collection comprising antibodies for detecting virus type B, and a third sample antibody collection comprising antibodies for detecting virus type C.

In some embodiments, the example method 14000 may determine a total number n of antibody mixtures to be produced at step/operation 14004. In some embodiments, the total number n of antibody mixtures is the same as the total number n of the sample channels. For example, if the example waveguide comprises four sample channels, the example method 14000 produces four antibody mixtures.

In some embodiments, the example method 14000 may determine a total number m of sample antibody collections for producing the antibody mixtures. As an example, when a total number of sample channels (or a total number of antibody mixtures) is n, the total number m of sample antibody collections is determined based on $m=2^n-1$. For example, if there are two sample channels, then three antibody collections are needed to produce antibody mixtures. If there are three sample channels, then seven antibody collections are needed to produce antibody mixtures. If there are four sample channels, then fifteen antibody collections are needed to produce antibody mixtures.

In some embodiments, to produce a total of n antibody mixtures to be coated on a total of n sample channels from a total of m different antibody collections, the example method 14000 may determine different combinations of antibody mixtures (in other words, different combinations of sample channels), and add antibodies from each of antibody collections to one of the combinations of antibody mixtures. For example, antibodies from each one of the m different antibody collections may be added to one of the n antibody mixtures, two of the n antibody mixtures, . . . , or n of the n antibody mixtures. In this example, antibodies from each antibody collection are added to a different combination of antibody mixtures as compared to a combination of antibody mixture(s) to which other antibodies from other antibody collections are added. In other words, antibodies from different antibody collections are added to different combinations of antibody mixtures, such that no two antibody collections are added to the same combination of antibody mixtures, similar to various examples described herein in connection with FIG. 122.

As an example, if a sample testing device comprises four sample channels (for example, sample channel 1, sample channel 2, sample channel 3, and sample channel 4), then a total of 15 antibody collections are needed to produce the antibody mixtures (for example, antibody collections A, B, C, D, E, F, G, H, I, J, K, L, M, N, O) to produce antibody mixtures for the four sample channels (for example, antibody mixture 1, antibody mixture 2, antibody mixture 3, and antibody mixture 4). The table below illustrates an example of antibodies from different antibody collections in each antibody mixture:

| Antibody Mixture | Antibody Mixtures | | | | | | | | | | | | | | |
| --- | --- | --- | --- | --- | --- | --- | --- | --- | --- | --- | --- | --- | --- | --- | --- |
|  | A | B | C | D | E | F | G | H | I | J | K | L | M | N | O |
| 1 | X |   |   |   | X | X | X |   |   |   |   | X | X | X | X |
| 2 |   | X |   | X |   |   | X | X |   | X |   |   | X | X | X |
| 3 |   |   | X |   | X |   | X |   | X | X | X |   | X | X |   |
| 4 |   |   |   | X |   |   |   | X |   | X | X | X | X |   | X |

Referring back to FIG. 140, subsequent to and/or in response to step/operation 14004, the example method 14000 proceeds to step/operation 14006. At step/operation 14006, the example method 14000 may include coating the plurality of sample channels with the plurality of antibody mixtures.

In some embodiments, a sample testing device may comprise a waveguide that includes a plurality of sample channels, similar to various examples described herein. Before conducting a test using the sample testing device, sample channels of the waveguide are coated with antibody mixtures (also referred to as antigen mixtures) in a predetermined sequence. In some embodiments, each of the plurality of sample channels is coated with an unique antibody mixture, and no two sample channels are coated with the same antibody mixture.

In some embodiments, to coat an antibody mixture to a sample channel, the example method 14000 may include applying the antibody mixture to a surface of the sample channel (for example, on a bottom surface of the sample channel). Continuing from the example above, the example method 14000 may coat antibody mixture 1 on the surface of sample channel 1, antibody mixture 2 on the surface of sample channel 2, antibody mixture 3 on the surface of sample channel 3, and antibody mixture 4 on the surface of sample channel 4.

Referring back to FIG. 140, subsequent to and/or in response to step/operation 14006, the example method 14000 proceeds to step/operation 14008. At step/operation 14008, the example method 14000 may include coating at least one positive reference channel with at least one reference binding substance.

In some embodiments, the at least one reference binding substance may comprise substances that cause a reference substance to bind with the at least one reference binding substance. For example, the at least one reference binding substance may attract and draw the reference substance toward the at least one reference binding substance. As an example, the reference substance may be in the form of a type or variation of virus, and the at least one reference binding substance may comprise antibodies for that particular type or variation of virus.

While the description above provides an example of using viruses as the reference substance and virus antibodies as the reference binding substance, it is noted that the scope of the present disclosure is not limited to the description above. In some examples, an example reference substance and/or reference binding substance may comprise other molecules, chemicals, substances.

In some embodiments, the waveguide of the sample testing device may comprise at least one positive reference channel in addition to the sample channels, and the at least one reference binding substance may be coated on the surface of the at least one positive reference channel. As an example, the waveguide of the sample testing device may comprise two positive reference channels, and each of the two positive reference channels may be coated with the same or different reference binding substances.

Referring back to FIG. 140, subsequent to and/or in response to step/operation 14008, the example method 14000 proceeds to step/operation 14010. At step/operation 14010, the example method 14000 may include producing a sample mixture using a reference substance and a sample substance.

As described above, the reference substance may bind with the reference binding substance that is coated on the positive reference channel. For example, the reference substance may comprise a known virus or a well-controlled virus surrogate, and the surface of the positive reference channel may be coated with antibodies for that known virus or the well-controlled virus surrogate.

In some embodiments, the sample substance may comprise samples that the example method 14000 determines the sample types for. For example, the sample substance may comprise an unknown virus or unknown specimen, and the example method 14000 may determine the type of the unknown virus or the unknown specimen.

As such, at step/operation 14010, the example method 14000 may create a sample mixture (e.g. a sample fusion) by mixing the sample substance (e.g. specimen) with one or more reference substances (e.g. well-controlled virus surrogates) as binding references in the test, details of which are described herein.

Referring back to FIG. 140, subsequent to and/or in response to step/operation 14010, the example method 14000 proceeds to step/operation 14012. At step/operation 14012, the example method 14000 may include injecting the sample mixture into the plurality of sample channels and the at least one positive reference channel of the waveguide.

In some embodiments, the sample mixture that is produced at step/operation 14010 is injected to all channels of the waveguide simultaneously. For example, the sample mixture is injected into the sample channels of the waveguide (that has been coated with the plurality of antibody mixtures at step/operation 14006), as well as into the at least one positive reference channel (that has been coated with the at least one reference binding substance at step/operation 14008).

Referring back to FIG. 140, subsequent to and/or in response to step/operation 14012, the example method 14000 proceeds to step/operation 14014. At step/operation 14014, the example method 14000 may include receiving a plurality of test signals from the plurality of sample channels and at least one reference signal from the at least one positive reference channel.

In some embodiments, laser beams may be emitted through the plurality of sample channels and the at least one positive reference channel of the waveguide to generate test signals, similar to those described above. For example, the waveguide may be in the form of a bimodal waveguide that creates interference fringe patterns as the laser beams travel through channels of the waveguide, and an imaging component may detect the interference fringe patterns. In some embodiments, after the sample mixture is injected to the plurality of sample channels and the at least one positive reference channel, interference fringe patterns from one or more of these channels may change, and the imaging component may generate test signals based on the detected interference fringe patterns.

Referring back to FIG. 140, subsequent to step/operation 14014, the example method 14000 proceeds to step/operation 14016. At step/operation 14016, the example method 14000 may include determining a sample type from a plurality of sample types that is associated with the sample substance.

In some embodiments, test signals from the sample channels may be normalized based on the at least one reference signal from the at least one positive reference channel. As described above, the sample mixture comprises a reference substance, and the at least one positive reference channel is coated with at least one reference binding substance that binds with the reference substance. As such, the at least one reference signal from the at least one positive reference channel provides a benchmark signal that indicates when the sample mixture comprises the sample type that one of the antibodies coated on the channel is targeted for. In some embodiments, each of the test signals from the sample channels may be compared with the at least one reference signal to determine whether it provides a positive indication, details of which are described in connection with at least FIG. 142A to FIG. 142B herein.

Referring back to step/operation 14016, the example method 14000 proceeds to step/operation 14018 and ends.

In accordance with some embodiments of the present disclosure, an example method for determining the sample type of a sample may be carried out by an example sample type determination device that includes one or more computing systems, such as the sample type determination device 14100 shown in FIG. 141. The sample type determination device 14100 may include a processor 14101, a memory 14103, a communications circuitry 14105, an input/output circuitry 14107, and/or a display 14109. The sample type determination device 14100 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

As described above, the term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the sample type determination device 14100 may provide or supplement the functionality of particular circuitry. For example, the processor 14101 may provide processing functionality, the memory 14103 may provide storage functionality, the communications circuitry 14105 may provide network interface functionality, and the like.

In some embodiments, the processor 14101 (and/or co-processor or any other processing circuitry assisting or otherwise associated with the processor) may be in communication with the memory 14103 via a bus for passing information among components of the apparatus. The memory 14103 may be non-transitory and may include, for example, one or more volatile and/or non-volatile memories. In other words, for example, the memory 14103 may be an electronic storage device (e.g., a computer readable storage medium). The memory 14103 may be configured to store information, data, content, applications, instructions, or the like, for enabling the sample type determination device 14100 to carry out various functions in accordance with example embodiments of the present disclosure.

The processor 14101 may be embodied in a number of different ways and may, for example, include one or more processing devices configured to perform independently. Additionally, or alternatively, the processor 14101 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 14101 may be configured to execute instructions stored in the memory 14103 or otherwise accessible to the processor. Alternatively, or additionally, the processor 14101 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 14101 is embodied as an executor of software instructions, the instructions may specifically configure the processor to perform the algorithms and/or operations described herein when the instructions are executed.

In some embodiments, the sample type determination device 14100 may include the input/output circuitry 14107 that may, in turn, be in communication with the processor 14101 to provide output to the user and, in some embodiments, to receive an indication of a user input. The input/output circuitry 14107 may comprise an interface, a mobile application, a kiosk, or the like. In some embodiments, the input/output circuitry 14107 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 14103, and/or the like).

In some embodiments, the sample type determination device 14100 may include the display 14109 that may, in turn, be in communication with the processor 14101 to display user interface renderings. In various examples of the present disclosure, the display 14109 may include a liquid crystal display (LCD), a light-emitting diode (LED) display, a plasma (PDP) display, a quantum dot (QLED) display, and/or the like.

The communications circuitry 14105 may be any means such as a device or circuitry embodied in either hardware or a combination of hardware and software that is configured to receive and/or transmit data from/to a network and/or any other device, circuitry, or module in communication with the sample type determination device 14100. In this regard, the communications circuitry 14105 may include, for example, a network interface for enabling communications with a wired or wireless communication network. For example, the communications circuitry 14105 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of sample type determination device 14100. In some embodiments, one or more external systems (such as a remote cloud computing and/or data storage system) may also be leveraged to provide at least some of the functionality discussed herein.

Various methods described herein, including, for example, the example method 14200 as shown in FIG. 142A to FIG. 142B, may determine a sample type associated with a sample from a plurality of sample types.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 142A to FIG. 142B may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

FIG. 142A and FIG. 142B illustrate an example method of determining a sample type of a sample in the sample mixture in accordance with various embodiments of the present disclosure.

Referring now to FIG. 142A, the example method 14200 starts at step/operation 14202. Subsequent to and/or in response to step/operation 14202, the example method 14200 proceeds to step/operation 14204. At step/operation 14204, a processing circuitry (for example but not limited to, the processor 14101 of the sample type determination device 14100 described above in connection with FIG. 141) may receive a plurality of test signals associated with a plurality of sample channels and at least one reference signal from at least one reference channel.

For example, similar to those described above, an imaging component may generate the plurality of test signals based on the interference fringe patterns detected from the output ends of the sample channels of the waveguide, and generate the at least one reference signal from the output end of at least one reference channel of the waveguide.

As described above, if the surface of a channel is coated with antibodies for a particular type/variant of virus, and the sample substance comprises that particular type/variant of virus, the antibodies causes the virus in the sample substance to bind to the surface of the channel, which creates changes in the interference fringe pattern from that channel. For example, the magnitude of the interference fringe pattern may increase (e.g. the interference fringe pattern may shift upwards). In some embodiments, an imaging component may detect the interference fringe pattern. In some embodiments, the imaging component may generate a test signal based on the interference fringe pattern if the interference fringe pattern is from a sample channel. In some embodiments, the imaging component may generate a reference signal based on the interference fringe pattern if the interference fringe pattern is from a positive reference channel. For example, the signal magnitude of the test signal or the reference signal may correspond to the magnitude of the interference fringe pattern from the sample channel or the positive reference channel, respectively.

In some embodiments, an imaging component may generate a plurality of test signals based on interference fringe patterns from a plurality of sample channels and at least one reference signal based on at least one interference fringe pattern from at least one reference channel. In some embodiments, the imaging component may transmit the plurality of test signals and the at least one reference signal to the sample type determination device.

Referring back to FIG. 142A, subsequent to and/or in response to step/operation 14204, the example method 14200 proceeds to step/operation 14206. At step/operation 14206, a processing circuitry (for example but not limited to, the processor 14101 of the sample type determination device 14100 described above in connection with FIG. 141) may record the at least one reference signal as at least one positive indication benchmark.

As described above, the sample mixture comprises at least one reference substance, and the at least one positive reference channel is coated with at least one reference binding substance that binds or attracts the at least one reference substance. For example, the reference substance in the sample mixture may be in the form of a type or variation of virus, and the at least one reference binding substance may comprise antibodies for that particular type or variation of virus. As such, the reference signal from the at least one positive reference channel corresponds to a signal indicating that the surface of the channel is coated with antibodies for the type or variation of virus contained in the sample mixture.

In some embodiments, the processing circuitry may record the at least one reference signal as at least one positive indication benchmark. For example, the processing circuitry may record the magnitude of the at least one reference signal as a positive benchmark magnitude. In such an example, if the magnitude of a test signal from another sample channel is the same or more than the magnitude of the at least one reference signal, the test signal indicates that the sample channel is coated with antibodies for the type/variation of virus that is contained in the sample mixture.

Referring back to FIG. 142A, subsequent to and/or in response to step/operation 14204, the example method 14200 proceeds to block A, which connects FIG. 124A to FIG. 142B. As shown in FIG. 142B, subsequent to and/or in response to block A (for example, subsequent to and/or in response to step/operation 14206, the example method 14200 proceeds to step/operation 14208. At step/operation 14208, a processing circuitry (for example but not limited to, the processor 14101 of the sample type determination device 14100 described above in connection with FIG. 141) may determine whether a test signal from a sample channel provides a positive indication according to the positive indication benchmark.

As described above, the example method 14200 may record the at least one reference signal from the positive reference channel as at least one positive indication benchmark. For example, the at least one reference signal may be associated with a signal magnitude that corresponds to the magnitude of the interference fringe pattern.

In some embodiments, to determine whether a test signal from a sample channel provides a positive indication, the processing circuitry may compare the test signal with the at least one reference signal. For example, the processing circuitry may compare the signal magnitude between the test signal and the at least one reference signal.

If the signal magnitude of a test signal from a sample channel reaches or is higher than the signal magnitude of the at least one reference signal from the at least one positive reference channel, the processing circuitry may determine that the test signal provides a positive indication. In such an example, the test signal indicates that the sample channel is coated with antibodies that binds with viruses in the sample substance in the sample mixture. The higher the signal magnitude of the test signal as compared to that of the signal magnitude of the reference signal, the more confident that the test signal provides a positive indication.

If the signal magnitude is lower than the signal magnitude of the at least one reference signal from the at least one positive reference channel, the processing circuitry may determine that the test signal does not provide a positive indication. In such an example, the test signal indicates that the sample channel is not coated with antibodies that would bind with viruses in the sample substance in the sample mixture. The lower the signal magnitude of the test signal as compared to that of the signal magnitude of the reference signal, the more confident that the test signal does not provide a positive indication.

Referring back to FIG. 142B, if, at step/operation 14208, the example method 14200 determines that the test signal provides a positive indication according to the positive benchmark, the example method 14200 proceeds to step/operation 14210. At step/operation 14210, a processing circuitry (for example but not limited to, the processor 14101 of the sample type determination device 14100 described above in connection with FIG. 141) may generate a candidate data set that comprises sample types associated with the antibody mixture coated on the sample channel.

For example, a sample channel may be coated with antibody mixture that comprises antibodies for virus types A, E, F, G, L, M, N, and O. If the test signal from the sample channel provides a positive indication, it shows that the sample substance in the sample mixture may comprise type A virus, type E virus, type F virus, type G virus, type L virus, type M virus, type N virus, or type O virus. In such an example, the processing circuitry may generate a candidate data set that comprises sample type A, type E, type F, type G, type L, type M, type N, and type O.

Referring back to FIG. 142B, if, at step/operation 14208, the example method 14200 determines that the test signal does not provide a positive indication according to the positive benchmark, the example method 14200 proceeds to step/operation 14212. At step/operation 14212, a processing circuitry (for example but not limited to, the processor 14101 of the sample type determination device 14100 described above in connection with FIG. 141) may generate an elimination data set comprising sample types associated with antibody mixture coated on the sample channel.

For example, a sample channel may be coated with antibody mixture that comprises antibodies for virus types A, E, F, G, L, M, N, and O. If the test signal from the sample channel does not provide a positive indication, it shows that the sample substance in the sample mixture does not comprise type A virus, type E virus, type F virus, type G virus, type L virus, type M virus, type N virus, and type O virus. In such an example, the processing circuitry may generate an elimination data set that comprises sample type A, type E, type F, type G, type L, type M, type N, and type O.

Referring back to FIG. 142B, subsequent to and/or in response to step/operation 14210 and step/operation 14212, the example method 14200 proceeds to step/operation 14214. At step/operation 14214, a processing circuitry (for example but not limited to, the processor 14101 of the sample type determination device 14100 described above in connection with FIG. 141) may determine whether test signals from all sample channels are examined.

For example, the processing circuitry may determine whether test signals from each sample channel of the waveguide have been examined to determine whether it provides a positive indication, similar to those described above in connection with step/operation 14208.

If, at step/operation 14214, the processing circuitry determines that at least one test signal from at least one sample channel has not been examined, the example method 14200 proceeds to step/operation 14208. In such an example, the processing circuitry may determine whether the at least one test signal provides a positive indication, similar to those described above.

If, at step/operation 14214, the processing circuitry determines that all test signals from all sample channels have been examined, the example method 14200 proceeds to step/operation 14216. At step/operation 14216, a processing circuitry (for example but not limited to, the processor 14101 of the sample type determination device 14100 described above in connection with FIG. 141) may determine that the sample substance is associated with a sample type that is in each candidate data set and not in any elimination data set.

As described above, the processing circuitry may add sample types to the candidate data set or the elimination data set based on whether the test signal provides a positive indication. As an example, an example waveguide may comprise four sample channels that are coated with different combinations of antibodies as shown in the table below:

| Sample Channel | A | B | C | D | E | F | G | H | I | J | K | L | M | N | O |
|---|---|---|---|---|---|---|---|---|---|---|---|---|---|---|---|
| 1 | X |   |   |   | X | X | X |   |   |   |   | X | X | X | X |
| 2 |   | X |   |   | X |   |   | X | X |   | X |   | X | X | X |
| 3 |   |   | X |   |   | X |   | X |   | X | X | X |   | X | X |
| 4 |   |   |   | X |   |   | X |   | X | X | X | X | X |   | X |

As an example, the processing circuitry may determine that the test signal from Sample Channel 1 provides a positive indication. In this example, the processing circuitry may generate a first candidate data set that comprises type A, type E, type F, type G, type L, type M, type N, and type O.

Continuing in this example, the processing circuitry may determine that the test signal from the Sample Channel 2 does not provide a positive indication. In this example, the processing circuitry may generate a first elimination data set that comprises type B, type E, type H, type I, type K, type M, type N, and type O.

Continuing in this example, the processing circuitry may determine that the test signal from the Sample Channel 3 does not provide a positive indication. In this example, the processing circuitry may generate a second elimination data set that comprises type C, type F, type H, type J, type K, type L, type N, and type O.

Continuing in this example, the processing circuitry may determine that the test signal from the Sample Channel 4 provides a positive indication. In this example, the processing circuitry may generate a second candidate data set that comprises type D, type G, type I, type J, type K, type L, type M, and type O.

In some embodiments, the processing circuitry may compare sample types in the first candidate data set and the second candidate data set, and determine one or more overlapping sample types in the first candidate data set and the second candidate data set. If a sample type is not in both the first candidate data set and the second candidate data set, then the sample type is not associated with the sample substance as the sample type associated with the sample substance must be each candidate data set. In the above example, the first candidate data set comprises type A, type E, type F, type G, type L, type M, type N, and type O, and the second candidate data set comprises type D, type G, type I, type J, type K, type L, type M, and type O. The processing circuitry may determine that the overlapping sample types between the first candidate data set and the second candidate data set include type G, type M, and type O.

As described above, the sample type associated with the sample substance is not in any elimination data set. In some embodiments, the processing circuitry may compare overlapping sample types in the candidate data sets with the sample types in the elimination data sets, and remove any overlapping sample types that are also in the elimination data sets. Continuing from the example above, the example processing circuitry may determine that type M and type O are in the first elimination data set, and may determine that the sample substance is not associated with either type M or type O. As such, the processing circuitry may determine that the sample type associated with the sample substance is type G.

Referring back to FIG. 142B, subsequent to and/or in response to step/operation 14216, the example method 14200 proceeds to step/operation 14218 and ends.

Referring now to FIG. 143A and FIG. 143B, example views associated with an example waveguide 14300 is illustrated. In particular, FIG. 143A illustrates an example perspective view of the example waveguide 14300 in accordance with various embodiments of the present disclosure. FIG. 143B illustrates an example zoomed view of at least a portion of the example waveguide 14300 in accordance with various embodiments of the present disclosure.

In the example shown in FIG. 143A, the example waveguide 14300 may define a plurality of channels 14301 on a waveguide 14303. In some embodiments, the plurality of channels 14301 may comprise a plurality of sample channels and one or more reference channels, details of which as illustrated in FIG. 143B.

Referring now to FIG. 143B, an example zoomed view of at least a portion of the example waveguide 14300 is illustrated.

In some embodiments, the example waveguide 14300 may comprise a total eight channels, including two binding reference channels, four sample channels, and two buried reference channels. In the example shown in FIG. 143B, the example waveguide 14300 may comprise channels that are arranged in the following order: a binding reference channel 14305A, a sample channel 14307A, a buried reference channel 14309A, a sample channel 14307B, a sample channel 14307C, a buried reference channel 14309B, a sample channel 14307D and a binding reference channel 14305B.

In some embodiments, each of the sample channel 14307A, sample channel 14307B, sample channel 14307C, and sample channel 14307D may be coated with a sample mixture, similar to those described above.

In some embodiments, the binding reference channel 14305A and the binding reference channel 14305B may comprise positive reference channel(s) and/or negative reference channel(s). For example, one or both of the binding reference channel 14305A and the binding reference channel 14305B may be positive reference channel(s) that are coated with at least one reference binding substance, similar to those described above. Additionally, or alternatively, one or both of the binding reference channel 14305A and the binding reference channel 14305B may be negative reference channel(s).

In such an example, a negative reference channel may be coated with substances that do not bind or attract any substance from the sample mixture. For example, the binding reference channel 14305A and the binding reference channel 14305B may be coated with water. Because the substances coated on the negative reference channel do not bind or attract any substance from the sample mixture, the reference signal from the negative reference channel corresponds to a signal indicating that the surface of the channel is not coated with any antibodies for the type or variation of virus contained in the sample mixture. In some embodiments, the processing circuitry may record the magnitude of the reference signal from the negative reference channel as a negative benchmark magnitude. In such an example, if the magnitude of a test signal from another sample channel reaches or is lower than the magnitude of the at least one reference signal from the negative reference channel, the test signal indicates that the sample channel is not coated with antibodies for any virus that is contained in the sample mixture. In some embodiments, the processing circuitry may record the signal from the at least one reference signal from the negative reference channel as at least one negative indication benchmark.

In some embodiments, the reference signal from the negative reference channel may be used as a negative benchmark for test signals from the sample channels. For example, in addition to or in alternative of those described above in connection with step/operation 14208 of FIG. 142B, the processing circuitry may determine whether the test signal provides a negative indication according to the negative indication benchmark.

If the signal magnitude of a test signal from a sample channel is at or lower than the signal magnitude of the at least one reference signal from the negative reference channel, the processing circuitry may determine that the test signal provides a negative indication. In such an example, the test signal indicates that the sample channel is not coated with antibodies that binds with viruses in the sample substance in the sample mixture, and the processing circuitry may generate an elimination data set comprising sample types associated with antibody mixture coated on the sample channel, similar to those described above in connection with at least step/operation 14212. The lower the signal magnitude of the test signal as compared to that of the signal magnitude of the reference signal, the more confident that the test signal provides a negative indication.

If the signal magnitude is higher than the signal magnitude of the at least one reference signal from the negative reference channel, the processing circuitry may determine that the test signal provides a positive indication. In such an example, the test signal indicates that the sample channel is coated with antibodies that would bind with viruses in the sample substance in the sample mixture, and the processing circuitry may generate a candidate data set comprising sample types associated with antibody mixture coated on the sample channel, similar to those described above in connection with step/operation 14210. The higher the signal magnitude of the test signal as compared to that of the signal magnitude of the reference signal, the more confident that the test signal provides a positive indication.

In some embodiments, the buried reference channel 14309A and the buried reference channel 14309B may be sealed and contain the same or different reference mediums, similar to those described above. In some embodiments, the buried reference channel 14309A and the buried reference channel 14309B may provide buried sensing regions that can be added to provide absolute reference to compensate for the sensor signal variations with signals from the ambient environment, similar to those described above.

As such, in the example shown in FIG. 143B, the test signals from the sample channel 14307A, the sample channel 14307B, the sample channel 14307C, and the sample channel 14307D may be compensated based on the signals from the buried reference channels to eliminate signal noise caused by the ambient environment, and may be normalized according to the positive indication benchmark and/or the negative indication benchmark so as to determine whether the test signal provides a positive indication or a negative indication.

As such, various embodiments of the present disclosure may overcome technical challenges and difficulties associated with waveguides. For example, various embodiments of the present disclosure provide sample specimens with controlled binding reference fusion, where patient sample specimen is mixed with one or more well controlled virus surrogates for binding references. Various embodiments of the present disclosure may provide antigen combination fusion, where several or many antigen types combinations are determined for multi-virus immobilization and are sequentially applied to the sensing channels. Various embodiments of the present disclosure provide a multichannel virus sensor, where as few as 8 channels can detect up to 15 types of virus with test environment compensation and binding quantification with noise cancellation. As such, various embodiments of the present disclosure provide multi-virus sensing mechanisms that allow simultaneous multi-virus detection in a single specimen collection.

In various examples, a multichannel viral sensor requires a uniform flow in all channels. However, many parallel channels cannot provide uniform flow due to the variations between channels.

Various embodiments of the present disclosure may provide a sample testing device that provides a serial flow of sample solution through a single injection that solves the flow uniformity problem. In some embodiments, the single injection of serial flow can simplify the flow system in the sample testing device and provide various technical benefits and advancements. For example, a reduced channel volume of the sample testing device can minimize the detection delay between channels to allow real-time multichannel detection and processing.

Referring now to FIG. 144A, FIG. 144B, FIG. 144C, FIG. 144D, FIG. 144E, FIG. 144F, and FIG. 144G, example views of an example waveguide cartridge 14400 in accordance with various embodiments of the present disclosure are provided. The example waveguide cartridge 14400 may provide a multichannel interferometric viral sensor with a serial flow from a single injection.

In particular, FIG. 144A and FIG. 144B illustrate example exploded views of the example waveguide cartridge 14400.

In the example shown in FIG. 144A, the example waveguide cartridge 14400 may comprise a fluidic body 14414 that defines a buffer reservoir 14408, an injection port 14410, and a waste reservoir 14412, similar to those described above in connection with FIG. 86A.

In some embodiments, the buffer reservoir 14408 may be in the form of a sunken area on the top surface of the fluidic body 14414 where a buffer solution may be stored. For example, as part of assembling the example waveguide cartridge 14400, buffer solutions are filled into the buffer reservoir 14408. Examples of buffer solution may include, but are not limited to, water.

In some embodiments, the waveguide cartridge 14400 comprises a pump membrane 14406. In some embodiments, the pump membrane 14406 is aligned to cover the top opening of the buffer reservoir 14408. For example, the pump membrane 14406 and the buffer reservoir 14408 may define a space for storing the buffer solution.

In some embodiments, the pump membrane 14406 may comprise flexible material such as, but not limited to, silicone. In some embodiments, when a force is exerted on the pump membrane 14406, the pump membrane 14406 may be deformed. For example, as described in detail herein, the buffer reservoir 14408 may define a buffer release tunnel on the bottom surface of the buffer reservoir 14408. As described above, the pump membrane 14406 may be aligned to cover the top opening of the buffer reservoir 14408. When a downward force is exerted on the pump membrane 14406 and towards the buffer reservoir 14408, the pump membrane 14406 may deform, which pushed the buffer solution stored in the buffer reservoir 14408 to be release through the buffer release tunnel on the bottom surface of the buffer reservoir 14408.

As described in further details herein, the buffer release tunnel may be connected to a beginning of a serial flow channel that is defined on the bottom surface of the fluidic body 14414. As such, by pushing the pump membrane 14406, buffer solutions may be released into the serial flow channel, details of which are described herein.

In some embodiments, the injection port 14410 may be in the form of a sunken area on the top surface of the fluidic body 14414. In some embodiments, a sample solution can be injected into the waveguide cartridge 14400 through the injection port 14410.

For example, the waveguide cartridge 14400 comprises an injection septum 14404. In some embodiments, the injection septum 14404 is aligned to cover the top opening of the injection port 14410. In some embodiments, the injection septum 14404 may comprise flexible material such as, but not limited to, silicone.

In some embodiments, the injection septum 14404 may define a passageway that is connected to the space defined by the injection port 14410. In some embodiments, an outer opening of the central passageway is covered by a cover. In some embodiments, a syringe device (or other suitable device) that stores sample solution may pierce through the cover, and inject the sample solution into the injection port 14410 through the central passageway.

In some embodiments, the injection port 14410 may define a sample release tunnel on the bottom surface of the injection port 14410. In some embodiments, the passageway defined by the injection septum 14404 is connected to the sample release tunnel. When a sample solution is injected into the injection port 14410 through the injection septum 14404, the sample solution is released through the sample release tunnel on the bottom surface of the buffer reservoir 14408.

As described in further details herein, the sample release tunnel may be connected to a serial flow channel that is defined on the bottom surface of the fluidic body 14414. As such, sample solutions may be released into the serial flow channel through the sample release tunnel of the injection port 14410, details of which are described herein.

In some embodiments, the waste reservoir 14412 may be in the form of a sunken area on the top surface of the fluidic body 14414. In some embodiments, the waste reservoir 14412 may define a waste release tunnel on the bottom surface of the waste reservoir 14412. In some embodiments, the waste release tunnel is connected to the end of the serial flow channel defined on the bottom surface of the fluidic body 14414, and may receive waste solution (for example, buffer solution and/or sample solution after they travel through the serial flow channel). In some embodiments, waste solution may be stored in the waste reservoir 14412.

In some embodiments, the waveguide cartridge 14400 comprises an exhausting filter 14402. In some embodiments, the exhausting filter 14402 is aligned to cover the top opening of the waste reservoir 14412. In some embodiments, the exhausting filter 14402 may comprise filtering material such as, but not limited to, HEPA air filters that prevents harmful particles in the waste solution from being released into the environment.

As shown in FIG. 144A, the fluidic body 14414 is positioned on a waveguide sensor 14416 that defines a plurality of channels (for example, a sample channel that is positioned between two reference channels). In some embodiments, portions of the serial flow channel defined on the bottom surface of the fluidic body 14414 are aligned with channels on the waveguide sensor 14416. For example, as shown in FIG. 144B, an example serial flow channel 14418 is defined on the bottom surface of the fluidic body 14414.

In some embodiments, the example serial flow channel 14418 may be in the form of a groove on the bottom surface of the fluidic body 14414. The groove may comprise a plurality of connected sections, including a sample section, a serial flow channel section, and a pre-wash section, details of which are described herein. In some embodiments, the serial flow channel section may define three parallel grooves that are connected and align with the three channels (e.g. a sample channel and two reference channels) on the waveguide sensor 14416, details of which are described herein.

Referring now to FIG. 144C, an example top view of the example waveguide cartridge 14400 is illustrated. In some embodiments, the example waveguide cartridge 14400 may have a width W of 10 millimeters. In some embodiments, the example waveguide cartridge 14400 may have a length L of 32 millimeters.

Referring now to FIG. 144C, an example side view of the example waveguide cartridge 14400 is illustrated. In some embodiments, the example waveguide cartridge 14400 may have a thickness T of 6 millimeters.

Referring now to FIG. 144D, an example top view of the example waveguide cartridge 14400 is illustrated. In particular, FIG. 144D illustrates that the waveguide sensor 14416 is aligned with the serial flow channel defined on the bottom surface of the fluidic body 14414.

Referring now to FIG. 144F, an example perspective view of the example waveguide cartridge 14400 is illustrated. In particular, FIG. 144F illustrates that the pump membrane 14406 is aligned to cover the buffer reservoir 14408, the injection septum 14404 is aligned to cover the injection port 14410, and the exhausting filter 14402 is aligned to cover the waste reservoir 14412.

Referring now to FIG. 144G, an example left view of the example waveguide cartridge 14400 is illustrated.

Referring now to FIG. 145A, FIG. 145B, FIG. 145C, FIG. 145D, FIG. 145E, and FIG. 145F, example views of an example cartridge body 14500 in accordance with various embodiments of the present disclosure are provided.

In particular, FIG. 145A illustrates an example top view of the example cartridge body 14500. FIG. 145B illustrates an example bottom view of the example cartridge body

14500. FIG. 145C illustrates an example cross section view of the example cartridge body 14500.

In the example shown in FIG. 145A, the example cartridge body 14500 may comprise a buffer reservoir 14505, an injection port 14503, and a waste reservoir 14501, similar to the buffer reservoir 14408, the injection port 14410, and the waste reservoir 14412 described above in connection with FIG. 144A.

In some embodiments, the buffer reservoir 14505 may define an opening of a buffer release tunnel 14511 on the bottom surface of the buffer reservoir 14505. Similarly, the injection port 14503 may define an opening of a sample release tunnel 14509 on the bottom surface of the injection port 14503. Similarly, the waste reservoir 14412 may define an opening of a waste release tunnel 14507 on the bottom surface of the waste reservoir 14412.

Referring now to FIG. 145B, a serial flow channel 14513 defined on the bottom surface of the example cartridge body 14500 is illustrated. In the example shown in FIG. 145B, the buffer release tunnel 14511, the sample release tunnel 14509, and the waste release tunnel 14507 are connected to the serial flow channel 14513.

As described above, the serial flow channel 14513 may comprise a plurality of sections. For example, the serial flow channel 14513 may comprise a sample section 14515, a pre-wash section 14517, and a serial flow section 14519. In some embodiments, the sample section 14515 is connected to the pre-wash section 14517, which in turn is connected to the serial flow section 14519. For example, a fluid may flow from the sample section 14515, to the pre-wash section 14517, and then to the serial flow section 14519.

In some embodiments, the buffer release tunnel 14511 is connected to a beginning point of sample section 14515 of the serial flow channel 14513. As such, when the buffer solution (such as water) is released from the buffer release tunnel 14511, the buffer solution may flow from the sample section 14515 to the pre-wash section 14517, to the serial flow section 14519, and exit from the serial flow channel 14513 through the waste release tunnel 14507.

In some embodiments, the sample release tunnel 14509 is connected to the sample section 14515 of the serial flow channel 14513. In particular, the sample release tunnel 14509 is connected to a point subsequent to the beginning point of sample section 14515 (where the buffer release tunnel 14511) in the direction of flow. As such, when the sample solution is released from the sample release tunnel 14509, the sample solution may flow from at least a portion of the sample section 14515 to the pre-wash section 14517, to the serial flow section 14519, and exit from the serial flow channel 14513 through the waste release tunnel 14507.

In the example shown in FIG. 145B, the sample section 14515 is in a parallel arrangement with the pre-wash section 14517. For example, both the sample section 14515 and the pre-wash section 14517 may be disposed along a long side of the bottom surface of the example cartridge body 14500, and are connected by a portion of the serial flow channel 14513 that is along a short side of the bottom surface of the example cartridge body 14500.

In some embodiments, the serial flow section 14519 is positioned between the sample section 14515 and the pre-wash section 14517. In particular, the serial flow section 14519 comprises three parallel grooves that are connected in series. As described above, the three parallel grooves of the serial flow section 14519 may be aligned with the three channels on a waveguide sensor. For example, a top groove of the serial flow section 14519 may be aligned with a reference channel of the waveguide sensor. The middle groove of the serial flow section 14519 may be aligned with a sample channel of the waveguide sensor. The bottom groove of the serial flow section 14519 may be aligned with another reference channel of the waveguide sensor.

In some embodiments, the end of the serial flow section 14519 is connected to the waste release tunnel 14507, similar to those described above.

In accordance with various embodiments of the present disclosure, an example method of conducting sample testing by utilizing the example cartridge body 14500 is provided.

In some embodiments, the example method may comprise causing an injection of buffer solution to the serial flow channel 14513 through buffer release tunnel 14511 (for example, by pushing the pump membrane as described above). In some embodiments, the buffer solution flows through the serial flow channel 14513 and exits the serial flow channel 14513 through the waste release tunnel 14507, similar to those described above. As such, the buffer solution may wash the serial flow channel 14513 and remove any dust, air, or particles that may affect sample testing.

In some embodiments, the example method may comprise causing an injection of a sample solution to the serial flow channel 14513 through sample release tunnel 14509 (for example, through the injection septum as described above). In some embodiments, after the sample solution is injected into the serial flow channel 14513, the pump membrane continues to push the buffer solution through the serial flow channel 14513. Because the sample release tunnel 14509 is connected to the serial flow channel 14513 subsequent to where the buffer release tunnel 14511 is connected, the pump membrane may push the sample solution through the serial flow channel 14513.

For example, as the pump membrane continues pushing the sample solution, the sample solution may travel through the pre-wash section 14517, the top groove of the serial flow section 14519, and arrive at the middle groove of the serial flow section 14519. When the sample solution arrives at the middle groove of the serial flow section 14519, both the top groove and the bottom groove of the serial flow section 14519 are filled with buffer solution (such as water). As described above, the top groove of the serial flow section 14519 may be aligned with a reference channel of the waveguide sensor, the middle groove of the serial flow section 14519 may be aligned with a sample channel of the waveguide sensor, and a bottom groove of the serial flow section 14519 may be aligned with another reference channel of the waveguide sensor. As such, the waveguide sensor may detect a sample type of the sample solution in accordance with various examples described herein.

In some embodiments, the amount of the sample solution injected to the serial flow channel 14513 may be based on the length of the middle groove in the serial flow section 14519. For example, if the length of the middle groove in the serial flow section 14519 is one inch, the sample solution may be injected to the serial flow channel 14513 so that it fills the one inch length of the middle groove.

While the description above provides an example of the volume of the sample solution to be injected, it is noted that the scope of the present disclosure is not limited to the description above. In some examples, the volume of the injected sample solution can be higher than the middle groove in the serial flow section 14519, so that two or more sensing channels have overlapped sensing time. For example, the volume of the sample solution may be higher than the serial flow section 14519, such that all three channels in the waveguide sensor can conduct simultaneous detection and referencing for data comparison and noise cancellation.

Referring now to FIG. 145C, an example cross section view of the example cartridge body 14500 is illustrated. In particular, FIG. 145C illustrates the cross sections of the buffer reservoir 14505, the injection port 14503, and the waste reservoir 14501.

FIG. 145D and FIG. 145E illustrate example perspective views of the example cartridge body 14500. FIG. 145F illustrates an example left view of the example cartridge body 14500.

As such, various embodiments of the present disclosure provide an example waveguide cartridge 14400 that overcomes various technical challenges and difficulties, and provide technical advancements and improvements. For example, various embodiments of the present disclosure provide a fluidic body that defines an injection port for receiving a sample injection. The fluidic body also provides a buffer reservoir that is positioned to a front end of the injection port and a waste reservoir that is positioned to a back end of the injection port.

As described above, the buffer solution is pre-filled up in the buffer reservoir and along the sample section, pre-wash section, and the serial flow section of the serial flow channel. In some embodiments, the sample solution is then injected with a syringe to fill up the injection port and pushes a part of the buffer solution to the pre-wash section of the serial flow channel. In some embodiments, after the sample solution is injected, the pump membrane pushes the buffer solution and the sample solution through the serial flow section of the serial flow channel to complete pre-wash, sample immobilization, and post-wash.

As such, an example waveguide cartridge in accordance with embodiments of the present disclosure can provide a serial flow channel that can deliver pre-wash, sample fluid testing, post-wash functionalities. Various embodiments of the present disclosure may reduce the volumes of sections in the serial flow channels that are arranged with minimum connection volume between them to minimize the sensing delay between channels.

In various embodiments of the present disclosure, an example sample testing device does not utilize an imaging lens, as the example sample testing device does not need to image the output, but instead directly detects a shift in position of the laser beam from the output end of the waveguide that may be caused by the refractive index change of the waveguide (for example, as the sample travels through the sample channel of the sample testing device). As such, the example sample testing device may position an image sensor at a predetermined distance from the output end of the waveguide, and the image sensor may detect the shift in position of the laser beam from the output end of the waveguide.

However, as the laser beam from the output end of the waveguide changes in position in the vertical direction, the angle of incidence between the laser beam and the detection surface of the image sensor may change. For example, as the laser beam from the output end of the waveguide shifts upwards, the angle of incidence between the laser beam and the detection surface of the image sensor may increase. As the laser beam from the output end of the waveguide shifts downwards, the angle of incidence between the laser beam and the detection surface of the image sensor may decrease. The change in the angle of incidence between the laser beam and the detection surface of the image sensor may cause many technical challenges and difficulties.

For example, the change in the angle of incidence may affect the amplitude of the laser light as detected by the image sensor as well as sensor pixel angular responsivity. When the angle of incidence decreases (for example, when the laser light shifts towards to the middle of the image sensor), the amplitude of the laser light increases (for example, the laser light as detected by the image sensor becomes brighter) as well as sensor pixel angular responsivity increases (the electrical output level becomes higher). When the angle of incidence increases (for example, when the laser light shifts towards to the top or bottom of the image sensor), the amplitude of the laser light decreases (for example, the laser light as detected by the image sensor becomes darker) as well as sensor pixel angular responsivity decreases (the electrical output level becomes lower). The change in the amplitude of the laser light and sensor pixel angular responsivity may cause signal loss and create bias in detecting the position of the laser light by the image sensor. For example, the signal loss may reflect the signal position as detected by the image sensor. As an example, as the laser light shifts towards to the top or bottom of the image sensor, the amplitude and the light intensity of the laser light decreases as well as sensor pixel angular responsivity decreases, and the image sensor may not be able to detect the position of the highest/lowest laser beam and may inaccurately detect how much the laser light has shifted. As such, an image sensor in the interferometric sensing suffers sensor angular response problems. The actual fringe pattern image can be distorted, and the fringe shift detection is lower than actual shift.

Various embodiments of the present disclosure may overcome the above-referenced technical challenges and difficulties, and provide various technical improvements and advancements. For example, various embodiments of the present disclosure may incorporate a field lens in the front of the image sensor. The image sensor may correct the angle of incidence of the laser light to the image sensor to normal angles. Over the entire image sensor area of the image sensor, the normal angles of incidence to the image sensor ensure that the image sensor is able to provide the highest response with distortion free fringe pattern sensing.

Referring now to FIG. 146A, FIG. 146B, FIG. 146C, and FIG. 146D, example views of a sample testing device 14600 in accordance with various embodiments of the present disclosure are illustrated. In particular, FIG. 146A illustrates an example perspective view of the sample testing device 14600. FIG. 146B illustrates an example zoomed view of at least a portion of the sample testing device 14600. FIG. 146C illustrates an example side view of the sample testing device 14600. FIG. 146D illustrates another example zoomed view of at least a portion of the example sample testing device 14600.

In the example shown in FIG. 146A, the example sample testing device 14600 may comprise a multichannel waveguide 14602, similar to those described above.

In some embodiments, the example sample testing device 14600 may comprise a fiber array 14604, similar to those described above. In some embodiments, the fiber array 14604 may comprise fibers that may receive laser beams. In some embodiments, subsequent to the fiber array 14604 receiving the laser beams, the laser beams may be provided to the multichannel waveguide 14602. For example, each of the fiber array 14604 may convey a laser beam to one of the channels in the multichannel waveguide 14602.

In some embodiments, after the laser beams travel through channels in the multichannel waveguide 14602, the laser beams may exit from an output end of the multichannel waveguide 14602. In some embodiments, the positions of the laser beams from the output end of the multichannel waveguide 14602 may be shifted based at least in part on the change of the refractive index of the multichannel waveguide 14602. For example, the change in the change of the refractive index of the multichannel waveguide 14602 may occur after the sample solution is injected to the multichannel waveguide 14602, and the amount of the change of the refractive index of the multichannel waveguide 14602 can be an indicator of the bonding between virus molecules in the sample solution and the antibodies that are coated on the surface of the multichannel waveguide 14602.

In some embodiments, an image sensor 14606 is positioned adjacent to the output end of the multichannel waveguide 14602. As described above, the image sensor 14606 may detect the shift in the vertical position of the output laser beam from the multichannel waveguide 14602.

As described above, as the laser beam shifts to different positions along the vertical direction, the angle of incidence of the laser beam may change, which can cause technical problems and difficulties In accordance with some embodiments of the present disclosure, the example sample testing device 14600 may comprise a field lens 14608.

Referring now to FIG. 146B, an example zoomed view of the example sample testing device 14600 is illustrated. In particular, FIG. 146B illustrates an example zoomed view of at least a portion of the example sample testing device 14600 illustrated above in connection with FIG. 146A.

As described above, one of the technical issues faced by many sample testing devices is the angle of incidence between the laser light output from the multichannel waveguide 14602. For example, the further away that the image sensor is positioned from the output end of the multichannel waveguide 14602, the more shifts that the image sensor may detect from the output end of the multichannel waveguide 14602. Another issue of the angle of incidence is the signal/energy loss that is caused by the angle. Only the right angle position would provide zero energy loss and zero positioning loss.

Various embodiments of the present disclosure overcome these technical challenges and difficulties, and provide various technical improvements and advancements. In the example shown in FIG. 146B, the example sample testing device 14600 may comprise a field lens 14608 that is secured to the imaging surface of the image sensor 14606. In some embodiments, the field lens 14608 may be positioned to receive the laser beams output from the multichannel waveguide 14602.

In some embodiments, the field lens 14608 may be positioned at or near the image field that corresponds to the total image sensing surface of the image sensor 14606, such that the light may enter the image sensing surface of the image sensor 14606 without going through any other imaging lens. For example, the field lens 14608 may be positioned in close proximity to the sensing area of the image sensor 14606. Additionally, or alternatively, the field lens 14608 may be attached to the sensing area of the image sensor 14606.

In some embodiments, the fixed distance between the output end of the multichannel waveguide 14602 and the field lens 14608 may be determined based on the focal length of the field lens 14608. For example, the distance from the output end of the multichannel waveguide 14602 to the field lens 14608 may be matched to the focal length of the field lens 14608. As such the field lens 14608 may correct the angle of incidence from the output of the multichannel waveguide 14602 when it is positioned at such a fixed distance from the output of the multichannel waveguide 14602. After correction, the light enters the sensing surface of the image sensor 14606 at a normal angle. As such, various embodiments may normalize the angle of incidence to the sensor pixel over the entire field of view of the image sensor 14606 to generate non-distorted fringe pattern images, which can enhance the sensitivity of the image sensor 14606 to detect the laser beams existing from the multichannel waveguide 14602.

Referring now to FIG. 146C and FIG. 146D, an example side view and an example zoomed view of the example sample testing device 14600 in accordance with some embodiments of the present disclosure are illustrated.

As shown in FIG. 146C and FIG. 146D, with the field lens 14608 in place, all light exiting the lens and entering to the sending surface shown will be parallel to the lens optical axis. As such, various embodiments of the present disclosure may correct the light angle of incidence to the image sensor for uniformly high efficiency light, and normal incidence to the sensor pixel over the entire field of view for non-distorted fringe pattern image.

Referring now to FIG. 147A and FIG. 147B, an example field lens 14700 in accordance with some embodiments of the present disclosure is illustrated. In particular, FIG. 147A illustrates an example perspective view of the example field lens 14700, and FIG. 147B illustrates an example side view of the example field lens 14700.

In the example shown in FIG. 147A and FIG. 147B, the example field lens 14700 may be in the form of a plano-convex singlet lens. For example, the example field lens 14700 may comprise a curved surface that provides a positive focal length. The curvature of the example field lens 14700 may bend the angle of incidence of the light, such that the light entering the sensing area of the image sensor at or near an right angle, so as to reduce and/or eliminate the signal loss caused by the difference angles.

As such, the example field lens 14700 shown in FIG. 147A and FIG. 147B may correct the angle of incident of the light entering into the image sensor, and may provide various technical benefits and improvements described herein. For example, as described above, interferometric sensing may suffer from sensor angular response problems, where the actual fringe pattern image is distorted, and the fringe shift detection is lower than actual shift. Hence, a more appropriate solution is required. By attaching the example field lens 14700 to the sensing surface of the image sensor, various embodiments of the present disclosure may use example field lens 14700 in front of the image sensor to correct the light angle of incidence to the image sensor so that light will be normal to the image sensor. Here, the focal length of the field lens is matched to the distance from the light exit pupil.

It is to be understood that the disclosure is not to be limited to the specific examples disclosed, and that modifications and other examples are intended to be included within the scope of the appended claims. Although specific terms are employed herein, they are used in a generic and descriptive sense only and not for purposes of limitation, unless described otherwise.

The invention claimed is:

1. A method for sample testing comprising:
   injecting a sample mixture comprising a reference substance and a sample substance to each of a plurality of sample channels and at least one positive reference channel;
   generating a plurality of test signals based on interference fringe patterns from the plurality of sample channels and at least one reference signal based on at least one interference fringe pattern from the at least one positive reference channel;

receiving the plurality of test signals associated with the plurality of sample channels and the at least one reference signal from the at least one positive reference channel;

recording the at least one reference signal as at least one positive indication benchmark; and determining whether each test signal provides a positive indication according to the at least one positive indication benchmark.

2. The method of claim 1, further comprising:

in response to determining that a test signal from a sample channel provides a positive indication, generating a candidate data set comprising sample types that match the test signal associated with an antibody mixture coated on the sample channel, wherein the antibody mixture is specific to the sample types in the candidate data set.

3. The method of claim 1, further comprising:

in response to determining that a test signal from a sample channel does not provide a positive indication, generating an elimination data set comprising sample types that do not match the test signal associated with an antibody mixture coated on the sample channel, wherein the antibody mixture is not specific to the sample types in the elimination data set.

4. The method of claim 1, further comprising:

determining that the sample substance is associated with a sample type that is in each candidate data set and not in any elimination data set.

* * * * *